US011558423B2

(12) United States Patent
Gordon et al.

(10) Patent No.: US 11,558,423 B2
(45) Date of Patent: Jan. 17, 2023

(54) METHODS FOR ZERO TRUST SECURITY WITH HIGH QUALITY OF SERVICE

(71) Applicant: Stealthpath, Inc., Reston, VA (US)

(72) Inventors: Andrew Gordon, Alexandria, VA (US); Mike Clark, Sterling, VA (US); Matt Clark, Sterlin, VA (US); Daniel T. McGovern, Reston, VA (US); Kevin J. Kelly, Reston, VA (US); Nathan P. Leemkuil, Reston, VA (US)

(73) Assignee: Stealthpath, Inc., Vienna, VA (US)

( * ) Notice: Subject to any disclaimer, the term of this patent is extended or adjusted under 35 U.S.C. 154(b) by 0 days.

(21) Appl. No.: 17/034,306

(22) Filed: Sep. 28, 2020

(65) Prior Publication Data

US 2021/0266346 A1 Aug. 26, 2021

Related U.S. Application Data

(60) Provisional application No. 62/907,233, filed on Sep. 27, 2019.

(51) Int. Cl.
*H04L 29/06* (2006.01)
*H04L 9/40* (2022.01)

(52) U.S. Cl.
CPC .................................. *H04L 63/166* (2013.01)

(58) Field of Classification Search
CPC ............... H04L 63/166; H04L 63/0272; H04L 63/0428; H04L 63/083; H04L 63/0245
See application file for complete search history.

(56) References Cited

U.S. PATENT DOCUMENTS

| | | | |
|---|---|---|---|
| 5,657,390 | A | 8/1997 | Elgamal et al. |
| 6,131,163 | A | 10/2000 | Wiegel |
| 6,154,839 | A | 11/2000 | Arrow et al. |
| 6,718,533 | B1 | 4/2004 | Schneider et al. |
| 6,782,474 | B1 | 8/2004 | Ylonen |
| 6,795,917 | B1 | 9/2004 | Ylonen |
| 6,823,453 | B1 | 11/2004 | Hagerman |

(Continued)

FOREIGN PATENT DOCUMENTS

| | | |
|---|---|---|
| AU | 2017100426 | 6/2017 |
| EP | 1954005 | 8/2008 |

(Continued)

OTHER PUBLICATIONS

Centrity, "Zero Trust Security: A New Paradigm for a Changing World" (May 21, 2018). Available at httos /Avww centrify com/ resources/zero-trust-securitv-a-new-naradiam-for-a-chanaino-world/ (Year: 2018).*

(Continued)

*Primary Examiner* — Sanchit K Sarker
(74) *Attorney, Agent, or Firm* — Jones Day

(57) ABSTRACT

The present disclosure relates to network security software cooperatively configured on plural nodes to monitor, alert, authenticate, and authorize devices, applications, users, and data protocol in network communications by exchanging nonpublic identification codes, application identifiers, and data type identifiers via pre-established communication pathways and comparing against pre-established values to provide authorized communication and prevent compromised nodes from spreading malware to other nodes.

9 Claims, 54 Drawing Sheets

(56) References Cited

U.S. PATENT DOCUMENTS

| | | | | |
|---|---|---|---|---|
| 6,973,496 | B2 | 12/2005 | Hayes | |
| 6,981,278 | B1 | 12/2005 | Minnig et al. | |
| 7,069,438 | B2 | 6/2006 | Balabine et al. | |
| 7,197,762 | B2 | 3/2007 | Tarquini | |
| 7,249,191 | B1 | 7/2007 | Hutchison et al. | |
| 7,533,128 | B1 | 5/2009 | Sanchez et al. | |
| 7,602,731 | B2 | 10/2009 | Jain | |
| 7,783,853 | B1 | 8/2010 | Rhee et al. | |
| 7,827,559 | B1 | 11/2010 | Rhee et al. | |
| 7,958,237 | B2 | 6/2011 | Fertell et al. | |
| 8,001,605 | B2 | 8/2011 | Padmanabhan et al. | |
| 8,209,704 | B1 | 6/2012 | McCann et al. | |
| 8,256,003 | B2 | 8/2012 | Dadhia et al. | |
| 8,281,127 | B2 | 10/2012 | Hayes | |
| 8,291,495 | B1 | 10/2012 | Burns et al. | |
| 8,316,237 | B1 | 11/2012 | Felsher et al. | |
| 8,335,916 | B2 | 12/2012 | Brabson et al. | |
| 8,352,576 | B2 | 1/2013 | Sparks | |
| 8,356,169 | B2 | 1/2013 | Ishikawa et al. | |
| 8,402,540 | B2 | 3/2013 | Kapoor et al. | |
| 8,423,663 | B2 | 4/2013 | Archer et al. | |
| 8,457,034 | B2 | 6/2013 | Kuehl et al. | |
| 8,522,314 | B1 | 8/2013 | Vasquez et al. | |
| 8,572,697 | B2 | 10/2013 | Hayes et al. | |
| 8,671,135 | B1 | 3/2014 | Joshi et al. | |
| 8,763,094 | B1 | 6/2014 | Hsieh et al. | |
| 8,806,011 | B1 | 8/2014 | Graham-Cumming | |
| 8,812,466 | B2 | 8/2014 | Wilson | |
| 8,908,700 | B2 | 12/2014 | Chadda et al. | |
| 8,910,272 | B2 | 12/2014 | Brandstatter | |
| 8,984,504 | B2 | 3/2015 | Becker et al. | |
| 9,037,719 | B2 | 5/2015 | Shen et al. | |
| 9,106,257 | B1 | 8/2015 | Pohlack et al. | |
| 9,148,443 | B2 | 9/2015 | Chizeck et al. | |
| 9,191,203 | B2 | 11/2015 | Rooyakkers et al. | |
| 9,219,710 | B2 | 12/2015 | Loewenthal et al. | |
| 9,256,552 | B2 | 2/2016 | Epstein | |
| 9,264,356 | B2 * | 2/2016 | Ogawa | H04L 69/22 |
| 9,355,420 | B2 | 5/2016 | Anderson et al. | |
| 9,386,081 | B2 | 7/2016 | Sanchez et al. | |
| 9,405,283 | B1 | 8/2016 | Damico | |
| 9,436,923 | B1 | 9/2016 | Sriram et al. | |
| 9,467,297 | B2 | 10/2016 | Clish et al. | |
| 9,552,216 | B2 | 1/2017 | Zheng et al. | |
| 9,560,038 | B2 | 1/2017 | Gupta | |
| 9,565,180 | B2 | 2/2017 | Yerra et al. | |
| 9,621,461 | B2 | 4/2017 | Sun | |
| 9,973,499 | B2 | 5/2018 | Hayes et al. | |
| 9,973,577 | B2 | 5/2018 | Barc et al. | |
| 10,250,390 | B1 | 4/2019 | Gray et al. | |
| 10,630,642 | B2 * | 4/2020 | Clark | G06F 21/606 |
| 2002/0007345 | A1 | 1/2002 | Harris | |
| 2002/0049719 | A1 * | 4/2002 | Shiomi | G06F 9/5016 |
| 2002/0133491 | A1 | 9/2002 | Sim et al. | |
| 2002/0157019 | A1 | 10/2002 | Kadyk et al. | |
| 2002/0174334 | A1 | 11/2002 | Meadow et al. | |
| 2002/0178273 | A1 | 11/2002 | Pardo-Castellote et al. | |
| 2003/0065970 | A1 | 4/2003 | Kadam | |
| 2003/0084329 | A1 | 5/2003 | Tarquini | |
| 2003/0105957 | A1 | 6/2003 | Brabson et al. | |
| 2004/0027373 | A1 | 2/2004 | Jacquot et al. | |
| 2004/0088704 | A1 | 5/2004 | Owen et al. | |
| 2004/0098506 | A1 | 5/2004 | Jean | |
| 2004/0123142 | A1 | 6/2004 | Dubai et al. | |
| 2004/0143735 | A1 | 7/2004 | Ferguson | |
| 2004/0168062 | A1 | 8/2004 | Isozaki et al. | |
| 2004/0168063 | A1 | 8/2004 | Revital et al. | |
| 2005/0204132 | A1 | 9/2005 | Diehl et al. | |
| 2005/0238012 | A1 | 10/2005 | Panigrahy et al. | |
| 2006/0023709 | A1 | 2/2006 | Hall et al. | |
| 2006/0080545 | A1 | 4/2006 | Bagley | |
| 2006/0155984 | A1 | 7/2006 | Tsuchida et al. | |
| 2006/0214006 | A1 | 9/2006 | Mori et al. | |
| 2006/0230200 | A1 | 10/2006 | Bellows et al. | |
| 2007/0021123 | A1 | 1/2007 | A'Rafat et al. | |
| 2007/0100999 | A1 | 5/2007 | Haider | |
| 2007/0136801 | A1 | 6/2007 | Le et al. | |
| 2007/0186115 | A1 | 8/2007 | Gao et al. | |
| 2007/0198656 | A1 | 8/2007 | Mazzaferri et al. | |
| 2007/0198837 | A1 * | 8/2007 | Koodli | H04W 12/0471 713/153 |
| 2007/0300219 | A1 | 12/2007 | Devaux | |
| 2008/0059788 | A1 | 3/2008 | Tardo et al. | |
| 2008/0134327 | A1 | 6/2008 | Bharrat et al. | |
| 2008/0175239 | A1 | 7/2008 | Sistanizadeh et al. | |
| 2009/0113202 | A1 * | 4/2009 | Hidle | H04L 63/0428 713/153 |
| 2009/0144541 | A1 | 6/2009 | Kim et al. | |
| 2009/0282460 | A1 | 11/2009 | Brooks | |
| 2010/0011410 | A1 | 1/2010 | Liu | |
| 2010/0054204 | A1 * | 3/2010 | Dolganow | H04W 4/50 370/331 |
| 2010/0070677 | A1 | 3/2010 | Thakkar | |
| 2010/0205427 | A1 | 8/2010 | Bauer et al. | |
| 2010/0316219 | A1 | 12/2010 | Boubion et al. | |
| 2011/0051606 | A1 | 3/2011 | Cutlip et al. | |
| 2011/0208965 | A1 | 8/2011 | Machani | |
| 2011/0246359 | A1 | 8/2011 | O'Brien et al. | |
| 2011/0214157 | A1 * | 9/2011 | Korsunsky | H04L 63/1425 726/1 |
| 2011/0231924 | A1 | 9/2011 | Devdhar et al. | |
| 2011/0295923 | A1 | 12/2011 | de Campos Ruiz et al. | |
| 2012/0054841 | A1 * | 3/2012 | Schultz | G06F 21/51 726/22 |
| 2012/0079476 | A1 | 3/2012 | Anderson | |
| 2012/0099425 | A1 | 4/2012 | Wang et al. | |
| 2012/0110335 | A1 | 5/2012 | Sandler et al. | |
| 2012/0144187 | A1 | 6/2012 | Wei et al. | |
| 2012/0185692 | A1 | 7/2012 | Hamlin | |
| 2013/0133026 | A1 | 5/2013 | Burgess | |
| 2013/0195109 | A1 * | 8/2013 | Ogawa | H04L 69/08 370/392 |
| 2013/0204988 | A1 | 8/2013 | Grewal et al. | |
| 2013/0332724 | A1 | 12/2013 | Walters | |
| 2014/0122678 | A1 | 5/2014 | Miner et al. | |
| 2014/0150083 | A1 | 5/2014 | Dinha et al. | |
| 2014/0172633 | A1 | 6/2014 | Dogin et al. | |
| 2014/0177839 | A1 | 6/2014 | Wagner et al. | |
| 2015/0012964 | A1 | 1/2015 | Xie et al. | |
| 2015/0012999 | A1 | 1/2015 | McGee | |
| 2015/0055467 | A1 | 2/2015 | Agarwal et al. | |
| 2015/0067059 | A1 | 3/2015 | Sanchez et al. | |
| 2015/0067796 | A1 | 3/2015 | Hayes et al. | |
| 2015/0113615 | A1 | 4/2015 | Foster et al. | |
| 2015/0128152 | A1 | 5/2015 | Lachaume | |
| 2015/0188823 | A1 | 7/2015 | Williams et al. | |
| 2015/0220625 | A1 | 8/2015 | Cartmell et al. | |
| 2015/0220927 | A1 | 8/2015 | Smith et al. | |
| 2015/0256431 | A1 | 9/2015 | Buchanan et al. | |
| 2015/0281278 | A1 | 10/2015 | Gooding et al. | |
| 2015/0332395 | A1 | 11/2015 | Walker et al. | |
| 2015/0363782 | A1 | 12/2015 | Ronca et al. | |
| 2015/0365389 | A1 | 12/2015 | Zhang et al. | |
| 2016/0006844 | A1 | 1/2016 | Tychina | |
| 2016/0027229 | A1 | 1/2016 | Spanos et al. | |
| 2016/0072787 | A1 | 3/2016 | Balabine et al. | |
| 2016/0072800 | A1 | 3/2016 | Soon-Shiong | |
| 2016/0078212 | A1 | 3/2016 | Bish et al. | |
| 2016/0119208 | A1 | 4/2016 | Castro et al. | |
| 2016/0164884 | A1 | 6/2016 | Sriram et al. | |
| 2016/0191551 | A1 | 6/2016 | Beauchesne et al. | |
| 2016/0211940 | A1 | 7/2016 | Carrascosa et al. | |
| 2016/0219024 | A1 * | 7/2016 | Verzun | H04L 9/34 |
| 2016/0226916 | A1 | 8/2016 | Buruganahalli et al. | |
| 2016/0253516 | A1 | 9/2016 | Beiter et al. | |
| 2016/0269421 | A1 | 9/2016 | Hayes | |
| 2016/0300234 | A1 | 10/2016 | Moss-Pultz | |
| 2016/0301695 | A1 | 10/2016 | Trivelpiece et al. | |
| 2016/0323219 | A1 | 11/2016 | Brecx | |
| 2016/0330209 | A1 | 11/2016 | Iacob et al. | |
| 2016/0352683 | A1 | 12/2016 | Cooper et al. | |
| 2016/0373262 | A1 | 12/2016 | Shearer et al. | |
| 2016/0373433 | A1 | 12/2016 | Rivers et al. | |
| 2017/0019426 | A1 | 1/2017 | Hayes | |

(56) References Cited

U.S. PATENT DOCUMENTS

| | | | |
|---|---|---|---|
| 2017/0034216 A1 | 2/2017 | Santhiveeran et al. | |
| 2017/0039146 A1 | 2/2017 | Lanigan et al. | |
| 2017/0046664 A1 | 2/2017 | Haldenby et al. | |
| 2017/0076106 A1 | 3/2017 | Keidar | |
| 2017/0116693 A1 | 4/2017 | Rae et al. | |
| 2017/0132615 A1 | 5/2017 | Castinado et al. | |
| 2017/0140408 A1 | 5/2017 | Wuehler | |
| 2017/0147807 A1 | 5/2017 | Rooyakkers | |
| 2017/0180250 A1 | 6/2017 | Shin et al. | |
| 2017/0187590 A1 | 6/2017 | Cook et al. | |
| 2017/0200000 A1 | 7/2017 | Bish et al. | |
| 2017/0201385 A1 | 7/2017 | Kravitz et al. | |
| 2017/0214694 A1 | 7/2017 | Yan | |
| 2017/0220815 A1 | 8/2017 | Ansari et al. | |
| 2017/0251065 A1 | 8/2017 | Furr et al. | |
| 2017/0257347 A1 | 9/2017 | Yan et al. | |
| 2017/0262862 A1 | 9/2017 | Aljawhari | |
| 2017/0264428 A1 | 9/2017 | Seger, II | |
| 2017/0279783 A1 | 9/2017 | Milazzo et al. | |
| 2017/0310579 A1 | 10/2017 | Hayes | |
| 2017/0374029 A1 | 12/2017 | Cianfrocca | |
| 2018/0109538 A1 | 4/2018 | Kumar et al. | |
| 2018/0220278 A1 | 8/2018 | Tal et al. | |
| 2018/0253451 A1 | 9/2018 | Callan et al. | |
| 2018/0294973 A1 | 10/2018 | Miller et al. | |
| 2019/0109820 A1* | 4/2019 | Clark | H04L 9/0861 |
| 2019/0109821 A1* | 4/2019 | Clark | H04L 63/0414 |
| 2019/0109864 A1 | 4/2019 | Eren et al. | |
| 2019/0116158 A1 | 4/2019 | Patil et al. | |
| 2020/0273268 A1* | 8/2020 | Bhattacharyya | H04W 4/40 |
| 2021/0266346 A1* | 8/2021 | Gordon | H04L 63/166 |

FOREIGN PATENT DOCUMENTS

| | | |
|---|---|---|
| EP | 3188440 | 7/2017 |
| WO | WO 2014/027266 | 2/2014 |
| WO | WO 2014/153176 | 9/2014 |
| WO | WO 2017/004527 | 1/2017 |
| WO | WO 2017/051069 | 3/2017 |
| WO | WO 2017/054985 | 4/2017 |
| WO | WO 2018/051305 | 3/2018 |

OTHER PUBLICATIONS

Ahmad et al., "Security in Software Defined Networks: A Survey." *IEEE Communication Surveys & Tutorials*, 17(4) (2015) 2317-2346.
Arxan, "Securing DRM and Multimedia Applications through Guard Technology." (Jul. 22, 2011), at https://www.sysbus.eu/wp-content/uploads/2016/08/Securing_DRM_and_Multimedia_App.indd_.pdf (downloaded Dec. 18, 2017).
Arxan, "Securing Cryptographic Keys." (Sep. 4, 2017), at https://www.arxan.com/wp-content/uploads/2016/07/Securing-Cryptographic-Keys. pdf (downloaded Dec. 18, 2017).
Bakker, "Enforcing a network-wide security policy using SDN." School of Engineering and Computer Science Te Kura Matai Pukaha, Purorohiko (2015).
Bedrock Automation, "White Paper Series—Chapter One." (Dec. 1, 2014).
Bedrock Automation, "White Paper Series—Chapter Two." (Mar. 23, 2015).
Bedrock Automation, "White Paper Series—Chapter Three." (Apr. 19, 2016).
Centrify, "Zero Trust Security: A New Paradigm for a Changing World" (May 21, 2018). Available at https://www.centrify.com/resources/zero-trust-security-a-new-paradigm-for-a-changing-world/.
Department of Homeland Security, "Security Tenets for Life Critical Embedded Systems." (Nov. 20, 2015), at https://www.dhs.gov/publication/security-tenets-lces (downloaded Dec. 18, 2017).
Gervais, "Security Analysis of Industrial Control Systems." Master's Thesis, KTH Stockholm and Aalto University (Jun. 29, 2012).
Ha, Taejin et al. "Suspicious Flow Forwarding for Multiple Intrusion Detection Systems on Software-Defined Networks," IEEE Network 30:6 (Nov. 1, 2016) 22-27.
"Implementation of an SSL Proxy in a Software Defined Network Aboard a Naval Ship to Monitor Internet Traffic." (2015) at https://events.static.linuxfound.org/sites/events/files/slides/SDN%20SSL%20Proxy%20Pat%20Dyroff.pdf (downloaded Dec. 18, 2017).
Lin et al., "IoT Privacy and Security Challenges for Smart Home Environments." *Information* 7 (2016) 44.
Lu R. et al., "Secure Provenance: The Essential of Bread and Butter of Data Forensics in Cloud Computing," Proceedings of the 5th ACM Symposium on Information, Computer and Communications Security (Apr. 13-16, 2010).
Mocana, "White Paper: Hardening the IoT Stack" (Aug. 22, 2017). Available at https://www.mocana.com/hardening-the-iot-stack-lp.
Mukherjee et al., "Design and build secure IoT solutions, Part 2: Securing IoT data over the network." IBM (Apr. 28, 2017).
Object Management Group, "The Real-time Publish-Subscribe Protocol (RTPS) DDS Interoperability Wire Protocol Specification, Version 2.2." (Sep. 2014).
Object Management Group, "DDS Security, Version 1.0." (Sep. 2016).
OneM2M, "Security Solutions Doc. No. TS-0003-V3.3.1." (2017).
Pardo-Castellote G. et al., "Securing access to Distributed Pub-Sub Information in a System-of-Systems and GIG Environment." Real-Time Innovations, Inc. (May 2010).
Park et al., "Mutual Authentication Scheme in Secure Internet of Things Technology for Comfortable Lifestyle." *Sensors* 16 (2016) 20.
Real-Time Innovations, "Security Solutions." (2012).
RTI News Releases, "RTI and Tresys Join Forces With Wind River to Announce Innovative CADRE Architecture for Building Flexible, Cost-Effective Secure Cross-Domain Solutions." at http://news.rti.com/pr/tresys-cds-framework (May 2, 2011) (downloaded Apr. 23, 2017).
Soroush et al., "Next-generation Cybersecurity for Advanced Real-time Distributed Systems." NSWCDD/PN-15/143 (Mar. 2015).
Wong et al., "RTI Q&A on Building the DDS Security Standard." (Aug. 11, 2014), at http://www.electronicdesign.com/dev-tools/rti-qa-building-dds-security-standard (downloaded May 10, 2017).
Xage, "Decentralized and Adaptive Security for the new Industrial Edge" (Dec. 2017). http://info.xage.com/hubfs/whitepapers/xage_whitepaper_decentralized-adaptive-security.pdf.
Youssef et al., "Data Distribution Service-Based Interoperability Framework for Smart Grid Testbed Infrastructure." *Energies* 9 (2016) 150.

* cited by examiner

3400

SID1 3402

3404

| | 3408 | 3410 | 3412 | 3414 | 3416 | 3418 | 3420 | 3422 | 3424 | 3426 | 3428 | | |
|---|---|---|---|---|---|---|---|---|---|---|---|---|---|
| 3430 | NIC 001 | USER A | APP 1 | SID2 | USER D | APP 4 | 7001 | 12001 | 8001 | 13001 | 0001 | | |
| 3432 | NIC 001 | USER A | APP 2 | SID2 | USER D | APP 4 | - | - | 9002 | 14002 | 0001 | | |
| 3434 | - | USER B | APP 2 | SID3 | USER F | APP 5 | 7003 | 12003 | 9003 | 14003 | 0001 | | |
| | | | | | | | | | | | | | |
| | | | | | | | | | | | | | |
| | | | | | | | | | | | | | |
| | | | | | | | | | | | | | |

| 3804 | 3808 | 3810 | 3812 | 3814 | 3816 | 3818 | 3820 | 3822 | 3824 |
|---|---|---|---|---|---|---|---|---|---|
| 3826 | SID(1) | NIC(1,1) | APP(A,T) | SID(2) | NIC(2,1) | APP(B,U) | 7001 | 12001 | 0001 |
| 3828 | SID(3) | NIC(3,2) | APP(C,V) | SID(1) | NIC(1,2) | APP(D,T) | 8001 | 13001 | 0002 |
| 3830 | SID(1) | NIC(1,1) | APP(A,T) | SID(2) | NIC(2,1) | APP(B,U) | 7002 | 12002 | 0003 |
| | | | | | | | | | |
| | | | | | | | | | |
| | | | | | | | | | |
| | | | | | | | | | |

| | 4008 | 4010 | 4012 | 4014 | 4016 | 4018 | 4020 |
|---|---|---|---|---|---|---|---|
| 4022 | USER A | APP 1 | W | 6001 | 10001 | 7001 | 12001 |
| 4024 | USER B | APP 1 | W | 6002 | 10002 | 7002 | 12002 |
| 4026 | USER A | APP 2 | X | 6003 | 10003 | 7003 | 12003 |
| 4028 | USER A | APP 2 | Y | 6004 | 10004 | 7004 | 12004 |
| | USER C | APP 3 | Z | 6005 | 10005 | 7005 | 12005 |

SID2 — 4602

4604

4606

| | 4608 | 4610 | 4612 | 4614 | 4616 | 4618 | 4620 | 4622 | 4624 | 4626 | | |
|---|---|---|---|---|---|---|---|---|---|---|---|---|
| 4628 | 6001 | C | 10001 | NIC 002 | SID 1 | W | – | – | LAID 1 | RAID 1 | | |
| 4630 | 6009 | C | 10009 | NIC 003 | SID 4 | R | – | – | LAID 9 | RAID 9 | | |
| 4632 | 6003 | C | 10003 | NIC 002 | SID 1 | R/W | 7003 | 12003 | LAID 3 | RAID 3 | | |
| | | | | | | | | | | | | |
| | | | | | | | | | | | | |
| | | | | | | | | | | | | |
| | | | | | | | | | | | | |

FIG. 46

METHODS FOR ZERO TRUST SECURITY WITH HIGH QUALITY OF SERVICE

CROSS REFERENCE TO RELATED APPLICATION

This application claims the benefit of priority from U.S. Provisional Application No. 62/907,233, filed Sep. 27, 2019. The foregoing related application, in its entirety, is incorporated herein by reference.

FIELD OF THE INVENTION

The present disclosure relates to systems, methods, and apparatuses to secure computing devices against network-borne security threats.

BACKGROUND OF THE INVENTION

Networked computing devices are embedded almost everywhere in the modern economy. Increasingly connected to the wider information environment, these devices deliver enhanced control, safety, and convenience. The downside to this paradigm, however, is increased surface area and vectors for cyber attacks, especially from inside traditional security perimeters such as firewalls, placing both data and infrastructure at risk. Recognizing that actors, systems or services operating from within the security perimeter can pose as much of a threat as external threats, proactive architectures such as Zero Trust architectures are intended to provide rigid cyberhygeine policies to authorize and authentic all traffic in a network.

In practice, such strategies have proven difficult to fully implement in modern computing environments while maintaining stable quality of service (QOS). Providing the complete system description necessary to implement a proactive security architecture such as Zero Trust, for example, can be daunting. Moreover, QOS can be difficult to maintain over time as the network and node configurations evolve due to an ever growing number of inter-related moving parts (including applications, operating systems and cybersecurity agents) that require nearly continual configuring, updating, and patching as well as resolving of conflicts that arise as a result of these activities. In lockstep with these changes, proactive security approaches can require near continual reconfiguring to avoid mismatches which can degrade QOS. As a result, organizations struggle to implement proactive security architectures.

Better engagement models are needed for initialization, implementation, and maintenance of pro-active network security architectures. First, new approaches at the pre-implementation stage are needed to identify users, applications, connections, and contexts to be incorporated in an initial security configuration. Second, real-time mapping and tracking of actual system behavior is required to provide dynamic updates to system configuration. Third, proactive architectures should be implemented with flexibility to monitor and adjust detection activity before progressing to full cyber hygiene protection.

BRIEF SUMMARY OF THE INVENTION

The present disclosure relates, in certain embodiments, to methods, systems, products, software, modules, middleware, computing infrastructure and/or apparatus to implement a proactive security architecture at the API command, device/network, and IP payload levels by a series of communication management operations that may be selectively and reversibly enabled or disabled. Protection layers may be selectively added via automated monitoring and provisioning of security software, alerting, and full authentication and authorization of device, application and user endpoints. This approach enables proactive security architectures to be phased-in with management impact to QOS.

Certain embodiments may comprise, for example, an edge device. In certain embodiments, for example, the edge device may comprise a NIC, a processor, a communication parameters file, and software components executable by the processor. In certain embodiments, for example, the software components may comprise a networking stack. In certain embodiments, for example, the software components may comprise an application program comprising an API command to the networking stack. In certain embodiments, for example, the software components may comprise a network security program executable to perform communication management operations. In certain embodiments, for example, the communication management operations may comprise: authorizing one or more networking stack functions triggered by the API command, comprising: I) obtaining an application identifier and process owner associated with an instance of the application program, and further obtaining a port number and a NIC address associated with the API command; II) parsing the communication parameters file to obtain a nonpublic application code and a nonpublic user code associated with the port number paired with the NIC address; and III) confirming the nonpublic application code corresponds to the application identifier and further confirming the nonpublic user code corresponds to the process owner. In certain embodiments, for example, the communication management operations may comprise: forming a configured network communication pathway between the application program instance and a remote program operated by a remote user on a remote device, comprising: I) sending a first configuration packet from the device to the remote device, the first configuration packet containing a nonpublic device identifier for the device in an application layer portion of the first configuration packet; II) receiving a second configuration packet from the remote device, the second configuration packet containing a first remote parameter in a first application layer portion of the second configuration packet and a second remote parameter in a second application layer portion of the second configuration packet; and III) matching that the first remote parameter to a nonpublic remote application code that is associated with the port number in the communication parameters file, and further matching the second remote parameter corresponds to a nonpublic remote user code that is associated with the port number in the communications parameter file.

A. In certain embodiments, for example, the API command may be a bind command. In certain embodiments, for example, the API command may be a connect command. In certain embodiments, for example, the API command may be an accept command.

B. In certain embodiments, for example, the configured network communication pathway may be at least partially encrypted. In certain embodiments, for example, the configured network communication pathway may comprise an IPSec tunnel. In certain embodiments, for example, the network security program may be installed during production of the device.

C. Certain embodiments may provide, for example, an inventory comprising a plurality of the edge device.

D. Certain embodiments may provide, for example, a method of updating a security configuration of the edge device, comprising: transmitting an updated communication parameters file to the device via the configured network communication pathway.

E. In certain embodiments, for example, the obtaining may be performed in a kernel space of the edge device. In certain embodiments, for example, the parsing may be performed in a kernel space of the edge device. In certain embodiments, for example, the confirming may be performed in a kernel space of the edge device. In certain embodiments, for example, the matching may be performed in a kernel space of the edge device. In certain embodiments, for example, the further matching may be performed in a kernel space of the edge device.

F. In certain embodiments, for example, the forming a configured network communication pathway may further comprise: further sending a third configuration packet from the device to the remote device, the third configuration packet containing the nonpublic application code and the nonpublic user code in an application layer portion of the third configuration packet. In certain embodiments, for example, the third configuration packet may be sent prior to receiving the second configuration packet.

G. In certain embodiments, for example, the forming a configured network communication pathway may further comprise: i) further receiving a third configuration packet from the remote device, the third configuration packet containing a second remote parameter in an application layer portion of the third configuration packet; and ii) further confirming that the second remote parameter corresponds to a nonpublic remote device identifier for the remote device and associated with the port number in the communication parameters file. In certain embodiments, for example, the further confirming may be performed in a kernel space of the edge device.

H. In certain embodiments, for example, the communication management operations may further comprise: preventing the port number from being used by any communication pathway except for the configured network communication pathway.

I. In certain embodiments, for example, the communication parameters file may be encrypted. In certain embodiments, for example, the parsing the communication parameters file may comprise: i) identifying a data record in the configuration parameters file that contains the port number in a destination port number field of the identified data record in the configuration parameters file; and ii) verifying that the nonpublic application code may be present in a local application identification field of the identified data record and that the nonpublic user code may be present in a local user identification field of the identified data record. In certain embodiments, for example, the identified data record may be the only data record in the communication parameters file that contains the port number in the destination port number field. In certain embodiments, for example, the identified data record may further comprise a flag in a flag field of the data record, the flag specifying whether the configured network communication pathway is authorized for unidirectional or bidirectional data flow between the application program and a remote application program.

J. In certain embodiments, for example, the communication management operations may further comprise: preventing all user-applications on the edge device from directly connecting to remote computing devices. In certain embodiments, for example, the communication management operations may further comprise: redirecting all requests from user-applications to connect to remote computing devices to a loopback interface. In certain embodiments, for example, the communication management operations may further comprise: i) receiving a series of further network packets, the series of further network packets comprising (a) application data, and (b) encrypted parameters in application layer portions of the further network packets; ii) decrypting the encrypted parameters using decryption keys to obtain decrypted parameters; and ii) verifying that the decrypted parameters match the nonpublic remote application code prior to passing the application data to the application program. In certain embodiments, for example, the verifying may comprise: i) first verifying that a first decrypted parameter of the decrypted parameters matches the nonpublic remote application code followed by passing first data of the application data to the application program; followed by ii) second verifying that a second decrypted parameter of the decrypted parameters matches the nonpublic remote application code followed by passing second data of the application data to the application program. In certain embodiments, for example, the verifying may be performed in a kernel space of the edge device. In certain embodiments, for example, the series of further network packets comprise all communications of user space data via the configured network communication pathway. In certain embodiments, for example, the communication management operations may further comprise: inspecting the application data to confirm that at least portions of the application data conform to one or more content requirements. In certain embodiments, for example, the inspecting may be performed in the kernel space of the edge device. In certain embodiments, for example, the one or more content requirements may comprise a data range. In certain embodiments, for example, the one or more content requirements may comprise a command type authorized to be present in the application data. In certain embodiments, for example, the one or more content requirements may comprise a command type that is prohibited from being present in the application data. In certain embodiments, for example, the decrypting may be performed with one or more decryption keys. In certain embodiments, for example, the one or more decryption keys may be not applied to the application data. In certain embodiments, for example, the one or more decryption keys comprise a series of different single-use decryption keys.

K. In certain embodiments, for example, the configured network communication pathway may comprise a TCP connection.

L. In certain embodiments, for example, the configuring may comprise: verifying that an authorized functional counterpart of the network security program is running on the second computing device.

M. In certain embodiments, for example, the network security program may comprise at least one kernel loadable module. In certain embodiments, for example, the network security program uses a Netfilter framework. In certain embodiments, for example, the network security program uses a Windows Filtering Protocol framework. In certain embodiments, for example, the network security program and the application program may be not configured to set up a packet communication pathway between transport layer ports of the network security program and the application program.

N. In certain embodiments, for example, the network security program may comprise obfuscation code. In certain embodiments, for example, the network security program may comprise one or more covert channels. In certain embodiments, for example, the application may comprise an artificial intelligence component. In certain embodiments, for example, the application may be part or all of a predictive maintenance system comprising an artificial intelligence component. In certain embodiments, for example, the edge device may be part or all of an artificial intelligence appliance. In certain embodiments, for example, the application may be part or all of an energy management system comprising an artificial intelligence component. In certain embodiments, for example, the application may be part or all of an inventory optimization system comprising an artificial intelligence component. In certain embodiments, for example, the application may be part or all of a smart city management system comprising an artificial intelligence component. In certain embodiments, for example, the application may be part or all of a smart factory management system comprising an artificial intelligence component. In certain embodiments, for example, the application may be part or all of a voice recognition system comprising an artificial intelligence component. In certain embodiments, for example, the application may be part or all of a facial recognition system comprising an artificial intelligence component. In certain embodiments, for example, the application may be part or all of a deepfake detection system such as a deepfake detection system comprising an artificial intelligence component. In certain embodiments, for example, the application may be part or all of a machine learning (for example automated machine learning or reinforcement learning) system (for example a deep learning system such as a system using multi-layer, deep neural networks (DNNs))) comprising an artificial intelligence component. In certain embodiments, for example, the application may be part or all of a pharmaceutical research system (for example a drug discovery or formulation optimization system) comprising an artificial intelligence component. In certain embodiments, for example, the application may be part or all of an anti-money laundering system comprising an artificial intelligence component. In certain embodiments, for example, the application may be part or all of fraud detection system comprising an artificial intelligence component. In certain embodiments, for example, the application may be part or all of an artificial intelligence modeling system. In certain embodiments, for example, the application may be part or all of an artificial intelligence model training system. In certain embodiments, for example, the application may be part or all of an enterprise artificial intelligence system. In certain embodiments, for example, the application may be part or all of an augmented reality system such as an augmented reality system comprising an artificial intelligence model. In certain embodiments, for example, the application may be part or all of a software for developing artificial intelligence applications. In certain embodiments, for example, the application may be a social media application, such as a blog, a social network site, a dating site, a news site, a website that allows users to post pictures or video, and the like. In certain embodiments, for example, the application may comprise an artificial intelligence component embedded on a chip.

O. In certain embodiments, for example, the edge device may be present in a drone. In certain embodiments, for example, the edge device may be present in a satellite. In certain embodiments, for example, the edge device may be present in a signal intelligence system. In certain embodiments, for example, the edge device may be present in a military device (for example a tank, a military aircraft, a military drone, a submarine, etc.). In certain embodiments, for example, the edge device may be used for one or more of analyzing intelligence, organizing prudent data for military leaders, providing geospatial analysis, controlling a smart weapon, or communicating information in cognitive electronic warfare (for example to improve situational awareness in one or more of a hostile zone, war zone, or combat zone). In certain embodiments, for example, the device may classify heat signatures so warfighters can be informed of people, buildings, or other objects. In certain embodiments, for example, the edge device may be present in an autonomous device. In certain embodiments, for example, the edge device may be present in a disaster recovery system. In certain embodiments, for example, the edge device may be present in a satellite. In certain embodiments, for example, the edge device may be present in an automobile. In certain embodiments, for example, the edge device may be present in an aircraft. In certain embodiments, for example, the edge device may be present in or in communication with a GPS system. In certain embodiments, for example, the edge device may be present in or in communication with a radar. In certain embodiments, for example, the edge device may be present in a surveillance device. In certain embodiments, for example, the surveillance device may be a video camera. In certain embodiments, for example, the surveillance device may be a perimeter security device. In certain embodiments, for example, the edge device may be present in critical infrastructure. In certain embodiments, for example, the edge device may be a process controller. In certain embodiments, for example, the edge device may be present in a factory. In certain embodiments, for example, the edge device may be present in oil and/or gas infrastructure. In certain embodiments, for example, the edge device may be present in an oil rig (for example an offshore oil rig). In certain embodiments, for example, the edge device may be a component of a control system for a refinery or a petrochemical plant. In certain embodiments, for example, the edge device (for example a controlled device, a sensor, or a controller) may be present in a liquid natural gas infrastructure. In certain embodiments, for example, the edge device may be in communication with a container management system.

P. In certain embodiments, for example, the edge device may be a remote console configured to access a network (for example an enterprise network or operational technology network (such as a network in a factory)). In certain embodiments, for example, the remote console may be configured to provide a system administrator access to the network. In certain embodiments, for example, the network security software may prevent the remote console from forming a connection with any devices except for devices on one or more predetermined networks.

Q. In certain embodiments, for example, the edge device may be in communication with a hypervisor. In certain embodiments, for example, the edge device may be a virtual device. In certain embodiments, for example, the edge device may be a physical device. In certain embodiments, for example, the NIC may be a physical NIC. In certain embodiments, for example, the NIC may be a virtual NIC.

R. In certain embodiments, for example, the nonpublic device identifier, the nonpublic application code, the nonpublic remote device identifier, and the nonpublic remote application code may be shared secrets between the edge device and the remote device.

S. In certain embodiments, for example, the port number may have a value of between 1024 and 65535.

T. In certain embodiments, for example, the edge device may transmit information comprising at least a portion of an executable code via the configured communication pathway. In certain embodiments, for example, the information may comprise at least a portion of a script. In certain embodiments, for example, the information may comprise at least a portion of a transaction. In certain embodiments, for example, the transaction may be configured to modify ownership of at least one token. In certain embodiments, for example, the transaction may be configured to create a smart contract. In certain embodiments, for example, the transaction may be configured to invoke a smart contract method. In certain embodiments, for example, the transaction may be configured to encode data in a file. In certain embodiments, for example, the information may comprise at least a portion of a proposed block of transactions. In certain embodiments, for example, the information may comprise at least a portion of a protocol message. In certain embodiments, for example, the remote program may be an information management process. In certain embodiments, for example, the information management process may comprise a distributed ledger management process. In certain embodiments, for example, the information management process may comprise a supply chain management process. In certain embodiments, for example, the information management process may comprise a fintech service. In certain embodiments, for example, the information management process may comprise a transaction processing service. In certain embodiments, for example, the information management process may comprise a file update process. In certain embodiments, for example, the information management process may be distributed on a peer-to-peer network. In certain embodiments, for example, the application program may be a wallet on the edge device. In certain embodiments, for example, the edge device may be a mobile device.

U. In certain embodiments, for example, application program may comprise at least a portion of the network security program. In certain embodiments, for example, the application program controls at least a portion of the communication management operations.

Certain embodiments may provide, for example, a method to manage communications with a plurality of edge devices. In certain embodiments, for example, the method may comprise pre-loading communication configuration parameters onto the edge devices, the communication management parameters comprising: a) destination addresses and port numbers for authorized destination ports at the destination addresses; b) nonpublic device codes for the edge devices; and c) identifiers for authorized software on the edge devices. In certain embodiments, for example, the method may comprise pre-installing network security software on the edge devices, the network security software configured to restrict network communications of the edge devices to communications between the authorized software and the authorized destination ports. In certain embodiments, for example, the method may comprise establishing authorized network connections with the edge devices, comprising: a) receiving metadata packets at the authorized destination ports, the metadata packets containing first values and second values in application layer portions of the metadata packets; and b) verifying that the first values match the installed nonpublic device codes and the second values match the installed authorized software identifiers.

A. In certain embodiments, for example, the destination addresses may be IP addresses for NICs resident on the plurality of edge devices. In certain embodiments, for example, the destination addresses may be hostnames.

Certain embodiments may provide, for example, a method to manage communications of an edge device. In certain embodiments, for example, the method may comprise pre-loading communication configuration parameters onto the edge device, the communication management parameters comprising: a) a destination address and a port number for an authorized transport layer destination port at the destination address; b) a nonpublic device code for the edge device; and c) an identifier for authorized software on the edge device. In certain embodiments, for example, the method may comprise pre-installing network security software on the edge device, the network security software configured to restrict network communications of the edge device to communications between the authorized software and the authorized destination port. In certain embodiments, for example, the method may comprise establishing authorized network connections with the edge device, comprising: a) receiving a metadata packet at the authorized destination port, the metadata packets containing a first value and a second value in an application layer portion of the metadata packet; and b) verifying that the first value matches the installed nonpublic device code and the second value matches the installed authorized software identifier.

Certain embodiments may provide, for example, an edge device. In certain embodiments, for example, the edge device may comprise a NIC, a processor, a communication parameters file, and software components executable by the processor. In certain embodiments, for example, the software components may comprise a networking stack. In certain embodiments, for example, the software components may comprise an application program comprising an API command to the networking stack. In certain embodiments, for example, the software components may comprise a network security program executable to perform communication management operations. In certain embodiments, for example, the communication management operations may comprise authorizing one or more networking stack functions triggered by the API command, comprising: I) obtaining an application identifier and process owner associated with an instance of the application program, and further obtaining a port number and a NIC address associated with the API command; II) parsing the communication parameters file to obtain a nonpublic application code and a nonpublic user code associated with the port number paired with the NIC address; and III) confirming the nonpublic application code corresponds to the application identifier and further confirming the nonpublic user code corresponds to the process owner. In certain embodiments, for example, the communication management operations may comprise forming a configured network communication pathway between the application program instance and a remote program operated by a remote user on a remote device, comprising: I) sending a first configuration packet from the device to the remote device, the first configuration packet containing a nonpublic device identifier for the device in a portion of the first configuration packet; II) receiving a second configuration packet from the remote device, the second configuration packet containing a first remote parameter in a first portion of the second configuration packet and a second remote parameter in a second portion of the second configuration packet; and III) matching the first remote parameter to a nonpublic remote application code that is associated with the port number in the communication parameters file, and further matching the second remote parameter corresponds to a nonpublic remote user code that is associated with the port number in the communications parameter file.

A. In certain embodiments, for example, the nonpublic device identifier may be contained in a higher-than-OSI layer three and lower-than-OSI layer seven portion of the first configuration packet. In certain embodiments, for example, the first portion of the second configuration packet may be a higher-than-OSI layer three and lower-than-OSI layer seven layer portion. In certain embodiments, for example, the second portion of the second configuration packet may be a higher-than-OSI layer three and lower-than-OSI layer seven layer portion. In certain embodiments, for example, the nonpublic device identifier may be contained in an application layer portion of the first configuration packet. In certain embodiments, for example, the first portion of the second configuration packet may be an application layer portion. In certain embodiments, for example, the second portion of the second configuration packet may be an application layer portion.

Certain embodiments may provide, for example, a product comprising at least one non-transitory computer-readable storage medium having computer-readable program code embodied therein. In certain embodiments, for example, the computer-readable program code may comprise: a first module configured to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command. In certain embodiments, for example, the computer-readable program code may comprise: a second module configured to perform second communication management operations, the second communication management operations comprising: forming a configured communication pathway to the destination port by configuring a pre-established communication pathway to exclusively communicate application data between the application operated by the user and a remote application operated by a remote user on a remote computing device, the configuring comprising: a) sending a first configuration packet from the computing device to the remote computing device via the pre-established communication pathway, the first configuration packet containing a nonpublic computing device identifier in an application layer portion of the first configuration packet; b) receiving a second configuration packet from the remote computing device, the second configuration packet containing a nonpublic remote computing device identifier in an application layer portion of the second configuration packet; c) further sending a third configuration packet from the computing device to the remote computing device via the pre-established communication pathway, the third configuration packet containing a nonpublic parameter in an application layer portion of the third configuration packet, wherein the nonpublic parameter is unique to the computing device or to the application and to the user; and d) further receiving a fourth configuration packet from the remote computing device, the fourth configuration packet containing a nonpublic remote parameter in an application layer portion of the fourth configuration packet, wherein the nonpublic remote parameter is unique to the remote computing device or to the remote application and the remote user. In certain embodiments, for example, the computer-readable program code may comprise: a third module configured to reversibly enable and/or disable execution, by the computing device, of at least a portion of the first communication management operations and/or at least a portion of the second communication management operations.

A. Certain embodiments may comprise, for example, a plurality of copies of the product for securing communications of a plurality of networked computing devices.

B. In certain embodiments, for example, the computer-readable program code may be executable by one or more processors on the computing device to perform the communication management operations.

C. In certain embodiments, for example, the obtaining authorization from the provisioning server may comprise receiving a communications configuration file containing an identifier that associates the destination port number with the application in combination with the user. In certain embodiments, for example, the communications configuration file may be sent from the provisioning server. In certain embodiments, for example, the communications configuration file may be received prior to the detecting.

D. In certain embodiments, for example, the reversibly enabling and/or disabling execution of the at least a portion of the first communication management operations may be independent of the reversibly enabling and/or disabling execution of the at least a portion of the second communication management operations. In certain embodiments, for example, the first communication management operations may be enabled by the third module if the second communication management operations are enabled. In certain embodiments, for example, the second communication management operations may be enabled by the third module if the first communication management operations are enabled. In certain embodiments, for example, the first communication management operations may further comprise: i) further detecting a further networking API command by a further application operated by a further user on the computing device, the further networking API command specifying a further destination port number for a further destination port; and ii) adding the networking API command to a blacklist of prohibited API commands based on receiving negative authorization from the provisioning server, and/or blocking completion of the networking API command. In certain embodiments, for example, the third module may enable and/or disables execution of the at least a portion of the first communication management operations and/or at least a portion of the second communication management operations based on instructions received from a provisioning server.

E. In certain embodiments, for example, the computer-readable program code may further comprise: a fourth module configured to reversibly select among modes for the first module, the modes comprising: a) a first module monitor mode, wherein the first communication management operations further comprise: transmitting the destination port number, an application identifier, and a user identifier to the provisioning server; b) a first module alert mode, wherein the first communication management operations further comprise: transmitting an alert to an SEIM component in response to the networking API command until the authorization is obtained; and c) a first module protect mode, wherein the first communication management operations further comprise: denying the networking API command until the authorization is obtained.

F. In certain embodiments, for example, the computer-readable program code may further comprise: a fourth module configured to reversibly select among modes for the second module, the modes for the second module comprising: a) a second module monitor mode, wherein the second communication management operations further comprise: transmitting the destination port number, an application identifier, a user identifier, a remote application identifier, and a remote user identifier to the provisioning server; b) a second module alert mode, wherein the second communication management operations further comprise: comparing the nonpublic remote parameter to a value obtained from the provisioning server, and sending an alert to an SEIM component in response to the nonpublic remote parameter not matching the value; and c) a second module protect mode, wherein the second communication management operations further comprise: comparing the nonpublic remote parameter to a value obtained from the provisioning server, and breaking the pre-established communication in response to the nonpublic remote parameter not matching the value.

G. In certain embodiments, for example, the computer-readable program code may further comprise: i) fourth module configured to verify that a payload of an incoming network packet conforms to a plurality of content requirements, the plurality of content requirements comprising: a) a data model; b) a data range; and c) a command type authorized to be present in the incoming application data; and ii) a fifth module configured to reversibly select among modes for the first module, the modes comprising: a) a fourth module monitor mode, wherein the first communication management operations further comprise: transmitting the destination port number, an application identifier, and a user identifier to the provisioning server; b) a fourth module alert mode, wherein the first communication management operations further comprise: transmitting an alert to an SEIM component in response to the networking API command until the authorization is obtained; and c) a fourth module protect mode, wherein the first communication management operations further comprise: denying the networking API command until the authorization is obtained.

H. In certain embodiments, for example, the computer-readable program code may further comprise: i) a fourth module configured to reversibly select among modes for the first module, the modes comprising: a) a first module monitor mode, wherein the first communication management operations further comprise: transmitting the destination port number, an application identifier, and a user identifier to the provisioning server; b) a first module alert mode, wherein the first communication management operations further comprise: transmitting an alert to an SEIM component in response to the networking API command until the authorization is obtained; and c) a first module protect mode, wherein the first communication management operations further comprise: denying the networking API command until the authorization is obtained; ii) a fifth module configured to reversibly select among modes for the second module, the modes comprising: a) a second module monitor mode, wherein the second communication management operations further comprise: transmitting the destination port number, an application identifier, a user identifier, a remote application identifier, and a remote user identifier to the provisioning server; b) a second module alert mode, wherein the second communication management operations further comprise: comparing the nonpublic remote parameter to a value obtained from the provisioning server, and sending an alert to an SEIM component in response to the nonpublic remote parameter not matching the value; and c) a second module protect mode, wherein the second communication management operations further comprise: comparing the nonpublic remote parameter to a value obtained from the provisioning server, and breaking the pre-established communication in response to the nonpublic remote parameter not matching the value; iii) a sixth module configured to verify that a payload of an incoming network packet conforms to a plurality of content requirements, the plurality of content requirements comprising: a) a data model; b) a data range; and c) a command type authorized to be present in the incoming application data; and iv) a seventh module configured to reversibly select among modes for the first module, the modes comprising: a) a sixth module monitor mode, wherein the first communication management operations further comprise: transmitting the destination port number, an application identifier, and a user identifier to the provisioning server; b) a sixth module alert mode, wherein the first communication management operations further comprise: transmitting an alert to an SEIM component in response to the networking API command until the authorization is obtained; and c) a sixth module protect mode, wherein the first communication management operations further comprise: denying the networking API command until the authorization is obtained.

I. In certain embodiments, for example, the nonpublic remote parameter may be unique to the remote computing. In certain embodiments, for example, the nonpublic remote parameter may be unique to the combination of the remote application and the remote user.

J. In certain embodiments, for example, the computer-readable program code may further comprise: a fourth module configured to perform fourth communication management operations, the fourth communication management operations comprising: a) applying a set of content filtering rules to a payload of a received network packet to identify one or more components of the payload that conform to the set of content filtering rules; and b) replacing the payload with a modified payload consisting of the one or more conforming components.

K. In certain embodiments, for example, the computer-readable program code may further comprise a fourth module configured to perform fourth communication management operations, the fourth communication management operations comprising: forming a further configured communication pathway between the computing device and the provisioning server by configuring a further pre-established communication pathway to exclusively communicate at least the authorization to complete the networking API command, the forming comprising: a) sending a fifth configuration packet to the provisioning server via the pre-established communication pathway, the fifth configuration packet containing a nonpublic computing device identifier in an application layer portion of the fifth configuration packet; b) receiving a sixth configuration packet from the provisioning server, the sixth configuration packet containing a nonpublic first provisioning server device identifier in an application layer portion of the sixth configuration packet; c) further sending a seventh configuration packet to the remote computing device via the pre-established communication pathway, the seventh configuration packet containing a nonpublic parameter in an application layer portion of the seventh configuration packet, wherein the nonpublic parameter is specific to a computer-readable program code; and d) further receiving an eighth configuration packet from the first computing device, the eighth configuration packet containing a nonpublic provisioning server application identifier and a nonpublic provisioning server user identifier.

L. In certain embodiments, for example, the port number may have a value of between 1024 and 65535.

M. In certain embodiments, for example, the computing device may transmit information comprising at least a portion of an executable code via the configured communication pathway. In certain embodiments, for example, the information may comprise at least a portion of a script. In certain embodiments, for example, the information may comprise at least a portion of a transaction. In certain embodiments, for example, the transaction may be configured to modify ownership of at least one token. In certain embodiments, for example, the transaction may be configured to create a smart contract. In certain embodiments, for example, the transaction may be configured to invoke a smart contract method. In certain embodiments, for example, the transaction may be configured to encode data in a file. In certain embodiments, for example, the information may comprise at least a portion of a proposed block of transactions. In certain embodiments, for example, the information may comprise at least a portion of a protocol message.

N. In certain embodiments, for example, the application may be an information management process. In certain embodiments, for example, the remote application may be an information management process. In certain embodiments, for example, the information management process may comprise a distributed ledger management process. In certain embodiments, for example, the information management process may comprise a supply chain management process. In certain embodiments, for example, the information management process may comprise a fintech service. In certain embodiments, for example, the information management process may comprise a transaction processing service. In certain embodiments, for example, the information management process may comprise a file update process. In certain embodiments, for example, the information management process may be distributed on a peer-to-peer network.

O. In certain embodiments, for example, the first module may be configured to run in a hypervisor of the computing device. In certain embodiments, for example, the second module may be configured to run in a hypervisor of the computing device. In certain embodiments, for example, the third module may be configured to run in a hypervisor. In certain embodiments, for example, at least a portion of the computer-readable program code may be configured to run in a hypervisor. In certain embodiments, for example, the application may run on a virtual machine running on the computing device. In certain embodiments, for example, the application may run in a container instance on the computing device. In certain embodiments, for example, the first module may be configured to run in a container orchestration system (for example a container orchestration system such as Kubernetes) of the computing device. In certain embodiments, for example, the second module may be configured to run in a container orchestration system of the computing device. In certain embodiments, for example, the third module may be configured to run in a container orchestration system. In certain embodiments, for example, at least a portion of the computer-readable program code may be configured to run in a container orchestration system (for example a container orchestration system such as Kubernetes). In certain embodiments, for example, the application may run in a container instance on the computing device.

P. In certain embodiments, for example, application may comprise at least a portion of the computer-readable program code. In certain embodiments, for example, the application may comprise the first module. In certain embodiments, for example, the application may comprise the second module. In certain embodiments, for example, the application may comprise the third module.

Q. In certain embodiments, for example, the product may comprise obfuscation code. In certain embodiments, for example, the product may comprise one or more covert channels. In certain embodiments, for example, the application may comprise an artificial intelligence component. In certain embodiments, for example, the application may be part or all of a predictive maintenance system comprising an artificial intelligence component. In certain embodiments, for example, the computing device may be part or all of an artificial intelligence appliance. In certain embodiments, for example, the application may be part or all of an energy management system comprising an artificial intelligence component. In certain embodiments, for example, the application may be part or all of an inventory optimization system comprising an artificial intelligence component. In certain embodiments, for example, the application may be part or all of a smart city management system comprising an artificial intelligence component. In certain embodiments, for example, the application may be part or all of a smart factory management system comprising an artificial intelligence component. In certain embodiments, for example, the application may be part or all of a voice recognition system comprising an artificial intelligence component. In certain embodiments, for example, the application may be part or all of a facial recognition system comprising an artificial intelligence component. In certain embodiments, for example, the application may be part or all of a deepfake detection system such as a deepfake detection system comprising an artificial intelligence component. In certain embodiments, for example, the application may be part or all of a machine learning (for example automated machine learning or reinforcement learning) system (for example a deep learning system such as a system using multi-layer, deep neural networks (DNNs))) comprising an artificial intelligence component. In certain embodiments, for example, the application may be part or all of a pharmaceutical research system (for example a drug discovery or formulation optimization system) comprising an artificial intelligence component. In certain embodiments, for example, the application may be part or all of an anti-money laundering system comprising an artificial intelligence component. In certain embodiments, for example, the application may be part or all of fraud detection system comprising an artificial intelligence component. In certain embodiments, for example, the application may be part or all of an artificial intelligence modeling system. In certain embodiments, for example, the application may be part or all of an artificial intelligence model training system. In certain embodiments, for example, the application may be part or all of an enterprise artificial intelligence system. In certain embodiments, for example, the application may be part or all of an augmented reality system such as an augmented reality system comprising an artificial intelligence model. In certain embodiments, for example, the application may be part or all of a software for developing artificial intelligence applications. In certain embodiments, for example, the application may be a social media application, such as a blog, a social network site, a dating site, a news site, a website that allows users to post pictures or video, and the like. In certain embodiments, for example, the application may comprise an artificial intelligence component embedded on a chip.

R. In certain embodiments, for example, the computing device may be present in a drone. In certain embodiments, for example, the computing device may be present in a satellite. In certain embodiments, for example, the computing device may be present in a signal intelligence system. In certain embodiments, for example, the computing device may be present in a military device (for example a tank, a military aircraft, a military drone, a submarine, etc.). In certain embodiments, for example, the computing device may be used for one or more of analyzing intelligence, organizing prudent data for military leaders, providing geospatial analysis, controlling a smart weapon, or communicating information in cognitive electronic warfare (for example to improve situational awareness in one or more of a hostile zone, war zone, or combat zone). In certain embodiments, for example, the device may classify heat signatures so warfighters can be informed of people, buildings, or other objects. In certain embodiments, for example, the computing device may be present in an autonomous device. In certain embodiments, for example, the computing device may be present in a disaster recovery system. In certain embodiments, for example, the computing device may be present in a satellite. In certain embodiments, for example, the computing device may be present in an automobile. In certain embodiments, for example, the computing device may be present in an aircraft. In certain embodiments, for example, the computing device may be present in or in communication with a GPS system. In certain embodiments, for example, the computing device may be present in or in communication with a radar. In certain embodiments, for example, the computing device may be present in a surveillance device. In certain embodiments, for example, the surveillance device may be a video camera. In certain embodiments, for example, the surveillance device may be a perimeter security device. In certain embodiments, for example, the computing device may be present in critical infrastructure. In certain embodiments, for example, the computing device may be a process controller. In certain embodiments, for example, the computing device may be present in a factory. In certain embodiments, for example, the computing device may be present in oil and/or gas infrastructure. In certain embodiments, for example, the computing device may be present in an oil rig (for example an offshore oil rig). In certain embodiments, for example, the computing device may be a component of a control system for a refinery or a petrochemical plant. In certain embodiments, for example, the computing device (for example a controlled device, a sensor, or a controller) may be present in a liquid natural gas infrastructure. In certain embodiments, for example, the computing device may be in communication with a container management system.

S. In certain embodiments, for example, the computing device may be a remote console configured to access a network (for example an enterprise network or operational technology network (such as a network in a factory)). In certain embodiments, for example, the remote console may be configured to provide a system administrator access to the network. In certain embodiments, for example, the network security software may prevent the remote console from forming a connection with any devices except for devices on one or more predetermined networks.

Certain embodiments may provide, for example, a product comprising at least one non-transitory computer-readable storage medium having computer-readable program code embodied therein. In certain embodiments, for example, the computer-readable program code may comprise: a first module configured to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command. In certain embodiments, for example, the computer-readable program code may comprise: a second module configured to perform second communication management operations, the second communication management operations comprising: forming a configured communication pathway to the destination port by configuring a pre-established communication pathway to exclusively communicate application data between the application operated by the user and a remote application operated by a remote user on a remote computing device, the configuring comprising: a) sending a first configuration packet from the computing device to the remote computing device via the pre-established communication pathway, the first configuration packet containing a nonpublic computing device identifier in an application layer portion of the first configuration packet; b) receiving a second configuration packet from the remote computing device, the second configuration packet containing a nonpublic remote computing device identifier in an application layer portion of the second configuration packet; c) further sending a third configuration packet from the computing device to the remote computing device via the pre-established communication pathway, the third configuration packet containing a nonpublic parameter in an application layer portion of the third configuration packet, wherein the nonpublic parameter is unique to the computing device or to the application and to the user; and d) further receiving a fourth configuration packet from the remote computing device, the fourth configuration packet containing a nonpublic remote parameter in an application layer portion of the fourth configuration packet, wherein the nonpublic remote parameter is unique to the remote computing device or to the remote application and the remote user. In certain embodiments, for example, the computer-readable program code may comprise: a third module configured to reversibly select among modes for the first module, the modes comprising: a) a first module monitor mode, wherein the first communication management operations further comprise: transmitting the destination port number, an application identifier, and a user identifier to the provisioning server; b) a first module alert mode, wherein the first communication management operations further comprise: transmitting an alert to an SEIM component in response to the networking API command until the authorization is obtained; and c) a first module protect mode, wherein the first communication management operations further comprise: denying the networking API command until the authorization is obtained.

A. In certain embodiments, for example, the third module may reversibly select among modes based on instructions received from a provisioning server.

B. In certain embodiments, for example, the computer-readable program code may further comprise: a fourth module configured to reversibly enable and/or disable execution, by the computing device, of at least a portion of the first communication management operations and/or at least a portion of the second communication management operations.

C. In certain embodiments, for example, the computer-readable program code may further comprise: a fourth module configured to reversibly select among modes for the second module, the modes comprising: a) a second module monitor mode, wherein the second communication management operations further comprise: transmitting the destination port number, an application identifier, a user identifier, a remote application identifier, and a remote user identifier to the provisioning server; b) a second module alert mode, wherein the second communication management operations further comprise: comparing the nonpublic remote parameter to a value obtained from the provisioning server, and sending an alert to an SEIM component in response to the nonpublic remote parameter not matching the value; and c) a second module protect mode, wherein the second communication management operations further comprise: comparing the nonpublic remote parameter to a value obtained from the provisioning server, and breaking the pre-established communication in response to the nonpublic remote parameter not matching the value.

Certain embodiments may provide, for example, a product comprising at least one non-transitory computer-readable storage medium having computer-readable program code embodied therein. In certain embodiments, for example, the computer-readable program code may comprise: a first module configured to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command. In certain embodiments, for example, the computer-readable program code may comprise: a second module configured to perform second communication management operations, the second communication management operations comprising: forming a configured communication pathway to the destination port by configuring a pre-established communication pathway to exclusively communicate application data between the application operated by the user and a remote application operated by a remote user on a remote computing device, the configuring comprising: a) sending a first configuration packet from the computing device to the remote computing device via the pre-established communication pathway, the first configuration packet containing a nonpublic computing device identifier in an application layer portion of the first configuration packet; b) receiving a second configuration packet from the remote computing device, the second configuration packet containing a nonpublic remote computing device identifier in an application layer portion of the second configuration packet; c) further sending a third configuration packet from the computing device to the remote computing device via the pre-established communication pathway, the third configuration packet containing a nonpublic parameter in an application layer portion of the third configuration packet, wherein the nonpublic parameter is unique to the computing device or to the application and to the user; and d) further receiving a fourth configuration packet from the remote computing device, the fourth configuration packet containing a nonpublic remote parameter in an application layer portion of the fourth configuration packet, wherein the nonpublic remote parameter is unique to the remote computing device or to the remote application and the remote user. In certain embodiments, for example, the computer-readable program code may comprise: a third module configured to reversibly select among modes for the second module, the modes comprising: a) a second module monitor mode, wherein the second communication management operations further comprise: transmitting the destination port number, an application identifier, a user identifier, a remote application identifier, and a remote user identifier to the provisioning server; b) a second module alert mode, wherein the second communication management operations further comprise: comparing the nonpublic remote parameter to a value obtained from the provisioning server, and sending an alert to an SEIM component in response to the nonpublic remote parameter not matching the value; and c) a second module protect mode, wherein the second communication management operations further comprise: comparing the nonpublic remote parameter to a value obtained from the provisioning server, and breaking the pre-established communication in response to the nonpublic remote parameter not matching the value.

A. In certain embodiments, for example, the third module may reversibly select among modes based on instructions received from a provisioning server.

B. In certain embodiments, for example, the computer-readable program code may further comprise: a fourth module configured to reversibly enable and/or disable execution, by the computing device, of at least a portion of the first communication management operations and/or at least a portion of the second communication management operations.

C. In certain embodiments, for example, the computer-readable program code may further comprise: a fourth module configured to reversibly select among modes for the first module, the modes comprising: a) a first module monitor mode, wherein the first communication management operations further comprise: transmitting the destination port number, an application identifier, and a user identifier to the provisioning server; b) a first module alert mode, wherein the first communication management operations further comprise: transmitting an alert to an SEIM component in response to the networking API command until the authorization is obtained; and c) a first module protect mode, wherein the first communication management operations further comprise: denying the networking API command until the authorization is obtained.

D. In certain embodiments, for example, the first communication management operations may further comprise: i) further detecting a further networking API command by a further application operated by a further user on the computing device, the further networking API command specifying a further destination port number for a further destination port; and ii) adding the networking API command to a blacklist of prohibited API commands based on receiving negative authorization from the provisioning server, and/or blocking completion of the networking API command.

E. In certain embodiments, for example, the third module may enable and/or may disable execution of the at least a portion of the first communication management operations and/or at least a portion of the second communication management operations based on instructions received from a provisioning server. In certain embodiments, for example, the third module may reversibly select among modes based on instructions received from a provisioning server.

Certain embodiments may provide, for example, a product comprising at least one non-transitory computer-readable storage medium having computer-readable program code embodied therein. In certain embodiments, for example, the computer-readable program code may comprise: a first module enablable to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command. In certain embodiments, for example, the computer-readable program code may comprise: a second module enablable to perform second communication management operations, the second communication management operations comprising: forming a configured communication pathway by configuring a pre-established communication pathway to exclusively communicate application data between the application operated by the user and a remote application operated by a remote user on a remote computing device, the configuring comprising: a) sending a first configuration packet from the computing device to the remote computing device via the pre-established communication pathway, the first configuration packet containing a nonpublic device identifier for the computing device in an application layer portion of the first configuration packet; b) receiving a second configuration packet from the remote computing device, the second configuration packet containing a nonpublic remote device identifier for the remote computing device in an application layer portion of the second configuration packet; c) further sending a third configuration packet from the computing device to the remote computing device via the pre-established communication pathway, the third configuration packet containing a nonpublic parameter in an application layer portion of the third configuration packet, wherein the nonpublic parameter is specific (for example unique) to the application and to the user if the first module is enabled, and the nonpublic parameter is unique to the device if the first module is disabled; and d) further receiving a fourth configuration packet from the remote computing device, the fourth configuration packet containing a nonpublic remote parameter in an application layer portion of the fourth configuration packet, wherein the nonpublic parameter is unique to the remote computing device or to the remote application and the remote user.

A. In certain embodiments, for example, the nonpublic parameter may comprise the nonpublic device identifier. In certain embodiments, for example, the nonpublic parameter may comprise a hash of a MAC address.

Certain embodiments may provide, for example, a method of updating the security profile of a network. In certain embodiments, for example, the method may comprise: sending a command from a provisioning server to a first computing device to operate in a predetermined mode, the predetermined mode configured to record communication events at the first computing device in a log and to transmit the log to the provisioning server. In certain embodiments, for example, the method may comprise: receiving the log from the first computing device, the communication events comprising a connection request from a second computing device. In certain embodiments, for example, the method may comprise: updating a security configuration file, based at least on the connection request, to contain bidirectional authorization and authentication parameters between at least a first application on the first computing device and at least a second application on the second computing device. In certain embodiments, for example, the method may comprise: transmitting the updated security configuration file to the first computing device with a further command to operate in a further mode, the further mode configured to authorize and authenticate all application-to-application communications between the first computing device and the second computing device based at least on the bidirectional authorization and authentication parameters.

A. In certain embodiments, for example, the bidirectional authorization and authentication parameters may comprise: a nonpublic first application identifier corresponding to an authorized application on the first computing device, and a nonpublic second application identifier corresponding to an authorized application on the second computing device. In certain embodiments, for example, the bidirectional authorization and authentication parameters may comprise: a nonpublic first user identifier corresponding to an authorized user on the first computing device, and a nonpublic second user identifier corresponding to an authorized user on the second computing device. In certain embodiments, for example, the bidirectional authorization and authentication parameters may comprise: a nonpublic first device identifier corresponding to the first computing device, and a nonpublic second device identifier corresponding to the second computing device. In certain embodiments, for example, the bidirectional authorization and authentication parameters may comprise: nonpublic first data content requirements corresponding to data content requirements of data generated at the first computing device, and nonpublic second data content requirements corresponding to data content requirements of data generated at the second computing device.

B. Certain embodiments may comprise, for example, a product comprising at least one non-transitory computer-readable storage medium having computer-readable program code embodied therein to perform the method, the computer-readable program code executable by at least one processor of the first computing device. Certain embodiments may comprise, for example, a plurality of copies of the product for securing communications of a plurality of networked computing devices.

Certain embodiments may provide, for example, a product for securing communications of a plurality of networked computing devices, the product comprising a non-transitory computer-readable storage medium having computer-readable program code embodied therein, the computer-readable program code executable by a first computing device of the plurality of networked computing devices to perform communication management operations. In certain embodiments, for example, the communication management operations may comprise receiving a configuration file and a communication management parameter from a provisioning server. In certain embodiments, for example, the communication management operations may comprise interrupting, on the first computing device, a networking API command from a first application operated by a first user, the networking API command comprising a source port number for a transport layer source port of the first application and/or a destination port number for a transport layer destination port on a second computing device. In certain embodiments, for example, the communication management operations may comprise detecting that a combination of (a) an identifier for the first application operated by the first user and (b) the source port number and/or and the destination port number are not present in the configuration file. In certain embodiments, for example, the communication management operations may comprise alerting an SEIM system of the detecting if the communication management parameter has one of a predetermined first series of values. In certain embodiments, for example, the communication management operations may comprise blocking execution of the networking API command if the communication management parameter has one of a predetermined second series of values.

A. In certain embodiments, for example, the predetermined first series of values and the predetermined second series of values may overlap. In certain embodiments, for example, the predetermined first series of values and the predetermined second series of values may not overlap.

Certain embodiments may provide, for example, a product comprising at least one non-transitory computer-readable storage medium having computer-readable program code embodied therein. In certain embodiments, for example, the computer-readable program code may comprise: a first module configured to perform first communication management operations on a computing device, the first communication management operations comprising: a) detecting a networking API command by an application operated by a user on the computing device, the networking API command specifying a destination port number for a transport layer destination port; and b) obtaining authorization from a provisioning server to complete the networking API command. In certain embodiments, for example, the computer-readable program code may comprise: a second module configured to perform second communication management operations, the second communication management operations comprising: forming a configured communication pathway to the destination port by configuring a pre-established communication pathway to exclusively communicate application data between the application operated by the user and a remote application operated by a remote user on a remote computing device. In certain embodiments, for example, the configuring may comprise sending a first configuration packet from the computing device to the remote computing device via the pre-established communication pathway, the first configuration packet containing a nonpublic computing device identifier in a portion of the first configuration packet. In certain embodiments, for example, the configuring may comprise receiving a second configuration packet from the remote computing device, the second configuration packet containing a nonpublic remote computing device identifier in a portion of the second configuration packet. In certain embodiments, for example, the configuring may comprise further sending a third configuration packet from the computing device to the remote computing device via the pre-established communication pathway, the third configuration packet containing a nonpublic parameter in a portion of the third configuration packet, wherein the nonpublic parameter is unique to the computing device or to the application and to the user. In certain embodiments, for example, the configuring may comprise further receiving a fourth configuration packet from the remote computing device, the fourth configuration packet containing a nonpublic remote parameter in a portion of the fourth configuration packet, wherein the nonpublic remote parameter is unique to the remote computing device or to the remote application and the remote user. In certain embodiments, for example, the computer-readable program code may comprise: a third module configured to reversibly enable and/or disable execution, by the computing device, of at least a portion of the first communication management operations and/or at least a portion of the second communication management operations.

A. In certain embodiments, for example, the nonpublic computing device identifier may be contained in an application layer portion of the first configuration packet. In certain embodiments, for example, the nonpublic remote computing device identifier may be contained in an application layer portion of the second configuration packet. In certain embodiments, for example, the nonpublic parameter may be contained in an application layer portion of the third configuration packet. In certain embodiments, for example, the nonpublic remote parameter may be contained in an application layer portion of the fourth configuration packet. In certain embodiments, for example, the nonpublic computing device identifier may be contained in a higher-than-OSI layer three and lower-than-OSI layer seven portion of the first configuration packet. In certain embodiments, for example, the nonpublic remote computing device identifier may be contained in a higher-than-OSI layer three and lower-than-OSI layer seven layer portion of the second configuration packet. In certain embodiments, for example, the nonpublic parameter may be contained in a higher-than-OSI layer three and lower-than-OSI layer seven portion of the third configuration packet. In certain embodiments, for example, the nonpublic remote parameter may be contained in a higher-than-OSI layer three and lower-than-OSI layer seven layer portion of the fourth configuration packet.

Certain embodiments may provide, for example, a product comprising at least one non-transitory computer-readable storage medium having computer-readable program code embodied therein. In certain embodiments, for example, the computer-readable program code may comprise: a first module configured to perform first communication management operations on a computing device. In certain embodiments, for example, the first communication management operations may comprise detecting a networking API command by an application operated by a user on the computing device, the networking API command specifying a destination port number for a destination port. In certain embodiments, for example, the first communication management operations may comprise obtaining authorization from a provisioning server to complete the networking API command. In certain embodiments, for example, the computer-readable program code may comprise: a second module configured to verify that a payload of an incoming network packet conforms to a plurality of content requirements, the plurality of content requirements comprising: a) a data model; b) a data range; and/or c) a command type authorized to be present in the incoming application data. In certain embodiments, for example, the computer-readable program code may comprise: a third module configured to reversibly select among modes for the second module, the modes comprising: a) a second module monitor mode, wherein the second communication management operations further comprise: transmitting the destination port number, an application identifier, a user identifier, a remote application identifier, and a remote user identifier to the provisioning server; b) a second module alert mode, wherein the second communication management operations further comprise: comparing the nonpublic remote parameter to a value obtained from the provisioning server, and sending an alert to an SEIM component in response to the nonpublic remote parameter not matching the value; and c) a second module protect mode, wherein the second communication management operations further comprise: comparing the nonpublic remote parameter to a value obtained from the provisioning server, and breaking the pre-established communication in response to the nonpublic remote parameter not matching the value.

A. In certain embodiments, for example, the plurality of content requirements may be determined based at least on the destination port number. In certain embodiments, for example, the plurality of content requirements may be obtained from a local configuration file, the local configuration file indexed at least by the destination port number.

Certain embodiments may provide, for example, a product comprising at least one non-transitory computer-readable storage medium having computer-readable program code embodied therein. In certain embodiments, for example, the computer-readable program code may comprise: a first module configured to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command. In certain embodiments, for example, the computer-readable program code may comprise: a second module configured to verify that a payload of an incoming network packet conforms to a plurality of content requirements, the plurality of content requirements comprising: a) a data model; b) a data range; and c) a command type authorized to be present in the incoming application data. In certain embodiments, for example, the computer-readable program code may comprise: a third module configured to reversibly enable and/or disable execution, by the computing device, of at least a portion of the first communication management operations and/or the second communication management operations.

Certain embodiments may provide, for example, a product comprising at least one non-transitory computer-readable storage medium having computer-readable program code embodied therein. In certain embodiments, for example, the computer-readable program code may comprise: a first module configured to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command. In certain embodiments, for example, the computer-readable program code may comprise: a second module configured to verify that a payload of an incoming network packet conforms to a plurality of content requirements, the plurality of content requirements comprising: a) a data model; b) a data range; and c) a command type authorized to be present in the incoming application data. In certain embodiments, for example, the computer-readable program code may comprise: a third module configured to reversibly select among modes for the first module, the modes comprising: a) a first module monitor mode, wherein the first communication management operations further comprise: transmitting the destination port number, an application identifier, and a user identifier to the provisioning server; b) a first module alert mode, wherein the first communication management operations further comprise: transmitting an alert to an SEIM component in response to the networking API command until the authorization is obtained; and c) a first module protect mode, wherein the first communication management operations further comprise: denying the networking API command until the authorization is obtained.

Certain embodiments may provide, for example, a product comprising at least one non-transitory computer-readable storage medium having computer-readable program code embodied therein. In certain embodiments, for example, the computer-readable program code may comprise: a first module configured to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command. In certain embodiments, for example, the computer-readable program code may comprise: a second module configured to perform second communication management operations, the second communication management operations comprising: a) applying a set of content filtering rules to a payload of a received network packet to identify one or more components of the payload that conform to the set of content filtering rules; and b) replacing the payload with a modified payload consisting of the one or more conforming components. In certain embodiments, for example, the computer-readable program code may comprise: a third module configured to reversibly enable and/or disable execution, by the computing device, of at least a portion of the first communication management operations and/or the second communication management operations.

Certain embodiments may provide, for example, a product comprising at least one non-transitory computer-readable storage medium having computer-readable program code embodied therein. In certain embodiments, for example, the computer-readable program code may comprise: a first module configured to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command. In certain embodiments, for example, the computer-readable program code may comprise: a second module configured to perform second communication management operations, the second communication management operations comprising: a) applying a set of content filtering rules to a payload of a received network packet to identify one or more components of the payload that conform to the set of content filtering rules; and b) replacing the payload with a modified payload consisting of the one or more conforming components. In certain embodiments, for example, the computer-readable program code may comprise: a third module configured to reversibly select among modes for the first module, the modes comprising: a) a first module monitor mode, wherein the first communication management operations further comprise: transmitting the destination port number, an application identifier, and a user identifier to the provisioning server; b) a first module alert mode, wherein the first communication management operations further comprise: transmitting an alert to an SEIM component in response to the networking API command until the authorization is obtained; and c) a first module protect mode, wherein the first communication management operations further comprise: denying the networking API command until the authorization is obtained.

Certain embodiments may provide, for example, a product comprising at least one non-transitory computer-readable storage medium having computer-readable program code embodied therein. In certain embodiments, for example, the computer-readable program code may comprise: a first module configured to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command. In certain embodiments, for example, the computer-readable program code may comprise: a second module configured to perform second communication management operations, the second communication management operations comprising: a) applying a set of content filtering rules to a payload of a received network packet to identify one or more components of the payload that conform to the set of content filtering rules; and b) replacing the payload with a modified payload consisting of the one or more conforming components. In certain embodiments, for example, the computer-readable program code may comprise: a third module configured to reversibly select among modes for the second module, the modes comprising: a) a second module monitor mode, wherein the second communication management operations further comprise: transmitting the destination port number, an application identifier, a user identifier, a remote application identifier, and a remote user identifier to the provisioning server; b) a second module alert mode, wherein the second communication management operations further comprise: comparing the nonpublic remote parameter to a value obtained from the provisioning server, and sending an alert to an SEIM component in response to the nonpublic remote parameter not matching the value; and c) a second module protect mode, wherein the second communication management operations further comprise: comparing the nonpublic remote parameter to a value obtained from the provisioning server, and breaking the pre-established communication in response to the nonpublic remote parameter not matching the value.

A. In certain embodiments, for example, the set of content filtering rules may comprise a whitelist of allowed content features. In certain embodiments, for example, the set of content filtering rules may comprise a blacklist of disallowed content features.

Certain embodiments may comprise, for example, a product for securing communications of a plurality of networked computing devices, the product comprising a non-transitory computer-readable storage medium having computer-readable program code embodied therein, the computer-readable program code executable by a first computing device of the plurality of networked computing devices to perform communication management operations. In certain embodiments, for example, the communication management operations may comprise: forming a configured communication pathway by configuring a pre-established communication pathway to exclusively communicate application data between a first user-application on the first computing device and a second user-application on a second computing device of the plurality of networked computing devices, the first user-application operated by a first user and the second user-application operated by a second user, the configuring comprising: a) sending a first configuration packet from the first computing device to the second computing device via the pre-established communication pathway, the first configuration packet containing a nonpublic first device identifier for the first computing device in an application layer portion of the first configuration packet; b) receiving a second configuration packet from the second computing device, the second configuration packet containing a nonpublic second device identifier for the second computing device in an application layer portion of the second configuration packet; c) confirming, in a kernel space of the first computing device, that the second computing device is authorized to communicate with the first user-application, comprising: matching the nonpublic second device identifier to a preconfigured nonpublic second device code for the second computing device; d) further sending a third configuration packet from the first computing device to the second computing device via the pre-established communication pathway, the third configuration packet containing a nonpublic first user-application identifier in an application layer portion of the third configuration packet, wherein the nonpublic first user-application identifier is exclusive to the first user-application and the second user-application; e) further receiving a fourth configuration packet from the second computing device, the fourth configuration packet containing a nonpublic second user-application identifier in an application layer portion of the fourth configuration packet; and f) further confirming, in the kernel space of the first computing device, that the second user-application is authorized to receive outgoing application data from the first user-application via the configured communication pathway, comprising: further matching the nonpublic second user-application identifier to a preconfigured nonpublic second user-application code, wherein the preconfigured nonpublic second user-application code is exclusive to the second user-application and the first user-application. In certain embodiments, for example, the communication management operations may comprise: modifying a payload of a received network packet received via the configured communication pathway, comprising: a) applying a set of content filtering rules to the payload to identify one or more components of the payload that conform to the set of content filtering rules and one or more further components of the payload that do not conform to the set of content filtering rules; and b) replacing the payload with a modified payload consisting of the one or more conforming components and/or exclusive of the one or more further components. In certain embodiments, for example, the communication management operations may comprise: passing at least a portion of the modified payload to the first user-application, wherein files containing values for the nonpublic first device identifier, the preconfigured nonpublic second device code, the nonpublic first user-application identifier, and the preconfigured nonpublic second user-application code are sent to the first computing device and the second computing device from a provisioning server prior to performing the communication management operations.

Certain embodiments may provide, for example, a method to progressively discover and secure network communications. In certain embodiments, for example, the method may comprise parsing first communication information received from first network security software running on a first computing device to identify a second computing device. In certain embodiments, for example, the method may comprise sending second network security software to the second computing device. In certain embodiments, for example, the method may comprise further receiving second communication information from the second network security software running on the second computing device. In certain embodiments, for example, the method may comprise identifying a requested communication pathway between a first application operated by a first user on the first computing device and a second application operated by a second user on the second computing device, comprising: cross-referencing the first communication information and the second communication information, based at least on a transport layer destination port number of the requested communication pathway. In certain embodiments, for example, the method may comprise generating and transmitting communication management parameters for the requested connection pathway as shared secrets to the first computing device and the second computing device, the communication management parameters comprising: a proxy for the destination port number that is exclusive to the requested communication pathway, and an assignment of the proxy to one of the first network security software and the second network security software.

A. In certain embodiments, for example, the first communication information may be received via a first exclusive connection. In certain embodiments, for example, the method may further comprise: forming the first exclusive connection by configuring a pre-established communication pathway, comprising: a) sending a first configuration packet to the first computing device via the pre-established communication pathway, the first configuration packet containing a nonpublic computing device identifier in an application layer portion of the first configuration packet; b) receiving a second configuration packet from the first computing device, the second configuration packet containing a nonpublic first computing device identifier in an application layer portion of the second configuration packet; c) further sending a third configuration packet to the remote computing device via the pre-established communication pathway, the third configuration packet containing a nonpublic parameter in an application layer portion of the third configuration packet, wherein the nonpublic parameter is specific to a third application and to a third user; and d) further receiving a fourth configuration packet from the first computing device, the fourth configuration packet containing a nonpublic first application identifier and a nonpublic first user identifier. In certain embodiments, for example, the second configuration packet may be received by the pre-established communication pathway. In certain embodiments, for example, the fourth configuration packet may be received by the pre-established communication pathway.

B. In certain embodiments, for example, the second communication information may be received via a second exclusive connection. In certain embodiments, for example, the method may further comprise: forming the second exclusive connection by configuring a second pre-established communication pathway, comprising: a) sending a fifth configuration packet to the second computing device via the second pre-established communication pathway, the first configuration packet containing a nonpublic computing device identifier in an application layer portion of the fifth configuration packet; b) receiving a sixth configuration packet from the second computing device, the sixth configuration packet containing a nonpublic second computing device identifier in an application layer portion of the sixth configuration packet; c) further sending a seventh configuration packet to the remote computing device via the second pre-established communication pathway, the seventh configuration packet containing a nonpublic parameter in an application layer portion of the seventh configuration packet, wherein the nonpublic parameter is specific to a third application and to a third user; and d) further receiving an eighth configuration packet from the second computing device, the eighth configuration packet containing a nonpublic second application identifier and a nonpublic second user identifier. In certain embodiments, for example, the sixth configuration packet may be received by the pre-established communication pathway. In certain embodiments, for example, the eighth configuration packet may be received by the pre-established communication pathway.

Certain embodiments may provide, for example, a method to progressively discover and secure network communications. In certain embodiments, for example, the method may comprise parsing first communication information received from first network security software running on a first computing device to identify a second computing device. In certain embodiments, for example, the method may comprise sending second network security software to the second computing device. In certain embodiments, for example, the method may comprise further receiving second communication information from the second network security software running on the second computing device. In certain embodiments, for example, the method may comprise identifying a requested communication pathway between a first application operated by a first user on the first computing device and a second application operated by a second user on the second computing device, comprising: cross-referencing the first communication information and the second communication information, based at least on a transport layer destination port number of the requested communication pathway. In certain embodiments, for example, the method may comprise generating and transmitting communication management parameters for the requested connection pathway as shared secrets to the first computing device and the second computing device, the communication management parameters comprising: nonpublic identifiers for the first application, the first user, the second application, and the second user for bidirectional authentication and authorization of the requested communication pathway by the first network security software and the second network security software.

A. In certain embodiments, for example, the first communication information may be derived from a connection request packet. In certain embodiments, for example, the connection request packet may be received.

B. In certain embodiments, for example, the first communication information may be derived from a connection request command. In certain embodiments, for example, the connection request commend may be executed by the first computing device.

C. In certain embodiments, for example, the first communication information may be derived from a network packet. In certain embodiments, for example, the network packet contains application layer data. In certain embodiments, for example, the network packet contains a network address for the second computing device.

D. In certain embodiments, for example, the method may further comprise: submitting at least a portion of the first communication information and at least a portion of the second communication information to a communications authorization server, and obtaining an authorization status for the requested communication pathway.

E. In certain embodiments, for example, the method may further comprise: further obtaining one or more application data content requirements for the requested communication pathway, and transmitting the one or more application data content requirements as shared secrets to the first computing device and the second computing device.

F. In certain embodiments, for example, the bi-directional authentication and authorizing may comprise: forming a configured communication pathway to exclusively communicate application data between the first application operated by the first user and the second application operated by the second user, comprising: i) sending a first configuration packet from the first computing device to the second computing device via a pre-established communication pathway, the first configuration packet containing a nonpublic first device identifier for the first computing device in an application layer portion of the first configuration packet; ii) receiving a second configuration packet from the second computing device, the second configuration packet containing a nonpublic second device identifier for the second computing device in an application layer portion of the second configuration packet; and iii) confirming, in a kernel space of the first computing device, that the second computing device is authorized to communicate with the first user-application, comprising: matching the nonpublic second device identifier to a preconfigured nonpublic second device code for the second computing device.

G. In certain embodiments, for example, the bi-directional authentication and authorizing may comprise: forming a configured communication pathway to exclusively communicate application data between the first application operated by the first user and the second application operated by the second user, comprising: i) sending a first configuration packet from the first computing device to the second computing device via the pre-established communication pathway, the first configuration packet containing a nonpublic first application identifier in an application layer portion of the first configuration packet, wherein the nonpublic first application identifier is exclusive to the first application and the first user; ii) receiving a second configuration packet from the second computing device, the second configuration packet containing a nonpublic second application identifier in an application layer portion of the second configuration packet; and iii) confirming, in the kernel space of the first computing device, that the second application operated by the second user is authorized to receive outgoing application data from the first application via the configured communication pathway, comprising: matching the nonpublic second user-application identifier to a preconfigured nonpublic second user-application code, wherein the preconfigured nonpublic second user-application code is exclusive to the second user-application and the first user-application.

Certain embodiments may provide, for example, a method to progressively discover and approve networking API commands. In certain embodiments, for example, the method may comprise parsing a synopsis of a first networking API command received from first network security software running on a first computing device to identify a second computing device. In certain embodiments, for example, the method may comprise sending second network security software to the second computing device. In certain embodiments, for example, the method may comprise receiving a synopsis of a second networking API command from the second network security software running on the second computing device. In certain embodiments, for example, the method may comprise submitting at least a portion of the synopsis of the first networking API command and at least a portion of the synopsis of the second networking API command to a communications authorization server, and obtaining an authorization status for the first networking API command and an authorization status for the second networking API command. In certain embodiments, for example, the method may comprise passing the authorization status for the first networking API command to the first computing device and passing the authorization status for the second networking API command to the second computing device.

A. In certain embodiments, for example, the first networking API command may be a bind command. In certain embodiments, for example, the authorization status for the first networking API command may be processed by the first network security software to allow a specified application operated by a specified user to bind a specified port to a specified NIC. In certain embodiments, for example, the authorization status for the first networking API command may be processed by the first network security software to prevent a specified application operated by a specified user from binding a specified port to a specified NIC.

B. In certain embodiments, for example, the second networking API command may be a connect command. In certain embodiments, for example, the authorization status for the second networking API command may be processed by the second network security software to allow a specified application operated by a specified user to send a connection request to a specified destination port at a specified NIC. In certain embodiments, for example, the authorization status for the second networking API command may be processed by the second network security software to prevent a specified application operated by a specified user from sending a connection request to a specified destination port at a specified NIC.

C. In certain embodiments, for example, the authorization status for the first networking API command may be processed by the first network security software to allow a specified application operated by a specified user to bind a specified port to a specified interface. In certain embodiments, for example, the authorization status for the first networking API command may be processed by the first network security software to prevent a specified application operated by a specified user from binding a specified port to a specified interface.

Certain embodiments may provide, for example, a method to securely configure network security software from a provisioning server. In certain embodiments, for example, the method may comprise parsing first communication information received from first network security software running on a first computing device to identify a second computing device. In certain embodiments, for example, the method may comprise sending second network security software and communication management parameters to the second computing device, the communication management parameters selected to restrict outside communications by the second network security software to an exclusive network connection with the provisioning server. In certain embodiments, for example, the method may comprise further receiving second communication information via the exclusive network connection. In certain embodiments, for example, the method may comprise identifying a requested communication pathway between a first application operated by a first user on the first computing device and a second application operated by a second user on the second computing device, comprising: cross-referencing the first communication information and the second communication information, based at least on a transport layer destination port number of the requested communication pathway. In certain embodiments, for example, the method may comprise generating and transmitting updated communication management parameters to the second computing device via the exclusive network connection, the updated communication management parameters comprising: a proxy for the destination port number that is exclusive to the requested communication pathway; and an assignment of the proxy to one of the first network security software and the second network security software.

Certain embodiments may provide, for example, a method to securely configure network security software from a provisioning server. In certain embodiments, for example, the method may comprise parsing first communication information received from first network security software running on a first computing device to identify a second computing device. In certain embodiments, for example, the method may comprise sending second network security software and communication management parameters to the second computing device, the communication management parameters selected to restrict outside communications by the second network security software to an exclusive network connection with the provisioning server. In certain embodiments, for example, the method may comprise further receiving second communication information via the exclusive network connection. In certain embodiments, for example, the method may comprise identifying a requested communication pathway between a first application operated by a first user on the first computing device and a second application operated by a second user on the second computing device, comprising: cross-referencing the first communication information and the second communication information, based at least on a transport layer destination port number of the requested communication pathway. In certain embodiments, for example, the method may comprise generating and transmitting updated communication management parameters to the second computing device via the exclusive network connection, the updated communication management parameters comprising: nonpublic identifiers for the first application, the first user, the second application, and the second user for bidirectional authentication and authorization of the requested communication pathway by the first network security software and the second network security software.

Certain embodiments may provide, for example, a method to progressively discover and secure network communications. In certain embodiments, for example, the method may comprise: running first network security software on a first computing device to perform first communication management operations, the first communication management operations comprising: a) logging communication events at a first computing device for at least a determined period of time to obtain first communication information; and b) sending the first communication management information to a provisioning server. In certain embodiments, for example, the method may comprise: further running the provisioning server to perform configuration management operations, the configuration management operations comprising: a) cross-referencing the first communication information with second communication information received from second network security software running on a second computing device to identify a requested communication pathway between a first application operated by a first user on the first computing device and a second application operated by a second user on the second computing device; and b) generating and transmitting communication management parameters for the requested connection pathway to the first computing device and to the second computing device to instruct the first network security software to act as a proxy for the first application in the requested communication pathway and the second network security software to act as a proxy for the second application in the requested communication pathway, the communication management parameters comprising a proxy for a destination port number of the requested communication pathway that is exclusive to the requested communication pathway.

Certain embodiments may provide, for example, a method to progressively discover and secure network communications. In certain embodiments, for example, the method may comprise: running first network security software on a first computing device to perform first communication management operations, the first communication management operations comprising: a) logging communication events at a first computing device for at least a determined period of time to obtain first communication information; and b) sending the first communication management information to a provisioning server. In certain embodiments, for example, the method may comprise: further running the provisioning server to perform configuration management operations, the configuration management operations comprising: a) cross-referencing the first communication information with second communication information received from second network security software running on a second computing device to identify a requested communication pathway between a first application operated by a first user on the first computing device and a second application operated by a second user on the second computing device; and b) generating and transmitting communication management parameters for the requested connection pathway to the first computing device and to the second computing device to instruct the first network security software and the second network security software to coordinate bidirectional authentication and authorization of the requested communication pathway.

A. In certain embodiments, for example, the determined period of time may be a predetermined time interval.

Certain embodiments may provide, for example, a method to progressively discover and secure network communications. In certain embodiments, for example, the method may comprise receiving communication information from one or more network security software running on one or more computing devices, the one or more computing devices having nonpublic device identifiers installed on the one or more computing devices. In certain embodiments, for example, the method may comprise parsing the received communication information to identify one or more further computing devices; iii) sending one or more further network security software and one or more further nonpublic identification codes to the one or more further computing devices. In certain embodiments, for example, the method may comprise: forming a configured communication pathway between a first network security software and a second network security software by configuring a pre-established communication pathway between the first network security software and the second network security software to exclusively communicate application data between a first application operated by a first user and a second application operated by the second user, the configuring comprising: a) sending a first configuration packet from a first computing device to a second computing device via the pre-established communication pathway, the first configuration packet containing a first device identifier of the nonpublic device identifiers or the further nonpublic device identifiers in an application layer portion of the first configuration packet; b) receiving a second configuration packet from a second computing device, the second configuration packet containing a device identification parameter in an application layer portion of the second configuration packet; and c) confirming, in a kernel space of the first computing device, that the second computing device is authorized to communicate with the first computing device, comprising: matching the device identification parameter to a second nonpublic device identifier of the nonpublic device identifiers or the further nonpublic device identifiers.

A. In certain embodiments, for example, the first nonpublic device identifier may be uniquely assigned to the first computing device, and the second nonpublic device identifier may be uniquely assigned to the second computing device.

B. In certain embodiments, for example, the first application may be running on the first computing device, and the second application may be running on the second computing device.

C. In certain embodiments, for example, the first network security software may be selected from the one or more network security software or the one or more further network security software, and the second network security software may be selected from the one or more network security software or the one or more further network security software.

Certain embodiments may provide, for example, a method to progressively discover and secure network communications. In certain embodiments, for example, the method may comprise communication information from one or more network security software running on one or more computing devices. In certain embodiments, for example, the method may comprise parsing the received communication information to identify one or more further computing devices. In certain embodiments, for example, the method may comprise sending one or more further network security software to the one or more further computing devices. In certain embodiments, for example, the method may comprise identifying one or more requested communication pathways between two or more applications running on two or more computing devices of the one or more computing devices and the one or more further computing devices, comprising: cross-referencing the communication information and the further communication information to identify one or more transport layer destination port numbers for the one or more requested communication pathways. In certain embodiments, for example, the method may comprise further sending two or more application identifiers corresponding to the two or more applications to the two or more computing devices. In certain embodiments, for example, the method may comprise: forming a configured communication pathway between a first network security software and a second network security software by configuring a pre-established communication pathway between the first network security software and the second network security software to exclusively communicate application data between a first application of the two or more applications and a second application of the two or more applications, the configuring comprising: a) sending a first configuration packet from a first computing device of the two or more computing devices to a second computing device of the two or more computing devices via the pre-established communication pathway, the first configuration packet containing a first application identifier of the two or more application identifiers assigned to the first application in an application layer portion of the first configuration packet; b) receiving a second configuration packet from a second computing device, the second configuration packet containing an application identification parameter in an application layer portion of the second configuration packet; and c) confirming, in a kernel space of the first computing device, that the second application is authorized to communicate application data with the first application, comprising: matching the application identification parameter to a second application identifier of the two or more application identifiers assigned to the second application.

A. In certain embodiments, for example, the one or more computing devices may have nonpublic device identifiers installed on the one or more computing devices.

B. In certain embodiments, for example, the sending may comprise sending one or more further nonpublic identification codes.

Certain embodiments may provide, for example, a method to increase security in a network. In certain embodiments, for example, the method may comprise: configuring a first computing device, comprising: a) installing first network security software and first initial communication management parameters, the first initial communication management parameters comprising a nonpublic first device identifier for the first computing device; and b) forming an exclusive first communication pathway for communication between the first network security software and a provisioning server running on a provisioning device. In certain embodiments, for example, the method may comprise: obtaining first communication information at the first computing device and providing the first communication information to the provisioning server, comprising: a) intercepting a bind request from a first application operated by a first user on the first computing device, the bind request specifying a destination port number and a first NIC address; b) generating a first combined identifier that is unique for first application and the first user; c) further intercepting a connection request from a second computing device, the connection request specifying the destination port number and a second NIC address; and d) advising the provisioning server of the first communication information via the exclusive first communication pathway, the first communication information comprising: the first combined identifier, the destination port number, the first NIC address, and the second NIC address. In certain embodiments, for example, the method may comprise further configuring the second computing device, comprising: a) downloading second network security software and second initial communication management parameters from the provisioning server to the second computing device, the second initial communication management parameters comprising a nonpublic second device identifier for the second computing device; and b) further forming an exclusive second communication pathway for communication between the second network security software and the provisioning server. In certain embodiments, for example, the method may comprise: further obtaining second communication information at the second computing device and providing the second communication information to the provisioning server, comprising: a) detecting a further connection request from a second application operated by a second user on the second computing device, the connection request specifying the second NIC address and the destination port number; b) further generating a second combined identifier that is unique for the second application and the second user; and c) further advising the provisioning server of the second communication information, the second communication information comprising: the second combined identifier, the destination port and the second NIC address via the exclusive second communication pathway. In certain embodiments, for example, the method may comprise identifying a requested communication pathway between the first application operated by the first user and the second application operated by the second user, comprising: cross-referencing the first communication information and the second communication information at the provisioning server, based at least on the destination port number. In certain embodiments, for example, the method may comprise: generating and transmitting updated communication management parameters for the requested communication pathway from the provisioning server, comprising: a) selecting a first network security port number assigned to the first network security software; b) transmitting first updated communication management parameters from the provisioning server to the first computing device via the exclusive first communication pathway, the first updated communication management parameters comprising: the first communication information, the second communication information, the first exclusive port number, and the second device identifier; and c) transmitting second updated communication management parameters from the provisioning server to the second computing device via the exclusive second communication pathway, the second updated communication management parameters comprising: the first communication information, the second communication information, the first exclusive port number, and the first device identifier.

Certain embodiments may provide, for example, a method to progressively discover and quarantine malware in a network. In certain embodiments, for example, the method may comprise parsing first communication information received from first network security software running on a first computing device in the network to identify a second computing device in the network. In certain embodiments, for example, the method may comprise sending second network security software to the second computing device. In certain embodiments, for example, the method may comprise further receiving second communication information from the second network security software running on the second computing device. In certain embodiments, for example, the method may comprise identifying a requested communication pathway between a first application operated by a first user on the first computing device and a second application operated by a second user on the second computing device, comprising: cross-referencing the first communication information and the second communication information, based at least on a transport layer destination port number of the requested communication pathway. In certain embodiments, for example, the method may comprise: generating and transmitting communication management parameters for the requested connection pathway to the first computing device and the second computing device, the communication management parameters comprising: a) first communication management parameters sent to the first computing device, the first communication management parameters selected to cause the first network security software to block communications with the second application and/or the second user; and b) second communication management parameters sent to the second computing device, the second communication management parameters selected to cause the second network security software to block networking API commands initiated by the second application and/or the second user.

Certain embodiments may provide, for example, a method for a communications configuration server to discover network devices. In certain embodiments, for example, the method may comprise receiving metadata from a first computing device for a connection request sent by a second computing device, the metadata comprising: a transport layer destination port number for the connection request, an identifier for a first application and a first user assigned the destination port number, and an address for the second computing device. In certain embodiments, for example, the method may comprise transmitting network security software and communication management parameters to the second computing device, the communication management parameters processable by the network security software to form an encrypted exclusive connection between the second computing device and the provisioning server. In certain embodiments, for example, the method may comprise further receiving further metadata from the first computing device or the second computing device, the further metadata comprising a further address for a third computing device. In certain embodiments, for example, the method may comprise further transmitting further network security software and further communication management parameters to the third computing device, the further communication management parameters processable by the further network security software to form a further encrypted exclusive connection between the third computing device and the provisioning server.

Certain embodiments may provide, for example, a method for secure communications between a first computing device and a second computing device. In certain embodiments, for example, the method may comprise receiving metadata for a bind request by a first application and a first user on the first computing device to bind a destination port to an interface at the first computing device. In certain embodiments, for example, the method may comprise further receiving metadata for a connection request by a second application and a second user on the second computing device to form a connection with the destination port. In certain embodiments, for example, the method may comprise cross-referencing the bind request and the connection request based on the destination port to associate the first computing device, the second computing device, the destination port, the first application, the first user, the second application, and the second user with a desired connection. In certain embodiments, for example, the method may comprise: passing communication management parameters to the first computing device and the second computing device, the first communication management parameters comprising: a) a destination port number for the destination port; b) a nonpublic first device identification code; c) a nonpublic second device identification code; d) an identification code unique to the first application and the first user; and e) an identification code unique to the second application and the second user.

Certain embodiments may provide, for example, a product for configuring communications between a plurality of networked computing devices on a network, the product comprising a non-transitory computer-readable storage medium having computer-readable program code embodied therein, the computer-readable program code executable by at least one processor on the network to perform communication management operations. In certain embodiments, for example, the communication management operations may comprise obtaining a list of the networked computing devices, the list comprising at least a first destination address for a first computing device of the plurality of networked computing devices and a second destination address for a second computing device plurality of networked computing devices. In certain embodiments, for example, the communication management operations may comprise generating a nonpublic first device identifier for the first computing device and a nonpublic second device identifier for the second computing device. In certain embodiments, for example, the communication management operations may comprise transmitting the first device identifier and a first network security software to the first computing device and the second device identifier and a second network security software to the second computing device. In certain embodiments, for example, the communication management operations may comprise receiving network traffic metadata comprising the first device identifier and the second device identifier via an exclusive encrypted connection from the first computing device and/or the second computing device. In certain embodiments, for example, the communication management operations may comprise generating application-specific parameters that are at least partially derived from the network traffic metadata, the application-specific parameters comprising: a first application identifier for a first application operated by a first user and second application identifier for a second application operated by a second user. In certain embodiments, for example, the communication management operations may comprise transmitting the application-specific parameters to the first computing device and to the second computing device.

A. In certain embodiments, for example, the network traffic metadata may be received from the first computing device exclusive of the second computing device. In certain embodiments, for example, a first portion of the network traffic metadata may be received from the first computing device and a second portion of the network traffic metadata may be received from the second computing device.

B. In certain embodiments, for example, the first device identifier may be received from the first computing device and the second device identifier may be received from the second computing device. In certain embodiments, for example, the second device identifier may be received from the first computing device and the first device identifier may be received from the second computing device.

C. In certain embodiments, for example, the communication management operations may further comprise: i) forming a first configured communication pathway by configuring a first pre-established communication pathway for exclusive communication of the network traffic metadata and communication management parameters with a first network security agent on the first computing device, the first network security agent operated by a first user, the configuring the first pre-established communication pathway comprising: a) receiving a first configuration packet from the first computing device via the first pre-established communication pathway, the first configuration packet containing a nonpublic first device identifier for the first computing device in an application layer portion of the first configuration packet; b) confirming, in a kernel space executed by the at least one processor, that the first computing device is authorized to send the network traffic metadata to and to receive the communication management parameters from at least one host device that hosts the at least one processor, comprising: matching the nonpublic first device identifier to a preconfigured nonpublic first device code for the first computing device; and c) sending a second configuration packet to the first computing device, the second configuration packet containing a nonpublic host identifier for the at least one host device in an application layer portion of the second configuration packet; and ii) receiving the network traffic metadata from the first computing device and transmitting the communication management parameters to the first computing device via the first configured communication pathway. In certain embodiments, for example, the communication management parameters further comprise nonpublic device identification codes for the first computing device and the second computing device. In certain embodiments, for example, the communication management parameters further comprise at least one transport layer port number having a value of between 1024 and 65535.

D. In certain embodiments, for example, the communication management operations may further comprise: preventing any transport layer ports used by the first configured communication pathway from being used by any other communication pathway.

E. In certain embodiments, for example, the communication management operations may further comprise: i) forming a second configured communication pathway by configuring a second pre-established communication pathway for exclusive communication of the network traffic metadata and communication management parameters with a second network security agent on the second computing device, the second network security agent operated by a second user, the configuring the second pre-established communication pathway comprising: a) receiving a third configuration packet from the second computing device via the second pre-established communication pathway, the second configuration packet containing a nonpublic second device identifier for the second computing device in an application layer portion of the third configuration packet; b) confirming, in the kernel space executed by the at least one processor, that the second computing device is authorized to receive the communication management parameters from at least one host device that hosts the at least one processor, comprising: matching the nonpublic second device identifier to a preconfigured nonpublic second device code for the second computing device; and c) sending a fourth configuration packet to the second computing device, the fourth configuration packet containing the nonpublic host identifier in an application layer portion of the fourth configuration packet; ii) preventing any transport layer ports used by the second configured communication pathway from being used by any other communication pathway; and iii) transmitting the communication management parameters to the second computing device via the second configured communication pathway. In certain embodiments, for example, the communication management operations may further comprise: obtaining exogenous approval of the communication management parameters prior to the transmitting.

F. In certain embodiments, for example, the generating may be triggered after the network traffic metadata is separately received at least 5 times (for example at least 10 times, at least 25 times, at least 50 times, at least 100 times, or at least 1000 times). In certain embodiments, for example, the generating may be triggered after the network traffic metadata is separately received between 1 and 1000 times, for example between 2 and 5 times, between 2 and 25 times, between 2 and 50 times, between 2 and 100 times, or between 2 and 1000 times. In certain embodiments, for example, the separate receipts of the network traffic metadata span a time period of at least 1 minute (for example at least 15 minutes, at least 1 hour, at least 1 day, at least 7 days, at least 14 days, at least 30 days, at least 90 days, or at least 180 days. In certain embodiments, for example, the separate receipts of the network traffic metadata span a time period of between 1 minute and 15 minutes, between 1 minute and 1 hour, between 1 minute and 1 day, between 1 minute and 7 days, between 1 minute and 14 days, between 1 minute and 30 days, between 1 minute and 90 days, or between 1 minute and 180 days.

G. In certain embodiments, for example, the communication management operations may further comprise: i) further receiving further network traffic metadata from the second computing device; and ii) further deriving the second application identifier from the further network traffic metadata.

H. In certain embodiments, for example, the at least one processor may be hosted on at least one general purpose computer. In certain embodiments, for example, the at least one processor may be hosted on at least one network appliance.

Certain embodiments may provide, for example, a product for configuring communications between a plurality of networked computing devices on a network, the product comprising a non-transitory computer-readable storage medium having computer-readable program code embodied therein, the computer-readable program code executable by at least one processor on the network to perform communication management operations. In certain embodiments, for example, the communication management operations may comprise receiving network traffic metadata from a networked first computing device of the plurality of networked computing devices. In certain embodiments, for example, the communication management operations may comprise: generating communication management parameters for communication of application data between a first application running on the first computing device and a second application running on a networked second computing device of the plurality of networked computing devices, the communication management parameters comprising: a) a first parameter comprising a first randomly-generated number and a first application identifier for the first application, the first application identifier derived from the network traffic metadata; and b) a second parameter comprising a second randomly-generated number and a second application identifier for the second application, the second application identifier derived from the network traffic metadata. In certain embodiments, for example, the communication management operations may comprise transmitting the communication management parameters to the first computing device and to the second computing device.

A. In certain embodiments, for example, the communication management operations may further comprise: i) forming a first configured communication pathway by configuring a first pre-established communication pathway for exclusive communication of the network traffic metadata and the communication management parameters with a first network security agent on the first computing device, the first network security agent operated by a first user, the configuring the first pre-established communication pathway comprising: a) receiving a first configuration packet from the first computing device via the first pre-established communication pathway, the first configuration packet containing a nonpublic first device identifier for the first computing device in an application layer portion of the first configuration packet; b) confirming, in a kernel space executed by the at least one processor, that the first computing device is authorized to send the network traffic metadata to and to receive the communication management parameters from at least one host device that hosts the at least one processor, comprising: matching the nonpublic first device identifier to a preconfigured nonpublic first device code for the first computing device; and c) sending a second configuration packet to the first computing device, the second configuration packet containing a nonpublic host identifier for the at least one host device in an application layer portion of the second configuration packet; ii) preventing any transport layer ports used by the first configured communication pathway from being used by any other communication pathway; and iii) receiving the network traffic metadata from the first computing device and transmitting the communication management parameters to the first computing device via the first configured communication pathway.

B. In certain embodiments, for example, the communication management operations may further comprise: i) forming a second configured communication pathway by configuring a second pre-established communication pathway for exclusive communication of the network traffic metadata and the communication management parameters with a second network security agent on the second computing device, the second network security agent operated by a second user, the configuring the second pre-established communication pathway comprising: a) receiving a third configuration packet from the second computing device via the second pre-established communication pathway, the second configuration packet containing a nonpublic second device identifier for the second computing device in an application layer portion of the third configuration packet; b) confirming, in the kernel space executed by the at least one processor, that the second computing device is authorized to receive the communication management parameters from at least one host device that hosts the at least one processor, comprising: matching the nonpublic second device identifier to a preconfigured nonpublic second device code for the second computing device; and c) sending a fourth configuration packet to the second computing device, the fourth configuration packet containing the nonpublic host identifier in an application layer portion of the fourth configuration packet; ii) preventing any transport layer ports used by the second configured communication pathway from being used by any other communication pathway; and iii) transmitting the communication management parameters to the second computing device via the second configured communication pathway.

C. In certain embodiments, for example, the communication management operations may comprise: obtaining exogenous approval of the communication management parameters prior to the transmitting.

D. In certain embodiments, for example, the generating may be triggered after the network traffic metadata is separately received at least 5 times (for example at least 10 times, at least 25 times, at least 50 times, at least 100 times, or at least 1000 times). In certain embodiments, for example, the generating may be triggered after the network traffic metadata is separately received between 1 and 1000 times, for example between 2 and 5 times, between 2 and 25 times, between 2 and 50 times, between 2 and 100 times, or between 2 and 1000 times. In certain embodiments, for example, the separate receipts of the network traffic metadata span a time period of at least 1 minute (for example at least 15 minutes, at least 1 hour, at least 1 day, at least 7 days, at least 14 days, at least 30 days, at least 90 days, or at least 180 days. In certain embodiments, for example, the separate receipts of the network traffic metadata span a time period of between 1 minute and 15 minutes, between 1 minute and 1 hour, between 1 minute and 1 day, between 1 minute and 7 days, between 1 minute and 14 days, between 1 minute and 30 days, between 1 minute and 90 days, or between 1 minute and 180 days.

E. In certain embodiments, for example, the communication management operations may further comprise: i) further receiving further network traffic metadata from the second computing device; and ii) further deriving the second application identifier from the further network traffic metadata.

F. In certain embodiments, for example, the first parameter may further comprise: a first user identifier for a user of the first application. In certain embodiments, for example, the first user identifier may be derived from the network traffic metadata. In certain embodiments, for example, the second parameter may further comprise: a second user identifier for a user of the second application. In certain embodiments, for example, the second user identifier may be derived from the network traffic metadata.

G. In certain embodiments, for example, the at least one processor may be hosted on at least one general purpose computer. In certain embodiments, for example, the at least one processor may be hosted on at least one network appliance. In certain embodiments, for example, the communication management parameters may further comprise nonpublic device identification codes for the first computing device and the second computing device. In certain embodiments, for example, the communication management parameters may further comprise at least one transport layer port number having a value of between 1024 and 65535.

Certain embodiments may provide, for example, a product for configuring communications between a plurality of networked computing devices on a network, the product comprising a non-transitory computer-readable storage medium having computer-readable program code embodied therein, the computer-readable program code executable by at least one processor on the network to perform communication management operations. In certain embodiments, for example, the communication management operations may comprise: receiving data provenance parameters for network communications between a first computing device of the plurality of networked computing devices and a networked at least a second computing device of the plurality of networked computing devices, the data provenance parameters comprising: a) a first device identifier for the first computing device; b) a first application proto-identifier for a first application running on the first computing device; c) at least a second device identifier for the at least a second computing device; and d) at least a second application proto-identifier for at least a second application running on the at least a second computing device. In certain embodiments, for example, the communication management operations may comprise: generating communication management parameters for communication of application data between the first application and the at least a second application, the communication management parameters comprising: a) a first parameter derived from the first device identifier and the first application proto-identifier; and b) at least a second parameter derived from the at least a second device identifier the at least a second application proto-identifier. In certain embodiments, for example, the communication management operations may comprise transmitting the communication management parameters exclusively to the first computing device and to the at least a second computing device.

A. In certain embodiments, for example, the communication management operations may further comprise: purging the first parameter and the at least a second parameter from a memory after the transmitting.

Certain embodiments may provide, for example, a method to provide alerts for network communications of a first computing device. In certain embodiments, for example, the method may comprise advising a communications configuration server of a first networking API command invoked by a first application operated by a first user on the first computing device, the first networking API command specifying a transport layer destination port. In certain embodiments, for example, the method may comprise receiving communication management parameters from the communications configuration server that specify a second application operated by a second user on a second computing device that is authorized to form a network connection with the first application operated by the first user via the destination port. In certain embodiments, for example, the method may comprise: alerting an SEIM if: a) a first process other than the first application operated by the first user invokes the first networking API command; and/or b) a second process other than the second application operated by the second user invokes the second networking API command; and/or c) an incoming network packet specifying the destination port does not contain a code that matches one of the configuration management parameters that is unique to the second application and second user; and/or d) an incoming network packet specifying the destination port contains a payload that does not conform to one or more content requirements specified in the configuration management parameters.

A. In certain embodiments, for example, the first networking API command may comprise a bind command to bind the destination port to a NIC at the first computing device. In certain embodiments, for example, the second networking API command may comprise a connect command to form a connection with the destination port at the NIC.

Certain embodiments may provide, for example, a method to provide alerts for network communications of a first computing device. In certain embodiments, for example, the method may comprise advising a communications configuration server of a first networking API command invoked by a first application operated by a first user on the first computing device, the first networking API command specifying a transport layer destination port. In certain embodiments, for example, the method may comprise receiving communication management parameters from the communications configuration server that specify a second application operated by a second user on a second computing device that is authorized to form a network connection with the first application operated by the first user via the destination port. In certain embodiments, for example, the method may comprise: securing communications, comprising: a) blocking an attempt by a first process other than the first application operated by the first user to invoke the first networking API command; and/or b) blocking an attempt by a second process other than the second application operated by the second user to invoke the second networking API command; and/or c) dropping an incoming network packet specifying the destination port that does not contain a code that matches one of the configuration management parameters that is unique to the second application and second user; and/or d) dropping an incoming network packet specifying the destination port that contains a payload that does not conform to one or more content requirements specified in the configuration management parameters.

Certain embodiments may provide, for example, a product for securing communications of a plurality of networked computing devices, the product comprising a non-transitory computer-readable storage medium having computer-readable program code embodied therein, the computer-readable program code executable by a first computing device of the plurality of networked computing devices to perform communication management operations. In certain embodiments, for example, the communication management operations may comprise forming a connection between the first computing device and a second computing device to communicate data exclusively between a first application operated by a first user on the first computing device and a second application operated by a second user on a second computing device, comprising: exchanging metadata packets between the first computing device and a second computing device, a first metadata packet of the exchanged metadata packets containing a first application identifier that identifies the first application and the first user in an application layer portion of the first metadata packet, and a second metadata packet of the exchanged metadata packets containing a second application identifier that identifies a second application and a second user in an application layer portion of the second metadata packet. In certain embodiments, for example, the communication management operations may comprise advising a provisioning server that the first application operated by the first user and the second application operated by the second user have formed the connection. In certain embodiments, for example, the communication management operations may comprise: receiving instructions from the provisioning server to perform further communication management operations, the further communication management operations comprising: a) dropping the connection and blocking any further attempt to form a connection between the first application operated by the first user and the second application operated by the second user; or b) inspecting incoming network packets according to an algorithm to determine whether the second application identifier is recoverable from application layer portions of the incoming network packets.

A. In certain embodiments, for example, the further communication management operations may comprise: i) the inspecting; followed by ii) notifying an SEIM if the second application identifier is not recoverable from an application layer portion of one of the incoming network packets.

B. In certain embodiments, for example, the further communication management operations may further comprise: notifying an SEIM of an attempt by the first application and/or the first user to form a connection. In certain embodiments, for example, the further communication management operations may further comprise: notifying an SEIM of an attempt by the second application and/or the second user to form a connection. In certain embodiments, for example, the further communication management operations may further comprise: dropping the connection and blocking any further attempt to form a connection with the second application and/or the second user. In certain embodiments, for example, the further communication management operations may further comprise: preventing the first application and/or the first user from forming any connection. In certain embodiments, for example, the further communication management operations may further comprise: i) the inspecting; followed by ii) dropping the connection and/or notifying an SEIM if the second application identifier is not recoverable from an application layer portion of one of the incoming network packets.

C. In certain embodiments, for example, the exchanging metadata packets between the first computing device and a second computing device may comprise receiving a nonpublic device identifier for the second computing device.

D. In certain embodiments, for example, the advising may further comprise: passing the nonpublic device identifier for the second computing device to the provisioning server.

Certain embodiments may provide, for example, a product for securely communicating application data between a plurality of networked computing devices, the product comprising a non-transitory computer-readable storage medium having computer-readable program code embodied therein, the computer-readable program code executable by a first computing device of the plurality of networked computing devices to perform communication management operations. In certain embodiments, for example, the communication management operations may comprise receiving at least one network packet from a networked second computing device of the plurality of networked computing devices, the at least one network packet comprising a transport layer destination port number and an application layer parameter. In certain embodiments, for example, the communication management operations may comprise generating a first application proto-identifier for a first application to which the destination port number is assigned on the first computing device. In certain embodiments, for example, the communication management operations may comprise processing the application layer parameter to obtain a second application proto-identifier for a second application running on the second computing device. In certain embodiments, for example, the communication management operations may comprise passing the first application proto-identifier and the second application proto-identifier to a networked provisioning server of the plurality of networked computing devices. In certain embodiments, for example, the communication management operations may comprise receiving, in response to the passing, communication management parameters comprising a first application identifier at least partially derived from the first application proto-identifier and a second application identifier at least partially derived from the second application proto-identifier.

A. In certain embodiments, for example, the communication management operations may further comprise: forming a configured communication pathway by using the communication management parameters to configure a pre-established communication pathway to exclusively communicate application data between the first application and the second application on the second computing device.

B. In certain embodiments, for example, the communication management operations may further comprise: preventing any transport layer ports used by the configured communication pathway from being used by any other communication pathway.

C. In certain embodiments, for example, the communication management operations may further comprise: adding the communication management parameters to a local file.

Certain embodiments may provide, for example, a product for securely communicating application data between a plurality of networked computing devices, the product comprising a non-transitory computer-readable storage medium having computer-readable program code embodied therein, the computer-readable program code executable by a first computing device of the plurality of networked computing devices to perform communication management operations. In certain embodiments, for example, the communication management operations may comprise interrupting at least one request from a first application running on the first computing device to send data to a destination port on a second computing device. In certain embodiments, for example, the communication management operations may comprise modifying the data by appending a first application proto-identifier for the first application. In certain embodiments, for example, the communication management operations may comprise releasing the modified data for processing by a network stack of the first computing device. In certain embodiments, for example, the communication management operations may comprise: receiving communication management parameters from a predetermined networked provisioning server of the plurality of networked computing devices, the communication management parameters comprising: a) a first application identifier at least partially derived from the first application proto-identifier; and b) a second application identifier for a second application to which the destination port number is assigned.

Certain embodiments may provide, for example, a product comprising at least one non-transitory computer-readable storage medium having computer-readable program code embodied therein. In certain embodiments, for example, the computer-readable program code may comprise: first communication management operations, comprising: a) forming a first connection with a first computing device, comprising: executing at least a first networking API command referencing a first NIC; b) receiving a first network packet comprising an application layer payload from the first computing device via the first connection; c) verifying that a payload of an incoming network packet conforms to a plurality of content requirements, the plurality of content requirements comprising: I) a data model; and/or II) a data range; and/or III) a command type authorized to be present in the incoming application data. In certain embodiments, for example, the computer-readable program code may comprise: second communication management operations, comprising: a) further forming a second connection with a second computing device, comprising: executing at least a second networking API command referencing a second NIC, the second NIC different from the first NIC; b) only if the incoming network packet is verified, adding an application identifier for the program code to the application layer payload to form a modified payload; and c) only if the incoming network packet is verified, inserting the modified payload into a second network packet and sending the second network packet to the second computing device via the second connection.

A. In certain embodiments, for example, the computer-readable program code may further comprise: a controller configured to reversibly enable and/or disable execution, by the computing device, of at least a portion of the first communication management operations and/or at least a portion of the second communication management operations.

B. In certain embodiments, for example, the computer-readable program code may further comprise: a controller configured to reversibly select among modes for the first communication management operations, the modes comprising: i) a monitor mode, wherein the first communication management operations may further comprise: transmitting an identifier for the first NIC, an IP address for the first computing device, a transport layer source port number corresponding to the first computing device, a destination port number of the incoming network packet, and the plurality of content requirements to the provisioning server; ii) an alert mode, wherein the first communication management operations may further comprise: transmitting an alert to an SEIM component in response to the attempt to verify the incoming network packet fails; and iii) a protect mode, wherein the first communication management operations may further comprise: dropping the incoming network packet the attempt to verify the incoming network packet fails.

Certain embodiments may provide, for example, a product comprising at least one non-transitory computer-readable storage medium having computer-readable program code embodied therein. In certain embodiments, for example, the computer-readable program code may comprise: first communication management operations, comprising: a) forming a first connection with a first computing device, comprising: executing at least a first networking API command referencing a first NIC; b) extracting an application identifier and a packet payload from application layer portions of an incoming network packet received from the first computing device; and c) confirming the application identifier is an expected identifier for the program code. In certain embodiments, for example, the computer-readable program code may comprise: second communication management operations, comprising: a) further forming a second connection with a second computing device, comprising: executing at least a second networking API command referencing a second NIC, the second NIC different from the first NIC; b) inserting a content identifier that identifies a plurality of content requirements into a second network packet, the plurality of content requirements comprising: I) a data model; and/or II) a data range; and/or III) a command type authorized to be present in the incoming application data; and c) sending the second network packet to the second computing device via the second connection.

Certain embodiments may provide, for example, a method for a provisioning server to configure communications between computing devices. In certain embodiments, for example, the method may comprise receiving, from a first computing device, a network addresses for second and third computing devices. In certain embodiments, for example, the method may comprise sending communication management parameters to the first computing device, the communication management parameters comprising: a) a first interface identifier for a first network interface of the first computing device; b) a second interface identifier for a second network interface of the first computing device; c) an application identifier for an application and user on the second computing device; and d) content requirements for application layer packet data received from the third computing device. In certain embodiments, for example, the method may comprise forming a first connection via the first network interface with the second computing device, and verifying that incoming network packets received via the first connection contain an application layer parameter that matches the application identifier. In certain embodiments, for example, the method may comprise further forming a second connection via the second network interface with the third computing device, and further verifying that application layer payloads of incoming network packets received via the second connection conform to the content requirements.

Certain embodiments may comprise, for example, an edge device comprising a NIC, a processor, a communication parameters file, and software components executable by the processor, the software components comprising: i) a networking stack; ii) an application program comprising an API command to the networking stack; iii) a network security program executable to perform communication management operations, the communication management operations comprising: a) authorizing one or more networking stack functions triggered by the API command, comprising: I) obtaining an application identifier and process owner associated with an instance of the application program, and further obtaining a port number and a NIC address associated with the API command; II) parsing the communication parameters file to obtain a nonpublic application code and a nonpublic user code associated with the port number paired with the NIC address; and III) confirming the nonpublic application code corresponds to the application identifier and further confirming the nonpublic user code corresponds to the process owner; b) forming a configured network communication pathway between the application program instance and a remote program operated by a remote user on a remote device, comprising: I) sending a first configuration packet from the device to the remote device, the first configuration packet containing a nonpublic device identifier for the device in an application layer portion of the first configuration packet; II) receiving a second configuration packet from the remote device, the second configuration packet containing a first remote parameter in a first application layer portion of the second configuration packet and a second remote parameter in a second application layer portion of the second configuration packet; and Ill) matching that the first remote parameter to a nonpublic remote application code that is associated with the port number in the communication parameters file, and further matching the second remote parameter corresponds to a nonpublic remote user code that is associated with the port number in the communications parameter file.

Certain embodiments may provide, for example, a method to manage communications with a plurality of edge devices, comprising: i) pre-loading communication configuration parameters onto the edge devices, the communication management parameters comprising: a) destination addresses and port numbers for authorized destination ports at the destination addresses; b) nonpublic device codes for the edge devices; and c) identifiers for authorized software on the edge devices; ii) pre-installing network security software on the edge devices, the network security software configured to restrict network communications of the edge devices to communications between the authorized software and the authorized destination ports; and iii) establishing authorized network connections with the edge devices, comprising: a) receiving metadata packets at the authorized destination ports, the metadata packets containing first values and second values in application layer portions of the metadata packets; and b) verifying that the first values match the installed nonpublic device codes and the second values match the installed authorized software identifiers.

Certain embodiments may provide, for example, a method to manage communications of an edge device, comprising: i) pre-loading communication configuration parameters onto the edge device, the communication management parameters comprising: a) a destination address and a port number for an authorized transport layer destination port at the destination address; b) a nonpublic device code for the edge device; and c) an identifier for authorized software on the edge device; ii) pre-installing network security software on the edge device, the network security software configured to restrict network communications of the edge device to communications between the authorized software and the authorized destination port; and iii) establishing authorized network connections with the edge device, comprising: a) receiving a metadata packet at the authorized destination port, the metadata packets containing a first value and a second value in an application layer portion of the metadata packet; and b) verifying that the first value matches the installed nonpublic device code and the second value matches the installed authorized software identifier.

Certain embodiments may provide, for example, an edge device comprising a NIC, a processor, a communication parameters file, and software components executable by the processor, the software components comprising: i) a networking stack; ii) an application program comprising an API command to the networking stack; iii) a network security program executable to perform communication management operations, the communication management operations comprising: a) authorizing one or more networking stack functions triggered by the API command, comprising: I) obtaining an application identifier and process owner associated with an instance of the application program, and further obtaining a port number and a NIC address associated with the API command; II) parsing the communication parameters file to obtain a nonpublic application code and a nonpublic user code associated with the port number paired with the NIC address; and III) confirming the nonpublic application code corresponds to the application identifier and further confirming the nonpublic user code corresponds to the process owner; b) forming a configured network communication pathway between the application program instance and a remote program operated by a remote user on a remote device, comprising: I) sending a first configuration packet from the device to the remote device, the first configuration packet containing a nonpublic device identifier for the device in a portion of the first configuration packet; II) receiving a second configuration packet from the remote device, the second configuration packet containing a first remote parameter in a first portion of the second configuration packet and a second remote parameter in a second portion of the second configuration packet; and III) matching the first remote parameter to a nonpublic remote application code that is associated with the port number in the communication parameters file, and further matching the second remote parameter corresponds to a nonpublic remote user code that is associated with the port number in the communications parameter file.

Certain embodiments may provide, for example, a product comprising at least one non-transitory computer-readable storage medium having computer-readable program code embodied therein, the computer-readable program code comprising: i) a first module configured to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command; ii) a second module configured to perform second communication management operations, the second communication management operations comprising: forming a configured communication pathway to the destination port by configuring a pre-established communication pathway to exclusively communicate application data between the application operated by the user and a remote application operated by a remote user on a remote computing device, the configuring comprising: a) sending a first configuration packet from the computing device to the remote computing device via the pre-established communication pathway, the first configuration packet containing a nonpublic computing device identifier in an application layer portion of the first configuration packet; b) receiving a second configuration packet from the remote computing device, the second configuration packet containing a nonpublic remote computing device identifier in an application layer portion of the second configuration packet; c) further sending a third configuration packet from the computing device to the remote computing device via the pre-established communication pathway, the third configuration packet containing a nonpublic parameter in an application layer portion of the third configuration packet, wherein the nonpublic parameter is unique to the computing device or to the application and to the user; and d) further receiving a fourth configuration packet from the remote computing device, the fourth configuration packet containing a nonpublic remote parameter in an application layer portion of the fourth configuration packet, wherein the nonpublic remote parameter is unique to the remote computing device or to the remote application and the remote user; and iii) a third module configured to reversibly enable and/or disable execution, by the computing device, of at least a portion of the first communication management operations and/or at least a portion of the second communication management operations.

Certain embodiments may provide, for example, a product comprising at least one non-transitory computer-readable storage medium having computer-readable program code embodied therein, the computer-readable program code comprising: i) a first module configured to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command; ii) a second module configured to perform second communication management operations, the second communication management operations comprising: forming a configured communication pathway to the destination port by configuring a pre-established communication pathway to exclusively communicate application data between the application operated by the user and a remote application operated by a remote user on a remote computing device, the configuring comprising: a) sending a first configuration packet from the computing device to the remote computing device via the pre-established communication pathway, the first configuration packet containing a nonpublic computing device identifier in an application layer portion of the first configuration packet; b) receiving a second configuration packet from the remote computing device, the second configuration packet containing a nonpublic remote computing device identifier in an application layer portion of the second configuration packet; c) further sending a third configuration packet from the computing device to the remote computing device via the pre-established communication pathway, the third configuration packet containing a nonpublic parameter in an application layer portion of the third configuration packet, wherein the nonpublic parameter is unique to the computing device or to the application and to the user; and d) further receiving a fourth configuration packet from the remote computing device, the fourth configuration packet containing a nonpublic remote parameter in an application layer portion of the fourth configuration packet, wherein the nonpublic remote parameter is unique to the remote computing device or to the remote application and the remote user; and iii) a third module configured to reversibly select among modes for the first module, the modes comprising: a) a first module monitor mode, wherein the first communication management operations further comprise: transmitting the destination port number, an application identifier, and a user identifier to the provisioning server; b) a first module alert mode, wherein the first communication management operations further comprise: transmitting an alert to an SEIM component in response to the networking API command until the authorization is obtained; and c) a first module protect mode, wherein the first communication management operations further comprise: denying the networking API command until the authorization is obtained.

Certain embodiments may provide, for example, a product comprising at least one non-transitory computer-readable storage medium having computer-readable program code embodied therein, the computer-readable program code comprising: i) a first module configured to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command; ii) a second module configured to perform second communication management operations, the second communication management operations comprising: forming a configured communication pathway to the destination port by configuring a pre-established communication pathway to exclusively communicate application data between the application operated by the user and a remote application operated by a remote user on a remote computing device, the configuring comprising: a) sending a first configuration packet from the computing device to the remote computing device via the pre-established communication pathway, the first configuration packet containing a nonpublic computing device identifier in an application layer portion of the first configuration packet; b) receiving a second configuration packet from the remote computing device, the second configuration packet containing a nonpublic remote computing device identifier in an application layer portion of the second configuration packet; c) further sending a third configuration packet from the computing device to the remote computing device via the pre-established communication pathway, the third configuration packet containing a nonpublic parameter in an application layer portion of the third configuration packet, wherein the nonpublic parameter is unique to the computing device or to the application and to the user; and d) further receiving a fourth configuration packet from the remote computing device, the fourth configuration packet containing a nonpublic remote parameter in an application layer portion of the fourth configuration packet, wherein the nonpublic remote parameter is unique to the remote computing device or to the remote application and the remote user; and iii) a third module configured to reversibly select among modes for the second module, the modes comprising: a) a second module monitor mode, wherein the second communication management operations further comprise: transmitting the destination port number, an application identifier, a user identifier, a remote application identifier, and a remote user identifier to the provisioning server; b) a second module alert mode, wherein the second communication management operations further comprise: comparing the nonpublic remote parameter to a value obtained from the provisioning server, and sending an alert to an SEIM component in response to the nonpublic remote parameter not matching the value; and c) a second module protect mode, wherein the second communication management operations further comprise: comparing the nonpublic remote parameter to a value obtained from the provisioning server, and breaking the pre-established communication in response to the nonpublic remote parameter not matching the value.

Certain embodiments may provide, for example, a product comprising at least one non-transitory computer-readable storage medium having computer-readable program code embodied therein, the computer-readable program code comprising: i) a first module enablable to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command; ii) a second module enablable to perform second communication management operations, the second communication management operations comprising: forming a configured communication pathway by configuring a pre-established communication pathway to exclusively communicate application data between the application operated by the user and a remote application operated by a remote user on a remote computing device, the configuring comprising: a) sending a first configuration packet from the computing device to the remote computing device via the pre-established communication pathway, the first configuration packet containing a nonpublic device identifier for the computing device in an application layer portion of the first configuration packet; b) receiving a second configuration packet from the remote computing device, the second configuration packet containing a nonpublic remote device identifier for the remote computing device in an application layer portion of the second configuration packet; c) further sending a third configuration packet from the computing device to the remote computing device via the pre-established communication pathway, the third configuration packet containing a nonpublic parameter in an application layer portion of the third configuration packet, wherein the nonpublic parameter is specific to the application and to the user if the first module is enabled, and the nonpublic parameter is unique to the device if the first module is disabled; and d) further receiving a fourth configuration packet from the remote computing device, the fourth configuration packet containing a nonpublic remote parameter in an application layer portion of the fourth configuration packet, wherein the nonpublic parameter is unique to the remote computing device or to the remote application and the remote user.

Certain embodiments may provide, for example, a method of updating the security profile of a network, comprising: i) sending a command from a provisioning server to a first computing device to operate in a predetermined mode, the predetermined mode configured to record communication events at the first computing device in a log and to transmit the log to the provisioning server; ii) receiving the log from the first computing device, the communication events comprising a connection request from a second computing device; iii) updating a security configuration file, based at least on the connection request, to contain bidirectional authorization and authentication parameters between at least a first application on the first computing device and at least a second application on the second computing device; and iv) transmitting the updated security configuration file to the first computing device with a further command to operate in a further mode, the further mode configured to authorize and authenticate all application-to-application communications between the first computing device and the second computing device based at least on the bidirectional authorization and authentication parameters.

Certain embodiments may provide, for example, a product for securing communications of a plurality of networked computing devices, the product comprising a non-transitory computer-readable storage medium having computer-readable program code embodied therein, the computer-readable program code executable by a first computing device of the plurality of networked computing devices to perform communication management operations, the communication management operations comprising: i) receiving a configuration file and a communication management parameter from a provisioning server; ii) interrupting, on the first computing device, a networking API command from a first application operated by a first user, the networking API command comprising a source port number for a transport layer source port of the first application and/or a destination port number for a transport layer destination port on a second computing device; iii) detecting that a combination of (a) an identifier for the first application operated by the first user and (b) the source port number and/or and the destination port number are not present in the configuration file; v) alerting an SEIM system of the detecting if the communication management parameter has one of a predetermined first series of values; and vi) blocking execution of the networking API command if the communication management parameter has one of a predetermined second series of values.

Certain embodiments may provide, for example, a product comprising at least one non-transitory computer-readable storage medium having computer-readable program code embodied therein, the computer-readable program code comprising: i) a first module configured to perform first communication management operations on a computing device, the first communication management operations comprising: a) detecting a networking API command by an application operated by a user on the computing device, the networking API command specifying a destination port number for a transport layer destination port; and b) obtaining authorization from a provisioning server to complete the networking API command; ii) a second module configured to perform second communication management operations, the second communication management operations comprising: forming a configured communication pathway to the destination port by configuring a pre-established communication pathway to exclusively communicate application data between the application operated by the user and a remote application operated by a remote user on a remote computing device, the configuring comprising: a) sending a first configuration packet from the computing device to the remote computing device via the pre-established communication pathway, the first configuration packet containing a nonpublic computing device identifier in a portion of the first configuration packet; b) receiving a second configuration packet from the remote computing device, the second configuration packet containing a nonpublic remote computing device identifier in a portion of the second configuration packet; c) further sending a third configuration packet from the computing device to the remote computing device via the pre-established communication pathway, the third configuration packet containing a nonpublic parameter in a portion of the third configuration packet, wherein the nonpublic parameter is unique to the computing device or to the application and to the user; and d) further receiving a fourth configuration packet from the remote computing device, the fourth configuration packet containing a nonpublic remote parameter in a portion of the fourth configuration packet, wherein the nonpublic remote parameter is unique to the remote computing device or to the remote application and the remote user; and iii) a third module configured to reversibly enable and/or disable execution, by the computing device, of at least a portion of the first communication management operations and/or at least a portion of the second communication management operations.

Certain embodiments may provide, for example, a product comprising at least one non-transitory computer-readable storage medium having computer-readable program code embodied therein, the computer-readable program code comprising: i) a first module configured to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command; ii) a second module configured to verify that a payload of an incoming network packet conforms to a plurality of content requirements, the plurality of content requirements comprising: a) a data model; b) a data range; and c) a command type authorized to be present in the incoming application data; and iii) a third module configured to reversibly select among modes for the second module, the modes comprising: a) a second module monitor mode, wherein the second communication management operations further comprise: transmitting the destination port number, an application identifier, a user identifier, a remote application identifier, and a remote user identifier to the provisioning server; b) a second module alert mode, wherein the second communication management operations further comprise: comparing the nonpublic remote parameter to a value obtained from the provisioning server, and sending an alert to an SEIM component in response to the nonpublic remote parameter not matching the value; and c) a second module protect mode, wherein the second communication management operations further comprise: comparing the nonpublic remote parameter to a value obtained from the provisioning server, and breaking the pre-established communication in response to the nonpublic remote parameter not matching the value.

Certain embodiments may provide, for example, a product comprising at least one non-transitory computer-readable storage medium having computer-readable program code embodied therein, the computer-readable program code comprising: i) a first module configured to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command; ii) a second module configured to verify that a payload of an incoming network packet conforms to a plurality of content requirements, the plurality of content requirements comprising: a) a data model; b) a data range; and c) a command type authorized to be present in the incoming application data; and iii) a third module configured to reversibly enable and/or disable execution, by the computing device, of at least a portion of the first communication management operations and/or the second communication management operations.

Certain embodiments may provide, for example, a product comprising at least one non-transitory computer-readable storage medium having computer-readable program code embodied therein, the computer-readable program code comprising: i) a first module configured to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command; ii) a second module configured to verify that a payload of an incoming network packet conforms to a plurality of content requirements, the plurality of content requirements comprising: a) a data model; b) a data range; and c) a command type authorized to be present in the incoming application data; and iii) a third module configured to reversibly select among modes for the first module, the modes comprising: a) a first module monitor mode, wherein the first communication management operations further comprise: transmitting the destination port number, an application identifier, and a user identifier to the provisioning server; b) a first module alert mode, wherein the first communication management operations further comprise: transmitting an alert to an SEIM component in response to the networking API command until the authorization is obtained; and c) a first module protect mode, wherein the first communication management operations further comprise: denying the networking API command until the authorization is obtained.

Certain embodiments may provide, for example, a product comprising at least one non-transitory computer-readable storage medium having computer-readable program code embodied therein, the computer-readable program code comprising: i) a first module configured to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command; ii) a second module configured to perform second communication management operations, the second communication management operations comprising: a) applying a set of content filtering rules to a payload of a received network packet to identify one or more components of the payload that conform to the set of content filtering rules; and b) replacing the payload with a modified payload consisting of the one or more conforming components; and iii) a third module configured to reversibly enable and/or disable execution, by the computing device, of at least a portion of the first communication management operations and/or the second communication management operations.

Certain embodiments may provide, for example, a product comprising at least one non-transitory computer-readable storage medium having computer-readable program code embodied therein, the computer-readable program code comprising: i) a first module configured to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command; ii) a second module configured to perform second communication management operations, the second communication management operations comprising: a) applying a set of content filtering rules to a payload of a received network packet to identify one or more components of the payload that conform to the set of content filtering rules; and b) replacing the payload with a modified payload consisting of the one or more conforming components; and iii) a third module configured to reversibly select among modes for the first module, the modes comprising: a) a first module monitor mode, wherein the first communication management operations further comprise: transmitting the destination port number, an application identifier, and a user identifier to the provisioning server; b) a first module alert mode, wherein the first communication management operations further comprise: transmitting an alert to an SEIM component in response to the networking API command until the authorization is obtained; and c) a first module protect mode, wherein the first communication management operations further comprise: denying the networking API command until the authorization is obtained.

Certain embodiments may provide, for example, a product comprising at least one non-transitory computer-readable storage medium having computer-readable program code embodied therein, the computer-readable program code comprising: i) a first module configured to perform first communication management operations on a computing device, the first communication management operations comprising: a) detecting a networking API command by an application operated by a user on the computing device, the networking API command specifying a destination port number for a destination port; and b) obtaining authorization from a provisioning server to complete the networking API command; ii) a second module configured to perform second communication management operations, the second communication management operations comprising: a) applying a set of content filtering rules to a payload of a received network packet to identify one or more components of the payload that conform to the set of content filtering rules; and b) replacing the payload with a modified payload consisting of the one or more conforming components; and iii) a third module configured to reversibly select among modes for the second module, the modes comprising: a) a second module monitor mode, wherein the second communication management operations further comprise: transmitting the destination port number, an application identifier, a user identifier, a remote application identifier, and a remote user identifier to the provisioning server; b) a second module alert mode, wherein the second communication management operations further comprise: comparing the nonpublic remote parameter to a value obtained from the provisioning server, and sending an alert to an SEIM component in response to the nonpublic remote parameter not matching the value; and c) a second module protect mode, wherein the second communication management operations further comprise: comparing the nonpublic remote parameter to a value obtained from the provisioning server, and breaking the pre-established communication in response to the nonpublic remote parameter not matching the value.

Certain embodiments may comprise, for example, a product for securing communications of a plurality of networked computing devices, the product comprising a non-transitory computer-readable storage medium having computer-readable program code embodied therein, the computer-readable program code executable by a first computing device of the plurality of networked computing devices to perform communication management operations, the communication management operations comprising: i) forming a configured communication pathway by configuring a pre-established communication pathway to exclusively communicate application data between a first user-application on the first computing device and a second user-application on a second computing device of the plurality of networked computing devices, the first user-application operated by a first user and the second user-application operated by a second user, the configuring comprising: a) sending a first configuration packet from the first computing device to the second computing device via the pre-established communication pathway, the first configuration packet containing a nonpublic first device identifier for the first computing device in an application layer portion of the first configuration packet; b) receiving a second configuration packet from the second computing device, the second configuration packet containing a nonpublic second device identifier for the second computing device in an application layer portion of the second configuration packet; c) confirming, in a kernel space of the first computing device, that the second computing device is authorized to communicate with the first user-application, comprising: matching the nonpublic second device identifier to a preconfigured nonpublic second device code for the second computing device; d) further sending a third configuration packet from the first computing device to the second computing device via the pre-established communication pathway, the third configuration packet containing a nonpublic first user-application identifier in an application layer portion of the third configuration packet, wherein the nonpublic first user-application identifier is exclusive to the first user-application and the second user-application; e) further receiving a fourth configuration packet from the second computing device, the fourth configuration packet containing a nonpublic second user-application identifier in an application layer portion of the fourth configuration packet; and f) further confirming, in the kernel space of the first computing device, that the second user-application is authorized to receive outgoing application data from the first user-application via the configured communication pathway, comprising: further matching the nonpublic second user-application identifier to a preconfigured nonpublic second user-application code, wherein the preconfigured nonpublic second user-application code is exclusive to the second user-application and the first user-application; and ii) modifying a payload of a received network packet received via the configured communication pathway, comprising: a) applying a set of content filtering rules to the payload to identify one or more components of the payload that conform to the set of content filtering rules and one or more further components of the payload that do not conform to the set of content filtering rules; and b) replacing the payload with a modified payload consisting of the one or more conforming components and/or exclusive of the one or more further components; and iii) passing at least a portion of the modified payload to the first user-application, wherein files containing values for the nonpublic first device identifier, the preconfigured nonpublic second device code, the nonpublic first user-application identifier, and the preconfigured nonpublic second user-application code are sent to the first computing device and the second computing device from a provisioning server prior to performing the communication management operations.

Certain embodiments may provide, for example, a method to progressively discover and secure network communications, comprising: i) parsing first communication information received from first network security software running on a first computing device to identify a second computing device; ii) sending second network security software to the second computing device; iii) further receiving second communication information from the second network security software running on the second computing device; iv) identifying a requested communication pathway between a first application operated by a first user on the first computing device and a second application operated by a second user on the second computing device, comprising: cross-referencing the first communication information and the second communication information, based at least on a transport layer destination port number of the requested communication pathway; and v) generating and transmitting communication management parameters for the requested connection pathway as shared secrets to the first computing device and the second computing device, the communication management parameters comprising: a proxy for the destination port number that is exclusive to the requested communication pathway, and an assignment of the proxy to one of the first network security software and the second network security software.

Certain embodiments may provide, for example, a method to progressively discover and secure network communications, comprising: i) parsing first communication information received from first network security software running on a first computing device to identify a second computing device; ii) sending second network security software to the second computing device; iii) further receiving second communication information from the second network security software running on the second computing device; iv) identifying a requested communication pathway between a first application operated by a first user on the first computing device and a second application operated by a second user on the second computing device, comprising: cross-referencing the first communication information and the second communication information, based at least on a transport layer destination port number of the requested communication pathway; and v) generating and transmitting communication management parameters for the requested connection pathway as shared secrets to the first computing device and the second computing device, the communication management parameters comprising: nonpublic identifiers for the first application, the first user, the second application, and the second user for bidirectional authentication and authorization of the requested communication pathway by the first network security software and the second network security software.

Certain embodiments may provide, for example, a method to progressively discover and approve networking API commands, comprising: i) parsing a synopsis of a first networking API command received from first network security software running on a first computing device to identify a second computing device; ii) sending second network security software to the second computing device; iii) receiving a synopsis of a second networking API command from the second network security software running on the second computing device; iv) submitting at least a portion of the synopsis of the first networking API command and at least a portion of the synopsis of the second networking API command to a communications authorization server, and obtaining an authorization status for the first networking API command and an authorization status for the second networking API command; v) passing the authorization status for the first networking API command to the first computing device and passing the authorization status for the second networking API command to the second computing device.

Certain embodiments may provide, for example, a method to securely configure network security software from a provisioning server, comprising: i) parsing first communication information received from first network security software running on a first computing device to identify a second computing device; ii) sending second network security software and communication management parameters to the second computing device, the communication management parameters selected to restrict outside communications by the second network security software to an exclusive network connection with the provisioning server; iii) further receiving second communication information via the exclusive network connection; iv) identifying a requested communication pathway between a first application operated by a first user on the first computing device and a second application operated by a second user on the second computing device, comprising: cross-referencing the first communication information and the second communication information, based at least on a transport layer destination port number of the requested communication pathway; and v) generating and transmitting updated communication management parameters to the second computing device via the exclusive network connection, the updated communication management parameters comprising: a proxy for the destination port number that is exclusive to the requested communication pathway; and an assignment of the proxy to one of the first network security software and the second network security software.

Certain embodiments may provide, for example, a method to securely configure network security software from a provisioning server, comprising: i) parsing first communication information received from first network security software running on a first computing device to identify a second computing device; ii) sending second network security software and communication management parameters to the second computing device, the communication management parameters selected to restrict outside communications by the second network security software to an exclusive network connection with the provisioning server; iii) further receiving second communication information via the exclusive network connection; iv) identifying a requested communication pathway between a first application operated by a first user on the first computing device and a second application operated by a second user on the second computing device, comprising: cross-referencing the first communication information and the second communication information, based at least on a transport layer destination port number of the requested communication pathway; and v) generating and transmitting updated communication management parameters to the second computing device via the exclusive network connection, the updated communication management parameters comprising: nonpublic identifiers for the first application, the first user, the second application, and the second user for bidirectional authentication and authorization of the requested communication pathway by the first network security software and the second network security software.

Certain embodiments may provide, for example, a method to progressively discover and secure network communications, comprising: i) running first network security software on a first computing device to perform first communication management operations, the first communication management operations comprising: a) logging communication events at a first computing device for at least a determined period of time to obtain first communication information; and b) sending the first communication management information to a provisioning server; and ii) further running the provisioning server to perform configuration management operations, the configuration management operations comprising: a) cross-referencing the first communication information with second communication information received from second network security software running on a second computing device to identify a requested communication pathway between a first application operated by a first user on the first computing device and a second application operated by a second user on the second computing device; and b) generating and transmitting communication management parameters for the requested connection pathway to the first computing device and to the second computing device to instruct the first network security software to act as a proxy for the first application in the requested communication pathway and the second network security software to act as a proxy for the second application in the requested communication pathway, the communication management parameters comprising a proxy for a destination port number of the requested communication pathway that is exclusive to the requested communication pathway.

Certain embodiments may provide, for example, a method to progressively discover and secure network communications, comprising: i) running first network security software on a first computing device to perform first communication management operations, the first communication management operations comprising: a) logging communication events at a first computing device for at least a determined period of time to obtain first communication information; and b) sending the first communication management information to a provisioning server; and ii) further running the provisioning server to perform configuration management operations, the configuration management operations comprising: a) cross-referencing the first communication information with second communication information received from second network security software running on a second computing device to identify a requested communication pathway between a first application operated by a first user on the first computing device and a second application operated by a second user on the second computing device; and b) generating and transmitting communication management parameters for the requested connection pathway to the first computing device and to the second computing device to instruct the first network security software and the second network security software to coordinate bidirectional authentication and authorization of the requested communication pathway.

Certain embodiments may provide, for example, a method to progressively discover and secure network communications, comprising: i) receiving communication information from one or more network security software running on one or more computing devices, the one or more computing devices having nonpublic device identifiers installed on the one or more computing devices; ii) parsing the received communication information to identify one or more further computing devices; iii) sending one or more further network security software and one or more further nonpublic identification codes to the one or more further computing devices; and iv) forming a configured communication pathway between a first network security software and a second network security software by configuring a pre-established communication pathway between the first network security software and the second network security software to exclusively communicate application data between a first application operated by a first user and a second application operated by the second user, the configuring comprising: a) sending a first configuration packet from a first computing device to a second computing device via the pre-established communication pathway, the first configuration packet containing a first device identifier of the nonpublic device identifiers or the further nonpublic device identifiers in an application layer portion of the first configuration packet; b) receiving a second configuration packet from a second computing device, the second configuration packet containing a device identification parameter in an application layer portion of the second configuration packet; and c) confirming, in a kernel space of the first computing device, that the second computing device is authorized to communicate with the first computing device, comprising: matching the device identification parameter to a second nonpublic device identifier of the nonpublic device identifiers or the further nonpublic device identifiers.

Certain embodiments may provide, for example, a method to progressively discover and secure network communications, comprising: i) receiving communication information from one or more network security software running on one or more computing devices; ii) parsing the received communication information to identify one or more further computing devices; iii) sending one or more further network security software to the one or more further computing devices; iv) identifying one or more requested communication pathways between two or more applications running on two or more computing devices of the one or more computing devices and the one or more further computing devices, comprising: cross-referencing the communication information and the further communication information to identify one or more transport layer destination port numbers for the one or more requested communication pathways; v) further sending two or more application identifiers corresponding to the two or more applications to the two or more computing devices; vi) forming a configured communication pathway between a first network security software and a second network security software by configuring a pre-established communication pathway between the first network security software and the second network security software to exclusively communicate application data between a first application of the two or more applications and a second application of the two or more applications, the configuring comprising: a) sending a first configuration packet from a first computing device of the two or more computing devices to a second computing device of the two or more computing devices via the pre-established communication pathway, the first configuration packet containing a first application identifier of the two or more application identifiers assigned to the first application in an application layer portion of the first configuration packet; b) receiving a second configuration packet from a second computing device, the second configuration packet containing an application identification parameter in an application layer portion of the second configuration packet; and c) confirming, in a kernel space of the first computing device, that the second application is authorized to communicate application data with the first application, comprising: matching the application identification parameter to a second application identifier of the two or more application identifiers assigned to the second application.

Certain embodiments may provide, for example, a method to increase security in a network, comprising: i) configuring a first computing device, comprising: a) installing first network security software and first initial communication management parameters, the first initial communication management parameters comprising a nonpublic first device identifier for the first computing device; and b) forming an exclusive first communication pathway for communication between the first network security software and a provisioning server running on a provisioning device; ii) obtaining first communication information at the first computing device and providing the first communication information to the provisioning server, comprising: a) intercepting a bind request from a first application operated by a first user on the first computing device, the bind request specifying a destination port number and a first NIC address; b) generating a first combined identifier that is unique for first application and the first user; c) further intercepting a connection request from a second computing device, the connection request specifying the destination port number and a second NIC address; and d) advising the provisioning server of the first communication information via the exclusive first communication pathway, the first communication information comprising: the first combined identifier, the destination port number, the first NIC address, and the second NIC address; iii) further configuring the second computing device, comprising: a) downloading second network security software and second initial communication management parameters from the provisioning server to the second computing device, the second initial communication management parameters comprising a nonpublic second device identifier for the second computing device; and b) further forming an exclusive second communication pathway for communication between the second network security software and the provisioning server; iv) further obtaining second communication information at the second computing device and providing the second communication information to the provisioning server, comprising: a) detecting a further connection request from a second application operated by a second user on the second computing device, the connection request specifying the second NIC address and the destination port number; b) further generating a second combined identifier that is unique for the second application and the second user; and c) further advising the provisioning server of the second communication information, the second communication information comprising: the second combined identifier, the destination port and the second NIC address via the exclusive second communication pathway; v) identifying a requested communication pathway between the first application operated by the first user and the second application operated by the second user, comprising: cross-referencing the first communication information and the second communication information at the provisioning server, based at least on the destination port number; and vi) generating and transmitting updated communication management parameters for the requested communication pathway from the provisioning server, comprising: a) selecting a first network security port number assigned to the first network security software; b) transmitting first updated communication management parameters from the provisioning server to the first computing device via the exclusive first communication pathway, the first updated communication management parameters comprising: the first communication information, the second communication information, the first exclusive port number, and the second device identifier; and c) transmitting second updated communication management parameters from the provisioning server to the second computing device via the exclusive second communication pathway, the second updated communication management parameters comprising: the first communication information, the second communication information, the first exclusive port number, and the first device identifier.

Certain embodiments may provide, for example, a method to progressively discover and quarantine malware in a network, comprising: i) parsing first communication information received from first network security software running on a first computing device in the network to identify a second computing device in the network; ii) sending second network security software to the second computing device; iii) further receiving second communication information from the second network security software running on the second computing device; iv) identifying a requested communication pathway between a first application operated by a first user on the first computing device and a second application operated by a second user on the second computing device, comprising: cross-referencing the first communication information and the second communication information, based at least on a transport layer destination port number of the requested communication pathway; and v) generating and transmitting communication management parameters for the requested connection pathway to the first computing device and the second computing device, the communication management parameters comprising: a) first communication management parameters sent to the first computing device, the first communication management parameters selected to cause the first network security software to block communications with the second application and/or the second user; and b) second communication management parameters sent to the second computing device, the second communication management parameters selected to cause the second network security software to block networking API commands initiated by the second application and/or the second user.

Certain embodiments may provide, for example, a method for a communications configuration server to discover network devices, comprising: i) receiving metadata from a first computing device for a connection request sent by a second computing device, the metadata comprising: a transport layer destination port number for the connection request, an identifier for a first application and a first user assigned the destination port number, and an address for the second computing device; ii) transmitting network security software and communication management parameters to the second computing device, the communication management parameters processable by the network security software to form an encrypted exclusive connection between the second computing device and the provisioning server; iii) further receiving further metadata from the first computing device or the second computing device, the further metadata comprising a further address for a third computing device; and iv) further transmitting further network security software and further communication management parameters to the third computing device, the further communication management parameters processable by the further network security software to form a further encrypted exclusive connection between the third computing device and the provisioning server.

Certain embodiments may provide, for example, a method for secure communications between a first computing device and a second computing device, comprising: i) receiving metadata for a bind request by a first application and a first user on the first computing device to bind a destination port to an interface at the first computing device; ii) further receiving metadata for a connection request by a second application and a second user on the second computing device to form a connection with the destination port; iii) cross-referencing the bind request and the connection request based on the destination port to associate the first computing device, the second computing device, the destination port, the first application, the first user, the second application, and the second user with a desired connection; and iv) passing communication management parameters to the first computing device and the second computing device, the first communication management parameters comprising: a) a destination port number for the destination port; b) a nonpublic first device identification code; c) a nonpublic second device identification code; d) an identification code unique to the first application and the first user; and e) an identification code unique to the second application and the second user.

Certain embodiments may provide, for example, a product for configuring communications between a plurality of networked computing devices on a network, the product comprising a non-transitory computer-readable storage medium having computer-readable program code embodied therein, the computer-readable program code executable by at least one processor on the network to perform communication management operations, the communication management operations comprising: i) obtaining a list of the networked computing devices, the list comprising at least a first destination address for a first computing device of the plurality of networked computing devices and a second destination address for a second computing device plurality of networked computing devices; ii) generating a nonpublic first device identifier for the first computing device and a nonpublic second device identifier for the second computing device; and iii) transmitting the first device identifier and a first network security software to the first computing device and the second device identifier and a second network security software to the second computing device; iv) receiving network traffic metadata comprising the first device identifier and the second device identifier via an exclusive encrypted connection from the first computing device and/or the second computing device; v) further generating application-specific parameters that are at least partially derived from the network traffic metadata, the application-specific parameters comprising: a first application identifier for a first application operated by a first user and second application identifier for a second application operated by a second user; and vi) transmitting the application-specific parameters to the first computing device and to the second computing device.

Certain embodiments may provide, for example, a product for configuring communications between a plurality of networked computing devices on a network, the product comprising a non-transitory computer-readable storage medium having computer-readable program code embodied therein, the computer-readable program code executable by at least one processor on the network to perform communication management operations, the communication management operations comprising: i) receiving network traffic metadata from a networked first computing device of the plurality of networked computing devices; ii) generating communication management parameters for communication of application data between a first application running on the first computing device and a second application running on a networked second computing device of the plurality of networked computing devices, the communication management parameters comprising: a) a first parameter comprising a first randomly-generated number and a first application identifier for the first application, the first application identifier derived from the network traffic metadata; and b) a second parameter comprising a second randomly-generated number and a second application identifier for the second application, the second application identifier derived from the network traffic metadata; and iii) transmitting the communication management parameters to the first computing device and to the second computing device.

Certain embodiments may provide, for example, a product for configuring communications between a plurality of networked computing devices on a network, the product comprising a non-transitory computer-readable storage medium having computer-readable program code embodied therein, the computer-readable program code executable by at least one processor on the network to perform communication management operations, the communication management operations comprising: i) receiving data provenance parameters for network communications between a first computing device of the plurality of networked computing devices and a networked at least a second computing device of the plurality of networked computing devices, the data provenance parameters comprising: a) a first device identifier for the first computing device; b) a first application proto-identifier for a first application running on the first computing device; c) at least a second device identifier for the at least a second computing device; and d) at least a second application proto-identifier for at least a second application running on the at least a second computing device; ii) generating communication management parameters for communication of application data between the first application and the at least a second application, the communication management parameters comprising: a) a first parameter derived from the first device identifier and the first application proto-identifier; and b) at least a second parameter derived from the at least a second device identifier the at least a second application proto-identifier; and iii) transmitting the communication management parameters exclusively to the first computing device and to the at least a second computing device.

Certain embodiments may provide, for example, a method to provide alerts for network communications of a first computing device, comprising: i) advising a communications configuration server of a first networking API command invoked by a first application operated by a first user on the first computing device, the first networking API command specifying a transport layer destination port; ii) receiving communication management parameters from the communications configuration server that specify a second application operated by a second user on a second computing device that is authorized to form a network connection with the first application operated by the first user via the destination port; and iii) alerting an SEIM if: a) a first process other than the first application operated by the first user invokes the first networking API command; and/or b) a second process other than the second application operated by the second user invokes the second networking API command; and/or c) an incoming network packet specifying the destination port does not contain a code that matches one of the configuration management parameters that is unique to the second application and second user; and/or d) an incoming network packet specifying the destination port contains a payload that does not conform to one or more content requirements specified in the configuration management parameters.

Certain embodiments may provide, for example, a method to provide alerts for network communications of a first computing device, comprising: i) advising a communications configuration server of a first networking API command invoked by a first application operated by a first user on the first computing device, the first networking API command specifying a transport layer destination port; and ii) receiving communication management parameters from the communications configuration server that specify a second application operated by a second user on a second computing device that is authorized to form a network connection with the first application operated by the first user via the destination port; and iii) securing communications, comprising: a) blocking an attempt by a first process other than the first application operated by the first user to invoke the first networking API command; and/or b) blocking an attempt by a second process other than the second application operated by the second user to invoke the second networking API command; and/or c) dropping an incoming network packet specifying the destination port that does not contain a code that matches one of the configuration management parameters that is unique to the second application and second user; and/or d) dropping an incoming network packet specifying the destination port that contains a payload that does not conform to one or more content requirements specified in the configuration management parameters.

Certain embodiments may provide, for example, a product for securing communications of a plurality of networked computing devices, the product comprising a non-transitory computer-readable storage medium having computer-readable program code embodied therein, the computer-readable program code executable by a first computing device of the plurality of networked computing devices to perform communication management operations, the communication management operations comprising: i) forming a connection between the first computing device and a second computing device to communicate data exclusively between a first application operated by a first user on the first computing device and a second application operated by a second user on a second computing device, comprising: exchanging metadata packets between the first computing device and a second computing device, a first metadata packet of the exchanged metadata packets containing a first application identifier that identifies the first application and the first user in an application layer portion of the first metadata packet, and a second metadata packet of the exchanged metadata packets containing a second application identifier that identifies a second application and a second user in an application layer portion of the second metadata packet; ii) advising a provisioning server that the first application operated by the first user and the second application operated by the second user have formed the connection; and iii) receiving instructions from the provisioning server to perform further communication management operations, the further communication management operations comprising: a) dropping the connection and blocking any further attempt to form a connection between the first application operated by the first user and the second application operated by the second user; or b) inspecting incoming network packets according to an algorithm to determine whether the second application identifier is recoverable from application layer portions of the incoming network packets.

Certain embodiments may provide, for example, a product for securely communicating application data between a plurality of networked computing devices, the product comprising a non-transitory computer-readable storage medium having computer-readable program code embodied therein, the computer-readable program code executable by a first computing device of the plurality of networked computing devices to perform communication management operations, the communication management operations comprising: i) receiving at least one network packet from a networked second computing device of the plurality of networked computing devices, the at least one network packet comprising a transport layer destination port number and an application layer parameter; ii) generating a first application proto-identifier for a first application to which the destination port number is assigned on the first computing device; iii) processing the application layer parameter to obtain a second application proto-identifier for a second application running on the second computing device; iv) passing the first application proto-identifier and the second application proto-identifier to a networked provisioning server of the plurality of networked computing devices; and v) receiving, in response to the passing, communication management parameters comprising a first application identifier at least partially derived from the first application proto-identifier and a second application identifier at least partially derived from the second application proto-identifier.

Certain embodiments may provide, for example, a product for securely communicating application data between a plurality of networked computing devices, the product comprising a non-transitory computer-readable storage medium having computer-readable program code embodied therein, the computer-readable program code executable by a first computing device of the plurality of networked computing devices to perform communication management operations, the communication management operations comprising: i) interrupting at least one request from a first application running on the first computing device to send data to a destination port on a second computing device; ii) modifying the data by appending a first application proto-identifier for the first application; iii) releasing the modified data for processing by a network stack of the first computing device; followed by v) receiving communication management parameters from a predetermined networked provisioning server of the plurality of networked computing devices, the communication management parameters comprising: a) a first application identifier at least partially derived from the first application proto-identifier; and b) a second application identifier for a second application to which the destination port number is assigned.

Certain embodiments may provide, for example, a product comprising at least one non-transitory computer-readable storage medium having computer-readable program code embodied therein, the computer-readable program code comprising: i) first communication management operations, comprising: a) forming a first connection with a first computing device, comprising: executing at least a first networking API command referencing a first NIC; b) receiving a first network packet comprising an application layer payload from the first computing device via the first connection; c) verifying that a payload of an incoming network packet conforms to a plurality of content requirements, the plurality of content requirements comprising: I) a data model; and/or II) a data range; and/or III) a command type authorized to be present in the incoming application data; and ii) second communication management operations, comprising: a) further forming a second connection with a second computing device, comprising: executing at least a second networking API command referencing a second NIC, the second NIC different from the first NIC; b) only if the incoming network packet is verified, adding an application identifier for the program code to the application layer payload to form a modified payload; and c) only if the incoming network packet is verified, inserting the modified payload into a second network packet and sending the second network packet to the second computing device via the second connection.

Certain embodiments may provide, for example, a product comprising at least one non-transitory computer-readable storage medium having computer-readable program code embodied therein, the computer-readable program code comprising: i) first communication management operations, comprising: a) forming a first connection with a first computing device, comprising: executing at least a first networking API command referencing a first NIC; b) extracting an application identifier and a packet payload from application layer portions of an incoming network packet received from the first computing device; and c) confirming the application identifier is an expected identifier for the program code; and ii) second communication management operations, comprising: a) further forming a second connection with a second computing device, comprising: executing at least a second networking API command referencing a second NIC, the second NIC different from the first NIC; b) inserting a content identifier that identifies a plurality of content requirements into a second network packet, the plurality of content requirements comprising: I) a data model; and/or II) a data range; and/or III) a command type authorized to be present in the incoming application data; and c) sending the second network packet to the second computing device via the second connection.

Certain embodiments may provide, for example, a method for a provisioning server to configure communications between computing devices, comprising: i) receiving, from a first computing device, a network addresses for second and third computing devices; ii) sending communication management parameters to the first computing device, the communication management parameters comprising: a) a first interface identifier for a first network interface of the first computing device; b) a second interface identifier for a second network interface of the first computing device; c) an application identifier for an application and user on the second computing device; and d) content requirements for application layer packet data received from the third computing device; iii) forming a first connection via the first network interface with the second computing device, and verifying that incoming network packets received via the first connection contain an application layer parameter that matches the application identifier; and iv) further forming a second connection via the second network interface with the third computing device, and further verifying that application layer payloads of incoming network packets received via the second connection conform to the content requirements.

Each of the foregoing methods, systems, products, software, modules, middleware, computing infrastructure and/or apparatus may be inclusive of one or more of the following embodiments. Certain embodiments may provide, for example, a product for securing communications of a plurality of networked computing devices, the product comprising a non-transitory computer-readable storage medium having computer-readable program code embodied therein, the computer-readable program code executable by a first computing device to provide communication management operations that can be selectively enabled or disabled, and that can be applied to monitor, provide alerts for, or block unauthorized packet communications, the communication management operations comprising: i) sending a nonpublic first identification code for the first computing device to a software port on a second computing device via a pre-established communication pathway; ii) receiving, in response to the sending the nonpublic first identification code, a nonpublic second identification code for the second computing device; iii) comparing the nonpublic second identification code with a pre-established value for the second computing device; iv) further sending a first application identifier for a first user-application to the second computing device via the pre-established communication pathway; v) further receiving, in response to the sending the first application identifier, a second application identifier for a second user-application; vi) comparing the second application identifier with a pre-established value for the second user-application; vii) confirming application data received from the second user-application conforms to a data model assigned to a predetermined port number, a data range assigned to the predetermined port number, and a command type assigned to the predetermined port number, the predetermined port number assigned to the first user-application and/or the second user-application; followed by viii) passing the confirmed application data to the first user-application.

A. In certain embodiments, for example, the nonpublic second identification code may be obtained from a network packet. In certain embodiments, for example, the nonpublic second identification code may be obtained from a portion of the network packet that is higher-than-OSI layer three and lower-than-OSI layer seven. In certain embodiments, for example, the comparing may be initiated in a kernel space of the first computing device.

B. In certain embodiments, for example, the pre-established value may be preprovisioned on nonvolatile storage media of the first computing device. In certain embodiments, for example, the communication management operations may further comprise: decrypting the nonpublic second identification code with a single-use cryptographic key.

C. In certain embodiments, for example, the nonpublic first identification code and the nonpublic second identification code may be shared secrets between the first computing device and the second computing device.

D. In certain embodiments, for example, the communication management operations may further comprise translating, prior to the passing, the application data from a first pre-established format to a second pre-established format. In certain embodiments, for example, the communication management operations may further comprise: determining the first pre-established format and the second pre-established format from (a) a data model identification code assigned to the data model and/or (b) the predetermined port number.

E. In certain embodiments, for example, the communication management operations may further comprise: sending the first application identifier and a data model identifier assigned to the data model to the second computing device in a single network packet.

F. In certain embodiments, for example, the comparing the nonpublic second identification code and the comparing the second application identifier may be performed prior to any communication of application data between the first user-application and the second user-application.

G. In certain embodiments, for example, the communication management operations may further comprise: i) receiving a data packet from a first port assigned to the first user-application, the first port hosted on the first computing device, the data packet comprising a payload and a second port number; and ii) assembling a packet segment for the received data packet, the packet segment comprising the payload, the first application identifier, and a data model identifier assigned to the data model. In certain embodiments, for example, the pre-established communication pathway may have a one-to-one correspondence to an n-tuple (as referred to herein, an n-tuple may be, for example, an at least a 2-tuple, an at least a 3-tuple, an at least a 5-tuple, an at least a 6-tuple, an at least an 8-tuple, an at least a 10-tuple, or an at least a 12-tuple) comprising the first application identifier, the second application identifier, the second port number, and the data model identifier. In certain embodiments, for example, each of a series of network packet communications of user-application data between the first port and the second port may comprise: transmission of a network packet to a third port, the third port assigned to network security software resident on the second computing device, the third port having a one-to-one correspondence with the second port number, the second port number assigned to the second port, the second port assigned to the second user-application, the network packet comprising the first application identifier and the data model identifier. In certain embodiments, for example, the first application identifier and the data model identifier in the each of the series of network packet communications may be encrypted by one of a series of single-use encryption keys. In certain embodiments, for example, all communications of user-application data between the first port and the second port may comprise the series of network packet communications.

H. In certain embodiments, for example, the communication management operations may further comprise: i) intercepting a network connection request from a first port assigned to the first user-application, the first port hosted by the first computing device, the request comprising a second port number; and ii) verifying that the first user-application is specifically authorized to communicate with a second port, the second port number assigned to the second port. In certain embodiments, for example, the verifying may be performed prior to forming the pre-established communication pathway.

I. In certain embodiments, for example, the communication management operations may further comprise: i) intercepting a network connection request from a second port, the second port hosted by the second computing device, the request comprising a first port number; and ii) verifying that a first port is specifically authorized to receive packet data from the second port, the first port number assigned to the first port. In certain embodiments, for example, the communication management operations may further comprise: confirming that the second computing device has consulted a pre-specified local policy to specifically authorize network packet communication between the first port and the second port. In certain embodiments, for example, the communication management operations may further comprise: receiving an encrypted identifier for the pre-specified local policy from the second computing device. In certain embodiments, for example, the pre-specified local policy may comprise a record, the record comprising the first application identifier, the second application identifier, the data model identifier, and the first port number. In certain embodiments, for example, the pre-specified local policy may further comprise a flag, the flag specifying whether the communication pathway is unidirectional or bidirectional. In certain embodiments, for example, the intercepting may be initiated in a kernel space of the first computing device. In certain embodiments, for example, the communication management operations may further comprise: i) receiving a network packet via the communication pathway, the network packet comprising the first port number, data from the second user-application, the second application identifier, and the data model identifier; and ii) comparing the second application identifier and the data model identifier with pre-established values, the pre-established values identified based on the first port number. In certain embodiments, for example, the second application identifier and the data model identifier may be located in higher-than-OSI layer three portions of the network packet. In certain embodiments, for example, the comparing may be initiated in a kernel of the first computing device. In certain embodiments, for example, the communication management operations may further comprise: translating the data from the second user-application to a format expected by the first user-application.

J. In certain embodiments, for example, the communication management operations may further comprise: confirming that further application data received from the first user-application conforms to a further data model assigned to a further predetermined port number, a further data range assigned to the further predetermined port number, and a further command type assigned to the further predetermined port number, the further predetermined port number assigned to the first user-application and/or the second user-application; followed by passing the confirmed further application data to the second user-application.

K. In certain embodiments, for example, a portion of the communication management operations may be configured for execution in a kernel space of the first computing device, and a further portion of the communication management operations may be configured for execution in an application space of the first computing device.

Certain embodiments may provide, for example, a product for securing communications of a plurality of networked computing devices (for example network packet-based communications among the network computing devices over a network), the product comprising a non-transitory computer-readable storage medium having computer-readable program code embodied therein, the computer-readable program code executable by a first computing device to provide communication management operations that can be selectively enabled or disabled, and that can be applied to monitor, provide alerts for, or block unauthorized packet communications. In certain embodiments, for example, the communication management operations may comprise sending a nonpublic first identification code (for example sending an encrypted nonpublic first identification code) for the first computing device (for example the nonpublic first identification code may be assigned to the first computing device) to a software port on a second computing device via a pre-established communication pathway. In certain embodiments, for example, the communication management operations may comprise receiving, in response to the sending (or in response to receipt of the nonpublic first identification code by the second computing device), a nonpublic second identification code for the second computing device (for example the nonpublic second identification code may be assigned to the second computing device). In certain embodiments, for example, the communication management operations may comprise comparing the nonpublic second identification code with a pre-established (or preconfigured, predefined, or preprovisioned) value for the second computing device (for example the pre-established value may be assigned to the second computing device).

A. In certain embodiments, for example, the nonpublic second identification code may be obtained from a network packet. In certain embodiments, for example, the nonpublic second identification code may be obtained from a higher-than-Open Systems Interconnection (OSI) layer three portion (for example one or more of an OSI layer four portion, an OSI layer five portion, an OSI layer six portion, an OSI layer seven portion, or a layer between one or more of an OSI layer three portion, an OSI layer four portion, an OSI layer five portion, an OSI layer six portion, or an OSI layer seven portion) of the network packet. In certain embodiments, for example, the comparing may be initiated in a kernel space of the first computing device. In certain embodiments, for example, the comparing may be partially performed in an application space of the first computing device.

B. In certain embodiments, for example, the pre-established value may be preprovisioned on nonvolatile storage media of the first computing device. In certain embodiments, for example, the communication management operations may further comprise: decrypting the nonpublic second identification code with a single-use cryptographic key. In certain embodiments, for example, the single-use cryptographic key may be rotated to obtain a further cryptographic key for use in further decrypting.

C. In certain embodiments, for example, the nonpublic first identification code and the nonpublic second identification code may be shared secrets between the first computing device and the second computing device.

D. In certain embodiments, for example, the communication management operations may further comprise sending a first application identifier for a first user-application (for example the first application identifier may be assigned to the first user-application) to the second computing device via the pre-established communication pathway. In certain embodiments, for example, the communication management operations may further comprise receiving, in response to the sending, a second application identifier for a second user-application (for example the second application identifier may be assigned to the second user-application). In certain embodiments, for example, the communication management operations may further comprise comparing the second application identifier with a pre-established value for the second user-application. In certain embodiments, for example, the communication management operations may further comprise sending a data type identifier for the pre-established communication pathway via the pre-established communication pathway. In certain embodiments, for example, the communication management operations may further comprise receiving, in response to the sending, the data type identifier from the second computing device. In certain embodiments, for example, the communication management operations may further comprise comparing the received data type identifier with a pre-established value for the pre-established communication pathway. In certain embodiments, for example, the first application identifier and the data type identifier may be sent to the second computing device in a single network packet. In certain embodiments, for example, the comparing the nonpublic second identification code, the comparing the second application identifier, and the comparing the received data type identifier may be performed prior to any communication of application data between the first user-application and the second user-application. In certain embodiments, for example, the communication management operations may further comprise receiving a data packet from a first port assigned to the first user-application, the first port hosted on the first computing device, the data packet comprising a payload and a second port number. In certain embodiments, for example, the communication management operations may further comprise assembling a packet segment for the received data packet, the packet segment comprising the payload, the first application identifier, and the data type identifier. In certain embodiments, for example, the pre-established communication pathway may have a one-to-one correspondence to an n-tuple comprising the first application identifier, the second application identifier, the second port number, and the data type identifier. In certain embodiments, for example, each of a series of network packet communications of user-application data between the first port and the second port may comprise: transmission of a network packet to a third port, the third port assigned to network security software resident on the second computing device, the third port having a one-to-one correspondence with the second port number, the second port number assigned to the second port, the second port assigned to the second user-application, the network packet comprising the first application identifier and the data type identifier. In certain embodiments, for example, the first application identifier and the data type identifier in the each of the series of network packet communications may be encrypted by one of a series of single-use encryption keys. In certain embodiments, for example, all communications of user-application data between the first port and the second port may comprise the series of network packet communications. In certain embodiments, for example, the communication management operations may further comprise intercepting a network connection request from a first port assigned to the first user-application, the first port hosted by the first computing device, the request comprising a second port number. In certain embodiments, for example, the communication management operations may further comprise verifying that the first user-application is specifically authorized to communicate with a second port, the second port number assigned to the second port. In certain embodiments, for example, the verifying may be performed prior to forming the pre-established communication pathway. In certain embodiments, for example, the communication management operations may further comprise intercepting a network connection request from a second port, the second port hosted by the second computing device, the request comprising a first port number. In certain embodiments, for example, the communication management operations may further comprise verifying that a first port is specifically authorized to receive packet data from the second port, the first port number assigned to the first port. In certain embodiments, for example, the communication management operations may further comprise confirming that the second computing device has consulted a pre-specified local policy to specifically authorize network packet communication between the first port and the second port. In certain embodiments, for example, the communication management operations may further comprise: receiving an encrypted identifier for the pre-specified local policy from the second computing device. In certain embodiments, for example, the pre-specified local policy may comprise a record, the record comprising the first application identifier, the second application identifier, the data type identifier, and the first port number. In certain embodiments, for example, the pre-specified local policy may further comprise a flag, the flag specifying whether the communication pathway is unidirectional or bidirectional. In certain embodiments, for example, the intercepting may be initiated in a kernel space of the first computing device. In certain embodiments, for example, the communication management operations may further comprise receiving a network packet via the communication pathway, the network packet comprising the first port number, data from the second user-application, the second application identifier, and the data type identifier. In certain embodiments, for example, the communication management operations may further comprise comparing the second application identifier and the data type identifier with pre-established values, the pre-established values identified based on the first port number. In certain embodiments, for example, the second application identifier and the data type identifier may be located in higher-than-OSI layer three portions (for example one or more of OSI layer four portions, OSI layer five portions, OSI layer six portions, OSI layer seven portions, or layers between one or more of the OSI layer three portions, OSI layer four portions, OSI layer five portions, OSI layer six portions, or OSI layer seven portions) of the network packet. In certain embodiments, for example, the comparing may be initiated in a kernel of the first computing device. In certain embodiments, for example, the communication management operations may further comprise: translating the data from the second user-application to a format expected by the first user-application. In certain embodiments, for example, the data from the second user-application may be translated from a pre-established format, the pre-established format determined from the data type identifier.

E. In certain embodiments, for example, the communication management operations may comprise, prior to assembling the packet segment (and prior to one or more translation steps if the data undergoes translation), using the data type identifier to obtain a data definition for the payload or a portion of the payload, and evaluating the payload to determine whether the payload (or the portion of the payload) complies with the data definition. In certain embodiments, for example, the data definition may comprise a required protocol header (for example a header for an MQTT payload), a list (for example a list of one) of allowed data types (for example integer, text, or floating point data types), a required value pair (for example a field description and a value having a specified data type), and/or required control characters (for example one or more required ASCII code characters at predetermined positions in the payload). In certain embodiments, for example, the communication management operations may comprise discarding (and taking no further steps to transmit) the payload if the payload does not comply with the data definition. In certain embodiments, for example, the communication management operations may comprise, prior to assembling the packet segment, comparing the payload or portions of the payload based on the data type identifier against one or more pre-authorized ranges (for example minimum and/or maximum values and/or discrete allowed values for numerical data, or for example a range or allowed values for text data) and evaluating the payload to determine whether the payload (or the portion of the payload) falls within the one or more pre-authorized ranges. In certain embodiments, for example, the communication management operations may comprise discarding (and taking no further steps to transmit) the payload if the payload (or the portion of the payload) does not fall within the one or more pre-authorized ranges. In certain embodiments, for example, the communication management operations may comprise, prior to assembling the packet segment, using the data type identifier to obtain a list of pre-authorized commands and/or a list of prohibited commands (for example database instruction commands such as SQLread and SQLwrite), and evaluating the payload to determine whether the payload (or the portion of the payload) contains one of the pre-authorized commands and/or does not contain one of the prohibited commands. In certain further embodiments, for example, the list of pre-authorized commands may be exclusive. In certain embodiments, for example, the communication management operations may comprise discarding (and taking no further steps to transmit) the payload if the payload (or the portion of the payload) does not contain one of the pre-authorized commands and/or contains one of the prohibited commands.

F. In certain embodiments, for example, the communication management operations may comprise, after receiving the network packet via the communication pathway, using the data type identifier to obtain a data definition for the data from the second user-application or a portion thereof, and evaluating said data to determine whether the data (or the portion thereof) complies with the data definition. In certain embodiments, for example, the data definition may comprise a required protocol header (for example a header for an MQTT payload), a list (for example a list of one) of allowed data types (for example integer, text, or floating point data types), a required value pair (for example a field description and a value having a specified data type), and/or required control characters (for example one or more required ASCII code characters at predetermined positions in the payload). In certain embodiments, for example, the communication management operations may comprise discarding (and taking no further steps to transmit) the received network packet (including the data) if the data does not comply with the data definition. In certain embodiments, for example, the communication management operations may comprise, after receiving the network packet via the communication pathway, using the data type identifier to obtain one or more allowed ranges (for example minimum and/or maximum values and/or discrete allowed values for numerical data, or for example a range or allowed values for text data) for the data or a portion thereof, and evaluating the data to determine whether the data (or the portion thereof) falls within the one or more allowed ranges. In certain embodiments, for example, the communication management operations may comprise discarding (and taking no further steps to transmit) the data if the data (or the portion of the data) does not fall within the one or more allowed ranges. In certain embodiments, for example, the communication management operations may comprise, after receiving the network packet via the communication pathway, using the data type identifier to obtain a list of allowed commands and/or a list of prohibited commands (for example database instruction commands such as SQLread and SQLwrite), and evaluating the data to determine whether the data (or the portion of the data) contains one of the allowed commands and/or does not contain one of the prohibited commands. In certain further embodiments, for example, the list of allowed commands may be exclusive. In certain embodiments, for example, the communication management operations may comprise discarding (and taking no further steps to consume) the data if the data (or the portion of the data) does not contain one of the allowed commands and/or contains one of the prohibited commands.

G. In certain embodiments, for example, the nonpublic first identification code may be preprovisioned on the first computing device as a static value (for example in an encrypted configuration file) that is used each time the first computing device executes the communication management operations (and the nonpublic second identification code may be similarly preprovisioned on the second computing device) as described herein. In certain other embodiments, for example, the nonpublic first identification code (and/or nonpublic second identification code) may be obtained by requesting a security token (or token pair) for the first port (for example during establishment of the port in a listening mode, prior to sending a connection request, or during or after establishment of the pre-established communication pathway). In certain embodiments, for example, the request may specify identifiers (for example public identifiers) for the first computing device and the second computing device, and the token (or token pair) returned in response to the request may be a function of the first computing device and the second computing device. In certain embodiments, for example, the second computing device may also obtain a token (or token pair) complimentary to the token (or token pair) received by the first computing device. In certain embodiments, for example, a new token (or pair of tokens) is generated each time a connection between the first computing device and the second computing device is established. In certain embodiments, for example, all communications between the first computing device and the third computing device and all communications between the second computing device and the third computing device, may be secured by one of the methods, systems, products, communication management operations, software, modules, middleware, computing infrastructure and/or apparatus disclosed herein.

H. In certain embodiments, for example, the application identifier for the first user-application may be preprovisioned on the first computing device as a static value (for example in an encrypted configuration file) that is used each time the first computing device executes the communication management operations (and the application identifier for the second user-application may be similarly preprovisioned on the second computing device) as described herein. In certain other embodiments, for example, the application identifier for the first user-application (and/or application identifier for the second user-application) may be obtained by requesting a security token (or token pair) for the first port (for example during establishment of the port in a listening mode, prior to sending a connection request, or during or after establishment of the pre-established communication pathway). In certain embodiments, for example, the request may specify identifiers for the first user-application and the second user-application (and optionally the data type), and the token (or token pair) returned in response to the request may be a function of the identifiers for the first user-application and the second user-application (and optionally the data type). In certain embodiments, for example, the second computing device may also obtain a token (or token pair) complimentary to the token (or token pair) received by the first computing device. In certain embodiments, for example, a new token (or pair of tokens) is generated each time a connection between the first computing device and the second computing device is established. In certain embodiments, for example, all communications between the first computing device and the third computing device and all communications between the second computing device and the third computing device, may be secured by one of the methods, systems, products, communication management operations, software, modules, middleware, computing infrastructure and/or apparatus disclosed herein.

I. In certain embodiments, for example, all authentication and authorization parameters required to perform the communication management operations may be obtained from a local encrypted configuration file installed on a first node (for example the first computing device). In certain embodiments, for example, the local encrypted configuration file may include only those authentication and authorization parameters required by the first node to conduct pre-authorized communications. In certain other embodiments, for example, at least a portion (for example all) authentication and authorization parameters required to perform the communication management operations (whether static parameters or dynamically generated tokens or token pairs) may be obtained from a third node (for example a credentialing server). In certain embodiments, for example, the communication management operations may comprise obtaining the nonpublic first identification code, the pre-established value for the second computing device, the first application identifier, the pre-established value for the second user-application, the data type identifier, the pre-established value for the received data type identifier, the first port number, the second port number, the third port number, the data definition, the protocol header, the list of allowed data types, the required value pair, the required control characters, the one or more allowed ranges, the list of allowed commands, and/or the list of prohibited commands from at least a third node (for example a credentialing server). In certain embodiments, for example, one or more (for example all) of the nonpublic first identification code, the pre-established value for the second computing device, the first application identifier, the pre-established value for the second user-application, the data type identifier, the pre-established value for the received data type identifier, the first port number, the second port number, the third port number, the data definition, the protocol header, the list of allowed data types, the required value pair, the required control characters, the one or more allowed ranges, the list of allowed commands, and the list of prohibited commands may be obtained upon request, periodically, on boot-up of the first node or the third node, or upon establishment of a communication pathway between the first node and the third node. In certain embodiments, for example, two or more (for example all) of the nonpublic first identification code, the pre-established value for the second computing device, the first application identifier, the pre-established value for the second user-application, the data type identifier, the pre-established value for the received data type identifier, the first port number, the second port number, the third port number, the data definition, the protocol header, the list of allowed data types, the required value pair, the required control characters, the one or more allowed ranges, the list of allowed commands, and the list of prohibited commands may be obtained simultaneously, essentially simultaneously, or sequentially. In certain embodiments, for example, a portion or all the obtaining may be performed during boot up of the first computing device (including for example, obtaining all necessary parameters for communicating with remote computing devices at boot up of the first computing devices). In certain embodiments, for example, a portion or all of the obtaining may be performed dynamically (for example in response to a confirmation that a communication pathway has been established (for example upon establishment of the pre-established communication pathway). In certain embodiments, for example, the third node may maintain a master configuration file of a portion or all necessary authentication and authorization parameters for port-to-port communications between a plurality of networked computing devices.

J. In certain embodiments, for example, a portion of the communication management operations may be configured for execution in a kernel space of the first computing device, and a further portion of the communication management operations may be configured for execution in an application space of the first computing device.

Certain embodiments may provide, for example, a product for securing communications of a plurality of networked computing devices, the product comprising a non-transitory computer-readable storage medium having computer-readable program code embodied therein, the computer-readable program code executable by a first computing device to provide communication management operations that can be selectively enabled or disabled, and that can be applied to monitor, provide alerts for, or block unauthorized packet communications, the communication management operations comprising: i) sending a nonpublic first identification code for the first computing device to a software port on a second computing device via a pre-established communication pathway; ii) receiving, in response to the sending, a nonpublic second identification code for the second computing device; and iii) comparing the nonpublic second identification code with a pre-established value for the second computing device.

A. In certain embodiments, for example, the nonpublic second identification code may be obtained from a network packet. In certain embodiments, for example, the nonpublic second identification code may be obtained from a higher-than-OSI layer three portion (for example one or more of an OSI layer four portion, an OSI layer five portion, an OSI layer six portion, an OSI layer seven portion, or a layer between one or more of an OSI layer three portion, an OSI layer four portion, an OSI layer five portion, an OSI layer six portion, or an OSI layer seven portion) of the network packet. In certain embodiments, for example, the comparing may be initiated in a kernel space of the first computing device. In certain embodiments, for example, the comparing may be partially performed in an application space of the first computing device.

B. In certain embodiments, for example, the pre-established value may be preprovisioned on nonvolatile storage media of the first computing device. In certain embodiments, for example, the communication management operations may further comprise: decrypting the nonpublic second identification code with a single-use cryptographic key. In certain embodiments, for example, the single-use cryptographic key may be rotated to obtain a further cryptographic key for use in further decrypting.

C. In certain embodiments, for example, the nonpublic first identification code and the nonpublic second identification code may be shared secrets between the first computing device and the second computing device.

D. In certain embodiments, for example, the communication management operations may further comprise: i) sending a first application identifier for a first user-application to the second computing device via the pre-established communication pathway; ii) receiving, in response to the sending, a second application identifier for a second user-application; and iii) comparing the second application identifier with a pre-established value for the second user-application. In certain embodiments, for example, the communication management operations may further comprise: i) sending a data type identifier for the pre-established communication pathway via the pre-established communication pathway; ii) receiving, in response to the sending, the data type identifier from the second computing device; and iii) comparing the received data type identifier with a pre-established value for the pre-established communication pathway. In certain embodiments, for example, the first application identifier and the data type identifier may be sent to the second computing device in a single network packet. In certain embodiments, for example, the comparing the nonpublic second identification code, the comparing the second application identifier, and the comparing the received data type identifier may be performed prior to any communication of application data between the first user-application and the second user-application. In certain embodiments, for example, the communication management operations may further comprise: i) receiving a data packet from a first port assigned to the first user-application, the first port hosted on the first computing device, the data packet comprising a payload and a second port number; and ii) assembling a packet segment for the received data packet, the packet segment comprising the payload, the first application identifier, and the data type identifier. In certain embodiments, for example, the pre-established communication pathway may have a one-to-one correspondence to an n-tuple comprising the first application identifier, the second application identifier, the second port number, and the data type identifier. In certain embodiments, for example, each of a series of network packet communications of user-application data between the first port and a second port may comprise: the first application identifier and the data type identifier, the second port assigned to the second user-application, the second port number assigned to the second port. In certain embodiments, for example, the first application identifier and the data type identifier in the each of the series of network packet communications may be encrypted by one of a series of single-use encryption keys. In certain embodiments, for example, the series of network packet communications may comprise all network packet communications of user-application data between the first port and the second port. In certain embodiments, for example, the communication management operations may further comprise: i) intercepting a network connection request from a first port assigned to the first user-application, the first port hosted by the first computing device, the request comprising a second port number; and ii) verifying that the first user-application is specifically authorized to communicate with a second port, the second port number assigned to the second port. In certain embodiments, for example, the verifying may be performed prior to forming the pre-established communication pathway. In certain embodiments, for example, the communication management operations may further comprise: i) intercepting a network connection request from a second port, the second port hosted by the second computing device, the request comprising a first port number; and ii) verifying that a first port is specifically authorized to receive packet data from the second port, the first port number assigned to the first port. In certain embodiments, for example, the communication management operations may further comprise confirming that the second computing device has consulted a pre-specified local policy to specifically authorize network packet communication between the first port and the second port. In certain embodiments, for example, the communication management operations may further comprise: receiving an encrypted identifier for the pre-specified local policy from the second computing device. In certain embodiments, for example, the pre-specified local policy may comprise a record, the record comprising the first application identifier, the second application identifier, the data type identifier, and the first port number. In certain embodiments, for example, the pre-specified local policy may further comprise a flag, the flag specifying whether the communication pathway is unidirectional or bidirectional. In certain embodiments, for example, the intercepting may be initiated in a kernel space of the first computing device. In certain embodiments, for example, the communication management operations may further comprise: i) receiving a network packet via the communication pathway, the network packet comprising the first port number, data from the second user-application, the second application identifier, and the data type identifier; and ii) comparing the second application identifier and the data type identifier with pre-established values, the pre-established values identified based on the first port number. In certain embodiments, for example, the second application identifier and the data type identifier may be located in higher-than-OSI layer three portions (for example one or more of OSI layer four portions, OSI layer five portions, OSI layer six portions, OSI layer seven portions, or layers between one or more of the OSI layer three portions, OSI layer four portions, OSI layer five portions, OSI layer six portions, or OSI layer seven portions) of the network packet. In certain embodiments, for example, the comparing may be initiated in a kernel of the first computing device. In certain embodiments, for example, the communication management operations may further comprise: translating the data from the second user-application to a format expected by the first user-application. In certain embodiments, for example, the data from the second user-application may be translated from a pre-established format, the pre-established format determined from the data type identifier.

E. In certain embodiments, for example, a portion of the communication management operations may be configured for execution in a kernel space of the first computing device, and a further portion of the communication management operations may be configured for execution in an application space of the first computing device.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to provide communication management operations that can be selectively enabled or disabled, and that can be applied to monitor, provide alerts for, or block unauthorized packet communications. In certain embodiments, for example, the communication management operations may comprise establishing authorized network tunnels (for example network tunnels based on protocol which involve encrypting a network packet and inserting the encrypted network packet inside a packet for transport (such as IPsec protocol), or network tunnels based on Socket Secured Layer protocol, or network tunnels which require encryption of part of all of a packet payload but do not involve additional headers (for example do not involve packaging an IP packet inside another IP packet) for network communication on all port-to-port network communications (for example unencrypted or encrypted payload communications) among the plurality of networked computing devices (inclusive, for example, of port-to-port communications according to User Datagram Protocol (UDP) or Transmission Control Protocol (TCP) between end-user application processes over a network)). In certain embodiments, for example, the port-to-port communications may be between user-application processes (inclusive of application processes having a process owner (or user)). In certain embodiments, for example, one or more of the user-application processes may reside in kernel and/or application space. In certain embodiments, for example, the establishing may comprise intercepting network connection requests (for example by network application programming interfaces) having associated destination port numbers. In certain embodiments, for example, the establishing may comprise identifying preconfigured, predefined, pre-established and/or preprovisioned tunnel port numbers (for example predefined tunnel port numbers associated with servers), comprising identifying at least one (for example, one) preconfigured, predefined, pre-established and/or preprovisioned tunnel port number for each associated destination port number of the associated destination port numbers. In certain embodiments, for example, the establishing may comprise requesting the negotiation of network tunnels, the requesting comprising sending connection request packets comprising the tunnel port numbers (and also, for example, cipher suite parameters), each one of the network tunnels having a one-to-one correspondence with one of the tunnel port numbers. In certain embodiments, for example, the establishing may comprise authorizing the network tunnels, comprising comparing computing device identifiers, user-application identifiers (for example user-application identifiers derived from application process identifiers and/or application process owners, together or in parts), and payload data-type identifiers received from the network tunnels with preconfigured, predefined, pre-established and/or preprovisioned authorization codes. In certain further embodiments, for example, the computing device identifiers, user-application identifiers, and/or payload data-type identifiers may be encrypted and require decryption before the comparing.

A. In certain embodiments, for example, the intercepting, identifying, requesting, and authorizing may be transparent to all user-application processes (for example all processes (except optionally for processes executing portions of the program code) executing in (non-kernel) application space and having process owners) on the plurality of networked computing devices. In certain embodiments, for example, the intercepting may be performed by a network application programming interface having standard syntax (for example using modified network application programming interface functions that retain standard syntax, for example: bind( ) connect( ) listen( ) UDP sendto( ), UDP bindto( ), and close( ) functions).

B. In certain embodiments, for example, the intercepting, identifying, requesting, and authorizing may be self-executing. In certain further embodiments, for example, the intercepting, identifying, requesting, and authorizing may be automatic. In certain further embodiments, for example, the identifying, requesting, and authorizing may be automatically invoked following the intercepting. In certain embodiments, for example, the intercepting, identifying, and authorizing may occur in the kernel spaces of the plurality of networked computing devices. In certain embodiments, for example, one or more of the intercepting, identifying, and authorizing may occur in application spaces of the plurality of networked computing devices. In certain further embodiments, for example, at least a portion (for example all) of the non-transitory computer-readable storage medium may be resident on a deployment server.

C. In certain further embodiments, for example, at least a portion (for example, all) of the non-transitory computer-readable storage medium may be resident on flash drive. In certain embodiments, for example, the communication management operations may further comprise: preventing all user-application process ports from binding to a portion or all physical interfaces of the plurality of networked computing devices.

D. In certain embodiments, for example, user-application process ports may transmit packets to network security software process ports by loopback interfaces. In certain embodiments, for example, user-application process ports may transmit packets to network security software process ports by TUN/TAP interfaces.

E. In certain embodiments, for example, the network tunnels may be encrypted. In certain embodiments, for example, the network tunnels may be interposed between network security processes (for example middleware) running on separate computing devices. In certain embodiments, for example, the network security processes may manage a segment of the data pathway that is interposed between user-application processes on separate computing devices of the plurality of networked computing devices. In certain embodiments, for example, the network security processes may be conducted on the plural computing devices with user-application processes, wherein the user-application processes may engage in port-to-port communications. In certain embodiments, for example, the network security processes may be resident on different computing devices from the user-application processes. In certain embodiments, for example, the product may be used to configure a software-defined perimeter.

F. In certain embodiments, for example, the tunnel port numbers, computing device identifiers, user-application identifiers, and/or payload data-type identifiers may be obtained from a plurality of configuration files. In certain embodiments, for example, the configuration files may contain private keys for negotiating encryption keys for the network tunnels. In certain embodiments, for example, the configuration files may be binary files. In certain embodiments, for example, the configuration files may be encrypted files. In certain embodiments, for example, the configuration files may be variable length files. In certain embodiments, for example, the configuration files may be read-only files.

G. In certain embodiments, for example, the communication management operations may further comprise: executing operating system commands to identify user-application processes making the connection requests, and verifying that the identified user-application processes are authorized to transmit data to the associated destination port numbers. In certain embodiments, for example, the communication management operations may further comprise thwarting attempts by malware to form network connections, the thwarting comprising: rejecting network connection requests in which identified user-application processes are not authorized to transmit data, for example by reference to a configuration file of authorized port-to-port connections. In certain embodiments, for example, the product may further comprise a configuration file, the configuration file comprising at least two of the following: tunnel port numbers, computing device identifiers, user-application identifiers, and payload data-type identifiers. In certain embodiments, for example, the communication management operations may comprise updating a connection state indicator based on the comparing computing device identifiers, the comparing user-application process identifiers, and/or the comparing payload data-type identifiers. In certain embodiments, for example, the updated connection state indicator may be a field in a list of port-to-port connections.

In certain embodiments, for example, the connection state indicator may be changed from a value indicating that no connection has been established to a value indicating that an open connection state exists for a particular port-to-port connection. In certain embodiments, for example, the connection state indicator may be changed from a value indicating that no connection has been established to a value indicating that a connection is in the process of being formed and that one or more of the computing device identifiers, the user-application process identifiers, and/or the payload data-type identifiers has been successfully exchanged, authenticated and/or authorized. In certain embodiments, for example, the connection state indicator may be changed from a value indicating that an open connection exists, that no connection exists, or that a connection is in the process of being formed to a value indicating that the connection is being declined due to failure to successfully exchange, authenticate and/or authorize one or more of the computing device identifiers, the user-application process identifiers, and/or the payload data-type identifiers.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device executing an operating system (for example a Linux operating system, a Linux-based operating system, a real time operating system, a mini-operating system, an edge device operating system, and/or an open source operating system) to enable and/or cause the computing device to provide communication management operations that can be selectively enabled or disabled, and that can be applied to monitor, provide alerts for, or block unauthorized packet communications, the communication management operations comprising: establishing authorized network tunnels for all (or substantially all, or most or greater than 80% or greater than 90% of the connected or operational physical ports across all the devices within the software defined network) port-to-port network communications among the plurality of networked computing devices, comprising: i) intercepting network connection requests having associated destination port numbers; ii) identifying preconfigured, predefined, pre-established and/or preprovisioned tunnel port numbers, comprising identifying at least one tunnel port number for each associated destination port number of the associated destination port numbers; iii) requesting the negotiation of network tunnels, the requesting comprising sending connection request packets comprising the tunnel port numbers, each one of the network tunnels having a one-to-one correspondence with one of the tunnel port numbers; and iv) authorizing the network tunnels, comprising comparing computing device identifiers, user-application identifiers, and payload data-type identifiers received from the network tunnels with preconfigured, predefined, pre-established and/or preprovisioned authorization codes.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to provide communication management operations that can be selectively enabled or disabled, and that can be applied to monitor, provide alerts for, or block unauthorized packet communications. In certain embodiments, for example, the communication management operations may comprise establishing authorized network tunnels for all port-to-port network communications among the plurality of networked computing devices. In certain embodiments, for example, the establishing may comprise intercepting a network connection request having an associated destination port number. In certain embodiments, for example, the establishing may comprise identifying a preconfigured, predefined, pre-established and/or preprovisioned tunnel port number associated with the destination port number. In certain embodiments, for example, the establishing may comprise requesting the forming of a network tunnel, the forming comprising sending a connection request packet comprising the tunnel port number. In certain embodiments, for example, the establishing may comprise authorizing the network tunnel, comprising comparing a computing device identifier, a user-application identifier, and a payload data-type identifier received from the network tunnel with a preconfigured, predefined, pre-established and/or preprovisioned authorization code.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to provide communication management operations that can be selectively enabled or disabled, and that can be applied to monitor, provide alerts for, or block unauthorized packet communications, the communication management operations comprising: establishing authorized network tunnels for all port-to-port network communications among the plurality of networked computing devices, comprising: i) intercepting a network connection request having an associated destination port number; ii) identifying a preconfigured, predefined, pre-established and/or preprovisioned tunnel port number associated with the destination port number; iii) requesting the forming of a network tunnel, the forming comprising sending a connection request packet comprising the tunnel port number; and iv) authorizing the network tunnel, comprising comparing a computing device identifier, a user-application identifier, and a payload data-type identifier received from the network tunnel with a preconfigured, predefined, pre-established and/or preprovisioned authorization code.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise establishing authorized network tunnels for at least one port-to-port network communication (including, for example, all port-to-port network communications (for example unencrypted or encrypted payload communications) among the plurality of networked computing devices (inclusive, for example, of port-to-port communications according to User Datagram Protocol (UDP) or Transmission Control Protocol (TCP) between end-user application processes over a network)). In certain embodiments, for example, the port-to-port communications may be between user-application processes (inclusive of application processes having a process owner (or user)). In certain embodiments, for example, one or more of the user-application processes may reside in kernel and/or application space. In certain embodiments, for example, the establishing may comprise intercepting network connection requests from source ports (for example the source ports may comprise ports associated with user-application processes), the requests having associated destination port numbers. In certain embodiments, for example, the establishing may comprise verifying that the source ports are authorized to communicate with ports having the associated destination port numbers. In certain embodiments, for example, the establishing may comprise requesting the negotiation of network tunnels, comprising sending connection request packets comprising the associated destination port numbers, each one of the network tunnels having a one-to-one correspondence with one of the associated destination port numbers. In certain embodiments, for example, the establishing may comprise authorizing the network tunnels, comprising comparing computing device identifiers, user-application identifiers, and/or payload data-type identifiers received from the network tunnels with preconfigured, predefined, pre-established and/or preprovisioned authorization codes. In certain further embodiments, for example, the computing device identifiers, user-application identifiers, and/or payload data-type identifiers may be encrypted and require decryption before the comparing.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: establishing authorized network tunnels for all port-to-port network communications among the plurality of networked computing devices, comprising: i) intercepting network connection requests from source ports, the requests having associated destination port numbers; ii) verifying that the source ports are authorized to communicate with ports having the associated destination port numbers; iii) requesting the negotiation of network tunnels, comprising sending connection request packets comprising the associated destination port numbers, each one of the network tunnels having a one-to-one correspondence with one of the associated destination port numbers; and iv) authorizing the network tunnels, comprising comparing computing device identifiers, user-application identifiers, and payload data-type identifiers received from the network tunnels with preconfigured, predefined, pre-established and/or preprovisioned authorization codes.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise establishing authorized encrypted communication pathways for at least one port-to-port network communication (for example all port-to-port communications) among the plurality of networked computing devices. In certain embodiments, for example, the establishing may comprise intercepting network connection requests having associated destination port numbers. In certain embodiments, for example, the establishing may comprise identifying preconfigured, predefined, pre-established and/or preprovisioned encrypted communication port numbers, comprising identifying at least one preconfigured, predefined, pre-established and/or preprovisioned encrypted communication port number for each associated destination port number of the associated destination port numbers. In certain embodiments, for example, the establishing may comprise requesting the negotiation of encrypted communication pathways, the requesting comprising sending connection request packets comprising the encrypted communication port numbers, each one of the encrypted communication pathways having a one-to-one correspondence with one of the encrypted communication port numbers. In certain embodiments, for example, the establishing may comprise authorizing the encrypted communication pathways, comprising comparing computing device identifiers, user-application identifiers, and/or payload data-type identifiers received from the encrypted communication pathways with preconfigured, predefined, pre-established and/or preprovisioned authorization codes.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: establishing authorized encrypted communication pathways for all port-to-port network communications among the plurality of networked computing devices, comprising: i) intercepting network connection requests having associated destination port numbers; ii) identifying preconfigured, predefined, pre-established and/or preprovisioned encrypted communication port numbers, comprising identifying at least one preconfigured, predefined, pre-established and/or preprovisioned encrypted communication port number for each associated destination port number of the associated destination port numbers; iii) requesting the negotiation of encrypted communication pathways, the requesting comprising sending connection request packets comprising the encrypted communication port numbers, each one of the encrypted communication pathways having a one-to-one correspondence with one of the encrypted communication port numbers; and iv) authorizing the encrypted communication pathways, comprising comparing computing device identifiers, user-application identifiers, and payload data-type identifiers received from the encrypted communication pathways with preconfigured, predefined, pre-established and/or preprovisioned authorization codes.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise establishing authorized encrypted communication pathways for at least one port-to-port network communication (including, for example, all port-to-port network communications) among the plurality of networked computing devices. In certain embodiments, for example, the establishing may comprise intercepting network connection requests from source ports (for example source ports that have been opened by and have a predetermined relationship with authorized applications), the requests having associated destination port numbers. In certain embodiments, for example, the establishing may comprise verifying that the source ports are authorized to communicate with ports having the associated destination port numbers. In certain embodiments, for example, the establishing may comprise requesting the negotiation of encrypted communication pathways, the requesting comprising sending connection request packets comprising the associated destination port numbers. In certain embodiments, for example, the establishing may comprise authorizing the encrypted communication pathways, comprising comparing computing device identifiers, user-application identifiers, and/or payload data-type identifiers received from the encrypted communication pathways with preconfigured, predefined, pre-established and/or preprovisioned authorization codes.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: establishing authorized encrypted communication pathways for all port-to-port network communications among the plurality of networked computing devices, comprising: i) intercepting network connection requests from source ports, the requests having associated destination port numbers; ii) verifying that the source ports are authorized to communicate with ports having the associated destination port numbers; iii) requesting the negotiation of encrypted communication pathways, the requesting comprising sending connection request packets comprising the associated destination port numbers; and iv) authorizing the encrypted communication pathways, comprising comparing computing device identifiers, user-application identifiers, and payload data-type identifiers received from the encrypted communication pathways with preconfigured, predefined, pre-established and/or preprovisioned authorization codes.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise establishing authorized network tunnels for all port-to-port network communications among the plurality of networked computing devices. In certain embodiments, for example, the establishing may comprise intercepting a network connection request from a source port, the request having an associated destination port number. In certain embodiments, for example, the establishing may comprise verifying that the source port is authorized to communicate with a port having the associated destination port number. In certain embodiments, for example, the establishing may comprise requesting the negotiation of a network tunnel, comprising sending a connection request packet comprising the associated destination port number. In certain embodiments, for example, the establishing may comprise authorizing the network tunnel, comprising comparing a computing device identifiers, a user-application identifier, and a payload data-type identifier received from the network tunnel with a preconfigured, predefined, pre-established and/or preprovisioned authorization code.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: establishing authorized network tunnels for all port-to-port network communications among the plurality of networked computing devices, comprising: i) intercepting a network connection request from a source port, the request having an associated destination port number; ii) verifying that the source port is authorized to communicate with a port having the associated destination port number; iii) requesting the negotiation of a network tunnel, comprising sending a connection request packet comprising the associated destination port number; and iv) authorizing the network tunnel, comprising comparing a computing device identifiers, a user-application identifier, and a payload data-type identifier received from the network tunnel with a preconfigured, predefined, pre-established and/or preprovisioned authorization code.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise establishing authorized encrypted communication pathways for all port-to-port network communications among the plurality of networked computing devices. In certain embodiments, for example, the establishing may comprise intercepting a network connection request having an associated destination port number. In certain embodiments, for example, the establishing may comprise identifying a preconfigured, predefined, pre-established and/or preprovisioned encrypted communication port number associated with the destination port number. In certain embodiments, for example, the establishing may comprise requesting the negotiation of an encrypted communication pathway, the requesting comprising sending a connection request packet comprising the encrypted communication port number. In certain embodiments, for example, the establishing may comprise authorizing the encrypted communication pathway, comprising comparing a computing device identifier, a user-application identifier, and a payload data-type identifier received from the encrypted communication pathway with a preconfigured, predefined, pre-established and/or preprovisioned authorization code.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: establishing authorized encrypted communication pathways for all port-to-port network communications among the plurality of networked computing devices, comprising: i) intercepting a network connection request having an associated destination port number; ii) identifying a preconfigured, predefined, pre-established and/or preprovisioned encrypted communication port number associated with the destination port number; iii) requesting the negotiation of an encrypted communication pathway, the requesting comprising sending a connection request packet comprising the encrypted communication port number; and iv) authorizing the encrypted communication pathway, comprising comparing a computing device identifier, a user-application identifier, and a payload data-type identifier received from the encrypted communication pathway with a preconfigured, predefined, pre-established and/or preprovisioned authorization code.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise establishing authorized encrypted communication pathways for all port-to-port network communications among the plurality of networked computing devices. In certain embodiments, for example, the establishing may comprise intercepting a network connection request from a source port, the request having an associated destination port number. In certain embodiments, for example, the establishing may comprise verifying that the source port is authorized to communicate with a port having the associated destination port number. In certain embodiments, for example, the establishing may comprise requesting the negotiation of an encrypted communication pathway, the requesting comprising sending a connection request packet comprising the associated destination port number. In certain embodiments, for example, the establishing may comprise authorizing the encrypted communication pathway, comprising comparing a computing device identifier, a user-application identifier, and a payload data-type identifier received from the encrypted communication pathway with a preconfigured, predefined, pre-established and/or preprovisioned authorization code.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: establishing authorized encrypted communication pathways for all port-to-port network communications among the plurality of networked computing devices, comprising: i) intercepting a network connection request from a source port, the request having an associated destination port number; ii) verifying that the source port is authorized to communicate with a port having the associated destination port number; iii) requesting the negotiation of an encrypted communication pathway, the requesting comprising sending a connection request packet comprising the associated destination port number; and iv) authorizing the encrypted communication pathway, comprising comparing a computing device identifier, a user-application identifier, and a payload data-type identifier received from the encrypted communication pathway with a preconfigured, predefined, pre-established and/or preprovisioned authorization code.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: performing communication processing functions on at least a portion of port-to-network communications (including, for example, on all port-to-network communications) of the plurality of computing devices. In certain embodiments, for example, the performing communication processing functions may comprise: receiving data packets (for example from a user-application process via a loopback interface) having payloads and associated destination port numbers (the associated destination port numbers may include, for example, a destination port number associated with a destination port of a network security process). In certain embodiments, for example, the performing communication processing functions may comprise: identifying preconfigured, predefined, pre-established and/or preprovisioned tunnel port numbers, each one of the tunnel port numbers having a one-to-one correspondence with one of the associated destination port numbers. In certain embodiments, for example, the performing communication processing functions may comprise: assembling packet segments, each one of the packet segments comprising one of the payloads, an associated user-application process identifier, and a payload data type descriptor. In certain embodiments, for example, the associated user-application process identifier may comprise a process identifier and/or a process owner. In certain embodiments, for example, the associated user-application process identifier, and a payload data type descriptor may be combined (or concatenated) in a metadata portion of the packet segment. In certain embodiments, for example, the metadata may be encrypted, for example by a single-use cryptographic key. In certain embodiments, for example, the performing communication processing functions may comprise: requesting transmission of network packets through network tunnels (for example at least a different network tunnel for each application-to-application communication of a specified data protocol type), each one of the network packets comprising a tunnel port number of one of the tunnel port numbers and one of the assembled packet segments, each one of the network tunnels having a one-to-one correspondence with one of the tunnel port numbers.

A. In certain embodiments, for example, the receiving, identifying, assembling, and requesting may be transparent to all user-application processes on the plurality of networked computing devices. In certain embodiments, for example, the data packets may be received by loopback interfaces. In certain embodiments, for example, the data packets may be received by kernel read and/or write calls. In certain embodiments, for example, the data packets may be received by TAP/TUN interfaces. In certain embodiments, for example, the receiving may occur in kernel spaces of the plural computing devices. In certain embodiments, for example, the receiving may occur in application spaces of the plural computing devices. In certain embodiments, for example, the received data packet may be received from user-application processes executing in application spaces of the plural computing devices. In certain embodiments, for example, the user-application process identifiers may comprise process commands and process owners (for example process commands and process owners comparable to the output of operating system commands). In certain embodiments, for example, the communication processing functions may further comprise: setting connection status indicators to a non-operative state if more than a fixed number (for example a fixed number such as 10 or 20) of requests to transmit network packets are rejected. In certain embodiments, for example, the communication processing functions may further comprise: setting connection status indicators to a non-operative state if the difference between rejected and successful requests to transmit network packets exceeds a fixed number (for example a fixed number such as 10 or 20).

B. In certain embodiments, for example, the communication processing functions may further comprise: checking a connection status of the network tunnels (for example by checking lists maintained in kernel memory of the plural networked computing devices). In certain embodiments, for example, the communication processing functions may further comprise dropping network packets that are received via one or more network tunnels whose connection status indicators are set to a non-operative state.

C. In certain embodiments, for example, the payloads may be translated into a common format prior to the assembling.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving data packets having payloads and associated destination port numbers; ii) identifying preconfigured, predefined, pre-established and/or preprovisioned tunnel port numbers, each one of the tunnel port numbers having a one-to-one correspondence with one of the associated destination port numbers; iii) assembling packet segments, each one of the packet segments comprising one of the payloads, an associated user-application process identifier, and a payload data type descriptor; and iv) requesting transmission of network packets through network tunnels, each one of the network packets comprising a tunnel port number of one of the tunnel port numbers and one of the assembled packet segments, each one of the network tunnels having a one-to-one correspondence with one of the tunnel port numbers.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on all port-to-network communications of the plurality of computing devices. In certain embodiments, for example, the performing communication processing functions may comprise receiving a data packet having a payload and an associated destination port number. In certain embodiments, for example, the performing communication processing functions may comprise identifying a preconfigured, predefined, pre-established and/or preprovisioned tunnel port number associated with the destination port number. In certain embodiments, for example, the performing communication processing functions may comprise assembling a packet segment, the packet segment comprising the payload, an associated user-application identifier, and a payload data type descriptor. In certain embodiments, for example, the performing communication processing functions may comprise requesting transmission of a network packet through a network tunnel, the network packet comprising the tunnel port number and the assembled packet segment, the network tunnel having a one-to-one correspondence with the tunnel port number.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving a data packet having a payload and an associated destination port number; ii) identifying a preconfigured, predefined, pre-established and/or preprovisioned tunnel port number associated with the destination port number; iii) assembling a packet segment, the packet segment comprising the payload, an associated user-application identifier, and a payload data type descriptor; and iv) requesting transmission of a network packet through a network tunnel, the network packet comprising the tunnel port number and the assembled packet segment, the network tunnel having a one-to-one correspondence with the tunnel port number.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: performing communication processing functions on at least a portion of port-to-network communications (including, for example, on all port-to-network communications) of the plurality of computing devices. In certain embodiments, for example, the performing communication processing functions may comprise receiving data packets from source ports, the data packets having payloads and associated destination port numbers. In certain embodiments, for example, the performing communication processing functions may comprise verifying that the source ports are authorized to communicate with ports having the associated destination port numbers. In certain embodiments, for example, the performing communication processing functions may comprise assembling packet segments, each one of the packet segments comprising one of the payloads, an associated user-application identifier, and a payload data type descriptor. In certain embodiments, for example, the performing communication processing functions may comprise requesting transmission of network packets through network tunnels, each one of the network packets comprising a port number of one of the associated destination port numbers and one of the assembled packet segments, each one of the network tunnels having a one-to-one correspondence with one of the associated destination port numbers.

A. In certain embodiments, for example, the transmitted network packets may be exclusive of the destination port numbers associated with the received data packets. In certain embodiments, for example, the payloads in the transmitted network packets may be re-associated with the destination port numbers only after the transmitted network packets are received at one or more second computing devices of the plurality of networked computing devices, the second computing device different from the computing device. In certain embodiments, for example, the associated destination port numbers may not be transmitted from the computing device to one or more second computing devices of the plurality of networked computing devices. In certain embodiments, for example, the associated destination port numbers may not be transmitted across a network coupled to one or more computing devices of the plurality of networked computing devices. In certain embodiments, for example, the associated destination port numbers may not be transmitted from the computing device via the network tunnels.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through network tunnels, each one of the network packets comprising a port number of one of the associated destination port numbers and one of the assembled packet segments, each one of the network tunnels having a one-to-one correspondence with one of the associated destination port numbers.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: performing communication processing functions on all port-to-network communications of the plurality of computing devices. In certain embodiments, for example, the performing communication processing functions may comprise receiving data packets having payloads and associated destination port numbers. In certain embodiments, for example, the performing communication processing functions may comprise identifying preconfigured, predefined, pre-established and/or preprovisioned port numbers, each one of the port numbers having a one-to-one correspondence with one of the associated destination port numbers. In certain embodiments, for example, the performing communication processing functions may comprise assembling packet segments, each one of the packet segments comprising one of the payloads, an associated user-application identifier, and a payload data type descriptor. In certain embodiments, for example, the performing communication processing functions may comprise requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving data packets having payloads and associated destination port numbers; ii) identifying preconfigured, predefined, pre-established and/or preprovisioned port numbers, each one of the port numbers having a one-to-one correspondence with one of the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations. In certain embodiments, for example, the communication management operations may comprise performing communication processing functions on all port-to-network communications of the plurality of computing devices. In certain embodiments, for example, the performing communication processing functions may comprise receiving data packets, the data packets comprising messages and associated destination port numbers. In certain embodiments, for example, the performing communication processing functions may comprise identifying preconfigured, predefined, pre-established and/or preprovisioned port numbers, each one of the port numbers having a one-to-one correspondence with one of the associated destination port numbers. In certain embodiments, for example, the performing communication processing functions may comprise assembling packet segments, each one of the packet segments comprising at least a portion of one of the messages, an associated user-application identifier, and a payload data type descriptor. In certain embodiments, for example, the performing communication processing functions may comprise requesting transmission of network packets through encrypted communication pathways, each one of the network packets comprising a port number of one of the port numbers and one of the assembled packet segments, each one of the encrypted communication pathways having a one-to-one correspondence with one of the port numbers.

A. In certain embodiments, for example, one or more of the messages may have a size exceeding a maximum transfer unit.

B. In certain embodiments, for example, one of the packet segments may comprise a portion of one of the messages, the one of the messages having a size exceeding a maximum transfer unit and the one of the packet segments having a total payload, the total payload having a size not exceeding the maximum transfer unit or another maximum transfer unit.

Certain embodiments may provide, for example product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving data packets, the data packets comprising messages and associated destination port numbers; ii) identifying preconfigured, predefined, pre-established and/or preprovisioned port numbers, each one of the port numbers having a one-to-one correspondence with one of the associated destination port numbers; iii) assembling packet segments, each one of the packet segments comprising at least a portion of one of the messages, an associated user-application identifier, and a payload data type descriptor; and iv) requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a product for managing communications of a plurality of networked computing devices. In certain embodiments, for example, the product may comprise a non-transitory computer-readable storage medium having computer-readable program code embodied therein, the computer-readable program code executable (or compilable, linkable, and/or loadable to be executable) by a computing device to enable and/or cause the computing device to perform communication management operations. In certain embodiments, for example, the communication management operations may comprise performing communication processing functions on all port-to-network communications of the plurality of computing devices. In certain embodiments, for example, the performing communication processing functions may comprise receiving data packets, the data packets comprising messages and associated destination port numbers, the messages comprising user-application identifiers and payload data type descriptors. In certain embodiments, for example, the performing communication processing functions may comprise identifying preconfigured, predefined, pre-established and/or preprovisioned port numbers, each one of the port numbers having a one-to-one correspondence with one of the associated destination port numbers. In certain embodiments, for example, the performing communication processing functions may comprise assembling packet segments, each one of the packet segments comprising at least a portion of one of the messages, the at least a portion of one of the messages comprising one of the user-application identifiers and one of the payload data type descriptors. In certain embodiments, for example, the performing communication processing functions may comprise requesting transmission of network packets through encrypted communication pathways, each one of the network packets comprising a port number of one of the port numbers and one of the assembled packet segments, each one of the encrypted communication pathways having a one-to-one correspondence with one of the port numbers.

A. In certain embodiments, for example, the user-application identifiers may be spaced apart from one another and the payload data type descriptors are spaced apart from one another.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving data packets, the data packets comprising messages and associated destination port numbers, the messages comprising user-application identifiers and payload data type descriptors; ii) identifying preconfigured, predefined, pre-established and/or preprovisioned port numbers, each one of the port numbers having a one-to-one correspondence with one of the associated destination port numbers; iii) assembling packet segments, each one of the packet segments comprising at least a portion of one of the messages, the at least a portion of one of the messages comprising one of the user-application identifiers and one of the payload data type descriptors; and iv) requesting transmission of network packets through encrypted communication pathways, each one of the network packets comprising a port number of one of the port numbers and one of the assembled packet segments, each one of the encrypted communication pathways having a one-to-one correspondence with one of the port numbers.

A. In certain embodiments, for example, any given message to be sent across a network may have a size exceeding a maximum transfer unit (for example a maximum transfer unit of 1500 bytes), requiring the message to be split into plural payloads for transport across the network, each of the plural payloads having a size of no greater than the maximum transfer unit, for insertion into plural network packets. In certain further embodiments, for example, the computing processing functions may comprise inserting plural metadata into the message, whereby each one of the plural payloads contains one of the plural metadata. In certain embodiments, for example, the plural metadata may be positioned at predetermined locations in the plural payloads. In certain embodiments, for example, two or more of the plural metadata may be spaced a predetermined distance in the any given message. In certain embodiments, for example, each one of the plural metadata may comprise one of the user-application identifiers and one of the payload data type descriptors.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on at least a portion of port-to-network communications (including, for example, on all port-to-network communications) of the plurality of computing devices. In certain embodiments, for example, the performing communication processing functions may comprise receiving data packets from source ports, the data packets having payloads and associated destination port numbers. In certain embodiments, for example, the performing communication processing functions may comprise verifying that the source ports are authorized to communicate with ports having the associated destination port numbers. In certain embodiments, for example, the performing communication processing functions may comprise assembling packet segments, each one of the packet segments comprising one of the payloads, an associated user-application identifier, and a payload data type descriptor. In certain embodiments, for example, the performing communication processing functions may comprise requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

A. In certain embodiments, for example, the transmitted network packets may be exclusive of the destination port numbers associated with the received data packets. In certain embodiments, for example, the payloads in the transmitted network packets may be re-associated with the destination port numbers only after the transmitted network packets are received at one or more second computing devices of the plurality of networked computing devices, the second computing device different from the computing device. In certain embodiments, for example, the associated destination port numbers may not be transmitted from the computing device to one or more second computing devices of the plurality of networked computing devices. In certain embodiments, for example, the associated destination port numbers may not be transmitted across a network coupled to one or more computing devices of the plurality of networked computing devices. In certain embodiments, for example, the associated destination port numbers may not be transmitted from the computing device via the encrypted communication pathways.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on all port-to-network communications of the plurality of computing devices, the performing communication processing functions comprising. In certain embodiments, for example, the communication processing functions may comprise receiving data packets from source ports, the data packets having payloads and associated destination port numbers. In certain embodiments, for example, the communication processing functions may comprise verifying that the source ports are authorized to communicate with ports having the associated destination port numbers. In certain embodiments, for example, the communication processing functions may comprise assembling packet segments, each one of the packet segments comprising one of the payloads, an associated user-application identifier, and a payload data type descriptor. In certain embodiments, for example, the communication processing functions may comprise requesting transmission of network packets through network tunnels, each one of the network packets comprising a port number of one of the associated destination port numbers and one of the assembled packet segments, each one of the network tunnels having a one-to-one correspondence with one of the associated destination port numbers.

A. In certain embodiments, for example, the transmitted network packets may be exclusive of the destination port numbers associated with the received data packets. In certain embodiments, for example, the payloads in the transmitted network packets may be re-associated with the destination port numbers only after the transmitted network packets are received at one or more second computing devices of the plurality of networked computing devices, the second computing device different from the computing device. In certain embodiments, for example, the associated destination port numbers may not be transmitted from the computing device to one or more second computing devices of the plurality of networked computing devices. In certain embodiments, for example, the associated destination port numbers may not be transmitted across a network coupled to one or more computing devices of the plurality of networked computing devices. In certain embodiments, for example, the associated destination port numbers may not be transmitted from the computing device via the network tunnels.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through network tunnels, each one of the network packets comprising a port number of one of the associated destination port numbers and one of the assembled packet segments, each one of the network tunnels having a one-to-one correspondence with one of the associated destination port numbers.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations, the communication management operations comprising: performing communication processing functions on all port-to-network communications of the plurality of computing devices. In certain embodiments, for example, the performing communication processing functions may comprise receiving a data packet from a source port, the data packet having a payload and an associated destination port number. In certain embodiments, for example, the performing communication processing functions may comprise verifying that the source port is authorized to communicate with a port having the associated destination port number. In certain embodiments, for example, the performing communication processing functions may comprise assembling a packet segment, the packet segment comprising the payload, an associated user-application identifier, and a payload data type descriptor. In certain embodiments, for example, the performing communication processing functions may comprise requesting transmission of a network packet through a network tunnel, the network packet comprising the associated destination port numbers and the assembled packet segment, the network tunnels having a one-to-one correspondence with the associated destination port number.

A. In certain embodiments, for example, the transmitted network packet may be exclusive of the destination port number associated with the received data packet. In certain embodiments, for example, the payload in the transmitted network packet may be re-associated with the destination port number only after the transmitted network packet is received at a second computing devices of the plurality of networked computing devices, the second computing device different from the computing device. In certain embodiments, for example, the associated destination port number may not be transmitted from the computing device to the second computing device of the plurality of networked computing devices. In certain embodiments, for example, the associated destination port number may not be transmitted across a network coupled to one or more computing devices of the plurality of networked computing devices. In certain embodiments, for example, the associated destination port number may not be transmitted from the computing device via the network tunnel.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving a data packet from a source port, the data packet having a payload and an associated destination port number; ii) verifying that the source port is authorized to communicate with a port having the associated destination port number; iii) assembling a packet segment, the packet segment comprising the payload, an associated user-application identifier, and a payload data type descriptor, and iv) requesting transmission of a network packet through a network tunnel, the network packet comprising the associated destination port numbers and the assembled packet segment, the network tunnels having a one-to-one correspondence with the associated destination port number.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on all port-to-network communications of the plurality of computing devices. In certain embodiments, for example, the performing communication processing functions may comprise receiving data packets having payloads and associated destination port numbers. In certain embodiments, for example, the performing communication processing functions may comprise identifying preconfigured, predefined, pre-established and/or preprovisioned port numbers, each one of the port numbers having a one-to-one correspondence with one of the associated destination port numbers. In certain embodiments, for example, the performing communication processing functions may comprise assembling packet segments, each one of the packet segments comprising one of the payloads, an associated user-application identifier, and a payload data type descriptor. In certain embodiments, for example, the performing communication processing functions may comprise requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving data packets having payloads and associated destination port numbers; ii) identifying preconfigured, predefined, pre-established and/or preprovisioned port numbers, each one of the port numbers having a one-to-one correspondence with one of the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on all port-to-network communications of the plurality of computing devices. In certain embodiments, for example, the performing communication processing functions may comprise receiving a data packet having a payload and an associated destination port number. In certain embodiments, for example, the performing communication processing functions may comprise identifying a preconfigured, predefined, pre-established and/or preprovisioned port number, the port number having a one-to-one correspondence with the associated destination port number. In certain embodiments, for example, the performing communication processing functions may comprise assembling a packet segment, the packet segment comprising the payload, an associated user-application identifier, and a payload data type descriptor. In certain embodiments, for example, the performing communication processing functions may comprise requesting encrypted communication over an encrypted communication pathway of a network packet, the network packets comprising the port number and the assembled packet segment, the encrypted communication pathway having a one-to-one correspondence with the port number.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving a data packet having a payload and an associated destination port number; ii) identifying a preconfigured, predefined, pre-established and/or preprovisioned port number, the port number having a one-to-one correspondence with the associated destination port number; iii) assembling a packet segment, the packet segment comprising the payload, an associated user-application identifier, and a payload data type descriptor; and iv) requesting encrypted communication over an encrypted communication pathway of a network packet, the network packets comprising the port number and the assembled packet segment, the encrypted communication pathway having a one-to-one correspondence with the port number.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on all port-to-network communications of the plurality of computing devices. In certain embodiments, for example, the performing communication processing functions may comprise receiving data packets from source ports, the data packets having payloads and associated destination port numbers. In certain embodiments, for example, the performing communication processing functions may comprise verifying that the source ports are authorized to communicate with ports having the associated destination port numbers. In certain embodiments, for example, the performing communication processing functions may comprise assembling packet segments, each one of the packet segments comprising one of the payloads, an associated user-application identifier, and a payload data type descriptor. In certain embodiments, for example, the performing communication processing functions may comprise requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on all port-to-network communications of the plurality of computing devices. In certain embodiments, for example, the performing communication processing functions may comprise receiving a data packet from a source port, the data packet having a payload and an associated destination port number. In certain embodiments, for example, the performing communication processing functions may comprise verifying that the source port is authorized to communicate with a port having the associated destination port number. In certain embodiments, for example, the performing communication processing functions may comprise assembling a packet segment, the packet segments comprising the payload, an associated user-application identifier, and a payload data type descriptor. In certain embodiments, for example, the performing communication processing functions may comprise requesting transmission of a network packet through an encrypted communication pathway, the network packets comprising the associated destination port number and the assembled packet segment, the encrypted communication pathway having a one-to-one correspondence with the associated destination port number.

A. In certain embodiments, for example, the transmitted network packet may be exclusive of the destination port number associated with the received data packet. In certain embodiments, for example, the payload in the transmitted network packet may be re-associated with the destination port number only after the transmitted network packet is received at a second computing devices of the plurality of networked computing devices, the second computing device different from the computing device. In certain embodiments, for example, the associated destination port number may not be transmitted from the computing device to the second computing device of the plurality of networked computing devices. In certain embodiments, for example, the associated destination port number may not be transmitted across a network coupled to one or more computing devices of the plurality of networked computing devices. In certain embodiments, for example, the associated destination port number may not be transmitted from the computing device via the network tunnel.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all port-to-network communications of the plurality of computing devices, the performing communication processing functions comprising: i) receiving a data packet from a source port, the data packet having a payload and an associated destination port number; ii) verifying that the source port is authorized to communicate with a port having the associated destination port number; iii) assembling a packet segment, the packet segments comprising the payload, an associated user-application identifier, and a payload data type descriptor; and iv) requesting transmission of a network packet through an encrypted communication pathway, the network packets comprising the associated destination port number and the assembled packet segment, the encrypted communication pathway having a one-to-one correspondence with the associated destination port number.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: performing communication processing functions on at least a portion of network-to-port communications (including, for example, on all network-to-port communications) received by the plurality of computing devices. In certain embodiments, for example, the performing communication processing functions may comprise obtaining tunnel port numbers, metadata (for example metadata encrypted using a single-use cryptographic key), and payloads associated with network packets. In certain embodiments, for example, the performing communication processing functions may comprise identifying preconfigured, predefined, pre-established and/or preprovisioned destination port numbers and preconfigured, predefined, pre-established and/or preprovisioned authorization codes associated with the tunnel port numbers, each one of the authorization codes comprising a preconfigured, predefined, pre-established and/or preprovisioned user-application process identifier and a preconfigured, predefined, pre-established and/or preprovisioned payload data-type identifier associated with one of the obtained tunnel port numbers. In certain embodiments, for example, the performing communication processing functions may comprise authorizing the network packets, comprising: comparing (for example comparing in application spaces or kernel spaces of the plurality of computing devices) metadata with the authorization codes. In certain embodiments, for example, the performing communication processing functions may comprise requesting transmission (for example across loopback interfaces, by TUN/TAP interfaces, or by kernel read and/or write calls) of payloads from the authorized network packets to destinations referenced by the destination port numbers. In certain embodiments, for example, the payloads may be passed to the destination port numbers by one or more loopback interfaces.

A. In certain embodiments, for example, the obtaining, identifying, authorizing, and requesting may be transparent to all user-application processes on the plurality of networked computing devices (for example by employing modified network application programming interface functions (for example in a modified operating system) while maintaining standard syntax). In certain embodiments, for example, the obtaining, identifying, authorizing, and requesting may be self-executing and/or automatic (for example requiring no human intervention, no interruption in computer execution other than ordinary, temporary process scheduling).

B. In certain embodiments, for example, the communication processing functions may be performed at 95% of wire speed or greater and less than 10% of the processor load may be committed to network communications. In certain embodiments, for example, the destinations may comprise user-application processes. In certain embodiments, for example, the program code may be middleware positioned between the network and the destinations referenced by the destination port number. In certain embodiments, for example, the communication processing functions may further comprise: dropping network packets if they are not authorized following the comparing (for example dropping network packets for which the metadata does not match expected values based on the authorization codes).

C. In certain embodiments, for example, the communication processing functions may further comprise: setting connection status indicators to a non-operative state if more than a fixed number of network packets are not authorized following the comparing. In certain embodiments, for example, the communication processing functions may further comprise: checking, the checking at least partially performed in kernels of the plural networked computing devices, a connection status of the network. In certain embodiments, for example, the communication processing functions may further comprise: dropping network packets that are received via one or more network tunnels whose connection status indicators are set to a non-operative state.

Certain embodiments may comprise, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all network-to-port communications received by the plurality of computing devices, the performing communication processing functions comprising: i) obtaining tunnel port numbers, metadata, and payloads associated with network packets; ii) identifying preconfigured, predefined, pre-established and/or preprovisioned destination port numbers and preconfigured, predefined, pre-established and/or preprovisioned authorization codes associated with the tunnel port numbers, each one of the authorization codes comprising a preconfigured, predefined, pre-established and/or preprovisioned user-application identifier and a preconfigured, predefined, pre-established and/or preprovisioned payload data-type identifier associated with one of the obtained tunnel port numbers; iii) authorizing the network packets, comprising: comparing at least a portion of the metadata with the authorization codes; and iv) requesting transmission of payloads from the authorized network packets to destinations referenced by the destination port numbers.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on all network-to-port communications received by the plurality of computing devices. In certain embodiments, for example, the performing communication processing functions may comprise obtaining a port number, metadata, and a payload associated with a network packet received by the networked computing device. In certain embodiments, for example, the performing communication processing functions may comprise identifying a preconfigured, predefined, pre-established and/or preprovisioned destination port number and a preconfigured, predefined, pre-established and/or preprovisioned authorization code associated with the obtained port number, the authorization code comprising a preconfigured, predefined, pre-established and/or preprovisioned user-application identifier and a preconfigured, predefined, pre-established and/or preprovisioned payload data-type identifier associated with the obtained port number. In certain embodiments, for example, the performing communication processing functions may comprise authorizing the network packet, comprising: comparing the metadata with the authorization code. In certain embodiments, for example, the performing communication processing functions may comprise requesting transmission of the payload to a destination referenced by the destination port number.

Certain embodiments may comprise, for example, a computer program product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all network-to-port communications received by the plurality of computing devices, the performing communication processing functions comprising: i) obtaining a port number, metadata, and a payload associated with a network packet received by the networked computing device; ii) identifying a preconfigured, predefined, pre-established and/or preprovisioned destination port number and a preconfigured, predefined, pre-established and/or preprovisioned authorization code associated with the obtained port number, the authorization code comprising a preconfigured, predefined, pre-established and/or preprovisioned user-application identifier and a preconfigured, predefined, pre-established and/or preprovisioned payload data-type identifier associated with the obtained port number; iii) authorizing the network packet, comprising: comparing the metadata with the authorization code; and iv) requesting transmission of the payload to a destination referenced by the destination port number.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: performing communication processing functions on at least a portion of network-to-port communications (including, for example, on all network-to-port communications) received by the plurality of computing devices. In certain embodiments, for example, the performing communication processing functions may comprise obtaining destination port numbers, metadata, and payloads associated with network packets. In certain embodiments, for example, the performing communication processing functions may comprise identifying preconfigured, predefined, pre-established and/or preprovisioned authorization codes associated with the destination port numbers, each one of the authorization codes comprising a preconfigured, predefined, pre-established and/or preprovisioned user-application identifier and a preconfigured, predefined, pre-established and/or preprovisioned payload data-type identifier associated with one of the destination port numbers. In certain embodiments, for example, the performing communication processing functions may comprise authorizing the network packets, comprising: comparing at least a portion of the metadata with the authorization codes. In certain embodiments, for example, the performing communication processing functions may comprise requesting transmission of payloads from the authorized network packets to destinations referenced by the destination port numbers.

Certain embodiments may provide, for example, a product for managing communications of a plurality of networked computing devices, the product comprising a non-transitory computer-readable storage medium having computer-readable program code embodied therein, the computer-readable program code executable by a computing device to enable and/or cause the computing device to perform communication management operations, the communication management operations comprising: performing communication processing functions on all network-to-port communications received by the plurality of computing devices, the performing communication processing functions comprising: i) obtaining destination port numbers, metadata, and payloads associated with network packets; ii) identifying preconfigured, predefined, pre-established and/or preprovisioned authorization codes associated with the destination port numbers, each one of the authorization codes comprising a preconfigured, predefined, pre-established and/or preprovisioned user-application identifier and a preconfigured, predefined, pre-established and/or preprovisioned payload data-type identifier associated with one of the destination port numbers; iii) authorizing the network packets, comprising: comparing at least a portion of the metadata with the authorization codes; and iv) requesting transmission of payloads from the authorized network packets to destinations referenced by the destination port numbers.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on all network-to-port communications received by the plurality of computing devices. In certain embodiments, for example, the performing communication processing functions may comprise obtaining a port number, metadata, and a payload associated with a network packet received by the networked computing device. In certain embodiments, for example, the performing communication processing functions may comprise identifying a preconfigured, predefined, pre-established and/or preprovisioned destination port number and a preconfigured, predefined, pre-established and/or preprovisioned authorization code associated with the obtained port number, the authorization code comprising a preconfigured, predefined, pre-established and/or preprovisioned user-application identifier and a preconfigured, predefined, pre-established and/or preprovisioned payload data-type identifier associated with the obtained port number. In certain embodiments, for example, the performing communication processing functions may comprise authorizing the network packet, comprising: comparing the metadata with the authorization code. In certain embodiments, for example, the performing communication processing functions may comprise requesting transmission of the payload to a destination referenced by the preconfigured, predefined, pre-established and/or preprovisioned destination port number.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all network-to-port communications received by the plurality of computing devices, the performing communication processing functions comprising: i) obtaining a port number, metadata, and a payload associated with a network packet received by the networked computing device; ii) identifying a preconfigured, predefined, pre-established and/or preprovisioned destination port number and a preconfigured, predefined, pre-established and/or preprovisioned authorization code associated with the obtained port number, the authorization code comprising a preconfigured, predefined, pre-established and/or preprovisioned user-application identifier and a preconfigured, predefined, pre-established and/or preprovisioned payload data-type identifier associated with the obtained port number; iii) authorizing the network packet, comprising: comparing the metadata with the authorization code; and iv) requesting transmission of the payload to a destination referenced by the preconfigured, predefined, pre-established and/or preprovisioned destination port number.

Certain embodiments may provide, for example, a product for managing communications of a plurality of networked computing devices. In certain embodiments, for example, the product may comprise a non-transitory computer-readable storage medium having a plurality of computer-readable program code embodied therein, the plurality of computer-readable program code for distributed execution across the plurality of networked computing devices to cooperatively enable and/or cause the plurality of networked computing devices to perform communication management operations. In certain embodiments, for example, the communication management operations may comprise negotiating, on a first computing device, a first data pathway between a first user-application and a first network security program code of the plurality of computer-readable program code. In certain embodiments, for example, the communication management operations may comprise negotiating, on a second computing device, a second data pathway between a second network security program of the plurality of computer-readable program code and a second user-application. In certain embodiments, for example, the communication management operations may comprise negotiating a third data pathway between the first network security program and the second network security program, the third data pathway comprising an encrypted network tunnel, each of the first data pathway, second data pathway, and third data pathway participate to form at least a part of a dedicated data pathway for exclusively communicating data from a first port of the first user-application to a second port of the second user-application.

Certain embodiments may provide, for example, a product for managing communications of a plurality of networked computing devices, the product comprising a non-transitory computer-readable storage medium having a plurality of computer-readable program code embodied therein, the plurality of computer-readable program code for distributed execution across the plurality of networked computing devices to cooperatively enable and/or cause the plurality of networked computing devices to perform communication management operations, the communication management operations comprising: i) negotiating, on a first computing device, a first data pathway between a first user-application and a first network security program code of the plurality of computer-readable program code; ii) negotiating, on a second computing device, a second data pathway between a second network security program of the plurality of computer-readable program code and a second user-application; and iii) negotiating a third data pathway between the first network security program and the second network security program, the third data pathway comprising an encrypted network tunnel, each of the first data pathway, second data pathway, and third data pathway participate to form at least a part of a dedicated data pathway for exclusively communicating data from a first port of the first user-application to a second port of the second user-application.

Certain embodiments may provide, for example, a product for managing communications of a plurality of networked computing devices. In certain embodiments, for example, the product may comprise a non-transitory computer-readable storage medium having a plurality of computer-readable program code embodied therein, the plurality of computer-readable program code for distributed execution across the plurality of networked computing devices to cooperatively enable and/or cause the plurality of networked computing devices to perform communication management operations. In certain embodiments, for example, the communication management operations may comprise negotiating, on a first computing device, a first data pathway between a first user-application and a first network security program of the plural security programs. In certain embodiments, for example, the communication management operations may comprise negotiating, on a second computing device, a second data pathway between a second network security program of the plural security programs and a second user-application. In certain embodiments, for example, the communication management operations may comprise negotiating a third data pathway between the first network security program and the second network security program, the third data pathway comprising an encrypted communication pathway, each of the first data pathway, second data pathway, and third data pathway exclusive to a dedicated data pathway for communicating data from a first port of the first user-application to a second port of the second user-application.

Certain embodiments may provide, for example, a product for managing communications of a plurality of networked computing devices, the product comprising a non-transitory computer-readable storage medium having a plurality of computer-readable program code embodied therein, the plurality of computer-readable program code for distributed execution across the plurality of networked computing devices to cooperatively enable and/or cause the plurality of networked computing devices to perform communication management operations, the communication management operations comprising: i) negotiating, on a first computing device, a first data pathway between a first user-application and a first network security program of the plural security programs; ii) negotiating, on a second computing device, a second data pathway between a second network security program of the plural security programs and a second user-application; iii) negotiating a third data pathway between the first network security program and the second network security program, the third data pathway comprising an encrypted communication pathway, each of the first data pathway, second data pathway, and third data pathway exclusive to a dedicated data pathway for communicating data from a first port of the first user-application to a second port of the second user-application.

Certain embodiments may provide, for example, a secured system, comprising: i) a first node networked with a second node, the first node hosting a first application program, the second node hosting a second application program; and ii) plural network security programs cooperatively configured according to plural configuration files to negotiate one or plural dedicated data pathways for all communications between the first application program and the second application program, each of the one or plural data pathways comprising: an encrypted network tunnel extending from a first network security program of the plural network security programs to a second network security program of the plural network security programs, the first network security program and the second network security program interposed between the first application program and the second application program; each of the plural configuration files comprising: a) one or plural destination port numbers associated with the second application program; b) one or plural destination port numbers associated with the second network security program, comprising at least one port number for each one of the one or plural destination port numbers associated with the second application program; c) one or plural first user-application identifiers associated with the first application program; d) one or plural second user-application identifiers associated with the second application program; e) one or plural data type identifiers; and f) node identification codes for the first node and the second node, processor, or computing device.

Certain embodiments may provide, for example, a secured system, comprising: i) a first node networked with a second node, the first node hosting a first application program, the second node hosting a second application program; and ii) plural network security programs cooperatively configured according to plural configuration files to negotiate one or plural dedicated data pathways for all communications between the first application program and the second application program, each of the one or plural data pathways comprising: an encrypted communication pathway extending from a first network security program of the plural network security programs to a second network security program of the plural network security programs, the first network security program and the second network security program interposed between the first application program and the second application program; each of the plural configuration files comprising: a) one or plural destination port numbers associated with the second application program; b) one or plural first user-application identifiers associated with the first application program; c) one or plural second user-application identifiers associated with the second application program; d) one or plural data type identifiers; and e) node identification codes for the first node and the second node, processor, or computing device.

Certain embodiments may provide, for example, a secured system, comprising: i) a first node networked with a second node, a) the first node hosting a first application program, a first configuration file and a first network security program associated with the first configuration file; and b) the second node hosting a second application program, a second configuration file, and a second network security program associated with the second configuration file; and ii) the first and second network security programs cooperatively configured to negotiate one or plural dedicated data pathways for all communications between the first application program and the second application program, a) each of the one or plural data pathways comprising the first network security program and the second network security program interposed between the first application program and the second application program; and b) each of the one or plural data pathways comprising: an encrypted network tunnel between the first network security program and the second network security program, each of the plural configuration files comprising at least one of the following: a) one or plural destination port numbers associated with the second application program; b) one or plural destination port numbers associated with the second network security program, comprising at least one port number for each one of the one or plural destination port numbers associated with the second application program; c) one or plural first user-application identifiers associated with the first application program; d) one or plural second user-application identifiers associated with the second application program; e) one or plural data type identifiers; and f) node identification codes for the first node and the second node, processor, or computing device.

Certain embodiments may provide, for example, a secured system, comprising: i) a first node networked with a second node, a) the first node hosting a first application program, a first configuration file and a first network security program associated with the first configuration file; and b) the second node hosting a second application program, a second configuration file, and a second network security program associated with the second configuration file; and ii) the first and second network security programs cooperatively configured to negotiate one or plural dedicated data pathways for all communications between the first application program and the second application program, a) each of the one or plural data pathways comprising the first network security program and the second network security program interposed between the first application program and the second application program; and b) each of the one or plural data pathways comprising: an encrypted data pathway between the first network security program and the second network security program, each of the plural configuration files comprising at least one of the following: a) one or plural destination port numbers associated with the second application program; b) one or plural first user-application identifiers associated with the first application program; c) one or plural second user-application identifiers associated with the second application program; d) one or plural data type identifiers; and e) node identification codes for the first node and the second node, processor, or computing device.

Certain embodiments may provide, for example, a product for managing communications in a cloud, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations. In certain embodiments, for example, the communication management operations may comprise performing communication processing functions on all network-to-port communications received by a virtual machine. In certain embodiments, for example, the performing communication processing functions may comprise obtaining port numbers, metadata, and payloads associated with network packets. In certain embodiments, for example, the performing communication processing functions may comprise identifying predefined destination port numbers and predefined authorization codes associated with the obtained port numbers, each one of the predefined authorization codes comprising a predefined user-application identifier and a predefined payload data-type identifier associated with one of the obtained port numbers. In certain embodiments, for example, the performing communication processing functions may comprise authorizing the network packets, comprising: comparing at least a portion of the metadata with the predefined authorization codes. In certain embodiments, for example, the performing communication processing functions may comprise requesting transmission of payloads from the authorized network packets to cloud resources referenced by the predefined destination port numbers.

Certain embodiments may provide, for example, a product for managing communications in a cloud, the product comprising a non-transitory computer-readable storage medium having computer-readable program code embodied therein, the computer-readable program code executable (or compilable, linkable, and/or loadable to be executable) by a computing device to enable and/or cause the computing device to perform communication management operations, the communication management operations comprising: performing communication processing functions on all network-to-port communications received by a virtual machine, the performing communication processing functions comprising: i) obtaining port numbers, metadata, and payloads associated with network packets; ii) identifying predefined destination port numbers and predefined authorization codes associated with the obtained port numbers, each one of the predefined authorization codes comprising a predefined user-application identifier and a predefined payload data-type identifier associated with one of the obtained port numbers; iii) authorizing the network packets, comprising: comparing at least a portion of the metadata with the predefined authorization codes; and iv) requesting transmission of payloads from the authorized network packets to cloud resources referenced by the predefined destination port numbers.

Certain embodiments may provide, for example, a method for managing communications. In certain embodiments, for example, the method may comprise intercepting network connection requests (for example by network application programming interfaces) having associated destination port numbers. In certain embodiments, for example, the method may comprise identifying preconfigured, predefined, pre-established and/or preprovisioned tunnel port numbers (for example predefined tunnel port numbers associated with servers), comprising identifying at least one (for example, one) preconfigured, predefined, pre-established and/or pre-provisioned tunnel port number for each associated destination port number of the associated destination port numbers. In certain embodiments, for example, the method may comprise requesting the negotiation of network tunnels, the requesting comprising sending connection request packets comprising the tunnel port numbers (and also, for example, cipher suite parameters), each one of the network tunnels having a one-to-one correspondence with one of the tunnel port numbers. In certain embodiments, for example, the method may comprise authorizing the network tunnels, comprising comparing computing device identifiers, user-application identifiers (for example user-application identifiers derived from application process identifiers and/or application process owners, together or in parts), and payload data-type identifiers received from the network tunnels with preconfigured, predefined, pre-established and/or pre-provisioned authorization codes. In certain further embodiments, for example, the computing device identifiers, user-application identifiers, and/or payload data-type identifiers may be encrypted and require decryption before the comparing.

Certain embodiments may provide, for example, a method for managing communications, comprising: i) intercepting network connection requests having associated destination port numbers; ii) identifying preconfigured, predefined, pre-established and/or preprovisioned tunnel port numbers, comprising identifying at least one tunnel port number for each associated destination port number of the associated destination port numbers; iii) requesting the negotiation of network tunnels, the requesting comprising sending connection request packets comprising the tunnel port numbers, each one of the network tunnels having a one-to-one correspondence with one of the tunnel port numbers; and iv) authorizing the network tunnels, comprising comparing computing device identifiers, user-application identifiers, and payload data-type identifiers received from the network tunnels with preconfigured, predefined, pre-established and/or preprovisioned authorization codes.

Certain embodiments may provide, for example, a method for managing communications. In certain embodiments, for example, the method may comprise intercepting a network connection request having an associated destination port number. In certain embodiments, for example, the method may comprise identifying a preconfigured, predefined, pre-established and/or preprovisioned tunnel port number associated with the destination port number. In certain embodiments, for example, the method may comprise requesting the forming of a network tunnel, the forming comprising sending a connection request packet comprising the tunnel port number. In certain embodiments, for example, the method may comprise authorizing the network tunnel, comprising comparing a computing device identifier, a user-application identifier, and a payload data-type identifier received from the network tunnel with a preconfigured, predefined, pre-established and/or preprovisioned authorization code.

Certain embodiments may provide, for example, a method for managing communications, comprising: i) intercepting a network connection request having an associated destination port number; ii) identifying a preconfigured, predefined, pre-established and/or preprovisioned tunnel port number associated with the destination port number; iii) requesting the forming of a network tunnel, the forming comprising sending a connection request packet comprising the tunnel port number; and iv) authorizing the network tunnel, comprising comparing a computing device identifier, a user-application identifier, and a payload data-type identifier received from the network tunnel with a preconfigured, predefined, pre-established and/or preprovisioned authorization code.

Certain embodiments may provide, for example, a method for managing communications. In certain embodiments, for example, the method may comprise intercepting network connection requests from source ports (for example the source ports may comprise ports associated with user-application processes), the requests having associated destination port numbers. In certain embodiments, for example, the method may comprise verifying that the source ports are authorized to communicate with ports having the associated destination port numbers. In certain embodiments, for example, the method may comprise requesting the negotiation of network tunnels, comprising sending connection request packets comprising the associated destination port numbers, each one of the network tunnels having a one-to-one correspondence with one of the associated destination port numbers. In certain embodiments, for example, the method may comprise authorizing the network tunnels, comprising comparing computing device identifiers, user-application identifiers, and/or payload data-type identifiers received from the network tunnels with preconfigured, predefined, pre-established and/or preprovisioned authorization codes. In certain further embodiments, for example, the computing device identifiers, user-application identifiers, and/or payload data-type identifiers may be encrypted and require decryption before the comparing.

Certain embodiments may provide, for example, a method for managing communications, comprising: i) intercepting network connection requests from source ports, the requests having associated destination port numbers; ii) verifying that the source ports are authorized to communicate with ports having the associated destination port numbers; iii) requesting the negotiation of network tunnels, comprising sending connection request packets comprising the associated destination port numbers, each one of the network tunnels having a one-to-one correspondence with one of the associated destination port numbers; and iv) authorizing the network tunnels, comprising comparing computing device identifiers, user-application identifiers, and payload data-type identifiers received from the network tunnels with preconfigured, predefined, pre-established and/or preprovisioned authorization codes.

Certain embodiments may provide, for example, a method for managing communications. In certain embodiments, for example, the method may comprise intercepting network connection requests having associated destination port numbers. In certain embodiments, for example, the establishing may comprise identifying preconfigured, predefined, pre-established and/or preprovisioned encrypted communication port numbers, comprising identifying at least one preconfigured, predefined, pre-established and/or preprovisioned encrypted communication port number for each associated destination port number of the associated destination port numbers. In certain embodiments, for example, the establishing may comprise requesting the negotiation of encrypted communication pathways, the requesting comprising sending connection request packets comprising the encrypted communication port numbers, each one of the encrypted communication pathways having a one-to-one correspondence with one of the encrypted communication port numbers. In certain embodiments, for example, the establishing may comprise authorizing the encrypted communication pathways, comprising comparing computing device identifiers, user-application identifiers, and/or payload data-type identifiers received from the encrypted communication pathways with preconfigured, predefined, pre-established and/or preprovisioned authorization codes.

Certain embodiments may provide, for example, a method for managing communications, comprising: i) intercepting network connection requests having associated destination port numbers; ii) identifying preconfigured, predefined, pre-established and/or preprovisioned encrypted communication port numbers, comprising identifying at least one preconfigured, predefined, pre-established and/or preprovisioned encrypted communication port number for each associated destination port number of the associated destination port numbers; iii) requesting the negotiation of encrypted communication pathways, the requesting comprising sending connection request packets comprising the encrypted communication port numbers, each one of the encrypted communication pathways having a one-to-one correspondence with one of the encrypted communication port numbers; and iv) authorizing the encrypted communication pathways, comprising comparing computing device identifiers, user-application identifiers, and payload data-type identifiers received from the encrypted communication pathways with preconfigured, predefined, pre-established and/or preprovisioned authorization codes.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise establishing authorized encrypted communication pathways for at least one port-to-port network communication (including, for example, all port-to-port network communications) among the plurality of networked computing devices. In certain embodiments, for example, the establishing may comprise intercepting network connection requests from source ports (for example source ports that have been opened by and have a predetermined relationship with authorized applications), the requests having associated destination port numbers. In certain embodiments, for example, the method may comprise verifying that the source ports are authorized to communicate with ports having the associated destination port numbers. In certain embodiments, for example, the method may comprise requesting the negotiation of encrypted communication pathways, the requesting comprising sending connection request packets comprising the associated destination port numbers. In certain embodiments, for example, the method may comprise authorizing the encrypted communication pathways, comprising comparing computing device identifiers, user-application identifiers, and/or payload data-type identifiers received from the encrypted communication pathways with preconfigured, predefined, pre-established and/or preprovisioned authorization codes.

Certain embodiments may provide, for example, a method for managing communications, comprising: i) intercepting network connection requests from source ports, the requests having associated destination port numbers; ii) verifying that the source ports are authorized to communicate with ports having the associated destination port numbers; iii) requesting the negotiation of encrypted communication pathways, the requesting comprising sending connection request packets comprising the associated destination port numbers; and iv) authorizing the encrypted communication pathways, comprising comparing computing device identifiers, user-application identifiers, and payload data-type identifiers received from the encrypted communication pathways with preconfigured, predefined, pre-established and/or preprovisioned authorization codes.

Certain embodiments may provide, for example, a method for managing communications. In certain embodiments, for example, the method may comprise intercepting a network connection request from a source port, the request having an associated destination port number. In certain embodiments, for example, the method may comprise verifying that the source port is authorized to communicate with a port having the associated destination port number. In certain embodiments, for example, the method may comprise may comprise requesting the negotiation of a network tunnel, comprising sending a connection request packet comprising the associated destination port number. In certain embodiments, for example, the method may comprise authorizing the network tunnel, comprising comparing a computing device identifiers, a user-application identifier, and a payload data-type identifier received from the network tunnel with a preconfigured, predefined, pre-established and/or preprovisioned authorization code.

Certain embodiments may provide, for example, a method for managing communications, comprising: i) intercepting a network connection request from a source port, the request having an associated destination port number; ii) verifying that the source port is authorized to communicate with a port having the associated destination port number; iii) requesting the negotiation of a network tunnel, comprising sending a connection request packet comprising the associated destination port number; and iv) authorizing the network tunnel, comprising comparing a computing device identifiers, a user-application identifier, and a payload data-type identifier received from the network tunnel with a preconfigured, predefined, pre-established and/or preprovisioned authorization code.

Certain embodiments may provide, for example, a method for managing communications. In certain embodiments, for example, the method may comprise intercepting a network connection request having an associated destination port number. In certain embodiments, for example, the method may comprise identifying a preconfigured, predefined, pre-established and/or preprovisioned encrypted communication port number associated with the destination port number. In certain embodiments, for example, the method may comprise requesting the negotiation of an encrypted communication pathway, the requesting comprising sending a connection request packet comprising the encrypted communication port number. In certain embodiments, for example, the method may comprise authorizing the encrypted communication pathway, comprising comparing a computing device identifier, a user-application identifier, and a payload data-type identifier received from the encrypted communication pathway with a preconfigured, predefined, pre-established and/or preprovisioned authorization code.

Certain embodiments may provide, for example, a method for managing communications, comprising: i) intercepting a network connection request having an associated destination port number; ii) identifying a preconfigured, predefined, pre-established and/or preprovisioned encrypted communication port number associated with the destination port number; iii) requesting the negotiation of an encrypted communication pathway, the requesting comprising sending a connection request packet comprising the encrypted communication port number; and iv) authorizing the encrypted communication pathway, comprising comparing a computing device identifier, a user-application identifier, and a payload data-type identifier received from the encrypted communication pathway with a preconfigured, predefined, pre-established and/or preprovisioned authorization code.

Certain embodiments may provide, for example, a method for managing communications. In certain embodiments, for example, the method may comprise intercepting a network connection request from a source port, the request having an associated destination port number. In certain embodiments, for example, the method may comprise verifying that the source port is authorized to communicate with a port having the associated destination port number. In certain embodiments, for example, the method may comprise requesting the negotiation of an encrypted communication pathway, the requesting comprising sending a connection request packet comprising the associated destination port number. In certain embodiments, for example, the method may comprise authorizing the encrypted communication pathway, comprising comparing a computing device identifier, a user-application identifier, and a payload data-type identifier received from the encrypted communication pathway with a preconfigured, predefined, pre-established and/or preprovisioned authorization code.

Certain embodiments may provide, for example, a method for managing communications, comprising: i) intercepting a network connection request from a source port, the request having an associated destination port number; ii) verifying that the source port is authorized to communicate with a port having the associated destination port number; iii) requesting the negotiation of an encrypted communication pathway, the requesting comprising sending a connection request packet comprising the associated destination port number; and iv) authorizing the encrypted communication pathway, comprising comparing a computing device identifier, a user-application identifier, and a payload data-type identifier received from the encrypted communication pathway with a preconfigured, predefined, pre-established and/or preprovisioned authorization code.

Certain embodiments may provide, for example, a method for managing communications of a plurality of networked computing devices. In certain embodiments, for example, the method may comprise receiving data packets (for example from a user-application process via a loopback interface) having payloads and associated destination port numbers (the associated destination port numbers may include, for example, a destination port number associated with a destination port of a network security process). In certain embodiments, for example, the method may comprise identifying preconfigured, predefined, pre-established and/or preprovisioned tunnel port numbers, each one of the tunnel port numbers having a one-to-one correspondence with one of the associated destination port numbers. In certain embodiments, for example, the method may comprise assembling packet segments, each one of the packet segments comprising one of the payloads, an associated user-application process identifier, and a payload data type descriptor. In certain embodiments, for example, the associated user-application process identifier may comprise a process identifier and/or a process owner. In certain embodiments, for example, the associated user-application process identifier, and a payload data type descriptor may be combined (or concatenated) in a metadata portion of the packet segment. In certain embodiments, for example, the metadata may be encrypted, for example by a single-use cryptographic key. In certain embodiments, for example, the method may comprise requesting transmission of network packets through network tunnels (for example at least a different network tunnel for each application-to-application communication of a specified data protocol type), each one of the network packets comprising a tunnel port number of one of the tunnel port numbers and one of the assembled packet segments, each one of the network tunnels having a one-to-one correspondence with one of the tunnel port numbers.

Certain embodiments may provide, for example, a method for managing communications, comprising: i) receiving data packets having payloads and associated destination port numbers; ii) identifying preconfigured, predefined, pre-established and/or preprovisioned tunnel port numbers, each one of the tunnel port numbers having a one-to-one correspondence with one of the associated destination port numbers; iii) assembling packet segments, each one of the packet segments comprising one of the payloads, an associated user-application process identifier, and a payload data type descriptor; and iv) requesting transmission of network packets through network tunnels, each one of the network packets comprising a tunnel port number of one of the tunnel port numbers and one of the assembled packet segments, each one of the network tunnels having a one-to-one correspondence with one of the tunnel port numbers.

Certain embodiments may provide, for example, a method for managing communications of a plurality of networked computing devices. In certain embodiments, for example, the method may comprise receiving a data packet having a payload and an associated destination port number. In certain embodiments, for example, the method may comprise identifying a preconfigured, predefined, pre-established and/or preprovisioned tunnel port number associated with the destination port number. In certain embodiments, for example, the method may comprise assembling a packet segment, the packet segment comprising the payload, an associated user-application identifier, and a payload data type descriptor. In certain embodiments, for example, the method may comprise requesting transmission of a network packet through a network tunnel, the network packet comprising the tunnel port number and the assembled packet segment, the network tunnel having a one-to-one correspondence with the tunnel port number.

Certain embodiments may provide, for example, a method for managing communications, comprising: i) receiving a data packet having a payload and an associated destination port number; ii) identifying a preconfigured, predefined, pre-established and/or preprovisioned tunnel port number associated with the destination port number; iii) assembling a packet segment, the packet segment comprising the payload, an associated user-application identifier, and a payload data type descriptor; and iv) requesting transmission of a network packet through a network tunnel, the network packet comprising the tunnel port number and the assembled packet segment, the network tunnel having a one-to-one correspondence with the tunnel port number.

Certain embodiments may provide, for example, a method for managing communications. In certain embodiments, for example, the method may comprise receiving data packets from source ports, the data packets having payloads and associated destination port numbers. In certain embodiments, for example, the method may comprise verifying that the source ports are authorized to communicate with ports having the associated destination port numbers. In certain embodiments, for example, the method may comprise assembling packet segments, each one of the packet segments comprising one of the payloads, an associated user-application identifier, and a payload data type descriptor. In certain embodiments, for example, the method may comprise requesting transmission of network packets through network tunnels, each one of the network packets comprising a port number of one of the associated destination port numbers and one of the assembled packet segments, each one of the network tunnels having a one-to-one correspondence with one of the associated destination port numbers.

Certain embodiments may provide, for example, a method for managing communications, comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through network tunnels, each one of the network packets comprising a port number of one of the associated destination port numbers and one of the assembled packet segments, each one of the network tunnels having a one-to-one correspondence with one of the associated destination port numbers.

Certain embodiments may provide, for example, a method for managing communications. In certain embodiments, for example, the method may comprise receiving data packets having payloads and associated destination port numbers. In certain embodiments, for example, the method may comprise identifying preconfigured, predefined, pre-established and/or preprovisioned port numbers, each one of the port numbers having a one-to-one correspondence with one of the associated destination port numbers. In certain embodiments, for example, the method may comprise assembling packet segments, each one of the packet segments comprising one of the payloads, an associated user-application identifier, and a payload data type descriptor. In certain embodiments, for example, the method may comprise requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a method for managing communications, comprising: i) receiving data packets having payloads and associated destination port numbers; ii) identifying preconfigured, predefined, pre-established and/or preprovisioned port numbers, each one of the port numbers having a one-to-one correspondence with one of the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a method for managing communications. In certain embodiments, for example, the method may comprise receiving data packets, the data packets comprising messages and associated destination port numbers. In certain embodiments, for example, the method may comprise identifying preconfigured, predefined, pre-established and/or preprovisioned port numbers, each one of the port numbers having a one-to-one correspondence with one of the associated destination port numbers. In certain embodiments, for example, the method may comprise may comprise assembling packet segments, each one of the packet segments comprising at least a portion of one of the messages, an associated user-application identifier, and a payload data type descriptor. In certain embodiments, for example, the method may comprise requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a method for managing communications, comprising: i) receiving data packets, the data packets comprising messages and associated destination port numbers; ii) identifying preconfigured, predefined, pre-established and/or preprovisioned port numbers, each one of the port numbers having a one-to-one correspondence with one of the associated destination port numbers; iii) assembling packet segments, each one of the packet segments comprising at least a portion of one of the messages, an associated user-application identifier, and a payload data type descriptor; and iv) requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a method for managing communications. In certain embodiments, for example, the method may comprise receiving data packets, the data packets comprising messages and associated destination port numbers, the messages comprising user-application identifiers and payload data type descriptors. In certain embodiments, for example, the method may comprise identifying preconfigured, predefined, pre-established and/or preprovisioned port numbers, each one of the port numbers having a one-to-one correspondence with one of the associated destination port numbers. In certain embodiments, for example, the method may comprise assembling packet segments, each one of the packet segments comprising at least a portion of one of the messages, the at least a portion of one of the messages comprising one of the user-application identifiers and one of the payload data type descriptors. In certain embodiments, for example, the method may comprise requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a method for managing communications, comprising: i) receiving data packets, the data packets comprising messages and associated destination port numbers, the messages comprising user-application identifiers and payload data type descriptors; ii) identifying preconfigured, predefined, pre-established and/or preprovisioned port numbers, each one of the port numbers having a one-to-one correspondence with one of the associated destination port numbers; iii) assembling packet segments, each one of the packet segments comprising at least a portion of one of the messages, the at least a portion of one of the messages comprising one of the user-application identifiers and one of the payload data type descriptors; and iv) requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a method for managing communications. In certain embodiments, for example, the method may comprise receiving data packets from source ports, the data packets having payloads and associated destination port numbers. In certain embodiments, for example, the method may comprise verifying that the source ports are authorized to communicate with ports having the associated destination port numbers. In certain embodiments, for example, the method may comprise assembling packet segments, each one of the packet segments comprising one of the payloads, an associated user-application identifier, and a payload data type descriptor. In certain embodiments, for example, the method may comprise requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

Certain embodiments may provide, for example, a method for managing communications, comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

Certain embodiments may provide, for example, a method for managing communications. In certain embodiments, for example, the method may comprise receiving data packets from source ports, the data packets having payloads and associated destination port numbers. In certain embodiments, for example, the method may comprise verifying that the source ports are authorized to communicate with ports having the associated destination port numbers. In certain embodiments, for example, the method may comprise assembling packet segments, each one of the packet segments comprising one of the payloads, an associated user-application identifier, and a payload data type descriptor. In certain embodiments, for example, the method may comprise requesting transmission of network packets through network tunnels, each one of the network packets comprising a port number of one of the associated destination port numbers and one of the assembled packet segments, each one of the network tunnels having a one-to-one correspondence with one of the associated destination port numbers.

Certain embodiments may provide, for example, a method for managing communications, comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through network tunnels, each one of the network packets comprising a port number of one of the associated destination port numbers and one of the assembled packet segments, each one of the network tunnels having a one-to-one correspondence with one of the associated destination port numbers.

Certain embodiments may provide, for example, a method for managing communications. In certain embodiments, for example, the method may comprise receiving a data packet from a source port, the data packet having a payload and an associated destination port number. In certain embodiments, for example, the method may comprise verifying that the source port is authorized to communicate with a port having the associated destination port number. In certain embodiments, for example, the method may comprise assembling a packet segment, the packet segment comprising the payload, an associated user-application identifier, and a payload data type descriptor. In certain embodiments, for example, the method may comprise requesting transmission of a network packet through a network tunnel, the network packet comprising the associated destination port numbers and the assembled packet segment, the network tunnels having a one-to-one correspondence with the associated destination port number.

Certain embodiments may provide, for example, a method for managing communications, comprising: i) receiving a data packet from a source port, the data packet having a payload and an associated destination port number; ii) verifying that the source port is authorized to communicate with a port having the associated destination port number; iii) assembling a packet segment, the packet segment comprising the payload, an associated user-application identifier, and a payload data type descriptor, and iv) requesting transmission of a network packet through a network tunnel, the network packet comprising the associated destination port numbers and the assembled packet segment, the network tunnels having a one-to-one correspondence with the associated destination port number.

Certain embodiments may provide, for example, a method for managing communications. In certain embodiments, for example, the method may comprise receiving data packets having payloads and associated destination port numbers. In certain embodiments, for example, the method may comprise identifying preconfigured, predefined, pre-established and/or preprovisioned port numbers, each one of the port numbers having a one-to-one correspondence with one of the associated destination port numbers. In certain embodiments, for example, the method may comprise assembling packet segments, each one of the packet segments comprising one of the payloads, an associated user-application identifier, and a payload data type descriptor. In certain embodiments, for example, the method may comprise requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a method for managing communications, comprising: i) receiving data packets having payloads and associated destination port numbers; ii) identifying preconfigured, predefined, pre-established and/or preprovisioned port numbers, each one of the port numbers having a one-to-one correspondence with one of the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a port number of one of the port numbers and one of the assembled packet segments, each one of the encrypted communication pathways having a one-to-one correspondence with one of the port numbers.

Certain embodiments may provide, for example, a method for managing communications of a plurality of networked computing devices. In certain embodiments, for example, the method may comprise receiving a data packet having a payload and an associated destination port number. In certain embodiments, for example, the method may comprise identifying a preconfigured, predefined, pre-established and/or preprovisioned port number, the port number having a one-to-one correspondence with the associated destination port number. In certain embodiments, for example, the method may comprise assembling a packet segment, the packet segment comprising the payload, an associated user-application identifier, and a payload data type descriptor. In certain embodiments, for example, the method may comprise requesting encrypted communication over an encrypted communication pathway of a network packet, the network packets comprising the port number and the assembled packet segment, the encrypted communication pathway having a one-to-one correspondence with the port number.

Certain embodiments may provide, for example, a method for managing communications, comprising: i) receiving a data packet having a payload and an associated destination port number; ii) identifying a preconfigured, predefined, pre-established and/or preprovisioned port number, the port number having a one-to-one correspondence with the associated destination port number; iii) assembling a packet segment, the packet segment comprising the payload, an associated user-application identifier, and a payload data type descriptor; and iv) requesting encrypted communication over an encrypted communication pathway of a network packet, the network packets comprising the port number and the assembled packet segment, the encrypted communication pathway having a one-to-one correspondence with the port number.

Certain embodiments may provide, for example, a method for managing communications of a plurality of networked computing devices. In certain embodiments, for example, the method may comprise receiving data packets from source ports, the data packets having payloads and associated destination port numbers. In certain embodiments, for example, the method may comprise verifying that the source ports are authorized to communicate with ports having the associated destination port numbers. In certain embodiments, for example, the method may comprise assembling packet segments, each one of the packet segments comprising one of the payloads, an associated user-application identifier, and a payload data type descriptor. In certain embodiments, for example, the method may comprise requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

Certain embodiments may provide, for example, a method for managing communications, comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

Certain embodiments may provide, for example, a method for managing communications of a plurality of networked computing devices. In certain embodiments, for example, the method may comprise receiving a data packet from a source port, the data packet having a payload and an associated destination port number. In certain embodiments, for example, the method may comprise verifying that the source port is authorized to communicate with a port having the associated destination port number. In certain embodiments, for example, the method may comprise assembling a packet segment, the packet segments comprising the payload, an associated user-application identifier, and a payload data type descriptor. In certain embodiments, for example, the method may comprise requesting transmission of a network packet through an encrypted communication pathway, the network packets comprising the associated destination port number and the assembled packet segment, the encrypted communication pathway having a one-to-one correspondence with the associated destination port number.

Certain embodiments may provide, for example, a method for managing communications, comprising: i) receiving a data packet from a source port, the data packet having a payload and an associated destination port number; ii) verifying that the source port is authorized to communicate with a port having the associated destination port number; iii) assembling a packet segment, the packet segments comprising the payload, an associated user-application identifier, and a payload data type descriptor; and iv) requesting transmission of a network packet through an encrypted communication pathway, the network packets comprising the associated destination port number and the assembled packet segment, the encrypted communication pathway having a one-to-one correspondence with the associated destination port number.

Certain embodiments may provide, for example, a method for managing communications. In certain embodiments, for example, the method may comprise obtaining port numbers, metadata (for example metadata encrypted using a single-use cryptographic key), and payloads associated with network packets. In certain embodiments, for example, the method may comprise identifying preconfigured, predefined, pre-established and/or preprovisioned destination port numbers and preconfigured, predefined, pre-established and/or preprovisioned authorization codes associated with the obtained port numbers, each one of the authorization codes comprising a preconfigured, predefined, pre-established and/or preprovisioned user-application process identifier and a preconfigured, predefined, pre-established and/or preprovisioned payload data-type identifier associated with one of the obtained port numbers. In certain embodiments, for example, the method may comprise authorizing the network packets, comprising: comparing (for example comparing in application spaces or kernel spaces of the plurality of computing devices) metadata with the authorization codes. In certain embodiments, for example, the method may comprise requesting transmission (for example across loopback interfaces, by TUN/TAP interfaces, or by kernel read and/or write calls) of payloads from the authorized network packets to destinations referenced by the destination port numbers. In certain embodiments, for example, the payloads may be passed to the destination port numbers by one or more loopback interfaces.

Certain embodiments may provide, for example, a method for managing communications, comprising: performing communication processing functions on all network-to-port communications received by the plurality of computing devices, the performing communication processing functions comprising: i) obtaining port numbers, metadata, and payloads associated with network packets; ii) identifying preconfigured, predefined, pre-established and/or preprovisioned destination port numbers and preconfigured, predefined, pre-established and/or preprovisioned authorization codes associated with the obtained port numbers, each one of the authorization codes comprising a preconfigured, predefined, pre-established and/or preprovisioned user-application identifier and a preconfigured, predefined, pre-established and/or preprovisioned payload data-type identifier associated with one of the obtained port numbers; iii) authorizing the network packets, comprising: comparing at least a portion of the metadata with the authorization codes; and iv) requesting transmission of payloads from the authorized network packets to destinations referenced by the destination port numbers.

Certain embodiments may provide, for example, a method for managing communications. In certain embodiments, for example, the method may comprise obtaining a port number, metadata, and a payload associated with a network packet received by the networked computing device. In certain embodiments, for example, the method may comprise identifying a preconfigured, predefined, pre-established and/or preprovisioned destination port number and a preconfigured, predefined, pre-established and/or preprovisioned authorization code associated with the obtained port number, the authorization code comprising a preconfigured, predefined, pre-established and/or preprovisioned user-application identifier and a preconfigured, predefined, pre-established and/or preprovisioned payload data-type identifier associated with the obtained port number. In certain embodiments, for example, the method may comprise authorizing the network packet, comprising: comparing the metadata with the authorization code. In certain embodiments, for example, the method may comprise requesting transmission of the payload to a destination referenced by the destination port number.

Certain embodiments may provide, for example, a method for managing communications, comprising: i) obtaining a port number, metadata, and a payload associated with a network packet received by the networked computing device; ii) identifying a preconfigured, predefined, pre-established and/or preprovisioned destination port number and a preconfigured, predefined, pre-established and/or preprovisioned authorization code associated with the obtained port number, the authorization code comprising a preconfigured, predefined, pre-established and/or preprovisioned user-application identifier and a preconfigured, predefined, pre-established and/or preprovisioned payload data-type identifier associated with the obtained port number; iii) authorizing the network packet, comprising: comparing the metadata with the authorization code; and iv) requesting transmission of the payload to a destination referenced by the destination port number.

Certain embodiments may provide, for example, a method for managing communications. In certain embodiments, for example, the method may comprise obtaining destination port numbers, metadata, and payloads associated with network packets. In certain embodiments, for example, the method may comprise identifying preconfigured, predefined, pre-established and/or preprovisioned authorization codes associated with the destination port numbers, each one of the authorization codes comprising a preconfigured, predefined, pre-established and/or preprovisioned user-application identifier and a preconfigured, predefined, pre-established and/or preprovisioned payload data-type identifier associated with one of the destination port numbers. In certain embodiments, for example, the method may comprise authorizing the network packets, comprising: comparing at least a portion of the metadata with the authorization codes. In certain embodiments, for example, the method may comprise requesting transmission of payloads from the authorized network packets to destinations referenced by the destination port numbers.

Certain embodiments may provide, for example, a method for managing communications, comprising: i) obtaining destination port numbers, metadata, and payloads associated with network packets; ii) identifying preconfigured, predefined, pre-established and/or preprovisioned authorization codes associated with the destination port numbers, each one of the authorization codes comprising a preconfigured, predefined, pre-established and/or preprovisioned user-application identifier and a preconfigured, predefined, pre-established and/or preprovisioned payload data-type identifier associated with one of the destination port numbers; iii) authorizing the network packets, comprising: comparing at least a portion of the metadata with the authorization codes; and iv) requesting transmission of payloads from the authorized network packets to destinations referenced by the destination port numbers.

Certain embodiments may provide, for example, a method for managing communications of a plurality of networked computing devices. In certain embodiments, for example, the method may comprise obtaining a port number, metadata, and a payload associated with a network packet received by the networked computing device. In certain embodiments, for example, the method may comprise identifying a preconfigured, predefined, pre-established and/or preprovisioned destination port number and a preconfigured, predefined, pre-established and/or preprovisioned authorization code associated with the obtained port number, the authorization code comprising a preconfigured, predefined, pre-established and/or preprovisioned user-application identifier and a preconfigured, predefined, pre-established and/or preprovisioned payload data-type identifier associated with the obtained port number. In certain embodiments, for example, the method may comprise authorizing the network packet, comprising: comparing the metadata with the authorization code. In certain embodiments, for example, the method may comprise requesting transmission of the payload to a destination referenced by the preconfigured, predefined, pre-established and/or preprovisioned destination port number.

Certain embodiments may provide, for example, a method for managing communications, comprising: i) obtaining a port number, metadata, and a payload associated with a network packet received by the networked computing device; ii) identifying a preconfigured, predefined, pre-established and/or preprovisioned destination port number and a preconfigured, predefined, pre-established and/or preprovisioned authorization code associated with the obtained port number, the authorization code comprising a preconfigured, predefined, pre-established and/or preprovisioned user-application identifier and a preconfigured, predefined, pre-established and/or preprovisioned payload data-type identifier associated with the obtained port number; iii) authorizing the network packet, comprising: comparing the metadata with the authorization code; and iv) requesting transmission of the payload to a destination referenced by the preconfigured, predefined, pre-established and/or preprovisioned destination port number.

Certain embodiments may provide, for example, a method for managing communications. In certain embodiments, for example, the method may comprise negotiating, on a first computing device, a first data pathway between a first user-application and a first network security program code of a plurality of computer-readable program code. In certain embodiments, for example, the method may comprise negotiating, on a second computing device, a second data pathway between a second network security program of the plurality of computer-readable program code and a second user-application. In certain embodiments, for example, the method may comprise negotiating a third data pathway between the first network security program and the second network security program, the third data pathway comprising an encrypted network tunnel, each of the first data pathway, second data pathway, and third data pathway participate to form at least a part of a dedicated data pathway for exclusively communicating data from a first port of the first user-application to a second port of the second user-application.

Certain embodiments may provide, for example, a method for managing communications, comprising: i) negotiating, on a first computing device, a first data pathway between a first user-application and a first network security program code of a plurality of computer-readable program code; ii) negotiating, on a second computing device, a second data pathway between a second network security program of the plurality of computer-readable program code and a second user-application; and iii) negotiating a third data pathway between the first network security program and the second network security program, the third data pathway comprising an encrypted network tunnel, each of the first data pathway, second data pathway, and third data pathway participate to form at least a part of a dedicated data pathway for exclusively communicating data from a first port of the first user-application to a second port of the second user-application.

Certain embodiments may provide, for example, a method for managing communications. In certain embodiments, for example, the method may comprise negotiating, on a first computing device, a first data pathway between a first user-application and a first network security program of plural security programs. In certain embodiments, for example, the method may comprise negotiating, on a second computing device, a second data pathway between a second network security program of the plural security programs and a second user-application. In certain embodiments, for example, the method may comprise negotiating a third data pathway between the first network security program and the second network security program, the third data pathway comprising an encrypted communication pathway, each of the first data pathway, second data pathway, and third data pathway exclusive to a dedicated data pathway for communicating data from a first port of the first user-application to a second port of the second user-application.

Certain embodiments may provide, for example, a method for managing communications, comprising: i) negotiating, on a first computing device, a first data pathway between a first user-application and a first network security program of plural security programs; ii) negotiating, on a second computing device, a second data pathway between a second network security program of the plural security programs and a second user-application; iii) negotiating a third data pathway between the first network security program and the second network security program, the third data pathway comprising an encrypted communication pathway, each of the first data pathway, second data pathway, and third data pathway exclusive to a dedicated data pathway for communicating data from a first port of the first user-application to a second port of the second user-application.

Certain embodiments may provide, for example, a method for managing communications in a cloud. In certain embodiments, for example, the method may comprise obtaining port numbers, metadata, and payloads associated with network packets. In certain embodiments, for example, the method may comprise identifying predefined destination port numbers and predefined authorization codes associated with the obtained port numbers, each one of the predefined authorization codes comprising a predefined user-application identifier and a predefined payload data-type identifier associated with one of the obtained port numbers. In certain embodiments, for example, the method may comprise authorizing the network packets, comprising: comparing at least a portion of the metadata with the predefined authorization codes. In certain embodiments, for example, the method may comprise requesting transmission of payloads from the authorized network packets to cloud resources referenced by the predefined destination port numbers.

Certain embodiments may provide, for example, a method for managing communications, comprising: i) obtaining port numbers, metadata, and payloads associated with network packets; ii) identifying predefined destination port numbers and predefined authorization codes associated with the obtained port numbers, each one of the predefined authorization codes comprising a predefined user-application identifier and a predefined payload data-type identifier associated with one of the obtained port numbers; iii) authorizing the network packets, comprising: comparing at least a portion of the metadata with the predefined authorization codes; and iv) requesting transmission of payloads from the authorized network packets to cloud resources referenced by the predefined destination port numbers.

Certain embodiments may provide, for example, a product for managing communications of a plurality of networked processor nodes. In certain embodiments, for example, the product may comprise a computer-readable storage medium (for example a non-transitory computer-readable storage medium) having computer-readable program code embodied therein, the computer-readable program code executable by a processor to perform communication management operations. In certain embodiments, for example, the communication management operations may comprise establishing authorized network tunnels (for example network tunnels based on protocol which involve encrypting a network packet and inserting the encrypted network packet inside a packet for transport (such as IPsec protocol), or network tunnels based on Socket Secured Layer protocol, or network tunnels which require encryption of part of all of a packet payload but do not involve additional headers (for example do not involve packaging an IP packet inside another IP packet) for network communication) on all port-to-port network communications (for example unencrypted or encrypted payload communications) among the plurality of networked processor nodes (inclusive, for example, of port-to-port communications according to User Datagram Protocol (UDP) or Transmission Control Protocol (TCP) between end-user application processes over a network)). In certain embodiments, for example, the port-to-port communications may be between user-application processes (inclusive of application processes having a process owner (or user)). In certain embodiments, for example, one or more of the user-application processes may reside in kernel and/or application space. In certain embodiments, for example, the establishing may comprise intercepting network connection requests (for example by network application programming interfaces) having associated destination port numbers. In certain embodiments, for example, the establishing may comprise identifying preconfigured, predefined, pre-established and/or preprovisioned tunnel port numbers (for example predefined tunnel port numbers associated with servers), comprising identifying at least one (for example, one) preconfigured, predefined, pre-established and/or preprovisioned tunnel port number for each associated destination port number of the associated destination port numbers. In certain embodiments, for example, the establishing may comprise requesting the negotiation of network tunnels, the requesting comprising sending connection request packets comprising the tunnel port numbers (and also, for example, cipher suite parameters), each one of the network tunnels having a one-to-one correspondence with one of the tunnel port numbers. In certain embodiments, for example, the establishing may comprise authorizing the network tunnels, comprising comparing node identifiers, user-application identifiers (for example user-application identifiers derived from application process identifiers and/or application process owners, together or in parts), and payload data-type identifiers received from the network tunnels with preconfigured, predefined, pre-established and/or preprovisioned authorization codes. In certain further embodiments, for example, the node identifiers, user-application identifiers, and/or payload data-type identifiers may be encrypted and require decryption before the comparing.

A. In certain embodiments, for example, the intercepting, identifying, requesting, and authorizing may be transparent to all user-application processes (for example all processes (except optionally for processes executing portions of the program code) executing in (non-kernel) application space and having process owners) on the plurality of networked nodes. In certain embodiments, for example, the intercepting may be performed by a network application programming interface having standard syntax (for example using modified network application programming interface functions that retain standard syntax, for example: bind( ) connect( ) listen( ) UDP sendto( ), UDP bindto( ), and close( ) functions).

B. In certain embodiments, for example, the intercepting, identifying, requesting, and authorizing may be self-executing. In certain further embodiments, for example, the intercepting, identifying, requesting, and authorizing may be automatic. In certain further embodiments, for example, the identifying, requesting, and authorizing may be automatically invoked following the intercepting. In certain embodiments, for example, the intercepting, identifying, and authorizing may occur in the kernel spaces of the plurality of networked nodes. In certain embodiments, for example, one or more of the intercepting, identifying, and authorizing occur in application spaces of the plurality of networked nodes. In certain further embodiments, for example, at least a portion (for example all) of the non-transitory computer-readable storage medium may be resident on a deployment server.

C. In certain further embodiments, for example, at least a portion (for example all) of the non-transitory computer-readable storage medium may be resident on flash drive. In certain embodiments, for example, the communication management operations may further comprise: preventing all user-application process ports from binding to a portion or all physical interfaces of the plurality of networked nodes.

D. In certain embodiments, for example, user-application process ports may transmit packets to network security software process ports by loopback interfaces. In certain embodiments, for example, user-application process ports may transmit packets to network security software process ports by TUN/TAP interfaces.

E. In certain embodiments, for example, the network tunnels may be encrypted. In certain embodiments, for example, the network tunnels may be interposed between network security processes (for example middleware) running on separate nodes. In certain embodiments, for example, the network security processes may manage a segment of the data pathway that is interposed between user-application processes on separate nodes of the plurality of networked processor nodes. In certain embodiments, for example, the network security processes may be conducted on the plural nodes with user-application processes, wherein the user-application processes may engage in port-to-port communications. In certain embodiments, for example, the network security processes may be resident on different nodes from the user-application processes. In certain embodiments, for example, the product may be used to configure a software-defined perimeter.

F. In certain embodiments, for example, the tunnel port numbers, node identifiers, user-application identifiers, and/or payload data-type identifiers may be obtained from a plurality of configuration files. In certain embodiments, for example, the configuration files may contain private keys for negotiating encryption keys for the network tunnels. In certain embodiments, for example, the configuration files may be binary files. In certain embodiments, for example, the configuration files may be encrypted files. In certain embodiments, for example, the configuration files may be variable length files. In certain embodiments, for example, the configuration files may be read-only files.

G. In certain embodiments, for example, the communication management operations may further comprise: executing operating system commands to identify user-application processes making the connection requests, and verifying that the identified user-application processes are authorized to transmit data to the associated destination port numbers. In certain embodiments, for example, the communication management operations may further comprise thwarting attempts by malware to form network connections, the thwarting comprising: rejecting network connection requests in which identified user-application processes are not authorized to transmit data, for example by reference to a configuration file of authorized port-to-port connections. In certain embodiments, for example, the product may further comprise a configuration file, the configuration file comprising at least two of the following: tunnel port numbers, node identifiers, user-application identifiers, and payload data-type identifiers. In certain embodiments, for example, the communication management operations may comprise updating a connection state indicator based on the comparing node identifiers, the comparing user-application process identifiers, and/or the comparing payload data-type identifiers. In certain embodiments, for example, the updated connection state indicator may be a field in a list of port-to-port connections. In certain embodiments, for example, the connection state indicator may be changed from a value indicating that no connection has been established to a value indicating that an open connection state exists for a particular port-to-port connection. In certain embodiments, for example, the connection state indicator may be changed from a value indicating that no connection has been established to a value indicating that a connection is in the process of being formed and that one or more of the node identifiers, the user-application process identifiers, and/or the payload data-type identifiers has been successfully exchanged, authenticated and/or authorized. In certain embodiments, for example, the connection state indicator may be changed from a value indicating that an open connection exists, that no connection exists, or that a connection is in the process of being formed to a value indicating that the connection is being declined due to failure to successfully exchange, authenticate and/or authorize one or more of the node identifiers, the user-application process identifiers, and/or the payload data-type identifiers.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: establishing authorized network tunnels for at least one port-to-port network communication (inclusive, for example, of all port-to-port network communications) among the plurality of networked processor nodes, comprising: i) intercepting network connection requests having associated destination port numbers; ii) identifying preconfigured, predefined, pre-established and/or preprovisioned tunnel port numbers, comprising identifying at least one tunnel port number for each associated destination port number of the associated destination port numbers; iii) requesting the negotiation of network tunnels, the requesting comprising sending connection request packets comprising the tunnel port numbers, each one of the network tunnels having a one-to-one correspondence with one of the tunnel port numbers; and iv) authorizing the network tunnels, comprising comparing node identifiers, user-application identifiers, and payload data-type identifiers received from the network tunnels with preconfigured, predefined, pre-established and/or preprovisioned authorization codes.

Certain embodiments may provide, for example, a computer program product for managing communications of a networked node comprising a processor, the computer program product comprising a computer-readable storage medium (for example a non-transitory computer-readable storage medium) having computer-readable program code embodied therein, the computer-readable program code executable by the processor to perform communication management operations, the communication management operations comprising: establishing authorized network tunnels for all port-to-port network communications for the networked node, comprising: i) intercepting a network connection request having an associated destination port number; ii) identifying a preconfigured, predefined, pre-established and/or preprovisioned tunnel port number associated with the destination port number; iii) requesting the forming of a network tunnel, the forming comprising sending a connection request packet comprising the tunnel port number; and iv) authorizing the network tunnel, comprising comparing a node identifier, a user-application identifier, and a payload data-type identifier received from the network tunnel with a preconfigured, predefined, pre-established and/or preprovisioned authorization code.

Certain embodiments may provide, for example, a product for managing communications of a plurality of networked processor nodes. In certain embodiments, for example, the product may comprise a computer-readable storage medium (for example a non-transitory computer-readable storage medium) having computer-readable program code embodied therein, the computer-readable program code executable by a processor to perform communication management operations. In certain embodiments, for example, the communication management operations may comprise establishing authorized network tunnels for at least one port-to-port network communication (including, for example, all port-to-port network communications (for example unencrypted or encrypted payload communications) among the plurality of networked processor nodes (inclusive, for example, of port-to-port communications according to User Datagram Protocol (UDP) or Transmission Control Protocol (TCP) between end-user application processes over a network)). In certain embodiments, for example, the port-to-port communications may be between user-application processes (inclusive of application processes having a process owner (or user)). In certain embodiments, for example, one or more of the user-application processes may reside in kernel and/or application space. In certain embodiments, for example, the establishing may comprise intercepting network connection requests from source ports (for example the source ports may comprise ports associated with user-application processes), the requests having associated destination port numbers. In certain embodiments, for example, the establishing may comprise verifying that the source ports are authorized to communicate with ports having the associated destination port numbers. In certain embodiments, for example, the establishing may comprise requesting the negotiation of network tunnels, comprising sending connection request packets comprising the associated destination port numbers, each one of the network tunnels having a one-to-one correspondence with one of the associated destination port numbers. In certain embodiments, for example, the establishing may comprise authorizing the network tunnels, comprising comparing node identifiers, user-application identifiers, and/or payload data-type identifiers received from the network tunnels with preconfigured, predefined, pre-established and/or preprovisioned authorization codes. In certain further embodiments, for example, the node identifiers, user-application identifiers, and/or payload data-type identifiers may be encrypted and require decryption before the comparing.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: establishing authorized network tunnels for all port-to-port network communications among the plurality of networked processor nodes, comprising: i) intercepting network connection requests from source ports, the requests having associated destination port numbers; ii) verifying that the source ports are authorized to communicate with ports having the associated destination port numbers; iii) requesting the negotiation of network tunnels, comprising sending connection request packets comprising the associated destination port numbers, each one of the network tunnels having a one-to-one correspondence with one of the associated destination port numbers; and iv) authorizing the network tunnels, comprising comparing node identifiers, user-application identifiers, and payload data-type identifiers received from the network tunnels with preconfigured, predefined, pre-established and/or preprovisioned authorization codes.

Certain embodiments may provide, for example, a product for managing communications of a plurality of networked processor nodes. In certain embodiments, for example, the product may comprise a non-transitory computer-readable storage medium having computer-readable program code embodied therein, the computer-readable program code executable by a processor to perform communication management operations. In certain embodiments, for example, the communication management operations may comprise establishing authorized encrypted communication pathways for at least one port-to-port network communication (for example all port-to-port communications) among the plurality of networked processor nodes. In certain embodiments, for example, the establishing may comprise intercepting network connection requests having associated destination port numbers. In certain embodiments, for example, the establishing may comprise identifying preconfigured, predefined, pre-established and/or preprovisioned encrypted communication port numbers, comprising identifying at least one preconfigured, predefined, pre-established and/or preprovisioned encrypted communication port number for each associated destination port number of the associated destination port numbers. In certain embodiments, for example, the establishing may comprise requesting the negotiation of encrypted communication pathways, the requesting comprising sending connection request packets comprising the encrypted communication port numbers, each one of the encrypted communication pathways having a one-to-one correspondence with one of the encrypted communication port numbers. In certain embodiments, for example, the establishing may comprise authorizing the encrypted communication pathways, comprising comparing node identifiers, user-application identifiers, and/or payload data-type identifiers received from the encrypted communication pathways with preconfigured, predefined, pre-established and/or preprovisioned authorization codes.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: establishing authorized encrypted communication pathways for all port-to-port network communications among the plurality of networked processor nodes, comprising: i) intercepting network connection requests having associated destination port numbers; ii) identifying preconfigured, predefined, pre-established and/or preprovisioned encrypted communication port numbers, comprising identifying at least one preconfigured, predefined, pre-established and/or preprovisioned encrypted communication port number for each associated destination port number of the associated destination port numbers; iii) requesting the negotiation of encrypted communication pathways, the requesting comprising sending connection request packets comprising the encrypted communication port numbers, each one of the encrypted communication pathways having a one-to-one correspondence with one of the encrypted communication port numbers; and iv) authorizing the encrypted communication pathways, comprising comparing node identifiers, user-application identifiers, and payload data-type identifiers received from the encrypted communication pathways with preconfigured, predefined, pre-established and/or preprovisioned authorization codes.

Certain embodiments may provide, for example, a product for managing communications of a plurality of networked processor nodes. In certain embodiments, for example, the product may comprise a non-transitory computer-readable storage medium having computer-readable program code embodied therein, the computer-readable program code executable by a processor to perform communication management operations. In certain embodiments, for example, the communication management operations may comprise establishing authorized encrypted communication pathways for at least one port-to-port network communication (including, for example, all port-to-port network communications) among the plurality of networked processor nodes. In certain embodiments, for example, the establishing may comprise intercepting network connection requests from source ports (for example source ports that have been opened by and have a predetermined relationship with authorized applications), the requests having associated destination port numbers. In certain embodiments, for example, the establishing may comprise verifying that the source ports are authorized to communicate with ports having the associated destination port numbers. In certain embodiments, for example, the establishing may comprise requesting the negotiation of encrypted communication pathways, the requesting comprising sending connection request packets comprising the associated destination port numbers. In certain embodiments, for example, the establishing may comprise authorizing the encrypted communication pathways, comprising comparing node identifiers, user-application identifiers, and/or payload data-type identifiers received from the encrypted communication pathways with preconfigured, predefined, pre-established and/or preprovisioned authorization codes.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: establishing authorized encrypted communication pathways for all port-to-port network communications among the plurality of networked processor nodes, comprising: i) intercepting network connection requests from source ports, the requests having associated destination port numbers; ii) verifying that the source ports are authorized to communicate with ports having the associated destination port numbers; iii) requesting the negotiation of encrypted communication pathways, the requesting comprising sending connection request packets comprising the associated destination port numbers; and iv) authorizing the encrypted communication pathways, comprising comparing node identifiers, user-application identifiers, and payload data-type identifiers received from the encrypted communication pathways with preconfigured, predefined, pre-established and/or preprovisioned authorization codes.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: establishing authorized network tunnels for all port-to-port network communications among the plurality of networked processor nodes, comprising: i) intercepting a network connection request from a source port, the request having an associated destination port number; ii) verifying that the source port is authorized to communicate with a port having the associated destination port number; iii) requesting the negotiation of a network tunnel, comprising sending a connection request packet comprising the associated destination port number; and iv) authorizing the network tunnel, comprising comparing a node identifiers, a user-application identifier, and a payload data-type identifier received from the network tunnel with a preconfigured, predefined, pre-established and/or preprovisioned authorization code.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: establishing authorized network tunnels for all port-to-port network communications among the plurality of networked processor nodes, comprising: i) intercepting a network connection request having an associated destination port number; ii) identifying a preconfigured, predefined, pre-established and/or preprovisioned encrypted communication port number associated with the destination port number; iii) requesting the negotiation of an encrypted communication pathway, the requesting comprising sending a connection request packet comprising the encrypted communication port number; and iv) authorizing the encrypted communication pathway, comprising comparing a node identifier, a user-application identifier, and a payload data-type identifier received from the encrypted communication pathway with a preconfigured, predefined, pre-established and/or preprovisioned authorization code.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: establishing authorized network tunnels for all port-to-port network communications among the plurality of networked processor nodes, comprising: i) intercepting a network connection request from a source port, the request having an associated destination port number; ii) verifying that the source port is authorized to communicate with a port having the associated destination port number; iii) requesting the negotiation of an encrypted communication pathway, the requesting comprising sending a connection request packet comprising the associated destination port number; and iv) authorizing the encrypted communication pathway, comprising comparing a node identifier, a user-application identifier, and a payload data-type identifier received from the encrypted communication pathway with a preconfigured, predefined, pre-established and/or preprovisioned authorization code.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on at least a portion of port-to-network communications (including, for example, on all port-to-network communications) of the plurality of processor nodes. In certain embodiments, for example, the performing communication processing functions may comprise: receiving data packets (for example from a user-application process via a loopback interface) having payloads and associated destination port numbers (the associated destination port numbers may include, for example, a destination port number associated with a destination port of a network security process). In certain embodiments, for example, the performing communication processing functions may comprise: identifying preconfigured, predefined, pre-established and/or preprovisioned tunnel port numbers, each one of the tunnel port numbers having a one-to-one correspondence with one of the associated destination port numbers. In certain embodiments, for example, the performing communication processing functions may comprise: assembling packet segments, each one of the packet segments comprising one of the payloads, an associated user-application process identifier, and a payload data type descriptor. In certain embodiments, for example, the associated user-application process identifier may comprise a process identifier and/or a process owner. In certain embodiments, for example, the associated user-application process identifier, and a payload data type descriptor may be combined (or concatenated) in a metadata portion of the packet segment. In certain embodiments, for example, the metadata may be encrypted, for example by a single-use cryptographic key. In certain embodiments, for example, the performing communication processing functions may comprise: requesting transmission of network packets through network tunnels (for example at least a different network tunnel for each application-to-application communication of a specified data protocol type), each one of the network packets comprising a tunnel port number of one of the tunnel port numbers and one of the assembled packet segments, each one of the network tunnels having a one-to-one correspondence with one of the tunnel port numbers.

A. In certain embodiments, for example, the receiving, identifying, assembling, and requesting may be transparent to all user-application processes on the plurality of networked nodes. In certain embodiments, for example, the data packets may be received by loopback interfaces. In certain embodiments, for example, the data packets may be received by kernel read and/or write calls. In certain embodiments, for example, the data packets may be received by TAP/TUN interfaces. In certain embodiments, for example, the receiving may occur in kernel spaces of the plural nodes. In certain embodiments, for example, the receiving may occur in application spaces of the plural nodes. In certain embodiments, for example, the received data packet may be received from user-application processes executing in application spaces of the plural nodes. In certain embodiments, for example, the user-application process identifiers may comprise process commands and process owners (for example process commands and process owners comparable to the output of operating system commands). In certain embodiments, for example, the communication processing functions may further comprise: setting connection status indicators to a non-operative state if more than a fixed number (for example a fixed number such as 10 or 20) of requests to transmit network packets are rejected. In certain embodiments, for example, the communication processing functions may further comprise: setting connection status indicators to a non-operative state if the difference between rejected and successful requests to transmit network packets exceeds a fixed number (for example a fixed number such as 10 or 20).

B. In certain embodiments, for example, the communication processing functions may further comprise: checking a connection status of the network tunnels (for example by checking lists maintained in kernel memory of the plural networked nodes). In certain embodiments, for example, the communication processing functions may further comprise dropping network packets that are received via one or more network tunnels whose connection status indicators are set to a non-operative state.

C. In certain embodiments, for example, the payloads may be translated into a common format prior to the assembling.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on at least a portion of port-to-network communications (including, for example, on all port-to-network communications) of the plurality of processor nodes, the performing communication processing functions comprising: i) receiving data packets having payloads and associated destination port numbers; ii) identifying preconfigured, predefined, pre-established and/or preprovisioned tunnel port numbers, each one of the tunnel port numbers having a one-to-one correspondence with one of the associated destination port numbers; iii) assembling packet segments, each one of the packet segments comprising one of the payloads, an associated user-application process identifier, and a payload data type descriptor; and iv) requesting transmission of network packets through network tunnels, each one of the network packets comprising a tunnel port number of one of the tunnel port numbers and one of the assembled packet segments, each one of the network tunnels having a one-to-one correspondence with one of the tunnel port numbers.

Certain embodiments may provide, for example, a computer program product for managing communications of a networked node comprising a processor, the computer program product comprising a non-transitory computer-readable storage medium having computer-readable program code embodied therein, the computer-readable program code executable by the processor to perform communication management operations, the communication management operations comprising: performing communication processing functions on all port-to-network communications of the networked node, the performing communication processing functions comprising: i) receiving a data packet having a payload and an associated destination port number; ii) identifying a preconfigured, predefined, pre-established and/or preprovisioned tunnel port number associated with the destination port number; iii) assembling a packet segment, the packet segment comprising the payload, an associated user-application identifier, and a payload data type descriptor; and iv) requesting transmission of a network packet through a network tunnel, the network packet comprising the tunnel port number and the assembled packet segment, the network tunnel having a one-to-one correspondence with the tunnel port number.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on at least a portion of port-to-network communications (including, for example, on all port-to-network communications) of the plurality of processor nodes. In certain embodiments, for example, the performing communication processing functions may comprise receiving data packets from source ports, the data packets having payloads and associated destination port numbers. In certain embodiments, for example, the performing communication processing functions may comprise verifying that the source ports are authorized to communicate with ports having the associated destination port numbers. In certain embodiments, for example, the performing communication processing functions may comprise assembling packet segments, each one of the packet segments comprising one of the payloads, an associated user-application identifier, and a payload data type descriptor. In certain embodiments, for example, the performing communication processing functions may comprise requesting transmission of network packets through network tunnels, each one of the network packets comprising a port number of one of the associated destination port numbers and one of the assembled packet segments, each one of the network tunnels having a one-to-one correspondence with one of the associated destination port numbers.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on all port-to-network communications of the plurality of processor nodes. In certain embodiments, for example, the performing communication processing functions may comprise receiving data packets having payloads and associated destination port numbers. In certain embodiments, for example, the performing communication processing functions may comprise identifying preconfigured, predefined, pre-established and/or preprovisioned tunnel port numbers, each one of the tunnel port numbers having a one-to-one correspondence with one of the associated destination port numbers. In certain embodiments, for example, the performing communication processing functions may comprise assembling packet segments, each one of the packet segments comprising one of the payloads, an associated user-application identifier, and a payload data type descriptor. In certain embodiments, for example, the performing communication processing functions may comprise requesting transmission of network packets through encrypted communication pathways, each one of the network packets comprising a tunnel port number of one of the tunnel port numbers and one of the assembled packet segments, each one of the encrypted communication pathways having a one-to-one correspondence with one of the tunnel port numbers.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on at least a portion of port-to-network communications (including, for example, on all port-to-network communications) of the plurality of processor nodes. In certain embodiments, for example, the performing communication processing functions may comprise receiving data packets from source ports, the data packets having payloads and associated destination port numbers. In certain embodiments, for example, the performing communication processing functions may comprise verifying that the source ports are authorized to communicate with ports having the associated destination port numbers. In certain embodiments, for example, the performing communication processing functions may comprise assembling packet segments, each one of the packet segments comprising one of the payloads, an associated user-application identifier, and a payload data type descriptor. In certain embodiments, for example, the performing communication processing functions may comprise requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on all port-to-network communications of the plurality of processor nodes, the performing communication processing functions comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through network tunnels, each one of the network packets comprising a port number of one of the associated destination port numbers and one of the assembled packet segments, each one of the network tunnels having a one-to-one correspondence with one of the associated destination port numbers.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on all port-to-network communications of the plurality of processor nodes, the performing communication processing functions comprising: i) receiving a data packet from a source port, the data packet having a payload and an associated destination port number; ii) verifying that the source port is authorized to communicate with a port having the associated destination port number; iii) assembling a packet segment, the packet segment comprising the payload, an associated user-application identifier, and a payload data type descriptor, and iv) requesting transmission of a network packet through a network tunnel, the network packet comprising the associated destination port numbers and the assembled packet segment, the network tunnels having a one-to-one correspondence with the associated destination port number.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on all port-to-network communications of the plurality of processor nodes, the performing communication processing functions comprising: i) receiving data packets having payloads and associated destination port numbers; ii) identifying preconfigured, predefined, pre-established and/or preprovisioned tunnel port numbers, each one of the tunnel port numbers having a one-to-one correspondence with one of the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a tunnel port number of one of the tunnel port numbers and one of the assembled packet segments, each one of the encrypted communication pathways having a one-to-one correspondence with one of the tunnel port numbers.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on all port-to-network communications of the plurality of processor nodes, the performing communication processing functions comprising: i) receiving a data packet having a payload and an associated destination port number; ii) identifying a preconfigured, predefined, pre-established and/or preprovisioned tunnel port number, the tunnel port number having a one-to-one correspondence with the associated destination port number; iii) assembling a packet segment, the packet segment comprising the payload, an associated user-application identifier, and a payload data type descriptor; and iv) requesting encrypted communication over an encrypted communication pathway of a network packet, the network packets comprising the tunnel port number and the assembled packet segment, the encrypted communication pathway having a one-to-one correspondence with the tunnel port number.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on all port-to-network communications of the plurality of processor nodes, the performing communication processing functions comprising: i) receiving data packets from source ports, the data packets having payloads and associated destination port numbers; ii) verifying that the source ports are authorized to communicate with ports having the associated destination port numbers; iii) assembling packet segments, each one of the packet segments comprising one of the payloads, an associated user-application identifier, and a payload data type descriptor; and iv) requesting transmission of network packets through encrypted communication pathways, each one of the network packets comprising a port number of one of the associated destination port numbers and one of the assembled packet segments, each one of the encrypted communication pathways having a one-to-one correspondence with one of the associated destination port numbers.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on all port-to-network communications of the plurality of processor nodes, the performing communication processing functions comprising: i) receiving a data packet from a source port, the data packet having a payload and an associated destination port number; ii) verifying that the source port is authorized to communicate with a port having the associated destination port number; iii) assembling a packet segment, the packet segments comprising the payload, an associated user-application identifier, and a payload data type descriptor; and iv) requesting transmission of a network packet through an encrypted communication pathway, the network packets comprising the associated destination port number and the assembled packet segment, the encrypted communication pathway having a one-to-one correspondence with the associated destination port number.

Certain embodiments may provide, for example, a product for managing communications of a plurality of networked processor nodes, the product comprising a computer-readable storage medium (for example a non-transitory computer-readable storage medium) having computer-readable program code embodied therein, the computer-readable program code executable by a processor to perform communication management operations, the communication management operations comprising: performing communication processing functions on at least a portion of network-to-port communications (including, for example, on all network-to-port communications) received by the plurality of processor nodes. In certain embodiments, for example, the performing communication processing functions may comprise obtaining tunnel port numbers, metadata (for example metadata encrypted using a single-use cryptographic key), and payloads associated with network packets. In certain embodiments, for example, the performing communication processing functions may comprise identifying preconfigured, predefined, pre-established and/or preprovisioned destination port numbers and preconfigured, predefined, pre-established and/or preprovisioned authorization codes associated with the tunnel port numbers, each one of the authorization codes comprising a preconfigured, predefined, pre-established and/or preprovisioned user-application process identifier and a preconfigured, predefined, pre-established and/or preprovisioned payload data-type identifier associated with one of the obtained tunnel port numbers. In certain embodiments, for example, the performing communication processing functions may comprise authorizing the network packets, comprising: comparing (for example comparing in application spaces or kernel spaces of the plurality of nodes) metadata with the authorization codes. In certain embodiments, for example, the performing communication processing functions may comprise requesting transmission (for example across loopback interfaces, by TUN/TAP interfaces, or by kernel read and/or write calls) of payloads from the authorized network packets to destinations referenced by the destination port numbers. In certain embodiments, for example, the payloads may be passed to the destination port numbers by one or more loopback interfaces.

A. In certain embodiments, for example, the obtaining, identifying, authorizing, and requesting may be transparent to all user-application processes on the plurality of networked nodes (for example by employing modified network application programming interface functions (for example in a modified operating system) while maintaining standard syntax). In certain embodiments, for example, the obtaining, identifying, authorizing, and requesting may be self-executing and/or automatic (for example requiring no human intervention, no interruption in computer execution other than ordinary, temporary process scheduling).

B. In certain embodiments, for example, the communication processing functions may be performed at 95% of wire speed or greater and less than 10% of the processor load may be committed to network communications. In certain embodiments, for example, the destinations may comprise user-application processes. In certain embodiments, for example, the program code may be middleware positioned between the network and the destinations referenced by the destination port number. In certain embodiments, for example, the communication processing functions may further comprise: dropping network packets if they are not authorized following the comparing (for example dropping network packets for which the metadata does not match expected values based on the authorization codes).

C. In certain embodiments, for example, the communication processing functions may further comprise: setting connection status indicators to a non-operative state if more than a fixed number of network packets are not authorized following the comparing. In certain embodiments, for example, the communication processing functions may further comprise: checking, the checking at least partially performed in kernels of the plural networked nodes, a connection status of the network. In certain embodiments, for example, the communication processing functions may further comprise: dropping network packets that are received via one or more network tunnels whose connection status indicators are set to a non-operative state.

Certain embodiments may comprise, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on at least a portion of network-to-port communications (including, for example, on all network-to-port communications) received by the plurality of processor nodes, the performing communication processing functions comprising: i) obtaining tunnel port numbers, metadata, and payloads associated with network packets; ii) identifying preconfigured, predefined, pre-established and/or preprovisioned destination port numbers and preconfigured, predefined, pre-established and/or preprovisioned authorization codes associated with the tunnel port numbers, each one of the authorization codes comprising a preconfigured, predefined, pre-established and/or preprovisioned user-application identifier and a preconfigured, predefined, pre-established and/or preprovisioned payload data-type identifier associated with one of the obtained tunnel port numbers; iii) authorizing the network packets, comprising: comparing at least a portion of the metadata with the authorization codes; and iv) requesting transmission of payloads from the authorized network packets to destinations referenced by the destination port numbers.

Certain embodiments may comprise, for example, a computer program product for managing communications of a networked nodes comprising a processor, the computer program product comprising a non-transitory computer-readable storage medium having computer-readable program code embodied therein, the computer-readable program code executable by the processor to perform communication management operations, the communication management operations comprising: performing communication processing functions on all network-to-port communications received by the networked node, the performing communication processing functions comprising: i) obtaining a tunnel port number, metadata, and a payload associated with a network packet received by the networked node; ii) identifying a preconfigured, predefined, pre-established and/or preprovisioned destination port number and a preconfigured, predefined, pre-established and/or preprovisioned authorization code associated with the tunnel port number, the authorization code comprising a preconfigured, predefined, pre-established and/or preprovisioned user-application identifier and a preconfigured, predefined, pre-established and/or preprovisioned payload data-type identifier associated with the obtained tunnel port number; iii) authorizing the network packet, comprising: comparing the metadata with the authorization code; and iv) requesting transmission of the payload to a destination referenced by the destination port number.

Certain embodiments may provide, for example, a product for managing communications of a plurality of networked processor nodes, the product comprising a computer-readable storage medium (for example a non-transitory computer-readable storage medium) having computer-readable program code embodied therein, the computer-readable program code executable by a processor to perform communication management operations, the communication management operations comprising: performing communication processing functions on at least a portion of network-to-port communications (including, for example, on all network-to-port communications) received by the plurality of processor nodes. In certain embodiments, for example, the performing communication processing functions may comprise obtaining destination port numbers, metadata, and payloads associated with network packets. In certain embodiments, for example, the performing communication processing functions may comprise identifying preconfigured, predefined, pre-established and/or preprovisioned authorization codes associated with the destination port numbers, each one of the authorization codes comprising a preconfigured, predefined, pre-established and/or preprovisioned user-application identifier and a preconfigured, predefined, pre-established and/or preprovisioned payload data-type identifier associated with one of the destination port numbers. In certain embodiments, for example, the performing communication processing functions may comprise authorizing the network packets, comprising: comparing at least a portion of the metadata with the authorization codes. In certain embodiments, for example, the performing communication processing functions may comprise requesting transmission of payloads from the authorized network packets to destinations referenced by the destination port numbers.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on all network-to-port communications received by the plurality of processor nodes, the performing communication processing functions comprising: i) obtaining destination port numbers, metadata, and payloads associated with network packets; ii) identifying preconfigured, predefined, pre-established and/or preprovisioned authorization codes associated with the destination port numbers, each one of the authorization codes comprising a preconfigured, predefined, pre-established and/or preprovisioned user-application identifier and a preconfigured, predefined, pre-established and/or preprovisioned payload data-type identifier associated with one of the destination port numbers; iii) authorizing the network packets, comprising: comparing at least a portion of the metadata with the authorization codes; and iv) requesting transmission of payloads from the authorized network packets to destinations referenced by the destination port numbers.

Certain embodiments may provide, for example, a product for managing communications of a plurality of networked processor nodes, the product comprising a non-transitory computer-readable storage medium having computer-readable program code embodied therein, the computer-readable program code executable by a processor to perform communication management operations, the communication management operations comprising: performing communication processing functions on all network-to-port communications received by the plurality of processor nodes, the performing communication processing functions comprising: i) obtaining a tunnel port number, metadata, and a payload associated with a network packet received by the networked node; ii) identifying a preconfigured, predefined, pre-established and/or preprovisioned destination port number and a preconfigured, predefined, pre-established and/or preprovisioned authorization code associated with the tunnel port number, the authorization code comprising a preconfigured, predefined, pre-established and/or preprovisioned user-application identifier and a preconfigured, predefined, pre-established and/or preprovisioned payload data-type identifier associated with the obtained tunnel port number; iii) authorizing the network packet, comprising: comparing the metadata with the authorization code; and iv) requesting transmission of the payload to a destination referenced by the preconfigured, predefined, pre-established and/or preprovisioned destination port number.

Certain embodiments may provide, for example, a method for authorized network communication, comprising: detecting a request by a first application present on a first node to transmit data to a destination port associated with a second application present on a second node, validating the authority of the first application to transmit the data to the destination port at least by checking a preconfigured list present on the first node, passing the data from the first application to a first middleware on the first node, and mutual authorization and authentication of the first node and the second node, the first application and the second application, and a data protocol of the data. In certain further embodiments, for example, the method may further comprise transmitting a network packet containing the data through a network tunnel (for example a network tunnel configured according to User Datagram Protocol (UDP), a "mid-weight" UDP comprising UDP plus additional connection acknowledgments devised to increase reliability of a UDP connection, or Transmission Control Protocol (TCP)), the network tunnel extending from the first middleware to a second middleware present on the second node, the network tunnel initialized based on the detected request, the initialization based at least on the mutual authentication and authorization.

A. In certain embodiments, for example, the first node may be a first computing device. In certain embodiments, for example, the first node may comprise a first processor, a first kernel, a first network stack, a first loopback interface, a first network application programming interface of the first network stack, and a first non-transitory computer-readable storage medium. In certain embodiments, for example, the second node may comprise a second processor, a second kernel, a second network stack, and a second non-transitory computer-readable storage medium. In certain embodiments, for example, the detecting may be performed by a first execution thread being executed by the first processor, and at least a portion of the validating may be performed by a second execution thread being executed by the first processor. In certain embodiments, for example, the detecting and the validating may be performed by a first execution thread being executed by the first processor, and at least a portion of the mutual authorization and authentication may be performed by a second execution thread being executed by the first processor. In certain embodiments, for example, the validating may be performed by the first middleware. In certain embodiments, for example, execution of the first middleware may be distributed at least between a first execution thread and a second execution thread being executed by the first processor. In certain embodiments, for example, the request from the first application may be passed through the first loopback interface to the first middleware. In certain embodiments, for example, the request from the first application may not be passed through the first loopback interface to the first middleware. In certain embodiments, for example, the request from the first application may be passed through a shim in the first network stack to the first middleware. In certain embodiments, for example, the request from the first application may be passed from the first network application programming interface directly to the first middleware. In certain embodiments, for example, the data may be passed through the loopback interface to the first middleware. In certain embodiments, for example, the data may not be passed through the first loopback interface to the first middleware. In certain embodiments, for example, the data may be passed through a shim in the first network stack to the first middleware. In certain embodiments, for example, the data may be passed from the first network application programming interface directly to the first middleware. In certain embodiments, for example, the detecting may comprise receiving (or intercepting), by the first middleware, the request. In certain embodiments, for example, the detecting may occur in the first network stack. In certain embodiments, for example, the detecting may occur in the first network application programming interface.

B. In certain embodiments, for example, at least a portion of the first middleware may comprise a kernel driver. In certain embodiments, for example, at least a portion of the first middleware may comprise a kernel module process.

C. In certain embodiments, for example, the method may further comprise: preventing the first application and the second application from associating with any socket comprising a physical interface. In certain embodiments, for example, the method may further comprise: preventing any port associated with the first application from binding with a physical interface. In certain embodiments, for example, the method may further comprise: preventing any port associated with the second application from binding with a physical interface. In certain embodiments, for example, the method may further comprise: preventing any port associated with the first application from binding with a physical interface, preventing any port associated with the second application from binding with a physical interface.

D. In certain embodiments, for example, the network tunnel may be encrypted. In certain further embodiments, for example, at least a portion of the network packet (for example the payload, a portion of the payload, or a metadata portion of the payload) may be encrypted using a symmetric key algorithm (for example a symmetric key algorithm such as an Advanced Encryption Standard (AES) algorithm (for example 256-bit AES). In certain further embodiments, for example, the symmetric key may be obtained by executing a key exchange algorithm (for example Elliptic-Curve Diffie-Hellman (ECDH) key exchange). In certain further embodiments, for example, the symmetric key may be a single-use key. In certain further embodiments, for example, the symmetric key may be obtained by rotating a key derived from ECDH key exchange.

E. In certain embodiments, for example, the data protocol may be obtained from metadata present in the network packet. In certain further embodiments, for example, the metadata may be encrypted.

F. In certain embodiments, for example, the metadata may comprise a connection state indicator for the network tunnel. In certain embodiments, for example, a connection state indicator for the network tunnel may be inserted into the metadata by the first middleware. In certain embodiments, for example, a second middleware present on the second node may determine a connection state of the network tunnel by inspecting the metadata (for example by decrypting encrypted metadata followed by parsing the metadata).

G. In certain embodiments, for example, at least a portion of the validating (for example all of the validating) may be performed by the first middleware. In certain further embodiments, for example, validating may comprise the first middleware inspecting a connection state of the network tunnel (for example checking a port state of an endpoint of the network tunnel such as a network tunnel endpoint present on the first node). In certain embodiments, for example, validating may comprise matching a 2-tuple comprising a destination port number of the destination port and a unique first application identifier of the first application with record present in the preconfigured list.

H. In certain embodiments, for example, the network tunnel may be encrypted based on executing an encryption algorithm (for example encrypted based on executing a key exchange algorithm) and the mutual authentication and authorization of the first node and the second node may be performed separately from the executing the encryption algorithm (for example may be performed after the executing the encryption algorithm). In certain embodiments, for example, the mutual authentication and authorization of the first node and the second node may comprise encrypting a first node identification code using a cryptographic key derived from the executing the key exchange algorithm. In certain further embodiments, for example, the cryptographic key may be nonpublic (for example the cryptographic key may be a shared secret between the first middleware and a second middleware executing on the second node). In certain embodiments, for example, the mutual authentication and authorization of the first node and the second node may comprise: (a) encrypting a first node identification code using a first cryptographic key derived from the executing the key exchange algorithm, and (b) encrypting a second node identification code using a second cryptographic key (for example a second cryptographic key that is different from the first cryptographic key) derived from the executing the key exchange algorithm. In certain further embodiments, for example, the cryptographic key may be nonpublic (for example the first cryptographic key and the second cryptographic key may each be a shared secret between the first middleware and a second middleware executing on the second node).

I. In certain embodiments, for example, the mutual authentication and authorization of the first node and the second node may be independent of mutual authentication and authorization of the first application and the second application and/or mutual authentication and authorization of the data protocol. In certain embodiments, for example, the mutual authentication and authorization of the first node and the second node may be independent of initializing the network tunnel. In certain embodiments, for example, the mutual authentication and authorization of the first node and the second node may occur after the network tunnel is initialized. In certain embodiments, for example, the exchange of the data protocol identifier between the first node and the second node may occur during initialization of the network tunnel to at least partially authorize the network tunnel.

J. In certain embodiments, for example, mutual authorization and authentication of the first application and the second application may comprise key exchange (for example by execution of a key exchange algorithm such as ECDH) during initialization of the network tunnel. In certain embodiments, for example, a first private key associated with the first application and a second private key associated with the second application may be used during the key exchange. In certain embodiments, for example, the first private key may be uniquely associated with the first application and the second private key may be uniquely associated with the second application. In certain embodiments, for example, the first private key may be uniquely associated with the first application and a user (for example a single-user) of the first application and the second private key may be uniquely associated with the second application and a user (for example a single-user) of the second application.

K. In certain embodiments, for example, mutual authorization and authentication of the first application and the second application may comprise encrypting a unique first application identifier and sending the encrypted unique first application identifier from the first node to the second node, followed by decrypting the unique first application identifier and comparing the unique first application identifier to a predetermined first identifier value that is specific to the network tunnel. In certain further embodiments, for example, mutual authorization and authentication of the first application and the second application may comprise encrypting a unique second application identifier and sending the encrypted unique second application identifier from the second node to the first node, followed by decrypting the unique second application identifier and comparing the unique second application identifier to a predetermined second identifier value that is specific to the network tunnel. In certain embodiments, for example, the unique first application identifier may comprise a first application identifier and an associated first user identifier. In certain embodiments, for example, the unique second application identifier may comprise a second application identifier and an associated second user identifier. In certain embodiments, for example, the unique first application identifier and the unique second application identifier may be exchanged during initialization of the network tunnel to at least partially authorize the network tunnel. In certain embodiments, for example, the network packet may contain the unique first application identifier. In certain embodiments, for example, mutual authentication and authorization of the data protocol may further comprise encrypting a data protocol identifier and sending the encrypted data protocol identifier from the first node to the second node, followed by decrypting the data protocol identifier and comparing the data protocol identifier to a predetermined data protocol identifier value that is specific to the network tunnel. In certain further embodiments, for example, mutual authorization and authentication of data protocol may comprise encrypting a data protocol identifier and sending the encrypted data protocol identifier from the second node to the first node, followed by decrypting the data protocol identifier and comparing the data protocol identifier to a predetermined data protocol identifier value that is specific to the network tunnel. In certain embodiments, for example, the above-described exchange of the data protocol identifier between the first node and the second may be performed during initialization of the network tunnel to at least partially authorize the network tunnel. In certain embodiments, for example, the network packet may contain the unique first application identifier. In certain embodiments, for example, mutual authentication and authorization of the first application and second application and mutual authentication and authorization of the data protocol may be combined. In certain further embodiments, for example, a first combined identifier comprising the unique first application identifier and the data protocol identifier may be encrypted and sent from the from the first node to the second node, followed by decrypting the first combined identifier and comparing the first combined identifier to a predetermined first combined identifier value that is specific to the network tunnel. In certain further embodiments, for example, a second combined identifier comprising the unique second application identifier and the data protocol identifier may be encrypted and sent from the from the second node to the first node, followed by decrypting the second combined identifier and comparing the second combined identifier to a predetermined second combined identifier value that is specific to the network tunnel. In certain embodiments, for example, the first combined identifier and the second combined identifier may be exchanged during initialization of the network tunnel to at least partially authorize the network tunnel. In certain embodiments, for example, the network packet may contain the unique first application identifier. In certain embodiments, for example, the first application identifier and the first user identifier may be obtained from a process status request (for example a "ps" command in Linux).

L. In certain embodiments, for example, the method may comprise detecting a request by the second application to open a port. In certain embodiments, for example, the method may comprise validating the authority of the second application to open the port at least by checking a further preconfigured list present on the second node, processor, or computing device. In certain embodiments, for example, the checking the further preconfigured list may comprise matching at least a portion of a member of the further preconfigured list with a 2-tuple comprising (a) a unique identifier for the second application and the user of the second application and (b) a port number associated with the port. In certain further embodiments, for example, the port may be the destination port.

M. In certain embodiments, for example, the method may further comprise: communicating the data from a second middleware present on the second node to the second application.

Certain embodiments may provide, for example, a method for authorized network communication. In certain embodiments, for example, the method may comprise: detecting (for example receiving or intercepting) a request by a first application present on a first node (for example a computing device such as an edge device in an Internet-of-Things) to transmit data to a second application present on a second node, validating the authority of the first application to transmit the data, passing the data from the first application to a first middleware on the first node, transmitting a network packet (for example an Internet Protocol (IP) packet) containing the data through a network tunnel (for example an encrypted network tunnel), and testing the authority of the second application to receive the data.

A. In certain further embodiments, for example, the validating may be based at least on a first port number (for example a transport layer port number according to the OSI model). In certain further embodiments, for example, the first application may comprise a computer program executing on the first node and the first port number may be associated with the first application. In certain embodiments, for example, the first middleware may comprise a computer program executing on the first node and the first port number may be associated with the first middleware (for example the port number may be associated with the second middleware and may be an endpoint of the network tunnel). In certain embodiments, for example, the first port number may be predetermined prior to the initialization of the network tunnel. In certain embodiments, for example, the first port number may be assigned dynamically during initialization of the network tunnel.

B. In certain embodiments, for example, the network tunnel may extend from the first middleware to a second middleware present on the second node (for example the network tunnel may extend from a port associated with the first middleware to a different port associated with the second middleware. In certain further embodiments, for example, the network tunnel may be initialized based on the detected request (for example, the initialization may be triggered by the detected request). In certain further embodiments, for example, the initialization may be based at least on mutual authentication and authorization of the first node and the second node (for example by exchange of encrypted node identification codes).

C. In certain embodiments, for example, the testing may be based at least on a second port number and a data protocol of the data. In certain further embodiments, for example, the second port number may be associated with a computer program executing on the second node, processor, or computing device. In certain further embodiments, for example, the second port number may be associated with the second application. In certain embodiments, for example, the second port number may be associated with a second middleware (for example the port number may be associated with the second middleware and may be an endpoint of the network tunnel). In certain embodiments, for example, the second port number may be predetermined prior to the initialization of the network tunnel. In certain embodiments, for example, the second port number may be assigned dynamically during initialization of the network tunnel.

D. In certain embodiments, for example, the first node may be a first computing device. In certain embodiments, for example, the first node may comprise a first processor, a first kernel, a first network stack, a first loopback interface, a first network application programming interface of the first network stack, and a first non-transitory computer-readable storage medium. In certain embodiments, for example, the second node may comprise a second processor, a second kernel, a second network stack, and a second non-transitory computer-readable storage medium. In certain embodiments, for example, the detecting may be performed by a first execution thread being executed by the first processor and at least a portion of the testing may be performed by a second execution thread being executed by the first processor. In certain embodiments, for example, the validating may be performed by the first middleware. In certain further embodiments, for example, the validating may be performed by the first execution thread. In certain further embodiments, for example, the validating may be performed by the second execution thread. In certain embodiments, for example, execution of the first middleware may be distributed at least between the first execution thread and the second execution thread. In certain embodiments, for example, the request from the first application may be passed through the first loopback interface to the first middleware. In certain embodiments, for example, the request from the first application may not be passed through the first loopback interface to the first middleware. In certain embodiments, for example, the request from the first application may be passed through a shim in the first network stack to the first middleware. In certain embodiments, for example, the request from the first application may be passed from the first network application programming interface directly to the first middleware. In certain embodiments, for example, the data may be passed through the loopback interface to the first middleware. In certain embodiments, for example, the data may not be passed through the first loopback interface to the first middleware. In certain embodiments, for example, the data may be passed through a shim in the first network stack to the first middleware. In certain embodiments, for example, the data may be passed from the first network application programming interface directly to the first middleware. In certain embodiments, for example, the detecting may comprise receiving or intercepting, by the first middleware, the request. In certain embodiments, for example, the detecting may occur in the first network stack. In certain embodiments, for example, the detecting may occur in the first network application programming interface.

E. In certain embodiments, for example, at least a portion of the first middleware may comprise a kernel driver. In certain embodiments, for example, at least a portion of the first middleware may comprise a kernel module process.

F. In certain embodiments, for example, the method may further comprise: preventing the first application and the second application from associating with any socket comprising a physical interface. In certain embodiments, for example, the method may further comprise: preventing any port associated with the first application from binding with a physical interface. In certain embodiments, for example, the method may further comprise: preventing any port associated with the second application from binding with a physical interface. In certain embodiments, for example, the method may further comprise: preventing any port associated with the first application from binding with a physical interface, preventing any port associated with the second application from binding with a physical interface.

G. In certain embodiments, for example, the network tunnel may be encrypted. In certain further embodiments, for example, at least a portion of the network packet (for example the payload, a portion of the payload, or a metadata portion of the payload) may be encrypted using a symmetric key algorithm (for example a symmetric key algorithm such as an Advanced Encryption Standard (AES) algorithm (for example 256-bit AES). In certain further embodiments, for example, the symmetric key may be obtained by Diffie-Hellman key exchange (for example Elliptic-Curve Diffie-Hellman (ECDH) key exchange). In certain further embodiments, for example, the symmetric key may be a single-use key. In certain further embodiments, for example, the symmetric key may be obtained by rotating a key derived from ECDH key exchange.

H. In certain embodiments, for example, the data protocol may be obtained from metadata present in the network packet. In certain further embodiments, for example, the metadata may be encrypted.

I. In certain embodiments, for example, the metadata may comprise a connection state indicator for the network tunnel. In certain embodiments, for example, a connection state indicator for the network tunnel may be inserted into the metadata by the first middleware. In certain embodiments, for example, a second middleware present on the second node may determine a connection state of the network tunnel by inspecting the metadata (for example by decrypting encrypted metadata followed by parsing the metadata).

J. In certain embodiments, for example, at least a portion of the validating (for example all of the validating) may be performed by the first middleware. In certain further embodiments, for example, validating may comprise the first middleware inspecting a connection state of the network tunnel (for example checking a port state of an endpoint of the network tunnel such as a network tunnel endpoint present on the first node). In certain embodiments, for example, validating may comprise matching a 2-tuple comprising the first port number and an application identifier with a predetermined, pre-authorized 2-tuple. In certain further embodiments, for example, the application identifier may comprise an application code and an application user code. In certain embodiments, for example, the application identifier and the application user code may be constructed based on a process status command (for example the "ps"

command in Linux). In certain embodiments, for example, validating may comprise matching a 3-tuple comprising the first port number, an application identifier, and an application user with a predetermined, pre-authorized 3-tuple. In certain embodiments, for example, at least a portion of the validating (for example all of the validating) may be performed by a second middleware present on the second node, processor, or computing device. In certain embodiments, for example, a first portion of the validating may be performed by the first middleware and a second portion of the validating may be performed by the second middleware.

K. In certain embodiments, for example, validating may comprise the second middleware inspecting the metadata. In certain embodiments, for example, validating may comprise the second middleware inspecting the metadata to determine a connection state of the network tunnel. In certain embodiments, for example, validating may comprise the second middleware inspecting the metadata to verify the first application is authorized. In certain embodiments, for example, validating may comprise the second middleware inspecting the metadata to verify a user of the first application is an authorized user of the first application. In certain embodiments, for example, validating may comprise the second middleware inspecting the metadata to verify a data protocol of the data is an authorized data protocol. In certain embodiments, for example, validating may comprise the second middleware inspecting the metadata to verify a descriptor comprising at least a portion of the user of the first application, at least a portion of the first application, and at least a portion of the data protocol matches a pre-stored, pre-authorized value for the descriptor.

L. In certain further embodiments, for example, the pre-stored, pre-authorized value may be selected based on (for example the pre-stored, pre-authorized value may be indexed by) at least one port number associated with the first application. In certain further embodiments, for example, the pre-stored, pre-authorized value may be selected based on at least one port number associated with the second application. In certain further embodiments, for example, the pre-stored, pre-authorized value may be selected based on at least one port number associated with the first middleware. In certain further embodiments, for example, the pre-stored, pre-authorized value may be selected based on at least one port number associated with the second middleware (for example the port number may be associated with the second middleware and may be an endpoint of the network tunnel).

M. In certain embodiments, for example, the initializing the network tunnel may comprise obtaining the predetermined, pre-authorized 2-tuple. In certain embodiments, for example, the initializing the network tunnel may comprise obtaining the predetermined, pre-authorized 3-tuple.

N. In certain embodiments, for example, the validating may comprise the first middleware verifying (for example verifying in a kernel of the first node) that data sent from the first application is permitted to pass through a first port identified by a first port number (for example wherein the first port number is a port number associated with the first middleware). In certain further embodiments, for example, the validating may comprise a second middleware present on the second node parsing metadata present in the network packet to obtain a descriptor comprising a first application component, a first application user component, and a data protocol component. In certain further embodiments, for example, the validating may comprise the second middleware looking up a predetermined value based on a destination port number of the network packet. In certain further embodiments, for example, the validating may comprise comparing the obtained descriptor with the looked-up, predetermined value. In certain embodiments, for example, at least a portion of the testing (for example all of the testing) may be performed by a second middleware present on the second node, processor, or computing device. In certain embodiments, for example, a first portion of the testing may be performed by the first middleware and a second portion of the testing may be performed by the second middleware. In certain embodiments, for example, the testing may comprise the second middleware inspecting metadata of the network packet. In certain further embodiments, for example, the testing may comprise the second middleware parsing the metadata to obtain a connection state indicator of the network tunnel. In certain embodiments, for example, the testing may comprise the second middleware comparing a destination port number of the network packet with a predetermined, pre-authorized destination port number.

O. In certain embodiments, for example, the testing may comprise testing, by at least a portion of a second middleware present on the second node (for example at least a portion of a middleware executing in a kernel of the second node), whether a destination port of the network packet matches an open, pre-authenticated second port number. In certain embodiments, for example, the open, pre-authenticated second port number may be pre-authenticated during the initialization of the tunnel network based on (a) being associated with the second middleware; (b) appearing in a record present on the second node, the record comprising the second application, a user of the second application, and a port number associated with the second application and the user of the second application; and (c) an open connection comprising the port number associated with the second application and the user of the second application.

P. In certain embodiments, for example, the method may further comprise: communicating the data from a second middleware present on the second node to the second application.

Q. In certain embodiments, for example, the mutual authentication and authorization of the first node and the second node may be independent of initializing the network tunnel. In certain embodiments, for example, the mutual authentication and authorization of the first node and the second node may occur after the network tunnel is initialized. In certain embodiments, for example, the network tunnel may be encrypted based on executing an encryption algorithm (for example encrypted based on executing a key exchange algorithm) and the mutual authentication and authorization of the first node and the second node may be performed separately from the executing the encryption algorithm (for example may be performed after the executing the encryption algorithm). In certain embodiments, for example, the mutual authentication and authorization of the first node and the second node may comprise encrypting a first node identification code using a cryptographic key derived from the executing the key exchange algorithm. In certain further embodiments, for example, the cryptographic key may be nonpublic (for example the cryptographic key may be a shared secret between the first middleware and a second middleware executing on the second node). In certain embodiments, for example, the mutual authentication and authorization of the first node and the second node may comprise: (a) encrypting a first node identification code using a first cryptographic key derived from the executing the key exchange algorithm, and (b) encrypting a second node identification code using a second cryptographic key (for example a second cryptographic key that is different from the first cryptographic key) derived from the executing the key exchange algorithm. In certain further embodiments, for example, the cryptographic key may be nonpublic (for example the first cryptographic key and the second cryptographic key may each be a shared secret between the first middleware and a second middleware executing on the second node).

Certain embodiments may provide, for example, a method for authorized network communication, comprising: i) detecting a request by a first application present on a first node to transmit data to a second application present on a second node; ii) validating the authority of the first application to transmit the data, the validating based at least on a predetermined port number of the first application; iii) passing the data from the first application to a first middleware on the first node; iv) transmitting a network packet containing the data through a network tunnel, the network tunnel extending from the first middleware to a second middleware present on the second node, the network tunnel initialized based on the detected request, the initialization based at least on mutual authentication and authorization of the first node and the second node; and v) testing the authority of the second application to receive the data, the testing based at least on a predetermined port number of the second application and a data protocol of the data.

Certain embodiments may provide, for example, a method for authorized network communication. In certain embodiments, for example, the method may comprise detecting a request by a first application process on a first node to establish a connection for transmitting data having a data type to a second application process at a destination port number. In certain embodiments, for example, the method may comprise validating the authority of the first application process to transmit the data at least by checking a preconfigured list present on the first node for a combination of a first application process identifier and the destination port number. In certain embodiments, for example, the method may comprise passing the data from the first application process to a first middleware process on the first node, processor, or computing device. In certain embodiments, for example, the method may comprise establishing a dedicated encrypted communication pathway for transmitting data having the data type between the first application process and the second application process, the dedicated encrypted communication pathway extending from the first middleware process to a second middleware process on the second node, by mutual authentication and authorization of the first node and/or the second node, the first application process and/or the second application process, a first application process owner and/or a second application process owner, and/or a data protocol of the data.

A. In certain embodiments, for example, the data may be passed from the first application process to the first middleware process by a TCP connection. In certain embodiments, for example, the encrypted communication pathway may comprise a UDP connection. In certain embodiments, for example, the data may be passed from the first application process to the first middleware process by a TCP connection and the encrypted communication pathway may comprise a UDP connection. In certain embodiments, for example, the data may be passed from the second application process to the second middleware process by a further TCP connection. In certain embodiments, for example, the data may be passed from the first application process to the first middleware process by a TCP connection, the encrypted communication pathway may comprise a UDP connection, and the data may be passed from the second application process to the second middleware process by a further TCP connection.

Certain embodiments may provide, for example, a method for authorized network communication, comprising: i) detecting a request by a first application process on a first node to establish a connection for transmitting data having a data type to a second application process at a destination port number; ii) validating the authority of the first application process to transmit the data at least by checking a preconfigured list present on the first node for a combination of a first application process identifier and the destination port number; iii) passing the data from the first application process to a first middleware process on the first node; iv) establishing a dedicated encrypted communication pathway for transmitting data having the data type between the first application process and the second application process, the dedicated encrypted communication pathway extending from the first middleware process to a second middleware process on the second node, by mutual authentication and authorization of the first node and/or the second node, the first application process and/or the second application process, a first application process owner and/or a second application process owner, and/or a data protocol of the data.

Certain embodiments may provide, for example, plural nodes coupled to a network, wherein each data transfer between a first node of the plural nodes and a second node (for example each second node) of the plural nodes may be according to one of the foregoing methods for authorized communication. In certain further embodiments, for example, the plural nodes coupled to the network may define a software-defined network (for example plural virtual router switches cooperatively configured with one another).

Certain embodiments may provide, for example, a method to securely transport plural data packets (for example plural IP packets), comprising: configuring a data pathway from a first application (for example an application program) executing on a first node to a second application executing on a second node, and exchanging node identification codes over at least a portion of the data pathway to at least partially authorize the at least a portion of the data pathway. In certain further embodiments, for example, the method may comprise, for each one of the transported plural packets from the first application: executing operating system commands to verify that the at least partially authorized at least a portion of the data pathway remains unaltered; reading first application user and data protocol metadata to obtain at least one descriptor (for example at one 4-byte or 8-type descriptor); and comparing the at least one descriptor with members of a static list (for example a predetermined white list of authorized descriptors).

A. In certain embodiments, for example, the data pathway may transport packets exclusively between endpoints defined by the first application and the second application (for example a port associated with the first application and a port associated with the second application). In certain further embodiments, for example, the authorized at least a portion of the data pathway may transport packets exclusively on the data pathway.

B. In certain embodiments, for example, the at least a portion of the data pathway may be encrypted based on executing an encryption algorithm (for example encrypted based on executing a key exchange algorithm) and the exchanging node identification codes may be performed separately from the executing the encryption algorithm (for example may be performed after the executing the encryption algorithm). In certain embodiments, for example, the exchanging node identification codes may comprise encrypting a first node identification code using a cryptographic key derived from the executing the key exchange algorithm. In certain further embodiments, for example, the cryptographic key may be nonpublic (for example the cryptographic key may be a shared secret between the first middleware and a second middleware executing on the second node). In certain embodiments, for example, the exchanging node identification codes may comprise: (a) encrypting a first node identification code using a first cryptographic key derived from the executing the key exchange algorithm, and (b) encrypting a second node identification code using a second cryptographic key (for example a second cryptographic key that is different from the first cryptographic key) derived from the executing the key exchange algorithm. In certain further embodiments, for example, at least one of the node identification codes may be nonpublic (for example the first node identification code and the second node identification code may each be a shared secret between a network security software executing on the first node and a network security software executing on the second node).

C. In certain embodiments, for example, the method may comprise decrypting the first application user and data protocol metadata prior to the reading.

D. In certain embodiments, for example, the at least one descriptor may be an n-tuple, wherein n may be at least 2 (for example a 2-tuple). In certain embodiments, for example, the n-tuple may be an at least a 2-tuple, an at least a 3-tuple, an at least a 5-tuple, an at least a 6-tuple, an at least an 8-tuple, an at least a 10-tuple, or an at least a 12-tuple.

E. In certain embodiments, for example, the static list may be present on the second node, processor, or computing device. In certain embodiments, for example, the comparing may be performed on the second node, processor, or computing device.

F. In certain embodiments, for example, the executing operating system commands may verify that a packet originated from an authenticated, authorized process on the first node, processor, or computing device. In certain further embodiments, for example, the verifying may comprise inspecting packet metadata to confirm that a packet originated from an authorized user on the first node, processor, or computing device.

G. In certain embodiments, for example, the executing operating system commands may comprise checking a connection state of the at least partially authorized at least a portion of the data pathway. In certain further embodiments, for example, said checking may comprise parsing packet metadata. In certain further embodiments, for example, said checking may comprise comparing the parsed metadata to members of a list of connections. In certain further embodiments, for example, each member of the list of connections may comprise a connection status indicator. In certain embodiments, for example, one or more members of the list of connections may comprise a disallowed flag indicating, when the disallowed flag is set to a predetermined value, that the at least partially authorized at least a portion of the data pathway is disallowed. In certain further embodiments, for example, the method may comprise terminating the at least partially authorized at least a portion of the data pathway if the checking the connection status, based on detecting the disallowed flag, determines that the at least partially authorized at least a portion of the data pathway is disallowed. In certain embodiments, for example, the connection status of a member of the list of connections may be updated at least based on the parsed metadata. In certain further embodiments, for example, a disallowed flag of a member of the list of connections may be set at least based on the parsed metadata.

H. In certain embodiments, for example, the method may further comprise, for each one of the transported plural packets from the first application: comparing a destination port number with a white list of authorized destination port numbers.

Certain embodiments may provide, for example, a method to securely transport plural data packets, comprising: i) configuring a data pathway from a first application executing on a first node to a second application executing on a second node; ii) exchanging node identification codes over at least a portion of the data pathway to at least partially authorize the at least a portion of the data pathway; and iii) for each one of the transported plural packets from the first application: a) executing operating system commands to verify that the at least partially authorized at least a portion of the data pathway remains unaltered; b) reading first application user and data protocol metadata to obtain at least one descriptor; and c) comparing the at least one descriptor with a static list of authorized descriptors.

Certain embodiments may provide, for example, a multifactor method having overlapping security layers to securely transport plural data packets from a first application executing on a first node to a second application executing on a second node, processor, or computing device. In certain embodiments, for example, each one of the plural data packets may share a common data protocol with each other one of the plural data packets. In certain further embodiments, for example, the method may comprise: configuring a series of dedicated network tunnels, and exchanging and authorizing node identification codes over the encrypted second middleware tunnel using at least two single-use cryptographic keys to authorize the second network tunnel independently of the configuring. In certain further embodiments, for example, the series of network tunnels may comprise: a first network tunnel between a first application port associated with the first application and a first security middleware port associated with first security middleware on the first node, a second network tunnel between the first security middleware port and a second security middleware port associated with second security middleware on the second node, the second network tunnel encrypted based on shared secret cryptography, and a third network tunnel between the second security middleware port and a second application port associated with a second application on the second node, processor, or computing device. In certain further embodiments, for example, the method may comprise, for each one of the transported plural data packets arriving at the second security middleware port: executing operating system commands to verify that connection states of the series of dedicated network tunnels are unchanged, encrypting, inserting, decrypting, and reading first application user and data protocol metadata, the encrypting and decrypting each using a single-use cryptographic key, and comparing the first application user and data protocol metadata with members of a static list (for example a static list of authorized 2-tuples).

Certain embodiments may provide, for example, a multifactor method having overlapping security layers to securely transport plural data packets from a first application executing on a first node to a second application executing on a second node, each one of the plural data packets sharing a common data protocol with each other one of the plural data packets, comprising: i) configuring a series of dedicated network tunnels comprising: a) a first network tunnel between a first application port associated with the first application and a first security middleware port associated with first security middleware on the first node; b) a second network tunnel between the first security middleware port and a second security middleware port associated with second security middleware on the second node, the second network tunnel encrypted based on shared secret cryptography; and c) a third network tunnel between the second security middleware port and a second application port associated with a second application on the second node; ii) exchanging and authorizing node identification codes over the encrypted second middleware tunnel using at least two single-use cryptographic keys to authorize the second network tunnel independently of the configuring; and for each one of the transported plural data packets arriving at the second security middleware port: iii) executing operating system commands to verify that connection states of the series of dedicated network tunnels are unchanged; iv) encrypting, inserting, decrypting, and reading first application user and data protocol metadata, the encrypting and decrypting each using a single-use cryptographic key; and v) comparing the first application user and data protocol metadata with members of a static list.

Certain embodiments may provide, for example, a method to provision resources for authorized communication over a network, comprising: detecting an attempt by a first user of a first program to trigger a transmission of data from a first port on a first node to a second port on a second node, filtering the attempt to determine whether the attempt is permissible, and if the attempt is permissible, configuring a data pathway for transmitting the data, the data pathway comprising a third port and a fourth port each interposed between the first port and the second port. In certain further embodiments, for example, the filtering may be based at least on: identity of the first user, identity of the first program, and the second port.

A. In certain embodiments, for example, the attempt may comprise a connection request (for example a connection request initiated at a network application programming interface).

B. In certain embodiments, for example, the configuring may further comprise recording a connection state of at least a portion of the data pathway. In certain embodiments, for example, the configuring may further comprise recording a connection state of at least a portion of the data pathway having the third port and the fourth port as endpoints. In certain embodiments, for example, the configuring may further comprise recording a connection state of the data pathway.

C. In certain embodiments, for example, the determining may comprise comparing the attempt to a list of permissible attempts.

D. In certain embodiments, for example, at least a portion of the list of permissible attempts may be maintained on the first node solely in kernel random access memory. In certain further embodiments, for example, the at least a portion of the list of permissible attempts may comprise a list of data destination ports and, for each member of the list of destination ports, a user (for example a user of an application associated with the destination port). In certain further embodiments, for example, the at least a portion of the list of permissible attempts may comprise an application program. In certain embodiments, for example, the at least a portion of the list of permissible attempts may be accessible solely by a singular program executing in the kernel. In certain further embodiments, for example, the at least a portion of the list of permissible attempts may be loaded into the kernel random access memory of the first node from a file (for example a file resident on a non-transitory computer-readable storage medium (for example a nonvolatile memory) of the first node) solely by a different singular program.

E. In certain embodiments, for example, the file may be cryptographically signed. In certain embodiments, for example, the file may be encrypted. In certain embodiments, for example, the file may be read-only. In certain embodiments, for example, the file may be a kernel access-only file. In certain embodiments, for example, the file may be a kernel access-only file. In certain embodiments, for example, the file may not be a kernel access-only file. In certain embodiments, for example, the file may be a binary file. In certain embodiments, for example, the file may be accessible from the first node solely be a single program (for example a program executing in an OSI application layer of the first node) executing on a processor of the first node, processor, or computing device. In certain embodiments, for example, the file may be a read-only, encrypted file readable only by a single program executing on a processor of the first node, processor, or computing device.

F. In certain embodiments, for example, the first port, second port, third port, and fourth port may each be restricted to establishing no more than a single data communications session. In certain embodiments, for example, the data may pass through each port.

G. In certain embodiments, for example, the first port may be exclusively associated with a first user mode program. In certain embodiments, for example, the first port may be exclusively associated with a first application program. In certain embodiments, for example, the second port may be exclusively associated with a second user mode program. In certain embodiments, for example, the second port may be exclusively associated with a second application program. In certain embodiments, for example, the first port may be exclusively associated with a first user mode program and the second port may be exclusively associated with a second application program. In certain embodiments, for example, the first port may be exclusively associated with a first user mode program. In certain embodiments, for example, the first port may be exclusively associated with a first user mode program. In certain embodiments, for example, the second port may be exclusively associated with a second user mode program. In certain embodiments, for example, the second port may be exclusively associated with a second user mode program. In certain embodiments, for example, the first port may be exclusively associated with a first user mode program and the second port may be exclusively associated with a second user mode program.

H. In certain embodiments, for example, the data may be translated into a common format (for example a format based on MQ Telemetry Transport protocol) for transport between the third and fourth port.

Certain embodiments may provide, for example, a method of transmitting non-malicious packets of data over a network, comprising: loading data packet filters into random access memory on a first node coupled to the network, initializing a network tunnel (and/or an encrypted communication pathway) to transmit the data, assigning one of the loaded data packet filters to the network tunnel (and/or the encrypted communication pathway), passing packets of data from the transmitting application through the assigned data packet filter, encrypting at least a portion of the filtered packets, and transmitting through the network tunnel (and/or the encrypted communication pathway) only the filtered packets having at least a destination port number, a data source application, and a user of the data source application matching the assigned data packet filter.

A. In certain embodiments, for example, the data packet filter may further comprise a destination network address. In certain embodiments, for example, an encryption key used in the encrypting may be used only once. In certain embodiments, for example, initializing the network tunnel (and/or the encrypted communication pathway) may comprise shared secret cryptography. In certain embodiments, for example, the network tunnel (and/or the encrypted communication pathway) may be unidirectional. In certain embodiments, for example, the network tunnel (and/or the encrypted communication pathway) may be bidirectional. In certain embodiments, for example, each one of the data packet filters may comprise a sequential series of sub-filters.

Certain embodiments may provide, for example, a method of transmitting non-malicious packets of data over a network, comprising: loading data packet filters into random access memory on a first node coupled to the network, initializing a network tunnel (and/or an encrypted communication pathway) to receive the data, assigning one of the loaded data packet filters to the network tunnel (and/or the encrypted communication pathway), receiving packets of data from the network tunnel (and/or the encrypted communication pathway), passing the packets of data through the assigned data packet filter, and passing to an OSI application layer of the first node only the filtered packets having at least a destination port number, a data source application, a user of the data source application, and a data protocol descriptor matching the assigned data packet filter.

A. In certain embodiments, for example, filtered packets passed to the OSI application layer further may have a command type descriptor having a value and/or falling in a range specified by the assigned data packet filter. In certain embodiments, for example, filtered packets passed to the OSI application layer may further have a date and/or time falling in a range specified by the assigned data packet filter. In certain embodiments, for example, filtered packets passed to the OSI application layer further may have an expected elapse time falling in a range specified by the assigned data packet filter. In certain embodiments, for example, the data protocol descriptor may conform to an MQ Telemetry Transport protocol. In certain embodiments, for example, the data protocol descriptor may conform to a file transfer protocol. In certain embodiments, for example, the data protocol descriptor may conform to a domain name server protocol. In certain embodiments, for example, the data protocol descriptor may conform to an internet control message protocol. In certain embodiments, for example, the data protocol descriptor may conform to a structured query language protocol. In certain embodiments, for example, the data protocol descriptor may conform to a publish-subscribe messaging pattern protocol. In certain embodiments, for example, the data protocol descriptor may conform to a data distribution service protocol. In certain embodiments, for example, the data protocol descriptor may comprise a publish-subscribe topic identifier. In certain embodiments, for example, the data protocol descriptor may comprise a data structure identifier. In certain embodiments, for example, the data protocol descriptor may comprise a data type identifier. In certain embodiments, for example, the data protocol descriptor may comprise a data definition identifier.

Certain embodiments may comprise, for example, a method of transmitting non-malicious packets of data over a network. In certain embodiments, for example, the method may comprise: loading data packet filters into kernel random access memory (or in certain other embodiments, for example, loading the data packet filters in application space memory) on a first node coupled to the network, initializing a network tunnel (and/or an encrypted communication pathway) to transmit the data, assigning one of the loaded data packet filters to the network tunnel (and/or the encrypted communication pathway), passing packets of data from the transmitting application through the assigned data packet filter, encrypting at least a portion of the filtered packets, and transmitting through the network tunnel (and/or encrypted communication pathway) only the filtered packets having at least an application port number, an encrypted port number, a data protocol field, and a destination port number matching the assigned data packet filter.

A. In certain embodiments, for example, the data may be application program data. In certain embodiments, for example, the data may be a file or a portion thereof (for example an executable file). In certain embodiments, for example, an encryption key used in the encrypting may be a single-use key. In certain embodiments, for example, the encryption key may be used only once. In certain embodiments, for example, initializing the network tunnel (and/or the encrypted communication pathway) may comprise shared secret cryptography. In certain embodiments, for example, the network tunnel (and/or the encrypted communication pathway) may be unidirectional. In certain embodiments, for example, the network tunnel (and/or the encrypted communication pathway) may be bidirectional. In certain embodiments, for example, each one of the data packet filters may comprise a sequential series of sub-filters. In certain embodiments, for example, the method may further comprise: transmitting to the network only the filtered packets containing a parameter specifying a file size of a file, wherein the file size falls in a range specified by the assigned data packet filter. In certain embodiments, for example, the method may further comprise: transmitting to the network only the filtered packets containing a parameter specifying a command type, wherein the command type has a value and/or falls in a range specified by the assigned data packet filter. In certain embodiments, for example, the method may further comprise: transmitting to the network only the filtered packets containing a parameter specifying a date and/or time, wherein the specified data and/or time falls in a range specified by the assigned data packet filter. In certain embodiments, for example, the method may further comprise: transmitting to the network only the filtered packets containing a parameter specifying a an expected elapsed time, wherein the expected elapsed time falls in a range specified by the assigned data packet filter. In certain further embodiments, for example, the method may further comprise: transmitting to the network only the filtered packets having an actual and/or estimated transmission time falling in a range specified by the assigned data packet filter.

B. In certain embodiments, for example, the data protocol field may identify an MQTT protocol. In certain embodiments, for example, the data protocol field may conform to a publish-subscribe messaging pattern protocol (for example a data distribution service (DDS) protocol). In certain embodiments, for example, the data protocol field may identify a Constrained Application Protocol (CaOP). In certain embodiments, for example, the data protocol field may identify an OMA LightweightM2M (LWM2M) protocol. In certain embodiments, for example, the data protocol field may identify a JavaScript Object Notation (JSON) protocol. In certain embodiments, for example, the data protocol field may identify a Representational State Transfer (REST) protocol. In certain embodiments, for example, the data protocol field may identify an OPC Unified Architecture (OPC-UA) protocol. In certain embodiments, for example, the data protocol field may identify a file transfer protocol. In certain embodiments, for example, the data protocol field may identify a domain name server protocol. In certain embodiments, for example, the data protocol field may identify an internet control message protocol. In certain embodiments, for example, the data protocol field may identify a structured query language protocol. In certain embodiments, for example, the data protocol field may comprise a publish-subscribe topic identifier. In certain embodiments, for example, the data protocol field may comprise a data structure identifier. In certain embodiments, for example, the data protocol field may comprise a data type identifier. In certain embodiments, for example, the data protocol field may comprise a data definition identifier.

Certain embodiments may provide, for example, a network security product for managing all port-to-port communications of a networked processor node, processor, or computing device. In certain embodiments, for example, the product may comprise a non-transitory computer-readable storage medium having a configuration file embodied therein for processing in the networked processor node by network security software to define authorized port-to-port communications. In certain embodiments, for example, the configuration file may comprise a universal nonpublic identifier for the networked processor node, processor, or computing device. In certain further embodiments, for example, the configuration file may comprise a series of records comprising parameters for authorized port-to-port communications. In certain embodiments, for example, each of one or more of (for example each of) the series of records may comprise an identifier for an authorized application resident on the networked processor node, processor, or computing device. In certain embodiments, for example, each of one or more of (for example each of) the series of records may comprise an identifier for an authorized user associated with the authorized application resident on the networked processor node, processor, or computing device. In certain embodiments, for example, each of one or more of (for example each of) the series of records may comprise a universal nonpublic identifier for a remote networked processor node, processor, or computing device. In certain embodiments, for example, each of one or more of (for example each of) the series of records may comprise an identifier for an authorized application resident on the remote networked processor node, processor, or computing device. In certain embodiments, for example, each of one or more of (for example each of) the series of records may comprise an identifier for an authorized user associated with the authorized application resident on the remote networked processor node, processor, or computing device. In certain embodiments, for example, each of one or more of (for example each of) the series of records may comprise a port associated with the authorized application resident on the remote networked processor node, processor, or computing device. In certain embodiments, for example, each of one or more of (for example each of) the series of records may comprise a port associated with a network security software resident on the remote networked processor node, processor, or computing device. In certain embodiments, for example, each of one or more of (for example each of) the series of records may comprise a data protocol descriptor.

Certain embodiments may provide, for example, a network security product for managing all port-to-port communications of a networked processor node, processor, or computing device. In certain embodiments, for example, the product may comprise a non-transitory computer-readable storage medium having a configuration file embodied therein for processing in the networked processor node by network security software to define authorized port-to-port communications. In certain embodiments, for example, the configuration file may comprise a universal nonpublic identifier for the networked processor node, processor, or computing device. In certain further embodiments, for example, the configuration file may comprise a series of records comprising parameters for authorized port-to-port communications. In certain embodiments, for example, each of one or more of (for example each of) the series of records may comprise an identifier for an authorized application resident on the networked processor node, an identifier for an authorized user associated with the authorized application resident on the networked processor node, a universal nonpublic identifier for a remote networked processor node, an identifier for an authorized application resident on the remote networked processor node, an identifier for an authorized user associated with the authorized application resident on the remote networked processor node, and a data protocol descriptor. In certain further embodiments, for example, each of one or more of (for example each of) the series of records may comprise a port associated with the authorized application resident on the remote networked processor node, processor, or computing device. In certain embodiments, for example, each of one or more of (for example each of) the series of records may comprise a port associated with a network security software resident on the remote networked processor node, processor, or computing device.

Certain embodiments may provide, for example, a network security product for managing all port-to-port communications of a networked processor node, the product comprising a non-transitory computer-readable storage medium having a configuration file embodied therein for processing in the networked processor node by network security software to define authorized port-to-port communications, the configuration file comprising: i) a universal nonpublic identifier for the networked processor node; and ii) a series of records comprising parameters for authorized port-to-port communications, each of the series of records comprising at least two of the following: a) an identifier for an authorized application resident on the networked processor node; b) an identifier for an authorized user associated with the authorized application resident on the networked processor node; c) a universal nonpublic identifier for a remote networked processor node; d) an identifier for an authorized application resident on the remote networked processor node; e) an identifier for an authorized user associated with the authorized application resident on the remote networked processor node; f) optionally, a port associated with the authorized application resident on the remote networked processor node; g) optionally, a port associated with a network security software resident on the remote networked processor node; and h) optionally, a data protocol descriptor.

Certain embodiments may provide, for example, a distributed system. In certain embodiments, for example, the distributed system may comprise: plural security programs resident on computer-readable storage media of plural networked nodes, the plural security programs cooperatively configured to negotiate dedicated data pathways for port-to-port communications between the plural networked nodes. In certain embodiments, for example, the negotiating may comprise, on a first node, negotiating a first data pathway between a first user-application and a first network security program of the plural security programs. In certain embodiments, for example, the negotiating may comprise, on a second node, negotiating a second data pathway between a second network security program of the plural security programs and a second user-application. In certain embodiments, for example, the negotiating may comprise negotiating a third data pathway between the first network security program and the second network security program, the third data pathway comprising a network tunnel and/or an encrypted communication pathway. In certain embodiments, for example, each of the first data pathway, second data pathway, and third data pathway participate to form at least a part of a dedicated data pathway for exclusively communicating data from a first port of the first user-application to a second port of the second user-application.

A. In certain embodiments, for example, the first data pathway and/or the second data pathway may comprise a TCP connection. In certain embodiments, for example, the third data pathway may comprise a UDP connection. In certain embodiments, for example, the first data pathway and/or the second data pathway may comprise a TCP connection, and the third data pathway may comprise a UDP connection.

Certain embodiments may provide, for example, a distributed system comprising: plural security programs resident on computer-readable storage media of plural networked nodes, the plural security programs cooperatively configured to negotiate dedicated data pathways for port-to-port communications between the plural networked nodes, the negotiating comprising: i) on a first node, negotiating a first data pathway between a first user-application and a first network security program of the plural security programs; ii) on a second node, negotiating a second data pathway between a second network security program of the plural security programs and a second user-application; and iii) negotiating a third data pathway between the first network security program and the second network security program, the third data pathway comprising a network tunnel and/or an encrypted communication pathway, each of the first data pathway, second data pathway, and third data pathway participate to form at least a part of a dedicated data pathway for exclusively communicating data from a first port of the first user-application to a second port of the second user-application.

Certain embodiments may provide, for example, a method of securing a node connected to the internet, comprising: authorizing incoming packets by comparing metadata from the packets to a list of authorized packet sources, applications, and payload protocols, and allowing only payloads from authorized packets to pass to an OSI application layer of the node, processor, or computing device. In certain further embodiments, for example, the method may be performed at a rate of at least 95% of wire speed and at most 10% processor load.

Certain embodiments may provide, for example, a method of securing a node (for example a computing device) connected to the internet. In certain embodiments, for example, the method may comprise: authorizing incoming IP packets at wire speed, allowing only payloads from authorized incoming IP packets to pass to an OSI application layer of the node, authorizing outgoing packets, allowing only authorized outgoing packets to pass to the internet. In certain further embodiments, for example, the method may be performed at a rate of at least 95% of wire speed and at most 10% processor load. In certain further embodiments, for example, the authorizing the incoming packets may comprise comparing metadata from the incoming packets to a list of authorized packet sources, applications, and payload protocols. In certain embodiments, for example, the authorizing the outgoing packets may comprise processing a list of authorized sending applications, the list containing, for each sending application present on the list of authorized sending applications, a port associated with the sending application.

A. In certain embodiments, for example, one of the foregoing methods to secure may induce a processor load of less than 5% according to the Load Benchmark Test.

B. In certain embodiments, for example, one of the foregoing methods to secure may slow network packet processing by less than 2 ms according to the Speed Benchmark Test. In certain embodiments, for example, one of the foregoing methods to secure may process at least 50,000 packets per second according to the Packet Processing Benchmark Test. In certain embodiments, for example, one of the foregoing methods to secure may prevent the secure node from establishing data communications sessions if greater than 90% of random access memory is utilized. In certain embodiments, for example, one of the foregoing methods to secure may be further configured to terminate all secure node data communications sessions if greater than 99% of random access memory is utilized. In certain embodiments, for example, the metadata may be obtained from a predetermined portion of each packet. In certain embodiments, for example, the rate and processor load of one of the foregoing methods to secure may be measured based on an Ethernet port having at least a 1 Gigabit (Gb) bandwidth (for example a 10 Gb bandwidth) and having less than 10% overhead. In certain embodiments, for example, the processor load may be based on a 1 GHz ARM9 processor running Microlinux.

Certain embodiments may provide, for example, a method of securing a computing device connected to the internet, comprising: i) authorizing incoming packets, at wire speed, by comparing metadata from the incoming packets to a list of authorized packet sources, applications, and payload protocols; ii) allowing only payloads from authorized incoming packets to pass to the OSI application layer of the node; iii) authorizing outgoing packets, based on a list of authorized source ports and sending applications; and iv) allowing only authorized outgoing packets to pass to the internet, at a rate of at least 95% of wire speed and at most 10% processor load.

Certain embodiments may provide, for example, a secure node comprising a processor, random access memory, and network security software, the network security software configured to: match, in a kernel of the secure node (or, in certain other embodiments, for example, an application space of the secure node), a destination port number of each incoming network packet to a member of a list of authorized destination ports, decrypt metadata from each incoming network packet, and compare the decrypted metadata to a list of authorized n-tuples (for example at least 2-tuples, an at least 3-tuples, at least 5-tuples, at least 6-tuples, at least 8-tuples, at least 10-tuples, or at least 12-tuples), each n-tuples in the list of authorized n-tuples comprising descriptors for: a packet payload source application and a payload protocol. In certain further embodiments, for example, the matching, decrypting, and comparing may be performed at a rate of at least 95% of wire speed and at most 10% processor load based on a 1 Gb Ethernet port having less than 10% overhead.

A. In certain embodiments, for example, the network security software may induce a processor load of less than 5% according to the Load Benchmark Test. In certain embodiments, for example, the network security software may slow network packet processing by less than 2 ms according to the Speed Benchmark Test. In certain embodiments, for example, the node may process at least 50,000 packets per second according to the Packet Processing Benchmark Test. In certain embodiments, for example, the network security software may be further configured to prevent the secure node from establishing data communications sessions if greater than 90% of random access memory is utilized. In certain embodiments, for example, the network security software may be further configured to terminate all secure node data communications sessions if greater than 99% of random access memory is utilized. In certain embodiments, for example, packet payload source application descriptor may comprise an application identifier and a user identifier. In certain embodiments, for example, the metadata may be obtained from a predetermined portion of each packet.

B. In certain embodiments, for example, the processor load may be based on an Ethernet port having at least a 1 Gigabit (Gb) bandwidth (for example a 10 Gb bandwidth) and having less than 10% overhead. In certain embodiments, for example, the processor load may be based on a 1 GHz ARM9 processor running Microlinux. In certain embodiments, for example, the metadata may be decrypted using a symmetric decryption algorithm (for example 256-bit AES). In certain further embodiments, for example, the decrypting may comprise using a cryptographic key (for example a cryptographic key derived from Elliptic-Curve Diffie-Hellman (ECDH) key exchange. In certain further embodiments, for example, the key may be a single-use key. In certain embodiments, for example, the key may be a rotated key.

C. In certain embodiments, for example, the network security software may be configured to drop (or discard) an incoming network packet if a destination port number of the network packet is not present on the list of authorized destination ports.

D. In certain further embodiments, for example, the matching may further comprise checking a connection state associated with the destination port number. In certain embodiments, for example, the network security software may be configured to drop an incoming network packet based on a status of a connection state associated with a destination port of the network packet (for example if the connection state is not open).

E. In certain embodiments, for example, the decrypting and comparing may be performed in an OSI application layer of the secure node, processor, or computing device.

F. In certain embodiments, for example, the list of sending applications and authorized ports may comprise a security middleware application having a root user and a port associated with the security middleware application. In certain embodiments, for example, the list of sending applications and authorized ports may comprise an application program and a port associated with the application program.

Certain embodiments may provide, for example, a node preconfigured to constrain communication over a network, comprising: a file stored on non-transitory computer-readable storage medium, the file defining a list of authorized data communications sessions, each record of the file comprising. In certain further embodiments, for example, each record of the file may further comprise: a) a universal identifier for a data source, comprising an authorized source application identifier and an identifier for an authorized user of the source application; b) a universal identifier for a data destination, comprising an authorized destination application identifier and an identifier for an authorized user of the destination application; c) a port associated with the destination application; d) a different port associated with a middleware; and e) a data protocol field.

A. In certain embodiments, for example, the file may be a binary file. In certain embodiments, for example, the file may be a variable record length file. In certain embodiments, for example, the file may be encrypted on the non-transitory computer-readable storage medium. In certain embodiments, for example, the port associated with the destination application may communicate with the middleware by a loopback interface. In certain embodiments, for example, the different port associated with the middleware may be an endpoint of an encrypted tunnel-portion of an authorized data communications session of the authorized data communications sessions. In certain embodiments, for example, each record of the file may comprise a network interface controller code for a network interface controller present on the node, processor, or computing device. In certain further embodiments, for example, a network address of the network interface controller may be determined based at least in part on the network interface controller code. In certain embodiments, for example, each record of the file may further comprise a different network interface controller code for a network interface controller present on a remote node, processor, or computing device. In certain further embodiments, for example, a network address of the remote network interface controller may be determined based at least in part on the different network interface controller code. In certain embodiments, for example, each record of the file may comprise a nonpublic identification code for the node, processor, or computing device. In certain embodiments, for example, each record of the file may comprise a nonpublic identification code for a remote node, processor, or computing device.

B. In certain embodiments, for example, each record of the file may comprise a private key (or a cryptographic parameter or primitive). In certain further embodiments, for example, the private key may be used by a key exchange algorithm executing on a processor of the node to establish a shared key with a remote node, processor, or computing device. In certain embodiments, each record of the file has a different private key.

C. In certain embodiments, for example, a portion of the file may be read into kernel random access memory on boot-up of the node, processor, or computing device. In certain embodiments, for example, the file may be accessible only by a kernel of the node, processor, or computing device. In certain embodiments, for example, the file may be accessible only by a root user of the node, processor, or computing device. In certain embodiments, for example, the file may be accessible by an application program module executed by a root user.

Certain embodiments may provide, for example, a node preconfigured to constrain communication over a network, comprising: a file stored on non-transitory computer-readable storage medium, the file defining a list of authorized data communications sessions, each record of the file comprising: a) a universal identifier for a data source, comprising an authorized source application identifier and an identifier for an authorized user of the source application; b) a universal identifier for a data destination, comprising an authorized destination application identifier and an identifier for an authorized user of the destination application; c) a port associated with the destination application; d) a different port associated with a middleware; e) a data protocol field; f) a network interface controller code for a network interface controller present on the node; g) a different network interface controller code for a network interface controller present on a remote node; h) a nonpublic identification code for the node; i) a different nonpublic identification code for the remote node; and j) a private key provisioned for use by a key exchange algorithm executing on the node to establish a shared key with the remote node, processor, or computing device.

Certain embodiments may provide, for example, a node preconfigured to constrain communication over a network, comprising a file stored on non-transitory computer-readable storage medium, the file having a list of authorized data communications sessions. In certain further embodiments, for example, each member of the list may comprise: an index defined by an application authorized to be executed on the processor and an authorized user of the application, a unique 2-tuple consisting of a port number assigned to the application and a port number assigned to a network security middleware, a unique 2-tuple consisting of a port number assigned to a remote application and a port number assigned to a remote network security middleware, and a data protocol descriptor.

A. In certain embodiments, for example, the file may be read-only. In certain embodiments, for example, the file may be cryptographically signed. In certain embodiments, for example, the read-only file may be encrypted. In certain embodiments, for example, the read-only file may be a binary file. In certain embodiments, for example, one member of the list may have a different record length than another member of the list.

B. In certain embodiments, for example, the index of a member of the list may be derived from a concatenation of a user name (or a portion thereof) and an application name (or a portion thereof), or at least portions thereof.

C. In certain embodiments, for example, the port number assigned to the application may appear only once in the list. In certain embodiments, for example, the port number assigned to the network security middleware may appear only once in the list. In certain embodiments, for example, the port number assigned to a remote application appears only once in the list. In certain embodiments, for example, the port number assigned to the remote network security middleware appears only once in the list. In certain embodiments, for example, each of the port number assigned to the application, port number assigned to the network security middleware, port number assigned to a remote application, and the remote network security middleware may appear only once in the list. In certain embodiments, for example, the data protocol descriptor may appear in a plurality of members of the list.

Certain embodiments may provide, for example, a node preconfigured to constrain communication over a network, comprising: a processor, a non-transitory computer-readable storage medium, and a read-only file stored on the non-transitory computer-readable storage medium. In certain further embodiments, for example, the file may comprise plural n-tuples, the plural n-tuples defining an exclusive list of authorized data communications sessions. In certain further embodiments, for example, each one of the plural n-tuples may comprise: an index defined by an application authorized to be executed on the processor and an authorized user of the application, a unique 2-tuple consisting of a port number assigned to the application and a port number assigned to a network security middleware, a unique 2-tuple consisting of a port number assigned to a remote application and a port number assigned to a remote network security middleware, and a data protocol descriptor.

A. In certain embodiments, for example, the network security middleware may be stored on the non-transitory computer-readable storage medium.

B. In certain embodiments, for example, the remote application and the remote network security middleware may reside on a common remote node, processor, or computing device. In certain embodiments, for example, the remote application and the remote network security middleware may reside on separate remote nodes. In certain further embodiments, for example, the remote network security middleware may reside on a software-defined perimeter controller.

C. In certain embodiments, for example, the read-only file may be cryptographically signed. In certain embodiments, for example, the read-only file may be encrypted. In certain embodiments, for example, the read-only file may be a binary file. In certain embodiments, for example, one of the n-tuples may have a different record length than another one of the n-tuples.

D. In certain embodiments, for example, the node may further comprise: network security software stored on the non-transitory computer-readable storage medium different from the network security middleware, the different network security software having sole permission to read the file. In certain further embodiments, for example, the different network security software may be configured to be executed by the processor to load at least a portion of the file into the kernel random access memory. In certain embodiments, for example, the different network security software may be executed in an OSI application layer of the node, processor, or computing device. In certain embodiments, for example, the different network security software may be executed in a kernel of the node, processor, or computing device. In certain further embodiments, for example, the at least a portion of the file may be loaded solely upon boot-up of the node, processor, or computing device.

E. In certain embodiments, for example, the network security middleware may be configured to be executed by the processor to prevent initialization of any data communications session except for the list of authorized data communications sessions.

Certain embodiments may provide, for example, a node preconfigured to constrain communication over a network, comprising: i) a processor; ii) a non-transitory computer-readable storage medium; iii) a read-only file stored on the non-transitory computer-readable storage medium, the file comprising plural n-tuples, the plural n-tuples defining an exclusive list of authorized data communications sessions, each one of the plural n-tuples comprising: a) an index defined by an application authorized to be executed on the processor and an authorized user of the application; b) a unique 2-tuple consisting of a port number assigned to the application and a port number assigned to a network security middleware, the network security middleware stored on the non-transitory computer-readable storage medium; c) a unique 2-tuple consisting of a port number assigned to a remote application and a port number assigned to a remote network security middleware; and d) a data protocol descriptor.

Certain embodiments may provide, for example, a method to retrofit a computing device coupled to a network. In certain embodiments, for example, the method may comprise: storing an encrypted file on a non-transitory computer-readable storage medium of the computing device, installing network security software on the non-transitory computer-readable storage medium of the computing device, setting permissions of the file whereby the file is readable only by the network security software; and modifying a network stack resident on the computing device to receive or intercept each data packet incoming from or outgoing to the network. In certain further embodiments, for example, the file may comprise a list interpretable by the network security middleware to define authorized communication sessions and an authorized data protocol for each authorized communication session of the authorized communication sessions. In certain further embodiments, for example, the network security software may be configured to load at least a portion of the file into kernel random access memory upon boot-up of the computing device. In certain further embodiments, for example, the network stack may be modified to route each received or intercepted data packet through the network security middleware. In certain further embodiments, for example, the network security middleware may be configured to drop a received or an intercepted data packet unless the received or intercepted data packet is authorized to be transmitted using one of the authorized communication sessions.

A. In certain embodiments, for example, the method may be exclusive of any modification to a pre-existing application program. In certain embodiments, for example, the modifying a network stack may comprise modifying a network protocol application programming interface. In certain embodiments, for example, the method may further comprise: installing cryptographic primitives (for example cryptographic primitives provided by Secured Socket Layer (SSL) software) to enable a separate encrypted network tunnel to be established for each authorized communication session of the authorized communication sessions.

Certain embodiments may provide, for example, a method to retrofit a computing device coupled to a network, comprising: i) storing an encrypted file on a non-transitory computer-readable storage medium of the computing device, the file comprising a list interpretable by network security middleware executing on the computing device to define authorized communication sessions and an authorized data protocol for each authorized communication session of the authorized communication sessions; ii) installing the network security software on the non-transitory computer-readable storage medium of the computing device, the network security software configured to load at least a portion of the file into kernel random access memory (or, in certain other embodiments, for example, into application space memory) upon boot-up of the computing device; iii) setting permissions of the file whereby the file is readable only by the network security software; and iv) modifying a network stack resident on the computing device to: a) receive or intercept each data packet incoming from or outgoing to the network; and b) route each received or intercepted data packet through the executing network security middleware, the network security middleware configured to drop a received or an intercepted data packet unless it is authorized to be transmitted using one of the authorized communication sessions.

Certain embodiments may provide, for example, a secure system. In certain embodiments, for example, the secure system may comprise: a network configured to transmit data based on at least one network packet-based protocol, and plural nodes coupled to the network, each one of the plural nodes comprising a network stack, a network protocol application programming interface, and middleware. In certain further embodiments, for example, the network protocol application programming interface may be configured to pass each data packet received to the middleware. In certain further embodiments, for example, the middleware may be configured to verify, prior to sending data towards a destination port, that the data: has been generated by an authorized application, conforms to an authorized data protocol, has been received from an authorized node, contains at least one port number that is present on a predetermined list of port numbers.

A. In certain embodiments, for example, the middleware may obtain data from a data packet passing through the network stack. In certain embodiments, for example, the data packet may be encrypted. In certain embodiments, for example, the middleware may generate metadata, encrypt metadata, and insert metadata into a partially assembled network packet.

B. In certain embodiments, for example, the at least one network packet-based protocol may comprise Ethernet protocol. In certain embodiments, for example, the at least one network packet-based protocol may comprise Wi-Fi protocol. In certain embodiments, for example, the at least one network packet-based protocol may comprise Bluetooth protocol.

C. In certain embodiments, for example, the at least one port number may be associated with an application responsible for producing a data packet. In certain embodiments, for example, the at least one port number may be associated with source port (for example may be a source port) in a network packet header. In certain embodiments, for example, the at least one port number may be associated with a destination port (for example may be a destination port) in a network packet header.

Certain embodiments may provide, for example, a secure system, comprising: i) a network configured to transmit data based on at least one network packet-based protocol; and ii) plural nodes coupled to the network, each one of the plural nodes comprising a network stack, a network protocol application programming interface, and middleware, the network protocol application programming interface configured to pass each data packet received to the middleware, the middleware configured to verify, prior to sending data towards a destination port, that the data: a) has been generated by an authorized application; b) conforms to an authorized data protocol; c) has been received from an authorized node; and d) contains at least one port number that is present on a predetermined list of port numbers.

Certain embodiments may provide, for example, a secure system, comprising: i) a network configured to transmit data based on at least one network packet-based protocol; and ii) plural nodes coupled to the network, each one of the plural nodes comprising a network stack, a network protocol application programming interface, and a middleware, invocation of the middleware being triggered by each data packet crossing the network protocol application programming interface for the first time, the middleware configured to verify, prior to sending data towards a destination port, that the data: a) has been generated by an authorized application, as determined based at least on metadata obtained by the middleware; b) conforms to an authorized data protocol, as determined based at least on the metadata; c) has been received from an authorized node; and d) contains at least one port number that is present on a predetermined list of port numbers.

Certain embodiments may provide, for example, a distributed method to secure plural computing devices coupled to a network. In certain embodiments, for example, the distributed method may comprise: having preprovisioned (or predetermined) configuration files on the plural computing devices, defining authorized port-to-port connections based in part on information from the configuration files on at least two of the plural computing devices (for example a first configuration file on a first computing device and a second configuration file on a second computing device), and restricting network communications to and from the plural computing devices to the authorized port-to-port connections.

A. In certain embodiments, for example, the preprovisioned (or predetermined) configuration files may be read on boot-up. In certain embodiments, for example, the preprovisioned (or predetermined) configuration files may be read by one or more application space programs. In certain embodiments, for example, the preprovisioned (or predetermined) configuration files may be read by one or more kernel space programs. In certain embodiments, for example, the preprovisioned (or predetermined) configuration files may be read by a combination of application space programs and kernel space programs.

B. In certain embodiments, for example, each one of the authorized port-to-port connections may comprise: a first socket referenced by first network security software executing on a first computing device of the plural computing devices; and a second socket referenced by network security software. In certain further embodiments, for example, the network security software may execute on: a second computing device of the plural computing devices, a third computing device executing an authorized deployment server, the authorized deployment server exclusively responsible for managing the static, preconfigured list of authorized pathways, or a fourth computing device executing a gateway server, network communication of the gateway server restricted to the authorized pathways. In certain embodiments, for example, data may be passed to the gateway server and processed by network security software on the fourth computing device unless the data is received from one of the authorized pathways. In certain embodiments, for example, the fourth computing device may be constrained, by an operating system, to executing only a static, preconfigured list of computer programs. In certain embodiments, for example, one or more of the preprovisioned (or predetermined) configuration files may be distributed by the authorized deployment server to at least two of the plural computing devices.

C. In certain embodiments, for example, the plural computing devices may be physically located at a common facility (for example a hospital, factory, chemical processing facility, power station, or offshore platform).

D. In certain embodiments, for example, at least one (for example each one) of the authorized port-to-port connections may be stateful. In certain embodiments, for example, at least one (for example each one) of the authorized port-to-port connections may be stateless.

Certain embodiments may provide, for example, a secured system comprising: plural nodes coupled to a network, and plural security programs for management of all communication between the plural nodes over the network, the plural security programs cooperatively configured to form dedicated data pathways for inter-application communication between the plural nodes. In certain further embodiments, for example, at least one of the dedicated data pathways may comprise: a first security program to send data from a first one of the plural nodes and a second security program to receive data on a second one of the plural nodes, and a dedicated encrypted network tunnel between the first security program and a second security program.

A. In certain embodiments, for example, the network may be a packet-switched network. In certain embodiments, for example, the received data may comprise a series of data packets. In certain embodiments, for example, the first security program may verify that each data packet of the series of data packets was transmitted from an authorized application. In certain embodiments, for example, the first security program may verify that a data packet of the series of data packets was transmitted from a port associated with an application authorized to transmit the data packet, based at least on a port number associated with the transmitting application, an identifier for the transmitting application, a user of the transmitting application, and a data protocol descriptor for the data packet. In certain embodiments, for example, the second security program may verify that each data packet of the series of data packets was transmitted from an authorized application. In certain embodiments, for example, the second security program may verify that each data packet of the series of data packets is being transmitted to an authorized port associated with an authorized application. In certain embodiments, for example, the second security program may verify that a data packet of the series of data packets is being transmitted to a port associated with an application authorized to receive the data packet, based at least on an identifier for the receiving application, an identifier for an application associated with the transmission of the data packet, a user of the transmitting application, and a data protocol descriptor for the data packet.

Certain embodiments may provide, for example, a secured system comprising: plural nodes coupled to a network, a first application program executing on a first node and a second application program executing on a second node, plural security programs for management of all communication between the plural nodes over the network, and plural read-only configuration files accessible by the plural security programs. In certain embodiments, for example, the plural security programs may be cooperatively configured to form a dedicated data pathway for inter-application communication between the first application program and the second application program. In certain further embodiments, for example, the dedicated data pathway may pass through a first security program and a second security program of the plural security programs, the first security program and a second security program interposed between the first application program and the second application program, and the data pathway may comprise a dedicated encrypted network tunnel between the first security program and a second security program. In certain further embodiments, for example, each of the plural configuration files may define an exclusive list of authorized inter-application communications, may further define an exclusive data protocol for each authorized inter-application communication of the exclusive list of authorized inter-application communications, may assigning a fixed port number to the first security software, and may contain nonpublic node identification codes.

A. In certain embodiments, for example, the fixed port number may be unique to a 5-tuple consisting of: an identifier for the first application program, a user of the first application program, an identifier for the second application program, a user of the second application program, and the exclusive data protocol. In certain embodiments, for example, the fixed port number may be unique on the first node and the second node to a 5-tuple consisting of: an identifier for the first application program, a user of the first application program, an identifier for the second application program, a user of the second application program, and the exclusive data protocol.

B. In certain embodiments, for example, each of the plural configuration files may be a binary file. In certain embodiments, for example, each of the plural configuration files may be divided into records. In certain further embodiments, for example, the records may be indexed by the fixed port number.

C. In certain embodiments, for example, each of the records may have a variable length. In certain embodiments, for example, each of the records may comprise a private key (or a cryptographic parameter or primitive). In certain embodiments, for example, each private key may be unique to the secured system.

D. In certain embodiments, for example, the nonpublic node identification codes may comprise a first node identification code assigned to the first node and a second node identification code assigned to the second node, processor, or computing device.

Certain embodiments may provide, for example, a secured system comprising: i) plural nodes coupled to a network; ii) a first application program executing on a first node and a second application program executing on a second node; iii) plural security programs for management of all communication between the plural nodes over the network, the plural security programs cooperatively configured to form a dedicated data pathway for inter-application communication between the first application program and the second application program, wherein the dedicated data pathway—a) passes through a first security program and a second security program of the plural security programs, the first security program and a second security program interposed between the first application program and the second application program; and b) comprises a dedicated encrypted network tunnel between the first security program and a second security program; iv) plural read-only configuration files accessible by the plural security programs, each of the plural configuration files—a) defining an exclusive list of authorized inter-application communications; b) further defining an exclusive data protocol for each authorized inter-application communication of the exclusive list of authorized inter-application communications; c) assigning a fixed port number to the first security software; and d) containing nonpublic node identification codes.

Certain embodiments may provide, for example, a secure system comprising: plural nodes configured to communicate over a network exclusively by plural encrypted communication pathways (for example by plural encrypted network tunnels), each one of the plural encrypted communication pathways (for example each one of the network tunnels) restricted to transmitting data sent from a single transmitting application on a first node of the plural nodes and directed to a single receiving application on a second node of the plural nodes. In certain further embodiments, for example, each one of the plural encrypted communication pathways (for example the plural encrypted network tunnels) may be restricted to transmitting data having a single payload data type, and encrypted with a cryptographic key that may be used only once. In certain further embodiments, for example, each one of the plural encrypted communication pathways (for example each one of the plural encrypted network tunnels) may be established by mutual exchange and authentication of preconfigured application authentication identification codes and nonpublic node identification codes. In each of the foregoing embodiments, the transmitting application, first node, receiving application, and/or receiving node may be different for each different encrypted network communication (for example each different network tunnel) of the plural encrypted network communication pathways (for example of the plural encrypted network tunnels).

A. In certain embodiments, for example, the plural encrypted communication pathways (for example the plural encrypted network tunnels) may comprise one or plural unidirectional encrypted communication pathways (for example one or plural unidirectional encrypted network tunnels). In certain embodiments, for example, the plural encrypted communication pathways (for example the plural encrypted network tunnels) may comprise one or plural bidirectional encrypted communication pathways (for example one or plural bidirectional network tunnels).

B. In certain embodiments, for example, the plural encrypted communication pathways (for example the plural encrypted network tunnels) may comprise one or plural stateful data communications sessions. In certain embodiments, for example, the plural encrypted communication pathways (for example the plural encrypted network tunnels) may be at least partially managed by middleware present on the plural nodes. In certain embodiments, for example, the plural encrypted communication pathways (for example the plural encrypted network tunnels) may be at least partially managed by a broker software present on at least one node of the plural nodes.

Certain embodiments may provide, for example, a secure system comprising: plural nodes configured to communicate over a network exclusively by plural encrypted network tunnels, each one of the plural encrypted network tunnels—i) restricted to transmitting data—a) sent from a single transmitting application on a first node of the plural nodes; b) directed to a single receiving application on a second node of the plural nodes; c) having a single payload data type; and d) encrypted with a cryptographic key that is used only once; and ii) established by mutual exchange and authentication of preconfigured—a) application authentication identification codes; and b) nonpublic node identification codes.

Certain embodiments may provide, for example, a secure system, comprising: plural nodes coupled to a network, plural application software executing on at least a first node and a second node of the plural nodes, at least one encrypted network tunnel configured to perform at least a partial data pathway for transport of data from a first application software of the plural application software on the first node of the plural nodes to a second application software of the plural application software on the second node of the plural nodes, the data conforming to a preconfigured, predefined, pre-established and/or preprovisioned first data protocol, and at least one security software initiating the at least one encrypted network tunnel. In certain further embodiments, for example, the at least one security software may be configured to authorize the encrypted network tunnel, based at least on authorizing the first node, the second node, the first application software, and the second application software. In certain further embodiments, for example, the at least one security software may be configured to confirm that the first application software is authorized to transmit the first data protocol. In certain further embodiments, for example, the at least one security software may be positioned between the first application software and the second application software in a data pathway comprising the at least one encrypted network tunnel.

A. In certain embodiments, for example, the encrypted tunnel may have an endpoint at a port associated with one of the at least one security software.

B. In certain embodiments, for example, the at least one security software may be plural security software, and the encrypted tunnel may have a first endpoint at a first port associated with a first security software of the plural security software and a second endpoint at a second port associated with a second security software of the plural security software.

C. In certain embodiments, for example, authorizing the first application software may comprise authorizing a user of the first application software. In certain embodiments, for example, the at least one security software may be transparent to the first application software and the second application software. In certain embodiments, for example, the authorizing and the confirming may each comprise encrypted communication over the network. In certain embodiments, for example, the system may be configured as a software-defined perimeter. In certain embodiments, for example, an access controller of the software-defined perimeter may comprise one of the at least one security software.

Certain embodiments may provide, for example, a secure system, comprising: i) plural nodes coupled to a network; ii) plural application software executing on at least a first node and a second node of the plural nodes; iii) at least one encrypted network tunnel configured to perform at least a partial data pathway for transport of data from a first application software of the plural application software on the first node of the plural nodes to a second application software of the plural application software on the second node of the plural nodes, the data conforming to a preconfigured, predefined, pre-established and/or preprovisioned first data protocol; and iv) at least one middleware initiating the at least one encrypted network tunnel, the at least one middleware positioned between the first application software and the second application software in a data pathway comprising the at least one encrypted network tunnel, the at least one middleware configured to: a) authorize the encrypted network tunnel, based at least on authorizing the first node, the second node, the first application software, and the second application software; and b) confirm that the first application software is authorized to transmit the first data protocol.

Certain embodiments may provide, for example, a secure system comprising: plural nodes coupled to a network, plural application software executing on at least a first node and a second node of the plural nodes, at least one encrypted network tunnel established between a first application software of the plural application software on the first node of the plural nodes and a second application software of the plural application software on the second node of the plural nodes, the first application software configured to send data conforming to a preconfigured, predefined, pre-established and/or preprovisioned first data protocol, and at least one middleware initiating the at least one encrypted network tunnel. In certain further embodiments, for example, the at least one middleware may be positioned between the first application software and the second application software in a data pathway comprising the at least one encrypted network tunnel. In certain further embodiments, for example, the at least one middleware may be configured to authorize the encrypted network tunnel, based at least on authorizing at least one of the plural nodes, the first application software, and the second application software. In certain further embodiments, for example, the at least one middleware may be configured to confirm that the second application software is authorized to receive the first data protocol.

A. In certain embodiments, for example, the at least one middleware may be transparent to the first application software and the second application software. In certain embodiments, for example, the authorize and the confirm may each comprise encrypted communication over the network.

Certain embodiments may provide, for example, a secure system comprising: i) plural nodes coupled to a network; ii) plural application software executing on at least a first node and a second node of the plural nodes; iii) at least one encrypted network tunnel established between a first application software of the plural application software on the first node of the plural nodes and a second application software of the plural application software on the second node of the plural nodes, the first application software configured to send data conforming to a preconfigured, predefined, pre-established and/or preprovisioned first data protocol; and iv) at least one middleware initiating the at least one encrypted network tunnel, the at least one middleware positioned between the first application software and the second application software in a data pathway comprising the at least one encrypted network tunnel, the at least one middleware configured to: a) authorize the encrypted network tunnel, based at least on authorizing at least one of the plural nodes, the first application software, and the second application software; and b) confirm that the second application software is authorized to receive the first data protocol.

Certain embodiments may provide, for example, a secure system comprising plural nodes communicating over a network by machine-to-machine middleware, each node of the plural nodes comprising: a preconfigured list, and machine-to-machine middleware. In certain embodiments, for example, each member of the preconfigured list may comprise a 2-tuple, the 2-tuple comprising a port number. In certain further embodiments, for example, the machine-to-machine middleware may be configured to: interpret the preconfigured list to define authorized client-server connections, receive a network packet from the network, decrypt an encrypted metadata portion of the network packet using a single-use cryptographic key, extract an authorization parameter from the decrypted metadata portion of the network packet, and compare a 2-tuple consisting of the destination port number of the network packet and the authorization parameter with at least one member of the preconfigured list.

A. In certain embodiments, for example, the preconfigured file may be stored on a non-transitory computer-readable storage medium (for example a nonvolatile memory storage medium) exclusively as an encrypted binary file. In certain embodiments, for example, the authorization parameter may be a remote node identification code. In certain embodiments, for example, the remote node identification code may be nonpublic. In certain embodiments, for example, the remote node identification code may be a shared secret among a subset of the plural nodes.

B. In certain embodiments, for example, the authorization parameter may comprise a remote descriptor, the remote descriptor comprising a remote application identifier, an identifier for a user of the remote application, and a data protocol code. In certain embodiments, for example, the machine-to-machine middleware may be at least partially embedded in a kernel.

Certain embodiments may provide, for example, a secure system comprising plural nodes communicating over a network by machine-to-machine middleware, each node of the plural nodes comprising: i) a preconfigured list, each member of the preconfigured list comprising a 2-tuple, the 2-tuple comprising a port number; and ii) machine-to-machine middleware configured to: a) interpret the preconfigured list to define authorized client-server connections; b) receive a network packet from the network; c) decrypt an encrypted metadata portion of the network packet using a single-use cryptographic key; d) extract an authorization parameter from the decrypted metadata portion of the network packet; and e) compare a 2-tuple consisting of the destination port number of the network packet and the authorization parameter with at least one member of the preconfigured list.

A. In certain embodiments, for example, the machine-to-machine middleware may be transparent to the client application. In certain embodiments, for example, the network packet may comprise a segmented payload. In certain embodiments, for example, at least 25% (for example at least 50%, such as at least 75%) of the plural nodes may be dedicated computing devices.

Certain embodiments may provide, for example, a secure system comprising plural nodes communicating over a network by machine-to-machine middleware, each node of the plural nodes comprising: a client application, a preconfigured list, a security layer, a kernel, and machine-to-machine middleware at least partially embedded in the kernel. In certain further embodiments, for example, the machine-to-machine middleware may be configured to: interpret the preconfigured list to define authorized client-server connections, receive a network packet from the network, decrypt an encrypted metadata portion of the network packet using a single-use cryptographic key (for example a rotated key derived from ECDH key exchange), extract at least a 2-tuple consisting of a remote server code and a data protocol code from the decrypted metadata portion of the network packet, and compare the 2-tuple to at least one member of the preconfigured list. In certain further embodiments, for example, each member of the preconfigured list may consist of an n-tuple, the n-tuple comprising a 2-tuple consisting of a remote server code and a data protocol code.

A. In certain embodiments, for example, the machine-to-machine middleware may be transparent to the client application. In certain embodiments, for example, the network packet may comprise a segmented payload. In certain embodiments, for example, at least 25% (for example at least 50%, such as at least 75%) of the plural nodes may be dedicated computing devices.

Certain embodiments may provide, for example, a secure system comprising plural nodes communicating over a network by machine-to-machine middleware, each node of the plural nodes comprising: i) a client application; ii) a preconfigured list, each member of the preconfigured list consisting of an n-tuple, the n-tuple comprising a 2-tuple consisting of a remote server code and a data protocol code; iii) a security layer; iv) a kernel; and v) machine-to-machine middleware at least partially embedded in the kernel, the machine-to-machine middleware configured to: a) interpret the preconfigured list to define authorized client-server connections; b) receive a network packet from the network; c) decrypt an encrypted metadata portion of the network packet using a single-use cryptographic key; d) extract at least a 2-tuple consisting of a remote server code and a data protocol code from the decrypted metadata portion of the network packet; and e) compare the 2-tuple to at least one member of the preconfigured list.

Certain embodiments may provide, for example, a method to instantiate and manage a dedicated data pathway extending from a source port on a first node to a destination port on a second node, processor, or computing device. In certain embodiments, for example, the method may comprise selecting, from a predetermined, exclusive list of authorized data pathways, a security port number exclusively paired with a port number of the destination port. In certain embodiments, for example, the method may comprise forming an encrypted communication pathway extending from the first node to a security port present on the second node, the security port having the selected security port number (i.e., the selected security port number assigned to the security port). In certain embodiments, for example, the method may comprise, prior to transmitting any data from the source port to the destination port: verifying, at the first node, that a first n-tuple (for example the first n-tuple may be an at least a 2-tuple, an at least a 3-tuple, an at least a 5-tuple, an at least a 6-tuple, an at least an 8-tuple, an at least a 10-tuple, or an at least a 12-tuple) received from the encrypted communication pathway matches an expected value based on the security port number, the first n-tuple comprising: a nonpublic device code for the second node, a user associated with the destination port, an application associated with the destination port, and a data protocol descriptor. In certain embodiments, for example, the method may comprise, prior to passing a network packet to the destination port: verifying, at the second node, that an second n-tuple obtained from the network packet matches an expected value based on the security port number, the second n-tuple comprising: a user associated with the source port, an application associated with the source port, and the data protocol descriptor.

Certain embodiments may comprise, for example, a method to instantiate and manage a dedicated data pathway extending from a source port on a first node to a destination port on a second node, comprising: i) selecting, from a predetermined, exclusive list of authorized data pathways, a security port number exclusively paired with a port number of the destination port; ii) forming an encrypted communication pathway extending from the first node to a security port present on the second node, the security port having the selected security port number (i.e., the selected security port number assigned to the security port); iii) prior to transmitting any data from the source port to the destination port: verifying, at the first node, that a first n-tuple received from the encrypted communication pathway matches an expected value based on the security port number, the first n-tuple comprising: a nonpublic device code for the second node, a user associated with the destination port, an application associated with the destination port, and a data protocol descriptor; and iv) prior to passing a network packet to the destination port: verifying, at the second node, that an second n-tuple obtained from the network packet matches an expected value based on the security port number, the second n-tuple comprising: a user associated with the source port, an application associated with the source port, and the data protocol descriptor.

Certain embodiments may provide, for example, a method to instantiate and manage a dedicated data pathway extending from a source port on a first node to a destination port on a second node, comprising: selecting, from a predetermined, exclusive list of authorized data pathways, a tunnel port number exclusively paired with a port number of the destination port; forming a network tunnel extending from the first node to a tunnel port present on the second node, the tunnel port having the selected tunnel port number (i.e., the selected tunnel port number assigned to the tunnel port); iii) prior to transmitting any data from the source port to the destination port: verifying, at the first node, that a first n-tuple received from the network tunnel matches an expected value based on the tunnel port number, the first n-tuple comprising: a nonpublic device code for the second node, a user associated with the destination port, an application associated with the destination port, and a data protocol descriptor; and iv) prior to passing a network packet to the destination port: verifying, at the second node, that an second n-tuple obtained from the network packet matches an expected value based on the tunnel port number, the second n-tuple comprising: a user associated with the source port, an application associated with the source port, and the data protocol descriptor.

Certain embodiments may provide, for example, a system comprising: plural nodes communicating over a network according to a shared network protocol, wherein each one of the plural nodes may be preconfigured to initialize at least one encrypted network tunnel with at least another one of the plural nodes, and each one of the plural nodes having application and/or data transfer privileges may be limited to transferring data to another one of the plural nodes exclusively by an encrypted network tunnel of the at least one encrypted network tunnel.

A. In certain embodiments, for example, each one of the least 25% (for example at least 50%, such as at least 90%) of the plural nodes may be an edge computing device.

Certain embodiments may provide, for example, a method to retrofit a node interface to a network, comprising: inserting a computing device between a node and the network. In certain further embodiments, for example, the computing device may comprise: a file stored on non-transitory computer-readable storage medium, the file having a list of authorized data communications sessions, the file comprising: an index defined by an application authorized to be executed on a processor of the node and an authorized user of the application, a unique 2-tuple consisting of a port number assigned to the application and a port number assigned to a network security middleware, a unique 2-tuple consisting of a port number assigned to a remote application and a port number assigned to a remote network security middleware, and a data protocol descriptor.

Certain embodiments may provide, for example, a method to retrofit a node interface to a network, comprising: inserting a computing device between a node and the network, the computing device comprising: a file on a non-transitory computer-readable storage medium of the computing device, the file interpretable by network security middleware executing on the computing device to define authorized communication sessions and an authorized data protocol for each one of the authorized communication sessions. In certain further embodiments, for example, the computing device may further comprise a network stack configured to route each data packet through the network security middleware, the network security middleware configured to drop a data packet unless it is authorized to be transmitted using one of the authorized communication sessions.

Certain embodiments may provide, for example, a secure method for a first computing device to update resident software, comprising: receiving, from a predetermined, authenticated, authorized client executing on a second computing device, an encrypted nonexecutable payload noticing availability of updated software. In certain further embodiments, for example, the receiving may be followed by establishing a unidirectional encrypted network tunnel with a predetermined server executing on a third computing device. In certain further embodiments, for example, the establishing may comprise exchanging and authenticating encrypted device identifiers between the first computing device and the third computing device, and verifying that the second computing device and the third computing device are different devices. In certain further embodiments, for example, the method may further comprise downloading the updated software over the unidirectional encrypted network tunnel.

Certain embodiments may provide, for example, a secure computing device comprising a physical network interface, the physical network interface configured to: compare a destination port number of each incoming network packet to a list of authorized destination ports, execute remote procedure calls to first software program (or module or portion of code) executing on a central processing unit of the computing device, the first software configured to decrypt metadata from each incoming network packet, and execute remote procedure calls to second software executing on the central processing unit. In certain further embodiments, for example, the second software program may be configured to compare the decrypted metadata to a list of authorized n-tuples, each of the n-tuples in the list of authorized n-tuples comprising descriptors for: a source application for the incoming network packet, a user for the source application, and a payload protocol for the network packet.

A. In certain embodiments, for example, the physical network interface may be a field-programmable gate array.

B. In certain embodiments, for example, the physical network interface may be further configured (for example programmed) to execute remote procedure calls to a third software program executing on the central processing unit, the third software configured to translate a payload of the incoming network packet into native formatted data for consumption by the receiving application.

C. In certain embodiments, for example, at least one of the first software, second software, or third software execute in an OSI application layer of the computing device.

Certain embodiments may provide, for example, a method to filter a network packet in an edge computing device, comprising: parsing at least a portion of the network packet to obtain payload data in a network stack of the edge computing device; and invoking publish-subscribe pattern messaging software from a sub-session layer of the network stack to retrieve, based on at least a portion of the payload data, one or more network packet authentication and/or access control parameters.

A. In certain embodiments, for example, the publish-subscribe pattern messaging software may conform to the Data Distribution Service standard.

B. In certain embodiments, for example, the publish-subscribe pattern messaging software may conform to an MQ Telemetry Transport messaging protocol.

C. In certain embodiments, for example, the one or more network packet authentication and/or access control parameters may be retrieved from metadata encoded in the payload data. In certain embodiments, for example, the one or more network packet authentication and/or access control parameters may comprise a source application, a source application user, and a data protocol of the payload data. In certain embodiments, for example, the one or more network packet authentication and/or access control parameters may be encrypted. In certain embodiments, for example, the method may further comprise: comparing a port address number of the network packet to a list of pre-authorized port address numbers stored in kernel random access memory.

Certain embodiments may provide, for example, a method to filter a network packet (for example an IP packet containing an IP header and a TCP segment). In certain embodiments, for example, the method may comprise parsing the network packet to obtain network packet data; and invoking data distribution service software from a sub-session layer (for example a transport layer according to the Open Systems Interconnection model) of a network stack to retrieve, based on at least a portion of the network packet data (for example a metadata portion), one or more network packet authentication and/or access control parameters. In certain embodiments, for example, the network packet may be an incoming packet received from an Ethernet connection. In certain embodiments, for example, the network packet may be an outgoing packet being directed towards received from an Ethernet connection. In certain embodiments, for example, parsing the network packet may comprise parsing a header of the network packet (for example a network header such as an IP header, an IPsec header, or a TCP header of a TCP segment). In certain embodiments, for example, the one or more network packet authentication and/or access control parameters may comprise a destination port. In certain embodiments, for example, parsing the network packet may comprise parsing metadata (for example payload metadata). In certain further embodiments, for example, the metadata may comprise metadata useful for authenticating a computing device sending at least a portion of a payload present in the network packet. In certain embodiments, for example, the metadata may comprise metadata useful for authenticating an application and/or user sending at least a portion of a payload present in the network packet. In certain embodiments, for example, the metadata may comprise metadata useful for authorizing an application to have access to at least a portion of a payload present in the network packet.

A. In certain embodiments, for example, the network stack may be executing on a node in a data distribution service domain. In certain embodiments, for example, the node may be a subscriber in the data distribution service domain. In certain embodiments, for example, the node may be a publisher in the data distribution service domain. In certain embodiments, for example, the metadata may comprise metadata inserted by data distribution service middleware. In certain embodiments, for example, the metadata may comprise a publish-subscribe topic. In certain embodiments, for example, the network packet may comprise a payload having at least a portion that is strongly typed. In certain embodiments, for example, the metadata may comprise a publish-subscribe data type definition. In certain further embodiments, for example, the one or more network packet access control parameters may comprise the publish-subscribe data type definition. In certain embodiments, for example, the method may further comprise comparing the one or more network packet authentication and/or access control parameters with settings of a domain participant in a data distribution service domain. In certain embodiments, for example, the settings may define at least one data reader in the data distribution service domain. In certain embodiments, for example, the settings may define at least one data writer in the data distribution service domain. In certain embodiments, for example, the method may further comprise creating and maintaining an event log.

B. In certain further embodiments, for example, the data distribution service software may be invoked by operating system software, for example by operating system software operating at kernel priority. In certain embodiments, for example, the data distribution service software defines at least part of a software library, for example a pre-built library. In certain embodiments, for example, the data distribution service software defines at least one subroutine. In certain embodiments, for example, the data distribution service software defines at least one module. In certain embodiments, for example, the data distribution service software defines at least one function. In certain embodiments, for example, the data distribution service software defines at least a portion of an object.

C. In certain embodiments, for example, the network stack may be executing on a dedicated computing device. In certain embodiments, for example, the method may be performed at wire speed.

Certain embodiments may provide, for example, a kernel-based method for authorized network communication, comprising: detecting a network packet added to a network stack memory, moving the detected network packet from the network stack memory to a heap space; authorizing the network packet, and removing the authorized network packet from the heap space and replacing the network packet in network stack memory. In certain embodiments, for example, the authorizing may be based at least on: a) a universal identifier for a source of the network packet, comprising an authorized source application identifier and an identifier for an authorized user of the source application; b) a universal identifier for destination of the network packet, comprising an authorized destination application identifier and an identifier for an authorized user of the destination application; c) a port associated with the destination application; d) a different port associated with a middleware; and e) a data protocol field.

A. In certain embodiments, for example, the middleware may be responsible for the detecting. In certain embodiments, for example, the middleware may be responsible for the moving. In certain embodiments, for example, the middleware may be responsible for the authorizing. In certain embodiments, for example, the middleware may be responsible for the detecting, the moving, and the authorizing.

Certain embodiments may provide, for example, a kernel-based method for authorized network communication, comprising: i) detecting a network packet added to a network stack memory; ii) moving the detected network packet from the network stack memory to a heap space; iii) authorizing the network packet, based at least on: a) a universal identifier for a source of the network packet, comprising an authorized source application identifier and an identifier for an authorized user of the source application; b) a universal identifier for destination of the network packet, comprising an authorized destination application identifier and an identifier for an authorized user of the destination application; c) a port associated with the destination application; d) a different port associated with a middleware; and e) a data protocol field; and iv) removing the authorized network packet from the heap space and replacing the network packet in network stack memory.

Certain embodiments may comprise, for example, a kernel-based method for authorized network communication, comprising: detecting (for example receiving or intercepting) a network packet added to a network stack memory, making the detected network packet accessible to a heap space (for example by moving or copying the network packet from the network stack memory to the heap space), authorizing the network packet, and removing the authorized network packet from the heap space and replacing the network packet in network stack memory. In certain further embodiments, for example, the authorizing may reference: an index defined by a pre-approved application a pre-approved user of the application, a unique 2-tuple consisting of a port number assigned to the application and a port number assigned to an encryption layer, a unique 2-tuple consisting of a port number assigned to a remote application and a port number assigned to a remote encryption layer, and a data protocol field.

Certain embodiments may provide, for example, a method to prevent an attack by malware resident on a node, comprising: a network security agent opening a port in listening mode, the port configured to establish a compromised encrypted connection, receiving a connection request at the port from a malware configured to exploit the compromised encryption protocol, establishing an encrypted tunnel between the network security agent and the malware, the encrypted tunnel having the port as an endpoint, and the network security agent terminating the encrypted tunnel after a fixed number of attempts by the malware to provide an expected identification code for the node, the expected identification code selected by the network security agent based on the port number of the port.

A. In certain embodiments, for example, the network security agent may be present on the node, processor, or computing device. In certain embodiments, for example, the network security agent may be present on a remote node, processor, or computing device. In certain embodiments, for example, the encrypted connection may be compromised due to a compromised private key. In certain embodiments, for example, the encrypted connection may be compromised due to one or more compromised components of a cipher suite. In certain embodiments, for example, the encrypted connection may be compromised due to one or more security holes in a software implementation of an encryption protocol. In certain embodiments, for example, the malware may be present on the node, processor, or computing device. In certain embodiments, for example, the malware may be present on a different node, processor, or computing device. In certain embodiments, for example, the port may be configured according to a secure socket layer protocol. In certain embodiments, for example, the port may be configured according to an IPsec protocol. In certain embodiments, for example, the malware may identify the port based on a port scan. In certain embodiments, for example, the expected node identification code may have a length of at least 2048 bits. In certain embodiments, for example, the sum-of-digits of the expected node identification code may be a prime number. In certain embodiments, for example, a portion of the expected node identification code may be a randomly generated number. In certain embodiments, for example, at least 90% of the digits of the expected node identification code may be a randomly generated number. In certain embodiments, for example, the expected node identification code may be stored in a proprietary binary format configured to be interpreted solely by the network security agent. In certain embodiments, for example, the expected node identification code may be stored on a non-transitory computer-readable storage medium (for example a nonvolatile memory storage medium) in an encrypted, read-only binary file, the binary file comprising a proprietary record structure. In certain embodiments, for example, the binary file may comprise plural records having variable record length. In certain embodiments, for example, the binary file may be readable into random access memory solely by the network security agent. In certain embodiments, for example, the security agent may terminate the encrypted tunnel after no more than 20 attempts to provide the expected identification code.

Certain embodiments may provide, for example, a method to prevent an attack by malware resident on a node, comprising: a network security agent sending a connection request to a spoofed listening port associated with a malware, the network security agent configured to establish a compromised encrypted connection, establishing an encrypted tunnel between the network security agent and the malware, the encrypted tunnel having the malware port as an endpoint, and the network security agent terminating the encrypted tunnel after a fixed number of attempts by the malware to provide an expected identification code for the node, the expected identification code selected by the network security agent based on the port number of the port. In certain embodiments, for example, the network security agent may inadvertently send the connection request to the spoofed listening port. In certain embodiments, for example, the network security agent may be directed (for example by malware) to send the connection request to the spoofed listening port.

Certain embodiments may provide, for example, a method to prevent an attack by malware resident on a node, comprising: the malware attempting to transmit a connection request to a remote destination port, and checking an application code (for example an application code obtained from process status check) and a user code value of the malware against expected values, the expected values selected based on the destination port.

A. In certain embodiments, for example, the method may further comprise dropping the connection request based on the application code and a user code failing to match the expected values. In certain embodiments, for example, the method may further comprise dropping the connection request based on the absence of the destination port in a preconfigured list of allowed destination ports. In certain embodiments, for example, the malware may be introduced to the node via a USB port.

Certain embodiments may provide, for example, a method for communication between a first node and a second node, processor, or computing device. In certain embodiments, for example, the method may comprise establishing an encrypted connection to transfer data exclusively between a first process running on the first node and a second process running on the second node, processor, or computing device. In certain embodiments, for example, the establishing may comprise the second node receiving a node identification packet from the first node and confirming a shared secret node identification code received from the first node, processor, or computing device. In certain embodiments, for example, the method may comprise managing a connection state of the authorized encrypted connection. In certain embodiments, for example, the managing may comprise confirming that network packets received at the second node via the encrypted connection comprise at least a predetermined user identification code, a predetermined process identification code, and/or a predetermined data protocol identification code. In certain embodiments, for example, the node identification packet may comprise a packet type header configured for processing by network security software. In certain embodiments, for example, the network security software may be invoked in a network stack. In certain further embodiments, for example, the packet type header may be located after a layer three header according to the OSI Seven Layer Model. In certain further embodiments, for example, the packet type header may be located after a layer four header according to the OSI Seven Layer Model. In certain further embodiments, for example, the packet type header may be located after an SSL/TLS header. In certain embodiments, for example, a data protocol of the data to be transferred may match an expected data protocol based on the data protocol identification code. In certain embodiments, for example, the predetermined user identification code, the predetermined process identification code, and/or the predetermined data protocol identification code may be metadata present in the network packets. In certain embodiments, for example, the metadata may be configured for processing by network security software. In certain embodiments, for example, the network security software may be invoked in a network stack. In certain further embodiments, for example, the packet type header may be located after a layer three header according to the OSI Seven Layer Model. In certain further embodiments, for example, the metadata may be located after a layer four header according to the OSI Seven Layer Model. In certain further embodiments, for example, the packet type header may be located after an SSL/TLS header.

Certain embodiments may provide, for example, a method for communication between a first node and a second node, processor, or computing device. In certain embodiments, for example, the method may comprise authorizing an encrypted connection to transfer data exclusively between a first process (for example a first user process) running on the first node and a second process (for example a second user process) running on the second node, processor, or computing device. In certain embodiments, for example, the authorizing may comprise transmitting a node identification packet from the first node to the second node, the node identification packet comprising a shared secret node identification code for the first node, processor, or computing device. In certain embodiments, for example, the authorizing may be followed by managing a connection state of the authorized encrypted connection. In certain embodiments, for example, the managing may comprise withdrawing the authorization if at least one network packet received from the authorized encrypted connection is missing one or more of an expected user identification code, process identification code, and data protocol identification code. In certain embodiments, for example, the authorizing may further comprise: transmitting a node identification packet from the second node to the first node, the node identification packet comprising a shared secret node identification code for the second node, processor, or computing device. In certain embodiments, for example, the authorizing may further comprise: transmitting a process identification packet from the first node to the second node, the process identification packet comprising a user identifier for the first process, an application identifier for the first process, a data protocol identifier for the connection, or a combination of two or more of the foregoing identifiers. In certain embodiments, for example, the authorizing may further comprise: executing operating system commands to identify a process requesting the data transfer, followed by verifying that the requesting process is authorized to transfer and/or receive the data. In certain embodiments, for example, the managing may further comprise: executing operating system commands to identify a process requesting the data transfer, followed by verifying that the requesting process is authorized to transfer and/or receive the data. In certain embodiments, for example, the authorizing may comprise consulting configuration files present on the first node and second node to obtain one or more of the shared secret node identification code, user identification code, process identification code, and data protocol identification code. In certain embodiments, for example, the managing may comprise consulting configuration files present on the first node and second node to obtain one or more of the shared secret node identification code, user identification code, process identification code, and data protocol identification code. In certain embodiments, for example, a 3-tuple comprising the user identification code, process identification code, and data protocol identification code may be a shared secret between the first node and the second node, processor, or computing device. In certain embodiments, for example, a 4-tuple comprising the shared secret node identification code, user identification code, process identification code, and data protocol identification code may be a shared secret between the first node and the second node, processor, or computing device. In certain embodiments, for example, the authorizing may comprise mutual exchange from and authorization by the first node and second node of one or more of the shared secret node identification code, user identification code, process identification code, and data protocol identification code.

Certain embodiments may provide, for example, a method for communication between a first node and a second node, processor, or computing device. In certain embodiments, for example, the method may comprise authorizing an encrypted connection to transfer data between a first process running on the first node and a second process running on the second node, processor, or computing device. In certain embodiments, for example, the authorizing may comprise mutual exchange, authentication, and authorization of shared secret first and second node identification codes. In certain embodiments, for example, the authorizing may be followed by managing a connection state of the authorized encrypted connection. In certain embodiments, for example, the managing may comprise dropping the connection if an incoming network packet from the authorized encrypted connection is missing one or more of an expected user identification code, process identification code, and data protocol identification code.

Certain embodiments may provide, for example, a method for communication between a first node and a second node, processor, or computing device. In certain embodiments, for example, the method may comprise authorizing an encrypted connection to transfer data exclusively between a first process running on the first node and a second process running on the second node, processor, or computing device. In certain embodiments, for example, the authorizing may comprise transmitting a node identification packet from the first node to the second node, the node identification packet comprising a shared secret node identification code for the first node, processor, or computing device. In certain embodiments, for example, the authorizing may be followed by managing a connection state of the authorized encrypted connection. In certain embodiments, for example, the managing may comprise withdrawing the authorization if at least one network packet received from the authorized encrypted connection is missing an expected user, process, and/or packet payload data protocol identification code.

Certain embodiments may provide, for example, a method for communication between a first node and a second node, comprising: i) establishing an encrypted connection to transfer data exclusively between a first process running on the first node and a second process running on the second node, comprising: the second node receiving a node identification packet from the first node and confirming a shared secret node identification code received from the first node; and ii) managing a connection state of the authorized encrypted connection, comprising: confirming that network packets received at the second node via the encrypted connection comprise at least an predetermined user identification code, a predetermined process identification code, and/or a predetermined data protocol identification code.

Certain embodiments may provide, for example, a method for communication between a first node and a second node, comprising: i) authorizing an encrypted connection to transfer data exclusively between a first process running on the first node and a second process running on the second node, comprising: transmitting a node identification packet from the first node to the second node, the node identification packet comprising a shared secret node identification code for the first node; followed by ii) managing a connection state of the authorized encrypted connection, comprising: withdrawing the authorization if at least one network packet received from the authorized encrypted connection is missing one or more of an expected user identification code, process identification code, and data protocol identification code.

Certain embodiments may provide, for example, a method for communication between a first node and a second node, comprising: i) authorizing an encrypted connection to transfer data between a first process running on the first node and a second process running on the second node, comprising: mutual exchange, authentication, and authorization of shared secret first and second node identification codes; followed by ii) managing a connection state of the authorized encrypted connection, comprising: dropping the connection if an incoming network packet from the authorized encrypted connection is missing one or more of an expected user identification code, process identification code, and data protocol identification code.

Certain embodiments may provide, for example, a method for communication between a first node and a second node, comprising: i) authorizing an encrypted connection to transfer data exclusively between a first process running on the first node and a second process running on the second node, comprising: transmitting a node identification packet from the first node to the second node, the node identification packet comprising a shared secret node identification code for the first node; followed by ii) managing a connection state of the authorized encrypted connection, comprising: withdrawing the authorization if at least one network packet received from the authorized encrypted connection is missing an expected user, process, and/or packet payload data protocol identification code.

Certain embodiments may provide, for example, a method of securing network communications received by a network node, processor, or computing device. In certain embodiments, for example, the method may comprise confirming network packets received are from a preconfigured, predefined, pre-established and/or preprovisioned source process running on a preconfigured, predefined, pre-established and/or preprovisioned authorized source node and directed to a preconfigured, predefined, pre-established and/or preprovisioned authorized destination process running on a preconfigured, predefined, pre-established and/or preprovisioned authorized destination node, processor, or computing device. In certain embodiments, for example, the method may further comprise passing at least a portion of the payloads from the network packets to the authorized destination process.

A. In certain embodiments, for example, the authorized source process may be preconfigured, predefined, pre-established and/or preprovisioned relative to the network node (for example the network node may contain a file identifying the source process, wherein the file is present on the network node prior to the confirming and passing). In certain embodiments, for example, the authorized source node may be preconfigured, predefined, pre-established and/or preprovisioned relative to the network node (for example the network node may contain a file identifying the source node, wherein the file is present on the network node prior to the confirming and passing). In certain embodiments, for example, the authorized destination process may be preconfigured, predefined, pre-established and/or preprovisioned relative to the network node (for example the network node may contain a file identifying the destination process, wherein the file is present on the network node prior to the confirming and passing). In certain embodiments, for example, the authorized destination node may be preconfigured, predefined, pre-established and/or preprovisioned relative to the network node (for example the network node may contain a file identifying the destination node, wherein the file is present on the network node prior to the confirming and passing). In certain embodiments, for example, the authorized source process may be preconfigured, predefined, pre-established and/or preprovisioned relative to the authorized source node (for example the authorized source node may contain a file identifying the source process, wherein the file is present on the authorized source node prior to the confirming and passing). In certain embodiments, for example, the authorized source node may be preconfigured, predefined, pre-established and/or preprovisioned relative to the authorized source node (for example the authorized source node may contain a file identifying the source node, wherein the file is present on the authorized source node prior to the confirming and passing). In certain embodiments, for example, the authorized destination process may be preconfigured, predefined, pre-established and/or preprovisioned relative to the authorized source node (for example the authorized source node may contain a file identifying the destination process, wherein the file is present on the authorized source node prior to the confirming and passing). In certain embodiments, for example, the authorized destination node may be preconfigured, predefined, pre-established and/or preprovisioned relative to the authorized source node (for example the authorized source node may contain a file identifying the destination node, wherein the file is present on the authorized source node prior to the confirming and passing). In certain embodiments, for example, the authorized source process may be preconfigured, predefined, pre-established and/or preprovisioned relative to the authorized destination node (for example the authorized destination node may contain a file identifying the source process, wherein the file is present on the authorized destination node prior to the confirming and passing). In certain embodiments, for example, the authorized source node may be preconfigured, predefined, pre-established and/or preprovisioned relative to the authorized destination node (for example the authorized destination node may contain a file identifying the source node, wherein the file is present on the authorized destination node prior to the confirming and passing). In certain embodiments, for example, the authorized destination process may be preconfigured, predefined, pre-established and/or preprovisioned relative to the authorized destination node (for example the authorized destination node may contain a file identifying the destination process, wherein the file is present on the authorized destination node prior to the confirming and passing). In certain embodiments, for example, the authorized destination node may be preconfigured, predefined, pre-established and/or preprovisioned relative to the authorized destination node (for example the authorized destination node may contain a file identifying the destination node, wherein the file is present on the authorized destination node prior to the confirming and passing).

B. In certain embodiments, for example, the received packets may be received via an authorized encrypted communication pathway, wherein the authorized encrypted communication pathway may be established, wherein the establishing of the authorized encrypted communication pathway may comprise authorizing a preconfigured, predefined, pre-established and/or preprovisioned source node and a preconfigured, predefined, pre-established and/or preprovisioned destination node, processor, or computing device.

C. In certain embodiments, for example, the authorized destination node may be the network node, processor, or computing device. In certain embodiments, for example, the authorized destination node may perform the confirming and passing.

D. In certain embodiments, for example, the confirming may be transparent to the authorized source process. In certain embodiments, for example, the confirming may be transparent to the authorized destination process. In certain embodiments, for example, the confirming may be transparent to the authorized source process and the authorized destination process. In certain embodiments, for example, the confirming may comprise: comparing destination port numbers of the network packets with a preconfigured, predefined, pre-established and/or preprovisioned port number associated with the authorized destination process. In certain embodiments, for example, the associated port may be assigned to the authorized destination process. In certain embodiments, for example, the associated port may be assigned to network security software in communication with the authorized destination process. In certain embodiments, for example, the confirming may comprise: obtaining destination port numbers and source application codes, source process owners, and/or data type protocol from the network packets; selecting one or plural preconfigured, predefined, pre-established and/or preprovisioned authorization codes assigned to the destination port numbers; and matching the source application codes, source process owners, and/or data type protocol obtained from the network packets to the one or plural authorization codes.

E. In certain embodiments, for example, the passing may comprise transmitting the least a portion of the payloads from the network packets on a dedicated communication pathway for the authorized source process. In certain embodiments, for example, the passing may comprise transmitting the at least a portion of the payloads from the network packets via a loopback interface. In certain embodiments, for example, the passing may comprise passing the at least a portion of the payloads from the network packets via kernel functions (for example read and/or write functions). In certain embodiments, for example, the passing may comprise copying the at least a portion of the payloads from one memory location to another memory location. In certain embodiments, for example, the passing may not comprise copying the at least a portion of the payloads from one memory location to another memory location. In certain embodiments, for example, the passing may comprise adjusting a pointer to a location in kernel memory.

F. In certain embodiments, for example, the method may further comprise: establishing an authorized connection having the associated port as an endpoint, followed by receiving the network packets received.

Certain embodiments may provide, for example, a method of securing network communications received by a network node, processor, or computing device. In certain embodiments, for example, the method may comprise establishing an authorized encrypted communication pathway, which may comprise authorizing a preconfigured, predefined, pre-established and/or preprovisioned source node and a preconfigured, predefined, pre-established and/or preprovisioned destination node, processor, or computing device. In certain embodiments, for example, the method may comprise confirming network packets received via the encrypted communication pathway are from a preconfigured, predefined, pre-established and/or preprovisioned authorized source process running on the authorized source node and directed to a preconfigured, predefined, pre-established and/or preprovisioned authorized destination process running on the authorized destination node, processor, or computing device. In certain embodiments, for example, the method may comprise passing at least a portion of the payloads from the network packets to the authorized destination process. In certain embodiments, for example, the source node and the destination node may authorize one another based on mutual exchange, authentication, and authorization of shared secret device codes between the source node and the destination node, processor, or computing device. In certain embodiments, for example, the mutual exchange may be made across the encrypted communication pathway prior to its authorization. In certain embodiments, for example, the shared secret device codes may be created independently of any internet protocol. In certain embodiments, for example, the encrypted communication pathway may be formed according to SSL/TLS protocol prior to its authorization. In certain embodiments, for example, the encrypted communication pathway may be formed according to IPsec protocol prior to its authorization. In certain embodiments, for example, the encrypted communication pathway may be formed according to L2TP protocol prior to its authorization.

Certain embodiments may provide, for example, a method of securing network communications received by a network node, comprising: i) confirming network packets received are from a preconfigured, predefined, pre-established and/or preprovisioned authorized source process running on a preconfigured, predefined, pre-established and/or preprovisioned authorized source node and directed to a preconfigured, predefined, pre-established and/or preprovisioned authorized destination process running on a preconfigured, predefined, pre-established and/or preprovisioned authorized destination node; and ii) passing at least a portion of the payloads from the network packets to the authorized destination process.

Certain embodiments may provide, for example, a method of securing network communications received by a network node, comprising: i) establishing an authorized encrypted communication pathway, comprising authorizing a preconfigured, predefined, pre-established and/or preprovisioned source node and a preconfigured, predefined, pre-established and/or preprovisioned destination node; ii) confirming network packets received via the encrypted communication pathway are from a preconfigured, predefined, pre-established and/or preprovisioned authorized source process running on the authorized source node and directed to a preconfigured, predefined, pre-established and/or preprovisioned authorized destination process running on the authorized destination node; and iii) passing at least a portion of the payloads from the network packets to the authorized destination process.

Certain embodiments may provide, for example, a method for communication between a first node and a second node, processor, or computing device. In certain embodiments, for example, the method may comprise pre-loading a first configuration file (for example a preprovisioned first configuration file) on the first node (for example loading the file onto a non-transitory computer-readable storage medium (for example a nonvolatile memory storage medium) of the first node prior to boot-up of the first node, or loading the file into memory of the first node prior to other steps of the method enumerated herein) and a second configuration file (for example a preprovisioned second configuration file) on the second node, processor, or computing device. In certain embodiments, for example, the method may comprise forming an encrypted communication pathway. In certain embodiments, for example, the method may comprise authorizing the encrypted communication pathway to transfer data between a first process running on the first node and a second process running on the second node, processor, or computing device. In certain embodiments, for example, the authorizing may comprise transmitting a first node identification packet from the first node to the second node, the first node identification packet comprising a payload having a first node identifier assigned to the first node, the first node identifier obtained from the pre-loaded first configuration file on the first node, processor, or computing device. In certain embodiments, for example, the authorizing may comprise comparing the first node identifier from the first node identification packet with a further node identifier assigned to the first node, the further node identifier obtained from the pre-loaded second configuration file on the second node, processor, or computing device. In certain embodiments, for example, the data may comprise an executable program, a program command, typed data, a combination of two or more of the foregoing, or a portion of one of the foregoing.

A. In certain embodiments, for example, the method may be transparent to the first process and the second process (for example the first process and the second process may execute first and second compiled code whether or not the method is invoked, or each of the source code for the first process and the source code for the second process may interface with a network stack using standard function syntax of a network application programmer's interface).

B. In certain embodiments, for example, the first node identification packet may be transmitted through the encrypted communication pathway. In certain embodiments, for example, the first node identifier may be nonpublic and a shared secret. In certain embodiments, for example, the first node identifier may be nonpublic. In certain embodiments, for example, the first node identifier may be a shared secret between the first node and the second node, processor, or computing device. In certain embodiments, for example, the first node identifier may not be an IP address. In certain embodiments, for example, the first node identifier may not be a MAC address. In certain embodiments, for example, the first node identifier may not be a parameter used in (or a field present in) a layer 2-5 protocol header according to the OSI model.

C. In certain embodiments, for example, the comparing may be performed by network security software, the network security software invoked in a network stack of the second node, processor, or computing device. In certain embodiments, for example, the network security software may be transparent to the first process and the second process. In certain embodiments, for example, an interface to the network security software may be invoked using standard network API syntax.

D. In certain embodiments, for example, the first configuration file may be pre-loaded on first nonvolatile storage media (for example first physical nonvolatile storage media) and the second configuration file may be pre-loaded on second nonvolatile storage media (for example second physical nonvolatile storage media). In certain embodiments, for example, the pre-loaded second configuration file may comprise at least one record, no more than one of the at least one record comprising an n-tuple consisting of the first node identifier and one or more of a first application code, first process owner code, and first data type code. In certain embodiments, for example, the at least one record may comprise an identifier, the identifier used in forming the encrypted communication pathway. In certain embodiments, for example, the identifier may be a cryptographic primitive (for example a prime number, or for example a private key). In certain embodiments, for example, the at least one record may be a variable length record. In certain embodiments, for example, the second configuration file may be an encrypted binary file.

E. In certain embodiments, for example, the method may further comprise: transmitting a data packet from the first node to the second node, the data packet comprising a payload, the payload comprising: data from the first process; and at least one first process identifier comprising one or more of an application code (i.e., a code or identifier assigned to the application), process owner code, and data type code, the at least one first process identifier assigned to the first node, the at least one first process identifier obtained from the pre-loaded first configuration file on the first node, processor, or computing device. In certain embodiments, for example, the data may conform (for example the formatting of the data may conform) to a data type assigned to the data type code.

F. In certain embodiments, for example, the method may further comprise: comparing the at least one first process identifier with an at least one process identifier assigned to the first process, the at least one process identifier obtained from the pre-loaded second configuration file on the second node, processor, or computing device. In certain embodiments, for example, the method may further comprise: updating an authorized connection list to show an open connection state for the authorized encrypted communication pathway.

G. In certain embodiments, for example, the method may further comprise: transmitting data packets from the first node to the second node, the data packets comprising payloads, each of the payloads comprising: data from the first process; and at least one first process identifier comprising one or more of an application code, process owner code, and data type code, the at least one first process identifier assigned to the first node, the at least one first process identifier obtained from the pre-loaded first configuration file on the first node, processor, or computing device. In certain embodiments, for example, the method may further comprise: checking an authorized connection list resident on the second node to confirm that the encrypted communication pathway is in an open connection state. In certain embodiments, for example, the at least one first process identifier may be positioned in the payload to be processed by network security software. In certain embodiments, for example, the processing may be timed to occur prior to the processing of any application layer protocol header. In certain embodiments, for example, the method may further comprise: comparing the at least one first process identifier contained in each one of the payloads with an at least one process identifier assigned to the first process, the at least one process identifier obtained from the pre-loaded second configuration file on the second node, processor, or computing device. In certain embodiments, for example, the method may further comprise: updating an authorized connection list to change the authorized encrypted communication pathway connection state from open to closed if the at least one first process identifier contained in at least one of the payloads does not match the at least one first process identifier obtained from the pre-loaded first configuration file on the first node, processor, or computing device.

H. In certain embodiments, for example, the authorizing may comprise: transmitting a second node identification packet from the second node to the first node, the second node identification packet comprising a payload having a second node identifier assigned to the second node, the second node identifier obtained from the pre-loaded second configuration file on the second node; and comparing the second node identifier from the second node identification packet with an additional node identifier assigned to the second node, the additional node identifier obtained from the pre-loaded first configuration file on the first node, processor, or computing device.

I. In certain embodiments, for example, the authorizing may comprise: transmitting a first process identification packet from the first node to the second node, the first process identification packet comprising a payload having at least one first process identifier assigned to the first process, the at least one first process identifier comprising one or more of a first application code, first process owner code, and first data type code, the at least one first process identifier assigned to the first node, the first process identifier obtained from the pre-loaded first configuration file on the first node; and comparing the at least one first process identifier from the first process identification packet with a further at least one process identifier assigned to the first node, the further at least one process identifier obtained from the pre-loaded second configuration file on the second node, processor, or computing device.

J. In certain embodiments, for example, the authorizing may comprise: transmitting a second process identification packet from the second node to the first node, the second process identification packet comprising a payload having at least one second process identifier assigned to the second process, the at least one second process identifier comprising one or more of a second application code, second process owner code, and second data type code, the at least one second process identifier assigned to the second node, the second process identifier obtained from the pre-loaded second configuration file on the first node; and comparing the at least one second process identifier from the second process identification packet with an additional at least one process identifier assigned to the second node, the additional at least one process identifier obtained from the pre-loaded first configuration file on the second node, processor, or computing device.

K. In certain embodiments, for example, the method may further comprise: executing operating system commands to identify a process requesting the data transfer, followed by verifying that the requesting process is the first process.

Certain embodiments may provide, for example, a method for communication between a first node and a second node, comprising: i) pre-loading a first configuration file on the first node and a second configuration file on the second node; ii) forming an encrypted communication pathway; and iii) authorizing the encrypted communication pathway to transfer data between a first process running on the first node and a second process running on the second node, comprising: a) transmitting a first node identification packet from the first node to the second node, the first node identification packet comprising a payload having a first node identifier assigned to the first node, the first node identifier obtained from the pre-loaded first configuration file on the first node; and b) comparing the first node identifier from the first node identification packet with a further node identifier assigned to the first node, the further node identifier obtained from the pre-loaded second configuration file on the second node, processor, or computing device.

Certain embodiments may provide, for example, a method for authorized network communication. In certain embodiments, for example, the method may comprise: establishing a communication pathway between a first processor node and a second processor node, processor, or computing device. In certain embodiments, for example, the method may comprise comparing a second node identification code obtained from a second node identification packet against a second node expected value. In certain embodiments, for example, the method may comprise further comparing a first node identification code obtained from a first node identification packet against a first node expected value. In certain embodiments, for example, the method may comprise transmitting, after the comparing and further comparing, application data via the communication pathway.

A. In certain embodiments, for example, the first processor node may execute the comparing. In certain embodiments, for example, the second processor node may execute the further comparing. In certain embodiments, for example, the comparing and further comparing may follow the establishing. In certain embodiments, for example, the transmitting may be executed only after the comparing and further comparing.

B. In certain embodiments, for example, the communication pathway may be encrypted. In certain embodiments, for example, the first node identification code may be encrypted in the first node identification packet with a first single-use encryption key; and/or the second node identification code is encrypted in the second node identification packet with a second single-use encryption key.

C. In certain embodiments, for example, the first node identification code and/or the second node identification code may be nonpublic. In certain embodiments, for example, the first node identification code and/or the second node identification code may be a shared secret. In certain embodiments, for example, the second node expected value may be pre-provisioned on the first processor node; and/or the first node expected value may be pre-provisioned on the second processor node, processor, or computing device.

D. In certain embodiments, for example, the first node identification packet may comprise a higher-than-OSI layer three header, the a higher-than-OSI layer three header comprising a packet type indicator, the packet type indicator interpretable by network security software to alert the network security software to expect the first node identification code. In certain embodiments, for example, the second node identification packet may comprise a higher-than-OSI layer three header, the a higher-than-OSI layer three header comprising a packet type indicator, the packet type indicator interpretable by network security software to alert the network security software to expect the second node identification code.

E. In certain embodiments, for example, the first node identification packet and the second node identification packet may be received via the communication pathway. In certain embodiments, for example, the first node identification packet and the second node identification packet may be received via the network. In certain embodiments, for example, the first node identification packet and the second node identification packet may not be received via the communication pathway.

Certain embodiments may provide, for example, a method for authorized network communication. In certain embodiments, for example, the method may comprise: i) establishing a communication pathway between a first processor node and a second processor node; ii) comparing a second node identification code obtained from a second node identification packet against a second node expected value; iii) further comparing a first node identification code obtained from a first node identification packet against a first node expected value; and iv) transmitting, after the comparing and further comparing, application data via the communication pathway.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: forming a communication pathway between a source computing device and a destination computing device, comprising: comparing a destination computing device nonpublic identification code obtained from the destination computing device with a destination computing device pre-established value. In certain embodiments, for example, the destination computing device pre-established value may be preprovisioned on the source computing device.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations, the communication management operations comprising: forming a communication pathway between a source computing device and a destination computing device, comprising: comparing a destination computing device nonpublic identification code obtained from the destination computing device with a destination computing device pre-established value.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: forming a communication pathway between a source computing device and a destination computing device. In certain embodiments, for example, the forming a communication pathway may comprise comparing a destination computing device nonpublic identification code obtained from the destination computing device via the network with a destination computing device pre-established value. In certain embodiments, for example, the forming a communication pathway may comprise further comparing a source computing device nonpublic identification code obtained from the source computing device via the network to a source computing device pre-established value.

A. In certain embodiments, for example, the comparing and the further comparing may be performed independently. In certain embodiments, for example, the comparing and the further comparing may be performed sequentially. In certain embodiments, for example, the further comparing may not be performed until after the comparing is performed. In certain embodiments, for example, the comparing may not be performed until after the further comparing is performed. In certain embodiments, for example, the comparing and the further comparing may be performed asynchronously. In certain embodiments, for example, the comparing and the further comparing may be performed in a predetermined sequence.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations, the communication management operations comprising: forming a communication pathway between a source computing device and a destination computing device, comprising: a) comparing a destination computing device nonpublic identification code obtained from the destination computing device via the network with a destination computing device pre-established value; and b) comparing a source computing device nonpublic identification code obtained from the source computing device via the network to a source computing device pre-established value.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: forming a communication pathway between a source computing device and a destination computing device. In certain embodiments, for example, the forming a communication pathway may comprise comparing a destination computing device nonpublic identification code obtained from the destination computing device via the network with a destination computing device pre-established value. In certain embodiments, for example, the forming a communication pathway may comprise further comparing a source computing device nonpublic identification code obtained from the source computing device via the network to a source computing device pre-established value. In certain embodiments, for example, the forming a communication pathway may comprise additionally comparing user-application identifiers and a payload data-type identifiers exchanged between the source and destination computing devices with predefined authorization codes.

A. In certain embodiments, for example, the comparing, further comparing, and additionally comparing may be performed independently. In certain embodiments, for example, the comparing, further comparing, and additionally comparing may be performed sequentially. In certain embodiments, for example, the further comparing may not be performed until after the comparing is performed. In certain embodiments, for example, the comparing may not be performed until after the further comparing is performed, and the additionally comparing may not be performed until after the further comparing is performed. In certain embodiments, for example, the comparing, further comparing, and additionally comparing may be performed asynchronously. In certain embodiments, for example, the comparing, further comparing, and additionally comparing may be performed in a predetermined sequence.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations, the communication management operations comprising: forming a communication pathway between a source computing device and a destination computing device, comprising: a) comparing a destination computing device nonpublic identification code obtained from the destination computing device via the network with a destination computing device pre-established value; b) comparing a source computing device nonpublic identification code obtained from the source computing device via the network to a source computing device pre-established value; and c) comparing user-application identifiers and a payload data-type identifiers exchanged between the source and destination computing devices with predefined authorization codes.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: forming a communication pathway between a source computing device and a destination computing device. In certain embodiments, for example, the forming a communication pathway may comprise comparing, on the source computing device, a destination computing device nonpublic identification code obtained via the network with a destination computing device pre-established value.

A. In certain embodiments, for example, the destination computing device nonpublic identification code may be provided by the destination computing device. In certain embodiments, for example, the destination computing device nonpublic identification code may not be provided by the destination computing device. In certain embodiments, for example, the destination computing device nonpublic identification code may be provided by a node, the node different from the destination computing device.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations, the communication management operations comprising: forming a communication pathway between a source computing device and a destination computing device, comprising: comparing, on the source computing device, a destination computing device nonpublic identification code obtained via the network with a destination computing device pre-established value.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: forming a communication pathway between a source computing device and a destination computing device. In certain embodiments, for example, the forming a communication pathway may comprise comparing, on the source computing device, a destination computing device nonpublic identification code obtained from the destination computing device with a destination computing device pre-established value.

In certain embodiments, for example, the forming a communication pathway may comprise comparing, on the destination computing device, a source computing device nonpublic identification code obtained from the source computing device to a source computing device pre-established value.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations, the communication management operations comprising: forming a communication pathway between a source computing device and a destination computing device, comprising: a) comparing, on the source computing device, a destination computing device nonpublic identification code obtained from the destination computing device with a destination computing device pre-established value; and b) comparing, on the destination computing device, a source computing device nonpublic identification code obtained from the source computing device to a source computing device pre-established value.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: forming a communication pathway between a source computing device and a destination computing device. In certain embodiments, for example, the forming a communication pathway may comprise comparing, at the source computing device, a destination computing device nonpublic identification code obtained from a destination node packet with a destination node pre-established value.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations, the communication management operations comprising: forming a communication pathway between a source computing device and a destination computing device, comprising: comparing, at the source computing device, a destination computing device nonpublic identification code obtained from a destination node packet with a destination node pre-established value.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise: establishing authorized communication pathways for port-to-port network communications among the plurality of computing devices. In certain embodiments, for example, the establishing authorized communication pathways may comprise intercepting a network connection request from a source port, the request having an associated destination port number. In certain embodiments, for example, the establishing authorized communication pathways may comprise verifying that the source port is authorized to communicate with a destination port having the associated destination port number. In certain embodiments, for example, the establishing authorized communication pathways may comprise authorizing a communication pathway between a source computing device hosting the source port and a destination computing device hosting the destination port prior to any transmission of application data between the source computing device and the destination computing device via the communication pathway. In certain embodiments, for example, the authorizing may comprise comparing, on the source computing device, a destination computing device nonpublic identification code to a destination computing device expected value, the destination computing device nonpublic identification code obtained from a destination computing device identification packet. In certain embodiments, for example, the authorizing may comprise further comparing, on the destination computing device, a source computing device nonpublic identification code to a source computing device expected value, the source computing device nonpublic identification code obtained from a source computing device identification packet.

A. In certain embodiments, for example, the destination computing device identification packet and/or the source computing device identification packet may be received via the network. In certain embodiments, for example, the destination computing device identification packet and/or the source computing device identification packet may be received via the communication pathway.

B. In certain embodiments, for example, the destination computing device expected value may be pre-provisioned on the source computing device. In certain embodiments, for example, the source computing device expected value may be pre-provisioned on the destination computing device.

C. In certain embodiments, for example, the comparing and/or the further comparing may be enabled by a kernel of the computing device. In certain embodiments, for example, the computer-readable program code may be executable (or compilable, linkable, and/or loadable to be executable) by a computing device executing an operating system (for example a Linux operating system, a Linux-based operating system, a real time operating system, a mini-operating system, an edge device operating system, and/or an open source operating system).

D. In certain embodiments, for example, the communication management operations may comprise: inserting the source computing device nonpublic identification code into a higher-than-OSI layer three portion of the source computing device identification packet. In certain embodiments, for example, the communication management operations may comprise: inserting the source computing device nonpublic identification code into a higher-than-OSI layer four portion of the source computing device identification packet. In certain embodiments, for example, the communication management operations may comprise: inserting the source computing device nonpublic identification code into a payload portion of the source computing device identification packet. In certain embodiments, for example, the communication management operations may comprise: inserting the destination computing device nonpublic identification code into a higher-than-OSI layer three portion of the destination computing device identification packet. In certain embodiments, for example, the communication management operations may comprise: inserting the destination computing device nonpublic identification code into a higher-than-OSI layer four portion of the destination computing device identification packet. In certain embodiments, for example, the communication management operations may comprise: inserting the destination computing device nonpublic identification code into a payload portion of the destination computing device identification packet.

E. In certain embodiments, for example, the communication management operations may comprise: encrypting the source computing device nonpublic identification code and inserting the encrypted source computing device nonpublic identification code into the source computing device identification packet. In certain embodiments, for example, the source computing device nonpublic identification code may be encrypted with a single-use cryptographic key. In certain embodiments, for example, the communication management operations may comprise: encrypting the destination computing device nonpublic identification code and inserting the encrypted destination computing device nonpublic identification code into the destination computing device identification packet. In certain embodiments, for example, the destination computing device nonpublic identification code is encrypted with a single-use cryptographic key.

F. In certain embodiments, for example, the communication pathway between the source computing device and the destination computing device may be established prior to the authorizing.

G. In certain embodiments, for example, the communication management operations may comprise: requesting negotiation of the communication pathway, the requesting comprising sending a connection request packet comprising the associated destination port number.

H. In certain embodiments, for example, the communication management operations may comprise: establishing authorized encrypted communication pathways for all port-to-port network communications among the plurality of networked processor nodes.

I. In certain embodiments, for example, the communication management operations may comprise: comparing user-application identifiers and a payload data-type identifiers exchanged between the source and destination computing devices with predefined authorization codes.

J. In certain embodiments, for example, the comparing and the further comparing may be performed independently. In certain embodiments, for example, the comparing and the further comparing may be performed sequentially. In certain embodiments, for example, the further comparing may not be performed until after the comparing is performed. In certain embodiments, for example, the comparing may not be performed until after the further comparing is performed. In certain embodiments, for example, the comparing and the further comparing may be performed asynchronously. In certain embodiments, for example, the comparing and the further comparing may be performed in a predetermined sequence.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations, the communication management operations comprising: establishing authorized communication pathways for port-to-port network communications among the plurality of computing devices, comprising: i) intercepting, via a network, a network connection request from a source port, the request having an associated destination port number; ii) verifying that the source port is authorized to communicate with a destination port having the associated destination port number; and iii) authorizing a communication pathway between a source computing device hosting the source port and a destination computing device hosting the destination port prior to any transmission of application data between the source computing device and the destination computing device via the communication pathway, comprising: a) comparing, on the source computing device, a destination computing device nonpublic identification code to a destination computing device expected value, the destination computing device nonpublic identification code obtained from a destination computing device identification packet; and b) further comparing, on the destination computing device, a source computing device nonpublic identification code to a source computing device expected value, the source computing device nonpublic identification code obtained from a source computing device identification packet.

Certain embodiments may provide, for example, a method for secure communication between applications on two nodes. In certain embodiments, for example, the method may comprise intercepting, at a first node, a network connection request from a resident first user-application to send data to a destination port on a second node, processor, or computing device. In certain embodiments, for example, the method may comprise consulting a first local policy on the first node to verify that the first user-application is authorized to send data to the destination port. In certain embodiments, for example, the method may comprise verifying, at the second node, that the connection request is authorized by the first local policy for the destination port.

A. In certain embodiments, for example, the method may further comprise transmitting an encrypted identifier for the first local policy from the first node to the second node, processor, or computing device.

B. In certain embodiments, for example, the verifying may comprise consulting the first local policy and a second local policy, the second local policy consulted to verify that a second user application is authorized to receive the data at the destination port. In certain embodiments, for example, the first local policy may comprise an n-tuple filter. In certain embodiments, for example, the first local policy may comprise a port-to-port mapping of authorized connection between the first node and the second node, processor, or computing device. In certain embodiments, for example, the authorized port-to-port mapping may comprise an authorized first user-application identifier, an identifier for a second user application authorized to receive the data at the destination port authorized, and a data type identifier.

Certain embodiments may provide, for example, a method for secure communication between applications on two nodes, comprising: i) intercepting, at a first node, a network connection request from a resident first user-application to send data to a destination port on a second node; ii) consulting a first local policy on the first node to verify that the first user-application is authorized to send data to the destination port; and iii) verifying, at the second node, that the connection request is authorized by the first local policy for the destination port.

Certain embodiments may provide, for example, a product for managing communications of a plurality of networked computing devices. In certain embodiments, for example, the product may comprise a non-transitory computer-readable storage medium having computer-readable program code embodied therein. In certain embodiments, for example, the computer-readable program code may be executable (or compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations. In certain embodiments, for example, the communication management operations may comprise performing communication processing functions on all port-to-network communications of the plurality of processor nodes. In certain embodiments, for example, the communication processing functions may comprise receiving data packets from a user-application source port, the data packets having payloads and associated destination port numbers. In certain embodiments, for example, the communication processing functions may comprise assembling packet segments for all received data packets from the user-application, the packet segments comprising one of the payloads, an associated user-application identifier, and a payload data type descriptor.

A. In certain embodiments, for example, the communication processing functions may comprise verifying that the source ports are authorized to communicate with ports having the associated destination port numbers.

B. In certain embodiments, for example, the communication processing functions may comprise requesting transmission of network packets to the network, each one of the network packets comprising a port number of one of the associated destination port numbers and one of the assembled packet segments.

C. In certain embodiments, for example, the communication processing functions may comprise requesting transmission of network packets to the network through encrypted communication pathways.

D. In certain embodiments, for example, each one of the encrypted communication pathways may have a one-to-one correspondence with one of the associated destination port numbers.

E. In certain embodiments, for example, the receiving may occur in a kernel of the computing device.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a computing device (for example a computing device executing an operating system (for example a Linux operating system, a Linux-based operating system, a real time operating system, a mini-operating system, an edge device operating system, and/or an open source operating system)) to enable and/or cause the computing device to perform communication management operations, the communication management operations comprising: performing communication processing functions on all port-to-network communications of the plurality of processor nodes, the performing communication processing functions comprising: i) receiving data packets from a user-application source port, the data packets having payloads and associated destination port numbers; and ii) assembling packet segments for all received data packets from the user-application, the packet segments comprising one of the payloads, an associated user-application identifier, and a payload data type descriptor.

Certain embodiments may provide, for example, a distributed method to manage communications between plural nodes coupled to a network. In certain embodiments, for example, the distributed method may comprise authorizing port-to-port connections, comprising: obtaining port numbers, node identifiers, user-application identifiers, and payload data type descriptors from pre-provisioned configuration files present on at least two computing devices of the plural computing devices. In certain embodiments, for example, the distributed method may comprise restricting network communications to and from at least one of the at least two computing devices to the authorized port-to-port connections.

Certain embodiments may provide, for example, a distributed method to manage communications between plural nodes coupled to a network, comprising: i) authorizing port-to-port connections, comprising: obtaining port numbers, node identifiers, user-application identifiers, and payload data type descriptors from pre-provisioned configuration files present on at least two computing devices of the plural computing devices; and ii) restricting network communications to and from at least one of the at least two computing devices to the authorized port-to-port connections.

Certain embodiments may provide, for example, a method for secure network communication, comprising: i) selecting, from a preconfigured, exclusive list of authorized data pathways, a dedicated data pathway extending from a source port on a first node to a destination port on a second node, the selected data pathway characterized by a tunnel port number exclusive to the destination port; ii) instantiating a network tunnel extending from the first node to a tunnel port present on the second node, the tunnel port having the selected tunnel port number; iii) prior to transmitting any data from the source port to the destination port: verifying, at the first node, that a first n-tuple received from the network tunnel matches an expected value based on the tunnel port number, the first n-tuple comprising: a nonpublic device code for the second node, a user associated with the destination port, an application associated with the destination port, and a data protocol descriptor; and iv) prior to passing a network packet to the destination port: verifying, at the second node, that an second n-tuple obtained from the network packet matches an expected value based on the tunnel port number, the second n-tuple comprising: a user associated with the source port, an application associated with the source port, and the data protocol descriptor.

Certain embodiments may provide, for example, a method for secure network communication, comprising: i) selecting, from a preconfigured, exclusive list of authorized data pathways, a dedicated data pathway extending from a source port on a first node to a destination port on a second node; ii) instantiating a network tunnel for exclusive use by the dedicated data path, the network tunnel extending from the first node to the second node; iii) prior to transmitting any data through the network tunnel, verifying that the first node, the second node, a user associated with the source port, an application associated with the source port, a user associated with the destination port, an application associated with the destination port, and a data protocol of the data match parameters of the dedicated data path; followed by iv) prior to passing a network packet to the destination port: verifying, at the second node, that the user associated with the source port, the application associated with the source port, and the data protocol descriptor match parameters of the dedicated data pathway.

Certain embodiments may provide, for example, a method of securely transmitting data, comprising: i) prior to transmitting data packets via a dedicated data pathway extending from a source port on a first node to a destination port on a second node, receiving a series of codes at the first node via the dedicated data path; ii) verifying that the received codes include expected codes for the data path, the expected codes associated with the second node, a specified data type, and an owner of the destination port; iii) verifying that the data packets contain expected codes associated with the specified data type and an owner of the source port; followed by iv) passing the data packets to the destination port.

Certain embodiments may provide, for example, a method of securely transmitting data, comprising: i) establishing a dedicated data pathway between a source port on a first node and a destination port on a second node, the destination port associated with an executing user-application configured to receive a specified data type; ii) receiving a series of codes at the first node via the dedicated data path; iii) verifying that the received series of codes include expected codes associated with the second node, the specified data type, and the user-application; followed by iv) transmitting data packets via the dedicated data pathway to the second node; v) further verifying that the transmitted data packets contain expected codes associated with the specified data type and an owner of the source port; followed by vi) passing the transmitted data packets to the destination port. In certain embodiments, for example, the transmitted data packets may be exclusive of the destination port number.

Certain embodiments may provide, for example, a method of securely transmitting data, comprising: i) assembling data packets at a first node, each one of the data packets comprising: a) plural identifiers encoded in metadata; and b) payload obtained from a user-application executing on the source node; ii) passing the assembled data packets to a second node via a dedicated data pathway, the data pathway comprising a source port associated with the user-application; iii) verifying that the metadata identifies a data type and a user-application expected based on a destination port associated with the destination address of the data packets; followed by iv) passing the data packets to the destination port. In certain embodiments, for example, the assembled data packets passed to the second node may be exclusive of the destination port number.

Certain embodiments may provide, for example, a method for secure communication. In certain embodiments, for example, the method may comprise receiving a first network packet from a first user-application, the first network packet comprising a destination port number and a payload. In certain embodiments, for example, the method may comprise forming a second network packet comprising the payload, the second network packet not comprising the destination port number. In certain embodiments, for example, the method may comprise transmitting the second network packet via a machine-to-machine network. In certain embodiments, for example, the method may comprise processing the transmitted second network packet to form a third packet comprising the destination port number and the payload. In certain embodiments, for example, the method may comprise transmitting the payload to a second user-application, the second user-application having a destination port assigned thereto, the destination port number assigned to the destination port.

Certain embodiments may provide, for example, a method for secure communication, comprising: i) receiving a first network packet from a first user-application, the first network packet comprising a destination port number and a payload; ii) forming a second network packet comprising the payload, the second network packet not comprising the destination port number; iii) transmitting the second network packet via a machine-to-machine network; and iv) processing the transmitted second network packet to form a third packet comprising the destination port number and the payload.

Certain embodiments of the presently disclosed methods, systems, products, communication management operations, software, modules, middleware, computing infrastructure and/or apparatus may provide, for example, improvements to existing computing technology for packet-based network communications. Internet protocols allow open access for computer users to remotely access other computers and information stores easily from any access point, resulting in many points of attack for malware. While security layers have been added on top of this core architecture, modern malware exploits gaps in these layers through flaws in software and imperfect trust relationships between communicating devices. The improvements of the present disclosure include the following embodiments.

Certain embodiments may provide, for example, a method for network communication between a first computing device and a second computing device and comprising establishing a communication pathway between a first software port of the first computing device and a second software port of the second computing device according to UDP or TCP, the improvement comprising: i) sending a nonpublic first identification code for the first computing device to the second software port via the established communication pathway; ii) receiving, in response to the sending, a nonpublic second identification code for the second computing device at the first software port; and iii) comparing the nonpublic second identification code with a pre-established value for the second computing device.

Certain embodiments may provide, for example, a method for network communication comprising establishing communication pathways according to UDP or TCP, the improvement comprising: i) intercepting network connection requests having associated destination port numbers; ii) identifying predefined communication port numbers, comprising identifying at least one predefined communication port number for each associated destination port number of the associated destination port numbers; iii) sending UDP or TCP connection request packets comprising the predefined communication port numbers, each one of the communication pathways having a one-to-one correspondence with one of the predefined communication port numbers; and iv) authorizing the communication pathways, comprising comparing computing device identifiers, user-application identifiers, and payload data-type identifiers received the communication pathways with predefined authorization codes.

Certain embodiments may provide, for example, a method for network communication comprising establishing communication pathways according to UDP or TCP, the improvement comprising: i) intercepting network connection requests from source ports, the requests having associated destination port numbers; ii) verifying that the source ports are authorized to communicate with ports having the associated destination port numbers; iii) sending a UDP or TCP connection request packets comprising the associated destination port numbers; and iv) authorizing the communication pathways, comprising comparing computing device identifiers, user-application identifiers, and payload data-type identifiers received from the communication pathways with predefined authorization codes.

Certain embodiments may provide, for example, a method for network communication comprising transmitting UDP or TCP network packets through communication pathways, the improvement comprising: i) receiving data packets having payloads and associated destination port numbers; ii) identifying predefined port numbers, each one of the predefined port numbers having a one-to-one correspondence with one of the associated destination port numbers; iii) assembling packet segments, each one of the packet segments comprising one of the payloads, an associated user-application identifier, and a payload data type descriptor; and iv) requesting transmission of UDP or TCP network packets through the communication pathways, each one of the network packets comprising a port number of one of the predefined port numbers and one of the assembled packet segments, each one of the communication pathways having a one-to-one correspondence with one of the predefined port numbers.

Certain embodiments may provide, for example, a method for network communication comprising receiving UDP or TCP network packets from communication pathways, the improvement comprising: i) obtaining destination port numbers, metadata, and payloads associated with UDP or TCP network packets; ii) identifying predefined authorization codes associated with the destination port numbers, each one of the predefined authorization codes comprising a predefined user-application identifier and a predefined payload data-type identifier associated with one of the destination port numbers; iii) authorizing the network packets, comprising: comparing at least a portion of the metadata with the predefined authorization codes; and iv) requesting transmission of payloads from the authorized network packets to destinations referenced by the destination port numbers.

Certain embodiments may provide, for example, a method for network communication between a first computing device and a second computing device and comprising establishing a communication pathway between a first software port of the first computing device and a second software port of the second computing device according to UDP or TCP, the improvement comprising: one or more of the methods, systems, products, communication management operations, software, modules, middleware, computing infrastructure and/or apparatus of any of the embodiments disclosed herein.

Certain embodiments, for example, may comprise a product for securing communications of a plurality of networked computing devices. In certain embodiments, for example, the product may comprise a non-transitory computer-readable storage medium having computer-readable program code embodied therein. In certain embodiments, for example, the computer-readable program code may be executable (or program code compilable, linkable, and/or loadable to be executable) by a first computing device (for example a computing device executing an operating system (for example a Linux operating system, a Linux-based operating system, a real time operating system, a mini-operating system, an edge device operating system, and/or an open source operating system)) to enable and/or cause the first computing device to perform communication management operations. In certain embodiments, for example, the communications management operations may comprise receiving a first network packet from a first user-application, the first network packet comprising a destination port number and a payload. In certain embodiments, for example, the communications management operations may comprise forming a second network packet comprising the payload, the second network packet not comprising the destination port number. In certain embodiments, for example, the communications management operations may comprise transmitting the second network packet to network security software on a second computing device. In certain embodiments, for example, the communications management operations may comprise confirming that the network security software is preconfigured to transmit the payload to a second user-application on the second computing device, the second user-application having a destination port assigned thereto, the destination port number assigned to the destination port.

A. In certain embodiments, for example, the first user-application may be resident on the first computing device. In certain embodiments, for example, the network security software may obtain the destination port number from a preprovisioned file, the preprovisioned file resident on non-volatile storage media in communication with the second computing device.

Certain embodiments may provide, for example, a product for managing communications of a plurality of networked computing devices, the product comprising a non-transitory computer-readable storage medium having computer-readable program code embodied therein, the computer-readable program code executable (or compilable, linkable, and/or loadable to be executable) by a first computing device executing an operating system (for example a Linux operating system, a Linux-based operating system, a real time operating system, a mini-operating system, an edge device operating system, and/or an open source operating system) to enable and/or cause the first computing device to perform communication management operations, the communication management operations comprising: i) receiving a first network packet from a first user-application, the first network packet comprising a destination port number and a payload; ii) forming a second network packet comprising the payload, the second network packet not comprising the destination port number; iii) transmitting the second network packet to network security software on a second computing device; and iv) confirming that the network security software is preconfigured to transmit the payload to a second user-application on the second computing device, the second user-application having a destination port assigned thereto, the destination port number assigned to the destination port.

A. In any of the products disclosed herein for use on a computing device (for example products for managing communications), the product or a portion thereof may be distributed separately (for example on separate non-transitory computer-readable storage media) from at least a portion (for example all) of an operating system or kernel running (or to be run) on the computing device. In certain embodiments, for example, the product or a portion thereof may be installed separately from at least a portion (for example all) of an operating system or kernel running (or to be run) on the computing device. In certain embodiments, for example, the product or a portion thereof may be compiled separately from at least a portion (for example all) of an operating system or kernel running (or to be run) on the computing device. In certain embodiments, for example, the product or a portion thereof is linked separately from at least a portion (for example all) of an operating system or kernel running on the computing device. In certain embodiments, computer-readable program code executable (or compilable, linkable, and/or loadable to be executable) by a computing device to perform one or more of the communication management operations and/or processing functions disclosed herein (for example one or more of the establishing, performing, intercepting, identifying, requesting, authorizing, verifying, receiving, assembling, requesting transmission, encrypting, decrypting, inserting, translating, comparing, further comparing, additionally comparing, obtaining, negotiating, identifying, or forming operations or functions disclosed herein) are distributed on separate non-transitory computer-readable storage media from computer-readable program code executable (or compilable, linkable, and/or loadable to be executable) by the computing device to perform the other of the communication management operations and/or processing functions. In certain embodiments, for example, the computer-readable program code executable (or compilable, linkable, and/or loadable to be executable) by a computing device to perform the intercepting may be distributed on separate non-transitory computer-readable storage media from the computer-readable program code executable (or compilable, linkable, and/or loadable to be executable) by the computing device to perform other communication management operations and/or processing functions disclosed herein.

B. In certain embodiments, for example, computer-readable program code executable (or compilable, linkable, and/or loadable to be executable) by a computing device to perform the intercepting and/or the receiving operations or functions on a computing device may be distributed separately (for example on separate non-transitory computer-readable storage media) from computer-readable program code executable (or compilable, linkable, and/or loadable to be executable) by the computing device to perform one or more of the identifying, authorizing, verifying, assembling, encrypting, decrypting, inserting, translating, comparing, further comparing, additionally comparing, obtaining, negotiating, identifying, and forming operations or functions. In certain embodiments, for example, computer-readable program code executable (or compilable, linkable, and/or loadable to be executable) by a computing device to perform the intercepting and/or the receiving operations or functions may be installed separately from computer-readable program code executable (or compilable, linkable, and/or loadable to be executable) by the computing device to perform one or more of the identifying, authorizing, verifying, assembling, encrypting, decrypting, inserting, translating, comparing, further comparing, additionally comparing, obtaining, negotiating, identifying, and forming operations or functions. In certain embodiments, for example, computer-readable program code executable (or compilable, linkable, and/or loadable to be executable) by a computing device to perform the intercepting and/or the receiving operations or functions may be compiled separately from computer-readable program code executable (or compilable, linkable, and/or loadable to be executable) by the computing device to perform one or more of the identifying, authorizing, verifying, assembling, encrypting, decrypting, inserting, translating, comparing, further comparing, additionally comparing, obtaining, negotiating, identifying, and forming operations or functions. In certain embodiments, for example, the computer-readable program code executable (or compilable, linkable, and/or loadable to be executable) by a computing device to perform intercepting and/or the receiving operations or function may be linked separately from computer-readable program code executable (or compilable, linkable, and/or loadable to be executable) by the computing device to perform one or more of the identifying, authorizing, verifying, assembling, encrypting, decrypting, inserting, translating, comparing, further comparing, additionally comparing, obtaining, negotiating, identifying, and forming operations or functions.

C. In certain embodiments, for example, the computer-readable program code executable (or compilable, linkable, and/or loadable to be executable) by a computing device to perform one or more of the communication management operations and/or processing functions disclosed herein may be executable (or compilable, linkable, and/or loadable to be executable) in a kernel of the computing device.

D. In certain embodiments, for example, the computer-readable program code executable (or compilable, linkable, and/or loadable to be executable) by a computing device to perform one or more of the communication management operations and/or processing functions disclosed herein may be agnostic as to the operating system or kernel running on the computing device. In certain embodiments, for example, computer-readable program code executable (or compilable, linkable, and/or loadable to be executable) by a computing device to perform one or more of the communication management operations and/or processing functions disclosed herein may contain only a minimum interface functionality required to communicate with an operating system or kernel running on the computing device, and be otherwise agnostic as to the operating system or kernel running. In certain further embodiments, for example, the minimum interface functionality may comprise a kernel header, a definition file, a variable definition, mandatory kernel call, or a combination of two or more of the foregoing. In certain further embodiments, for example, the minimum interface functionality may be limited to one or more kernel headers, one or more definition files, one or more variable definitions, one or more mandatory kernel calls, or a combination of two or more of the foregoing. In certain embodiments, for example, computer-readable program code executable (or compilable, linkable, and/or loadable to be executable) by a computing device to perform one or more of the communication management operations and/or processing functions disclosed herein may be exclusive of any portion of code of a pre-existing operating system or kernel executable (or compilable, linkable, and/or loadable to be executable) on the computing device. In certain embodiments, for example, computer-readable program code executable (or compilable, linkable, and/or loadable to be executable) by a computing device to perform one or more of the communication management operations and/or processing functions disclosed herein may be exclusive of any calls to functions or modules of a pre-existing operating system or kernel executable (or compilable, linkable, and/or loadable to be executable) on the computing device.

E. In certain embodiments, for example, computer-readable program code executable (or compilable, linkable, and/or loadable to be executable) by a computing device to perform one or more of the communication management operations and/or processing functions disclosed herein may receive data from an end-user application program via an operating system or kernel executable (or compilable, linkable, and/or loadable to be executable) on the computing device. In certain embodiments, for example, computer-readable program code executable (or compilable, linkable, and/or loadable to be executable) by a computing device to perform one or more of the communication management operations and/or processing functions disclosed herein may not receive any further data from an operating system or kernel executable (or compilable, linkable, and/or loadable to be executable) on the computing device. In certain embodiments, for example, computer-readable program code executable (or compilable, linkable, and/or loadable to be executable) by a computing device to perform one or more of the communication management operations and/or processing functions disclosed herein may not receive any further data from an operating system or kernel executable (or compilable, linkable, and/or loadable to be executable) on the computing device. In certain embodiments, for example, computer-readable program code executable (or compilable, linkable, and/or loadable to be executable) by a computing device to perform one or more of the communication management operations and/or processing functions disclosed herein (for example all of communication management operations and/or processing functions disclosed herein) may not share any address space (for example kernel address space) with an operating system or kernel executable (or compilable, linkable, and/or loadable to be executable) on the computing device. In certain embodiments, for example, computer-readable program code executable (or compilable, linkable, and/or loadable to be executable) by a computing device to perform one or more of the communication management operations and/or processing functions disclosed herein may not use and/or manipulate any operating system or kernel data structure on the computing device.

F. In certain embodiments, for example, at least a portion of computer-readable program code executable (or compilable, linkable, and/or loadable to be executable) by a computing device to perform one or more of the communication management operations and/or processing functions disclosed herein may not be subject to a copyleft license. In certain embodiments, for example, computer-readable program code executable (or compilable, linkable, and/or loadable to be executable) by a computing device to perform one or more of the communication management operations and/or processing functions disclosed herein may not be subject to a copyleft license. In certain embodiments, for example, computer-readable program code executable (or compilable, linkable, and/or loadable to be executable) by a computing device to perform one or more of the communication management operations and/or processing functions disclosed herein may not be subject to a General Public License (GPL), for example the GPL version 1, the GPL version 2, the GPL version 3, a Lesser GPL, or a modified GPL. In certain embodiments, for example, computer-readable program code executable (or compilable, linkable, and/or loadable to be executable) by a computing device to perform one or more of the communication management operations and/or processing functions disclosed herein may not be subject to a Berkeley Software Distribution (BSD) license, for example a BSD License version 2.0, a Revised BSD License, a New BSD license, a Modified BSD License, or an otherwise modified BSD license.

G. In certain embodiments, for example, at least a portion of the computer-readable program code executable (or compilable, linkable, and/or loadable to be executable) by a computing device (for example a portion of the computer-readable program code executable (or compilable, linkable, and/or loadable to be executable) by a computing device that may not be subject to a copyleft license) may be in communication with (for example may be linked to and/or may exchange data with) software that may be subject to a copyleft license (for example software that may be subject to the GPL version 2). In certain embodiments, for example, the software that may be subject to a copyleft license may be part or all of a kernel or an operating system or kernel. In certain embodiments, for example, the software that may be subject to a copyleft license may be an operating system (for example a Linux operating system, a Linux-based operating system, a real time operating system, a mini-operating system, an edge device operating system, and/or an open source operating system) or kernel. In certain embodiments, for example, the software that may be subject to a copyleft license may be at a boundary (or edge or periphery) of the kernel (for example the software that may be subject to a copyleft license may be an API such as a network API). In certain embodiments, for example, the software that may be subject to a copyleft license may be an interoperability interface (for example an interface for communication between at least a portion of a kernel running on the computing device and an application running on the computing device.

H. In certain embodiments, for example, computer-readable program code executable (or compilable, linkable, and/or loadable to be executable) by a computing device to perform one or more of the communication management operations and/or processing functions disclosed herein may not comprise part of an operating system or kernel executable (or compilable, linkable, and/or loadable to be executable) on the computing device. In certain embodiments, for example, computer-readable program code executable (or compilable, linkable, and/or loadable to be executable) by a computing device to perform one or more of the communication management operations and/or processing functions disclosed herein may be executable (or compilable, linkable, and/or loadable to be executable) in a kernel of the computing device, for example in a privileged processing space, while not comprising part of an operating system or kernel executable (or compilable, linkable, and/or loadable to be executable) on the computing device. In certain embodiments, for example, computer-readable program code executable (or compilable, linkable, and/or loadable to be executable) by a computing device to perform one or more of the communication management operations and/or processing functions disclosed herein may be executable (or compilable, linkable, and/or loadable to be executable) in an application space of the computing device.

I. In certain embodiments, for example, a portion of the computer-readable program code executable (or compilable, linkable, and/or loadable to be executable) by a computing device may be executable (or compilable, linkable, and/or loadable to be executable) in a kernel space of the computing device, and a further portion of the computer-readable program code executable (or compilable, linkable, and/or loadable to be executable) by a computing device may be executable (or compilable, linkable, and/or loadable to be executable) in an application space of the computing device. In certain embodiments, for example, a portion of the computer-readable program code executable (or compilable, linkable, and/or loadable to be executable) by a computing device may be executable (or compilable, linkable, and/or loadable to be executable) in a kernel space of the computing device, and a further portion of the computer-readable program code executable (or compilable, linkable, and/or loadable to be executable) by a computing device may not be executable (or compilable, linkable, and/or loadable to be executable) in the kernel space (for example it may be executable in the application space or other non-privileged or non-priority executable space).

J. In certain embodiments, for example, computer-readable program code executable (or compilable, linkable, and/or loadable to be executable) by a computing device to perform the intercepting and/or the receiving operations or functions may be executable (or compilable, linkable, and/or loadable to be executable) in a kernel space of the computing device, and computer-readable program code executable (or compilable, linkable, and/or loadable to be executable) by a computing device to perform one or more of the assembling, requesting transmission, encrypting, decrypting, inserting, translating, comparing, further comparing, and additionally comparing operations or functions may be executable (or compilable, linkable, and/or loadable to be executable) in an application space of the computing device. In certain embodiments, for example, computer-readable program code executable (or compilable, linkable, and/or loadable to be executable) by a computing device to perform the intercepting and/or the receiving operations or functions may be executable (or compilable, linkable, and/or loadable to be executable) in a kernel space of the computing device, and computer-readable program code executable (or compilable, linkable, and/or loadable to be executable) by a computing device to perform one or more of the assembling, requesting transmission, encrypting, decrypting, inserting, translating, comparing, further comparing, and additionally comparing operations or functions may not be executable (or compilable, linkable, and/or loadable to be executable) in the kernel space.

K. In certain embodiments, for example, computer-readable program code executable (or compilable, linkable, and/or loadable to be executable) by a computing device to perform one or more of the communication management operations and/or processing functions disclosed herein may be a plug-in. In certain embodiments, for example, computer-readable program code executable (or compilable, linkable, and/or loadable to be executable) by a computing device to perform one or more of the communication management operations and/or processing functions disclosed herein may be present in a library (for example in a dynamic-link library). In certain embodiments, for example, computer-readable program code executable (or compilable, linkable, and/or loadable to be executable) by a computing device to perform one or more of the communication management operations and/or processing functions disclosed herein may be a loadable module. In certain embodiments, for example, the loadable module may be loaded by a computing device during bootup of the computing device. In certain embodiments, for example, the loadable module may be loaded by a computing device prior to loading of an operating system (for example may be loaded by an initial runtime environment or loaded by a Basic Input/Output System (BIOS)). In certain embodiments, for example, the loadable module may be loaded by the computing device after bootup of the computing device. In certain embodiments, for example, the loadable module may be loaded by the computing device during runtime. In certain embodiments, for example, computer-readable program code executable (or compilable, linkable, and/or loadable to be executable) by a computing device to perform one or more of the communication management operations and/or processing functions disclosed herein may be a loadable kernel module. In certain embodiments, for example, computer-readable program code executable (or compilable, linkable, and/or loadable to be executable) by a computing device to perform one or more of the communication management operations and/or processing functions disclosed herein may be a loadable application module. In certain embodiments, for example, computer-readable program code executable (or compilable, linkable, and/or loadable to be executable) by a computing device to perform one or more of the communication management operations and/or processing functions disclosed herein may be a driver.

L. In certain embodiments, for example, computer-readable program code executable (or compilable, linkable, and/or loadable to be executable) by a computing device to perform one or more of the communication management operations and/or processing functions disclosed herein may be dynamically linkable (for example may be a dynamically linkable module, such as a dynamically linkable loadable module). In certain embodiments, for example, the computer-readable program code may be dynamically linkable with a kernel (for example with a Linux or Linux-based kernel). In certain embodiments, for example, the computer-readable program code may be dynamically linkable with an operating system or kernel (for example with an operating system (for example a Linux operating system, a Linux-based operating system, a real time operating system, a mini-operating system, an edge device operating system, and/or an open source operating system)). In certain embodiments, for example, references (for example symbol tables, module names, memory offsets, etc.) to the dynamically linkable program code may be stored in a kernel space of the computing device. In certain embodiments, for example, references to the dynamically linkable program may be stored in an application space of the computing device. In certain embodiments, for example, the computer-readable program code may be compiled separately from an operating system or a kernel to form a kernel loadable module. In certain embodiments, for example, the kernel loadable module may be dynamically linked with the kernel during runtime on the computing device.

M. In certain embodiments, for example, computer-readable program code executable (or compilable, linkable, and/or loadable to be executable) by a computing device to perform one or more of the communication management operations and/or processing functions disclosed herein may be linkable (for example dynamically or statically linkable). In certain embodiments, for example, the computer-readable program code may be linkable in a kernel (for example with a Linux or Linux-based kernel). In certain embodiments, for example, the computer-readable program code may be linkable with an operating system (for example with an operating system (for example a Linux operating system, a Linux-based operating system, a real time operating system, a mini-operating system, an edge device operating system, and/or an open source operating system)). In certain embodiments, for example, the computer-readable program code may be linkable (for example dynamically or statically linkable) to an application program. In certain embodiments, for example, the computer-readable program code may be linkable (for example dynamically or statically linkable) to an interface (for example an interoperability interface). In certain embodiments, for example, the computer-readable program code may be linkable (for example dynamically or statically linkable) to an interface between an application space of the computing device and a kernel space of the computing device. In certain embodiments, for example, the computer-readable program code may be linkable (for example dynamically or statically linkable) to an application-to-kernel program interface (for example an interface such as Netlink or Netlinks). In certain embodiments, for example, computer-readable program code may be linkable (for example dynamically or statically linkable) to an application-to-application program interface. In certain embodiments, for example, computer-readable program code may be linkable (for example dynamically or statically linkable) to a kernel-to-kernel program interface.

N. In certain embodiments, for example, computer-readable program code executable (or compilable, linkable, and/or loadable to be executable) by a computing device to perform one or more of the communication management operations and/or processing functions disclosed herein may be a statically linkable module. In certain embodiments, for example, computer-readable program code executable (or compilable, linkable, and/or loadable to be executable) by a computing device to perform one or more of the communication management operations and/or processing functions disclosed herein may be a standalone program.

O. In certain embodiments, for example, computer-readable program code executable (or compilable, linkable, and/or loadable to be executable) by a computing device to perform one or more of the communication management operations and/or processing functions disclosed herein may be an object file. In certain embodiments, for example, computer-readable program code executable (or compilable, linkable, and/or loadable to be executable) by a computing device to perform one or more of the communication management operations and/or processing functions disclosed herein may be compilable ASCII code. In certain embodiments, for example, computer-readable program code executable (or compilable, linkable, and/or loadable to be executable) by a computing device to perform one or more of the communication management operations and/or processing functions disclosed herein may be compiled.

P. In certain embodiments, for example, computer-readable program code executable (or compilable, linkable, and/or loadable to be executable) by a computing device to perform intercepting and/or the receiving operations or functions may be invoked by one or more modified kernel functions (for example by a modified network API function such as bind( ) or connect( ). In certain embodiments, for example, the computer-readable program code executable (or compilable, linkable, and/or loadable to be executable) by a computing device to perform intercepting and/or the receiving operations or functions may be invoked by one or more modified kernel functions, and computer-readable program code executable (or compilable, linkable, and/or loadable to be executable) by a computing device to perform one or more of the identifying, authorizing, verifying, comparing, further comparing, and additionally comparing, may be part or all of a separate executable (or compilable, linkable, and/or loadable to be executable) code that communicates, via an inter-program interface (for example Netlink or Netlinks), with the computer-readable program code executable (or compilable, linkable, and/or loadable to be executable) by a computing device to perform one or more of the assembling, encrypting, decrypting, inserting, and translating operations or functions. In certain embodiments, for example, the one or more modified kernel functions may be licensed under the GPL version 2. In certain further embodiments, the computer-readable program code executable (or compilable, linkable, and/or loadable to be executable) by a computing device to perform one or more of the establishing, performing, intercepting, identifying, requesting, authorizing, verifying, receiving, assembling, requesting transmission, encrypting, decrypting, inserting, translating, comparing, further comparing, additionally comparing, obtaining, negotiating, identifying, forming operations or functions may not be licensed under a GPL or a BSD license. In certain embodiments, for example, the modified kernel function may be statically linked with an operating system executable (or compilable, linkable, and/or loadable to be executable) on the computing device. In certain embodiments, for example, the modified kernel function may be dynamically linked with an operating system running on the processor.

Certain embodiments may provide, for example, a computer program product comprising a computer readable storage medium having a computer readable program stored therein, wherein the computer readable program, when executed on a computing device, enables or causes the computing device to perform one or more of the methods disclosed herein.

Certain embodiments may provide, for example, a computer program product comprising a computer readable storage medium having a computer readable program stored therein, wherein the computer readable program, when executed on a computing device, further enables or causes the computing device to perform one or more of the methods disclosed herein.

Certain embodiments may provide, for example, a computer program product comprising a computer readable storage medium having a computer readable program stored therein, wherein the computer readable program, when executed on a computing device running a Linux operating system, enables or causes the computing device to perform one or more of the methods disclosed herein.

Certain embodiments may provide, for example, a computer program product comprising a computer readable storage medium having a computer readable program stored therein, wherein the computer readable program, when executed on a computing device running an operating system (for example, Linux), further enables or causes the computing device to perform one or more of the methods disclosed herein.

Certain embodiments may provide, for example, an apparatus, comprising: a processor; and a memory coupled to the processor, wherein the memory comprises instructions which, when executed by the processor, enable or cause the processor to perform one or more of the methods disclosed herein.

Certain embodiments may provide, for example, a system, comprising: one or more processors; a memory coupled to said one or more processors, said memory including a computer useable medium tangibly embodying at least one program of instructions executable by at least one of said one or more processors to perform one or more of the methods disclosed herein.

Certain embodiments may provide, for example, a computer program product, comprising: one or more machine-useable storage media; program instructions provided by said one or more media for programming a data processing platform to perform one or more of the methods disclosed herein.

Certain embodiments may provide, for example, an apparatus comprising: a host operating system comprising an active kernel and an active container; and a processor operable with said active kernel to instantiate instances for active Kernel Loadable Modules (KLMs) for servicing said active container, said active KLM's executable to perform one or more of the methods disclosed herein.

Certain embodiments may provide, for example, a system, comprising: one or more processors; an operating system executing on said one or more processors; memory coupled to said one or more processors, said memory including a computer useable medium tangibly embodying at least one program of instructions executable by at least one of said one or more processors to perform operations to perform one or more of the methods disclosed herein.

Certain embodiments may provide, for example, logic encoded on one or more non-transitory computer readable media for execution and when executed operable to perform one or more of the methods disclosed herein.

Certain embodiments may provide, for example, logic encoded on one or more non-transitory computer readable media for execution on one or more processors executing operating system commands, when executed operable to perform one or more of the methods disclosed herein.

Certain embodiments may provide, for example, a readable storage medium having a computer readable program stored therein, wherein the computer readable program, when executed on a computing device, causes the computing device to perform one or more of the methods disclosed herein.

Certain embodiments may provide, for example, a computing device comprising: a memory containing machine readable medium comprising machine executable code having stored thereon instructions to perform one or more of the methods disclosed herein.

Certain embodiments may provide, for example, a computer program product to perform one or more of the methods disclosed herein, the computer program product comprising: one or more computer readable storage media; and program instructions stored on the one or more computer readable storage media to perform the one or more of the methods disclosed herein.

Certain embodiments may provide, for example, a non-transitory machine-readable storage medium comprising instructions to provide enhanced communication security of a system comprising a processor operating with a Linux or Linux-based operating system, the instructions executable by the processor one or more of the methods disclosed herein.

Certain embodiments may provide, for example, a distributed system, comprising: i) a first computing device; ii) a first network security file containing first parameters, the first network security file resident on the first computing device; iii) a first copy of a network security software, at least a portion of the first copy configured to operate in a kernel of the first computing device; iv) a second computing device; v) a second network security file containing second parameters, the second network security file resident on the second computing device; vi) a second copy of the network security software, at least a portion of the second copy configured to operate in a kernel of the second computing device; and vii) a dedicated port-to-port encrypted communication pathway between the first copy and the second copy, the first copy configured to receive first codes from the second copy and to compare the first codes with the first parameters, to verify that the first copy is authorized to send information to and/or receive information from a user-process running on the second computing device via the dedicated port-to-port encrypted communication pathway, and the second copy configured to receive second codes from the first copy and to compare the second codes with the second parameters, to verify that the user-process is authorized to send information to and/or receive information from the first copy via the dedicated port-to-port encrypted communication pathway.

A. In certain embodiments, for example, the first codes, the second codes, the first parameters, and the second parameters are isolated (for example not accessible by and/or isolated in memory) from user-applications on the first computing device and the second computing device. In certain embodiments, for example, the first codes may be obtained (for example obtained by the second copy) from the second network security file. In certain embodiments, for example, the second codes may be obtained (for example obtained by the first copy) from the first network security file.

B. In certain embodiments, for example, all but at most one (or at most two, three, 10%, 20%, or 20-75%) of the first codes may be present in only a single record of the second network security file. In certain embodiments, for example, the first codes may form a unique n-tuple (for example the n-tuple may be an at least a 2-tuple, an at least a 3-tuple, an at least a 5-tuple, an at least a 6-tuple, an at least an 8-tuple, an at least a 10-tuple, or an at least a 12-tuple) in the second network security file.

C. In certain embodiments, for example, all but at most one (or at most two, three, 10%, 20%, or 20-75%) of the second codes may be present in only a single record of the first network security file. In certain embodiments, for example, the second codes may form a unique n-tuple in the first network security file. In certain embodiments, for example, the first network security file may be different from the second network security file. In certain embodiments, for example, the first parameters may be different from the second parameters.

Certain embodiments may provide, for example, a distributed system, comprising: i) N plural computing devices, which N is an integer (for example N may be at least 2, at least 3, at least 4, at least 6, at least 10, at least 15, at least 20, at least 50, at least 100, at least 250, at least 1000, at least 10,000, at least 100,000, or N may be at least 1,000,000); ii) N plural network security files containing plural parameters, each one of the N plural computing devices having a different one of the N plural network security files resident thereon; iii) N copies of a network security software, each of the N plural computing devices having one of the N copies of network security software installed thereon and configured to operating in a kernel thereof; iv) dedicated port-to-port encrypted communication pathways among the N copies of network security software, a first copy of the N copies configured to receive first codes from a second copy of the N copies and to compare first codes with first parameters of the plural parameters, to verify that the first copy is authorized to send information to and/or receive information from a user-process via one of the dedicated port-to-port encrypted communication pathways, a second copy of the N copies configured to receive second codes from the first copy and to compare the second codes with second parameters of the plural parameters, to verify that the user-process is authorized to send information to and/or receive information from the first copy via the one of the dedicated port-to-port encrypted communication pathways, the first codes present on at most two of the N plural computing devices, the second codes present only on the at most two of the N plural computing devices, the first parameters present only on the at most two of the N plural computing devices, and the second parameters present only on the at most two of the N plural computing devices.

Certain embodiments may provide, for example, a distributed system, comprising: i) N plural computing devices, which N is an integer; ii) N plural network security files containing plural parameters, each one of the N plural computing devices having a different one of the N plural network security files resident thereon; iii) a series of N groups of communication management operations, each of the N plural computing devices having one of the N groups installed thereon and configured to operating in a kernel thereof; iv) dedicated port-to-port encrypted communication pathways among the N groups, a first group of the N groups configured to receive first codes from a second group of the N groups and to compare first codes with first parameters of the plural parameters, to verify that the first group is authorized to send information to and/or receive information from a user-process via one of the dedicated port-to-port encrypted communication pathways, a second group of the N groups configured to receive second codes from the first group and to compare the second codes with second parameters of the plural parameters, to verify that the user-process is authorized to send information to and/or receive information from the first group via the one of the dedicated port-to-port encrypted communication pathways, the first codes present on at most two of the N plural computing devices, the second codes present only on the at most two of the N plural computing devices, the first parameters present only on the at most two of the N plural computing devices, and the second parameters present only on the at most two of the N plural computing devices.

In certain embodiments, for example, any of the foregoing products, network security software, and/or modules may comprise obfuscation code. In certain embodiments, for example, any of the foregoing products, network security software, and/or modules may comprise one or more covert channels. In certain embodiments, for example, any of the foregoing applications (for example user-applications or network security software or products) may comprise an artificial intelligence component. In certain embodiments, for example, any of the foregoing applications may be part or all of a predictive maintenance system comprising an artificial intelligence component. In certain embodiments, for example, any of the foregoing computing devices (for example edge devices) may be part or all of an artificial intelligence appliance. In certain embodiments, for example, any of the foregoing applications may be part or all of a energy management system comprising an artificial intelligence component. In certain embodiments, for example, any of the foregoing applications may be part or all of an inventory optimization system comprising an artificial intelligence component. In certain embodiments, for example, any of the foregoing applications may be part or all of a smart city management system comprising an artificial intelligence component. In certain embodiments, for example, any of the foregoing applications may be part or all of a smart factory management system comprising an artificial intelligence component. In certain embodiments, for example, any of the foregoing applications may be part or all of an voice recognition system comprising an artificial intelligence component. In certain embodiments, for example, any of the foregoing applications may be part or all of an facial recognition system comprising an artificial intelligence component. In certain embodiments, for example, any of the foregoing applications may be part or all of a deepfake detection system such as a deepfake detection system comprising an artificial intelligence component. In certain embodiments, for example, any of the foregoing applications may be part or all of an machine learning (for example automated machine learning or reinforcement learning) system (for example a deep learning system such as a system using multi-layer, deep neural networks (DNNs))) comprising an artificial intelligence component. In certain embodiments, for example, any of the foregoing applications may be part or all of a pharmaceutical research system (for example a drug discovery or formulation optimization system) comprising an artificial intelligence component. In certain embodiments, for example, any of the foregoing applications may be part or all of an anti-money laundering system comprising an artificial intelligence component. In certain embodiments, for example, any of the foregoing applications may be part or all of fraud detection system comprising an artificial intelligence component. In certain embodiments, for example, any of the foregoing applications may be part or all of an artificial intelligence modeling system. In certain embodiments, for example, any of the foregoing applications may be part or all of an artificial intelligence model training system. In certain embodiments, for example, any of the foregoing applications may be part or all of an enterprise artificial intelligence system. In certain embodiments, for example, any of the foregoing applications may be part or all of an augmented reality system such as an augmented reality system comprising an artificial intelligence model. In certain embodiments, for example, any of the foregoing applications may be part or all of a software for developing artificial intelligence applications. In certain embodiments, for example, any of the foregoing applications may be a social media application, such as a blog, a social network site, a dating site, a news site, a website that allows users to post pictures or video, and the like. In certain embodiments, for example, any of the foregoing applications may comprise an artificial intelligence component embedded on a chip.

In certain embodiments, for example, any of the foregoing computing devices (for example edge devices) may be present in a drone. In certain embodiments, for example, any of the foregoing computing devices (for example edge devices) may be present in a satellite. In certain embodiments, for example, any of the foregoing computing devices (for example edge devices) may be present in a signal intelligence system. In certain embodiments, for example, any of the foregoing computing devices (for example edge devices) may be present in a military device (for example a tank, a military aircraft, a military drone, a submarine, etc.). In certain embodiments, for example, any of the foregoing computing devices (for example edge devices) may be used for one or more of analyzing intelligence, organizing prudent data for military leaders, providing geospatial analysis, controlling a smart weapon, or communicating information in cognitive electronic warfare (for example to improve situational awareness in one or more of a hostile zone, war zone, or combat zone). In certain embodiments, for example, the device may classify heat signatures so warfighters can be informed of people, buildings, or other objects. In certain embodiments, for example, any of the foregoing computing devices (for example edge devices) may be present in an autonomous device. In certain embodiments, for example, any of the foregoing computing devices (for example edge devices) may be present in a disaster recovery system. In certain embodiments, for example, any of the foregoing computing devices (for example edge devices) may be present in a satellite. In certain embodiments, for example, any of the foregoing computing devices (for example edge devices) may be present in an automobile. In certain embodiments, for example, any of the foregoing computing devices (for example edge devices) may be present in an aircraft. In certain embodiments, for example, any of the foregoing computing devices (for example edge devices) may be present in or in communication with a GPS system. In certain embodiments, for example, any of the foregoing computing devices (for example edge devices) may be present in or in communication with a radar. In certain embodiments, for example, any of the foregoing computing devices (for example edge devices) may be present in a surveillance device. In certain embodiments, for example, the surveillance device may be a video camera. In certain embodiments, for example, the surveillance device may be a perimeter security device. In certain embodiments, for example, any of the foregoing computing devices (for example edge devices) may be present in critical infrastructure. In certain embodiments, for example, any of the foregoing computing devices (for example edge devices) may be a process controller. In certain embodiments, for example, any of the foregoing computing devices (for example edge devices) may be present in a factory. In certain embodiments, for example, any of the foregoing computing devices (for example edge devices) may be present in oil and/or gas infrastructure. In certain embodiments, for example, any of the foregoing computing devices (for example edge devices) may be present in an oil rig (for example an offshore oil rig). In certain embodiments, for example, any of the foregoing computing devices (for example edge devices) may be a component of a control system for a refinery or a petrochemical plant. In certain embodiments, for example, any of the foregoing computing devices (for example edge devices) (for example a controlled device, a sensor, or a controller) may be present in a liquid natural gas infrastructure. In certain embodiments, for example, any of the foregoing computing devices (for example edge devices) may be in communication with a container management system.

In certain embodiments, for example, any of the foregoing computing devices (for example edge devices) may be a remote console configured to access a network (for example an enterprise network or operational technology network (such as a network in a factory)). In certain embodiments, for example, the remote console may be configured to provide a system administrator access to the network. In certain embodiments, for example, the network security software may prevent the remote console from forming a connection with any devices except for devices on one or more predetermined networks.

Any of the foregoing methods, systems, products, communication management operations, software, modules, middleware, computing infrastructure and/or apparatus of the present disclosure and/or in one or more of the INCORPORATED REFERENCES may comprise communication management operations that can be selectively enabled or disabled, and that can be applied to monitor, provide alerts for, or block unauthorized packet communications.

BRIEF DESCRIPTION OF THE DRAWINGS

FIG. 34: Schematic view of first node having network configuration first data structure.

FIG. 38: Schematic view of first node having network configuration fifth data structure.

FIG. 40: Schematic view of first node having network configuration seventh data structure.

FIG. 46: Schematic view of second node having network configuration tenth data structure.

DETAILED DESCRIPTION OF THE INVENTION

Figure 1:
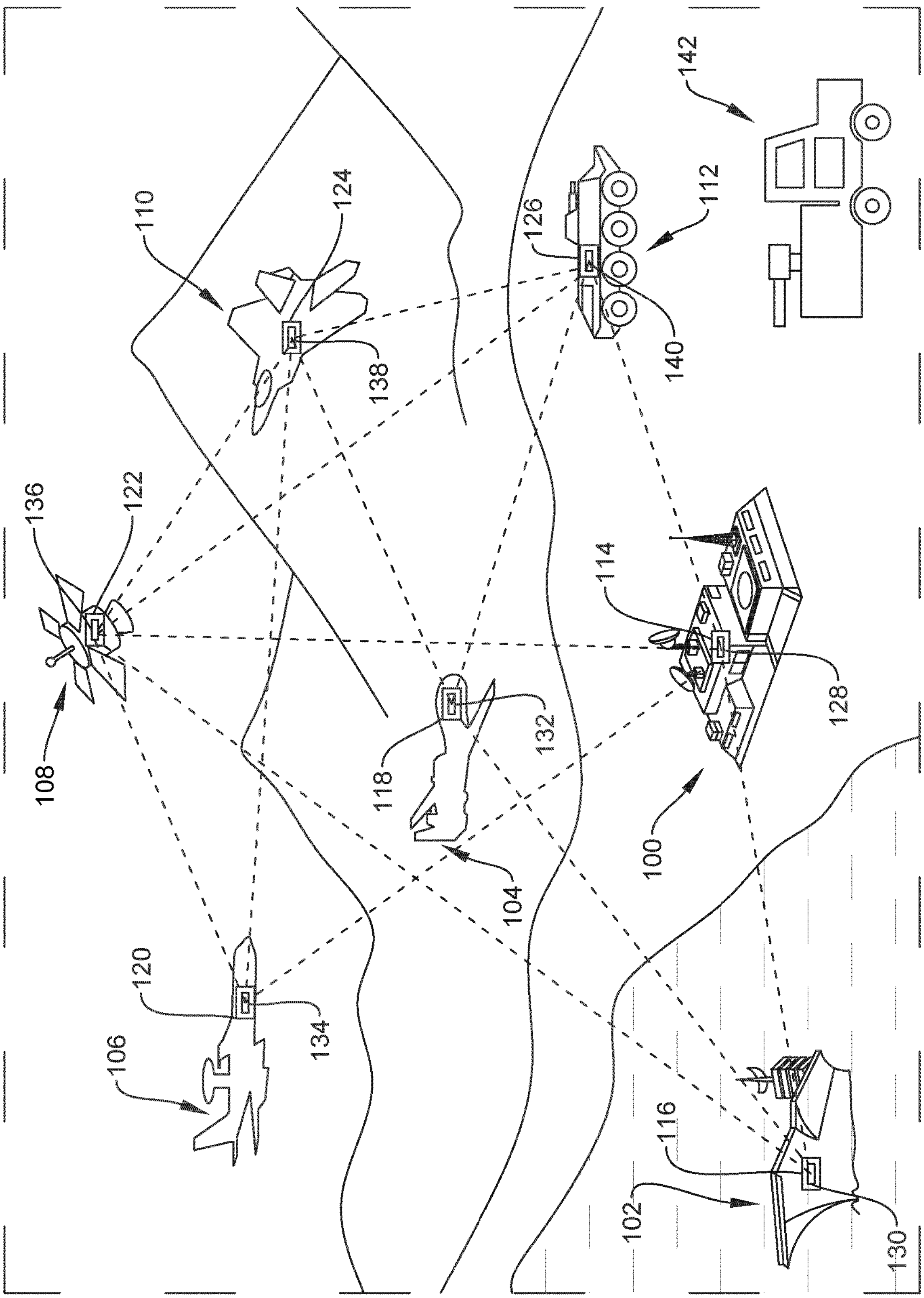
FIG. 1: Schematic view of a proactively secured integrated battlefield communications architecture.

The present disclosure relates, in certain embodiments, to providing trusted data to one or more preconfigured recipient counterparties via packet communications. Architectures that employ on one or more of the methods, systems, products, software, modules, middleware, computing infrastructure and/or apparatus provided herein maintain trust in data (trusted data) sent from an originating source to a recipient counterparty, such a network packet communication from an edge device to a controller, from a controller to a controlled computing device, from a client portal to a database, from an enterprise computing device to a machine learning infrastructure in a cloud, etc., as well as trust in subsequent communications of the data or further information derived from the data. In certain embodiments, for example, the architecture may enable a data gathering device to communicate data (either gathered data or processed data) from a verified application executing verified API commands on the data gathering device to data recipients using bilaterally negotiated, dedicated network connections between preauthorized device, application, user, and/or socket counterparties. The present disclosure further relates, in certain embodiments, to verification of data content requirements of the data—including but not limited to authorized or prohibited protocols, data types, data value ranges, payload sizes, and command types—both at the data gathering device and at counterparties and further nodes covered by the proactive architecture. The present disclosure relates, in certain embodiments, to the modification of network packet payloads containing part or all of the data to remove unauthorized components of the data, based on whitelisted or blacklisted data content rules. The proactive security architecture may apply to the data gathering device and recipient counterparties in direct communication with the data gathering device, and may be extended to a portion or all subsequent recipients.

In certain embodiments, for example, the foregoing approaches may provide trusted data throughout a computing network defined by the proactive architecture. In certain embodiments, for example, the computing network may comprise a satellite, such as a satellite transmitting signal intelligence. In certain embodiments, for example, the trusted data may comprise images, digital video, computer animation, movies, and/or digital audio. In certain embodiments, for example, the proactive architecture may prevent a deepfake attack. In certain embodiments, for example, the trusted data may be formatted according to a messaging protocol (for example MQTT). In certain embodiments, for example, the trusted data may comprise personal data such as personal financial data or health data covered under HIPPA. In certain embodiments, for example, the trusted data may comprise telemetry data. In certain embodiments, for example, the trusted data may comprise radar data. In certain embodiments, for example, the trusted data may comprise geopositioning data. In certain embodiments, for example, the trusted data may comprise sensor measurements such as measurements of temperature, pressure, moisture, and the like. In certain embodiments, for example, the trusted data may comprise data from analytical instruments such as spectrometer data and the like. In certain embodiments, for example, the trusted data may comprise results from a computer simulation program, such as an integrated circuit simulator, a war simulator, a predictive controller, etc.

In certain embodiments, for example, the trusted data may comprise training data for an artificial intelligence model. In certain embodiments, for example, the trusted data may comprise parameters for an artificial intelligence model. In certain embodiments, for example, the trusted data may comprise inputs into an artificial intelligence model, such as an artificial intelligence model being used to detect malware signatures, to perform preventative maintenance, to perform energy management, to monitor critical infrastructure, to detect financial fraud, or to implement anti-money laundering requirements. In certain embodiments, for example, the trusted data may be used in a process control system, such as robot control in a factory or warehouse, drilling process control in an onshore or offshore oil rig, or unit operation process control in a chemical plant or refinery. In certain embodiments, for example, the trusted data may be news, blog, social media, or social networking data such as personal data, configuration data, curated data, or posts and responses.

In certain embodiments, for example, the data gathering device and/or a preconfigured recipient counterparty may be a drone. In certain embodiments, for example, the data gathering device and/or a preconfigured recipient counterparty may be a satellite. In certain embodiments, for example, the proactive architecture may secure part or all of a signal intelligence system. In certain embodiments, for example, the data gathering device and/or a preconfigured recipient counterparty may be present in a military device (for example a tank, a military aircraft, a military drone, a submarine, etc.). In certain embodiments, for example, the data gathering device and/or a preconfigured recipient counterparty may be used for one or more of analyzing intelligence, organizing prudent data for military leaders, providing geospatial analysis, controlling a smart weapon, or communicating information in cognitive electronic warfare (for example to improve situational awareness in one or more of a hostile zone, war zone, or combat zone). In certain embodiments, for example, the device may classify heat signatures so warfighters can be informed of people, buildings, or other objects. In certain embodiments, for example, the data gathering device and/or a preconfigured recipient counterparty may be an autonomous device. In certain embodiments, for example, the data gathering device and/or a preconfigured recipient counterparty may be present in a disaster recovery system. In certain embodiments, for example, the data gathering device and/or a preconfigured recipient counterparty may be an automobile. In certain embodiments, for example, the data gathering device and/or a preconfigured recipient counterparty may be an aircraft. In certain embodiments, for example, the data gathering device and/or a preconfigured recipient counterparty may part of a GPS system. In certain embodiments, for example, the data gathering device and/or a preconfigured recipient counterparty may be present in or in communication with a radar. In certain embodiments, for example, the data gathering device and/or a preconfigured recipient counterparty may be a surveillance device. In certain embodiments, for example, the surveillance device may be a video camera. In certain embodiments, for example, the surveillance device may be a perimeter security device. In certain embodiments, for example, the data gathering device and/or a preconfigured recipient counterparty may be present in critical infrastructure. In certain embodiments, for example, the data gathering device and/or a preconfigured recipient counterparty may be a process controller. In certain embodiments, for example, the data gathering device and/or a preconfigured recipient counterparty may be present in a factory. In certain embodiments, for example, the data gathering device and/or a preconfigured recipient counterparty may be present in oil and/or gas infrastructure. In certain embodiments, for example, the data gathering device and/or a preconfigured recipient counterparty may be present in an oil rig (for example an offshore oil rig). In certain embodiments, for example, the data gathering device and/or a preconfigured recipient counterparty may be a component of a control system for a refinery or a petrochemical plant. In certain embodiments, for example, the data gathering device and/or a preconfigured recipient counterparty (for example a controlled device, a sensor, or a controller) may be present in a liquid natural gas infrastructure. In certain embodiments, for example, the data gathering device and/or a preconfigured recipient counterparty may be in communication with a container management system. In certain embodiments, for example, the data gathering device and/or a preconfigured recipient counterparty may be an edge device. In certain embodiments, for example, the data gathering device and/or a preconfigured recipient counterparty may comprise a database. In certain embodiments, for example, the data gathering device and/or a preconfigured recipient counterparty may be information technology. In certain embodiments, for example, the data gathering device and/or a preconfigured recipient counterparty may be operational technology.

A schematic illustration of a proactively secured architecture for integrated battlefield communications is shown in FIG. 1. A command center 100, an in-theater aircraft carrier 102, a drone 104, an airborn warning and control system (AWACs) aircraft 106, a satellite 108, an attack aircraft 110, and a ground reconnaissance vehicle 112 are each equipped with networked computers 114-126 having complementary intercommunicative network security software 128-140 configured to a) verify that local application processes and process users are authorized and only execute authorized network API commands, b) form only dedicated device-to-device connections (shown with dashed lines in FIG. 1) with preauthorized devices, applications, users, and sockets, and c) communicate only data conforming to predetermined content requirements. The drone 104 and ground reconnaissance vehicle 112 collect signal intelligence from an enemy asset 142 and form files containing gathered data. The combined signal intelligence data is shared via the device-to-device connections and the attack aircraft 110 provided instructions to deal with the enemy asset 142.

Figure 2:
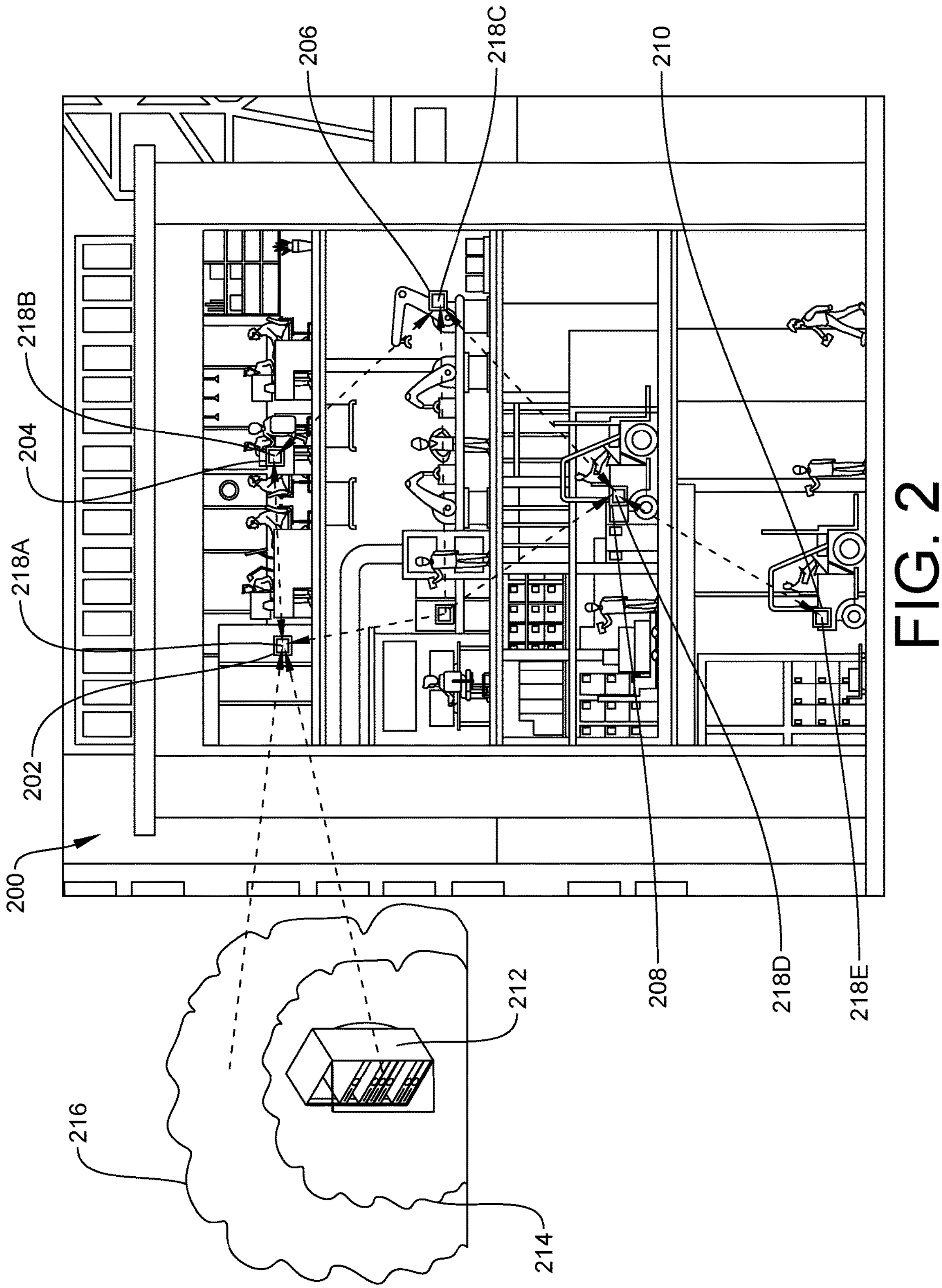
FIG. 2: Schematic view of a proactively secured smart factory.

A schematic illustration of a proactively secured smart factory is shown in FIG. 2. A factory generates 200 generates trusted data related to energy utilization, inventory, shipments, equipment scheduling, quality control, and returns at a series of computing devices positioned at a network computing 202, a front office 204, a robotic control 206, a warehouse equipment location 208, and a distribution equipment location 210 of the factory 200 which are communicated internally and to a remote cloud artificial intelligence analytical engine located on a cloud server 212 within a subspace 214 of the Internet 216. The data remains trusted throughout the communications because each of the foregoing communications (shown in exemplary dashed lines in FIG. 2) are secured on each communicating device by complementary network security software 218A-E that are configured to a) verify that local application processes and process users are authorized and only execute authorized network API commands, b) form only dedicated device-to-device connections with preauthorized devices, applications, users, and sockets, and c) communicate only data conforming to predetermined content requirements. The analytical engine generates models based on the trusted data to improve quality control, reduce logistical lags while reducing excess inventory, and increase energy efficiency which are communicated back to the factory and implemented. As part of maintaining the trusted data, the presence of the network security software 218A-E prevents a malicious intruder on the internet from penetrating the network server and/or spreading to any of the computing devices in the factory 200.

Figure 3:
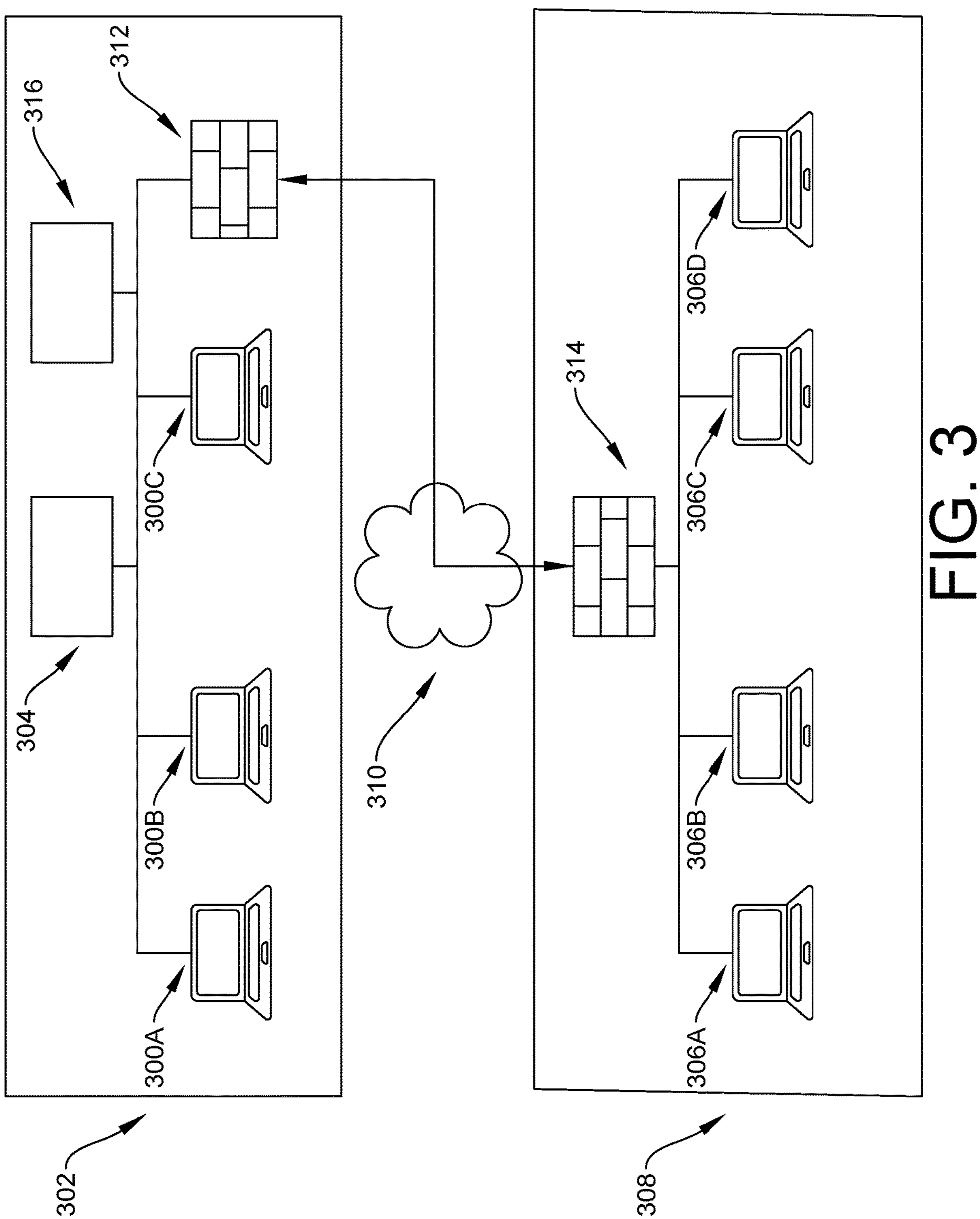
FIG. 3: Schematic view of an enterprise network.

A schematic illustration of a method for a configuring secure communications in an enterprise network (such as an enterprise network for a healthcare entity, a banking concern, or other concern that may include a combination of fixed, portable and mobile devices) that includes networked computing devices in two firewalled facilities is shown in FIG. 3. Upon receipt of network traffic such as connection requests and packet data, networked first computing devices 300A-C in a first facility 302 that includes a provisioning server 304, and networked second computing devices 306A-D in a second facility 308, transmit proto-identifiers that identify application programs (and optionally users of the application programs and/or data characteristics of the communications) associated with the network traffic (for example as a source and/or recipient of the network traffic). The proto-identifiers from the second facility 308 reach the provisioning server 304 via the public internet 310 via a virtual private network that extends from a first firewall 312 to a second firewall 314. The provisioning server uses the proto-identifiers to form an electronic report that is transmitted to an IT department device 316 for review and approval (or alternatively blacklisting of part or all of the network traffic. Upon receipt of approval for particular network communications, the provisioning server 304 issues configuration management parameters to the computing devices at both facilities (i.e., devices 300A-C and 306A-D). The configuration management parameters are retained locally by the devices 300A-C and 306A-D and used to configure secure communications independently of the firewalls 312 and 314 or any other network security appliances. Configuring secure communications includes: i) creating exclusive communication pathways for at least a portion of future network traffic that include use of exclusive transport layer ports that are not shared by any two communication pathways; i) preventing malware on any of the devices 300A-C and 306A-D from forming connections with any of any other devices generally; and iii) optionally blacklisting certain detected application-to-application communications. Optionally, all network traffic processed by the devices 300A-C and 306A-D can be subject to the communication management parameters. Optionally, all communications of the proto-identifiers and configuration management parameters provisioning server can be encrypted and transmitted via secured connections between the devices 300A-C and 306A-D and the provisioning server 304.

Figure 4:
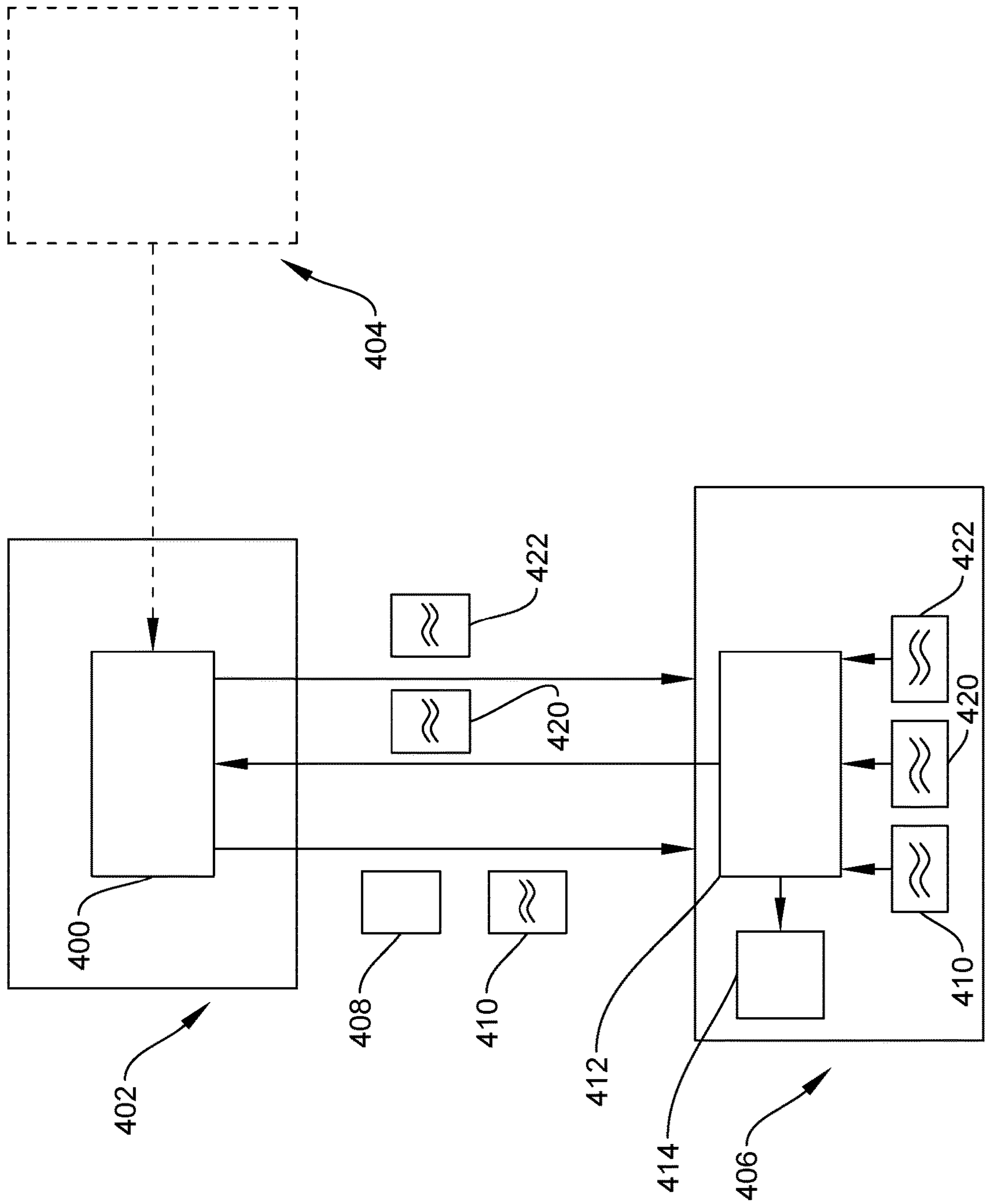
FIG. 4: Schematic view of a method to detect and process a bind request.

A schematic illustration of a method to detect connection event information comprising a bind request and to provide communication configuration parameters to manage communication security of a device is shown in FIG. 4. A provisioning server 400 on a provisioning device 402 obtains a first address (for example an IP address and/or a domain name) (optionally obtained from a device discovery capability 404 such as packet monitoring software) for a first computing device 406 and transmits a network security software installation file 408 and an initial configuration file 410 to the first computing device 406 where the initial configuration file 410 is stored on nonvolatile media of the first computing device 406 and the network security software installation file 408 is used to install network security software 412. The network security software 412 detects network communications events including a bind command from a first application 414 to bind a first transport layer port to a first interface on the first computing device 406. The network security software 412 determines a first application identifier and first user identifier for the first application 414 and records the first application identifier, first application user identifier and first transport layer port number in a log file 420. The log file 420 can be a serial listing of the events, a structured database, or another type of file. The network security software 412 uses communication management parameters obtained from the initial configuration file 410 to form an exclusive, encrypted connection with the provisioning server 400 that is used to transmit (for example periodically transmit according to a time schedule, a threshold event count, when a combination of types of events occur, or a combination of two or more of the foregoing, or transmitted each time an event occurs) the log file 420 to the provisioning server 400. The provisioning server 400 processes the log file to generate a first user-application identifier derived from the first application identifier and the first user identifier and a record that records a mapping of the first transport layer port number to the first user-application identifier. The mapping of the first transport layer port number to the first user-application identifier can be one-to-one or exclusive—i.e., the mapping can be used by the network security software 412 to prevent any application and/or user on the first computing device 406 other than the first application 406 and the first user from operating the first transport layer port. The record is inserted into an updated configuration file 422 (which also includes the information present in the initial configuration file) and the updated configuration file 422 transmitted to the first computing device 406 via the exclusive, encrypted connection. The network security software 412 processes the updated configuration file to obtain the configuration management parameters for management of the first transport layer port and communications occurring via the first transport layer port. Management can include resetting the first transport layer port and associated connection sessions. When an application subsequently attempts to bind the first transport layer port to an interface, the network security software 412 can obtain the first user-application identifier from the updated configuration file and confirm the requesting application is the first application 414 under the control of the first user. Prior to sending the updated configuration file, the provisioning server 400 can verify that the mapping is authorized, for example by submitting the record (or some other representation of the mapping) to an authorization agent (for example a system administrator) and obtaining authorization to transmit the updated configuration file 422. If the mapping of the first transport layer port number to the first user-application identifier is not authorized, the record can be used as a blacklist to indicate that the mapping of the first transport layer port number to the first user-application identifier is not authorized (and therefore the network security software 412 can block an attempt by the first application 414 to bind the first transport layer port).

If the mapping of the first transport layer port number to the second address is not authorized, the record can be used as a blacklist to indicate that the mapping of the first transport layer port number to the second address is not authorized (and therefore the network security software 412 can block the aforementioned connection request packet.

Figure 5:
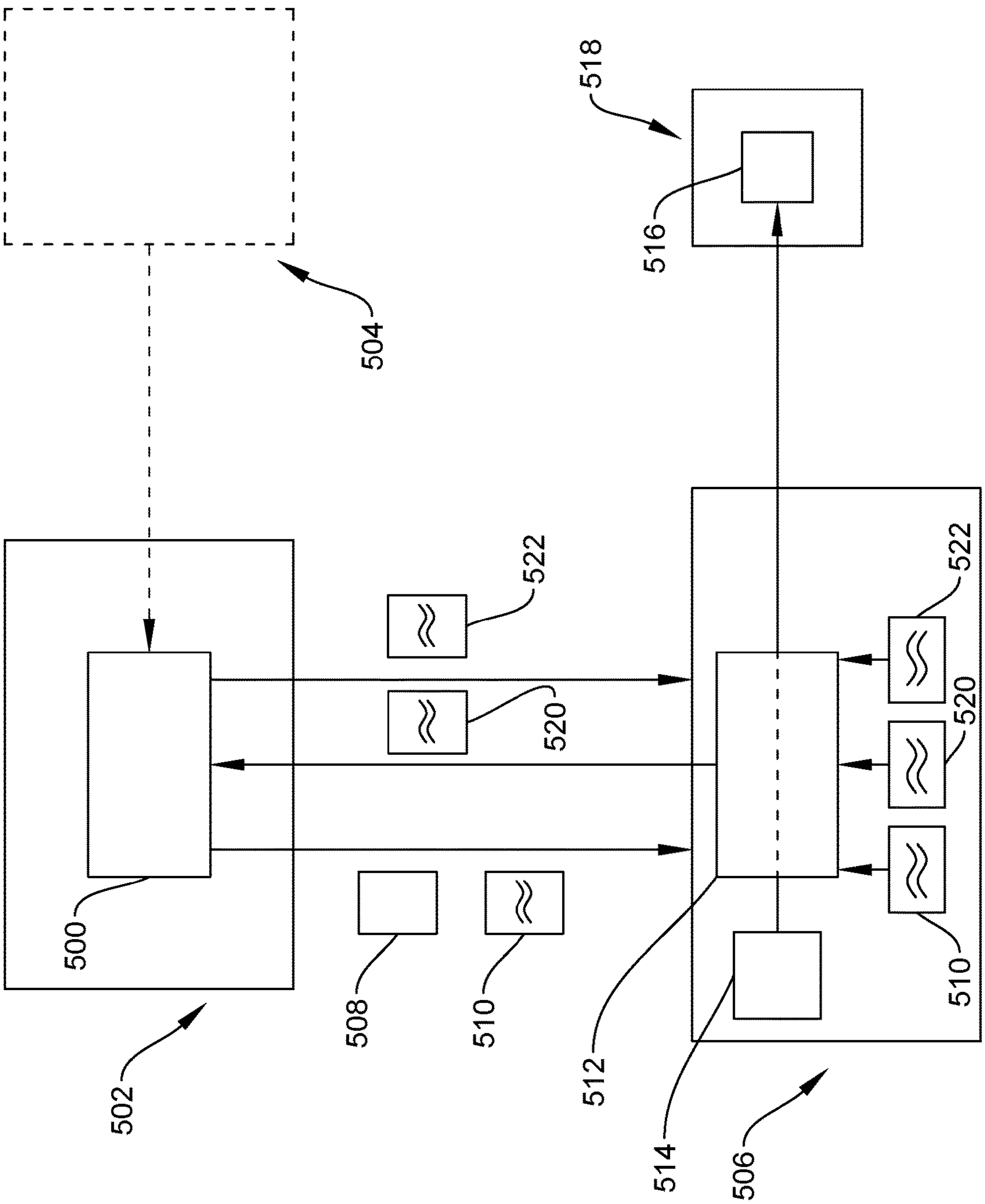
FIG. 5: Schematic view of a method to respond to a communication request.

A schematic illustration of a method to detect connection event information comprising a connection request and to provide communication configuration parameters to manage communication security of a device is shown in FIG. 5. A provisioning server 500 on a provisioning device 502 obtains a first address (for example an IP address and/or a domain name) (optionally obtained from a device discovery capability 504 such as packet monitoring software) for a first computing device 506 and transmits network security software installation file 508 and an initial configuration file 510 to the first computing device 506 where the initial configuration file 510 is stored on nonvolatile media of the first computing device 506 and the network security software installation file 508 is used to install network security software 512. The network security software 512 detects network communications events including a connection request from a first application 514, the connection request comprising a destination port number for a purported second application 516 and destination address for a second computing device 518. The network security software 512 determines a first application identifier and first user identifier for the first application 514 and records the first application identifier, first application user identifier, destination port number, and destination address in a log file 520. The log file 520 can be a serial listing of the events, a structured database, or another type of file. The network security software 512 uses communication management parameters obtained from the initial configuration file 510 to form an exclusive, encrypted connection with the provisioning server 500 that is used to transmit (for example periodically transmit according to a time schedule, a threshold event count, when a combination of types of events occur, or a combination of two or more of the foregoing, or transmitted each time an event occurs) the log file 520 to the provisioning server 500. The provisioning server 500 processes the log file to generate a first user-application identifier derived from the first application identifier and the first user identifier and a record that records a mapping of the first user-application identifier to the destination port number and the destination address. The mapping of the first user-application identifier to the destination port number and the destination address can be one-to-one or exclusive—i.e., the mapping can be used by the network security software 512 to prevent any application and/or user on the first computing device 506 other than the first application 514 and the first user from operating the first transport layer port. The record is inserted into an updated configuration file 522 (which also includes the information present in the initial configuration file) and the updated configuration file 522 transmitted to the first computing device 506 via the exclusive, encrypted connection. The network security software 512 processes the updated configuration file to obtain the configuration management parameters for management of the connection request. Management can include resetting any connection that resulted from the connection request and/or any connection with the destination port number at the destination address. When an application subsequently makes a connection request that includes the destination port number and the destination address, the network security software 512 can obtain the first user-application identifier from the updated configuration file and confirm the requesting application is the first application 514 under the control of the first user. Prior to sending the updated configuration file, the provisioning server 500 can verify that the mapping is authorized, for example by submitting the record (or some other representation of the mapping) to an authorization agent (for example a system administrator) (not shown) and obtaining authorization to transmit the updated configuration file 522. If the mapping of the first user-application identifier to the destination port number is not authorized, the record can be used as a blacklist to indicate that the mapping of the first user-application identifier to the destination port number is not authorized (and therefore the network security software 512 can block the connection request). In addition to information based on the first application 514 and the first user, the first user-application identifier can be specific to particular payload protocol. For example, a communication of data according to one protocol between the first application 514 and the second application 516 may require a different connection and a different first user-application identifier from a communication of data according to a different protocol between the first application 514 and the second application 516, even if the users are the same.

Figure 6:
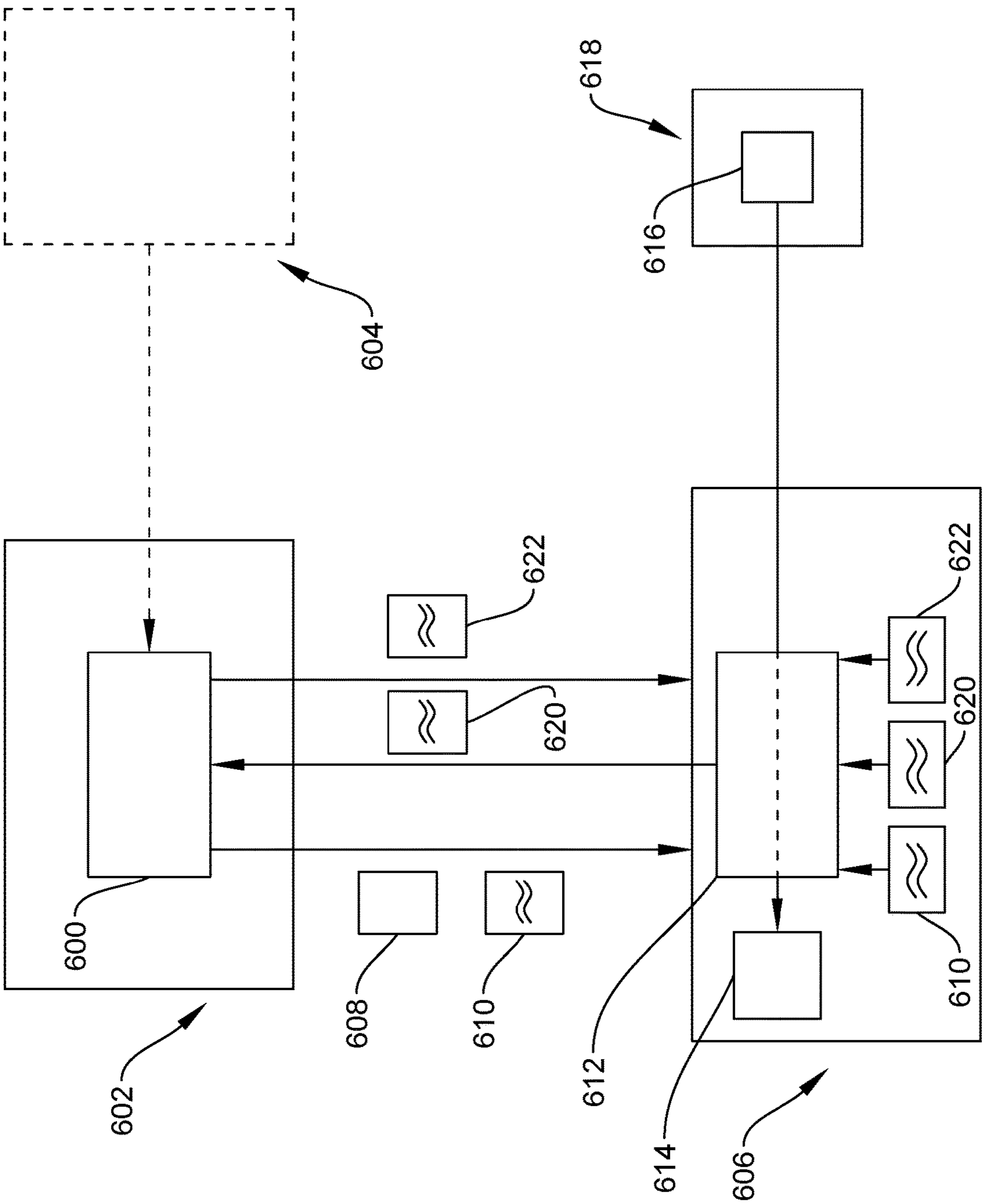
FIG. 6: Schematic view of a method to respond to a bind request and an incoming connection request.

A schematic illustration of a method to detect connection event information comprising a bind request and receipt of a connection request packet and to provide communication configuration parameters to manage communication security of a device is shown in FIG. 6. A provisioning server 600 on a provisioning device 602 obtains a first address (for example an IP address and/or a domain name) (optionally obtained from a device discovery capability 604 such as packet monitoring software) for a first computing device 606 and transmits network security software installation file 608 and an initial configuration file 610 to the first computing device 606 where the initial configuration file 610 is stored on nonvolatile media of the first computing device 606 and the network security software installation file 608 is used to install network security software 612. The network security software 612 detects network communications events including (a) a bind command from a first application 614 to bind a first transport layer port to a first interface on the first computing device 606 and (b) receipt of a connection request to form a connection between the first transport layer port and a second application 616 on a second computing device 618 having a second address. The network security software 612 determines a first application identifier and first user identifier for the first application 614 and records the first application identifier, first application user identifier, first transport layer port number, and second address in a log file 620 (the log file 620 can be a serial listing of the events, a structured database, or another type of file). The network security software 612 uses communication management parameters obtained from the initial configuration file 610 to form an exclusive, encrypted connection with the provisioning server 600 that is used to transmit (for example periodically transmit according to a time schedule, a threshold event count, when a combination of types of events occur, or a combination of two or more of the foregoing, or transmitted each time an event occurs) the log file 620 to the provisioning server 600. The provisioning server 600 processes the log file to generate a first user-application identifier derived from the first application identifier and the first user identifier and a record that records a mapping of the first transport layer port number to the first user-application identifier and the second address. The mapping of the first transport layer port number to the first user-application identifier can be one-to-one or exclusive—i.e., the mapping can be used by the network security software 612 to prevent any application and/or user on the first computing device 606 other than the first application 606 and the first user from operating the first transport layer port. The mapping of the first transport layer port number to the second address can also be used by the network security software 612 to reject any ingressing packet which contains a source address different from the second address. The record is inserted into an updated configuration file 622 (which also includes the information present in the initial configuration file) and the updated configuration file 622 transmitted to the first computing device 606 via the exclusive, encrypted connection. The network security software 612 processes the updated configuration file to obtain the configuration management parameters for management of the first transport layer port and communications occurring via the first transport layer port. Management can include resetting the first transport layer port and associated connection sessions. When an application subsequently attempts to bind the first transport layer port to an interface, the network security software 612 can obtain the first user-application identifier from the updated configuration file and confirm the requesting application is the first application 614 under the control of the first user. When an incoming connection request packet is received, the network security software 612 can obtain the second address from the updated configuration file and confirm that the second address matches the source address of the incoming connection request packet. Prior to sending the updated configuration file, the provisioning server 600 can verify that the mapping is authorized, for example by submitting the record (or some other representation of the mapping) to an authorization agent (for example a system administrator) and obtaining authorization to transmit the updated configuration file 622. If the mapping of the first transport layer port number to the first user-application identifier is not authorized, the record can be used as a blacklist to indicate that the mapping of the first transport layer port number to the first user-application identifier is not authorized (and therefore the network security software 612 can block an attempt by the first application 614 to bind the first transport layer port). If the mapping of the first transport layer port number to the second address is not authorized, the record can be used as a blacklist to indicate that the mapping of the first transport layer port number to the second address is not authorized (and therefore the network security software 612 can block the aforementioned connection request packet. In addition to information based on the first application 614 and the first user, the first user-application identifier can be specific to particular payload protocol. For example, a communication of data according to one protocol between the first application 614 and the second application 616 may require a different connection and a different first user-application identifier from a communication of data according to a different protocol between the first application 614 and the second application 616, even if the users are the same.

Figure 7:
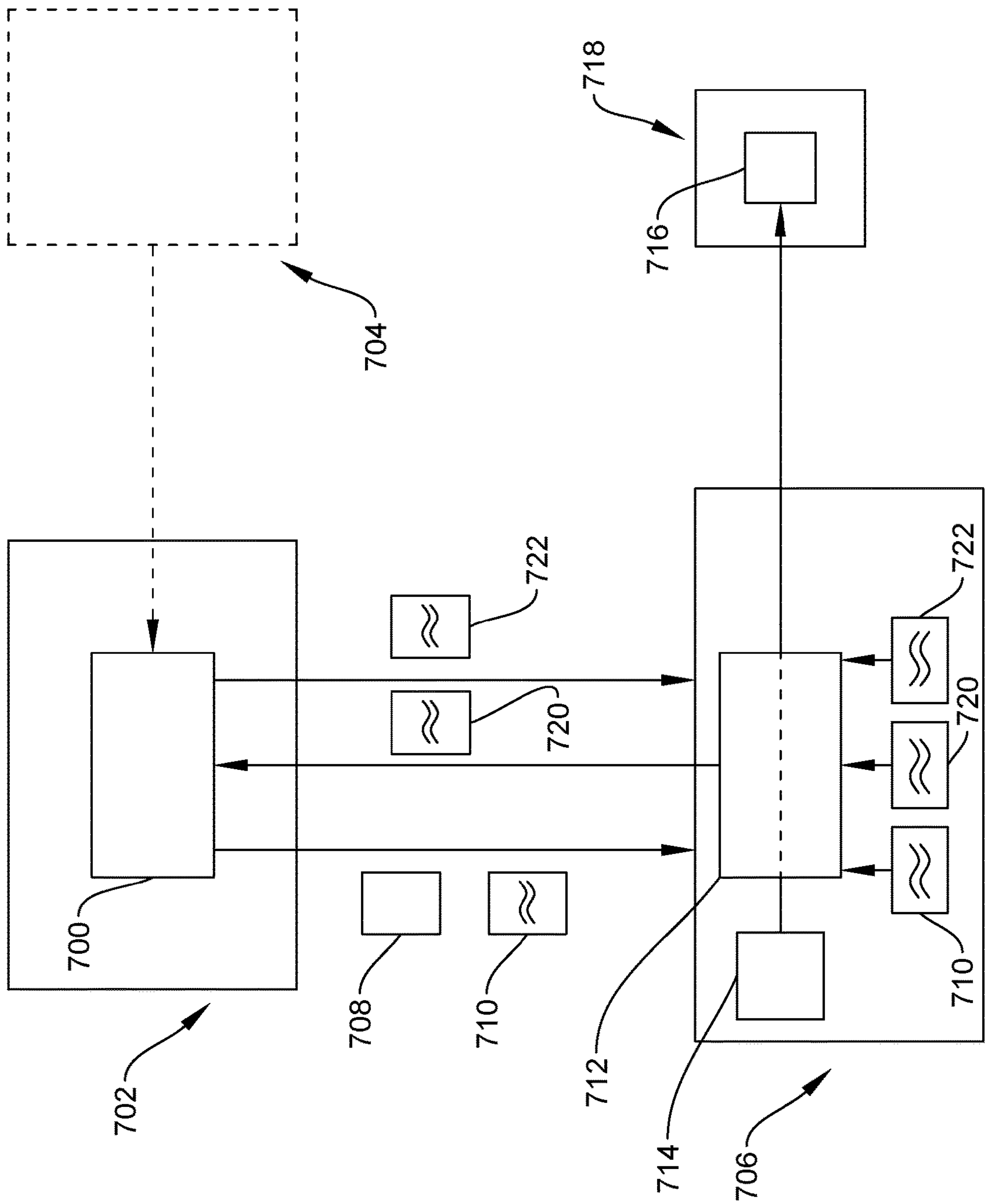
FIG. 7: Schematic view of a method to respond to a bind request and an outgoing connection request.

A schematic illustration of a method to detect connection event information comprising a bind request and a connection request and to provide communication configuration parameters to manage communication security of a device is shown in FIG. 7. A provisioning server 700 on a provisioning device 702 obtains a first address (for example an IP address and/or a domain name) (optionally obtained from a device discovery capability 704 such as packet monitoring software) for a first computing device 706 and transmits network security software installation file 708 and an initial configuration file 710 to the first computing device 706 where the initial configuration file 710 is stored on nonvolatile media of the first computing device 706 and the network security software installation file 708 is used to install network security software 712. The network security software 712 detects network communications events including (a) a bind command from a first application 714 to bind a first transport layer port to a first interface on the first computing device 706 and (b) a connection request made by the first application 714 to form a connection between the first transport layer port and a second transport layer port of a second application 716 on a second computing device 718 having a second address. The network security software 712 determines a first application identifier and first user identifier for the first application 714 and records the first application identifier, first application user identifier, first transport layer port number, first transport layer port number, and second address in a log file 720 (the log file 720 can be a serial listing of the events, a structured database, or another type of file). The network security software 712 uses communication management parameters obtained from the initial configuration file 710 to form an exclusive, encrypted connection with the provisioning server 700 that is used to transmit (for example periodically transmit according to a time schedule, a threshold event count, when a combination of types of events occur, or a combination of two or more of the foregoing, or transmitted each time an event occurs) the log file 720 to the provisioning server 700. The provisioning server 700 processes the log file to generate a first user-application identifier derived from the first application identifier and the first user identifier and a record that records a mapping of the first transport layer port number to the first user-application identifier, the second transport layer application port, and the second address. The mapping of the first transport layer port number to the first user-application identifier can be one-to-one or exclusive—i.e., the mapping can be used by the network security software 712 to prevent any application and/or user on the first computing device 706 other than the first application 706 and the first user from operating the first transport layer port. The mapping of the first transport layer port number to the second transport layer port number and the second address can also be used by the network security software 712 to reject any connection request from the first application (and first user) which specifies a destination port number and/or destination address different from the second transport layer port number and/or second address, respectively. The record is inserted into an updated configuration file 722 (which also includes the information present in the initial configuration file) and the updated configuration file 722 transmitted to the first computing device 706 via the exclusive, encrypted connection. The network security software 712 processes the updated configuration file to obtain the configuration management parameters for management of the first transport layer port and communications occurring via the first transport layer port. Management can include resetting the first transport layer port and associated connection sessions. When an application subsequently attempts to bind the first transport layer port to an interface, the network security software 712 can obtain the first user-application identifier from the updated configuration file and confirm the requesting application is the first application 714 under the control of the first user. When the first application 714 operated by the first user makes a connection request, the network security software 712 can obtain the second transport layer port number and the second address from the updated configuration file and confirm that the second transport layer port number and the second address matches the destination port number and the destination address of the connection request. Prior to sending the updated configuration file, the provisioning server 700 can verify that the mapping is authorized, for example by submitting the record (or some other representation of the mapping) to an authorization agent (for example a system administrator) and obtaining authorization to transmit the updated configuration file 722. If the mapping of the first transport layer port number to the first user-application identifier is not authorized, the record can be used as a blacklist to indicate that the mapping of the first transport layer port number to the first user-application identifier is not authorized (and therefore the network security software 712 can block an attempt by the first application 714 to bind the first transport layer port). If the mapping of the first transport layer port number to the second transport layer port number and the second address is not authorized, the record can be used as a blacklist to indicate that the mapping of the first transport layer port number to the second transport layer port number and the second address is not authorized (and therefore the network security software 712 can block the aforementioned connection request packet. In addition to information based on the first application 714 and the first user, the first user-application identifier can be specific to particular payload protocol. For example, a communication of data according to one protocol between the first application 714 and the second application 716 may require a different connection and a different first user-application identifier from a communication of data according to a different protocol between the first application 714 and the second application 716, even if the users are the same.

Figure 8:
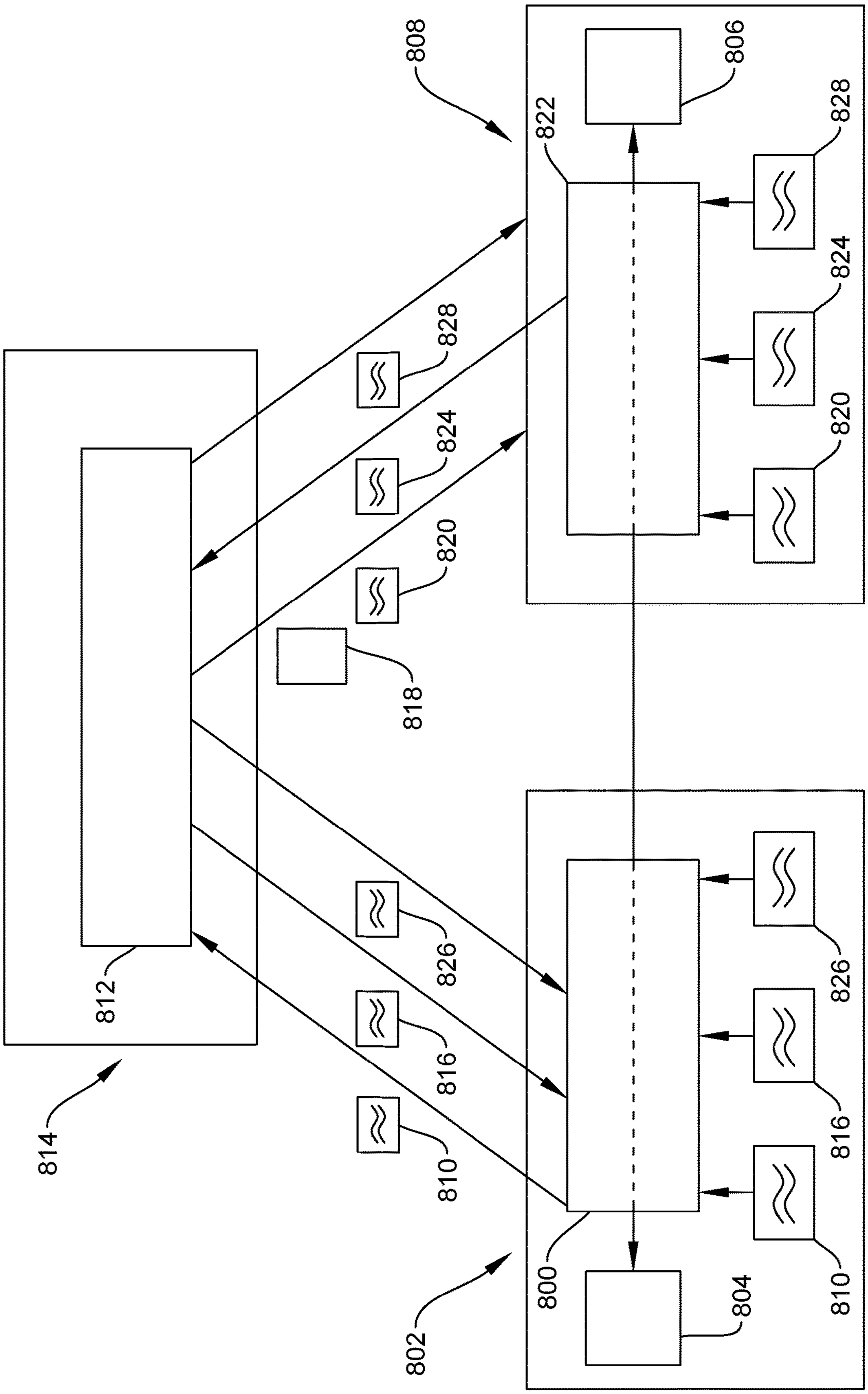
FIG. 8: Schematic view of a method to discover and secure communication pathways based on connection requests.

A schematic illustration of a method to provide communication configuration parameters based on connection requests to a provisioning server to identify network devices is shown in FIG. 8. A network security software 800 on a first computing device 802 detects network communications events including a connection request from a first application 804, the connection request comprising a destination port number for a second application 806 and destination address for a second computing device 808. The network security software 800 determines a first application identifier and first user identifier for the first application 804 and records the first application identifier, first application user identifier, destination port number, and destination address in a log file 810 (the log file 810 can be a serial listing of the events, a structured database, or another type of file). The network security software 800 transmits the log file 810 to the provisioning server 812 on a provisioning device 814 via an exclusive, encrypted connection. The provisioning server 812 processes the log file 810 to generate a first user-application identifier derived from the first application identifier and the first user identifier and a record that records a mapping of the first user-application identifier to the destination port number and the destination address. The mapping of the first user-application identifier to the destination port number and the destination address can be one-to-one or exclusive—i.e., the mapping can be used by the network security software 800 to prevent any application and/or user on the first computing device 802 other than the first application 804 and the first user from operating the first transport layer port. The record is inserted into a configuration file 816 and the configuration file 816 transmitted to the first computing device 802 via the exclusive, encrypted connection. The network security software 800 processes the configuration file 816 to obtain the configuration management parameters for management of the connection request. Management can include resetting any connection that resulted from the connection request and/or any connection with the destination port number at the destination address. When an application subsequently makes a connection request that includes the destination port number and the destination address, the network security software 800 can obtain the first user-application identifier from the configuration file 816 and confirm the requesting application is the first application 804 under the control of the first user. Prior to sending the configuration file 816, the provisioning server 814 can verify that the mapping is authorized, for example by submitting the record (or some other representation of the mapping) to an authorization agent (for example a system administrator) and obtaining authorization to transmit the configuration file 816. If the mapping of the first user-application identifier to the destination port number is not authorized, the record can be used as a blacklist to indicate that the mapping of the first user-application identifier to the destination port number is not authorized (and therefore the network security software 800 can block the connection request). In addition to information based on the first application 800 and the first user, the first user-application identifier can be specific to particular payload protocol. For example, a communication of data according to one protocol between the first application 800 and the second application 806 may require a different connection and a different first user-application identifier from a communication of data according to a different protocol between the first application 804 and the second application 806, even if the users are the same. The provisioning server 812 further transmits a network security software installation file 818 and an initial configuration file 820 to the second computing device 808 where the initial configuration file 820 is stored on nonvolatile media of the second computing device 808 and the network security software installation file 818 is used to install network security software 822. The network security software 822 detects network communications events including (a) a bind command from the second application 806 to bind a transport layer destination port to an interface on the second computing device 808 and (b) receipt of a connection request from the first computing device 802 to form a connection with the destination port. The network security software 822 from the second computing device 808 determines a second application identifier and second user identifier for the second application 806 and records the second application identifier, second application user identifier, destination port number, and first address for the first computing device 802 in a log file 824 (the log file 824 can be a serial listing of the events, a structured database, or another type of file). The network security software 822 uses communication management parameters obtained from the initial configuration file 820 to form an exclusive, encrypted connection with the provisioning server 812 that is used to transmit (for example periodically transmit according to a time schedule, a threshold event count, when a combination of types of events occur, or a combination of two or more of the foregoing, or transmitted each time an event occurs) the log file 824 to the provisioning server 812. The provisioning server 812 processes the two log files 810 and 824 and, using the destination port number to cross-reference the two log files, maps the destination port number to the first user-application identifier, a second user-application identifier (derived at least from the second application identifier and the second user identifier), the first address, and the destination address. The mapping is incorporated as records into updated configuration files (826 and 828) that are transmitted to the first computing device 802 and the second computing device 808 via the exclusive encrypted connections. The updated configuration files (826 and 828) can provide communication management parameters to the network security software (800 and 822) to enable the network security software (800 and 822) to perform communication management operations. For example, the network security software 800 can cross-reference the destination port number and destination address of a connection request with parameters in the updated configuration file 826 to determine whether the requesting application is the first application 804 (and therefore authorized to make the connection request). Once a connection between the first application and the second application (with the corresponding users) is established, the first network security software 800 can inspect incoming network packets for the presence of the second user-application identifier in a predetermined location (for example in an application layer location) of the network packet. When an application on the second computing device 808 attempts to bind the destination port to an interface, the network security software 822 can verify that the requesting application is the second application 806 as required. Once a connection between the first application 804 and the second application 806 (with the corresponding users) is established, the network security software 822 can inspect incoming network packets for the presence of the first user-application identifier in a predetermined location (for example in an application layer location) of the network packet.

Figure 9:
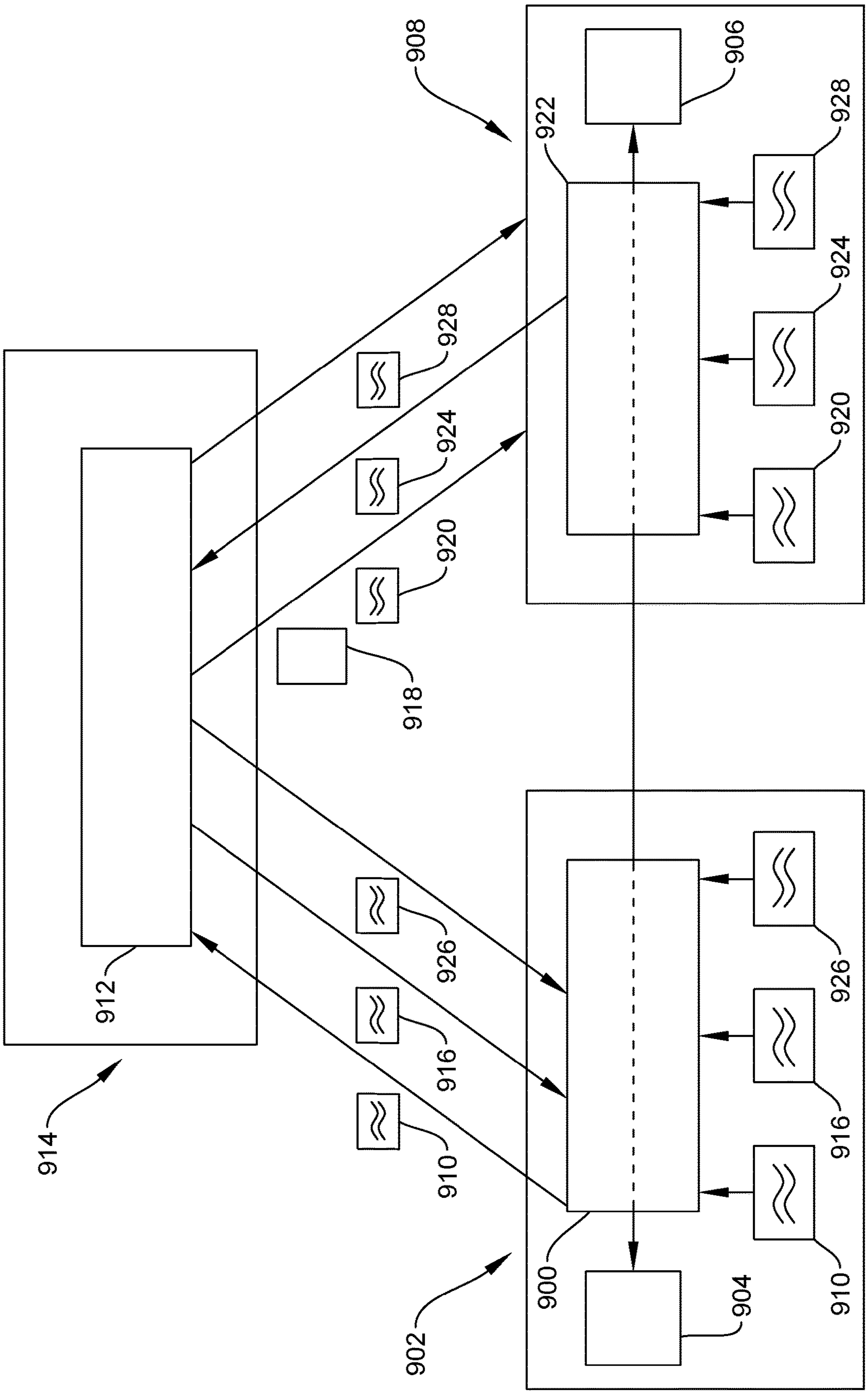
FIG. 9: Schematic view of a method to discover and secure communication pathways based on connection requests and bind requests.

A schematic illustration of a method to provide communication configuration parameters based on received connection requests to a provisioning server to identify network devices is shown in FIG. 9. A network security software 900 on a first computing device 902 having a first address detects network communications events including (a) a bind command from a first application 904 to bind a first transport layer port to a first interface on the first computing device 902 and (b) receipt of a connection request to form a connection between the first transport layer port and a second application 906 on a second computing device 908 having a second address. The network security software 900 determines a first application identifier and first user identifier for the first application 904 and records the first application identifier, first application user identifier, first transport layer port number, and second address in a log file 910 (the log file 910 can be a serial listing of the events, a structured database, or another type of file). The network security software 900 transmits the log file 910 to a provisioning server 912 on a provisioning device 914 via an exclusive, encrypted connection. The provisioning server 912 processes the log file 910 to generate a first user-application identifier derived from the first application identifier and the first user identifier and a record that records a mapping of the first transport layer port number to the first user-application identifier and the second address. The mapping of the first transport layer port number to the first user-application identifier can be one-to-one or exclusive—i.e., the mapping can be used by the network security software 900 to prevent any application and/or user on the first computing device 902 other than the first application 904 and the first user from operating the first transport layer port. The mapping of the first transport layer port number to the second address can also be used by the network security software 900 to reject any ingressing packet which contains a source address different from the second address. The record is inserted into a configuration file 916 and the configuration file 916 transmitted to the first computing device 902 via the exclusive, encrypted connection. The network security software 900 processes the configuration file 916 to obtain the configuration management parameters for management of the connection request. Management can include resetting any connection that resulted from the received connection request and/or any connection with the first transport layer port. When an application subsequently makes a bind request that includes the first transport layer port number, the network security software 900 can obtain the first user-application identifier from the configuration file 916 and confirm the requesting application is the first application 904 under the control of the first user. Prior to sending the configuration file 916, the provisioning server 912 can verify that the mapping is authorized, for example by submitting the record (or some other representation of the mapping) to an authorization agent (for example a system administrator) and obtaining authorization to transmit the configuration file 916. If the mapping of the first user-application identifier to the destination port number is not authorized, the record can be used as a blacklist to indicate that the mapping of the first user-application identifier to the destination port number is not authorized (and therefore the network security software 900 can block the connection request). In addition to information based on the first application 904 and the first user, the first user-application identifier can be specific to particular payload protocol. For example, a communication of data according to one protocol between the first application 904 and the second application 906 may require a different connection and a different first user-application identifier from a communication of data according to a different protocol between the first application 904 and the second application 906, even if the users are the same. The provisioning server 912 further transmits a network security software installation file 918 and an initial configuration file 920 to the second computing device 908 where the initial configuration file 920 is stored on nonvolatile media of the second computing device 908 and the network security software installation file 918 is used to install network security software 922. The network security software 922 detects network communications events including a connection request from the second application 906, the connection request comprising the first transport layer port number and first address for the first computing device 902. The network security software 922 determines a second application identifier and second user identifier for the second application 906 and records the second application identifier, second application user identifier, first transport layer port number, and first address in a log file 924 (the log file 920 can be a serial listing of the events, a structured database, or another type of file). The network security software 922 uses communication management parameters obtained from the initial configuration file 920 to form an exclusive, encrypted connection with the provisioning server 912 that is used to transmit (for example periodically transmit according to a time schedule, a threshold event count, when a combination of types of events occur, or a combination of two or more of the foregoing, or transmitted each time an event occurs) the log file 924 to the provisioning server 912. The provisioning server 912 processes the two log files 910 and 924 and, using the first transport layer port number to cross-reference the two log files, maps the first transport layer port number to the first user-application identifier, a second user-application identifier (derived at least from the second application identifier and the second user identifier), the first address, and the second address. The mapping is incorporated as records into updated configuration files (926 and 928) that are transmitted to the first computing device 902 and the second computing device 908 via the exclusive encrypted connections. The updated configuration files (926 and 928) can provide communication management parameters to the network security software (900 and 922) to enable the network security software (900 and 922) to perform communication management operations. For example, the network security software 900 can cross-reference the first transport layer port number and first address of a connection request with parameters in the updated configuration file 926 to determine whether the requesting application is the second application 906 (and therefore authorized to make the connection request). Once a connection between the first application and the second application (with the corresponding users) is established, the network security software 900 can inspect incoming network packets for the presence of the second user-application identifier in a predetermined location (for example in an application layer location) of the network packet. When an application on the first computing device 902 attempts to bind the first transport layer port to an interface, the network security software 900 can verify that the requesting application is the second application 904 as required. Once a connection between the first application and the second application (with the corresponding users) is established, the network security software 700 can inspect incoming network packets for the presence of the first user-application identifier in a predetermined location (for example in an application layer location) of the network packet.

Figure 10:
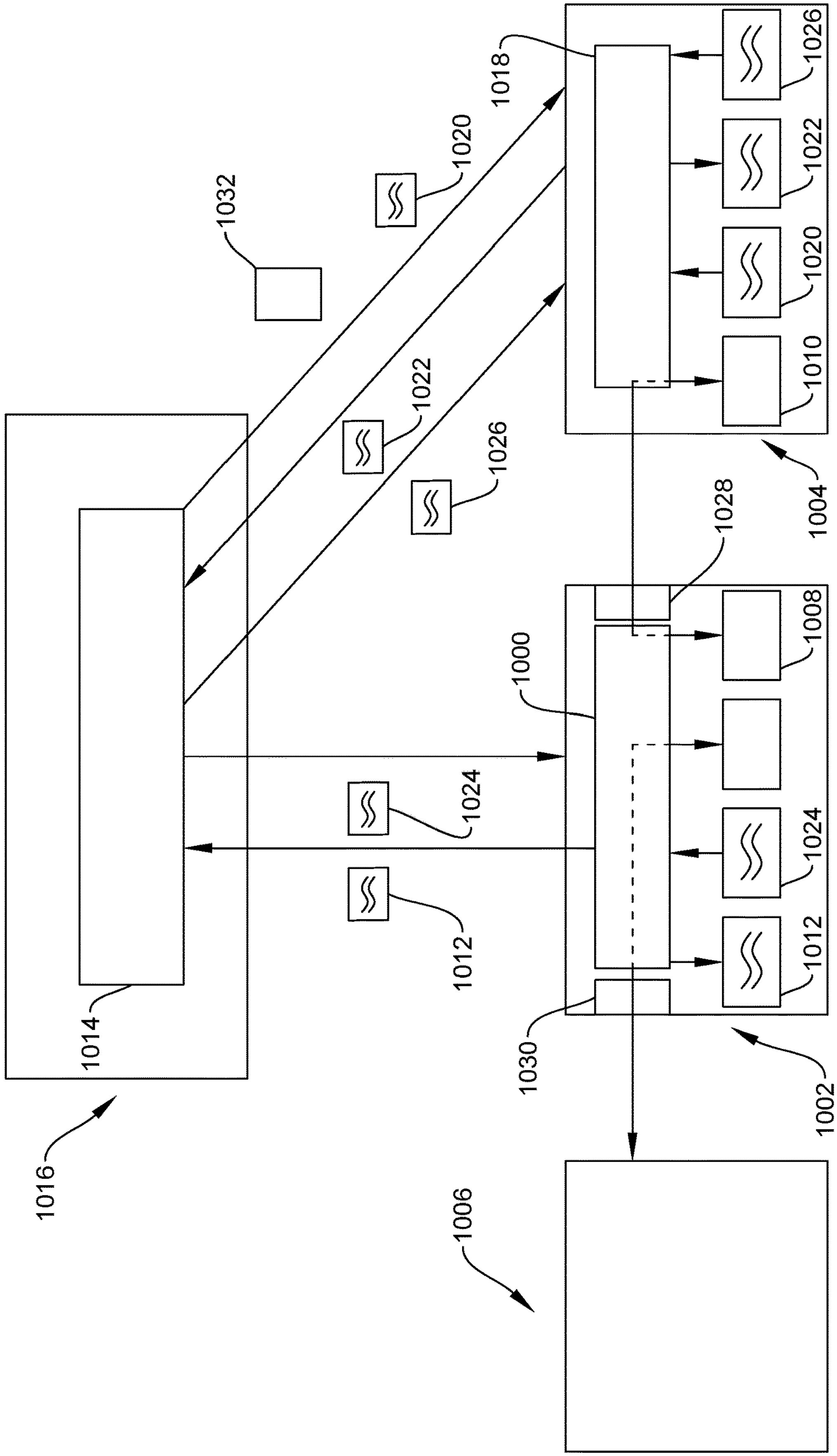
FIG. 10 Schematic view of a method to provide an internal gateway for securing communications.

A schematic illustration of a method to provide communication configuration parameters based on connection requests to a provisioning server to identify configurable and nonconfigurable network devices is shown in FIG. 10. A network security software 1000 on a first computing device 1002 detects network communications events with a second computing device 1004 and a third computing device 1006 including internal bind requests, outgoing connection requests and/or incoming connection requests with a first application 1008 and a second application 1010, respectively. The events are recorded in a log file 1012 and transmitted to a provisioning server 1014 on a provisioning device 1016. After receiving the log file 1012, the provisioning server 1014 determines that the second computing device 1004 is configured to receive network security software 1018 and a configuration file 1020 from the provisioning server 1014 and therefore transmits an installation file 1032 for the network security software 1018 and the configuration file 820 to the second computing device 1004. The network security software 1018 subsequently transmits a log file 1022 to the provisioning server 1014 which contains reciprocal communication events to certain events recorded in the log file 1012. The provisioning server processes the two log files (1012 and 1022) and generates updated configuration files 1024 and 1026 which are sent to the first computing device 1002 and the second computing device 1004. The updated configuration file 1024 specifies that certain communications between the first application 1008 and the second application 1010 utilize a first predetermined interface 1028. The provisioning server 1014 does not determine that the third computing device 1006 is configured to receive network security software from the provisioning server 1014. As a result, the updated configuration file 1024 specifies that communications between the first computing device 1002 and the third computing device 1006 utilize a second predetermined interface 1030 that is different from the first predetermined interface 1028. The updated configuration file 1024 further specifies data content and formatting requirements for incoming and outgoing payloads between the first application 1008 and the third computing device 1006, including allowed data type(s), data range(s), and/or command type(s), and/or prohibited data type(s), data range(s), and/or command type(s).

Figure 11:
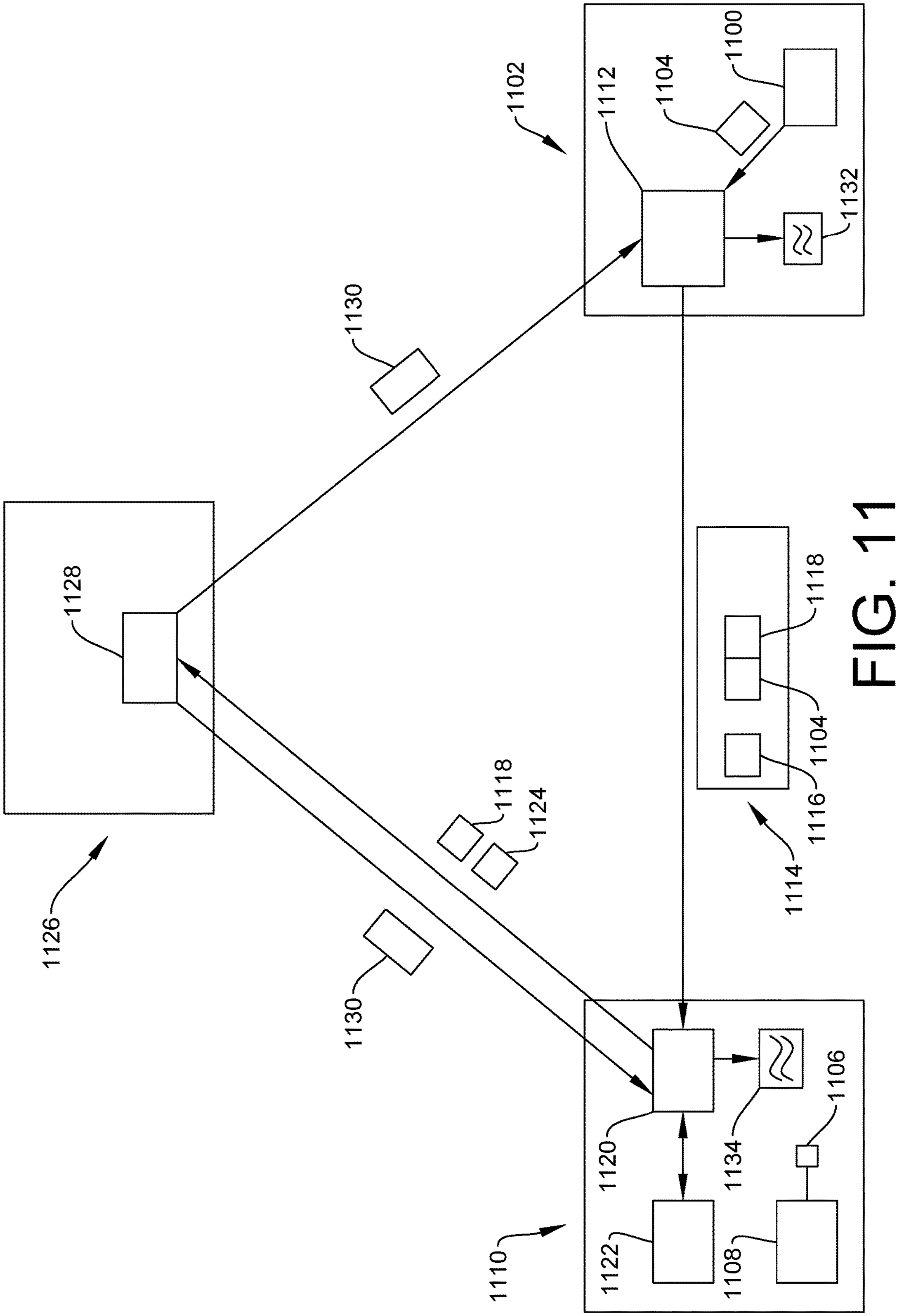
FIG. 11: Schematic view of a method to create and process proto-identifiers.

A schematic illustration of a method for a providing communication management parameters to a plurality of networked computing devices is shown in FIG. 11. A first application 1100 running on a networked first computing device 1102 of the plurality of networked computing devices transmits a request to send data 1104 to a transport layer destination port 1106 assigned to a second application 1108 running on a networked second computing device 1110 of the plurality of networked computing devices. The request is intercepted by a first network security product 1112 which appends a first application proto-identifier 1118 to the data 1104 and a network packet 1114 comprising a destination port number 1116 for the destination port 1106 and the data 1104 appended to the first application proto-identifier 1118 is sent to the second computing device 1110 where it is intercepted by a second network security product 1120. The second network security product 1120 consults an operating system 1122 of the second computing device 1110 to identify the second application 1108 (to which the transport destination port number 1116 is assigned), and generates a second application proto-identifier for the second application 1108. The second network security product 1120 passes the first application proto-identifier 1118 and the second application proto-identifier 1124 to a networked third computing device 1126 of the plurality of networked computing devices. A third network security product 1128 running on the third computing device 1126 receives the first application proto-identifier 1118 and the second application proto-identifier 1124 (for example by an encrypted communication pathway configured exclusively for communications between the second network security product 1120 and the third network security product 1128 using transport layer ports that are not shared by any other communication pathways), generates communication management parameters 1130 (based at least in part on the proto-identifiers) to be used by the first network security product 1112 and the second network security product 1122 for communication of application data between the first application 1100 and the second application 1108, and separately transmits the communication management parameters 1130 to the first network security product 1112 (for example by the encrypted communication pathway) and the second network security product 1120 (for example by a further encrypted communication pathway configured exclusively for communications between the first network security product 1112 and the third network security product 1128 using transport layer ports that are not shared by any other communication pathways). The generation of the communication management parameters 1130 by the third network security product 1128 can be conditioned on determining that communications between the first application 1100 and the second application 1108 using the destination port 1106 are stable (for example by waiting to generate the communication management parameters 1130 until the combination of the first application proto-identifier 1118 and the second application proto-identifier 1124 have been received a predetermined number of times within (or for at least) a predetermined timeframe). The communication management parameters 1130 can also include a first user identifier for the first application 1100, a second user identifier for the second application 1108, a first device identifier for the first computing device 1102, and a second device identifier for the second computing device 1110, each of which may be derived at least in part from corresponding additional proto-identifiers provided by the second computing device 1110. The communication management parameters 1130 can also include transport layer port numbers (for example transport layer port numbers having values of between 1024 and 65535) to be used by the first network security product 1112 and the second network security product 1120 for communication of data between the first application 1100 and the destination port 1106 of the second application 1108, and cryptographic primitives that may be used to negotiate an encrypted communication pathway between the first network security product 1112 and the second network security product 1120. The generation of the communication management parameters 1130 by the third network security product 1128 can be conditioned on receiving feedback (for example approval) from an exogenous agent (for example, the proto-identifiers (1118 and 1124) can be submitted to an IT department (for example in an electronic report) for review and approval of communications between the first application 1100 and the second application 1108 using the destination port 1106). As part of the feedback, the exogenous agent can provide additional parameters to be included in the communication management parameters 1130, such as data formatting and/or content requirements. After receiving the communication management parameters 1130, the first network security product 1112 and the second network security product 1120 may update configuration files 1132 and 1134, respectively. The exemplary embodiment depicted in FIG. 11 may enable secure communications between the first application 1100 and the second application 1108. For example, the received communication management parameters 1130 can be used by the first network security product 1112 and the second network security product 1120 in configuring a communication pathway configured exclusively for communications between the first network security product 1112 and the second network security product 1120 for all application data from the first application 1100 directed to the destination port 1106.

Figure 12:
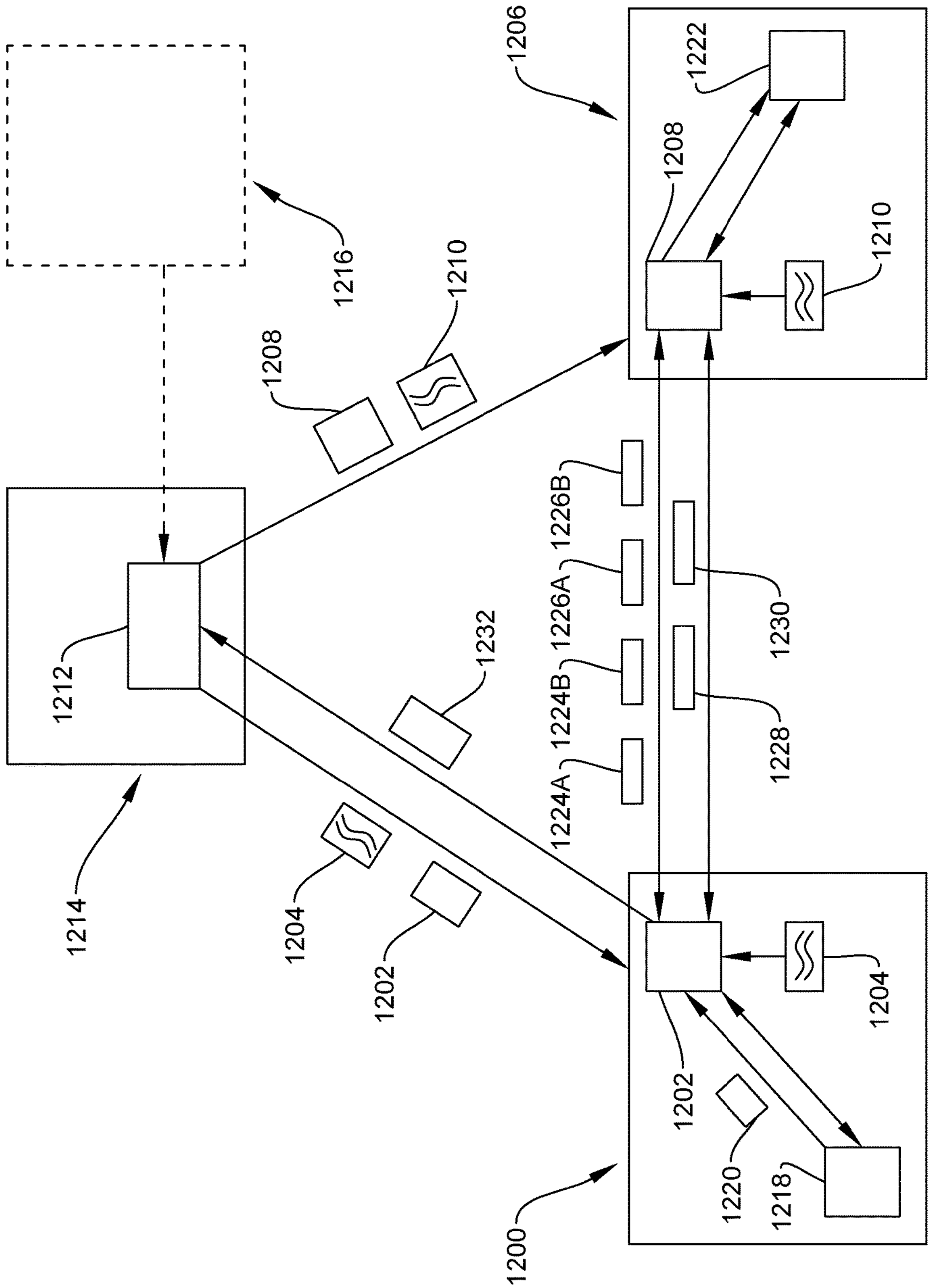
FIG. 12: Schematic view of a method to exchange and process proto-identifiers.

A schematic illustration of a method for monitoring device behavior in a plurality of networked computing devices is shown in FIG. 12. A networked first computing device 1200 receives a first network security software 1202 and a first file 1204 containing with a nonpublic first device identification cod and a networked second computing device 1206 receives a second network security software 1208 and a second file 1210 containing with a nonpublic second device identification code from a monitoring software 1212 running on a networked third computing device 1214. Optionally the monitoring software 1212 may receive network coordinates for the first computing device 1200 and the second computing device 1206 from a fourth computing device 1216 (for example as part of a network inventory report). After the first network security software 1202 and the second network security software 1208 are installed, the first network security software 1202 may intercept a connection request packet 1220 from a first application 1218 on the first computing device 1200 and serve as a proxy for communications with a second application 1222 on the second computing device 1206. To provide indicia for communications between the first application 1218 and the second application 1222, the first network security software 1202 and the second network security software 1208 exchange a series of metadata packets 1224A-B and 1226 A-B. A first metadata packet 1224A is sent from the first computing device 1200 to the second computing device 1206 and contains the first device identification code in an application layer portion of the first metadata packet 1224A. A second metadata packet 1224B is sent from the second computing device 1206 to the first computing device 1200 and contains the second device identification code in an application layer portion of the second metadata packet 1224B. A third metadata packet 1226A is sent from the first computing device 1200 to the second computing device 1206 and contains a first application identification code for the first application 1218 in an application layer portion of the third metadata packet 1226A. A fourth metadata packet 1226B is second from the second computing device 1206 to the first computing device 1200 and contains a second application identification code for the second application 1222 in an application layer portion of the third metadata packet 1226B. Following exchange of the metadata packets 1224A-B and 1226 A-B, the first network security software 1202 receives and communicates data received (for example via a network packet 1228) from the second application 1222 to the first application 1218, and the second network security software 1208 communicates data received (for example via a network packet 1230) from the first application 1218 to the second application 1222. To aid in tracking communications, the network packet 1228 contains the second application identification code and the network packet 1230 contains the first application identification code. The first network security software 1202 transmits communications metadata (for example via a series of network packets including a network packet 1232) to the monitoring software 1212. The communications metadata may include the device identification codes, the application identification codes, and/or data flow statistics (for example the number and timing of data packets transmitted between the first application 1218 and the second application 1222). All of the aforementioned communications between and/or among the monitoring software 1212, the first network security software 1202, and the second network security software 1208 can be accomplished by encrypted connections (for example encrypted TCP connections). In addition, each encrypted connection can be configured to use dedicated transport layer ports that are not shared with any other connections. The monitoring software 1212 can be configured to send commands to switch the mode of operation of the first network security software 1202 and the second network security software 1208. For example, the network monitoring software 1212 can send commands to instruct the first network security software 1202 and the second network security software 1008 to implement any of the communication management operations disclosed herein (for example, to lock down communications to communication pathways established based on authenticated device identification codes, application identification codes, and port numbers).

Figure 13:
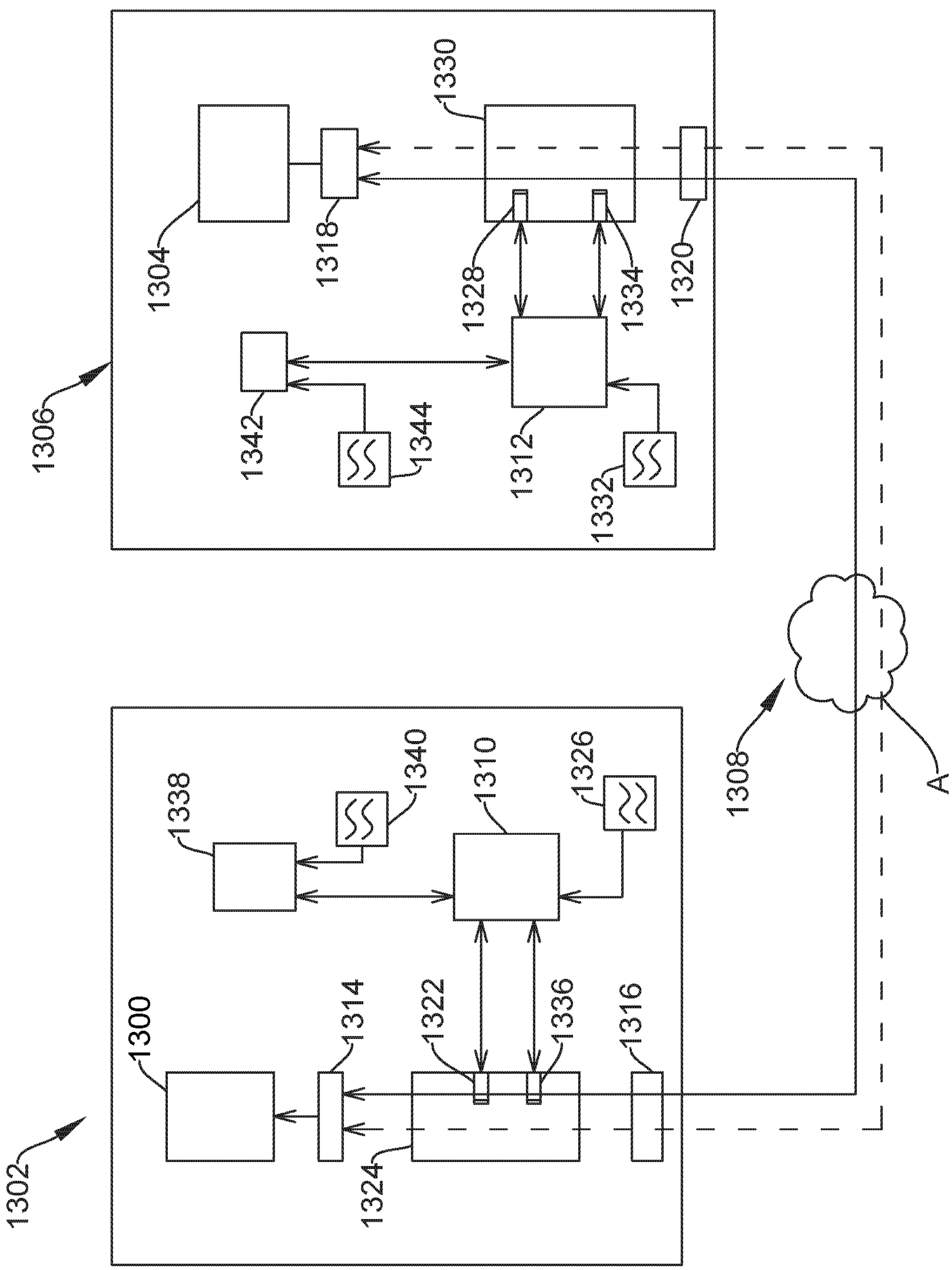
FIG. 13: Schematic view of a method for multiple modes of communications management.

A schematic view of an exemplary data flow for data transmission between a first application 1300 operated by a first user on a first node 1302 and a second application 1304 operated by a second user on a second node 1306 across a network 1308 is illustrated in FIG. 13. According to this embodiment, a first network security software 1310 and a second network security software 1312 are cooperatively configured to authorize communication-related requests, network connections, and packet payload content for communications between a first port 1314 bound to a first interface 1316 for the first application 1300 and a second port 1318 (for example an assigned ephemeral port) bound to a second interface 1320 for the second application 1304. In operation, a first command interceptor component 1322 (for example a Netfilter component or Windows Filtering System component) of a first network stack 1324 detects a bind request to bind the first port 1314 to the first interface 1316 from the first application 1300 and informs the first network security software 1310, which consults a configuration file 1326 to determine whether the first application 1300 is authorized to control the first port 1314 and optionally whether the application is authorized to bind the first port 1314 to the first interface 1316. If the operation is authorized, then the bind command will be allowed and the first port 1314 will bind and enter a listening mode. The first network security software 1310 can operate in a monitor mode, alert mode, or protect mode. In the monitor mode, if the operation is not authorized, then the first network security software 1310 will log the bind request (and allow the bind request to proceed) in a log file and transmit the log file to a provisioning server (not shown). In the alert mode, if the operation is not authorized, then the first network security software 1310 will send an alert to an SEIM system (and allow the bind request to proceed). In a variation on the alert mode, if the operation is not authorized and is also listed on a blacklist of prohibited communication operations for the first application 1300, the first port 1314, and/or the first interface 1316, then the first network security software 1310 will block the bind request as well as send an alert to the SEIM system. In the protect mode, if the operation is not authorized, then the first network security software 1310 will block or drop the bind request.

A second command interceptor component 1328 (for example a Netfilter component or Windows Filtering System component) of a second network stack 1330 detects a connection request to form a connection between the second application 1304 via the second interface 1320 to the first port 1314 bound to the first interface 1316 from the first application 1300 and informs the second network security software 1312, which consults a configuration file 1332 to determine whether the second application 1302 is authorized to communicate data with the first port 1314 (and also optionally determines whether use of the first interface 1316 and/or the second interface 1320 to communicate the data is authorized). If the operation is authorized, then the connection request will be allowed to pass to the network 1308. The second network security software 1312 can operate in a monitor mode, alert mode, or protect mode. In the monitor mode, if the operation is not authorized, then the second network security software 1312 will log the connection request (and allow the connection request to proceed) in a log file and transmit the log file to a provisioning server (not shown). In the alert mode, if the operation is not authorized, then the second network security software 1312 will send an alert to an SEIM system (and allow the connection request to proceed). In a variation on the alert mode, if the operation is not authorized and is also listed on a blacklist of prohibited communication operations, then the second network security software 1312 will block the connection request as well as send an alert to the SEIM system. In the protect mode, if the operation is not authorized, then the second network security software 1312 will block or drop the connection request.

Following establishment of a connection (for example a TCP or UDP connection) between the first port 1314 and the second port 1318, the connection is encrypted or routed through an exclusive, one-to-one encrypted tunnel (for example an IPSec tunnel), and bidirectional authorization of the applications (1300 and 1304) and process owners (i.e., users of the applications) is performed to authorize the connection. A first configuration packet is sent from the second network security software 1312 to the first network security software 1310 traversing a network authorization component 1334 of the second network stack 1330 and a network authorization component 1336 of the first network stack 1324. The first configuration packet contains a nonpublic second computing device identifier (obtained from the second configuration file 1332) for the second computing device 1306 in an application layer portion of the first configuration packet. The first network security software 1310 extracts the nonpublic second computing device identifier from the first configuration packet and confirms that the identifier matches an expected value obtained from the first configuration file 1326 for the connection. In the monitor mode, if the confirmation is not completed (for example the match fails), then the first network security software 1310 will log one or more components of the first configuration packet (for example a source or destination NIC address, a source or destination port number, a payload or a portion of a payload, and/or the nonpublic second device identifier) in the log file and transmit the log file to a provisioning server (not shown). In the alert mode, if the confirmation is not completed, then the first network security software 1310 will send an alert to an SEIM system. In a variation on the alert mode, if the confirmation is not completed and one or more components of the first configuration packet (for example a source or destination NIC address, a source or destination port number, a payload or a portion of a payload, and/or the nonpublic second device identifier, or a combination of one or more of the foregoing) is also listed on a blacklist of prohibited communication operations, then the first network security software 1310 will drop the connection as well as send an alert to the SEIM system. In the protect mode, if the if the confirmation is not completed, then the first network security software 1310 will drop the connection. A second configuration packet is sent from the first network security software 1310 via the network authorization component 1336 of the first network stack 1324 via the connection to the second network security software 1312 via the network authorization component 1334 of the second network stack 1330, the second configuration packet containing a nonpublic first computing device identifier (obtained from the first configuration file 1326) for the first computing device 1302 in an application layer portion of the second configuration packet. The second network security software 1312 extracts the nonpublic second computing device identifier from the second configuration packet and confirms that the identifier matches an expected value obtained from the first configuration file 1326 for the connection. In the monitor mode, if the confirmation is not completed (for example the match fails), then the second network security software 1312 will log one or more components of the second configuration packet (for example a source or destination NIC address, a source or destination port number, a payload or a portion of a payload, and/or the nonpublic first device identifier) in the log file and transmit the log file to a provisioning server (not shown). In the alert mode, if the confirmation is not completed, then the second network security software 1312 will send an alert to an SEIM system. In a variation on the alert mode, if the confirmation is not completed and one or more components of the second configuration packet (for example a source or destination NIC address, a source or destination port number, a payload or a portion of a payload, and/or the nonpublic first device identifier, or a combination of one or more of the foregoing) is also listed on a blacklist of prohibited communication operations, then the second network security software 1312 will drop the connection as well as send an alert to the SEIM system. In the protect mode, if the if the confirmation is not completed, then the second network security software 1312 will drop the connection. A third configuration packet is sent from the second network security software 1312 to the first network security software 1310 traversing a network authorization component 1334 of the second network stack 1330 and a network authorization component 1336 of the first network stack 1324, the third configuration packet containing a nonpublic second application identifier and a nonpublic second user identifier (obtained from the second configuration file 1332) in an application layer portion of the third configuration packet. The first network security software 1310 extracts the nonpublic second application identifier and the nonpublic second user identifier from the third configuration packet and confirms that the identifiers match expected values obtained from the first configuration file 1326 for the connection. In the monitor mode, if the confirmation is not completed (for example the match fails), then the first network security software 1310 will log one or more components of the third configuration packet (for example a source or destination NIC address, a source or destination port number, a payload or a portion of a payload, the nonpublic second application identifier, and/or the nonpublic second user identifier) in the log file and transmit the log file to a provisioning server (not shown). In the alert mode, if the confirmation is not completed, then the first network security software 1310 will send an alert to an SEIM system. In a variation on the alert mode, if the confirmation is not completed and one or more components of the third configuration packet (for example a source or destination NIC address, a source or destination port number, a payload or a portion of a payload, the nonpublic second application identifier, and/or the nonpublic second user identifier, or a combination of one or more of the foregoing) is also listed on a blacklist of prohibited communication operations, then the first network security software 1310 will drop the connection as well as send an alert to the SEIM system. In the protect mode, if the if the confirmation is not completed, then the first network security software 1310 will drop the connection. A fourth configuration packet is sent from the first network security software 1310 to the second network security software 1312 traversing the network authorization component 1336 of the first network stack 1324 and the network authorization component 1334 of the second network stack 1330. The fourth configuration packet contains a nonpublic first application identifier and a nonpublic first user identifier (obtained from the first configuration file 1326) for the first computing device 1302 in an application layer portion of the fourth configuration packet. The second network security software 1312 extracts the nonpublic first application identifier and the nonpublic first user identifier from the fourth configuration packet and confirms that the identifiers match expected values obtained from the first configuration file 1326 for the connection.

In the monitor mode, if the confirmation is not completed (for example the match fails), then the second network security software 1312 will log one or more components of the fourth configuration packet (for example a source or destination NIC address, a source or destination port number, a payload or a portion of a payload, the nonpublic first application identifier, and/or the nonpublic first user identifier) in the log file and transmit the log file to a provisioning server (not shown). In the alert mode, if the confirmation is not completed, then the second network security software 1312 will send an alert to an SEIM system. In a variation on the alert mode, if the confirmation is not completed and one or more components of the fourth configuration packet (for example a source or destination NIC address, a source or destination port number, a payload or a portion of a payload, the nonpublic first application identifier, and/or the nonpublic first user identifier, or a combination of one or more of the foregoing) is also listed on a blacklist of prohibited communication operations, then the second network security software 1312 will drop the connection as well as send an alert to the SEIM system. In the protect mode, if the if the confirmation is not completed, then the second network security software 1312 will drop the connection.

Following exchange of the fourth configuration packet, the first network security software 1310 and the second network security software 1312 perform communication management operations on communications between the first application 1300 and the second application 1304 via the ports (1314 and 1318) and the connection. For communications egressing from the first port 1314 and directed to the second port 1318 via network packets, the first network security software 1310 accesses the network packets via the network authorization component 1336 of the first computing device 1302 and inserts the nonpublic first application identifier and the nonpublic first user identifier into application layer portions of the network packets. Following insertion of the nonpublic first application identifier and the nonpublic first user identifier, at least a portion (for example all) of application layer payloads of egressing network packets are inspected by a payload inspection module 1338 (which can reside in an application space and/or a kernel space) of the first computing device 1302 to verify that outgoing application data conforms to one or more content requirements, which are specified in a local file 1340 on the first computing device 1302. The one or more content requirements can include, for example, one or more authorized data types, one or more prohibited data types, one or more authorized data ranges, one or more prohibited data ranges, one or more authorized data size ranges, one or more prohibited data size ranges, one or more command types authorized to be present in the incoming application data, and/or one or more command types prohibited from being present in the outgoing application data. If a payload fails the verification, the payload inspection module 1340 can optionally perform repairs on the payload, wherein the one or more prohibited data types, the one or more prohibited data ranges, the one or more prohibited data size ranges, and/or the one or more command types prohibited from being present in the incoming application data are excised from the payload. If this optional repair feature is employed, the modified payload is further inspected to determine whether the modified payload satisfies the one or more content requirements. If so, the modified payload can be considered verified without discarding the egressing network packet. Any such modifications to the payload are recorded in the log file. When the network packets are received in the second network stack 1330, the second network security software 1312 accesses the incoming network packets via the network authorization component 1334 of the second computing device 1306 and inspects the nonpublic first application identifier and the nonpublic first user identifier to confirm these parameters match expected values in the second configuration file for the connection. Following confirmation of the nonpublic first application identifier and the nonpublic first user identifier, at least a portion (for example all) of application layer payloads of incoming network packets are inspected by a payload inspection module 1342 (which can reside in an application space and/or a kernel space) of the second computing device 1306 to verify that incoming payloads conform to one or more content requirements, which can are specified in a local file 1344 on the second computing device 1306. The one or more content requirements can include, for example, one or more authorized data types, one or more prohibited data types, one or more authorized data ranges, one or more prohibited data ranges, one or more authorized data size ranges, one or more prohibited data size ranges, one or more command types authorized to be present in the incoming application data, and/or one or more command types prohibited from being present in the incoming payload. If an incoming payload fails the verification, the payload inspection module 1342 can optionally perform repairs on the incoming payload, wherein the one or more prohibited data types, the one or more prohibited data ranges, the one or more prohibited data size ranges, and/or the one or more command types prohibited from being present in the incoming application data are excised from the payload. If this optional repair feature is employed, the modified payload is further inspected to determine whether the modified payload satisfies the one or more content requirements. If so, the modified payload can be considered verified without discarding the incoming network packet. Any such modifications to the payload are recorded in the log file.

In the monitor mode, if the confirmation is not completed (for example the match fails), then the second network security software 1312 will log the discrepancy in the nonpublic first application identifier and/or the nonpublic first user identifier in the log file and transmit the log file to a provisioning server (not shown), and a payload of the incoming network packet will be allowed to pass to the second application 1304. In the alert mode, if the confirmation is not completed, then the second network security software 1312 will send an alert to an SEIM system, and a payload of the incoming network packet will be allowed to pass to the second application 1304. In a variation on the alert mode, if the confirmation is not completed and the nonpublic first application identifier and/or the nonpublic first user identifier is also listed on a blacklist of prohibited communication operations, then the second network security software 1312 will prevent the payload of the incoming network packet will be allowed to pass to the second application 1304 and drop the connection as well as send an alert to the SEIM system. In the protect mode, if the if the confirmation is not completed, then the second network security software 1312 will prevent the payload of the incoming network packet will be allowed to pass to the second application 1304 and drop the connection. For communications egressing from the second port 1318 and directed to the first port 1314 via network packets, communication management operations comparable to the foregoing operations are performed, including: inserting application and user identifiers associated with the second application 1304 by the second network security software 1312; verifying content requirements of egressing payloads by the payload inspection module 1342; confirming that the identifiers match expected values obtained from the first configuration file 1326 by the first network security software 1300; and verifying content requirements of incoming payloads by the payload inspection module 1338.

A hypothetical communication pathway (or connection) that does not interact with the network security software (1310 and 1312) is shown by identifier A for reference (this hypothetical communication pathway is shown for reference only and is not part of the exemplary embodiment). The hypothetical communication pathway would be negotiated using conventional protocol (for example TCP), with no verification of port 1314 association with the first application 1300, no verification that the second application 1304 is authorized to send a connection request to the port 1314, no authorization of device, application, and user identification codes, and no verification of source application comprising inspection of application layer portions of incoming network packets.

Each of the foregoing methods, systems, products, software, modules, middleware, computing infrastructure and/or apparatus may be inclusive of one or more of the following embodiments and/or one or more of the embodiments disclosed in the INCORPORATED REFERENCES. Any of the foregoing methods, systems, products, software, modules, middleware, computing infrastructure and/or apparatus comprising selectively enabling or disabling communication management operations may be applied to any of the communication management operations or groups of communication management operations disclosed in one or more of the following embodiments and/or one or more of the embodiments disclosed in the INCORPORATED REFERENCES. Any of the modes (for example one or more of the disclosed monitor modes, alert modes, and protect modes) of the foregoing methods, systems, products, software, modules, middleware, computing infrastructure and/or apparatus may be applied to one or more of the following embodiments and/or one or more of the embodiments disclosed in the INCORPORATED REFERENCES to form one or more additional embodiments. Any of the modules (for example one or more of the first modules, second modules, third modules, fourth modules, fifth modules, and six modules) of the foregoing methods, systems, products, software, middleware, computing infrastructure and/or apparatus may be applied to one or more of the following embodiments and/or one or more of the embodiments disclosed in the INCORPORATED REFERENCES to form one or more additional embodiments.

In certain embodiments of the methods, systems, products, communication management operations, software, modules, middleware, computing infrastructure and/or apparatus of the present disclosure, computing infrastructure may be secured by managing network communications (for example, all port-to-network, port-to-port and network-to-port communications) between networked nodes. Communications from user-applications on the network nodes may be managed, transparent to the user-application, by middleware that prevents the user-application from binding directly to a physical interface (or, for example, a virtual interface of a virtual machine). The middleware may operate on multiple nodes to manage outgoing communications from a node (port-to-network), and incoming communications into a node (network-to-port). The middleware may be present on a plurality of network nodes, including, for example, all of the network nodes of a defined group (such as a preconfigured group or a software defined network) to manage encrypted or partially encrypted communications such as tunnel communications (network port-to-network port, or network-to-network). The encrypted or partially encrypted communications such as tunnel communications may be established co-operatively between middleware on two or more network nodes. Authorized network communication may be transacted via these encrypted or partially encrypted communications such as tunnels, which may be dedicated encrypted or partially encrypted communications such as tunnels for authorized communications between a user-application on one network node and a user-application on another network node, processor, or computing device. In addition, the middleware may manage network communication by verifying most data packets (including all or substantially all data packets) resulting from a user-application for transmission over the network complies with a preconfigured, predefined, pre-established and/or preprovisioned set of authentication code parameters (including, for example, one or more of the following: a source user-application identifier, a payload data type descriptor, and port number). Similarly, the middleware may manage network communication by verifying most data packets (including all or substantially all data packets) received from a transmission over the internet for a user-application complies with a preconfigured, predefined, pre-established and/or preprovisioned set of authentication code parameters (including, for example, one or more of the following: a source user-application identifier, a payload data type descriptor, and port number). In such embodiments, the ability for malware to intrude, interrogate and/or proliferate within or among the network nodes is severely thwarted. In certain further embodiments, network communication security may be complemented by computing hygiene policies including human access monitoring and disabling a portion or all USB interfaces on network-accessible devices.

In certain embodiments, for example, the encrypted or partially encrypted communications may comprise a network tunnel. In certain embodiments, for example, the communications are encapsulated public network transmission units that appear to be data. In certain embodiments, for example, the communications may be partially or fully encrypted and transmitted across a network using a network tunnel, wherein the network tunnel may be defined by one or more encryption keys and one or more decryption keys. In certain embodiments, for example, the network tunnel may be defined by a protocol, for example Internet Protocol Security (IPsec), Transport Layer Security (SSL/TLS), Datagraph Transport Layer Security (DTLS), Microsoft Point-to-Point Encryption (MPPE), Microsoft Secure Socket Tunneling Protocol (SSTP), Point-to-Point Protocol (PPP), Layer 2 Tunneling Protocol (L2TP), Multi Path Virtual Private Network (MPVPN), or Secure Shell (SSH) protocol. In certain embodiments, for example, the protocol may require encapsulating a network packet inside another network packet (for example, adding an additional header). In certain embodiments, for example, a network tunnel may be defined by one or more encryption keys and one or more decryption keys associated with the tunnel, exclusive of any additional protocol header.

Figure 14:
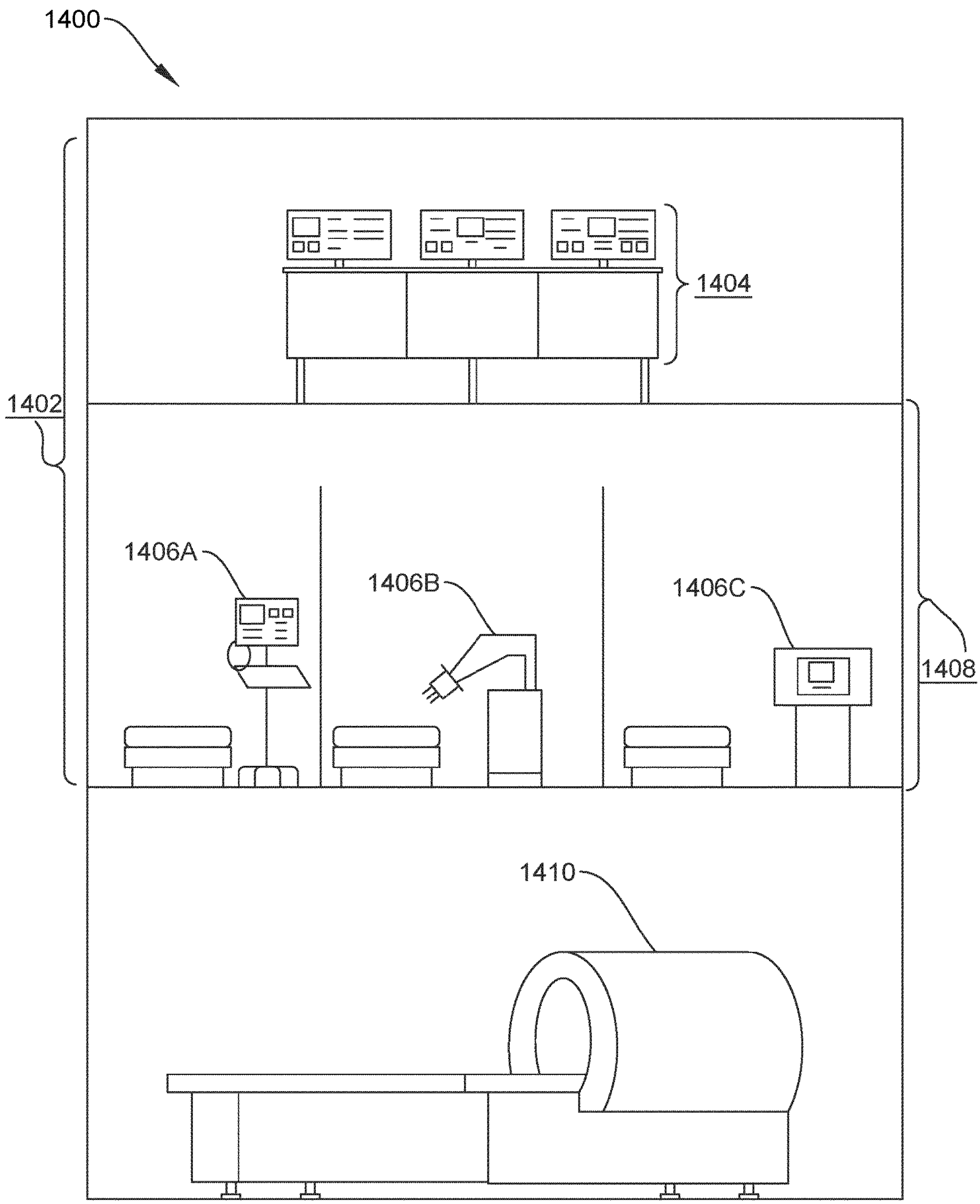
FIG. 14: Simplified schematic of a hospital.

In certain embodiments, for example, the methods, systems, products, communication management operations, software, modules, middleware, computing infrastructure and/or apparatus of the present disclosure may be employed to manage network communications (for example, all port-to-network, port-to-port and network-to-port communications) among networked nodes in an institution, for example a hospital, a university, a manufacturing facility, etc. In certain embodiments, for example a hospital such as the hospital 1400 schematically depicted in FIG. 14, network security software and configuration data may be employed (for example in an embodiment of the communication management operations) throughout a defined group of networked processor nodes (for example, all or most of the networked processors at a facility, inclusive of remote facilities) to manage networked communications between workstations, databases, smart devices, communication devices, etc. without requiring pre-existing or new application software to be modified to accommodate the network security software. In the inpatient ward 1402 of FIG. 14, for example, the security software and configuration data is installed on a nurse's station 1404 and smart devices (vital sign monitoring device 1406A, a mobile x-ray machine 1406B, and an infusion device 1406C) in a monitoring zone, which includes private patient suites 1408. In addition, a smart MRI machine 1410 is connected to monitoring systems in another department of the hospital 1400. Each communication pathway between and among nodes may be one of the encrypted communication pathways and/or network tunnels managed by one or more of the communication management operations of the authorized type described herein and/or in one of the INCORPORATED REFERENCES.

In operation, device software on a smart device generates packet data and requests its transmission to a pre-selected destination port associated with monitoring software at the nurse's station. Rather than sending a data packet directly to the monitoring software, the network security software receives or intercepts the data packet and verifies that the device software is authorized to transmit the data and that the requested destination port of the nurse's station is authorized to receive the payload of the data packet. Next, the network security software repackages the payload of the data packet into a new data packet and assigns the new data packet to an encrypted network tunnel that terminates at a preconfigured port associated with network security software of the nurse's station. This network tunnel is unique to the specific data feed being transmitted by the device, so different data feeds do not share the same tunnel. Prior to forwarding the new data packet to the network, the network security software inserts encrypted metadata into the new data packet defining the device software, the user of the device software, and data type being transmitted.

When the transmitted new data packet is received by the nurse's station, network security software on the nurse's station decrypts and inspects the inserted metadata to verify against a predefined configuration data that the sending device software, user, and data type are authorized for the network tunnel. If so, the network security software extracts the network packet payload and inserts it into a final packet that is forwarded to the destination port of the monitoring software. In each of the foregoing steps, the configuration data provides the necessary translation between the encrypted port and the destination port, as well as identifiers for the authorized device software, user, and data type used by the network security software to perform authentications.

In a billing department of the hospital, the network security software may be installed on a security server to receive (or intercept) and authorize all data packets received from an insurance provider via the public internet. In cases where a data packet is received from a secure remote node that is cooperatively configured with the security server, the aforementioned steps are applied to the received data packet and the data forwarded to its destination. In cases where the data is received from an unsecured remote node, the security server extracts the payload and processes it into a benign, authenticated format (including steps to render any executable payload inoperable), before forming a new packet for transmission to an endpoint in the hospital network.

While application transparency facilitates deployment of the network security software, in certain environments it is desirable to build applications that directly access a portion of the network security software through a security API. Such applications may be particularly useful, for example, to provide faster data processing and to customize security parameters.

In certain embodiments, for example, the methods, systems, products, communication management operations, software, modules, middleware, computing infrastructure and/or apparatus of the present disclosure may be employed (for example in an embodiment of the communication management operations) to manage network communications (for example, all port-to-network, port-to-port and network-to-port communications) among networked nodes in a modern hospital. A modern hospital. For example, may occupy several floors of a multistory building and may include hundreds of private patient suites. Through extensive computerization and network connectivity, the patient suites may be grouped into a series of zones, for example, 25-50 suites per zone, which may be monitored by nursing stations dedicated to each zone. Each nursing station may be required to monitor multiple medical data feeds from smart devices (including life support, infusion, x-ray, MRI, kidney dialysis, etc.) located in or near the patient suites and/or other station throughout the hospital and beyond. To meet changing patient requirements, the devices may frequently be relocated to different suites and/or zones, which may require reconfiguration of device assignments among the nursing stations. Embedded processors and network interfaces in the devices may facilitate frequent reconfiguration. Unless secured, hospital networks may be vulnerable because, for example, unsupervised visitors are in frequent close proximity to the smart devices. A bad actor may compromise the network from the privacy of a patient suite, for example by injecting malware into a smart device from a thumb drive (allowing it to spread to other computers and devices in the hospital), by plugging a computer into the network and spoofing the device, or simply by moving the device to a different suite.

In an embodiment, most of the devices, including all, in the hospital network (or portion of the hospital network) may be configured with network security software (middleware) and configuration data to accept network traffic only from (n-tuple) pre-authorized users, pre-authorized applications, pre-authorized devices, and/or pre-authorized datatypes. In addition, a separate server may update the configuration data across all zones to reflect reconfiguration events. With the security software running on each device on the network, data transmitted from malware on a smart device is rejected (and an alarm may be sounded) when the malware fails to provide a required user identifier and/or application identifier expected by the network security software. In addition, the network security software may prevent a workstation from connecting to any unauthorized device. When the unauthorized device (whether a new device or a device removed from its allotted zone) attempts to connect, the attempt may be rejected when the unauthorized device failed to provide an expected secret identification code.

Each smart device is may also be protected by installed network security software and configuration data, either installed directly (for devices with sufficient processing capability) or through a legacy adapter (containing the network security software and configuration files) disposed between the device and the network. In addition to the intrusion prevention features noted above, the network security software may also prevent malware resident on a smart device from transmitting data to the network. When the malware attempts to transmit data, the data may be received (or intercepted) and dropped when the network security software detects that the malware is not a pre-authorized application for the smart device.

In addition to the risk of unsupervised visitors, malware may also attempt to penetrate a hospital network through the public Internet, for example through casual browsing, email, or communication with service providers. According to an embodiment, all data packets from the public internet may be passed through a security server before transmitting to any network on the hospital. In cases where the data is received from a secure remote node that is cooperatively configured with the security server, the data may be transmitted to a network in the hospital. In cases where the data is received from an unsecured remote node, the security server takes additional steps to convert data packets into a benign, authenticated format (including steps to render any executable payload inoperable).

Figure 15:
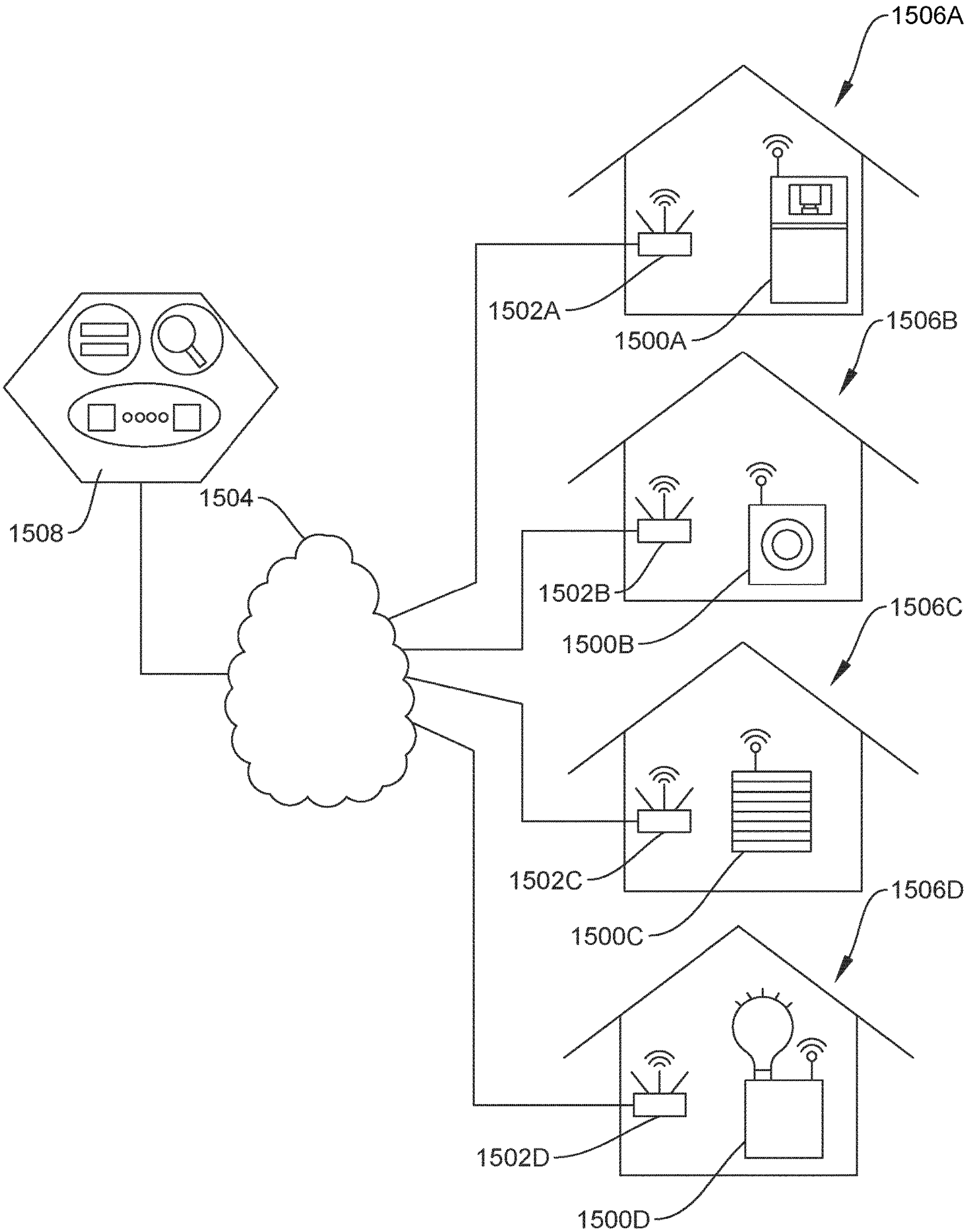
FIG. 15: Simplified schematic of an Internet of Things ecosystem.

In certain embodiments, for example, the methods, systems, products, communication management operations, software, modules, middleware, computing infrastructure and/or apparatus of the present disclosure may be employed (for example in an embodiment of the communication management operations) to manage network communications (for example, all port-to-network, port-to-port and network-to-port communications) among networked nodes in an Internet-of-Things application. In an Internet-of-Things application depicted in FIG. 15, for example, a consumer appliance manufacturer equips a suite of processor equipped, wirelessly networked smart products (a refrigerator 1500A, a washing machine 1500B, window shades 1500C, and lighting 1500D) with sensors and preconfigured network security software to securely report authenticated, authorized, encrypted operating data, via routers 1502A-D connected to the public Internet 1504 from homes 1506A-D to the manufacturer's cloud based analytics and maintenance engine 1508. The cloud engine 1508, in turn, utilizes the data to compute performance and/or maintenance parameters, and securely communicates authenticated, authorized control parameter adjustments, maintenance alerts, and/or firmware updates to the smart products 1500A-D. Each communication pathway between and among nodes may be one of the encrypted communication pathways and/or network tunnels managed by one or more of the communication management operations of the authorized type described herein and/or in one of the INCORPORATED REFERENCES.

For example, upon installation of a smart refrigerator, first network security software in the refrigerator utilizes preconfigured private keys to negotiate an exclusive encrypted network tunnel with second network security software in the cloud engine for the purpose of transmitting time series of temperature and/or temperature set point readings from refrigerator control software, across the public Internet, to cloud engine analytic software. Upon receipt, the analytic software will analyze the data and respond to the control software, for example, with seasonal adjustments to parameters that control operation of the refrigerator's compressor.

Prior to transmission of any readings, the cloud engine and refrigerator control software authenticate the refrigerator-to-cloud data path by exchanging device codes, application (refrigerator control software and/or cloud analytic software) identifiers, and/or data-type identifiers across the encrypted tunnel and verifying that the exchanged values correspond to authorized combinations of values.

Following tunnel authorization, for example, a temperature sensor driver executing on the processor may transmit a time series of temperature readings to the control software that, in turn, sends a request via a network API to transmit the readings in a data packet to a preconfigured destination port of the cloud engine. A first module of the first network security software may receive or intercept the request, uses the destination port number to identify a predetermined tunnel destination port number associated with the second network security software, and verifies that the network tunnel is open. A second module of the first network security software may translate the time series into a lightweight format (for example an MQTT format) for transport. A third module of the first network security software may assemble metadata containing an identifier for the control software, an identifier for the control software process owner, and/or a data protocol for the time series. A fourth module of the first network security software may encrypt the translated time series and the metadata. A fifth module of the first network security software may assemble the encrypted metadata and the encrypted, translated time series to form a network packet for transmission to the tunnel port of the second network security software.

Upon receipt of the network packet, a first module of the second network security software verifies that the network tunnel is open. A second module of the second network security software may decrypt the metadata. A third module of the second network security software may verify that the contents of the metadata match preconfigured, expected values based on the destination tunnel port number. A fourth module of the second network security software may decrypt the translated time series. A fifth module of the second network security software further may translate the translated time series into a format readable by the cloud engine analytic software. A sixth module of the second network security software may insert the properly formatted time series into a new network packet and/or may transmit the new network packet to the analytic software. If the network security software and the analytic software execute on the same processor, the transmittal may use a loopback interface. Otherwise, the new packet may contain appropriate authorization metadata and may be transmitted to the first network security software by a separate encrypted network tunnel to an appropriate device in accordance with the methods described above.

The analytic engine may analyze the time series and may compute updated compressor controller parameters. The new controller parameters may be transmitted to a preconfigured destination port of the refrigerator control software (a different port than the source port used for transmitting the time series discussed above), comprising passing a network packet containing the parameters (and appropriate metadata) across an encrypted network tunnel between the second network security software and the first network security software (a different encrypted network tunnel than the tunnel used to transmit the time series). The methods of forming the connection and moving the data may be in accordance with the methods discussed above. Upon receipt of the updated parameters, the refrigerator control software may update a compressor configuration file(s) referenced by the compressor controller, thereby modifying operation of the refrigerator.

In certain embodiments, for example, the methods, systems, products, communication management operations, software, modules, middleware, computing infrastructure and/or apparatus of the present disclosure may be employed (for example in an embodiment of the communication management operations) to manage network communications (for example, all port-to-network, port-to-port and network-to-port communications) among networked nodes in a smart transportation ecosystem, for example, network security software and configuration data may be factory installed at a number of attachment points in vehicles, including, for example, dedicated on-board processors for vehicle routing, vehicle data, vehicle communications (for example mobile routers) and vehicle maintenance. A vehicle routing computer, for example, may execute several instances of network security software (in conjunction with configuration data) to ensure the integrity of multiple real-time data feeds received from remote routing servers over a cellular or satellite network, including, for example, weather data, GPS or cellular triangulation data, traffic data, and logistic parameters (for example cargo content, next requested stop, destination location, or delivery status information).

Figure 16:
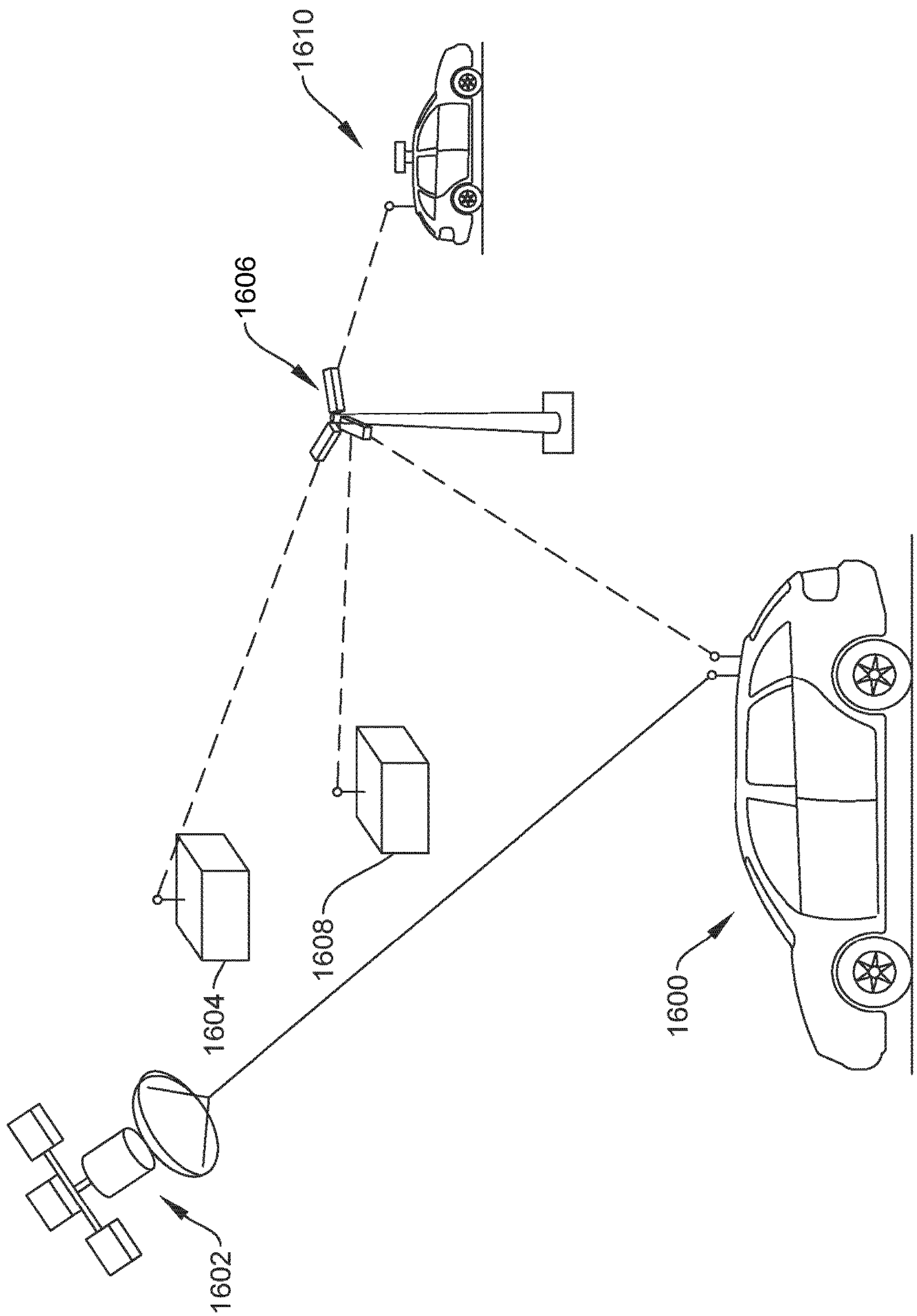
FIG. 16: Simplified schematic of a smart car ecosystem.

In the smart vehicle ecosystem depicted in FIG. 16, a smart car 1600 receives satellite geopositioning data from a satellite 1602 for processing by an onboard navigation computer equipped with the network security software. A second onboard processor of the smart car 1600 equipped with the network security software receives traffic data broadcasts from a weather bureau 1604 by a cellular data network through a cellular tower 1606. A third onboard processor of the smart car 1600 equipped with the network security software communicates transmission data to a manufacturer's maintenance bureau 1608 and receives periodic firmware updates from the bureau 1608. A fourth onboard processor equipped with the network security software communicates speedometer readings via the cell tower 1606 to a law enforcement vehicle 1610. Each communication pathway between and among nodes may be one of the encrypted communication pathways and/or network tunnels managed by one or more of the communication management operations of the authorized type described herein and/or in one of the INCORPORATED REFERENCES.

In operation, the network security software may establish discrete encrypted network tunnels configured for each data feed, including verifying the authority of a sending device, application, and/or application user to provide each particular data feed to, for example, the routing software and user by assigned encrypted tunnel. For example, following establishment of one of the encrypted network tunnels, a network security software (or middleware) may receive or intercept incoming network packets at a port defined by the specific encrypted tunnel and extracts data from the packet payload at a predetermined location where it expects encrypted metadata. Next, the first network security software may attempt to decrypt the metadata, for example, using an expected cryptographic key (a rotated key for example derived from an elliptic curve-based key exchange algorithm) and to match the decrypted metadata against expected identifiers for the sending application, application user, and/or data type. If the match is successful, the first network security software may extract the network packet payload and may insert it into a final packet which may be forwarded to a predetermined destination port (based on the encrypted tunnel port number) of the routing software.

Additional network security software (or middleware) may authenticate speedometer data for transmission, for example, to a law enforcement resource. In this mode, configuration data may include cryptographic keys shared with law enforcement used for establishing an encrypted network tunnels between the additional network security software and network security software utilized by the law enforcement resource. The additional network security software may receive or intercept a speedometer reading (encoded, for example, in a network packet received via a loopback interface) from speedometer software and may execute operating system commands to determine the identity of the speedometer software and the process owner. The additional network security software may then verify that the speedometer software matches the factory-installed version and is being executed by a pre-authorized user. Next, the additional network security may package the reading into a data packet and may assign the data packet to an encrypted network tunnel that terminates at a preconfigured port associated with the network security software installed at the law enforcement resource. Prior to transmitting the data packet through the network tunnel, the network security software inserts encrypted metadata that identifies the speedometer software, the user of the speedometer software, and data type being transmitted. Upon receipt of the data packet, law enforcement may authenticate the origin of the reading and the type of data, for example, by using the methods described herein.

In each of the foregoing steps, configuration data may be resident on most, for example, all of the attachment points to keep track of, for example, the ports, sending user-applications, receiving user-applications, data types, and/or devices assigned to most, for example, all of the encrypted network tunnels.

Figure 17:
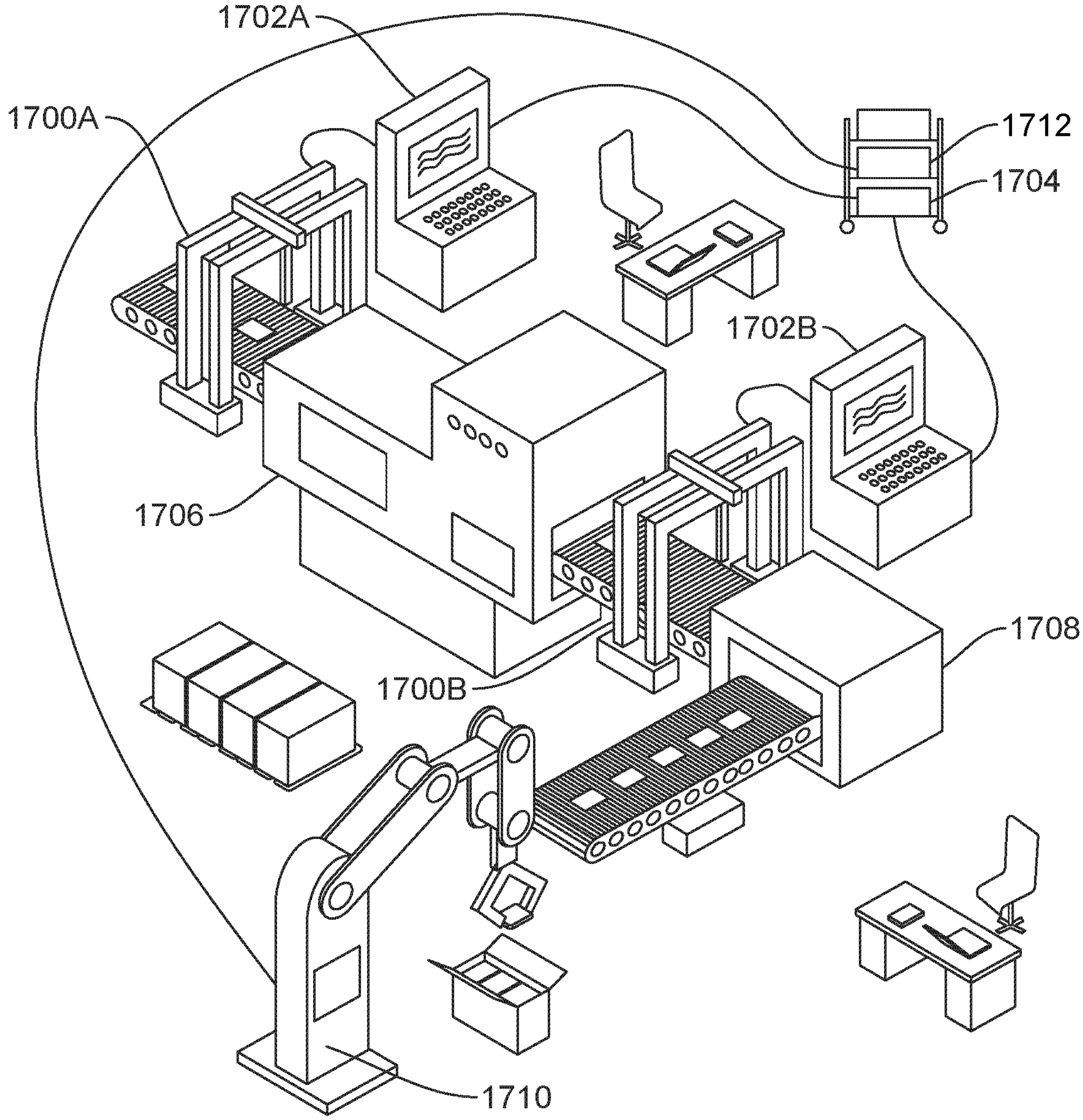
FIG. 17: Simplified schematic of a process-controlled industrial production unit.

In certain embodiments, for example, the methods, systems, products, communication management operations, software, modules, middleware, computing infrastructure and/or apparatus of the present disclosure may be employed (for example in an embodiment of the communication management operations) to manage network communications (for example, all port-to-network, port-to-port and network-to-port communications) among networked nodes in an Internet-of-Things process controlled manufacturing line. In the manufacturing line depicted in FIG. 17, quality control devices 1700A and 1700B inspect raw materials and intermediate products. The quality control devices 1700A and 1700B have embedded processors executing network security software, and are in machine-to-machine communication with control systems 1702A and 1702B, respectively, which also execute network security software. The control systems 1702A and 1702B are, in turn, in machine-to-machine communication with a quality control server,

1704, which records electronic batch data and provides control parameters to the control systems 1702A and 1702B. Raw materials are passed through a first stage 1706 to form intermediate products, which are passed through a second stage 1708 to form final products. The final products are loaded into shipping boxes by a robot 1710. The robot is in machine-to-machine communication with a logistics server 1712, and each of the robot 1710 and the logistics server are equipped with network security software. The logistics server 1712 obtains product count information and provides loading instructions to the robot 1710. Each communication pathway between and among nodes may be one of the encrypted communication pathways and/or network tunnels managed by one or more of the communication management operations of the authorized type described herein and/or in one of the INCORPORATED REFERENCES.

Figure 18:
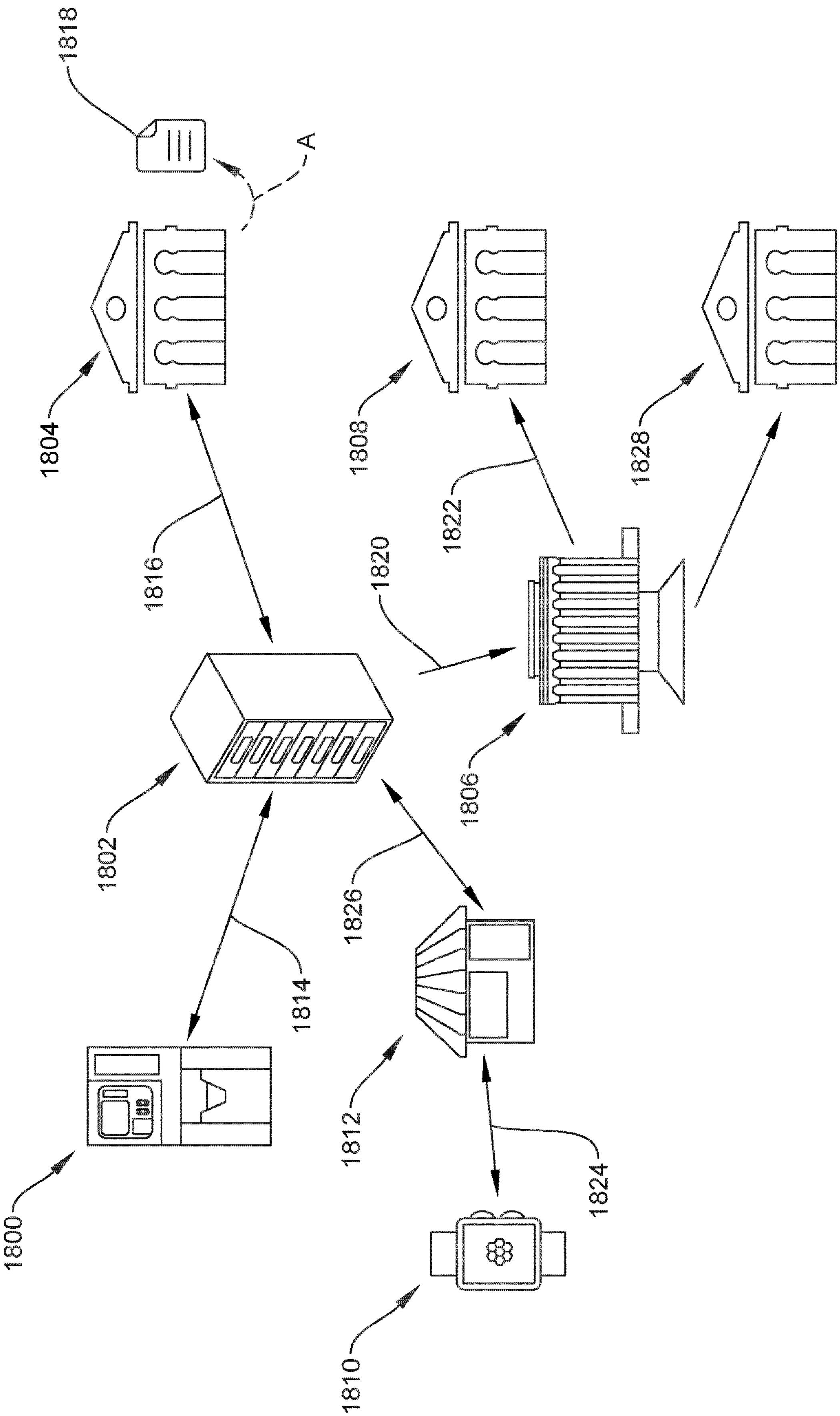
FIG. 18: Simplified schematic of a retail banking system.

In certain embodiments, for example, the methods, systems, products, communication management operations, software, modules, middleware, computing infrastructure and/or apparatus of the present disclosure may be employed (for example in an embodiment of the communication management operations) to manage network communications (for example, all port-to-network, port-to-port and network-to-port communications) for retail banking applications. In certain embodiments, for example retail banking applications such as the private Automated Teller Machine (ATM) network and the wearable payments ecosystem schematically depicted in FIG. 18, configuration data and network security software may be employed (for example in an embodiment of the communication management operations) throughout a defined group of networked processor nodes to manage network communications. In FIG. 18, network security software is installed on an ATM 1800, transaction processing engine 1802, retail customer's bank server 1804, an Automated Clearing House (ACH) server 1806, and cash provider's bank server 1808. In addition, network security software is installed on a wearable computing device 1810 containing an embedded near-field communication chip and on a merchant's payment processing computer 1812. Each communication pathway between and among nodes may be one of the encrypted communication pathways and/or network tunnels managed by one or more of the communication management operations of the authorized type described herein and/or in one of the INCORPORATED REFERENCES.

In operation, a retail banking customer provides card and pin input to the ATM 1800 to request a cash withdrawal. Device software resident on the ATM 1800 processes the request and generates encrypted packet data containing the customer's transaction information, card number, and pin input and requests its transmission to a pre-selected destination port associated with a remote transaction processing engine 1802. Rather than sending a data packet directly to the remote transaction processing engine 1802, the network security software receives the data packet and verifies that the device software is authorized to transmit the data and that the requested destination port of the remote transaction processing engine 1802 is authorized to receive the payload of the data packet. Next, the network security software repackages the payload of the data packet into a new data packet and assigns the new data packet to a first encrypted network tunnel 1814 that terminates at a preconfigured port associated with network security software of the remote transaction processing engine 1802. The first encrypted network tunnel 1814 is unique to the specific retail transaction being transmitted by the ATM 1800, so different transactions (for example different retail customers, or different transactions by the same customer) do not share the same tunnel. Prior to forwarding the new data packet to the network, the network security software inserts encrypted metadata into the new data packet defining the device software, the retail customer, and the data type being transmitted.

When the transmitted new data packet is received by the transaction processing engine 1802, network security software resident on the transaction processing engine 1802 decrypts and inspects the inserted metadata to verify against predefined configuration data that the sending device software, retail customer, and data type are authorized for the network tunnel. If so, the network security software extracts the network packet payload and inserts it into a new packet that is forwarded to the destination port of the transaction processing engine software. In each of the foregoing steps, the configuration data provides the necessary translation between the encrypted port and the destination port, as well as identifiers for the authorized device software, authorized device software user, and data type used by the network security software to perform authentications.

The transaction processing engine software processes the payload to identify the retail customer's card network and associated financial institution 1804, and forms a data packet containing the transaction information for transmission to a destination port of software resident on a server of the associated financial institution 1804. Rather than sending the data packet directly to the server of the associated financial institution 1804, network security software resident on the transaction processing engine 1802 receives the data packet and verifies that the transaction processing engine software is authorized to transmit the data and that the requested destination port of the server of the associated financial institution 1804 is authorized to receive the payload of the data packet. Next, the network security software repackages the payload of the data packet into a new data packet and assigns the new data packet to a second encrypted network tunnel 1816 that terminates at a preconfigured port associated with network security software of the server of the associated financial institution 1804. The second encrypted network tunnel 1816 is unique to the port-to-port connection between the transaction processing engine software, the associated financial institution server software, and the data type being transmitted (and optionally the retail customer identity and the specific transaction). Prior to forwarding the new data packet to the network, the network security software inserts encrypted metadata into the new data packet defining the transaction processing engine software, the transaction processing engine software user, and the data type being transmitted.

When the transmitted new data packet is received by the server of the associated financial institution 1804, network security software resident on the associated financial institution server decrypts and inspects the inserted metadata to verify against predefined configuration data that the sending transaction processing engine software, transaction processing engine software user, and data type are authorized for the second network tunnel. If so, the network security software extracts the network packet payload and inserts it into a new packet that is forwarded to the destination port of the associated financial institution software. In each of the foregoing steps, the configuration data provides the necessary translation between the encrypted port and the destination port, as well as identifiers for the transaction processing engine software, transaction processing engine software user, and data type used by the network security software to perform authentications.

The associated financial institution software memo debits the retail customer's account in a ledger 1818 of the associated financial institution, and forms a data packet containing an authorization for the ATM transaction for transmission though the second encrypted network tunnel 1816 to a destination port of transaction processing engine software. Prior to forwarding the data packet in a network packet to the network, the network security software inserts encrypted metadata into the network packet defining the associated financial institution software, the associated financial institution software user, and the data type being transmitted.

When the transmitted data packet is received by the transaction processing engine 1802 from the second encrypted network tunnel 1816, network security software resident on the transaction processing engine 1802 decrypts and inspects the inserted metadata to verify against predefined configuration data that the associated financial institution software, the associated financial institution software user, and data type are authorized for the network tunnel. If so, the network security software extracts the network packet payload and inserts it into a new packet that is forwarded to the destination port of the transaction processing engine software. In each of the foregoing steps, the configuration data provides the necessary translation between the encrypted port and the destination port, as well as identifiers for the transaction processing engine software, transaction processing engine software user, and data type used by the network security software to perform authentications.

The associated financial institution software forms a data packet providing an authorization for the ATM transaction for transmission though the first encrypted network tunnel 1814 to a destination port of ATM 1800 device software. Prior to forwarding the data packet in a network packet to the network, the network security software inserts encrypted metadata into the network packet defining the transaction processing engine software, the transaction processing engine software user, and the data type being transmitted.

When the transmitted data packet is received by the ATM 1800 from the transaction processing engine 1802, network security software resident on the ATM 1800 decrypts and inspects the inserted metadata to verify against predefined configuration data that the transaction processing engine software, the transaction processing engine software user, and data type are authorized for the first network tunnel. If so, the network security software extracts the network packet payload and inserts it into a new data packet that is forwarded to the destination port of the ATM 1800 device software. The ATM 1800 device software processes the payload of new data packet authorizing the transaction followed by dispensing cash to the retail customer. In each of the foregoing steps, the configuration data provides the necessary translation between the encrypted port and the destination port, as well as identifiers for the transaction processing engine software, transaction processing engine user, and data type used by the network security software to perform authentications.

In addition to sending transaction authorization data to the ATM 1800 device software, the transaction processing engine 1802 forms a data packet for transmission to a destination port of ACH server software. Rather than sending the data packet directly to the ACH server 1806, network security software resident on the transaction processing engine 1802 receives the data packet and verifies that the transaction processing engine software is authorized to transmit the data and that the requested destination port of the ACH server software is authorized to receive the payload of the data packet. Next, the network security software repackages the payload of the data packet into a new data packet and assigns the new data packet to a third encrypted network tunnel 1820 that terminates at a preconfigured port associated with network security software of the ACH server 1806. The third encrypted network tunnel 1820 is unique to the port-to-port connection between the transaction processing engine software, the ACH server software, and the data type being transmitted (and optionally the retail customer identity and the specific transaction). Prior to forwarding the new data packet to the network, the network security software inserts encrypted metadata into the new data packet defining the transaction processing engine software, the transaction processing engine software user, and the data type being transmitted.

When the data packet is received by the ACH server 1806, network security software resident on the ACH server 1806 decrypts and inspects the inserted metadata to verify against predefined configuration data that the sending transaction processing engine software, transaction processing engine software user, and data type are authorized for the third encrypted network tunnel 1820. If so, the network security software extracts the network packet payload and inserts it into a new packet that is forwarded to the destination port of the ACH server software.

The ACH server software processes the payload to identify the cash provider's bank server, and forms a data packet containing the transaction information for transmission to a destination port of software resident on cash provider's bank server 1808. Rather than sending the data packet directly to the software resident on cash provider's bank server 1808, the network security software resident on the ACH server 1806 receives the data packet and verifies that the ACH server software is authorized to transmit the data and that the requested destination port of software resident on cash provider's bank server 1808 is authorized to receive the payload of the data packet. Next, the network security software repackages the payload of the data packet into a new data packet and assigns the new data packet to a fourth encrypted network tunnel 1822 that terminates at a preconfigured port associated with network security software of the destination port of software resident on cash provider's bank server 1808. The fourth encrypted network tunnel 1822 is unique to port-to-port connection between the ACH server software, the associated financial institution server software, the cash provider's bank server software, and the data type being transmitted (and optionally the retail customer identity and the specific transaction). Prior to forwarding the new data packet to the network, the network security software inserts encrypted metadata into the new data packet defining the ACH server software, the ACH server software user, and the data type being transmitted.

When the transmitted new data packet is received by the cash provider's bank server 1808, network security software resident on the cash provider's bank server 1808 decrypts and inspects the inserted metadata to verify against predefined configuration data that the sending ACH server software, ACH server software user, and data type are authorized for the fourth encrypted network tunnel 1822. If so, the network security software extracts the network packet payload and inserts it into a new packet that is forwarded to the destination port of the cash provider's bank server software. The associated financial institution software credits the cash provider's bank account. In each of the foregoing steps, the configuration data provides the necessary translation between the encrypted port and the destination port, as well as identifiers for the ACH server software, ACH server software user, and data type used by the network security software to perform authentications.

In addition to dispensing cash at the ATM 1800, portions of the ATM network may also be used to process transactions in a wearable payments ecosystem. A merchant customer may use a wearable computing device 1810 containing an embedded near-field communication chip to transmit credit payment data to a merchant payment processing computer. Network security software resident on the wearable computing device forms a fifth encrypted network tunnel 1824 analogously to the encrypted network tunnels described above and transmits a network packet containing a payment request payload and metadata analogously to the data transmitted through the encrypted tunnels described above. The merchant payment processing computer transmits the payment request data analogously to the ATM 1800 through a sixth encrypted network tunnel 1826, and the transaction processing engine 1802 and the retail customer's bank server function as described above. When the transaction is authorized by the retail customer's bank server 1804, encrypted packet data is transmitted through the network to complete the transaction at the merchant's payment processing computer 1812. In addition, the software resident on the ACH server 1806 transmits instructions to a cash provider's server 1828 to credit the cash provider's account.

Figure 19:
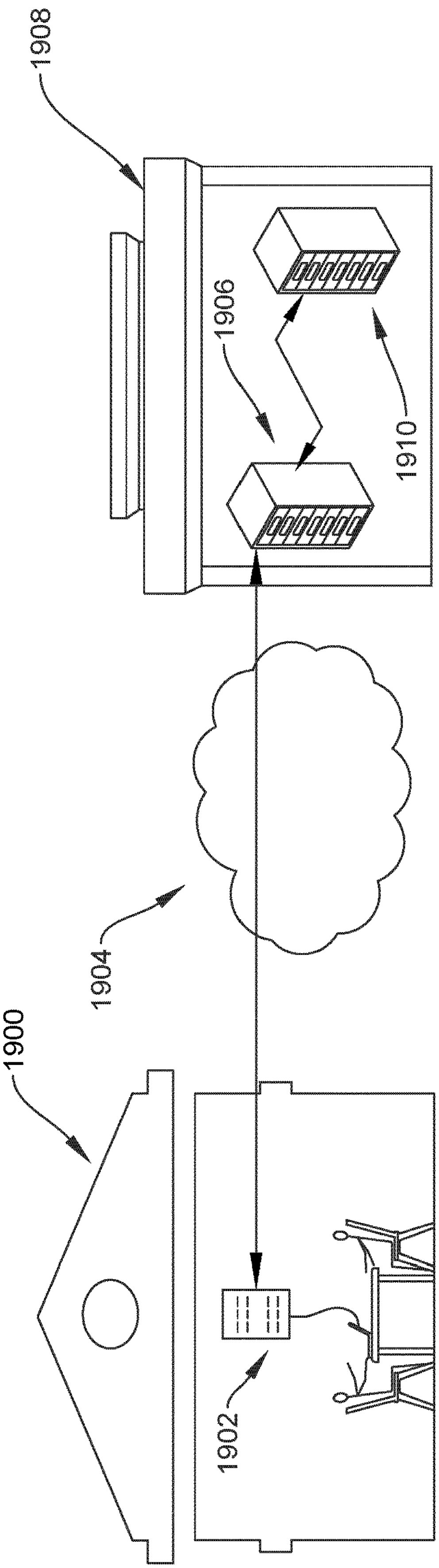
FIG. 19: Simplified schematic for loan application system.

In certain embodiments, for example, the methods, systems, products, communication management operations, software, modules, middleware, computing infrastructure and/or apparatus of the present disclosure may be employed (for example in an embodiment of the communication management operations) to manage network communications (for example, all port-to-network, port-to-port and network-to-port communications) between customers and a service bureau hosting confidential personal data, such as personal identity data (for example social security numbers), financial data, and/or or health data (for example data covered under the Health Insurance Portability and Accountability Act (HIPAA)). In FIG. 19, an applicant for a loan from a bank 1900 may provide personal financial information to a bank representative who inputs the data into the bank's electronic loan underwriting software resident on a bank server 1902. Each communication pathway between and among nodes may be one of the encrypted communication pathways and/or network tunnels managed by one or more of the communication management operations of the authorized type described herein and/or in one of the INCORPORATED REFERENCES.

The loan underwriting software resident on a bank server 1902 forms a secure connection over the public Internet 1904 according to Hyper Text Transfer Protocol Secure (HTTPS) protocol with a front end server 1906 at a credit bureau 1908 and transmits a request for the bank applicant's credit history. The front end server 1906 is equipped with first network security software which processes the request by extracting network packet payload data and chopping the data to neutralize any embedded malicious executable code. Once the data is chopped, second network security software resident on the front server 1906 forms an encrypted connection with third network security software resident on a database server 1910 of the credit bureau. The second and third network security software authenticate and authorize one another, the front end server 1906 and the database server 1910 devices, and the data protocol. The data protocol authorization requires that communications transmitted from the front end server 1906 to the database server 1910 consist of SQL queries to receive data, and communications transmitted from the database server 1910 to the front end server 1906 consist of data having a predetermined format. The second network security software creates a request for data based on the chopped payload and, upon receipt, passes the data through the HTTPS connection to the bank underwriting software resident on the bank server 1902.

Figure 20:
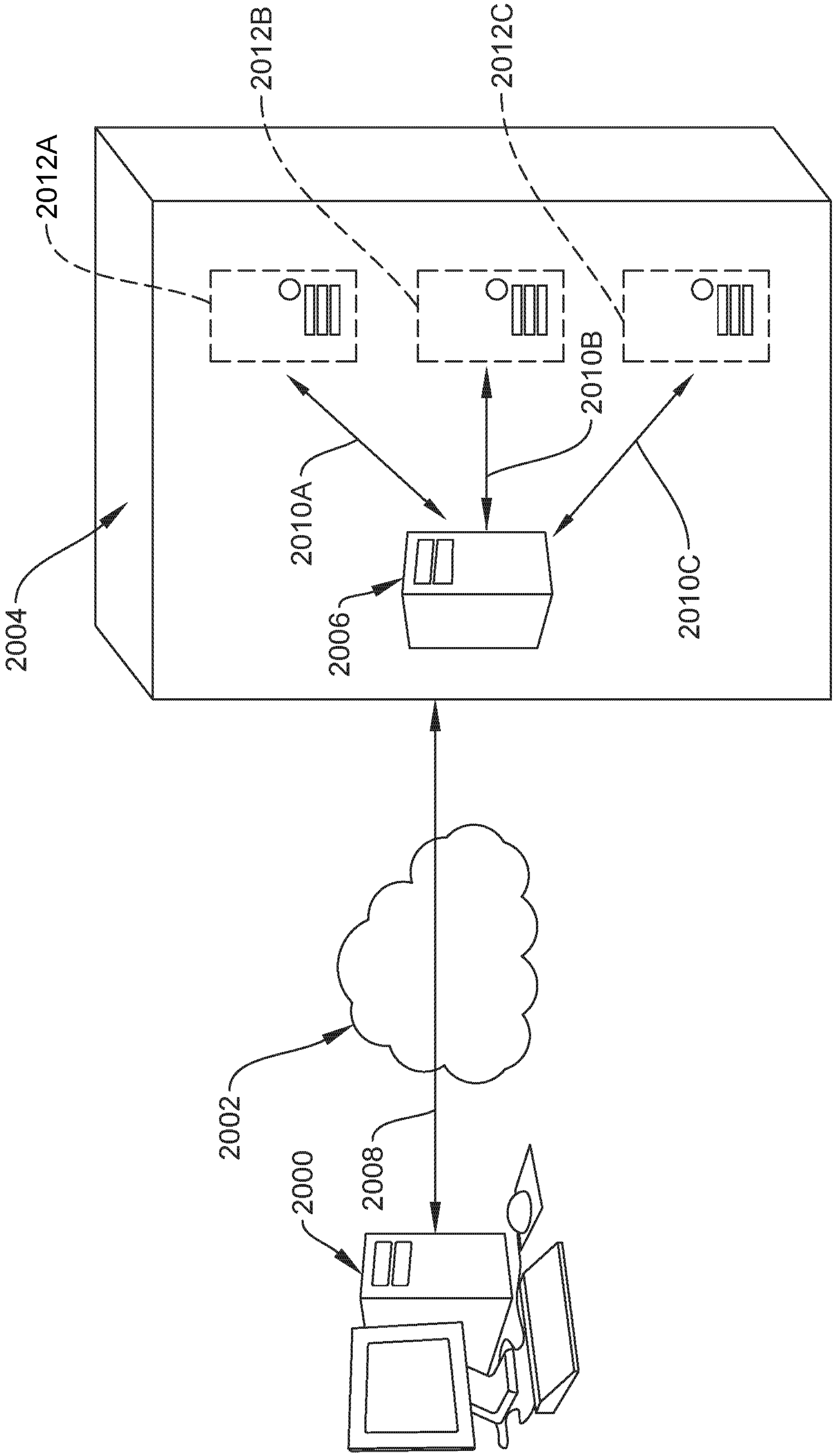
FIG. 20: Simplified schematic for a cloud computing ecosystem.

In certain embodiments, for example, the methods, systems, products, communication management operations, software, modules, middleware, computing infrastructure and/or apparatus of the present disclosure may be employed (for example in an embodiment of the communication management operations) to manage network communications (for example, all port-to-network, port-to-port and network-to-port communications) between, as shown in FIG. 20, a local node 2000 and, via the public Internet, 2002, cloud computing services at a server farm 2004. Each communication pathway between and among nodes may be one of the encrypted communication pathways and/or network tunnels managed by one or more of the communication management operations of the authorized type described herein and/or in one of the INCORPORATED REFERENCES.

In operation, all communications between the local node 2000 and the cloud computing services are transmitted through a dedicated bare-metal server 2006. The communications are managed by network security middleware present on the local node 2000 and on the dedicated bare-metal server 2006. The network security middleware negotiates an encrypted network tunnel 2008 by mutual authentication of devices based on shared secret device codes, process and process user identifiers on each device, and data protocol for the data being transmitted over the encrypted network tunnels. A different encrypted network tunnel is negotiated for each port-to-port communication, and the sending process, process user, and data protocol are authorized with each packet transmitted.

A communication path 2010 between the dedicated bare-metal server 2006 and virtual machines resident on cloud computing devices 2012 resident in the server farm 2004 are separately secured and are not protected by the above-noted network security middleware.

Certain embodiments may provide, for example, methods, systems, modules, or products for authorized communication, over a network, between plural nodes coupled to the network.

In certain embodiments, for example, the methods, systems, modules, or products may be implemented in hardware (for example may be implemented partially in hardware or entirely in hardware such as an application-specific integrated circuit). In certain embodiments, for example, the hardware may comprise programmable hardware (for example a field-programmable gate array). In certain embodiments, for example, the methods, systems, modules, or products may be implemented in software (for example entirely in software such as firmware, software resident on one or more nodes of the plural nodes, micro-code, etc.). In certain embodiments, for example, the software may be a computer-usable program stored in a computer-readable media (for example one or more of the non-transitory computer-readable storage media described below). In certain embodiments, for example, the methods, systems, modules, or products may be implemented in a combination of hardware and software.

In certain embodiments, for example, the network may comprise all or a portion of the public Internet, a Local Area Network (LAN) (for example a wired LAN, a wireless LAN, of a combination of the two), a Wide Area Network, a Metropolitan Area Network, a Campus Area Network, a Storage Area Network, a Personal Area Network, a System Area Network (or a Cluster Area Network), an Electronic Private Network, a Virtual Private Network (VPN), a Software-Defined Network, a Virtual Network, or a combination (or hybrid) of two or more of the foregoing networks. In certain embodiments, for example, the network may comprise a local area network supporting Ethernet communication over twisted pair cabling interconnected via one or plural switches and one or plural routers. In certain embodiments, for example, the network may comprise a local area network supporting wireless communication (for example wireless communication according to the IEEE 802.11 standard) using one or plural wireless antenna. In certain embodiments, for example, the network may comprise a local area network having an ARCNET, Token Ring, Localtalk, or FDDI configuration. In certain embodiments, for example, the network may comprise a local area network having Internet access. In certain embodiments, for example, the network may be exclusive of Internet access. In certain embodiments, for example, the network may transmit packet data by one or more propagated signals, for example an electrical signal, an optical signal, an acoustical wave, a carrier wave, an infrared signal, a digital signal, or a combination of two or more of the foregoing signals. In certain embodiments, for example, the network may be configured to transmit packet data (for example Ethernet frames) at a rate of at least 25 kilobits per second (Kbps), for example at least 100 Kbps, at least 250 Kbps, at least 500 Kbps, at least 1 million bits per second (Mbps), at least 10 Mbps, at least 25 Mbps, at least 50 Mbps, at least 100 Mbps, at least 250 Mbps, at least 500 Mbps, at least 1 gigabit per second (Gbps), at least 10 Gbps, at least 25 Gbps, at least 50 Gbps, or the network may be configured to transmit packet data at a rate of at least 100 Gbps. In certain embodiments, for example, the network may have a tree topology. In certain embodiments, for example, the network may be a mesh network.

In certain embodiments, for example, the network may connect plural nodes by routers and switches. In certain embodiments, for example, the plural nodes may comprise one or more of a network attached storage, a server (for example a file server, a mail server, a DNS server, a database server, a DHCP server, a VPN server, a VOIP server, an analytics server, or a portion of a cloud), a workstation (for example a desktop computer or a laptop computer), a mobile computing device (for example a smart phone, a smart tablet, or an embedded processor in an automobile), an input/output device (for example a fax machine, a printer, a scanner such as a bar code scanner, or a scanner/copier), a sensor (for example a temperature sensor, a moisture sensor, or a motion sensor), a camera (for example an IP camera), or a geolocation device (for example a Global Positioning System (GPS)-based device or a cellular triangulation device).

In certain embodiments, for example, the network may be a corporate communication network. In certain embodiments, for example, a portion of the plural nodes may be hosted at a corporate headquarters (for example central corporate databases, an email server, or a file backup storage). In certain embodiments, for example, all incoming traffic from the public Internet to the corporate network may be routed through the corporate headquarters. In certain embodiments, for example, a portion of the plural nodes may reside at one or more branch locations removed from the corporate headquarters. In certain embodiments, for example, the portion of the plural nodes may comprise one or more of a workstation or a sensor. In certain embodiments, for example, the one or more branch locations may communicate with the headquarters by a virtual private connection (for example the network may comprise a VPN). In certain embodiments, for example, the network may provide communication to one or plural mobile corporate assets (for example an automobile such as a rental car or a cargo truck). In certain embodiments, for example, the one or plural corporate assets may comprise one or more of an embedded processor and a sensor.

In certain embodiments, for example, the network may provide communication to, from, or within a hospital or a doctor's office. In certain embodiments, for example, the network may connect one or plural resources with databases, computers, devices, and/or sensors located in the hospital or doctor's office. In certain embodiments, for example, the one or plural resources may comprise a data center (for example a local or remote data center). In certain embodiments, for example, the network may comprise a VPN and/or plural LANs (for example a WAN). In certain embodiments, for example, the one or plural resources may comprise a cloud. In certain embodiments, for example, the one or plural resources may be connected to more than one hospital and/or doctor's office. In certain further embodiments, for example, the network may communicate patient records, patient monitoring data (for example real time data for a patient from a heart monitor being transmitted to a nurse's station), telemedicine data, billing and/or reimbursement data, financial data, equipment maintenance data, or a combination of two or more of the foregoing. In certain embodiments, for example, the network may provide communication between one or plural patient rooms and one or plural computing devices at a hospital or a doctor's office location (for example a nurse's station, a doctor's office, a medical supervisor's office, or a smart device (for example a smart phone running an app) used by a healthcare provider), a data hub (for example a local data hub or a data hub connected to the hospital by a private connection or the public Internet), a database, a smart device (for example a smart phone running an app) and/or the one or plural resources. In certain embodiments, for example, the recipient of the communication may be located within a LAN of the hospital or doctor's office. In certain embodiments, for example, the recipient of the communication may be remote from the LAN of the hospital or doctor's office. In certain embodiments, for example, the recipient of the communication may comprise a business partner (for example a service provider such as a billing service provider or a laboratory) of the hospital or doctor's office. In certain embodiments, for example, the communication may comprise sensor data from one or plural sensors in one of the one or plural patient rooms (for example the one or plural sensors may be an oxygen monitoring sensor, a heart monitor, a blood pressure sensor, or a medicine delivery sensor), a scanner (for example a scanner used to scan a barcode on a medicine container, such as a scanner used to scan a two-dimensional barcode in a hospital room), an input/output device (for example a keypad or a smartphone running an app), or a telemedicine device.

In certain embodiments, for example, the network may provide communication with one or plural automobiles (for example the network may provide communication in a smart car ecosystem). In certain embodiments, for example, one or plural devices in an automobile may be wirelessly connected to the Internet. In certain embodiments, for example, the network may provide communication between one or plural law enforcement-controlled devices and one or plural devices (for example a speedometer, a geolocator, or a kill switch) in (or on) the automobile. In certain embodiments, for example, the network may provide communication between one or plural equipment manufacturer interfaces (for example an interface to a web server or a cloud) and one or plural devices (for example a device configured to provide equipment diagnostic information) in (or on) the automobile. In certain embodiments, for example, the network may provide communication between one or plural urban planning agencies and one or plural devices (for example a geolocator or an onboard video camera) in (or on) the automobile. In certain embodiments, for example, the network may communicate weather information from a weather provider to a device (for example an onboard computer executing an autonomous operating system) in (or on) the automobile. In certain embodiments, for example, the network may communicate traffic information (for example traffic congestion information or traffic signal information) to a device (for example an onboard computer executing an autonomous operating system or a global positioning system software) in the automobile. In certain embodiments, for example, the network may communicate logistic information (for example cargo content, next requested stop information, destination location, or delivery status information) between a corporate database and a device in (or on) the automobile. In certain embodiments, for example, the network may communicate vehicle maintenance information (for example an oil change reminder) between a maintenance provider and a device in (or on) the automobile. In certain embodiments, for example, the network may transmit car payload data, car diagnostic data, business data, and/or infrastructure data between one or plural automobiles and a law enforcement agency, an urban planning agency, a weather provider, a traffic provider, a logistics provider, a car maintenance provider, or a combination of two or more of the foregoing.

In certain embodiments, for example, the network may provide communication in a chemical processing facility. In certain further embodiments, for example, the network may provide communication between a Supervisory Control and Data Acquisition (SCADA) system and a plurality of sensors, controllers, logic units, and controllers. In certain embodiments, for example, the network may communicate batch record data generated at one or plural stages of a chemical process.

In certain embodiments, for example, the network may provide communication among one or plural nodes for one or plural dedicated processes (for example one or plural industrial control processes or one or plural IoT applications). In certain further embodiments, for example, the network may provide communication for maintenance of the configuration of communications among the one or plural nodes. In certain embodiments, for example, the network may provide communications from one or plural dedicated processes or devices to a cloud (for example a storage cloud or an analytics engine).

In certain embodiments, for example, the network may provide communication in a factory. In certain embodiments, for example, the network may provide communication in a power station. In certain embodiments, for example, the network may provide communication in an offshore platform. In certain embodiments, for example, the network may provide communication for Automated Teller Machine (ATM) transactions. In certain embodiments, for example, the network may provide communication for credit card transactions. In certain embodiments, for example, the network may provide communication for monitoring IoT devices (for example monitoring IoT devices located in one or plural homes) for a warranty update, a maintenance indication, a service indication, a coupon, a cross-sale advertisement, an up-sale opportunity, or a combination of two or more of the foregoing. In certain embodiment, for example, the network may provide communication for database access (for example communication for access to a credit bureau database). In certain embodiments, for example, the network may provide communication to a DNS server.

In certain embodiments, for example, the network may transmit packets of binary data, signed or unsigned integer data, text (or string) data, or floating point data. In certain embodiments, for example, the network may transmit packets of analog readings (for example readings from an analog sensor). In certain embodiments, for example, the network may transmit packets of digital readings (for example readings from a digital sensor). In certain embodiments, for example, the network may transmit packets of sensor data (such as sensor readings, sensor state data, sensor warranty information, or sensor configuration data). In certain embodiments, for example, the network may transmit packets of voice data. In certain embodiments, for example, the network may transmit packets of image data. In certain embodiments, for example, the network may transmit packets of video data. In certain embodiments, for example, the network may transmit packets containing part or all of a file according to a protocol. In certain embodiments, for example, the file may be an executable file (for example an application program). In certain embodiments, for example, the file may be a parameters file, a data file, or configuration file (for example a file used to configure authorized communications). In certain embodiments, for example, the file may be a binary file (for example a binary file defining authorized communications). In certain embodiments, for example, the protocol may be a File Transfer Protocol (FTP). In certain embodiments, for example, the network may transmit packets of data for a remote control session. In certain embodiments, for example, the network may transmit packets of typed data (for example strongly typed data). In certain embodiments, for example, the network may transmit machine-to-machine communications. In certain embodiments, for example, the network may transmit packets of data objects. In certain embodiments, for example, the data objects may comprise a topic. In certain embodiments, for example, the network may transmit data packets comprising a publication (for example a publication being transmitted from a publisher to one or more subscribers). In certain embodiments, for example, the network may transmit data packets comprising metadata. In certain embodiments, for example, the metadata may comprise a connection state indicator (for example a connection state indicator indicating whether a port-to-port connection is open, closed, or in the process of being established). In certain embodiments, for example, the metadata may comprise a communication authentication parameter (for example a parameter used to authenticate a communicating device, communicating application, or communicating user). In certain embodiments, for example, the metadata may comprise a communication authorization parameter (for example a parameter used to authorize a communicating device, a communicating application, a communicating user, a data type, or a combination of two or more of the foregoing). In certain embodiments, for example, the metadata may comprise a data type or a data protocol parameter.

In certain embodiments, for example, the one or plural nodes may comprise an electronic device configured to send, receive, and/or forward information over the network. In certain embodiments, for example, the electronic device may be (or may host) a communication endpoint. In certain embodiments, for example, the one or plural nodes may comprise a device configured for network packet (for example Ethernet) communication, for example a computer, a computer system, a computing device, an edge device, part or all of a machine, a sensor, a controller, a microcontroller, a server, a client, a workstation, a host computer, a modem, a hub, a bridge, a switch, or a router configured for network packet communication. In certain embodiments, for example, the one or plural nodes may comprise a processor node equipped with a processor configured to process computer instructions. In certain embodiments, for example, the one or plural nodes may comprise a device configured for executing a network stack, for example a computer, a computer system, computing device, an edge device, part or all of a machine, a sensor, a controller, a microcontroller, a server, a client, a workstation, a host computer, a modem, a hub, a bridge, a switch, or a router executing a network stack.

In certain embodiments, for example, the one or plural nodes may comprise an electronic instruction execution system. In certain embodiments, for example, the one or plural nodes may comprise a processor (for example a central processing unit (CPU)), a microprocessor (for example a single-board microprocessor), a programmable processor (for example a field-programmable gate array (FPGA), an application specific integrated circuit (ASIC), or a virtual machine.

In certain embodiments, for example, the CPU may have an x86 architecture. In certain embodiments, for example, the CPU may be a 4-bit processor such as an Intel 4004 processor. In certain embodiments, for example, the CPU may be an 8-bit processor, for example an Intel 8008 processor, an Intel 8080 processor, or an Intel 8085 processor. In certain embodiments, for example, the CPU may be a bit-slice processor, for example a bit-slice processor selected from the Intel 3000 bit-slice processor family. In certain embodiments, for example, the CPU may be a 16-bit processor, for example a processor selected from Intel MCS-86 processor family such as an Intel 8086 processor, an Intel 8088 processor, an Intel 80186 processor, an Intel 80188 processor, or an Intel 80286 processor. In certain embodiments, for example, the CPU may be a 32-bit processor, for example a non-x86 processor such as an iAPX 432 processor, an i960 processor, an i860 processor, or an XScale processor. In certain embodiments, for example, the CPU may be a 32-bit processor, for example an Intel 80386 range processor such as an Intel 80386DX processor, an Intel 80386SX processor, an Intel 80376 processor, an Intel 80386SL processor, or an Intel 80386EX processor. In certain embodiments, for example, the CPU may be a 32-bit processor, for example an Intel 80486 range processor such as an Intel 80486DX processor, an Intel 80486SX processor, an Intel 80486DX2 processor, an Intel 80486SL processor, or an Intel 80486DX4 processor. In certain embodiments, for example, the CPU may be based on a 32-bit Intel P5 microarchitecture, for example an Intel Pentium processor or an Intel Pentium processor with MMX Technology. In certain embodiments, for example, the CPU may be based on a 32-bit P6/Pentium M microarchitecture, for example an Intel Pentium Pro processor, an Intel Pentium II processor, an Intel Celeron processor, an Intel Pentium III processor, an Intel Pentium II Xeon processor, an Intel Pentium III Xeon processor, an Intel Pentium III Coppermine-based Celeron processor, an Intel Pentium III Tualatin-based processor, an Intel Pentium M processor, an Intel Celeron M processor, an Intel Core processor, or an Intel Dual-Core Xeon LV processor. In certain embodiments, for example, the CPU may be based on a 32-bit NetBurst microarchitecture, for example an Intel Pentium 4 processor, an Xeon processor, an Intel Mobile Pentium 4-M processor, an Intel Pentium 4 EE processor, or an Intel Pentium 4E processor. In certain embodiments, for example, the CPU may be 64-bit IA-64 processor, for example an Intel Itanium processor or an Intel Itanium 2 processor. In certain embodiments, for example, the CPU may have a 64-bit NetBurst microarchitecture, for example an Intel Pentium 4F processor, Intel Pentium D processor, Intel Pentium Extreme Edition processor, or an Intel Xeon processor. In certain embodiments, for example, the CPU may have a 64-bit Core microarchitecture, for example an Intel Core 2 processor, an Intel Pentium Dual-Core processor, an Intel Celeron processor, or an Intel Celeron M processor. In certain embodiments, for example, the CPU may have a 64-bit Nehalem microarchitecture, for example an Intel Pentium processor, an Intel Core i3 processor, an Intel Core i5 processor, an Intel Core i7 processor, or an Intel Xeon processor. In certain embodiments, for example, the CPU may have a 64-bit Sandy Bridge/Ivy Bridge microarchitecture, for example an Intel Celeron processor, an Intel Pentium processor, an Intel Core i3 processor, an Intel Core i5 processor, or an Intel Core i7 processor. In certain embodiments, for example, the CPU may have a 64-bit Haswell microarchitecture. In certain embodiments, for example, the CPU may have a Broadwell microarchitecture, for example an Intel Core i3 processor, an Intel Core i5 processor, or an Intel Core i7 processor. In certain embodiments, for example, the CPU may have a Skylake microarchitecture, for example an Intel Core i3 processor, an Intel Core i5 processor, or an Intel Core i7 processor. In certain embodiments, for example, the CPU may have a Kaby Lake microarchitecture. In certain embodiments, for example, the CPU may have a Coffee Lake microarchitecture. In certain embodiments, for example, the CPU may have a Cannonlake microarchitecture. In certain embodiments, for example, the CPU may Intel Tera-Scale processor. In certain embodiments, for example, the node may comprise a microcontroller. In certain embodiments, for example, the microcontroller may be an Intel 8048 microcontroller, an Intel 8051 microcontroller, an Intel 80151 microcontroller, an Intel 80251 microcontroller, or a microcontroller selected from the MCS-96 family of microcontrollers.

In certain embodiments, for example, the CPU may have an ARM architecture. In certain embodiments, for example, the CPU may have an ARMv1 architecture. In certain embodiments, for example, the CPU may have an ARMv2 architecture. In certain embodiments, for example, the CPU may have an ARMv3 architecture. In certain embodiments, for example, the CPU may have an ARMv4 architecture. In certain embodiments, for example, the CPU may have an ARMv4T architecture. In certain embodiments, for example, the CPU may have an ARMv5TE architecture. In certain embodiments, for example, the CPU may have an ARMv6 architecture. In certain embodiments, for example, the CPU may have an ARMv6-M architecture. In certain embodiments, for example, the CPU may have an ARMv7-M architecture. In certain embodiments, for example, the CPU may have an ARMv7E-M architecture. In certain embodiments, for example, the CPU may have an ARMv8-M architecture. In certain embodiments, for example, the CPU may have an ARMv7-R architecture. In certain embodiments, for example, the CPU may have an ARMv8-R architecture. In certain embodiments, for example, the CPU may have an ARMv7-A architecture. In certain embodiments, for example, the CPU may have an ARMv8-A architecture. In certain embodiments, for example, the CPU may have an ARMv8.1-A architecture. In certain embodiments, for example, the CPU may have an ARMv8.2-A architecture. In certain embodiments, for example, the CPU may have an ARMv8.3-A architecture.

In certain embodiments, for example, the node may comprise a Digital Signal Processor (DSP) (for example the DSP may be embedded on a CPU or may be connected to a CPU). In certain embodiments, for example, the DSP may be a C6000 series DSP produced by Texas Instruments. In certain embodiments, for example, the CPU may be a TMS320C6474 chip. In certain embodiments, for example, the CPU may comprise a DSP having a StarCore architecture, for example MSC81xx chip produced by Freescale such as a MSC8144 DSP. In certain embodiments, for example, the CPU may comprise a multi-core multi-threaded DSP such as a multi-core multi-threaded processor produced by XMOS. In certain embodiments, for example, the DSP may be a CEVA-TeakLite DSP or a CEVA-XC DSP produced by CEVA, Inc. In certain embodiments, for example, the DSP may be a SHARC-based DSP produced by Analog Devices. In certain embodiments, for example, the DSP may be an embedded DSP, for example a Blackfin DSP. In certain embodiments, for example, the DSP may be based on TriMedia VLIW technology, for example a DSP produced by NXP Semiconductors. In certain embodiments, for example, the DSP may support fixed-point arithmetic. In certain embodiments, for example, the DSP may support floating-point arithmetic.

In certain embodiments, for example, the node may comprise a Graphics Processing Unit (GPU) (for example the GPU may be embedded on a CPU or may be connected to a CPU). In certain embodiments, for example, the GPU may be a gaming GPU such as GeForce GTX produced by nVidia, a Titan X produced by nVidia, a Radeon HD produced by Advanced Micro Devices (AMD), or a Radeon HD produced by Advanced Micro Devices (AMD). In certain embodiments, for example, the GPU may be a cloud gaming GPU such as a Grid produced by nVidia, or a Radeon Sky produced by Advanced Micro Devices (AMD). In certain embodiments, for example, the GPU may be a workstation GPU such as a Quadro produced by nVidia, a FirePro produced by AMD, or a Radeon Pro produced by AMD. In certain embodiments, for example, the GPU may be a cloud workstation such as a Tesla produced by nVidia, or a FireStream produced by AMD. In certain embodiments, for example, the GPU may be an artificial Intelligence cloud GPU such as a Radeon Instinct produced by AMD. In certain embodiments, for example, the GPU may be an automated/driverless car GPU such as a Drive PX produced by nVidia.

In certain embodiments, for example, the CPU may comprise an AMD Am2900 series processor, for example an Am2901 4-bit-slice ALU (1975), an Am2902 Look-Ahead Carry Generator, an Am2903 4-bit-slice ALU, an with hardware multiply, an Am2904 Status and Shift Control Unit, an Am2905 Bus Transceiver, an Am2906 Bus Transceiver with Parity, an Am2907 Bus Transceiver with Parity, an Am2908 Bus Transceiver with Parity, an Am2909 4-bit-slice address sequencer, an Am2910 12-bit address sequencer, an Am2911 4-bit-slice address sequencer, an Am2912 Bus Transceiver, an Am2913 Priority Interrupt Expander, or an Am2914 Priority Interrupt Controller. In certain embodiments, for example, the CPU may comprise an AMD Am29000 series processor, for example, an AMD 29000, an AMD 29027 FPU, an AMD 29030, an AMD 29050 with on-chip FPU, or an AMD 292xx embedded processor. In certain embodiments, for example, the processor may be an AMD Am9080, an AMD Am29X305, or an AMD Opteron A1100 Series.

In certain embodiments, for example, the CPU may be a Motorola 68451, a MC88100, a MC88110, a Motorola 6800 family, a Motorola 6809, a Motorola 88000, a Motorola MC10800, or a Motorola MC14500B processor. In certain embodiments, for example, the CPU may be a Motorola PowerPC processor, for example a PowerPC 600, a PowerPC e200, a PowerPC 7xx, a PowerPC 5000, a PowerPC G4, or a PowerQUICC processor.

In certain embodiments, for example, the one or plural nodes may comprise one or more processors coupled to one or more other components, inclusive of one or more non-transitory memory, one or more user input/output devices (for example a keyboard, a touchscreen, and/or a display), one or more data buses, and one or more physical interfaces to the network. In certain embodiments, for example, the one or more physical interfaces may comprise an Ethernet interface (for example a copper or fiber interface), a wireless interface (for example a wireless interface according to the IEEE 802.11 standard), a wireless broadband interface (for example a "Wi-Max" interface according to the IEEE 802.16 standard), a wireless interface according to an IEEE 802.15.4-based standard (for example an interface according to the Zigbee specification), a Bluetooth interface (for example a Bluetooth interface according to the IEEE 802.15.1 standard), a modem, or a combination of two or more of the foregoing interfaces. In certain embodiments, for example, the one or more physical interfaces may comprise an FPGA programmed for high speed network processing. In certain embodiments, for example, the one or more physical interfaces (for example an Ethernet interface or one of the aforementioned wireless interfaces) may have a data transfer rate of 10 Mbps, 100 Mbps, 1 Gbps, 10 Gbps, or 100 Gbps. In certain embodiments, for example, the one or more physical interfaces may have a data transfer rate of at least 10 Mbps, for example at least 100 Mbps, at least 1 Gbps, at least 10 Gbps, or the one or more physical interfaces may have a data transfer rate of at least 100 Gbps. In certain embodiments, for example, the one or more physical interfaces may have a data transfer rate of less than 100 Gbps, for example less than 10 Gbps, less than 1 Gbps, less than 100 Mbps, or the one or more physical interfaces may have a data transfer rate of less than 10 Mbps.

In certain embodiments, for example, the one or plural nodes may comprise computer-readable media configured to store information (for example data or computer-readable instructions). In certain embodiments, for example, the computer-readable media may comprise non-transitory computer-readable storage media. In certain embodiments, for example, the non-transitory computer-readable storage media may comprise a magnetic disk, an optical disk, random access memory (RAM), read-only memory, a flash memory device, or phase-change memory. In certain embodiments, for example, the non-transitory computer-readable storage media may be a fixed memory device, such as a hard drive. In certain embodiments, for example, the non-transitory computer-readable storage media may comprise one or plural device drives. In certain embodiments, for example, one or plural device drives may be selective from the group consisting of a parallel IDE drive, a serial EIDE drive, a SCSI based drive (for example Narrow, UW, LVD, etc.), an external USB/Flash drive; an IOMEGA Zip drive, a Jazz drive, a CD/DVD, a CD-R/RW, a DVD-R/RW drive, or a combination of two or more of the foregoing device drives. In certain embodiments, for example, the non-transitory computer-readable storage media may be a removable memory device, such as a diskette or a Universal Serial Bus (USB) flash drive. In certain embodiments, for example, the one or plural nodes (for example all of the plural nodes) may be exclusive of removable computer-readable media.

In certain embodiments, for example, the methods, systems, modules, or products may be implemented in software that is stored in one or more of the aforementioned computer-readable media and, when ready to be utilized, loaded in part or in whole (for example, into RAM) and executed by a CPU.

In certain embodiments, for example, the one or plural nodes may communicate (for example internally, or for example with each of another one or more of the plural nodes over the network) using transitory computer-readable communication media. In certain embodiments, for example, the transitory computer-readable communication media may comprise a propagated signal, for example an electrical signal, an optical signal, an acoustical wave, a carrier wave, an infrared signal, and/or a digital signal.

In certain embodiments, for example, the one or plural nodes may comprise an operating system defining a kernel (for example the one or plural nodes may be plural nodes, wherein a first node of the plural nodes comprises a first operating system and a second node of the plural nodes comprises a second operating system, the first operating system the same or different from the second operating system). In certain embodiments, for example, the operating system may be selected from the group consisting of 2K, 86-DOS, A/UX, Acados, ACP (Airline Control Program), AdaOS, ADMIRAL, Adrenaline, aerolitheOS, Aimos, AIOS, AIX, AIX/370, AIX/ESA, Aleris Operating System, Allegro, AllianceOS, Alpha OS, Alto OS, Amiga OS, Amoeba, Amstrad, AMX RTOS, AneedA, AngelOS, Antarctica, AOS/VS, Aperios, Apollo Domain/OS, ApolloOS, Apostle, Archimedes OS, AROS, ARTOS, Asbestos, Athena, AtheOS, AtomsNet, Atomthreads, AuroraOS, AutoSense OS, B-Free, Bada, BAL, Banyan VINES, Basic Executive System, BelA, BeOS, Beowulf, BKY, BlueEyedOS, BOS, BOS1810, BoxOS, bpmk, BPMK, BRiX, BS600, BS2000, BSDi, BugOS, Calmira, CCP (Computer Control Program), CDOS, Cefarix, C Executive, Chaos, ChibiOS, Chimera, Chippewa OS, Choices, Chorus, Cinder OS, Cisco IOS, Clicker32, CMW+ (SCO), COBRA, Coherent, CONSENSYS, Contiki, ConvexOS, Cos, Cosy, Counterpoise, CP/K, CP/M, CP/NET, CP/Z, CPF (Control Program Facility), Cromix, Cronus, CSOC, CTOS, CTSS, CX/SX, Cygnus, DAC, Darwin, Data General, DC/OSx, DCP, Degenerate OS, Delitalk, DELL UNIX, Deming OS, DEMOS, DesktopBSD, DESKWORK, DG/UX, DIGITAL UNIX, dingOS, DK/DOS, DLD, DNIX, Domain OS, DOS, DOS2, DOS 50, Dosket, drex, DR-DOS, Drops, Drywell OS, DS-OS, DTOS, DVIX, DYNIX Unix (Sequent), ECL-3211, eComStation, eCos, EduOS, EGOS, ekkoBSD, Elate, ELKS, Elysium, EOS, EP/IX, EPOC, ERaMS, ERIKA, EROS, ESER, ESIX, ESKO, Eumel, EuNIX, Exopc, ExOS, Express, Famos, FDOS, Fiasco, Flamethrower, FlashOS, FlexOS, FlingOS, FLP-80 DOS, Flux, Flux-Fluke-Flask, FMS, Forth, FortiOS, FreeBSD, FreeDOS, FreeDOWS, FreeVMS, Frenzy, Fuchsia, FullPliant, FunatixOS, FxOS, GazOS, GCOS, GECOS, GeekOS, Gemini Nucleus, Genera, GEORGE, GEOS, GM OS, GNU Hurd, GNUstep, Go, Goah, Gould OS, Grasshopper, GUIDE, HA-MSP, Hactar, Harmony, Haiku, Helios, HES, Hive, HOPE, HP-87 OS, HP-UX, HT-11, Hurd, Hurricane, HydrixOS, i5/OS, IBM PC-DOS, IBSYS, Icaros Desktop, ICL Unix, Immunix, Inferno, INMOS, INTEGRITY RTOS, Iridium OS, IRIX, iRMX, IRTS, ISC (Interactive), ISIS, ISSL, ITRON, ITS, JAMB, JavaOS, Jbed, JeniOS, Jeo-OS, Jibbed, JOS, JTMOS, JUNOS, JxOS, KAOS, Kaspersky OS, Katix, Kea, Kerberos, KeyKOS, KolibriOS, KOS, KRONOS, KROS, KRUD, Kylin, L4, L13Plus, LainOS, LAN Manager, LDOS, LegOS, IeJOS, Linux, Lisa OS, LTSS, LynxOS, Mach, Mac OS 8, Mac OS 9, Mac OS X, MANOS, MaRTE OS, Maruti, Masix, Master, Maverick OS, MBOS, MCP (Master Control Program), MDOS, MenuetOS, Merlin, Micripm, MICRODOS, MicroVMS, MidnightBSD, MikeOS, Minima, Minix, Minoca OS, Minux, Miranda, Miray pnOS, MITE 80/IOS, MK++, ML, ModulOS, Monitor, MOPS, MorphOS, MOS, MOSIX, MPE/iX, MPE OS, MRT1700, MS-DOS, MSOS, MT809, Multics, Mungi, MUTOS, muVinix, MVS, Möbius, NachOS, NCR Unix, NEC DOS, NECUX, Nemesis, NeOS, NetBSD, Netware, NewDeal, NEWDOS, NewOS, NEWS-OS, Newton OS, NexentaOS, NeXTStep, NextworksOS, Nexus, Nimbus, NintendOS, Node OS, NOS, NOS/BE, NOS/VE, Nova, Novell DOS, NS/GDOS, NSK, NTDIOS, Nucleus, Oaesis, Oasis, Oberon, Objex, Odin, Omega 4, OnCore, On Time RTOS-32, Opal, OpenBeOS, OpenBSD, OpenDarwin, OpenRavenscar, OpenServer, OpenSolaris, OpenVision, OpenVMS, OppcOS, OS-2, OS-9, OS-C, OS/2, OS/2 Warp, OS/9, OS/360, OS/390, OS/400, OS/ES, OS/M, OS4, osCAN, OSE, OSF/1, Osx, OSx16, OZONE, PAKOS, Palm OS, PAPL, Paramecium, ParixOS, Paros, PaulOS, P BASIC, PC-BSD, PC-DOS, PC-MOS/386, PC/M-System, PDOS, PEACE, Pebble, Pegasos, PETROS, Phantom OS, Phos, PikeOS, PIOS, PizziOS, Plan 9, Plex86, PM_SZ_OS, PocketPC 2003, PowerMAX, PowerOS, PowerSX, PowerUX, ProDOS, Prologue, Proolix, ProOSEK, PSOS, pSOSystem, PSU, PTS DOS, PublicOS, PURE, QDOS, QNX, Quadros, RadiOS, RBASIC, RCOS, RCOSjava, RDOS, ReactOS, REAL-32, Realogy Real Time Architekt, REBOL-IOS, Redox, ReWin, REX-80/86, REXX/OS, RHODOS, RISC OS, RMOS, RMS 68k, Roadrunner, Rocket, Rome, ROME, RSTS/E, RSX-11, RT-11, RTEL, RTEMS, RT Mach NTT, rtmk, RTMX, RTOS-32, RTOS-UH, RTS-80, RTX, RTXDOS, RxDOS, S.Ha.R.K, Sanos, SCO OpenServer, SCOPE, ScorchOS, ScottsNewOS, Scout, SCP, SCP (System Control Program), SCP-IBE, Self-R, SeOS, Sequent, SEVMS VAX, Shark, SharpOS, ShawnOS, SIBO, Sinclair, Sinix, SINTRAN III, SkyOS, Slikware, sMultiTA, SOBS, Solaris, Solar OS, Solbourne UNIX, SOS, SP6800, Spice, Spice/MT, SPIN, Spinix, SPDX, Spring, Squeak, SSP (System Support Program), STAR-OS, STARCOS, Starplex II OS, Sting, StreamOS, Subsump, SUMO, SunMOS, SunOS, SunriseOS, SuperDOS, SVM, SVR, Switch OS, Syllable, Symbian OS, SymbOS, Symobi, Symphony OS, Synapse, System 6 (Mac OS), System 7 (Mac OS), System V Release, Tabos, TABOS, TaIOS, TAOS, TENEX, THE, Thix, ThreadX, ThrillOS, TI-99 4A, TinyOS, TIS APL, TNIX, TOPS-10, TOPS-20, Topsy, Tornado, Torsion, TOS, TPF (Transaction Processing Facility), TriangleOS, Tripos, TRON, TRS-DOS, Tru64 UNIX, TSX-32, TUD:OS, TUNES, TurboDOS, UberOS, UCSD-p, UDOS, Ultrix, UMDS, UMN, UNI/OS, Unicos, UNICOS/Ic, Uni FLEX, Unisys U5000, Unix System, UnixWare, Ununurium, USIX, UTS, UXP/V, V2 OS, Vapour, Veloce OS3, VERSAdos, VisiOn, Visopsys, Visual Network OS, VM/ESA, VM/VSE, VME, VMS, VRTX/8002, VRTX/OS, VSE, VSOS, VSTa, VTOS, VxWorks, WEGA, WildMagnolia, Windows 7, Windows 8, Windows 10, Windows 95, Windows 98, Windows 98 SE, Windows 2000, Windows Automotive, Windows CE, Windows ME, Windows NT, Windows Server 2003, Windows Server 2003

R2, Windows Server 2008, Windows Server 2008 R2, Windows Vista, Windows XP, WinMac, WIZRD, x-kernel, XAOS, XDOS, Xenix, Xinu, xMach, XOS, XTS, Yamit, Yaxic, Yoctix, z-VM, z/OS, Z9001-OS, ZealOS, Zephyr, Zeta, Zeus Zilog, zeVenOS, ZMOS, ZotOS, and ZRTS 8000. In certain embodiments, for example, the operating system may be a Linux distribution consisting of the group selected from 3Anoppix, 64 Studio, Absolute Linux, AbulEdu, Adamantix, ADIOS, Adler Linux, Admelix, Admiral Linux, AGNULA, Alcolix, Alinex, aLinux, AliXe, Alpine Linux, ALT Linux, amaroK Live, Amber, and Linux, Android, Android Things, Ankur, Annvix, AnNyung, Anonym.OS, ANTEMIUM, antiX, APODIO, Apricity OS, aquamorph, Arabian, ArcheOS, Archie, Arch Linux, Ark Linux, Armed Linux, ArtistX, Arudius, AsianLinux, Asianux, ASork, ASP Linux, Astaro, AsteriskNOW, Athene, ATMission, Atomix, Augustux, Aurora, Aurox, AUSTRUMI, B2D, BabelDisc, BackTrack, Baltix, Bayanihan, BearOps Linux, BeatriX Linux, Beehive Linux, BeleniX, Bent Linux, Berry Linux, BestLinux, BIG LINUX, BinToo, BioBrew, Bioknoppix, Black Cat Linux, blackPanther, BLAG, Blin Linux, Bloody Stupid, Blue Cat Linux, BlueLinux, Bluewall, Bodhi Linux, Bonzai Linux, Bootable Cluster CD, Brillo, Buffalo, BugnuX, BU Linux, Burapha, ByzantineOS, Caixa Mágica, Caldera Linux, cAos, Carl.OS, Catix, CCux, CDlinux, Censornet, CentOS, Chakra, Chrome OS, Chromium OS, cI33n, ClarkConnect, ClearOS, cLIeNUX, Clonezilla Live, Clusterix, clusterKNOPPIX, Co-Create, CobaltOS, College, Commodore OS Vision, Condorux, Conectiva Linux, Cool Linux CD, CoreBiz, Coreboot, Corel Linux, CoreOS, Coyote, Craftworks Linux, CrunchBang, CrunchEee, CRUX, Cub Linux, Catix, Damn Small Linux, Damn Vulnerable Linux, Danix, DARKSTAR, Debian GNU/Linux, Debris Linux, Deep-Water, Deft Linux, DeLi, Delix Linux, Dell Networking OS10, Denix, Devil, Dizinha, DLD, DNA-Linux, Draco Linux, Dragon Linux, Dragora, DRBL live, Dreamlinux, Dualix, Dynabolic, dyne:bolic, Dzongkha, E/OS LX Desktop, Eadem, Eagle, eAR OS, easyLinux, Easy Peasy, easys, Edubuntu, eduKnoppix, EduLinux, Ehad, Eisfair, Elbuntu, ELE, eLearnix, elementary OS, ELF, Elfstone Linux, ELinOS, Elive, ELP, ELX, Embedix, Endian, Endless OS, EnGarde, ERPOSS, ESware, Euronode, EvilEntity Linux, Evinux, EzPlanet One, FAMELIX, FaunOS, Feather, Featherweight, Fedora, Fermi, ffsearch-LiveCD, Finnix, Firefox OS, Fiubbix, Flash, FlightLinux, Flonix, Fluxbuntu, FluxFlux-Eee, Foresight, FoRK, Formilux, FoX Desktop, Freduc, free-EOS, Freedows, Freeduc, FreeNAS, Freepia, FreeSBIE, Freespire, FreevoLive, Freezy, Frugalware, FTOSX, FusionSphere, GalliumOS, GeeXboX, Gelecek, GenieOS, Gentoo, Gentoox, GEOLivre, Gibraltar, Ging, Giotto, Glendix, gNewSense, GNIX, Gnoppix, GNUbie Linux, gnuLinEx, GNUstep, GoblinX, GoboLinux, GoodGoat Linux, gOS (Google OS), GParted, Grafpup, Granular Linux, grml, Guadalinex, Guix, GuLIC-BSD, H3Knix, Haansoft, Hakin9, Halloween Linux, Hancom, Hedinux, Helix, Heretix, Hikarunix, Hiweed, Holon, HOLON Linux, Honeywall, How-Tux, Hubworx, iBox, ICE Linux, Icepack Linux, IDMS, Igelle, Igel Linux, Ignalum, Impi, Independence, IndLinux, Instant WebKiosk, IPCop, JBLinux, JeOS, Jolicloud, JoLinux, Joli OS, Julex, Jurix Linux, Juxlala, K-DEMar, K12LTSP, Kaboot, Kaella, Kaladix Linux, Kalango, Kali Linux, KANOTIX, Karamad, KateOS, Kinneret, Kiwi Linux, Klax, Klikit-Linux, K Linux, kmLinux, knopILS, Knoppel, Knopperdisk, Knoppix, Knoppix 64, KnoppiXMAME, KnoppMyth, KnoSciences, Kodibuntu, Komodo, Kongoni, Korora, KRUD, Kubuntu, Kuki Linux, Kurumin, Kwort, L.A.S., Leetnux, Lerntux, LFS, LG3D, LibraNet Linux, LibreCMC, LIIS, Lin-X, Linare, LindowsOS, Lineox, LinEspa, LinnexOS, Linpus, Linspire, Linux+ Live, Linux-EduCD, Linux4One, Linux Antarctica, Linux by LibraNet, LinuxConsole, Linux CentOS (for example Linux CentOS 7), Linux DA OS, LinuxMCE, Linux Mint, LINUXO, LinuxOne, LinuxPPC, LinuxTLE, Linux XP, Litrix, LiveCD Router, LiveKiosk, LiVux, LLGP, LliureX, LNX-BBC, Loco, Lormalinux, I OS, LST Linux, LTSP, LUC3M, Luit, Lunar, LuteLinux, LXDEbian, Lycoris Desktop/LX, m0n0wall, Mageia, Magic, Mandrake, Mandriva, Mangaka, MAX, MaxOS, Mayix, MCNLive, Mediainlinux, Media Lab, MeeGo, MEPIS, MicroOS, MiniKazit, Minislack, Miracle, MirOS, MkLinux, Moblin, Mockup, MoLinux, Momonga, Monoppix, Monte Vista Linux, MoonOS, Morphix, MostlyLinux, MoviX, MSC, Mulimidix, muLinux, Multi Distro, Muriqui, MURIX, Musix, Mutagenix, MX Linux, Myah OS, myLinux, Nasgaïa, Natures, Navyn OS, NepaLinux, NetMAX DeskTOP, NetSecL, Netstation Linux, Netwosix, Nexenta, Niigata, NimbleX, Nitix, NoMad Linux, Nonux, Nova, NST, nUbuntu, Nuclinux, NuxOne, O-Net, OcNOS, Ocularis, Ola Dom, Omega, Omoikane, Onebase Linux, OpenArtist, OpenLab, OpenLinux, OpenLX, OpenMamba, OpenMediaVault, OpenNA, Open ProgeX, Openwall, Operator, Oracle Linux, Oralux, Overclockix, P!tux, PAIPIX, paldo, Parabola, ParallelKnoppix, Pardus, Parsix, Parsix GNU/Linux, PC/OS, PCLinuxOS, Peanut Linux, PelicanHPC, Penguin Sleuth, Pentoo, Peppermint, Pequelin, pfSense, Phaeronix, Phantomix, Phat Linux, PHLAK, Pie Box, Pilot, Pingo, Pingwinek, Pioneer Linux, Plamo, PLD, PLoP Linux, Pocket Linux, Poseidon, POSTed, Power Desktop, Pozix Linux, pQui, Privatix, Progeny, ProteanOS, ProTech, PUD, Pulsar Linux, Puppy, Puredyne, QiLinux, Qimo, Qplus, Quantian, Qubes OS, Raidiator, Raspbian, Red Flag, Red Hat, Red Hat Enterprise Linux (for example Red Hat Enterprise Linux version 7), RedHawk Linux, Redmond Linux, redWall Firewall, Remix OS, Repairlix, RIoT, RIP, ROCK, Rock Linux, Rocks Cluster, ROOT, ROSA, ROSLIMS, rPath, RR4 Linux, RTLinux, Rubix, Sabayon, Sabily, Sailfish OS, Salgix, Salix OS, Salvare, SAM, Samhain Linux, Santa Fe, Sauver, SaxenOS, SCI-.Linux, Scientific Linux, SCO Linux, ScrudgeWare, Securepoint, Security-Enhanced Linux ("SELinux"), Sentry Firewall, Shift Linux, Shinux, SimplyMEPIS, Skolelinux, Slack/390, Slackintosh, Slackware, Slamd64, SLAMPP, slax, SliTaz GNU/Linux, SLS, SLYNUX, SME Server, SmoothWall, SnapGear Embedded Linux, SNAPPIX, Snøfrix, SoL (Server optimized Linux), SONiC, Sorcerer, SOT Linux, Source Mage, Spectra Linux, SphinxOS, Splack, Splashtop, SprezzOS, Stampede, StartCom, STD, Stormix, StreamBOX, StressLinux, STUX, STX, Subgraph OS, Sugar On A Stick, SuliX, Sun Linux, Sun Wah, Super-Gamer, SuSE, Symphony OS, System Rescue, T2, TA-Linux, Tablix, Tails (The Amnesic Incognito Live System), Tao Live, Taprobane, TechLinux, Thinstation, Tilix, Tinfoil Hat Linux, Tiny Core Linux, Titan LEV, Tizen, tomsrtbt, Tomukas, Toophpix, Topologilinux, Toutou, Trinity, Trisquel GNU/Linux, Trixbox, Troppix, Trustix, Trustverse, Truva, TumiX, TupiServer, Tuquito, Turbolinux, Turkix, Ubuntu, UbuntuME, Ubuntu Netbook Remix, Ubuntu Privacy Remix, uClinux, Ufficio Zero, UHU-Linux, uL, Ulteo, Ultima, Underground, Unifix Linux, uOS, Urli OS, User-Linux, UTILEX,Ututo, Ututo XS, Vector, Vidalinux, VideoLinux, Vine, VLOS, VNLinux, Voltalinux, Volumio, War-Linux, Wazobia, Webfish Linux, WHAX, White Box, Whitix, WIENUX, Wind River Linux, WinLinux 2001, WinSlack, Wolvix, WOMP!, X-evian, X/OS, Xandros, Xarnoppix, Xenoppix, Xfld, Ximian Desktop, xPud, Xteam, XtreemOS, Xubuntu, Yellow Dog, YES, Yggdrasil Linux, Ylmf OS, Yoper, YunOS, Zebuntu, Zentyal, Zenwalk, Zeroshell, ZoneCD, and Zorin OS.

In certain embodiments, for example, the operating system may be configured to enforce access control policies. In certain embodiments, for example, the access control policies may restrict execution of computer programs (for example user-initiated processes, boot up processes, application programs and/or operating system programs) to a predetermined (for example preconfigured) list. In certain embodiments, for example, the access control policies may restrict access to files and network resources to a predetermined (for example preconfigured) list. In certain embodiments, for example, the access control policies may be mandatory. In certain embodiments, for example, configuration of the access control policies may be non-discretionary. In certain embodiments, for example, the operating system may not provide for a root user or a superuser. In certain embodiments, for example, the operating system may be SELinux (or SE Linux or Linux SE). In certain embodiments, for example, the operating system may comprise a kernel security module, for example the operating system may be a Linux operating system and the security module may be AppArmor.

In certain embodiments, for example, memory defined by the computer-readable media may comprise a kernel space memory and a user (or application) space memory. In certain embodiments, for example, the kernel space memory may comprise kernel RAM. In certain embodiments, for example, the kernel space memory may be reserved for executing the kernel. In certain embodiments, for example, the user space memory may be reserved for executing all non-kernel user processes (for example application programs) and program modules. In certain embodiments, for example, the user space memory may comprise a portion of RAM.

In certain embodiments, for example, the one or plural nodes may comprise a network stack (also termed a "protocol stack"). In certain embodiments, for example, at least a portion of the network stack may form part of the operating system or part of the kernel of the node, processor, or computing device. In certain embodiments, for example, the network stack may comprise one or more layers according to the OSI model. In certain embodiments, for example, the network stack may comprise a physical layer consisting of hardware (for example an Ethernet interface) used to form a data connection. In certain embodiments, for example, the network stack may comprise a data link layer configured to provide data transfer to and from a remote node of the plural nodes. In certain embodiments, for example, the network stack may comprise a network layer configured to transferring variable length data sequences (called datagrams) to and from a remote node of the plural nodes. In certain embodiments, for example, the network stack may comprise a transport layer configured to transfer datagrams from a source to a destination host according to a specified protocol. In certain embodiments, for example, the specified protocol may be Transmission Control Protocol (TCP). In certain embodiments, for example, the specified protocol may be User Datagram Protocol (UDP). In certain embodiments, for example, the network stack may comprise a session layer configured to establish, manage and terminate a connection between an application executing on the node and an application executing on another node of the plural nodes. In certain embodiments, for example, the network stack may comprise a presentation layer configured to map syntax and semantics between applications communicating via the network stack. In certain embodiments, for example, the network stack may comprise an application layer configured to provide a standardized communication interface to an application executing on the node, for example an network application programming interface whereby a user process (for example a self-contained user-application program) in user space may utilize portions of the network stack.

In certain embodiments, for example, the one more of the plural nodes may comprise software. In certain embodiments, for example, the software may be an application program. In certain embodiments, for example, the software may be an end-user application program (for example a program invoked by an end-user such as a non-administrator or non-root user). In certain embodiments, for example, an application executing in an application space of a node may be identified using a user-application identifier, user-application identifier comprising an application identifier (for example a process command) and a user (for example a process owner) of the application. In certain embodiments, for example, the software may be a program not invoked by an operating system, or a program that is not an operating system program. In certain embodiments, for example, the software may be a self-contained executable configured to execute in an application space of a node of the each of one more of the plural nodes. In certain embodiments, for example, the software may be a user mode program. In certain embodiments, for example, the software may be a server. In certain applications, for example, the software may be a client. In certain embodiments, for example, the software may be a publisher. In certain applications, for example, the software may be a subscriber. In certain embodiments, for example, the software may be a publisher and/or a subscriber. In certain embodiments, for example, the software may comprise a component of a Supervisory Control and Data Acquisition (SCADA) system. In certain embodiments, for example, the software may be configured to transmit data (for example sensor data, confidential data, and/or secret data). In certain embodiments, for example, the software may be configured to receive, transmit, create, handle, manipulate, and/or store data. In certain embodiments, for example, the software may be configured to receive, transmit, create, handle, manipulate, and/or store sensitive data (for example confidential data and/or secret data). In certain embodiments, for example, the software may be configured to receive, transmit, create, handle, manipulate, and/or store sensor data. In certain embodiments, for example, the software may be updated (for example updated one time, updated plural times, or periodically updated), for example updated from a remote computer over the network. In certain embodiments, combinations of an identifier for the software and an identifier for an authorized user may be present in a preconfigured list present on the node, processor, or computing device. In certain embodiments, for example, the preconfigured list may further comprise one or plural exclusive allowed network port numbers (and optionally allowed network interface controllers) which may be associated with the software. In certain embodiments, for example, the preconfigured list may further comprise one or plural exclusive allowed network port numbers (and optionally allowed network interface controllers) to which the software may transmit or from which the software may receive data. In certain embodiments, for example, the preconfigured list may further comprise a data type or data protocol descriptor authorized for transmission or receipt by the software. In certain embodiments, for example, the preconfigured list may further comprise one or plural tunnel port numbers for a network security program adapted to communicate with the software. In certain embodiments, for example, the preconfigured list may comprise a private key (or a cryptographic parameter or primitive) configured for establishment of an encrypted network tunnel having a port of the network security program as an endpoint, the port referencing one of the one or plural tunnel port numbers (for example a private key used for cryptographic key exchange). In certain embodiments, for example, the software may be non-secure. In certain embodiments, for example, the software may not be password protected. In certain embodiments, for example, the software may be configured for packet data communication with a remote application present on a remote node but not configured for secure communication (for example not configured for secure communication of packet data by an encrypted communication protocol such as TLS).

In certain embodiments, for example, the software may comprise network security software. In certain embodiments, for example, the network security software may comprise middleware (or the software may comprise middleware which comprises the network security software) configured to execute between an application software and at least a portion of the network (for example all of the network). In certain embodiments, for example, the network security software may be resident on a common node with the application software. In certain embodiments, for example, the network security software may communicate (for example by an encrypted network tunnel between a node on which the network security software is resident and a remote node) with remote network security software present on a remote node, processor, or computing device. In certain further embodiments, for example, the remote network security software may be middleware interposed between a remote application software on the remote node and the network. In certain embodiments, for example, the network security software may be present on a first node of the plural nodes and the application software may be present on a second node of the plural nodes. In certain embodiments, for example, the first node may be a network security broker. In certain embodiments, for example, the first node may be a controller for a software-defined perimeter. In certain embodiments, for example, the first node may be a controller for a black cloud. In certain embodiments, for example, the network security software may be exclusively invoked by a root user. In certain embodiments, for example, the network security software may be first invoked by a kernel. In certain embodiments, for example, at least a portion (for example all) of the network security software may be executed with kernel priority. In certain embodiments, for example, a portion of the network security software may comprise one or plural modules executing in an application space with less than kernel priority. In certain embodiments, for example, at least one of the one or plural modules may be invoked from a shim in a network stack. In certain embodiments, execution of the network security software may comprise a single execution thread. In certain embodiments, for example, execution of the network security software may be distributed. In certain embodiments, for example, execution of the network security software may comprise plural execution threads. In certain embodiments, for example, execution of the network security software may comprise two threads, three threads, or four threads. In certain embodiments, for example, execution of the network security software may comprise at least two execution threads, for example at least three execution threads, at least four execution threads, or execution of the network security software may comprise at least ten execution threads. In certain embodiments, for example, execution of the network security software may comprise less than twenty execution threads, less than ten execution threads, less than eight execution threads, less than four execution threads, or execution of the network security software may comprise less than three execution threads. In certain embodiments, for example a first execution thread of the network security software may communicate data to and/or receive data from a second execution thread of the network security software.

In certain embodiments, for example, the network security software may be embodied in one or more non-transitory computer-readable media for execution by a processor provisioned to manage communications with a camera. In certain embodiments, for example, the network security software may be embodied in one or more non-transitory computer-readable media for execution by a processor provisioned to manage communications with a network camera. In certain embodiments, for example, the network security software may be embodied in one or more non-transitory computer-readable media for execution by a processor provisioned to manage communications with a networked camera. In certain embodiments, for example, the network security software may be embodied in one or more non-transitory computer-readable media for execution by an embedded processor on a camera.

In certain embodiments, for example, the network security software may be embodied in one or more non-transitory computer-readable media for execution by a processor provisioned to manage communications with a video encoder. In certain embodiments, for example, the network security software may be embodied in one or more non-transitory computer-readable media for execution by an embedded processor on a video encoder.

In certain embodiments, for example, the network security software may be embodied in one or more non-transitory computer-readable media for execution by a processor provisioned to manage communications with a video recorder. In certain embodiments, for example, the network security software may be embodied in one or more non-transitory computer-readable media for execution by a processor provisioned to manage communications with a network video recorder. In certain embodiments, for example, the network security software may be embodied in one or more non-transitory computer-readable media for execution by a processor provisioned to manage communications with a networked video recorder. In certain embodiments, for example, the network security software may be embodied in one or more non-transitory computer-readable media for execution by an embedded processor on a video recorder.

In certain embodiments, for example, the network security software may be embodied in one or more non-transitory computer-readable media for execution by a processor provisioned to manage communications with an edge storage device for a video recorder. In certain embodiments, for example, the network security software may be embodied in one or more non-transitory computer-readable media for execution by a processor provisioned to manage communications with an edge storage device for a network video recorder. In certain embodiments, for example, the network security software may be embodied in one or more non-transitory computer-readable media for execution by a processor provisioned to manage communications with an edge storage device for a networked video recorder. In certain embodiments, for example, the network security software may be embodied in one or more non-transitory computer-readable media for execution by an embedded processor on an edge storage device for a video recorder.

In certain embodiments, for example, the network security software may be embodied in one or more non-transitory computer-readable media for execution by a processor provisioned to manage communications with an audio system. In certain embodiments, for example, the network security software may be embodied in one or more non-transitory computer-readable media for execution by an embedded processor on an audio system. In certain embodiments, for example, the network security software may be embodied in one or more non-transitory computer-readable media for execution by a processor provisioned to manage communications with an input/output accessory of an audio system. In certain embodiments, for example, the network security software may be embodied in one or more non-transitory computer-readable media for execution by an embedded processor on an input/output accessory or module of an audio system.

In certain embodiments, for example, the network security software may be embodied in one or more non-transitory computer-readable media for execution by a processor provisioned to manage communications with a system device, for example a network system device or a networked system device. In certain embodiments, for example, the system device may be a surveillance device. In certain embodiments, for example, the system device may be a radar-based detector.

In certain embodiments, for example, the network security software may be embodied in one or more non-transitory computer-readable media for execution by an embedded processor on a system device (for example on a radar-based detector or a surveillance device). In certain embodiments, for example, the network security software may be embodied in one or more non-transitory computer-readable media for execution by a processor provisioned to manage communications with video management software. In certain embodiments, for example, the network security software may be embodied in one or more non-transitory computer-readable media for execution by a processor provisioned to manage communications with surveillance software.

In certain embodiments, for example, the network security software may be embodied in one or more non-transitory computer-readable media for execution by a processor provisioned to manage communications with security analytics. In certain embodiments, for example, the security analytics may comprise people counter software, queue monitor software, store data software, occupancy estimating software, demographic identification software, tailgate detection software, direction detection software, perimeter security software, motion detection and/or monitoring software, cross like detection software, digital autotracking software, or a combination of two or more of the foregoing.

In certain embodiments, for example, the network security software may be embodied in one or more non-transitory computer-readable media for execution by a processor provisioned to manage communications with an access control device. In certain embodiments, for example, the network security software may be embodied in one or more non-transitory computer-readable media for execution by an embedded processor on an access control device. In certain embodiments, for example, the access control device of one or more of the foregoing embodiments may comprise a network door controller, a network door station, a card reader, a network I/O relay module, or a combination of two or more of the foregoing.

In certain embodiments, for example, the network security software may be embodied in one or more non-transitory computer-readable media for execution by a processor provisioned to manage communications with or within a communications kit (for example an executive communications kit). In certain embodiments, for example, the network security software may be embodied in one or more non-transitory computer-readable media for execution by a processor in a communications kit (for example an executive communications kit).

In certain embodiments, for example, the network security software may be embodied in one or more non-transitory computer-readable media for execution by a processor provisioned to manage communications with or within a cellular base station (for example a portable and/or deployable cellular base station). In certain embodiments, for example, the network security software may be embodied in one or more non-transitory computer-readable media for execution by a processor in a cellular base station (for example a portable and/or deployable cellular base station).

In certain embodiments, for example, the network security software may be embodied in one or more non-transitory computer-readable media for execution by a combined router and cellular gateway. In certain embodiments, for example, the network security software may be embodied in one or more non-transitory computer-readable media for execution by a processor provisioned to manage communications with or within a combined router and cellular gateway. In certain embodiments, for example, the router and/or cellular gateway of one or more of the foregoing embodiments may be deployable. In certain embodiments, for example, the router and/or cellular gateway of one or more of the foregoing embodiments may be for use in a rail transportation system. In certain embodiments, for example, the router and/or cellular gateway of one or more of the foregoing embodiments may be mounted in a bulkhead of a rail car.

In certain embodiments, for example, the network security software may be embodied in one or more non-transitory computer-readable media for execution by a processor provisioned to manage communications with or within a flyaway communications system (for example a deployable flyaway communications system). In certain embodiments, for example, the network security software may be embodied in one or more non-transitory computer-readable media for execution by a processor in a flyaway communications system (for example a deployable flyaway communications system).

In certain embodiments, for example, the network security software may be embodied in one or more non-transitory computer-readable media for execution by a processor provisioned to manage communications with an IP recorder (for example a network IP recorder or a networked IP recorder). In certain embodiments, for example, the network security software may be embodied in one or more non-transitory computer-readable media for execution by an embedded processor on an IP recorder.

In certain embodiments, for example, the network security software may be embodied in one or more non-transitory computer-readable media for execution by a processor provisioned to manage communications with a hybrid network video recorder (for example a network hybrid network video recorder or a networked hybrid network video recorder). In certain embodiments, for example, the network security software may be embodied in one or more non-transitory computer-readable media for execution by an embedded processor on a hybrid network video recorder.

In certain embodiments, for example, the network security software may be embodied in one or more non-transitory computer-readable media for execution by a processor provisioned to manage communications with a camera. In certain embodiments, for example, the camera may be networked. In certain embodiments, for example, the camera may be a network camera. In certain embodiments, for example, the camera may be a pan-tilt-zoom camera. In certain embodiments, for example, the camera may be a dome camera. In certain embodiments, for example, the camera may be a 360 degree camera. In certain embodiments, for example, the camera may be a bullet and box camera. In certain embodiments, for example, the camera may be a mobile camera. In certain embodiments, for example, the network security software may be embodied in one or more non-transitory computer-readable media for execution by an embedded processor on a camera.

In certain embodiments, for example, the network security software may be embodied in one or more non-transitory computer-readable media for execution by a processor of an aircraft control system, an aircraft navigation system, an air data system, an automatic direction finding system, or two or more of the foregoing systems. In certain embodiments, for example, the network security software may be embodied in one or more non-transitory computer-readable media for execution by a processor of an avionics system. In certain embodiments, for example, the network security software may be embodied in one or more non-transitory computer-readable media for execution by a processor of a flight management system.

In certain embodiments, for example, the network security software may be embodied in one or more non-transitory computer-readable media for execution by a processor of an airport baggage control system.

In certain embodiments, for example, the network security software may be embodied in one or more non-transitory computer-readable media for execution by a processor of pipeline system (for example a pipeline command and control system). In certain embodiments, for example, the network security software may be embodied in one or more non-transitory computer-readable media for execution by a processor of a mixed reality system. In certain embodiments, for example, the network security software may be embodied in one or more non-transitory computer-readable media for execution by a processor of an identity management system. In certain embodiments, for example, the network security software may be embodied in one or more non-transitory computer-readable media for execution by a processor of an image generation system. In certain embodiments, for example, the network security software may be embodied in one or more non-transitory computer-readable media for execution by a processor of a geopositioning system. In certain embodiments, for example, the network security software may be embodied in one or more non-transitory computer-readable media for execution by a processor of an express check-in system.

In certain embodiments, for example, the network security software may be embodied in one or more non-transitory computer-readable media for execution by a processor of an integrated targeting system. In certain embodiments, for example, the network security software may be embodied in one or more non-transitory computer-readable media for execution by a processor of a helmet mounted system (for example a helmet mounted display system). In certain embodiments, for example, the network security software may be embodied in one or more non-transitory computer-readable media for execution by a processor of a satellite communications transceiver. In certain embodiments, for example, the network security software may be embodied in one or more non-transitory computer-readable media for execution by a processor of an offsite check-in system. In certain embodiments, for example, the network security software may be embodied in one or more non-transitory computer-readable media for execution by a processor of a service kiosk. In certain embodiments, for example, the network security software may be embodied in one or more non-transitory computer-readable media for execution by a processor of a software-defined radio. In certain embodiments, for example, the network security software may be embodied in one or more non-transitory computer-readable media for execution by a processor of an in-flight television system. In certain embodiments, for example, the network security software may be embodied in one or more non-transitory computer-readable media for execution by a processor of a cabin management system.

In certain embodiments, for example, the network security software may be embodied in one or more non-transitory computer-readable media for execution by a processor of a video door station.

In certain embodiments, for example, the network security software may be embodied in one or more non-transitory computer-readable media for execution by a processor of an automotive infotainment system. In certain embodiments, for example, the network security software may be embodied in one or more non-transitory computer-readable media for execution by a processor of a telemedicine system. In certain embodiments, for example, the network security software may be embodied in one or more non-transitory computer-readable media for execution by a processor of a cardiohealth station. In certain embodiments, for example, the network security software may be embodied in one or more non-transitory computer-readable media for execution by a processor of a medical imaging system. In certain embodiments, for example, the network security software may be embodied in one or more non-transitory computer-readable media for execution by a processor of a building automation system (for example at a building automation hub).

In certain embodiments, for example, the network security software may be embodied in one or more non-transitory computer-readable media for execution by a processor provisioned to manage communications with an identity management device. In certain embodiments, for example, the network security software may be embodied in one or more non-transitory computer-readable media for execution by an embedded processor on an identity management device (for example a credentialing, permissioning, and/or provisioning device). In certain embodiments, for example, the network security software may be embodied in one or more non-transitory computer-readable media for execution by a processor provisioned to manage communications with an identity authentication device (for example a credentialing, permissioning, and/or provisioning device). In certain embodiments, for example, the network security software may be embodied in one or more non-transitory computer-readable media for execution by a processor provisioned to manage communications with an identity authentication device (for example a credentialing, permissioning, and/or provisioning device). In certain embodiments, for example, the network security software may be embodied in one or more non-transitory computer-readable media for execution by an embedded processor on an identity authorization device (for example a credentialing, permissioning, and/or provisioning device).

In certain embodiments, for example, the network security software may be embodied in one or more non-transitory computer-readable media for execution by a processor provisioned to manage communications with an access control device (for example a logical or physical access control device). In certain embodiments, for example, the network security software may be embodied in one or more non-transitory computer-readable media for execution by an embedded processor on an access control device (for example a logical or physical access control device).

In certain embodiments, for example, the network security software may be embodied in one or more non-transitory computer-readable media for execution by a processor provisioned to manage communications with a SCADA device. In certain embodiments, for example, the network security software may be embodied in one or more non-transitory computer-readable media for execution by a processor provisioned to manage communications with a logic processor. In certain embodiments, for example, the network security software may be embodied in one or more non-transitory computer-readable media for execution by an embedded processor on a SCADA device. In certain embodiments, for example, the network security software may be embodied in one or more non-transitory computer-readable media for execution by an embedded processor on a logic processor.

In certain embodiments, for example, the network security software may be embodied in one or more non-transitory computer-readable media for execution by a processor used to operate and/or control digital signage.

In certain embodiments, for example, the network security software may be embodied in one or more non-transitory computer-readable media for execution by a processor of an energy management system. In certain embodiments, for example, the network security software may be embodied in one or more non-transitory computer-readable media for execution by a processor of a home energy management system. In certain embodiments, for example, the network security software may be embodied in one or more non-transitory computer-readable media for execution by a processor of a standalone energy management system. In certain embodiments, for example, the network security software may be embodied in one or more non-transitory computer-readable media for execution by a processor of an industrial energy management system. In certain embodiments, for example, the network security software may be embodied in one or more non-transitory computer-readable media for execution by a processor of a commercial energy management system. In certain embodiments, for example, the network security software may be embodied in one or more non-transitory computer-readable media for execution by a processor of a power plant energy management system. In certain embodiments, for example, the network security software may be embodied in one or more non-transitory computer-readable media for execution by a processor of a solar energy management system. In certain embodiments, for example, the network security software may be embodied in one or more non-transitory computer-readable media for execution by a processor of a photovoltaic energy management system.

In certain embodiments, for example, the network security software may be embodied in one or more non-transitory computer-readable media for execution by a processor provisioned to manage communications with a thermostat. In certain embodiments, for example, the network security software may be embodied in one or more non-transitory computer-readable media for execution by a processor provisioned to manage communications with an alarm system. In certain embodiments, for example, the network security software may be embodied in one or more non-transitory computer-readable media for execution by a processor provisioned to manage communications with a smoke alarm. In certain embodiments, for example, the network security software may be embodied in one or more non-transitory computer-readable media for execution by a processor provisioned to manage communications with a carbon monoxide alarm system.

In certain embodiments, for example, the network security software may be embodied in one or more non-transitory computer-readable media for execution by a processor provisioned to manage communications with a remote keyless entry system. In certain embodiments, for example, the network security software may be embodied in one or more non-transitory computer-readable media for execution by an embedded processor on a remote keyless entry system.

In certain embodiments, for example, the network security software may be embodied in one or more non-transitory computer-readable media for execution by a processor provisioned to manage communications. In certain embodiments, for example, the communications may be banking communications. In certain embodiments, for example, the communications may be global payments communications. In certain embodiments, for example, the communications may be financial crime compliance communications. In certain embodiments, for example, the communications may be custodian communications. In certain embodiments, for example, the communications may be fund distribution communications. In certain embodiments, for example, the communications may be transfer agent communications. In certain embodiments, for example, the communications may be supply chain finance communications. In certain embodiments, for example, the communications may be mandate management communications. In certain embodiments, for example, the communications may be securities market communications. In certain embodiments, for example, the communications may be Treasury market communications. In certain embodiments, for example, the communications may be payment market communications. In certain embodiments, for example, the communications may be investment manager communications. In certain embodiments, for example, the communications may be Fed wire communications. In certain embodiments, for example, the communications may be investment client communications. In certain embodiments, for example, the communications may be client reporting communications. In certain embodiments, for example, the communications may be financial reporting communications.

In certain embodiments, for example, the network security software may be embodied in one or more non-transitory computer-readable media for execution by a processor provisioned to manage cable TV communications.

In certain embodiments, for example, the network security software may be embodied in one or more non-transitory computer-readable media for execution by a processor of an elevator control system. In certain embodiments, for example, the network security software may be embodied in one or more non-transitory computer-readable media for execution by a processor of an elevator management system. In certain embodiments, for example, the network security software may be embodied in one or more non-transitory computer-readable media for execution by a processor of an elevator reporting system.

In certain embodiments, for example, the network security software may be embodied in one or more non-transitory computer-readable media for execution by a processor of a voting machine. In certain embodiments, for example, the network security software may be embodied in one or more non-transitory computer-readable media for execution by a processor, the processor in Ethernet communication with a voting machine. In certain embodiments, for example, the voting machine may be at least 10 years old. In certain embodiments, for example, the voting machine may run a Windows XP or a Windows 2000 operating system. In certain embodiments, for example, the network security software may be installed relative to a voting machine to satisfy the requirements of at least part of a state and/or federal certification (for example an Election Assistance Commission certification) process and/or testing program. In certain embodiments, for example, the network security software may be embodied in one or more non-transitory computer-readable media for execution by a processor of a voter registration database.

In certain embodiments, for example, the network security software may be embodied in one or more non-transitory computer-readable media for execution by critical infrastructure, for example critical infrastructure of a city, county, and/or nation.

In certain embodiments, for example, the network security software may be embodied in one or more non-transitory computer-readable media for execution by a processor provisioned to manage communications with a water management and/or control facility (for example a water supply management and/or control facility).

In certain embodiments, for example, the network security software may be embodied in one or more non-transitory computer-readable media for execution by a processor provisioned to manage communications with a waste management and/or control facility (for example a hazardous waste management and/or control facility).

In certain embodiments, for example, the network security software may be embodied in one or more non-transitory computer-readable media for execution by a processor provisioned to manage communications for a law enforcement activity. In certain embodiments, for example, the network security software may be embodied in one or more non-transitory computer-readable media for execution by a processor provisioned to manage communications with a law enforcement database. In certain embodiments, for example, the network security software may be embodied in one or more non-transitory computer-readable media for execution by a processor provisioned to manage communications with a city, county, state, or federal government function.

In certain embodiments, for example, the network security software may be embodied in one or more non-transitory computer-readable media for execution by a processor provisioned to manage communications with an educational facility. In certain embodiments, for example, the network security software may be embodied in one or more non-transitory computer-readable media for execution by a processor provisioned to manage communications with an educational facility. In certain embodiments, for example, the network security software may be embodied in one or more non-transitory computer-readable media for execution by a processor provisioned to manage communications with an information repository (for example a library).

In certain embodiments, for example, the network security software may be embodied in one or more non-transitory computer-readable media for execution by a processor provisioned to manage communications with a utility. In certain embodiments, for example, the network security software may be embodied in one or more non-transitory computer-readable media for execution by a processor provisioned to manage communications with a power generation facility. In certain embodiments, for example, the network security software may be embodied in one or more non-transitory computer-readable media for execution by a processor provisioned to manage communications with a nuclear plant. In certain embodiments, for example, the network security software may be embodied in one or more non-transitory computer-readable media for execution by a processor provisioned to manage communications with a hydroelectric plant.

In certain embodiments, for example, the network security software may be embodied in one or more non-transitory computer-readable media for execution by a processor provisioned to manage communications with a virtual power plant. In certain embodiments, for example, the network security software may be embodied in one or more non-transitory computer-readable media for execution by a processor provisioned to manage communications with an energy arbitrage platform. In certain embodiments, for example, the network security software may be embodied in one or more non-transitory computer-readable media for execution by a processor provisioned to manage communications with a smart grid.

In certain embodiments, for example, the network security software may be embodied in one or more non-transitory computer-readable media for execution by a processor provisioned to manage communications with a smart home. In certain embodiments, for example, the network security software may be embodied in one or more non-transitory computer-readable media for execution by a processor provisioned to manage communications with a building automation device. In certain further embodiments, for example, the building automation device may comprise a temperature management system, ventilation system, air conditioning system, security system, perimeter security system, home appliance, or a combination of two or more of the foregoing.

In certain embodiments, for example, the network security software may be embodied in one or more non-transitory computer-readable media for execution by a processor provisioned to manage communication pathways in a building, the communication pathways configured according to X10, Ethernet, RS-485, 6LoWPAN, Bluetooth LE (BLE), ZigBee, Z-Wave, or two or more of the foregoing protocol.

In certain embodiments, for example, the network security software may be embodied in one or more non-transitory computer-readable media for execution by a processor provisioned to manage packet-based communications with or within an automobile.

In certain embodiments, for example, the network security software may be embodied in one or more non-transitory computer-readable media for execution by a processor provisioned to manage communications with a perimeter security system.

In certain embodiments, for example, the network security software may be embodied in one or more non-transitory computer-readable media for execution by a processor provisioned to manage communications with an access control component of a security system (for example a perimeter security system). In certain embodiments, for example, the access control component may be a surveillance appliance. In certain embodiments, for example, the access control component may be a video camera. In certain embodiments, for example, the access control component may be an alarm. In certain embodiments, for example, the access control component may be a notification system.

In certain embodiments, for example, the authorized communication may comprise transmission of data. During at least a portion of the transmission, for example, the data or a portion thereof may be present in a data packet. Unless further specified, the term "data packet" may refer to a packaged unit of data, wherein the particular packaging may vary depending on the location of the unit of data during its transmission. Transmission of a data packet may refer to end-to-end (for example application-to-application) communication of data by one or more port-to-port connections through one or plural network stacks and optionally over a network, wherein the data packet may include a variety of protocol headers at different stages of the transmission. In certain embodiments, for example, the term "data packet" may refer to a network packet present in the network and the network packet may comprise a frame, a network protocol header (for example an IP header), a transport layer header (for example a TCP or UDP header), and a payload. In certain embodiments, for example, the term "data packet" may refer to a unit of data present in a transport layer of the network stack, the data packet comprising a transport layer header and a payload, but exclusive of a frame header and a network protocol header. In certain embodiments, for example, the data packet may comprise a unit of data ready for consumption by an application, the data packet exclusive of a transport layer header.

In certain embodiments, for example, authorized communication may comprise communication between an application program on a first node of the plural nodes and an application program on a second node of the plural nodes. In certain embodiments, for example, the first node and the second node may be different nodes. In certain embodiments, for example, the first node and the second node may be the same node, processor, or computing device. In certain embodiments, for example, the first node and the second node may be virtual nodes (for example the first node may be a first virtual node on a machine and the second node may be a second virtual node on the machine or a different machine).

In certain embodiments, for example, authorized communication may comprise communication between a first application and a second application wherein the communication passes through one or plural network security software. In certain embodiments, for example, the software may be a middleware. In certain embodiments, for example, the authorized communication may pass through one network security software. In certain embodiments, for example, the authorized communication may pass through plural network security software (for example, two network security software, three network security software, or four network security software), wherein at least two (for example two, or for example each) of the plural network security software are cooperatively configured to authorize the authorized communication. In certain embodiments, for example, a first network security software may be execute in a kernel of a node and a second network security software may execute in a virtual machine on the node, processor, or computing device.

In certain embodiments, for example, at least one of the one or plural network security software may be middleware positioned between the first application and the second application. In certain embodiments, for example, the authorized communication may comprise a first communication from the first application to first network security software on the first node, a second communication from the first network security software to second network security software on the second node, and a third communication from the second network security software to the second application.

In certain embodiments, for example, the first communication may comprise communication from a port of the first application program to a port of the first network security software by a loopback interface in a network stack of the first node, processor, or computing device. In certain embodiments, for example, the first communication may comprise communication from the first application to the first network security software by a procedure call. In certain embodiments, for example, the first communication may comprise a kernel function call (for example a kernel read and/or a kernel write call). In certain embodiments, for example, the second communication may comprise communication over a network tunnel having a port of the first network security software and a port of the second network security software as endpoints. In certain embodiments, for example, at least a portion of the second communication may be encrypted. In certain embodiments, for example, a metadata portion of the second communication may be encrypted. In certain embodiments, for example, the metadata portion may be encrypted by the first network security software and decrypted by the second network security software. In certain embodiments, for example, the payload portion of the communication may be encrypted. In certain embodiments, for example, the payload portion may be encrypted by the first network security software and decrypted by the second network security software. In certain embodiments, for example, contiguous metadata and payload data may be encrypted to form a contiguous segment of encrypted information. In certain embodiments, for example, the contiguous segment may be encrypted by the first network security software and decrypted by the second network security software. In certain embodiments, for example, a metadata portion of the communication may be encrypted by the first network security software and decrypted by the second network security software while a payload portion of the communication may be encrypted by a third software present on the first node and decrypted by a fourth software present on the second node, processor, or computing device. In certain embodiments, for example, the third software may be the first application and/or the fourth software may be the second application. In certain embodiments, for example, the third software may be a security layer software present on the first node (for example SSL, TLS or IPsec software) and/or the fourth software may be a security layer software present on the second application. In certain embodiments, for example, the third communication may comprise communication from a port of the second network security software to a port of the second application program by a loopback interface of the second node, processor, or computing device. In certain embodiments, for example, the first communication may comprise communication from the second network security software to the second application program by a procedure call. In certain embodiments, for example, the second communication may be transparent to the first application and the second application. In certain embodiments, for example, the first application and the second application may not be aware of the second communication. In certain embodiments, for example, the first communication may be unencrypted. In certain embodiments, for example, the second communication may be unencrypted. In certain embodiments, for example, the first communication and/or the second communication may be unencrypted. In certain embodiments, for example, the first communication may be encrypted. In certain embodiments, for example, the second communication may be encrypted. In certain embodiments, for example, the first communication and/or the second communication may be encrypted. In certain embodiments, for example, the first communication may result from an attempt by the first application to establish a direct port-to-port connection with the second application. In certain embodiments, for example, the second communication may result from an attempt by the second application to bind a port to a physical interface of the second node, processor, or computing device. In certain embodiments, for example, the second communication may result from an attempt by the second application to establish a listening port (for example a listening port bound to a physical interface) on the second node, processor, or computing device. In certain embodiments, for example, the authorized communication may comprise communication to or from one or more ports having a pre-selected port number. In certain embodiments, for example, the authorized communication may comprise communication to or from one or more ephemeral ports. In certain embodiments, for example, port endpoints for the first communication may be ephemeral. In certain embodiments, for example, a source port for the second communication may be ephemeral and destination port for the second communication may be pre-selected (for example a fixed port number specified to network security software responsible for establishing the second connection). In certain embodiments, for example, a source port of the third communication may be ephemeral and a destination port of the third communication may be pre-selected. In certain embodiments, for example, the source and destination ports of each of the first communication, second communication, and third communication may be pre-selected.

In certain embodiments, for example, the first connection may be a connection according to TCP protocol. In certain embodiments, for example, the first connection may be a connection according to UDP. In certain embodiments, for example, the first connection may be a connection according to a mid-weight UDP protocol.

In certain embodiments, for example, the second connection may be a connection according to TCP protocol. In certain embodiments, for example, the second connection may be a connection according to UDP protocol. In certain embodiments, for example, the second connection may be a connection according to a mid-weight UDP protocol.

In certain embodiments, for example, the third connection may be a connection according to TCP protocol. In certain embodiments, for example, the third connection may be a connection according to UDP protocol. In certain embodiments, for example, the third connection may be a connection according to a mid-weight UDP protocol.

In certain embodiments, for example, each of the first connection, the second connection, and the third connection may be a connection according to TCP protocol. In certain embodiments, for example, each of the first connection, the second connection, and the third connection may be a connection according to UDP protocol. In certain embodiments, for example, each of the first connection, the second connection, and the third connection may be a connection according to a mid-weight UDP protocol. In certain embodiments, for example, each of the first connection, the second connection, and the third connection may be according to the same connection protocol. In certain embodiments, for example, each of the first connection and the second connection may be according to the same connection protocol and the third connection may be according to a different communication protocol. In certain embodiments, for example, each of the first connection, the second connection, and the third connection may be according to different communication protocol.

In certain embodiments, for example, the authorized communication may comprise communication over an encrypted tunnel having, as endpoints, a port of the first application and a port of the second application. In certain embodiments, for example, the first application and the second application may each comprise one or plural network security modules for authorized communication between the applications. In certain embodiments, for example, the encrypted tunnel may be authorized based on communication between the first node and a third node, the third node hosting network security middleware, and further based on communication between the second node and a fourth node, the fourth node hosting network security middleware. In certain embodiments, for example, the third node and the fourth node may be the same node (wherein the respective network security middleware may be the same or different). In certain embodiments, for example, the third node and the fourth node may be different nodes. In certain embodiments, for example, the third node and the first node may be the same node while the fourth node and the second node may be different nodes. In certain embodiments, for example, the first node, third node, and fourth node may be the same node, processor, or computing device. In certain embodiments, for example, the second node, third node, and fourth node may be the same node, processor, or computing device.

In certain embodiments, for example, the authorized communication may pass through a third node hosting network security software, the third node disposed, for purposes of the communication, between the first node and the second node, processor, or computing device. In certain embodiments, for example, the authorized communication may comprise a network tunnel between the first node and the third node (for example a network tunnel such as an encrypted network tunnel having the first application (or a shim in the network stack application programming interface) and network security software present on the third node as endpoints and a different network tunnel between the third node and the second node, processor, or computing device.

In certain embodiments, for example, a first node of the plural nodes and a second node of the plural nodes may form a secure connection. In certain embodiments, for example, the secure connection may comprise a network tunnel. In certain embodiments, for example, the network tunnel may be a packet network tunnel. In certain embodiments, for example, the network tunnel may be formed according to an encrypted communication protocol, whereby each data packet transmitted through the network tunnel may be encrypted at a first endpoint of the network tunnel present on the first node, passed through the network tunnel, and then decrypted at a second endpoint of the network tunnel present on the second node, processor, or computing device. In certain embodiments, for example, the encrypted communication protocol may be implemented in the OSI transport layer. In certain further embodiments, for example, the transport layer encrypted communication protocol may be selected from the group consisting of Secure Socket Layer (SSL) protocol, Transport Layer Security (TLS), Secure Shell (SSH) protocol, and a combination of two or more of the foregoing protocols. In certain embodiments, for example, the encrypted communication protocol may be implemented in the OSI network layer or data link layer. In certain further embodiments, for example, the encrypted communication protocol may be selected from the group consisting of IPsec, Layer 2 Tunneling Protocol (L2TP) over IPsec, or Ethernet over IPsec.

In certain embodiments, for example, encryption and decryption may use an encryption key wherein the key is established by executing a key exchange algorithm between software executing on the first node and software executing on the second node, processor, or computing device. In certain embodiments, for example, the key exchange algorithm may be selected from the group consisting of Rivest, Shamir, Adleman (RSA), Diffie-Hellman (DH), Diffie-Hellman Ephemeral (DHE), Elliptic-Curve Diffie-Hellman (ECDH), Kerberos (KRB5), Secure Remote Password Protocol (SRP), Pre-shared key (PSK), Digital Signature Algorithm (DSA), Elliptic Curve Digital Signature Algorithm (ECDSA), and Digital Signature Standard (DSS).

In certain embodiments, for example, the encryption and decryption may be performed using a symmetric encryption algorithm. In certain embodiments, for example, the symmetric encryption algorithm may be selected from the group consisting of Triple Data Encryption Algorithm (3DES), Advanced Encryption Standard (AES), Camelia (Block cipher developed by Mitsubishi and NTT), Data Encryption Standard (DES), Fortezza (Security token based cipher), GOST (Block cipher developed in USSR), International Data Encryption Algorithm (IDEA), Rivest Cipher 2 (RC2), Rivest Cipher 4 (RC4), and SEED (Block cipher developed by Korean Information Security Agency).

In certain embodiments, for example, each data packet passed through the network tunnel may contain a message authentication code, comprising a hashed value for a portion of the data packet. In certain embodiments, for example, the hashed value may be obtained by passing the portion of the data packet through a hashing algorithm. In certain embodiments, for example, the hashing algorithm may be selected from the group consisting of BLAKE-256, BLAKE-512, BLAKE2s, BLAKE2b, Elliptic Curve Only Hash (ECOH), the Fast Syndrome-based (FSB) hash, GOST, Grøstl, HAS-160, HAVAL, JH, the Message Digent-2 (MD2) algorithm, MD4, MD5, MD6, RadioGatún, the RACE Integrity Primitives Evaluation Message Digest (RIPEMD), RIPEMD-128, RIPEMD-160, RIPEMD-320, the Secure Hash Algorithm-1 (SHA-1), SHA-2, SHA-224, SHA-256, SHA-384, SHA-512, SHA-3, Skein, Snefru, Spectral Hash, Streebog, SWIFFT, Tiger, Whirlpool-0, Whirlpool-T, and Whirlpool.

In certain embodiments, for example, authorized communication may comprise transmission of metadata-containing data packets over a network tunnel. In certain embodiments, for example, the metadata-containing packets may conform to Internet Protocol version 4 (IPv4). In certain embodiments, for example, the metadata-containing packets may conform to Internet Protocol version 6 (IPv6). In certain embodiments, for example, the metadata may be positioned at a predetermined location (for example start at a predetermined location) in a data packet. In certain embodiments, for example, the metadata may be positioned after (for example immediately after, after a predetermined buffer, or at a predetermined offset from) a transport layer header of the data packet. In certain embodiments, for example, the metadata may be positioned between the transport layer header and payload data of the network packet.

In certain embodiments, for example, the metadata may be encrypted according to an encryption scheme of the network tunnel (for example one of the encryption schemes described herein). In certain embodiments, for example, the metadata may be encrypted with data packet payload data to form single ciphertext. In certain embodiments, for example, the metadata be encrypted separately from data packet payload data (or the metadata may be encrypted and payload data may not be encrypted). In certain embodiments, for example, the metadata be encrypted by a first network security software and data packet payload data may be encrypted by a second network security software.

In certain embodiments, for example, the metadata may be built and inserted into a data packet by a first network security software present on a first node of the plural nodes. In certain embodiments, for example, the first node may coincide with a source node (or node-of-origin) for the data packet (for example the first node may be a node containing first application software transmitting data contained in a payload of the data packet such as from program memory of the first application software). In certain embodiments, for example, the first node may be a waypoint node (or intermediate node) disposed between a source node for the data packet and a final destination node for the data packet. In certain embodiments, for example, the first node may be directly connected by an Ethernet connection to a source node for the data packet. In certain embodiments, for example, the second node may be directly connected by an Ethernet connection to a final destination node for the data packet.

In certain embodiments, for example, the metadata may be encrypted by software present in an encryption layer (for example TLS, SSL, or IPsec). In certain embodiments, for example, the metadata may be encrypted by an encryption module, subroutine, function, or the like. In certain embodiments, for example, the metadata may be encrypted using a single-use cryptographic key (for example an ECDH-derived key which is rotated with each packet transmission through the network tunnel), whereby the same metadata would appear different in different data packets due to use of a different cryptographic key in each instance. In certain embodiments, for example, the first network security software may comprise the encryption layer software. In certain embodiments, for example, the first network security software may invoke (for example call) the encryption layer software. In certain embodiments, for example, the first network security software may invoke the encryption module, subroutine, or function. In certain embodiments, for example, the encryption layer software or encryption module may be present in an OSI application layer of the first node, processor, or computing device. In certain embodiments, for example, the encryption layer software or encryption module may be present in a kernel layer (for example a kernel portion of a network stack) of the first node, processor, or computing device.

In certain embodiments, for example, the metadata may be extracted and parsed from a data packet by a second network security software present on a second node of the plural nodes. In certain embodiments, for example, the second node may coincide with a final destination node for the data packet (for example a final destination node comprising a second application configured to receive payload data present in the data packet such as in program memory of the second application). In certain embodiments, for example, the second node may be a waypoint node (or intermediate node) disposed between a source node for the data packet and a final destination node for the data packet. In certain embodiments, for example, the second node may be directly connected by an Ethernet connection to the source node for the data packet. In certain embodiments, for example, the second node may be directly connected by an Ethernet connection to the final destination node for the data packet.

In certain embodiments, for example, the metadata extracted from the data packet may be encrypted (as discussed herein). In certain embodiments, for example, the metadata may be decrypted by encryption layer software (for example TLS, SSL, or IPsec). In certain embodiments, for example, the metadata may be decrypted by an encryption module, subroutine, function, or the like (collectively referred to as "module" for purposes herein). In certain embodiments, for example, the decrypting may be performed prior to the parsing. In certain embodiments, for example, the decrypting may be performed subsequent to the parsing. In certain embodiments, for example, the second network security software may comprise the encryption layer software. In certain embodiments, for example, the second network security software may invoke (for example call) the encryption layer software. In certain embodiments, for example, the second network security software may invoke the encryption module. In certain embodiments, for example, the encryption layer software or encryption module may be present in an OSI application layer of the second node, processor, or computing device. In certain embodiments, for example, the encryption layer software or encryption module may be present in a kernel layer (for example a kernel portion of a network stack) of the second node, processor, or computing device.

In certain embodiments, for example, the metadata may comprise one or plural parameters. In certain embodiments, for example, the one or plural parameters may comprise a packet type identification code. In certain embodiments, for example, the packet type identification code may be interpreted by network security software to indicate the data packet is configured to be used for negotiation (for example authentication and/or authorization) of a network tunnel. In certain embodiments, for example, the packet type identification code may be interpreted by network security software to indicate the data packet is configured to be transmitted through an existing network tunnel (for example an authenticated and/or authorized network tunnel). In certain embodiments, for example, the packet type identification code may be interpreted by network security software to indicate the data packet contains application payload data. In certain embodiments, for example, the packet type identification code may be interpreted by network security software to determine a connection state for a network tunnel. In certain embodiments, for example, the packet type identification code may be positioned at a predetermined location (for example start at a predetermined location) in the data packet. In certain embodiments, for example, the packet type identification code may be positioned after (for example immediately after, after a predetermined buffer, or at a predetermined offset from) a transport layer header of the data packet. In certain embodiments, for example, the packet type identification code may occupy a predetermined location of the metadata. In certain embodiments, for example, the packet type identification code may be positioned at one end (for example at the beginning or the end closest to a transport layer header of the data packet) of the metadata. In certain embodiments, for example, the packet type identification code (prior to encryption) may be an integer in the range of $0\text{-}2^{32}$ (i.e., 0-4,294,967,295).

In certain embodiments, for example, the one or plural parameters may comprise one or plural node descriptors. In certain embodiments, for example, the one or plural parameters may be a node descriptor for a source node of the data packet. In certain embodiments, for example, the one or plural parameters may be a node descriptor for a source node of payload data (for example payload data that will be transmitted in a subsequent data packet by an application resident on the source node identified by the node descriptor). In certain embodiments, for example, the one or plural parameters may be a node descriptor for a destination node of payload data (for example payload data that will be transmitted in a subsequent data packet to an application resident on the destination node identified by the node descriptor). In certain embodiments, for example, the one or plural node descriptors may be nonpublic. In certain embodiments, for example, the one or plural node descriptors may be a shared secret among at least two of the plural nodes. In certain embodiments, for example, the one or plural node descriptors may be a shared secret among less than all of the plural nodes. In certain embodiments, for example, the one or plural node descriptors may have a size of at least 64 bits, for example at least 128 bits, at least 256 bits, at least 512 bits, at least 1024 bits, at least 2048 bits, at least 4096 bits, at least 8192 bits, at least 16384 bits, at least 32768 bits, or the one or plural node descriptors may have a size of at least 65536 bits. In certain embodiments, for example, the one or plural node descriptors may have a size of 64 bits, 128 bits, 256 bits, 512 bits, 1024 bits, 2048 bits, 4096 bits, 8192 bits, 16384 bits, 32768 bits, or the one or plural node descriptors may have a size of 65536 bits. In certain embodiments, for example, the one or plural node descriptors may have a size of less than 8192 bits, for example less than 4096 bits, less than 2048 bits, less than 1024 bits, or the one or plural node descriptors may have a size of less than 256 bits. In certain embodiments, for example, a portion of the one or plural node descriptors may comprise a company identifier. In certain embodiments, for example, a portion of the one or plural node descriptors may comprise a device-type identifier. In certain embodiments for example, a portion of the one or plural node descriptors may comprise a random number produced by a random number generator. In certain embodiments, for example, the random number may comprise at least 90% of the bits of the one or plural node descriptors, for example at least 95%, at least 96%, at least 97%, at least 98%, at least 98.5%, at least 99%, at least 99.5%, at least 99.9% or the random number may comprise at least 99.9% of the bits of the one or plural node descriptors. In certain embodiments, for example, the random number may comprise less than 99% of the bits of the one or plural node descriptors, for example less than 98%, or the random number may comprise less than 95% of the bits of the one or plural node descriptors. In certain embodiments, for example, the random number may comprise in the range of 95-99.9% of the bits of the one or plural node descriptors, for example in the range of 98-99% of the bits of the one or plural node descriptors. In certain embodiments, for example, the sum of digits of the one or plural node descriptors may be a prime number. In certain embodiments, for example, the one or plural node descriptors may accompany an application data payload in the data packet. In certain embodiments, for example, the one or plural node descriptors may be present in a data packet that does not contain an application data payload (for example a data packet used for negotiation of a network tunnel prior to the transmission of application data). In certain embodiments, for example, the metadata may comprise a packet type identification code and the one or plural node descriptors. In certain embodiments, for example, the one or plural node descriptors may be positioned at a predetermined location (for example start at a predetermined location) in the data packet. In certain embodiments, for example, the one or plural node descriptors may be positioned after (for example immediately after, after a predetermined buffer, or at a predetermined offset from) a transport layer header of the data packet. In certain embodiments, for example, the one or plural node descriptors may occupy a predetermined location of the metadata. In certain embodiments, for example, the one or plural node descriptors may be positioned after a packet type identification code at one end (for example at the beginning or the end closest to a transport layer header of the data packet) of the metadata.

In certain embodiments, for example, the one or plural parameters may comprise one or plural parameters for payload data. In certain embodiments, for example, the one or plural payload data parameters may comprise an application identification code. In certain embodiments, for example, the application identification code may have a length of at least 8 bits, for example at least 16 bits, at least 32 bits, or at least 64 bits. In certain embodiments, for example, the application identification code may have a length of no more than 64 bits, for example no more than 32 bits, no more than 16 bits, or no more than 8 bits. In certain embodiments, for example, the application identification code may have a length in the range of 8-64 bits, for example in the range of 8-32 bits, or in the range of 8-16 bits. In certain embodiments, for example, the one or plural payload data parameters may comprise an application user identification code. In certain embodiments, for example, the application user identification code may have a length of at least 8 bits, for example at least 16 bits, at least 32 bits, or at least 64 bits. In certain embodiments, for example, the application user identification code may have a length of no more than 64 bits, for example no more than 32 bits, no more than 16 bits, or no more than 8 bits. In certain embodiments, for example, the application user identification code may have a length in the range of 8-64 bits, for example in the range of 8-32 bits, or in the range of 8-16 bits. In certain embodiments, for example, the application identification code may be shorter than the application user identification code. In certain embodiments, for example, the application user identification code may be at least twice as long as the application identification code. In certain embodiments, for example, the one or plural payload data parameters may comprise an application identification code for a source application for the payload data. In certain embodiments, for example, the one or plural payload data parameters may comprise an application user identification code for a user of the source application for the payload data. In certain embodiments, for example, the one or plural payload data parameters may comprise an application identification code for a destination application for the payload data. In certain embodiments, for example, the combined length of the application identification code and the application user identification code may be least 8 bits, for example at least 16 bits, at least 32 bits, or at least 64 bits. In certain embodiments, for example, the combined length of the application identification code and the application user identification code may be no more than 128 bits, for example no more than 64 bits, no more than 48 bits, no more than 32 bits, no more than 16 bits, or no more than 8 bits. In certain embodiments, for example, the combined length of the application identification code and the application user identification code may have a length in the range of 8-64 bits, for example in the range of 24-64 bits, or in the range of 36-64 bits. In certain embodiments, for example, the one or plural payload data parameters may comprise an application user identification code for a user of the destination application for the payload data. In certain embodiments, for example, the one or plural payload data parameters may comprise a data type descriptor. In certain embodiments, for example, the data type descriptor may comprise a data type protocol. In certain embodiments, for example, the data type descriptor may comprise a data topic. In certain embodiments, for example, the data type descriptor may comprise a file size (for example a total size of a file being transmitted by one or more payload data). In certain embodiments, for example, the data type descriptor may comprise a maximum file size (for example a maximum size of a file being transmitted by one or more payload data). In certain embodiments, for example, the data type descriptor may comprise a file name. In certain embodiments, for example, the data type descriptor may comprise a command type. In certain embodiments, for example, the command type may be selected from the group consisting of SQLread, SQLwrite, AND/OR, ALTER TABLE, AS (alias), BETWEEN, CREATE DATABASE, CREATE TABLE, CREATE INDEX, CREATE VIEW, DELETE, DROP DATABASE, DROP INDEX, DROP TABLE, EXISTS, GROUP BY, HAVING, IN, INSERT INTO, INNER JOIN, LEFT JOIN, RIGHT JOIN, FULL JOIN, LIKE, ORDER BY, SELECT, SELECT *, SELECT DISTINCT, SELECT INTO, SELECT TOP, TRUNCATE TABLE, UNION, UNION ALL, UPDATE, WHERE, and a combination of two or more of the foregoing command types. In certain embodiments, for example, the data type descriptor may comprise a date/time (for example a transmission date/time or a deadline). In certain embodiments, for example, the data type descriptor may comprise a time-to-live of the payload data. In certain embodiments, for example, the data type descriptor may have a size of at least 64 bits, for example at least 128 bits, at least 256 bits, at least 512 bits, at least 1024 bits, at least 2048 bits, at least 4096 bits, at least 8192 bits, at least 16384 bits, at least 32768 bits, or the data type descriptor may have a size of at least 65536 bits. In certain embodiments, for example, the data type descriptor may have a size of less than 8192 bits, for example less than 4096 bits, less than 2048 bits, less than 1024 bits, or the data type descriptor may have a size of less than 256 bits.

In certain embodiments, for example, the metadata may comprise a packet type identification code and the one or plural payload data parameters. In certain embodiments, for example, the one or plural payload data parameters may be positioned in a data packet at a location where a packet type identification code would be present (for example, the data packet may contain the one or plural payload data parameters instead of the packet type identification code). In certain embodiments, for example, the one or plural payload data parameters may be positioned at a predetermined location (for example start at a predetermined location) in the data packet. In certain embodiments, for example, the one or plural payload data parameters may be positioned after (for example immediately after, after a predetermined buffer, or at a predetermined offset from) a transport layer header of the data packet. In certain embodiments, for example, the one or plural payload data parameters may occupy a predetermined location of the metadata. In certain embodiments, for example, the one or plural payload data parameters may be positioned after a packet type identification code at one end (for example at the beginning or the end closest to a transport layer header of the data packet) of the metadata.

In certain embodiments, for example, the authorized communication may comprise transmission of a network tunnel connection request packet (for example a request packet arising from a client connection request such as a request transmitted by a network security software), the request packet comprising encrypted metadata containing a packet type identification code, the packet type identification code a connection request identification code. In certain embodiments, for example, the connection request packet may conform to a protocol. In certain further embodiments, for example, the protocol may be UDP or TCP.

In certain embodiments, for example, the authorized communication may comprise transmission of a network tunnel connection request reply packet (for example a request packet from a server such as a reply from a network security software responding to a client connection request such as a request transmitted by a different network security software), the request reply packet comprising encrypted metadata containing a packet type identification code, the packet type identification code comprising a connection request reply identification code (for example a code having a different value from the connection request identification code). In certain embodiments, for example, the connection request reply packet may conform to a protocol. In certain further embodiments, for example, the protocol may be UDP or TCP.

In certain embodiments, for example, the authorized communication may comprise transmission of a node authentication and authorization packet. In certain embodiments, for example, the node authentication and authorization packet may comprise encrypted metadata containing a node validation packet type indicator and a node descriptor. In certain embodiments, for example, establishing authorized payload data communication may comprise: (a) transmitting a first node authentication and authorization packet from a first node network security software resident on a first node to second network security software present on a second node, followed by (b) transmitting a second node authentication and authorization packet from the second network security software to the first network security software.

In certain embodiments, for example, the authorized communication may comprise transmission of a payload data authorization and authentication packet. In certain embodiments, for example, the payload data authentication and authorization packet may comprise encrypted metadata containing a payload data validation packet type indicator and a payload data parameter. In certain embodiments, for example, the payload data parameter may comprise an application identification code for an application resident on a node transmitting the payload data authorization and authentication packet, an application user identification code for a user of the resident application, and a data type or data protocol for payload data to be transmitted by a network tunnel configured according to the payload data authorization and authentication packet. In certain embodiments, for example, establishing authorized payload data communication may comprise: (a) transmitting a first payload data authentication and authorization packet from a first node network security software resident on a first node to second network security software present on a second node, followed by (b) transmitting a second payload data authentication and authorization packet from the second network security software to the first network security software.

In certain embodiments, for example, authorized communication may comprise transmission of a payload data packet. In certain embodiments, for example, the payload data packet may comprise encrypted payload data authentication and authorization metadata and payload data. In certain embodiments, for example, the metadata may be exclusive of a packet type identification code.

In certain embodiments, for example, authorized communications comprising transfer of data packets across the network may comprise communications between a first node of the plural nodes and a further node (for example a second node) of the plural nodes. In certain embodiments, for example, establishment and coordination of the authorized communications may be performed by a first network security software cooperatively configured with a second network security software (for example a first network security software resident on the first node and a second network security software resident on the second node). In certain further embodiments, for example, the first network security software and the second network security software may be different copies of the computer-readable program code (for example copies obtained from different copies of the at least one component).

In certain embodiments, for example, the first network security software may have access to a first preconfigured list, for example a first preconfigured list stored in non-transitory storage media present on the same node as the first network security software, or otherwise accessible to the first network security software. In certain embodiments, for example, the second network security software may have access to a second preconfigured list, for example a second preconfigured list stored in non-transitory storage media present on the same node as the second network security software, or otherwise accessible to the second network security software. In certain embodiments, for example, the first preconfigured list and the second preconfigured list may be aligned to enable the first network security software and the second security software to cooperatively negotiate connections for authorized communications. In certain embodiments, for example, the first preconfigured list and the second preconfigured list may together exclusively define the authorized communications permitted between an application (for example a user-application) on the first node and an application (for example a user-application) on the second node, or may exclusively define the authorized port-to-port communications. In certain embodiments, for example, the first network security software may terminate any attempt by an application resident on the first node to transmit packet data to the second node, or may drop (or quarantine) any packets received at the first node sent from the second node, that are not in conformance with the first preconfigured list. Similarly, in certain embodiments, for example, the second network security software may terminate any attempt by an application resident on the second node to transmit packet data to the first node, or may drop any packets received at the second node sent from the first node, that are not in conformance with the second preconfigured list. In certain further embodiments, for example, the non-conformance may comprise failure of a portion of the destination port numbers and/or the metadata to match expected values, the expectation regarding the expected values based on parameters present in the second preconfigured list.

In certain embodiments, for example, each of the first preconfigured list and/or a further (or second) preconfigured list may comprise a series of records, each record in the form of an n-tuple. In certain embodiments, for example, the record length may be not fixed, i.e., it may vary from record to record. In certain embodiments, for example, each of the first preconfigured list and/or the second preconfigured list may be a binary file. In certain embodiments, for example, each of the first preconfigured list and/or the second preconfigured list may be encrypted. In certain embodiments, for example, each of the first preconfigured list and/or the second preconfigured list may be read-only. In certain embodiments, for example, the first preconfigured list may be read only by a single first network security software module of the first network security software having access (for example having sole access) to a first preconfigured list decryption key. In certain embodiments, for example, the first preconfigured list decryption key may be stored in a memory location (for example a volatile memory location) known only to the first network security software module. In certain embodiments, for example, the memory location may be specific, unique to, and/or set during compilation of the first network security software module (i.e., recompilation of the first network security software module would result in a different memory location). In certain embodiments, for example, the first preconfigured list decryption key may be specific to the compilation of the first network security software module. In certain embodiments, for example, the second preconfigured list may be read only by a single second network security software module of the second network security software having access (for example having sole access) to a second preconfigured list decryption key. In certain embodiments, for example, the second preconfigured list decryption key may be stored in a memory location (for example a volatile memory location) known only to the second network security software module. In certain embodiments, for example, the memory location may be specific, unique to, and/or set during compilation of the second network security software module (i.e., recompilation of the second network security software module would result in a different memory location). In certain embodiments, for example, the second preconfigured list decryption key may be specific, unique to, and/or set during compilation of the second network security software module.

In certain embodiments, for example, each record of the each of the first preconfigured list and a further (for example, the second) preconfigured list may be interpretable by the first network security software and the second network security software, respectively, to form an authorized connection for authorized communication. In certain embodiments, for example, the first preconfigured list may contain a first record interpretable by the first network security software and the second preconfigured list may contain a second record interpretable by the second network security software for forming an authorized connection for authorized communication between the first node and the second node, processor, or computing device.

In certain embodiments, for example, each of the first record and a further record (for example, the second record) may contain a node identifier or a node identification code for the source node (the source node may be the first node or the second node) from which packet data will be transmitted in the authorized communication. In certain embodiments, for example, each of the first record and the second record may contain a node identification code for the destination node (the destination node may be the first node or the second node different from the source node) to which packet data will be transmitted in the authorized communication. In certain embodiments, for example, the first network security software and the second network security software may each exchange with one another the node identification code that corresponds to their status (source or destination). In certain further embodiments, for example, the mutual exchange may occur over an encrypted tunnel having the first network security software and the second network security software as endpoints. In certain further embodiments, for example, the exchanged node identification codes may be validated by the receiving network security software by reference to the respective first record or second record. In certain embodiments, for example, the mutual validating may be used to partially authorize the aforementioned encrypted tunnel. In certain embodiments, for example, each of the node identification codes may have a size of at least 64 bits, for example at least 128 bits, at least 256 bits, at least 512 bits, at least 1024 bits, at least 2048 bits, at least 4096 bits, at least 8192 bits, at least 16384 bits, at least 32768 bits, or each of the node identification codes may have a size of at least 65536 bits. In certain embodiments, for example, each of the node identification codes may have a size of 64 bits, 128 bits, 256 bits, 512 bits, 1024 bits, 2048 bits, 4096 bits, 8192 bits, 16384 bits, 32768 bits, or each of the node identification codes may have a size of 65536 bits. In certain embodiments, for example, each of the node identification codes may have a size of less than 8192 bits, for example less than 4096 bits, less than 2048 bits, less than 1024 bits, or each of the node identification codes may have a size of less than 256 bits. In certain embodiments, for example, a portion of each of the node identification codes may comprise a company identifier. In certain embodiments, for example, a portion of each of the node identification codes may comprise a device-type identifier. In certain embodiments for example, a portion of each of the node identification codes may comprise a random number produced by a random number generator. In certain embodiments, for example, the random number may comprise at least 90% of the bits of each of the node identification codes, for example at least 95%, at least 96%, at least 97%, at least 98%, at least 98.5%, at least 99%, at least 99.5%, at least 99.9% or the random number may comprise at least 99.9% of the bits of each of the node identification codes. In certain embodiments, for example, the random number may comprise less than 99% of the bits of each of the node identification codes, for example less than 98%, or the random number may comprise less than 95% of the bits of each of the node identification codes. In certain embodiments, for example, the random number may comprise in the range of 95-99.9% of the bits of each of the node identification codes, for example in the range of 98-99% of the bits of each of the node identification codes. In certain embodiments, for example, the sum of digits of each of the node identification codes may be a prime number.

In certain embodiments, for example, each of the first record and the second record may contain a source universal application identifier for the source application program (corresponding to the first application or the second application) generating the packet data in an authorized communication. In certain embodiments, for example, the application identifier and the user for the application may correspond to or be based on values obtained by a process status check command. Similarly, in certain embodiments, for example, each of the first record and the second record may contain a destination universal application identifier for the destination application program (corresponding to the first application or the second application) receiving the packet data in an authorized communication. In certain embodiments, for example, the source universal application identifier may comprise an application identifier and a user for the application. In certain embodiments, for example, the first network security software and the second network security software may each exchange with one another the universal application identifier that corresponds to their status (source or destination). In certain further embodiments, for example, the mutual exchange may occur over an encrypted tunnel having the first network security software and the second network security software as endpoints. In certain further embodiments, for example, the exchanged universal application identifiers may be validated by the receiving network security software by reference to the respective first record or second record. In certain embodiments, for example, the mutual validating may be used to partially authorize the aforementioned encrypted tunnel. In certain embodiments, for example, a source universal application identifier may be included in a data packet and validated against the respective record (the first record or the second record) of the destination node in order to authenticate and authorize the data packet. In certain embodiments, for example, each of the source and destination application identifiers may have a length of at least 8 bits, for example at least 16 bits, at least 32 bits, or at least 64 bits. In certain embodiments, for example, the application identifier may have a length of no more than 64 bits, for example no more than 32 bits, no more than 16 bits, or no more than 8 bits. In certain embodiments, for example, the application identifier may have a length in the range of 8-64 bits, for example in the range of 8-32 bits, or in the range of 8-16 bits. In certain embodiments, for example, the application user may have a length of at least 8 bits, for example at least 16 bits, at least 32 bits, or at least 64 bits. In certain embodiments, for example, the each of the source and destination application user may have a length of no more than 64 bits, for example no more than 32 bits, no more than 16 bits, or no more than 8 bits. In certain embodiments, for example, the application user may have a length in the range of 8-64 bits, for example in the range of 8-32 bits, or in the range of 8-16 bits. In certain embodiments, for example, the universal application identifier may be least 8 bits, for example at least 16 bits, at least 32 bits, or at least 64 bits. In certain embodiments, for example, the each of the source and destination universal application identifier may be no more than 128 bits, for example no more than 64 bits, no more than 48 bits, no more than 32 bits, no more than 16 bits, or no more than 8 bits. In certain embodiments, for example, the universal application identifier may have a length in the range of 8-64 bits, for example in the range of 24-64 bits, or in the range of 36-64 bits.

In certain embodiments, for example, each of the first record and the second record may contain a code for a network interface controller of the source node (the source node may be the first node or the second node) from which packet data will be transmitted in the authorized communication. In certain embodiments, for example, each of the first record and the second record may contain a code for the network interface controller for the destination node (the destination node may be the first node or the second node different from the source node) to which packet data will be transmitted in the authorized communication. In certain embodiments, for example, each of the codes may be processed to obtain corresponding network addresses (for example IP addresses). In certain embodiments, for example, the corresponding network addresses may define an authorized source network address and an authorized destination network address in one or plural packet headers. In certain embodiments, for example, each of the network interface controller codes may have a size of at least 64 bits, for example at least 128 bits, at least 256 bits, at least 512 bits, at least 1024 bits, at least 2048 bits, at least 4096 bits, at least 8192 bits, at least 16384 bits, at least 32768 bits, or each of the network interface controller codes may have a size of at least 65536 bits. In certain embodiments, for example, each of the network interface controller codes may have a size of 64 bits, 128 bits, 256 bits, 512 bits, 1024 bits, 2048 bits, 4096 bits, 8192 bits, 16384 bits, 32768 bits, or each of the network interface controller codes may have a size of 65536 bits. In certain embodiments, for example, each of the network interface controller codes may have a size of less than 8192 bits, for example less than 4096 bits, less than 2048 bits, less than 1024 bits, or each of the network interface controller codes may have a size of less than 256 bits.

In certain embodiments, for example, each of the first record and the second record may contain a destination port number associated with the destination application (the first application or the second application). In certain embodiments, for example, the destination port number associated with the destination application may be used to direct packet data from the network security software resident on the destination node (the destination node may be the first node or the second node and the network security software may be the first network security software or the second network security software) to the destination application. In certain embodiments, for example, the destination port number associated with the destination application may be used as an index by the network security software resident on the source node (the source node may be the first node or the second node different from the destination node and the network security software may be the first network security software or the second network security software) to identify the appropriate record in the corresponding first preconfigured list.

In certain embodiments, for example, each of the first record and the second record may contain a destination port number (or an identifier associated with the destination port number) associated with the network security software resident on the destination node (the destination node may be the first node or the second node and the network security software may be the first network security software or the second network security software). In certain embodiments, for example, the destination port number associated with the network security software resident on the destination node may be used by the network security software resident on the source node as a destination address for a network packet. In certain embodiments, for example, the destination port number associated with the network security software resident on the destination node may be used as an endpoint for an encrypted communication pathway (for example an encrypted network tunnel) between the first network security software and the second network security software.

In certain embodiments, for example, each of the first record and the second record may comprise one or plural data description fields (or data description values or data description identifiers). In certain embodiments, for example, one or plural data description fields may designate or be an identifier for a data protocol. In certain embodiments, for example, the data protocol may be a machine-to-machine protocol. In certain embodiments, for example, the data protocol may be an IoT protocol. In certain embodiments, for example, the data protocol may comprise an MQ Telemetry Transport (MQTT) protocol. In certain embodiments, for example, the data protocol may comprise an Advanced Message Queuing Protocol (AMQP). In certain embodiments, for example, the data protocol may comprise a Simple/Streaming Text Oriented Messaging Protocol (STOMP). In certain embodiments, for example, the data protocol may comprise a Data Distribution Service DDS. In certain embodiments, for example, the data protocol may comprise a Constrained Application Protocol (CoAP). In certain embodiments, for example, the data protocol may comprise an Open Platform Communications Unified Architecture (OPC UA) protocol. In certain embodiments, for example, the data protocol may comprise a Java Message Service (JMS) protocol. In certain embodiments, for example, the data protocol may comprise an eXtensible Messaging and Presence Protocol (XMPP). In certain embodiments, for example, the data protocol may comprise a Representational State Transfer (REST) protocol. In certain embodiments, for example, the data protocol may comprise an Open Mobile Alliance Light Weight Machine-to-Machine (OMA LWM2M) protocol. In certain embodiments, for example, the data protocol may comprise a JavaScript Object Notation (JSON) protocol. In certain embodiments, for example, the data protocol may comprise a Simple Network Management Protocol (SNMP). In certain embodiments, for example, the data protocol may comprise a protocol conforming to Technical Report 069: CPE WAN Management Protocol (TR-069-CWMP). In certain embodiments, for example, the data protocol may comprise Hypertext Transfer Protocol (HTTP). In certain embodiments, for example, the data protocol may conform to the Alljoyn framework. In certain embodiments, for example, the data protocol may comprise Modbus protocol (for example Modbus over TCP and UDP). In certain embodiments, for example, the data protocol may conform to VITA 49 radio transport packet specification. In certain embodiments, for example, the data protocol may conform to Edgent protocol. In certain embodiments, for example, the data protocol may comprise a file transfer protocol. In certain embodiments, for example, the data protocol may comprise a domain name server protocol. In certain embodiments, for example, the data protocol may comprise an Internet Control Message Protocol (ICMP). In certain embodiments, for example, the data protocol may comprise a structured query language protocol. In certain embodiments, for example, the data protocol may comprise a publish-subscribe messaging pattern protocol. In certain embodiments, for example, the data protocol may comprise a data distribution service protocol. In certain embodiments, for example, the data protocol may comprise a data structure identifier. In certain embodiments, for example, the data protocol may comprise a data topic. In certain embodiments, for example, the data protocol may comprise a data type (for example “string”, “integer”, “unsigned integer”, “Boolean”, “floating point”, “double precision”, etc.). In certain embodiments, for example, the data protocol may indicate an allowed range (for example a continuous range or a list of allowed values) of values for a data payload. In certain embodiments, for example, the data protocol may comprise a data definition identifier.

In certain embodiments, for example, the one or plural data description fields may comprise a file size or file size identifier (for example a total size of a file being transmitted by one or more payload data). In certain embodiments, for example, the one or plural data description fields may comprise a maximum file size (for example a maximum size of a file being transmitted by one or more payload data). In certain embodiments, for example, the one or plural data description fields may comprise a file name or file name identifier. In certain embodiments, for example, the one or plural data description fields may comprise a command syntax, command type, and/or command type identifier. In certain embodiments, for example, the command type may comprise a SQL command and/or statement, for example the command type may comprise SQLread, SQLwrite, AND/OR, ALTER TABLE, AS (alias), BETWEEN, CREATE DATABASE, CREATE TABLE, CREATE INDEX, CREATE VIEW, DELETE, DROP DATABASE, DROP INDEX, DROP TABLE, EXISTS, GROUP BY, HAVING, IN, INSERT INTO, INNER JOIN, LEFT JOIN, RIGHT JOIN, FULL JOIN, LIKE, ORDER BY, SELECT, SELECT *, SELECT DISTINCT, SELECT INTO, SELECT TOP, TRUNCATE TABLE, UNION, UNION ALL, UPDATE, WHERE, or a combination of two or more of the foregoing commands. In certain embodiments, for example, the command type may comprise a DNS command, for example the command type may comprise IPCONFIG, TRACE ROUTE, NETSTAT, ARP, ROUTE, HOSTNAME, CONTROL NETCONNECTIONS, or a combination of two or more of the foregoing commands. In certain embodiments, for example, the command type may comprise an FTP command, for example the command type may comprise !, $, ?, ACCOUNT, APPEND, ASCII, BEEP, BINARY, BYE, CASE, CD, CDUP, CHMOD, CLOSE, CR, DEBUG, DELETE, DIR, DISCONNECT, EXIT, FORM, GET, GLOB, HASH, HELP, IDLE, IMAGE, IPANY, IPV4, IPV6, LCD, LS, MACDEF, MDELETE, MDIR, MGET, MKDIR, MLS, MODE, MODTIME, MPUT, NEWER, NLIST, NMAP, NTRANS, OPEN, PASSIVE, PROMPT, PROXY, PUT, PWD, QC, QUIT, QUOTE, RECV, REGET, RENAME, RESET, RESTART, RHELP, RMDIR, RSTATUS, RUNIQUE, SEND, SENDPORT, SITE, SIZE, STATUS, STRUCT, SUNIQUE, SYSTEM, TENEX, TICK, TRACE, TYPE, UMASK, USER, VERBOSE, or a combination of two or more of the foregoing commands. In certain embodiments, for example, the command type may comprise a Telnet, an Rlogin, an Rsh, or a Secure Shell command. In certain embodiments, for example, the command type may comprise an ICMP command, for example the command type may comprise PING, TRACEROUTE, ICMP PERMIT, ICMP DENY, or a combination of two or more of the foregoing commands. In certain embodiments, for example, the command type may comprise an MQTT command. In certain embodiments, for example, the one or plural data description fields may comprise a date/time (for example a transmission date/time or a deadline). In certain embodiments, for example, the one or plural data description fields may comprise a time-to-live of the payload data. In certain embodiments, for example, the one or plural data description fields may have a size of at least 64 bits, for example at least 128 bits, at least 256 bits, at least 512 bits, at least 1024 bits, at least 2048 bits, at least 4096 bits, at least 8192 bits, at least 16384 bits, at least 32768 bits, or the one or plural data description fields may have a size of at least 65536 bits. In certain embodiments, for example, the one or plural data description fields may have a size of less than 8192 bits, for example less than 4096 bits, less than 2048 bits, less than 1024 bits, or the one or plural data description fields may have a size of less than 256 bits. In certain embodiments, for example, one or plural data type descriptors present in a data packet may be compared with the one or plural data fields to at least partially determine whether the destination application is authorized to receive data from the data packet.

In certain embodiments, for example, each of the first record and the second record may comprise a private key (or a cryptographic parameter or primitive) for establishing the encrypted communication pathway (for example an encrypted network tunnel), for example by cryptographic key exchange as described herein.

In certain embodiments, for example, a first application being used by a first user and executing on the first node may attempt to establish a listening first port on the first node (for example the first application may open a port and attempt to bind the port to a physical or virtual interface). In certain embodiments, for example, the attempt to establish the listening port may conform to a UDP or a TCP connection protocol. In certain embodiments, for example, the attempt to establish the listening port may conform to a network security protocol, for example an SSL or TLS protocol for a UDP or TCP connection. In certain embodiments, for example, the first network security software (or middleware) may detect the attempt and, in response, the first network security software may form a first network security software listening first port. In certain embodiments, for example, the first network security software listening first port may form a connection with a remote host to become a secure connection endpoint, and data to or from the first application may be transmitted through the secure connection endpoint. In certain embodiments, for example, the first network security software may detect the attempt and allow the first application to establish the listening port, followed by the first network security software forming a connection between a port of the first network security software and the listening port. In certain embodiments, for example, the first network security software may be present on the first node, processor, or computing device. In certain embodiments, for example, the first network security software may comprise a network stack application programming interface function called by the first application. In certain embodiments, for example, the network stack application programming interface function may be, for example, a bind function. In certain embodiments, for example, the network stack application programming interface function may be a listen function. In certain embodiments, for example, the first network security software may be present on the second node, processor, or computing device. In certain embodiments, for example, the first network security software may be present on a third node of the plural nodes. In certain embodiments, for example, the first network security software may detect the attempt and prevent the first port from binding to the physical interface. In certain embodiments, for example, the first network security software may redirect the first application to establish a listening port on the loopback interface, followed by the first network security software forming a connection by the loopback interface with the first application. In certain embodiments, for example, the first network security software may prevent the first application from binding the first port to any interface. In certain embodiments, for example, the first network security software may form a connection (for example a direct connection) with the first application without using the loopback interface. In certain embodiments, for example, the first network security software may form a connection (for example a direct connection) with the first application only after at least one other connection is established (for example a connection between the first network security software and the second network security software, such as a connection between the first network security software and the second network security software dedicated to transmitting data having a specified protocol between the first application and the second application).

In certain embodiments, for example, prior to forming the connection with the first application software or opening the dedicated listening port, the first network security middleware may inspect the first application and the first user making the request to open a listening port. In certain embodiments, for example, the first network security software may obtain one or plural parameters (for example process parameters) for inspection and validate the one or plural parameters against a first preconfigured list (for example a list having the format of a preconfigured list as described herein) prior to allowing the combination of the first user and the first application to transmit or receive data (for example to transmit or to receive data according to a network protocol). In certain embodiments, for example, the one or plural parameters may comprise identifiers for the first user and the first application, and these parameters may be compared with a list of allowed 2-tuple values present in the first preconfigured list (for example in a record of the first preconfigured list). If the 2-tuple is not present in the first preconfigured list, for example, the first network security software may prevent the combination of the first application and the first user from receiving or transmitting data. In certain embodiments, for example, the one or plural parameters may comprise identifiers for the first user, the first application, and the requested port number (i.e., the port number associated with the listening port), and these parameters may be compared with a list of allowed 3-tuple values present in the first preconfigured list. In certain embodiments, for example, the identifiers for the first user, the first application, and the requested port number may correspond to a user of a destination application, the destination application, and a destination port number in a record of the first preconfigured list. If the 3-tuple is not present in the first preconfigured list, for example, the first network security software may prevent the combination of the first application and the first user from receiving or transmitting data.

In certain embodiments, for example, a second application being used by a second user and executing on the second node may attempt to form a connection with the combination of the first application and the first user over the listening first port (for example by attempting to send a connection request through a network stack of the second node). In certain embodiments, for example, the attempt to establish the connection may conform to a UDP or a TCP connection protocol. In certain embodiments, for example, the attempt to establish the connection may conform to a network security protocol, for example an SSL or TLS protocol for a UDP or TCP connection. In certain embodiments, for example, in response to detecting the attempt to establish a connection, a second network security software may form a connection with the first network security software listening first port for the purpose of transmitting data to and/or from the second application from and/or to the first application via the first network security program. In certain embodiments, for example, the second network security software may detect the second application attempt and allow the second application to connect to the second network security software, followed by the second network security software forming a connection with the first network security software. In certain embodiments, for example, the second network security software may be present on the second node, processor, or computing device. In certain embodiments, for example, the second network security software may comprise a network stack application programming interface function called by the second application. In certain embodiments, for example, the network stack application programming interface function may be a bind function (for example bind( )). In certain embodiments, for example, the network stack application programming interface function may be, for example, a connect function (for example connect( )). In certain embodiments, for example, the network stack application programming interface function may be, for example, a function which puts a software port into a listening state (for example listen( )). In certain embodiments, for example, the network stack application programming interface function may be, for example, a close function (for example close( )). In certain embodiments, for example, the second network security software may be present on the first node, processor, or computing device. In certain embodiments, for example, the second network security software may be present on a third node of the plural nodes. In certain embodiments, for example, the second network security software may be the same software as the first network security software (for example the first network security software and the second network security software may be different copies of the computer-readable program code (for example copies obtained from different copies of the at least one component)). In certain embodiments, for example, the second network security software may detect the second application attempt and prevent a port associated with the combination of the second application and the second user (the "second port") from binding or connecting to a physical interface. In certain embodiments, for example, the second network security software may redirect the second application to connect with the second network security software via a loopback interface. In certain embodiments, for example, the second network security software may prevent the second application from binding or connecting the second port to any physical interface. In certain embodiments, for example, the second network security software may form a connection (for example a direct connection) with the second application without use of a loopback interface. In certain embodiments, for example, the second network security software may communicate with the second application by kernel read and/or write commands. In certain embodiments, for example, the first network security software may form a connection (for example a direct connection) with the first application only after at least one other connection is established (for example a connection between the first network security software and the second network security software, such as a connection between the first network security software and the second network security software dedicated to transmitting data having a specified protocol between the first application and the second application).

In certain embodiments, for example, prior to forming the connection with the second application or forming a connection with the first network security software, the second network security software may inspect a combination of the second application and the second user. In certain embodiments, for example, the second network security software may obtain one or plural parameters for the inspection and validate the one or plural parameters against a second preconfigured list prior to allowing the combination of the second user and the second application to transmit or receive data. In certain embodiments, for example, the one or plural parameters may comprise identifiers for the second user and the second application, and these parameters may be compared with a list of allowed 2-tuple values present in the second preconfigured list. If the 2-tuple is not present in the second preconfigured list, for example, the second network security software may prevent the combination of the second application and the second user from receiving or transmitting data. In certain embodiments, for example, the one or plural parameters may comprise identifiers for the second user, the second application, and a destination port number for the requested connection (for example a destination port number associated with the first application), and these parameters may be compared with a list of allowed 3-tuple values present in the second preconfigured list. In certain embodiments, for example, the second user, the second application, and a destination port number for the requested connection may correspond to a user of a source application, the source application, and a port number associated with the destination application present in a record of the second preconfigured list. If the 3-tuple is not present in the second preconfigured list, for example, the second network security software may prevent the combination of the second application and the second user from receiving or transmitting data.

In certain embodiments, for example, the second network security software may use at least the aforementioned destination port number or a destination port identifier (and also optionally an identifier for the source application, an identifier for a user of the source application, or a combination of the identifier for the source application and the identifier for the user of the source application) to identify a different destination port number corresponding to a listening port of the first network security software. In certain embodiments, for example, the second network security software may use at least the aforementioned destination port number or destination port identifier (and also optionally an identifier for the source application, an identifier for a user of the source application, or a combination of the identifier for the source application and the identifier for the user of the source application) for the requested connection as an index into the second preconfigured list to identify a record containing the port number for the listening port of the first network security software. In certain embodiments, for example, said port number for the listening port may be stored in the second preconfigured list.

In certain embodiments, for example, the second network security software may construct or assemble, as described herein, a connection request packet comprising a packet header and metadata. In certain embodiments, for example, the packet header may comprise a destination network address specified by the connection request of the second application. In certain embodiments, for example, the packet header may comprise a destination network address obtainable from (for example specified by or computable from) the second configuration file (for example the destination network address may be specified by or computable from the record identified by at least the destination port number associated with the first application). In certain embodiments, for example, the packet header may comprise destination port number corresponding to the listening port established by the first network security software. In certain embodiments, for example, the packet header may comprise a source network address specified by the connection request of the second application. In certain embodiments, for example, the packet header may comprise a source network address obtainable from (for example specified by or computable from) the second configuration file (for example specified by or computable from the record identified by at least the destination port number associated with the first application). In certain embodiments, for example, the packet header may comprise a source port number associated with the second network security software that has been dynamically assigned (for example by a kernel of the second node). In certain embodiments, for example, the packet header may comprise a non-ephemeral source port number associated with the second network security software, wherein the non-ephemeral source port number is obtained from the second preconfigured list (for example the non-ephemeral source port number is specified in the record identified by at least the destination port number associated with the first application). In certain embodiments, for example, the metadata may comprise a packet type indicator. In certain embodiments, for example, the connection request packet may comprise cipher suite parameters according to a security protocol (for example security protocol such as SSL or TLS).

In certain embodiments, for example, first network security software may drop (or quarantine) the connection request packet if the packet type indicator does not correspond to an expected connection request packet type indicator. In certain embodiments, for example, in response to a threshold number of dropped or rejected connection requests (for example in response to a threshold number of dropped or rejected connection request packets received) from a node (for example connection requests from the second node or another of the plural nodes or a node not present in the plural nodes) the first network security software may add the node to a blacklist. In certain embodiments, for example, the threshold number may be less than 30 connection requests, for example less than 20, less than 15, less than 10, less than 5, less than 4, less than 3, or the threshold number may be less than 2 dropped or rejected connection requests. In certain embodiments, for example, the threshold number may be in the range of 2-10 connection requests, for example in the range of 2-8, in the range of 2-5, or the threshold number may be in the range of 2-4 connection requests. In certain embodiments, for example, the first network security software may drop (for example without attempting to verify) any further connection requests from the sending port of the blacklisted node, processor, or computing device. In certain embodiments, for example, the first network security software may drop (for example without attempting to verify) any further connection requests from any port of the blacklisted node, processor, or computing device. In certain embodiments, for example, the first network security software may terminate all connections (for example inclusive of network tunnels) with the blacklisted node, processor, or computing device. In certain embodiments, for example, the first network security software may drop (for example without attempting to verify) any further connection requests from the sending port after 2 dropped or rejected connection requests, and the network security software may terminate all connections (for example inclusive of network tunnels) after 10 dropped or rejected connection requests.

In certain embodiments, for example, the first network security software and the second network security software may negotiate an encrypted communication pathway (for example an encrypted network tunnel) according to an agreed-to cipher suite, the negotiating based at least on a first private key present in the first preconfigured list and a second private key present in a second preconfigured list. In certain embodiments, for example, the agreed-to choice of cipher suite may be preconfigured. In certain embodiments, for example, the agreed-to choice of cipher suite may be mandatory (i.e., the first node may not select an alternative cipher suite in a connection request reply packet). In certain embodiments, for example, the first private key and the second private key may be different. In certain embodiments, for example, the first private key and the second private key may be the same. In certain embodiments, for example, the first network security software and the second network security software may each execute a key exchange algorithm to generate a symmetric encryption key for encryption of metadata and optionally for encryption of payload data present in network packets transmitted through the negotiated encrypted communication pathway. In certain embodiments, for example, rather than negotiating an encrypted communication pathway, metadata may be protected by passing the metadata through a hash function to form hashed metadata for inclusion in a network packet for transmission over a communication pathway extending between the first network security software and the second network security software. In certain further embodiments, for example, the metadata may be combined with a random number and passed through a hash function to form a salted hashed metadata prior to insertion by the second network security software into a network packet. In certain embodiments, for example, the first network security software may know the hash function used (and, if used, the random number) in order to verify the contents of the metadata.

In certain embodiments, for example, following negotiation of the encrypted communication pathway, the first network security software may construct a first node authentication and authorization packet having the structure of a node authentication and authorization packet as described herein, and transmit the first node authentication and authorization packet to the second node, processor, or computing device. In certain embodiments, for example, the first network security software may obtain a first node authentication code for inclusion in metadata of the first node authentication and authorization packet from a first record of the first configuration file, the first record identified at least based the destination port number of the first network security software. In certain embodiments, for example, upon receipt of the first node authentication and authorization packet, the second network security software may decrypt (or, if applicable, check the hash value of) the first node authentication code and compare the value of the first node authentication code with a value obtained from a second record of the second preconfigured list, the second record identified at least based on the destination port number of the first network security software. In certain embodiments, for example, the constructing (inclusive of encrypting or forming a hash value for the metadata) and the obtaining may be performed by a portion of the first network security software executing in an application space (for example in an application space of the first node). In certain embodiments, for example, the decrypting and comparing may be performed by a portion of the second network security software executing in an application space (for example in an application space of the second node). In certain embodiments, for example, the constructing (inclusive of encrypting or forming a hash value for the metadata) and the obtaining may be performed by a portion of the first network security software executing in kernel space (for example in a kernel space of the first node). In certain embodiments, for example, the decrypting and comparing may be performed by a portion of the second network security software executing in a kernel space (for example in a kernel space of the second node).

In certain embodiments, for example, network security software resident on one of the plural nodes may drop (or quarantine) a received node authentication and authorization packet if the value of a node authentication code extracted from the received packet does not match an expected value. In certain embodiments, for example, in response to a threshold number of dropped or rejected node authentication and authorization packets from a different node (for example another one of the plural nodes or a node not one of the plural nodes), the network security software may add the node to a blacklist. In certain embodiments, for example, the threshold number may be less than 30 node authentication and authorization packets, for example less than 20, less than 15, less than 10, less than 5, less than 4, less than 3, or the threshold number may be less than 2 dropped or rejected node authentication and authorization packets. In certain embodiments, for example, the threshold number may be in the range of 2-10 node authentication and authorization packets, for example in the range of 2-8, in the range of 2-5, or the threshold number may be in the range of 2-4 node authentication and authorization packets. In certain embodiments, for example, the network security software may drop (for example without attempting to verify) any further node authentication and authorization packets from the sending port of the blacklisted node, processor, or computing device. In certain embodiments, for example, the network security software may drop (for example without attempting to verify) any further node authentication and authorization packets from any port of the blacklisted node, processor, or computing device. In certain embodiments, for example, the network security software may terminate all connections (for example inclusive of encrypted communication pathways) with the blacklisted node, processor, or computing device. In certain embodiments, for example, the first network security software may drop (for example without attempting to verify) any further node authentication and authorization packets from the sending port after 2 dropped or rejected node authentication and authorization packets, and the network security software may terminate all connections (for example inclusive of encrypted communication pathways) after 10 dropped or rejected node authentication and authorization packets.

In certain embodiments, for example, following negotiation of the encrypted communication pathway the second network security software may construct a second node authentication and authorization packet having the structure of a node authentication and authorization packet as described herein, and transmit the second node authentication and authorization packet to the first node, processor, or computing device. In certain embodiments, for example, the second node authentication and authorization packet may be transmitted prior to the transmission of the first node authentication and authorization packet. In certain embodiments, for example, the second node authentication and authorization packet may be transmitted after the transmission of the first node authentication and authorization packet. In certain embodiments, for example, the second node authentication and authorization packet may be transmitted after the decrypting and comparing the first node authentication and authorization packet. In certain embodiments, for example, the first node authentication and authorization packet may be transmitted after the decrypting and comparing the second node authentication and authorization packet. In certain embodiments, for example, the second node authentication and authorization packet may not be transmitted if the first node authentication and authorization packet is dropped (or quarantined). In certain embodiments, for example, the first node authentication and authorization packet may not be transmitted if the second node authentication and authorization packet is dropped. In certain embodiments, for example, the second network security software may obtain a second node authentication code for inclusion in metadata of the second node authentication and authorization packet from a second record of the second configuration file, the second record identified at least based the destination port number of the second network security software. In certain embodiments, for example, upon receipt of the second node authentication and authorization packet, the first network security software may decrypt (or, if applicable, check the hash value of) the second node authentication code and compare the value of the second node authentication code with a value obtained from a first record of the first preconfigured list, the first record identified at least based on the destination port number of the second network security software. In certain embodiments, for example, the constructing (inclusive of encrypting or forming a hash value for the metadata) and the obtaining may be performed by a portion of the second network security software executing in an application space (for example in an application space of the second node). In certain embodiments, for example, the decrypting and comparing may be performed by a portion of the first network security software executing in an application space (for example in an application space of the first node). In certain embodiments, for example, the constructing (inclusive of encrypting or forming a hash value for the metadata) and the obtaining may be performed by a portion of the second network security software executing in kernel space (for example in a kernel space of the second node). In certain embodiments, for example, the decrypting and comparing may be performed by a portion of the first network security software executing in a kernel space (for example in a kernel space of the first node).

In certain embodiments, for example, following negotiation of the encrypted communication pathway the first network security software may construct a first payload data authorization and authentication packet having the structure of a payload data authorization and authentication packet as described herein, and transmit the first payload data authorization and authentication packet to the second node, processor, or computing device. In certain embodiments, for example, the first payload data authorization and authentication packet may be constructed and transmitted following construction and transmission of the first node authentication and authorization packet. In certain embodiments, for example, the first network security software may obtain payload data authorization and authentication parameters for inclusion in metadata of the first payload data authorization and authentication packet from the first record of the first configuration file. In certain embodiments, for example, upon receipt of the first payload data authorization and authentication packet, the second network security software may decrypt (or, if applicable, check the hash value of) the payload data authorization and authentication parameters and compare the values with values obtained from the second record of the second preconfigured list. In certain embodiments, for example, the constructing (inclusive of encrypting or forming a hash value for the metadata) and the obtaining may be performed by a portion of the first network security software executing in an application space (for example in an application space of the first node). In certain embodiments, for example, the decrypting and comparing may be performed by a portion of the second network security software executing in an application space (for example in an application space of the second node). In certain embodiments, for example, the constructing (inclusive of encrypting or forming a hash value for the metadata) and the obtaining may be performed by a portion of the first network security software executing in kernel space (for example in a kernel space of the first node). In certain embodiments, for example, the decrypting and comparing may be performed by a portion of the second network security software executing in a kernel space (for example in a kernel space of the second node).

In certain embodiments, for example, network security software resident on one of the plural nodes may drop a received payload data authorization and authentication packet if the value of payload data authorization and authentication parameters extracted from the received packet do not match an expected value. In certain embodiments, for example, in response to a threshold number of dropped or rejected payload data authorization and authentication packets from a different node (for example another one of the plural nodes or a node not one of the plural nodes), the network security software may add the node to a blacklist. In certain embodiments, for example, the threshold number may be less than 30 payload data authorization and authentication packets, for example less than 20, less than 15, less than 10, less than 5, less than 4, less than 3, or the threshold number may be less than 2 dropped or rejected payload data authorization and authentication packets. In certain embodiments, for example, the threshold number may be in the range of 2-10 payload data authorization and authentication packets, for example in the range of 2-8, in the range of 2-5, or the threshold number may be in the range of 2-4 payload data authorization and authentication packets. In certain embodiments, for example, the network security software may drop (for example without attempting to verify) any further payload data authorization and authentication packets from the sending port of the blacklisted node, processor, or computing device. In certain embodiments, for example, the network security software may drop (for example without attempting to verify) any further payload data authorization and authentication packets from any port of the blacklisted node, processor, or computing device. In certain embodiments, for example, the network security software may terminate all connections (for example inclusive of encrypted communication pathways) with the blacklisted node, processor, or computing device. In certain embodiments, for example, the first network security software may drop (for example without attempting to verify) any further node payload data authorization and authentication packets from the sending port after 2 dropped or rejected payload data authorization and authentication packets, and the network security software may terminate all connections (for example inclusive of encrypted communication pathways) after 10 dropped or rejected payload data authorization and authentication packets.

In certain embodiments, for example, following negotiation of the encrypted communication pathway the second network security software may construct a second payload data authorization and authentication packet having the structure of a payload data authorization and authentication packet as described herein, and transmit the second payload data authorization and authentication packet to the first node, processor, or computing device. In certain embodiments, for example, the second payload data authorization and authentication packet may be transmitted prior to transmission of the first payload data authorization and authentication packet. In certain embodiments, for example, the second payload data authorization and authentication packet may be transmitted after transmission of the first payload data authorization and authentication packet. In certain embodiments, for example, the second payload data authorization and authentication packet may be constructed and transmitted following construction and transmission of the second node authentication and authorization packet. In certain embodiments, for example, the second payload data authorization and authentication packet may be transmitted after the decrypting and comparing the first payload data authorization and authentication packet. In certain embodiments, for example, the first payload data authorization and authentication packet may be transmitted after the decrypting and comparing the second payload data authorization and authentication packet. In certain embodiments, for example, the second payload data authorization and authentication packet may not be transmitted if the first payload data authorization and authentication packet is dropped. In certain embodiments, for example, the first payload data authorization and authentication packet may not be transmitted if the second payload data authorization and authentication packet is dropped. In certain embodiments, for example, the second network security software may obtain payload data authorization and authentication parameters for inclusion in metadata of the second payload data authorization and authentication packet from the second record of the second configuration file. In certain embodiments, for example, upon receipt of the second payload data authorization and authentication packet, the first network security software may decrypt (or, if applicable, check the hash value of) the payload data authorization and authentication parameters and compare the values with values obtained from the first record of the first preconfigured list. In certain embodiments, for example, the constructing (inclusive of encrypting or forming a hash value for the metadata) and the obtaining may be performed by a portion of the second network security software, said portion executing in an application space (for example in an application space of the second node). In certain embodiments, for example, the decrypting and comparing may be performed by a portion of the first network security software, said portion executing in an application space (for example in an application space of the first node). In certain embodiments, for example, the constructing (inclusive of encrypting or forming a hash value for the metadata) and the obtaining may be performed by a portion of the second network security software, said portion executing in kernel space (for example in a kernel space of the second node). In certain embodiments, for example, the decrypting and comparing may be performed by a portion of the first network security software, said portion executing in a kernel space (for example in a kernel space of the first node).

In certain embodiments, for example, if the first node authentication and authorization packet, second node authentication and authorization packet, first payload data authorization and authentication packet, and second payload data authorization and authentication packet are successfully validated, the first application and the second application may transmit payload data packets that the first network security software and the second network security software will allow to be transported across the encrypted communication pathway. In certain embodiments, for example, the destination port number of the first network security software may be recorded in a list of authorized open connections on the first node upon successful validation of the first node authentication and authorization packet, second node authentication and authorization packet, first payload data authorization and authentication packet, and second payload data authorization and authentication packet. In certain embodiments, for example, if any one of the first node authentication and authorization packet, second node authentication and authorization packet, first payload data authorization and authentication packet, and second payload data authorization and authentication packet are not successfully validated, whichever of the first network security software and the second network security software detect the unsuccessful validation may terminate the encrypted communication pathway (and optionally remove the terminated encrypted communication pathway from a list of authorized open connections and/or change the connection status of the encrypted communication pathway). In certain embodiments, for example, terminating the encrypted communication pathway may comprise releasing the destination port. In certain embodiments, for example, in addition to terminating the encrypted communication pathway, the first network security software may terminate the connection formed between the first network security software and the first application. In certain embodiments, for example, in addition to terminating the encrypted communication pathway, the second network security software may terminate the connection formed between the second network security software and the second application.

In certain embodiments, for example, the source port number of the second network security software may be recorded in a list of authorized open connections on the second node upon successful validation of the first node authentication and authorization packet, second node authentication and authorization packet, first payload data authorization and authentication packet, and second payload data authorization and authentication packet. In certain embodiments, for example, a source port number of the second network security software of each payload packet may be compared to the authorized list of open connections on the second node prior to transmitting the payload packet to the first network security software. In certain embodiments, for example, a payload packet may be dropped if said source port does not appear on the authorized list of open connections on the second node, processor, or computing device.

In certain embodiments, for example, a destination port number of each payload packet received by the first network security software may be compared to the authorized list of open connections on the first node, processor, or computing device. In certain embodiments, for example, a payload packet may be dropped if the destination port does not appear in the authorized list of open connections. In certain embodiments, for example, each payload packet received by the first network security software from the network tunnel may be checked to verify that the metadata contains the required second payload data authorization and authentication parameters. In certain embodiments, for example, if said verification fails then the payload packet may be dropped. In certain embodiments, for example, if more than a threshold number of payload packets received by the first network security software from the encrypted communication pathway fail to be verified, then the encrypted communication pathway may be terminated. In certain embodiments, for example, if more than 1 payload packet received by the first network security software from the encrypted communication pathway fails to be verified, for example more than 5, more than 10, more than 15, more than 30, more than 50, or if more than 100 payload packets received by the first network security software from the encrypted communication pathway fail to be verified, then the encrypted communication pathway may be terminated. In certain embodiments, for example, if more than a threshold number of payload packets received by the first network security software in a continuous sequence from the encrypted communication pathway fail to be verified, then the encrypted communication pathway may be terminated. In certain embodiments, for example, if more than 2 payload packets received in a continuous sequence by the first network security software from the encrypted communication pathway fail to be verified, for example more than 4, more than 8, more than 12, more than 18, more than 24, or if more than 48 payload packets received by the first network security software in a continuous sequence from the encrypted communication pathway fail to be verified, then the encrypted communication pathway may be terminated. In certain embodiments, for example, if a rolling counter defined as (a) a multiplier times (b) the number of payload packets received by the first network security software from the encrypted communication pathway failing to be verified, minus (c) another multiplier times (d) the number of payload packets received by the first network security software from the encrypted communication pathway successfully verified exceeds a threshold number, then the encrypted communication pathway may be terminated. In certain embodiments, for example, the multiplier may be 1 and the another multiplier may be 1. In certain embodiments, for example, the multiplier may be larger than the another multiplier. In certain embodiments, for example, the multiplier may be less than the another multiplier. In certain embodiments, for example, the another multiplier may be 1 and the multiplier may be greater than 1, for example the multiplier may be at least 1.25 (for example 1.25), at least 1.5 (for example 1.5), at least 2 (for example 2), at least 2.5 (for example 2.5), or the multiplier may be at least 3 (for example 3). In certain embodiments, for example, the threshold number may be less than 2, for example less than 4, less than 8, less than 10, less than 20, less than 30, less than 50, or the threshold number may be less than 100. In certain embodiments, for example, the threshold number may be in the range of 10-50, for example in the range of 20-40, or the threshold number may be in the range of 25-35. In certain embodiments, for example, the multiplier may be 1, the another multiplier may be 1, and the threshold number may be less than 30, for example less than 20, or less than 10. In certain embodiments, for example, the multiplier may be 3, the another multiplier may be 1, and the threshold number may be less than 60, for example less than 40, less than 30, less than 20, or less than 10.

In certain embodiments, for example, each payload packet received by the second network security software from the encrypted communication pathway may be checked to verify that the metadata contains the required first payload data authorization and authentication parameters. In certain embodiments, for example, if said verification fails then the payload packet may be dropped. If more than a threshold number of payload packets received by the second network security software from the encrypted communication pathway fail to be verified, then the encrypted communication pathway may be terminated. In certain embodiments, for example, if more than 1 payload packet received by the first network security software from the encrypted communication pathway fails to be verified, for example more than 5, more than 10, more than 15, more than 30, more than 50, or if more than 100 payload packets received by the first network security software from the encrypted communication pathway fail to be verified, then the encrypted communication pathway may be terminated. In certain embodiments, for example, if more than a threshold number of payload packets received by the second network security software in a continuous sequence from the encrypted communication pathway fail to be verified, then the encrypted communication pathway may be terminated. In certain embodiments, for example, if more than 2 payload packets received in a continuous sequence by the first network security software from the encrypted communication pathway fail to be verified, for example more than 4, more than 8, more than 12, more than 18, more than 24, or if more than 48 payload packets received by the first network security software in a continuous sequence from the encrypted communication pathway fail to be verified, then the encrypted communication pathway may be terminated. In certain embodiments, for example, if a rolling counter defined as (a) a multiplier times (b) the number of payload packets received by the first network security software from the encrypted communication pathway failing to be verified, minus (c) another multiplier times (d) the number of payload packets received by the first network security software from the encrypted communication pathway successfully verified exceeds a threshold number, then the encrypted communication pathway may be terminated. In certain embodiments, for example, the multiplier may be 1 and the another multiplier may be 1. In certain embodiments, for example, the multiplier may be larger than the another multiplier. In certain embodiments, for example, the multiplier may be less than the another multiplier. In certain embodiments, for example, the another multiplier may be 1 and the multiplier may be greater than 1, for example the multiplier may be at least 1.25 (for example 1.25), at least 1.5 (for example 1.5), at least 2 (for example 2), at least 2.5 (for example 2.5), or the multiplier may be at least 3 (for example 3). In certain embodiments, for example, the threshold number may be less than 2, for example less than 4, less than 8, less than 10, less than 20, less than 30, less than 50, or the threshold number may be less than 100. In certain embodiments, for example, the threshold number may be in the range of 10-50, for example in the range of 20-40, or the threshold number may be in the range of 25-35. In certain embodiments, for example, the multiplier may be 1, the another multiplier may be 1, and the threshold number may be less than 30, for example less than 20, or less than 10. In certain embodiments, for example, the multiplier may be 3, the another multiplier may be 1, and the threshold number may be less than 60, for example less than 40, less than 30, less than 20, or less than 10.

In certain embodiments, for example, the each of the plural nodes may comprise network security software, wherein the network security software may treat any network packet received by a port of the network security software as a malicious packet unless it is a connection request packet, a verified node authentication and authorization packet, a verified payload data authorization and authentication packet, or a verified payload packet as described herein.

In certain embodiments, for example, prior to transmission of a network packet by a first execution thread of the first network security software, a second execution thread (for example of the first network security software) may verify that the user of the first execution thread is an authorized user (for example by determining the user is the root user of a node on which the first execution thread is executing). In certain embodiments, for example, prior to transmission of a network packet by a first execution thread of the second network security, a second execution thread of the second network security software may verify that the user of the first execution thread is an authorized user, for example the root user of a node on which the first execution thread is executing.

In certain embodiments, for example, payload data may be translated by network security software from a native format (for example a native format associated with an application) into a common format prior to insertion in the payload data packet. In certain embodiments, for example, the common format may conform to a machine-to-machine protocol. In certain embodiments, for example, the format may conform to an IoT protocol. In certain embodiments, for example, the common format may conform to an MQ Telemetry Transport (MQTT) protocol. In certain embodiments, for example, the common format may conform to an Advanced Message Queuing Protocol (AMQP). In certain embodiments, for example, the common format may conform to a Simple/Streaming Text Oriented Messaging Protocol (STOMP). In certain embodiments, for example, the common format may conform to a Data Distribution Service DDS. In certain embodiments, for example, the common format may conform to a Constrained Application Protocol (CoAP). In certain embodiments, for example, the common format may conform to a Java Message Service (JMS). In certain embodiments, for example, the common format may conform to an eXtensible Messaging and Presence Protocol (XMPP). In certain embodiments, for example, the common format may conform to a Representational State Transfer (REST) protocol. In certain embodiments, for example, the common format may conform to an Open Mobile Alliance Light Weight Machine-to-Machine (OMA LWM2M) protocol. In certain embodiments, for example, the common format may conform to an Open Platform Communications Unified Architecture (OPC UA) protocol. In certain embodiments, for example, the common format may conform to a JavaScript Object Notation (JSON) protocol. In certain embodiments, for example, the common format may conform to an instant messaging protocol. In certain embodiments, for example, the common format may be a proprietary format (for example may conform to a proprietary protocol). In certain embodiments, for example, the translation may be performed in an application space of node where the network security software is resident. In certain embodiments, for example, network security software may translate received payload data from a common format to a native format according to a receiving application.

In certain embodiments, for example, first network security software resident on a first node may translate data (or a portion thereof) from a first native format to a common format, followed by inclusion of the translated data in a network packet. In certain embodiments, for example, the network packet may be transmitted from the first node to a second node, processor, or computing device. In certain embodiments, for example, second network software resident on the second node may translate the translated data (or translated portion thereof) from the common format into a second native format. In certain embodiments, for example, the data in the second native format may be transmitted to an application resident on the second node, processor, or computing device.

In certain embodiments, for example, prior to the second network security software performing said translating, the second network security software may treat incoming data as translated data and inspect the incoming data based on a predetermined policy (for example a policy based on a data type of the translated data). In certain further embodiments, for example, the inspecting may comprise determining the size(s) (or length(s)) of a portion, portions, or all the incoming data (for example checking using a command such as a rangeCheck command( )), and comparing the determined size(s) with minimum and/or maximum allowed size(s). In certain embodiments, for example, the minimum and/or maximum allowed size(s) may be obtained from the predetermined policy. In certain embodiments, for example, the inspecting may be followed by discarding the incoming data if the data does not conform to the predetermined policy. In certain embodiments, for example, the discarding may be effective to defeat a return-oriented programing exploit. In certain embodiments, for example, the discarding may prevent an attacker from gaining control of a program call stack running on the second node, processor, or computing device.

In certain embodiments, for example, the first native format and the second native format may be the same. In certain embodiments, for example, the first native format and the second native format may be different. In certain embodiments, for example, the translation of the data (or a portion thereof) from the first native format to the common format may chop malware contained in the data (or a portion thereof) into two or more discontiguous segments. In certain embodiments, for example, the translation of the data (or a portion thereof) from the first native format to the common format may render malware contained in the data (or a portion thereof) inoperable. In certain embodiments, for example, the translation of the data (or a portion thereof) from the common format to the second native format may chop (or shred) malware contained in the data (or a portion thereof) into two or more discontiguous segments. In certain embodiments, for example, the translation of the data (or a portion thereof) from the common format to the second native format may not reassemble malware originally contained in the data (or a portion thereof) in its first native format into a contiguous executable code (for example the first native format may be different from the second native format). In certain embodiments, for example, the translation of the data (or a portion thereof) from the common format to the second native format may render malware contained in the data (or a portion thereof) inoperable.

In certain embodiments, for example, the second node of the plural nodes may be a gateway server to different nodes than the plural nodes. In certain embodiments, for example, the second node of the plural nodes may be configured to receive network packet communications by connections which are not negotiated by the second network security software, followed by transmitting at least a portion of the received network packet communications through an authorized encrypted communication pathway that is negotiated by the first network security software and the second network security software. In certain embodiments, for example, the at least a portion of the received network packet communications may be passed through a trusted application to form trusted at least a portion of the received network packet communications, followed by passing the trusted at least a portion of the received network packet communications through the authorized encrypted communication pathway. In certain embodiments, for example, the at least a portion of the received network packet communications may be modified to render any executable computer code present in the received network packet communications nonexecutable. In certain embodiments, for example, the at least a portion of the received network packet communications may be modified, chopped, or shredded to render any executable code present in the received network packet communications nonexecutable. In certain embodiments, for example, the at least a portion of the received network packet communications may be padded to render any executable code present in the received network packet communications nonexecutable. In certain embodiments, for example, the at least a portion of the received network packet communications may be converted to a nonexecutable format. In certain embodiments, for example, the at least a portion of the received network packet communications may be converted to an ASCII text format. In certain embodiments, for example, the at least a portion of the received network packet communications may be passed through a function (for example a bitwise function or a cryptographic function) to render it nonexecutable. In certain embodiments, for example, the ratio of the different nodes to the plural nodes may be less than 1:1, for example less than 1:2, less than 1:3, less than 1:4, less than 1:5, less than 1:8, less than 1:9, less than 1:10, less than 1:20, or the ratio of the different nodes to the plural nodes may be less than 1:50.

Certain embodiments may provide, for example, use of any of the foregoing systems, methods, or apparatuses to defeat an attack over a network (for example an attack by malware resident on the node or on a remote node). In certain embodiments, for example, the attack may comprise a port scan attack whereby the malware detects an open port (for example a port in listening mode) on the node, processor, or computing device.

In certain embodiments, for example, malware may use a compromised password (for example a weak administrator password that has been compromised) to gain access to one or plural nodes, followed by transmitting data from the one or plural nodes.

In certain embodiments, for example, spyware present on a node may transmit keystrokes from a keyboard to a remote machine in order to obtain confidential information (for example a password for the machine or one or plural applications.

In certain embodiments, for example, the attack may comprise the malware spoofing a second node with which the first node is authorized to communicate. In certain embodiments, for example, the malware may monitor network traffic between the node and the further node to determine, for example, a node address, a node port number, a communication session ID, and a network packet sequence number associated with a communication session. In certain further embodiments, for example, the malware may modify Address Resolution Protocol (ARP) caches present on the node and on a router, causing network packets to be routed through the malware. Alternatively, in certain embodiments, for example, the malware may trigger a connection reset between the node and the router. In certain further embodiments, for example, the malware may spoof the node by registering with the router using the determined address and port number, and highjack the communication session with the further node, processor, or computing device. In certain further embodiments, for example, the node may redirect the node traffic to pass through the malware when the node reconnects with the router.

In certain embodiments, for example, the attack may comprise negotiating an encrypted tunnel with a network security agent resident on the node (and, in the case of a man-in-the-middle attack, negotiating a further encrypted tunnel with a second node). In certain embodiments, for example, the malware may obtain one or plural private keys from the node, enabling key exchange between the malware and the node, decryption of encrypted network packets, network packet payloads, and/or network packet metadata. In certain embodiments, for example, the malware may obtain the one or plural private keys based on a flaw in security software. By way of example, certain versions of OpenSSL (publicly available secured socket layer encryption software) contain a bug (the so-called "Heartbleed" bug) that has been exploited malware to read node memory. According to the Heartbleed bug, a malware client may send a "heartbeat" network packet to a server node, the packet containing a payload size parameter. Exploiting the fact that the OpenSSL versions require the server node respond to the heartbeat network packet in kind with the same heartbeat request, the malware may submit a payload size parameter much larger than the actual payload, which may cause the server to send random data from its memory to meet the length requirements of specified by the payload size parameter. By inspecting the random bits of data, in certain instances the malware may be able to identify sufficient cryptographic data to compromise a security protocol.

In certain embodiments, for example, the network attack may comprise a side-channel attack. In certain embodiments, for example, the network attack may comprise a challenge ACK side channel attack. In certain embodiments, for example, the side channel attack may be rendered ineffective by requiring, according to the methods described herein, the exchange and authorization of encrypted device, application, user, and/or data protocol parameters across an encrypted communication pathway prior to authorizing port-to-port communication (or higher than OSI layer three communication) across the encrypted communication pathway and, once port-to-port communication is authorized, further requiring, according to the methods described herein, that each payload passed to an application port is obtained from a network packet containing an expected application, user, and/or data protocol identifier.

In certain embodiments, for example, the network attack may comprise a denial-of-service attack, whereby one or plural remote nodes attempt to temporarily or indefinitely render node resources unavailable to its intended users. In certain embodiments, for example, the denial-of-service attack may comprise a distributed denial of service attack, whereby incoming network packets from plural sources flood the node, processor, or computing device. In certain embodiments, for example, the denial-of-service attack may comprise an OSI application layer attack whereby network packet data may flood application layer memory. In certain further embodiments, for example, the OSI application layer attack may trigger buffer overflow on the node, processor, or computing device. Buffer overflow may result in consumption of all available CPU memory (or in the introduction of malware into an executable region of node memory). In certain embodiments, for example, the denial-of-service attack may comprise a so-called "banana attack" whereby outgoing network packets are redirected to the client, thereby impairing incoming network traffic from reaching the node (and potentially flooding node memory with the redirected network packets). In certain embodiments, for example, the denial-of-service attack may be a so-called "Smurf" attack, whereby malware may spoof the source address of the node in network packets and exploit one or plural misconfigured network devices to cause the network packets to be broadcast to each member of a network. The resulting network traffic may use up the network's bandwidth. In certain embodiments, for example, the denial-of-service attack may comprise the so-called "ping flood", whereby the node may receive an overwhelming number of ping packets over the network. In the so-called "Ping of death" attack, for example, the malware may provide a malformed ping packet that may consume node resources. In the so-called "BlackNurse attack", for example, malware may transmit packets indicating that a destination port is unreachable. In certain embodiments, for example, the denial-of-service attack may comprise the so-called "shrew attack", whereby short synchronized bursts of traffic may disrupt TCP connections on the same link, by exploiting a weakness in TCPs retransmission timeout mechanism. In certain embodiments, for example, the denial-of-service attack may comprise the so-called "Slow Read" attack whereby malware sends properly formed application layer requests but reads responses very slowly, thus trying to exhaust the nodes connection pool. In certain embodiments, for example, the denial-of-service attack may comprise the so-called "teardrop attack", whereby malformed network fragments with overlapping, oversized payloads are transmitted to the node, processor, or computing device. In certain embodiments, for example, the teardrop attack may compromise certain kernels (for example Windows 3.1x, Windows 95 and Windows NT operating systems, as well as versions of Linux prior to versions 2.0.32 and 2.1.63) due to a bug in their TCP/IP fragmentation re-assembly code. In certain embodiments, for example, the network attack may comprise a malicious file list object (for example a compromised file) configured to be executed by software that is ostensibly not malicious (for example an authorized application software program or an operating system program).

Figure 21:
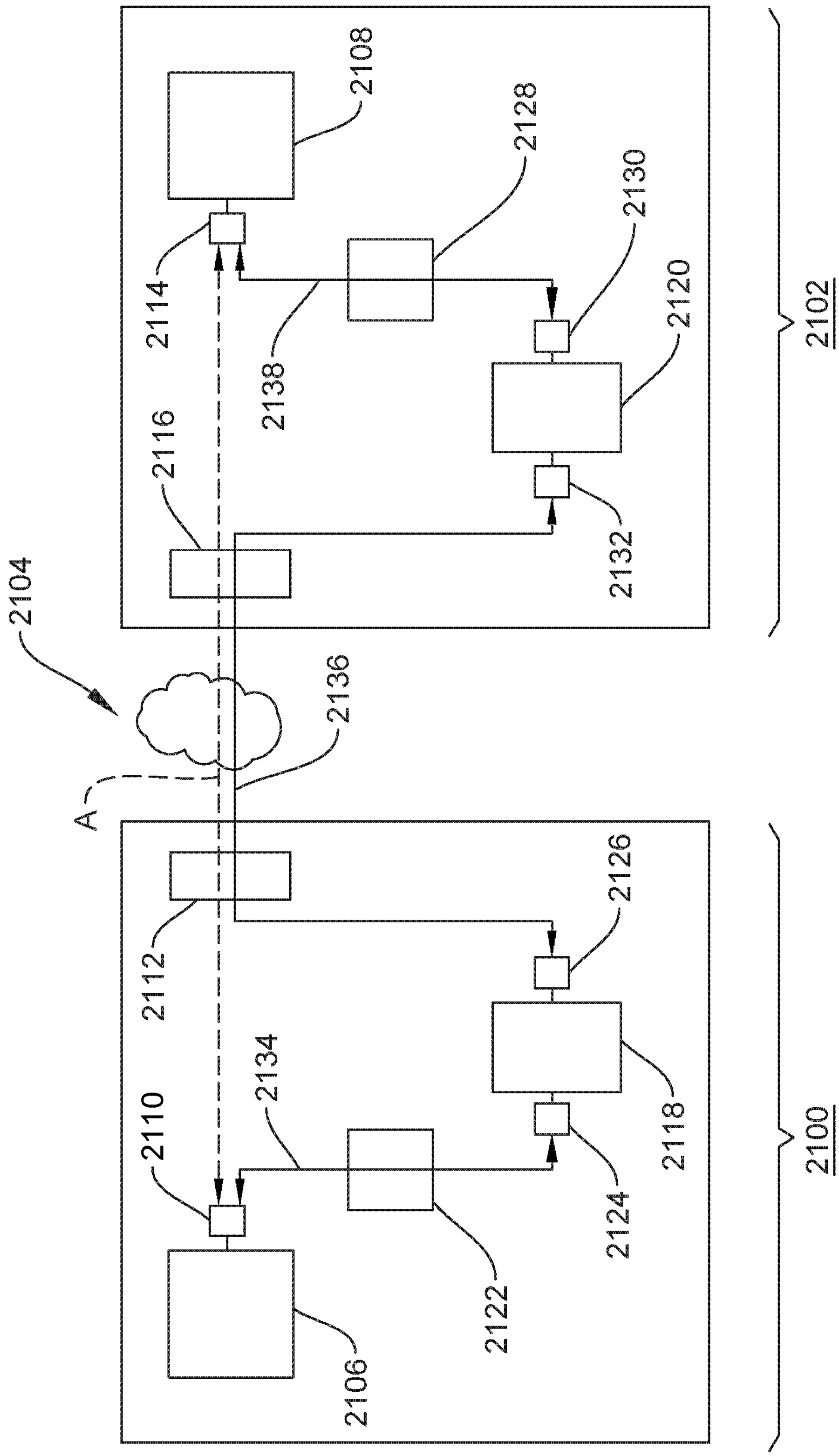
FIG. 21: Schematic view of exemplary data flow between nodes coupled to a network.

A schematic view of an exemplary data flow for data transmission between a first node 2100 and a second node 2102 across a network 2104 is illustrated in FIG. 21. According to this embodiment, a first application 2106 executing on the first node 2100 and a second application 2108 executing on the second node 2102 attempt to form a communication pathway (or channel) A (the communication pathway (or channel) is shown by the identifier A only for reference, and it is not part of the exemplary data flow managed by network security agent as described below), comprising attempting to associate a first port 2110 of the first application 2106 with a first physical interface 2112 of the first node 2100 and attempting to associate a second port 2114 of the second application 2108 with a second physical interface 2116 of the second node 2102. Of note, the first port 2110 and/or the second port 2114 may have predefined port numbers or may have ephemeral port numbers that are assigned at some point before, during, or subsequent to the attempt to form the communication pathway (or channel) A. According to this embodiment, a first network security agent 2118 and a second network security agent 2120 are cooperatively configured to prevent the attempted communication pathway (or channel) A from being formed. The first network security agent 2118 intercepts the attempt to associate the first port 2110 with the first physical interface 2112 and redirects the first port 2110 to associate with a first loopback interface 2122 of the first node 2100. Furthermore, the first network security agent 2118 causes a third port 2124 of the first network security agent 2118 to associate with the first loopback interface 2122 and a fourth port 2126 of the first network security agent to associate with the first physical interface 2112. The second network security agent 2120 intercepts the attempt to associate the second port 2114 with the second physical interface 2116 and redirects the second port 2114 to associate with a second loopback interface 2128 of the second node 2102. Furthermore, the second network security agent 2120 causes a fifth port 2130 of the second network security agent 2120 to associate with the second loopback interface 2128 and a sixth port 2132 of the second network security agent to associate with the second physical interface 2116. The first application 2106 and the first network security agent 2118 negotiate a first communication pathway (or channel) 2134, the first network security agent 2118 and the second network security agent 2120 negotiate a second communication pathway (or channel) 2136, and the second network security agent 2120 and the second application 2108 negotiate a third communication pathway (or channel) 2138, whereby data may be transmitted by a data path comprising the first communication pathway (or channel) 2134, the second communication pathway (or channel) 2136, and the third communication pathway (or channel) 2138.

Figure 22:
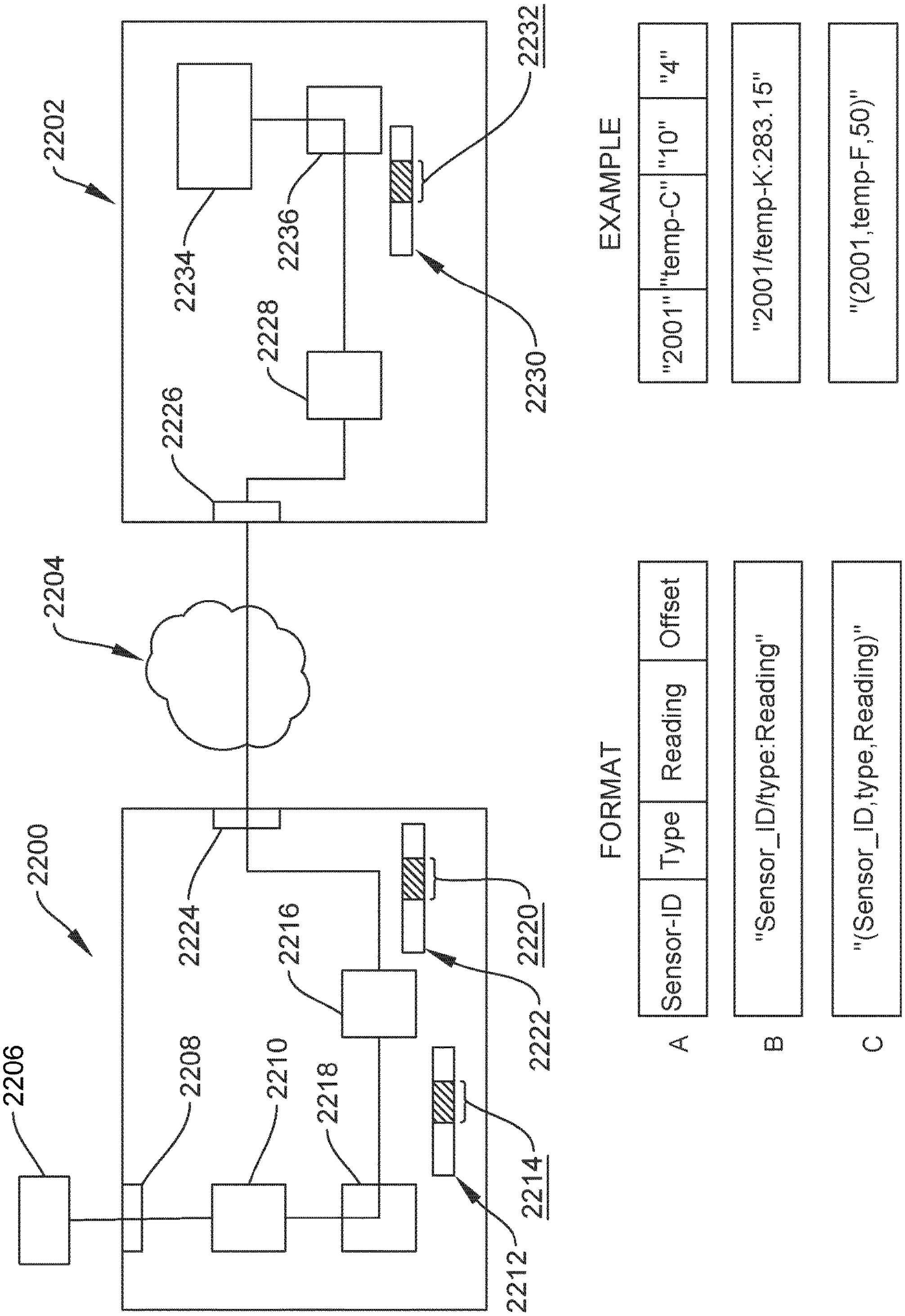
FIG. 22: Schematic view of an exemplary translated data flow between nodes coupled to a network.

A schematic view of an exemplary translated data flow between a first node 2200 and a second node 2202 across a network 2204 is illustrated in FIG. 22. According to this embodiment, a sensor 2206 transmits a sensor reading across a physical interface 2208 of the first node 2200 to sensor software 2210, which may include a driver for the sensor 2206. The sensor software 2210 transmits a first packet 2212 containing the sensor reading in a payload 2214 of the first packet 2212 to a first network security software 2216 via a loopback interface 2218 of the first node 2200 (i.e., the first packet 2212 is passed through a network stack via the loopback interface 2218 and the payload 2214 passed to the first network security software 2216). The first packet payload 2214 has a first native data format A, the first native data format A including an offset, the sensor reading, a fixed-width sensor identifier, and a fixed-width data type identifier. The offset provides an index to the start of the fixed-width sensor identifier in the payload. The sensor reading in the first native data format may be provided in first native units (for example a temperature value may be provided in degrees Celsius, as shown) or may be unitless. The first network security software 2216 includes a translator, the translator configured to convert the sensor data payload 2214 from the first native data format A to a translated format B (to form a translated sensor data payload 2220), the translated format B consisting of the sensor identifier, the data type, and a translated sensor reading, wherein a forward slash ("/") delimits the sensor identifier and the data type, and a colon (":") delimits the data type and the translated sensor data value. The translated sensor reading may be provided in translated units (for example a translated temperature value may be provided in degrees Kelvin, as shown) or may be unitless.

The first network security software transmits a second data packet 2222 containing the translated sensor data payload 2220 via a physical interface 2224 across the network 2204 to the second node 2202 via a physical interface 2226 where the second data packet 2222 is received by second network security software 2228. The second network security software 2228 includes a translator, the translator configured to convert the sensor data payload 2220 from the translated format B to a second native data format C expected by a database application, the second native data format C consisting of the sensor identifier, the data type, and a sensor reading in comma delimited format and enclosed in parenthesis. The sensor reading, following conversion from the translated format C by the second network security software 2228, may be provided according to second native units (for example a temperature value may be provided in degrees Fahrenheit, as shown) or may be unitless. The second network security software 2228 transmits a third packet 2230 containing the sensor data payload 2232 having the second native data format C to a database application 2234 via a loopback interface 2236 of the second node 2202.

The network security software (2216 and 2228) may perform additional communication management operations. In addition to translating the payload 2214, the network security software 2216 may be configured to evaluate the payload 2214 prior to the translating to determine whether the payload 2214 conforms to the first native data format A by checking whether the fixed-width sensor identifier is an integer falling within a pre-established valid range, whether the fixed-width data type identifier is one of a pre-established allowed type of data (for example "temp-C"), and whether the sensor reading is an integer or floating point number falling within a pre-established range. If the payload 2214 fails to conform to the first native data format A, the network security software 2216 may discard the payload 2214 without translating it. In addition to translating the payload 2220, the network security software 2228 may be configured to evaluate the payload 2220 prior to the translating to determine whether the payload 2220 conforms to the translated format B by checking whether the sensor identifier is an integer falling within a valid range, whether the data type identifier is one of a pre-established allowed type of data (for example "temp-K"), and whether the sensor reading is an integer or floating point number falling within a pre-established range. If the payload 2220 fails to conform to the translated format B, the network security software 2216 may discard the payload 2220 without translating it.

Figure 23:
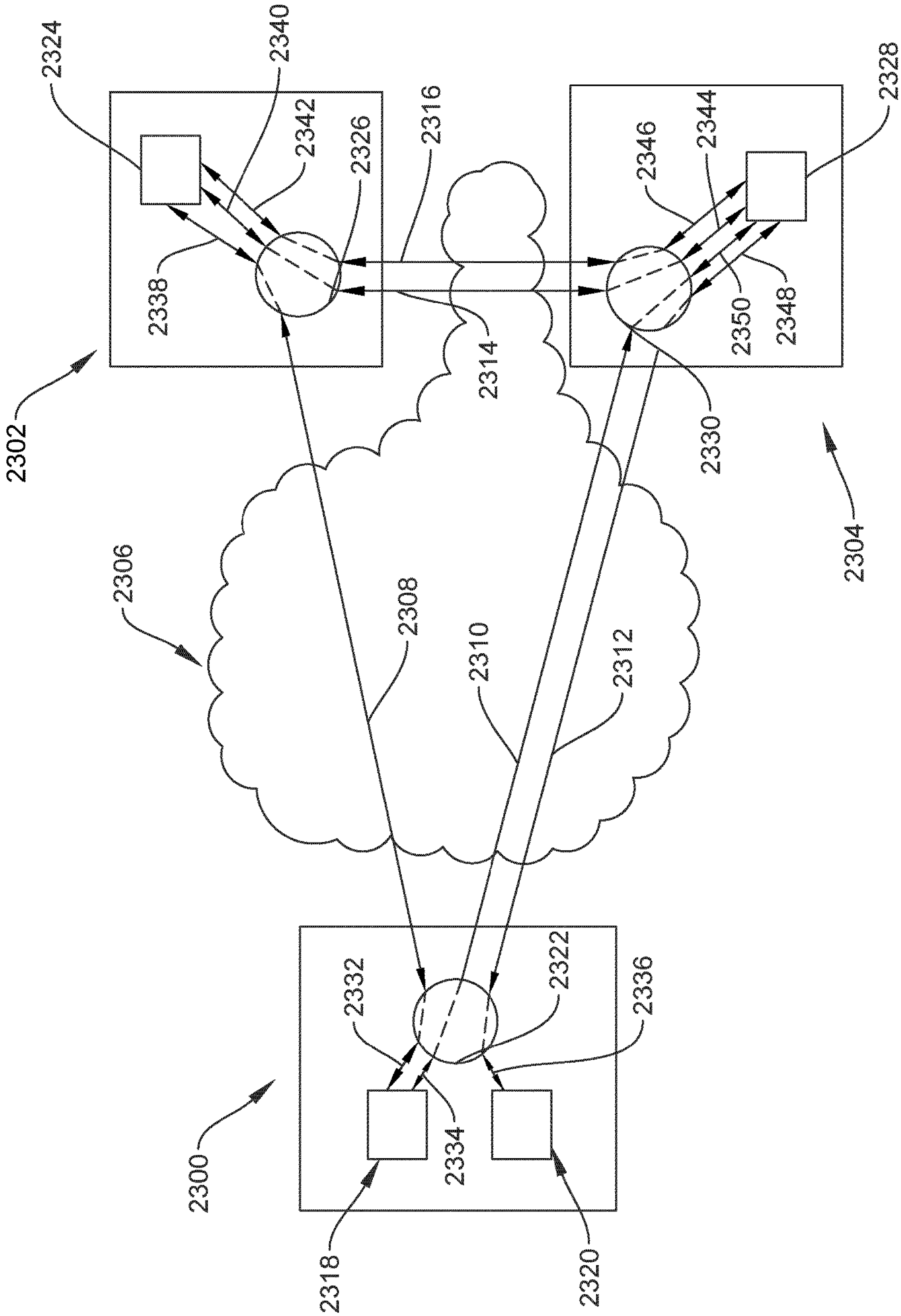
FIG. 23: Schematic view of exemplary network configuration.

A schematic view of an exemplary network configuration is illustrated in FIG. 23. The network comprises a first node 2300, a second node 2302, and a third node 2304 exchanging data over network 2306 through a first encrypted bidirectional connection (for example network tunnel) 2308, a second encrypted unidirectional connection (for example network tunnel) 2310, a third encrypted unidirectional connection (for example network tunnel) 2312, a fourth encrypted unidirectional connection (for example network tunnel) 2314, and a fifth encrypted bidirectional connection (for example network tunnel) 2316. The first node 2300 comprises a first application program 2318, a second application program 2320, and a first network security software 2322. The second node 2302 comprises a third application program 2324 and a second network security software 2326. The third node 2304 comprises a fourth application program 2328 and a third network security software 2330. Each of the application programs (2318, 2320, 2324, and 2328) communicate data to and from their respective network security software (2322, 2326, or 2330) by bidirectional connections 2332, 2334, 2336, 2338, 2340, 2342, 2344, 2346, 2348, 2350 as indicated. The first network security software 2322 is configured to (a) transmit data conforming exclusively to a first data protocol received from the first application program 2318 by bidirectional connection 2332 to the first encrypted bidirectional connection (for example network tunnel) 2308; and (b) transmit data conforming exclusively to the first data protocol received from the first encrypted bidirectional connection (for example network tunnel) 2308 to the first application program 2318 by bidirectional connection 2332. The first network security software 2322 is also configured to transmit data conforming exclusively to a second data protocol received from the first application program 2318 by bidirectional connection 2334 to the second encrypted unidirectional connection (for example network tunnel) 2310. The first network security software 2322 is further configured to transmit data conforming exclusively to a third data protocol received from the third encrypted unidirectional connection (for example network tunnel) 2312 to the second application program 2320 by bidirectional connection 2336. The second network security software 2326 is configured to (a) transmit data conforming exclusively to the first data protocol received from the third application program 2324 by bidirectional connection 2338 to the first encrypted bidirectional connection (for example network tunnel) 2308; and (b) transmit data conforming exclusively to the first data protocol received from the first encrypted bidirectional connection (for example network tunnel) 2308 to the third application program 2324 by bidirectional connection 2338. The second network security software 2326 is also configured to transmit data conforming exclusively to a fourth data protocol received from the fourth encrypted unidirectional connection (for example network tunnel) 2314 to the third application program 2324 by bidirectional connection 2340. The second network security software 2326 is further configured to (a) transmit data conforming exclusively to a fifth data protocol received from the third application program 2324 by bidirectional connection 2342 to the fifth encrypted bidirectional connection (for example network tunnel) 2316; and (b) transmit data conforming exclusively to the fifth data protocol received from the fifth encrypted bidirectional connection (for example network tunnel) 2316 to the third application program 2324 by bidirectional connection 2342. The third network security software 2330 is configured to transmit data conforming exclusively to the second data protocol received from the second encrypted unidirectional connection (for example network tunnel) 2310 to the fourth application program 2328 by bidirectional connection 2348. The third network security software 2330 is also configured to transmit data conforming exclusively to the third data protocol received from the fourth application program 2328 by bidirectional connection 2350 to the third encrypted unidirectional connection (for example network tunnel) 2312. The third network security software 2330 is further configured to transmit data conforming exclusively to the fourth data protocol received from the fourth application program 2328 by bidirectional connection 2344 to the fourth encrypted unidirectional connection (for example network tunnel) 2314. The third network security software 2330 is additionally configured to (a) transmit data conforming exclusively to a fifth data protocol received from the fourth application program 2328 by bidirectional connection 2346 to the fifth encrypted bidirectional connection (for example network tunnel) 2316; and (b) transmit data conforming exclusively to the fifth data protocol received from the fifth encrypted bidirectional connection (for example network tunnel) 2316 to the fourth application program 2328 by bidirectional connection 2346.

Figure 24:
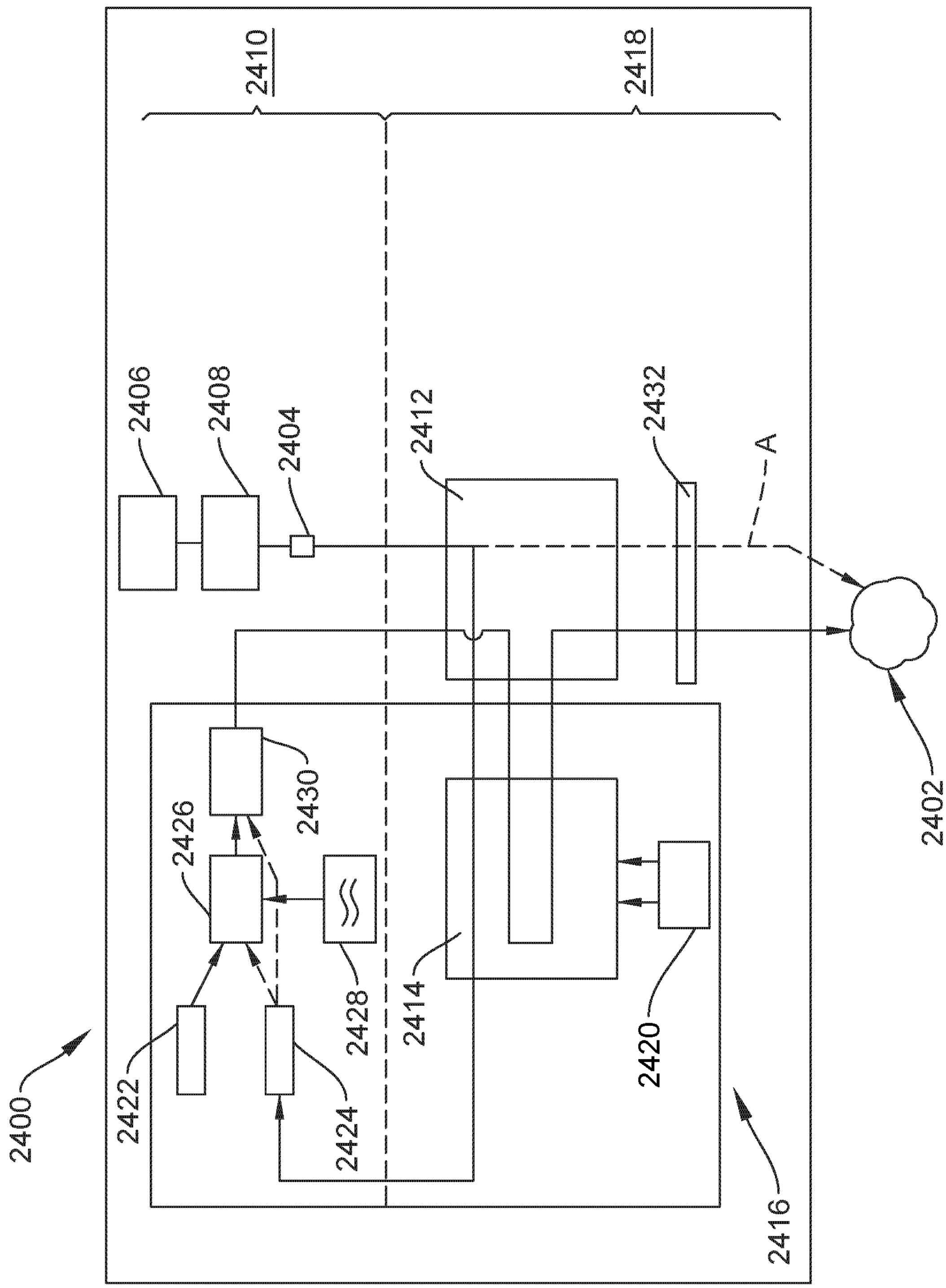
FIG. 24: Schematic view of exemplary node transmitting data to a network.

A schematic view of an exemplary node 2400 transmitting data to a network 2402 is illustrated in FIG. 24. A data packet sent from a program port 2404 by a user 2406 of a program 2408 executing in an application space 2410 to a network stack 2412 is routed to a first driver (or module, for example a kernel loadable module) 2414 of a network security layer 2416 in a kernel space 2418. Based on a list 2420 of allowed network connections (which list is stored in kernel space memory as shown or alternatively stored in application space memory, and at least a portion of the contents of the list may optionally be loaded from an kernel-only readable file or from an application space readable file and optionally passed via an interface to the kernel space 2410), the first driver (or module, for example a kernel loadable module) 2414 verifies that the user 2406 and the program 2408 are permissible, and obtains a network tunnel port number and data protocol for the data packet. The first driver (or module, for example a kernel loadable module) 2414 further verifies that the network tunnel port number is associated with a network tunnel that is in a valid state for transmitting data (for example having an open connection status). A builder module 2422 is invoked to assemble descriptors for the user 2406, the program 2408, and the data protocol into packet metadata. A data portion of the data packet is passed to a translator module 2424 to encode the data into translated data for transmission across the network tunnel. The packet metadata and optionally the translated data are encrypted by an encryption module 2426 using cryptographic keys specific to the network tunnel obtained from a file 2428 and an encrypted result is passed to an assembler module 2430 to form a modified data packet. If the translated data is not encrypted, it may bypass the encryption module 2428 and instead be passed directly to the assembler module 2430 as shown. The modified data packet is communicated to the network stack 2412 and a frame containing the modified data packet transmitted to the network tunnel by a physical interface 2432. Prior to communicating the modified data packet to the network tunnel, the first driver (or module, for example a kernel loadable module) 2414 verifies that the network tunnel is in a valid state for transmitting data. For illustrative purposes only, and not as part of the embodiment, path A shows that data packet sent from the program port 2404 would pass through the network stack 2412 and the physical interface 2432 to the network 2402 were the first driver (or module, for example a kernel loadable module) 2414 not present.

Figure 25:
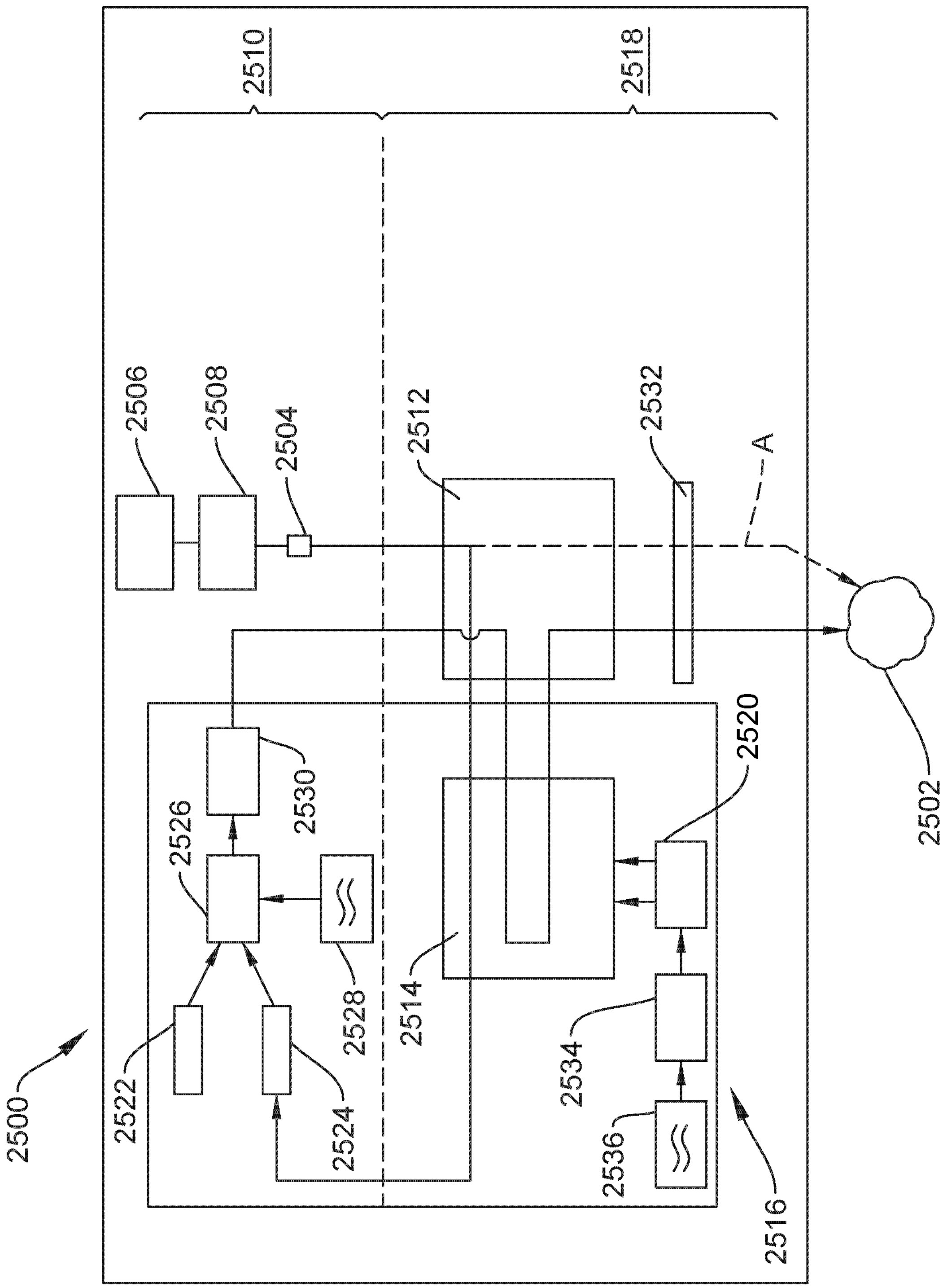
FIG. 25: Schematic view of exemplary node comprising a read-only file.

A schematic view of an exemplary node 2500 transmitting data to a network 2502 is illustrated in FIG. 25. A data packet sent from a program port 2504 by a user 2506 of a program 2508 in an application space 2510 to a network stack 2512 is routed to a first driver (or module, for example a kernel loadable module) 2514 of a network security layer 2516 in a kernel space 2518. Based on a list 2520 of allowed network connections (which list is stored in kernel space memory as shown or alternatively stored in application space memory, and at least a portion of the contents of the list may optionally be loaded from an kernel-only readable file or from an application space readable file and optionally passed via an interface to the kernel space 2510), the first driver (or module, for example a kernel loadable module) 2514 verifies that the port 2504 corresponds to a valid port for the user 2506 and the program 2508, and obtains a network tunnel port number and data protocol for the data packet. The first driver (or module, for example a kernel loadable module) 2514 further verifies that the network tunnel port number is associated with a usable network tunnel. A builder module 2522 is invoked to assemble descriptors for the user 2506, the program 2508, and the data protocol into packet metadata. A data portion of the data packet is passed to a translator module 2524 to encode the data into translated data for transmission across the network tunnel. The packet metadata and translated data are encrypted by an encryption module 2526 using cryptographic keys specific to the network tunnel obtained from a file 2528 and an encrypted result is passed to an assembler module 2530 to form a modified data packet. The modified data packet is communicated to the network stack 2512 and a frame containing the modified data packet transmitted to the network tunnel by a physical interface 2532. Prior to communicating the modified data packet to the network tunnel, the first driver (or module, for example a kernel loadable module) 2514 verifies that the network tunnel is in a valid state for transmitting data. The list 2520 of allowed network connections is loaded into kernel access memory by a second driver (or module, for example a kernel loadable module) 2534 having sole permission to read a cryptographically signed, read-only, kernel access-only file 2536 (in an alternative embodiment, the file 2536 may be an application space file and the second driver (or module, for example a kernel loadable module) 2534 may be an application space program). For illustrative purposes only, and not as part of the embodiment, path A shows that data packet sent from the program port 2504 would pass through the network stack 2512 and the physical interface 2532 to the network 2502 were the first driver (or module, for example a kernel loadable module) 2514 not present.

Figure 26:
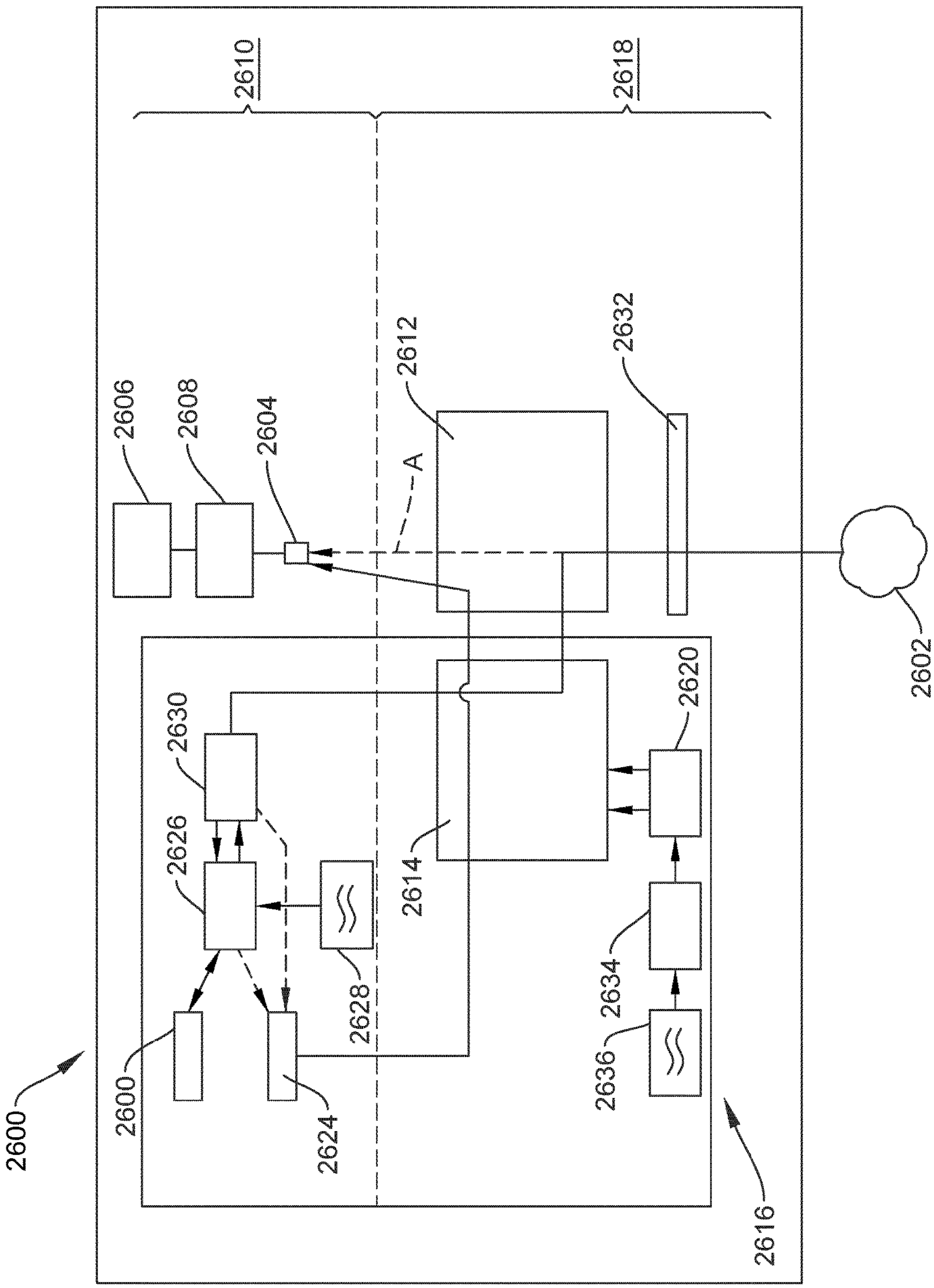
FIG. 26: Schematic view of exemplary node receiving data from a network.

A schematic view of an exemplary node 2500 receiving data from a network 2502 is illustrated in FIG. 26. A data packet containing translated data received from a network tunnel over the network 2502 and sent from a remote program port by a remote user passes through a physical interface 2532 and a network stack 2512. The data packet is received (or intercepted) by a first driver (or module, for example a kernel loadable module) 2514 of a network security layer 2516 in kernel space 2518 and directed to assembler 2530, where it is disassembled into encrypted metadata and the translated data (if the translated data is encrypted the encrypted translated data is passed with the encrypted metadata to an encryption module 2526, otherwise the unencrypted translated data is routed directly to a translation module 2524). Decrypted metadata obtained by passing the encrypted metadata through the encryption module 2526 is inspected by a validation module 2600 to verify that a descriptor comprising a remote application code, a remote user code, and a data protocol code match an expected value for the network tunnel. If the match is verified, the translated data is decrypted (if necessary) by encryption module 2526 and in any event the unencrypted/decrypted translated data is passed to a translator module 2524 for conversion into native format data and transmitted via a loopback interface to a local port 2504 associated with a resident program 2508.

Figure 27:
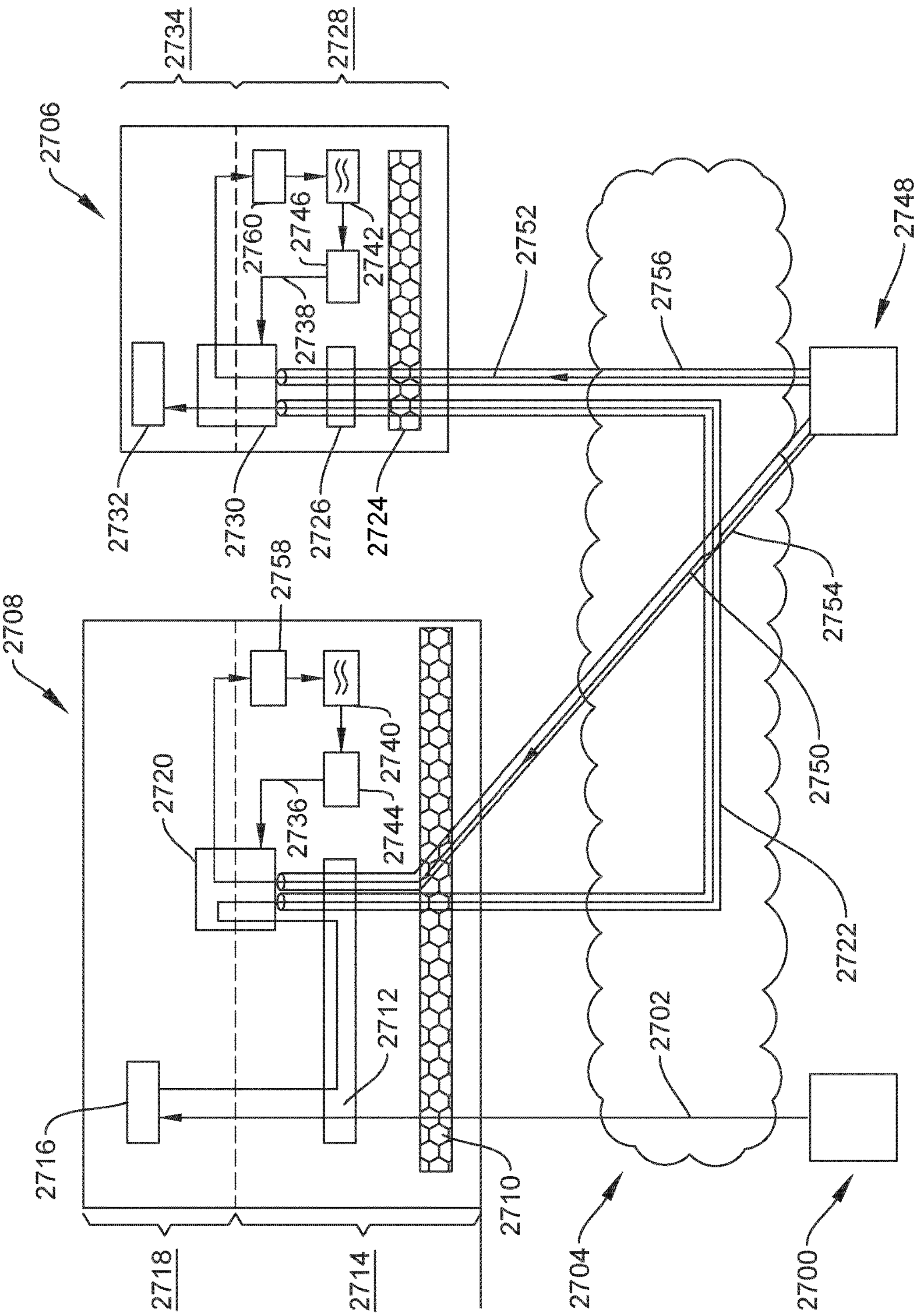
FIG. 27: Schematic view of gateway server.

A schematic view of an unsecure node 2700 transmitting data 2702 over a network 2704 to an exemplary secure node 2706 via an exemplary gateway server 2708 is illustrated in FIG. 27. The transmitted data 2702 passes through a physical interface 2710 into a network stack 2712 in a kernel space 2714 of the gateway server 2708 and to a trusted application 2716 in an application space 2718 of the gateway server. Trusted data is transmitted from trusted application 2716 through a loopback interface of the network stack 2712 to a network security software 2720, a portion of which executes in the kernel space 2714 and a portion in a second application space 2718. The network security software 2720 routes the trusted data across the network 2704 through a pre-authorized encrypted network tunnel 2722 to a physical interface 2724 of the secure node 2706. Once in the secure node 2706, the trusted data is passed through a network stack 2726 in a kernel space 2728 of the secure node 2706 and network security software 2730 and directed to a recipient application 2732 in an application space 2734 of the secure node 2706. The network security software 2720 and the network security software 2730 manage data traffic through the encrypted network tunnel 2722 based on parameters (2736 and 2738, respectively) loaded from encrypted, read-only files (2740 and 2742, respectively) by computer programs (2744 and 2746, respectively). The parameters include, inter alia, shared secret node identification codes for the secure node 2706 and the gateway server 2708, a port number of the network security software 2730, a port number of the recipient application 2732, a process identification code and a process owner code associated with the recipient application 2732, and a data protocol associated with the transmitted data 2702. The encrypted, read-only files (2740 and 2742, respectively) are maintained by security configuration server 2748, which transmits updated encrypted configuration data (2750 and 2752, respectively) through encrypted network tunnels (2754 and 2756, respectively) to file update programs (2758 and 2760, respectively) as shown. In another embodiment, the computer programs (2744 and 2746, respectively) responsible for loading the encrypted, read-only files (2740 and 2742, respectively) may be positioned in the application spaces (2718 and 2734, respectively) rather than the kernel spaces (2714 and 2728, respectively).

Figure 28:
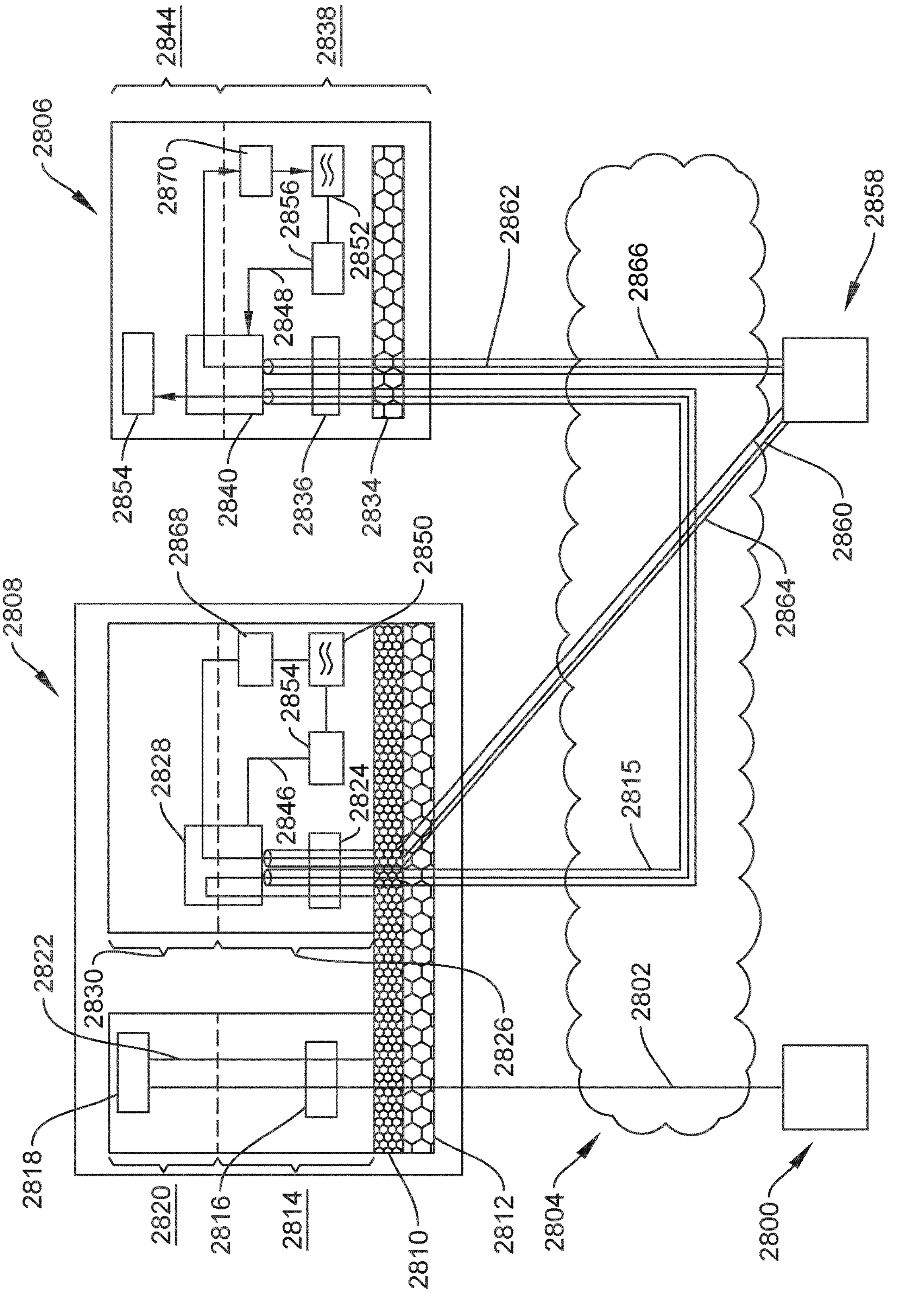
FIG. 28: Schematic view of gateway server comprising separation kernel.
Figure 29A:
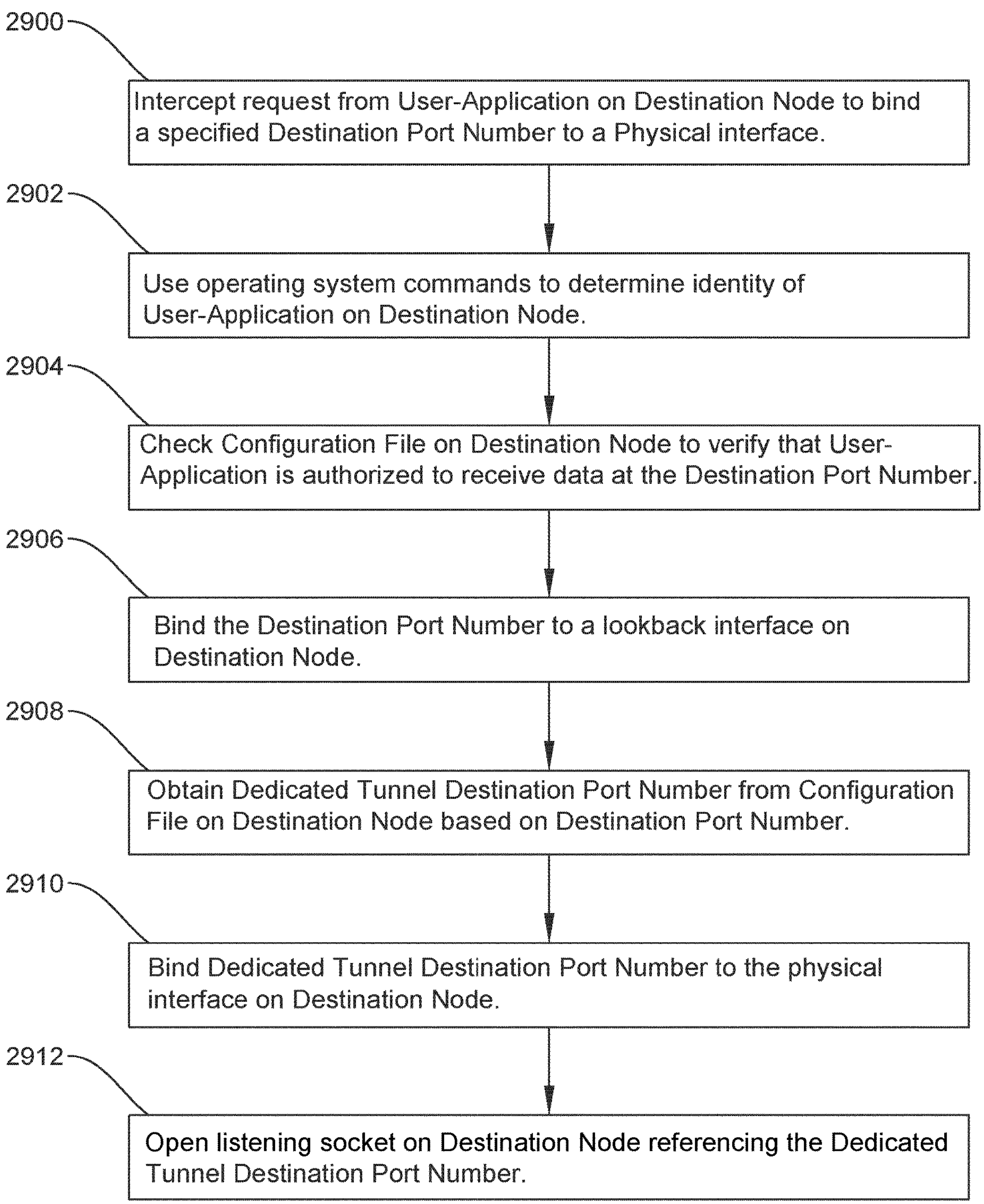
FIGS. 29(A-D): A flow chart illustrating exemplary communication management operations that may be associated with a network system in accordance with certain embodiments disclosed herein.
Figure 29B:
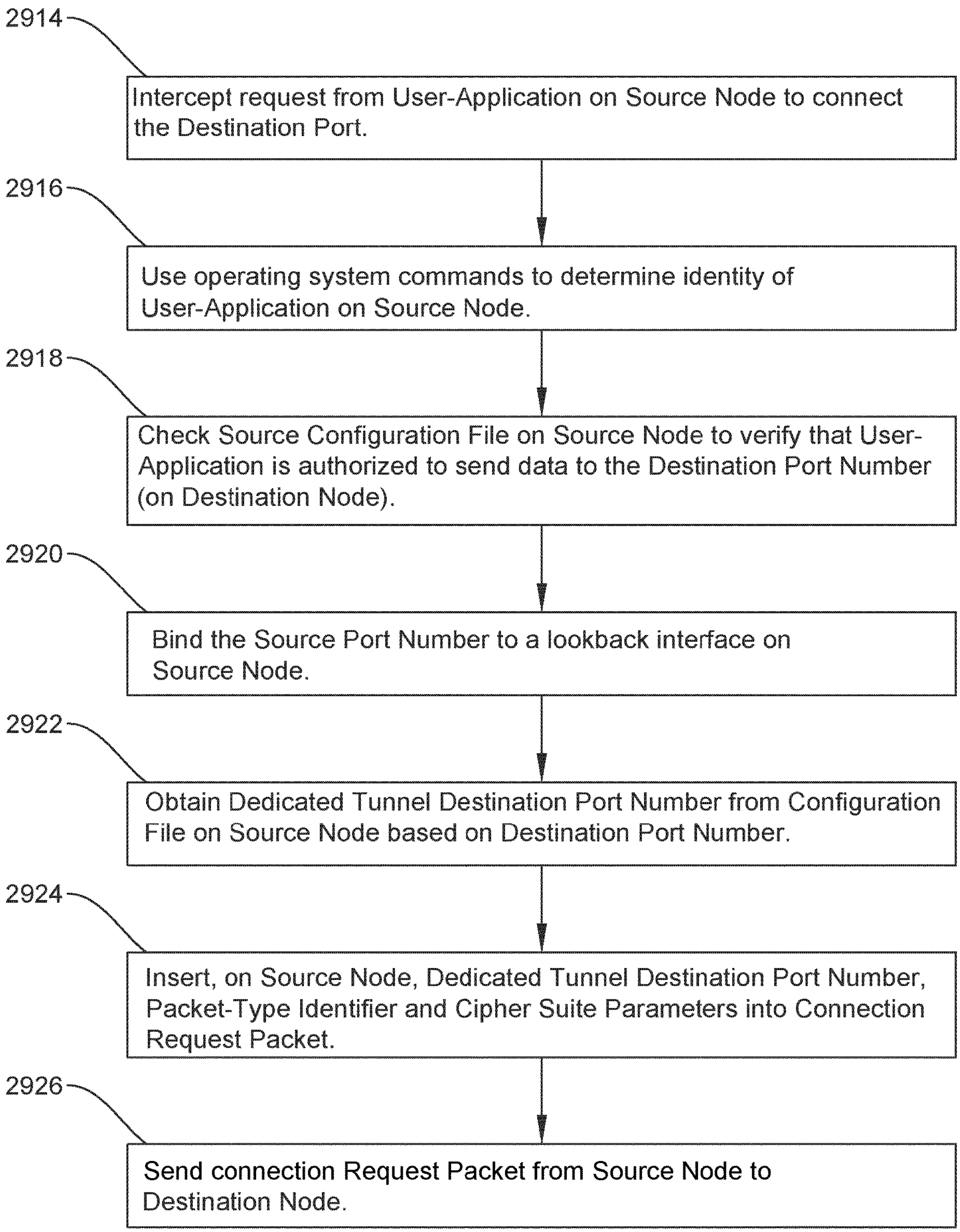
Figure 29C:
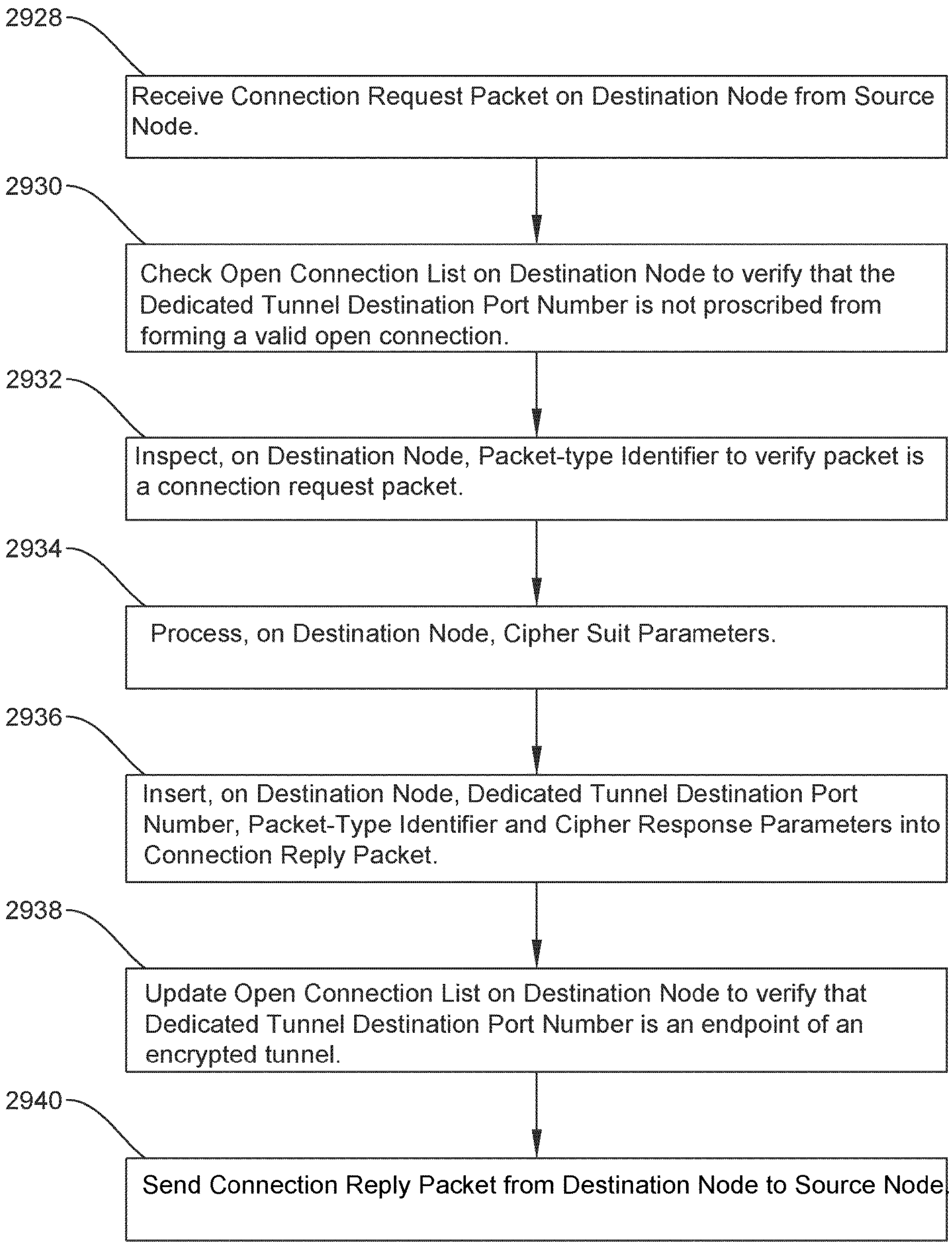
Figure 29D:
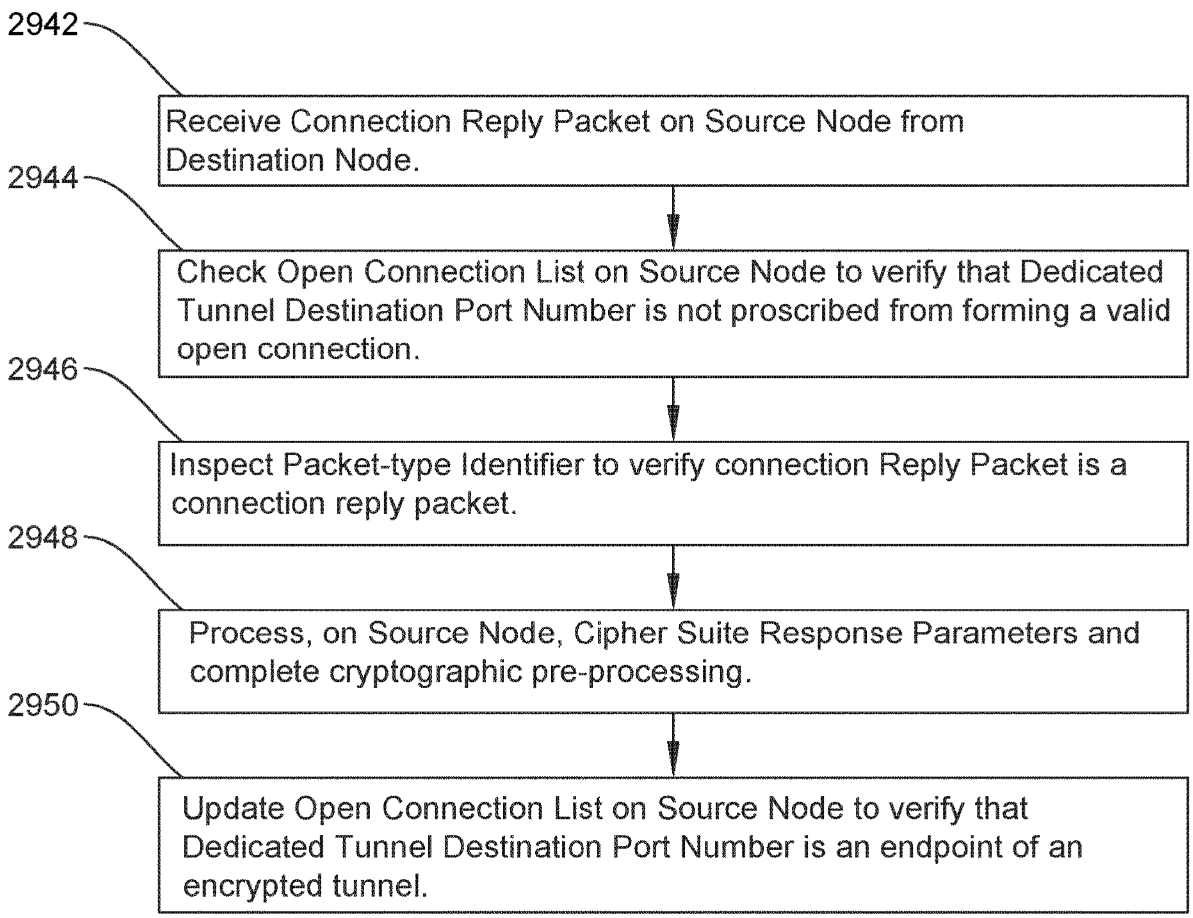
Figure 30A:
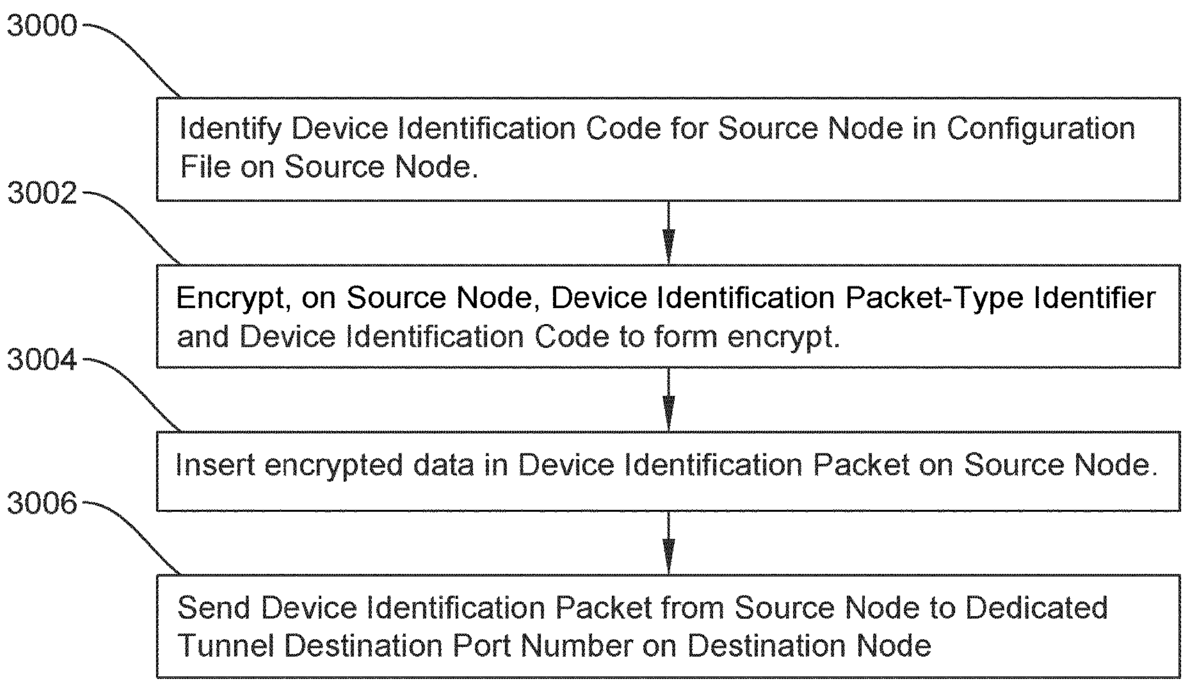
FIGS. 30(A-C): A flow chart illustrating exemplary communication management operations that may be associated with a network system in accordance with certain embodiments disclosed herein.
Figure 30B:
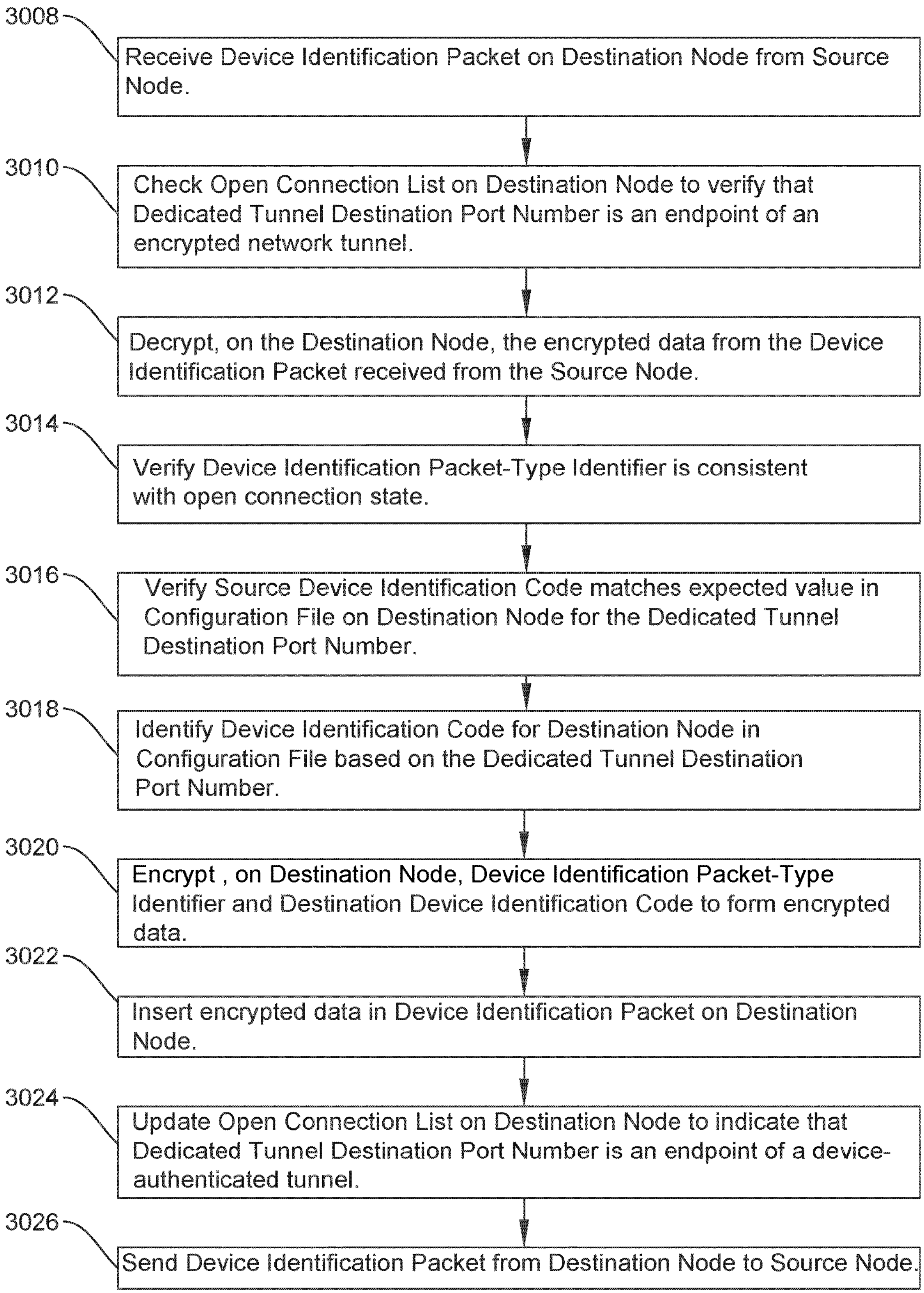
Figure 30C:
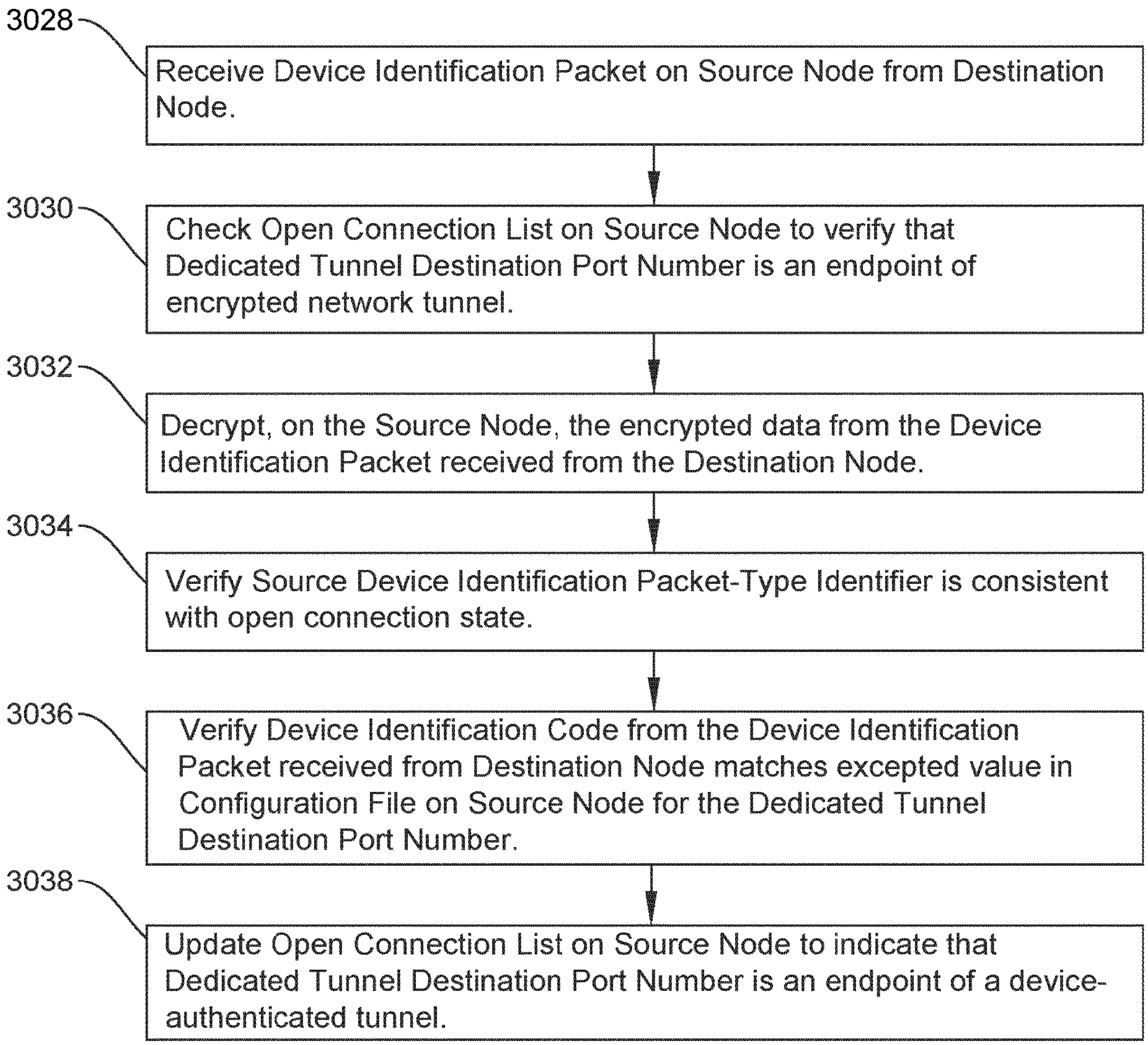
Figure 31A:
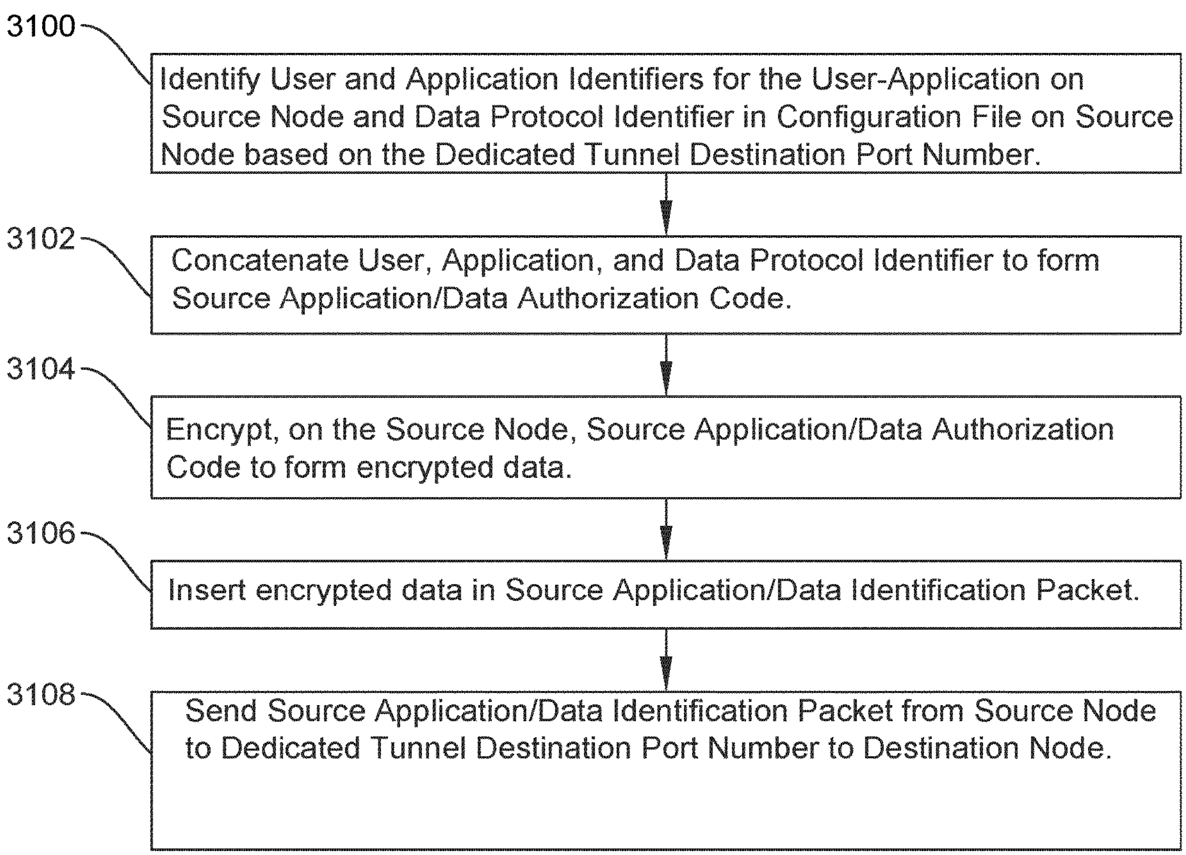
FIGS. 31(A-C): A flow chart illustrating exemplary communication management operations that may be associated with a network system in accordance with certain embodiments disclosed herein.
Figure 31B:
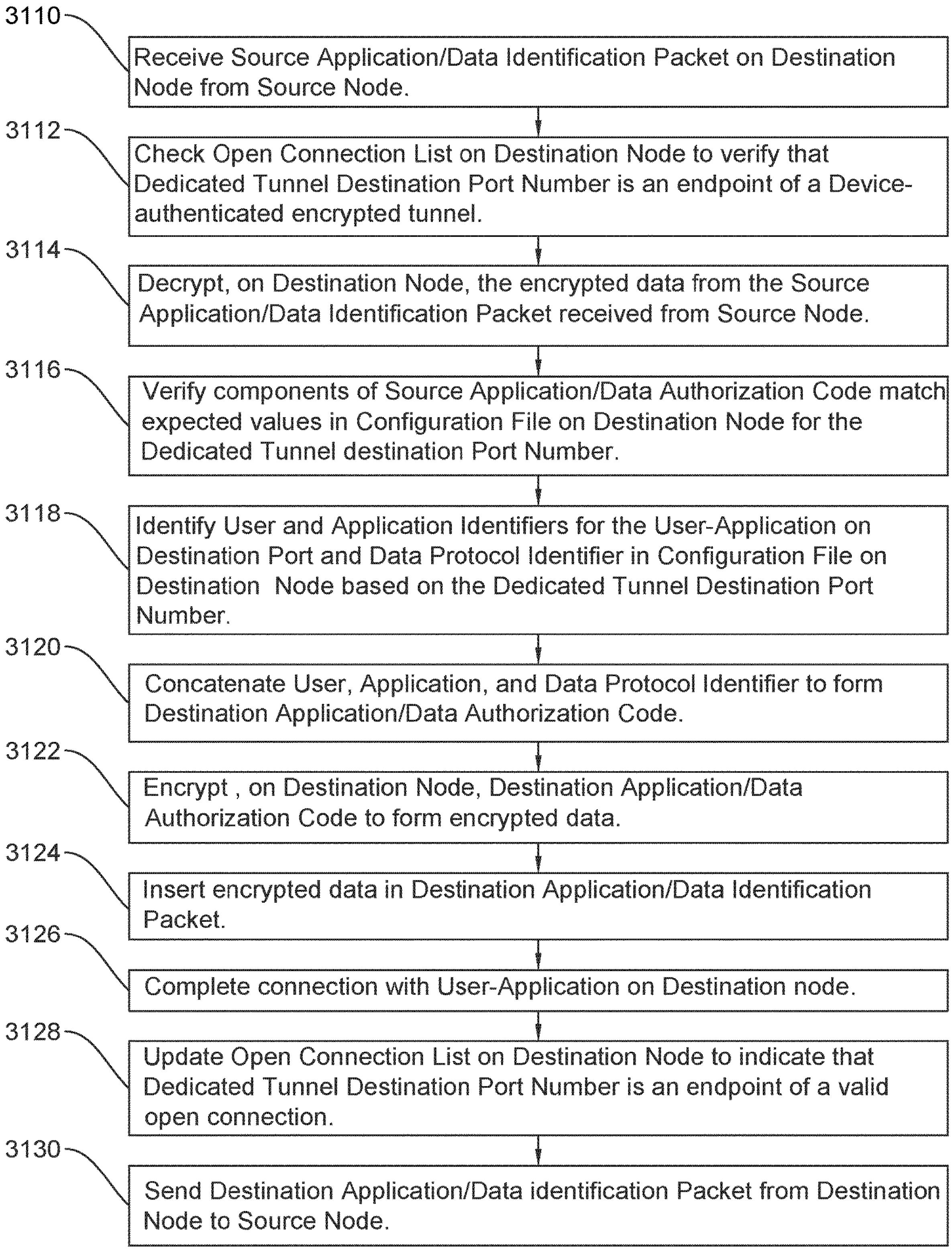
Figure 31C:
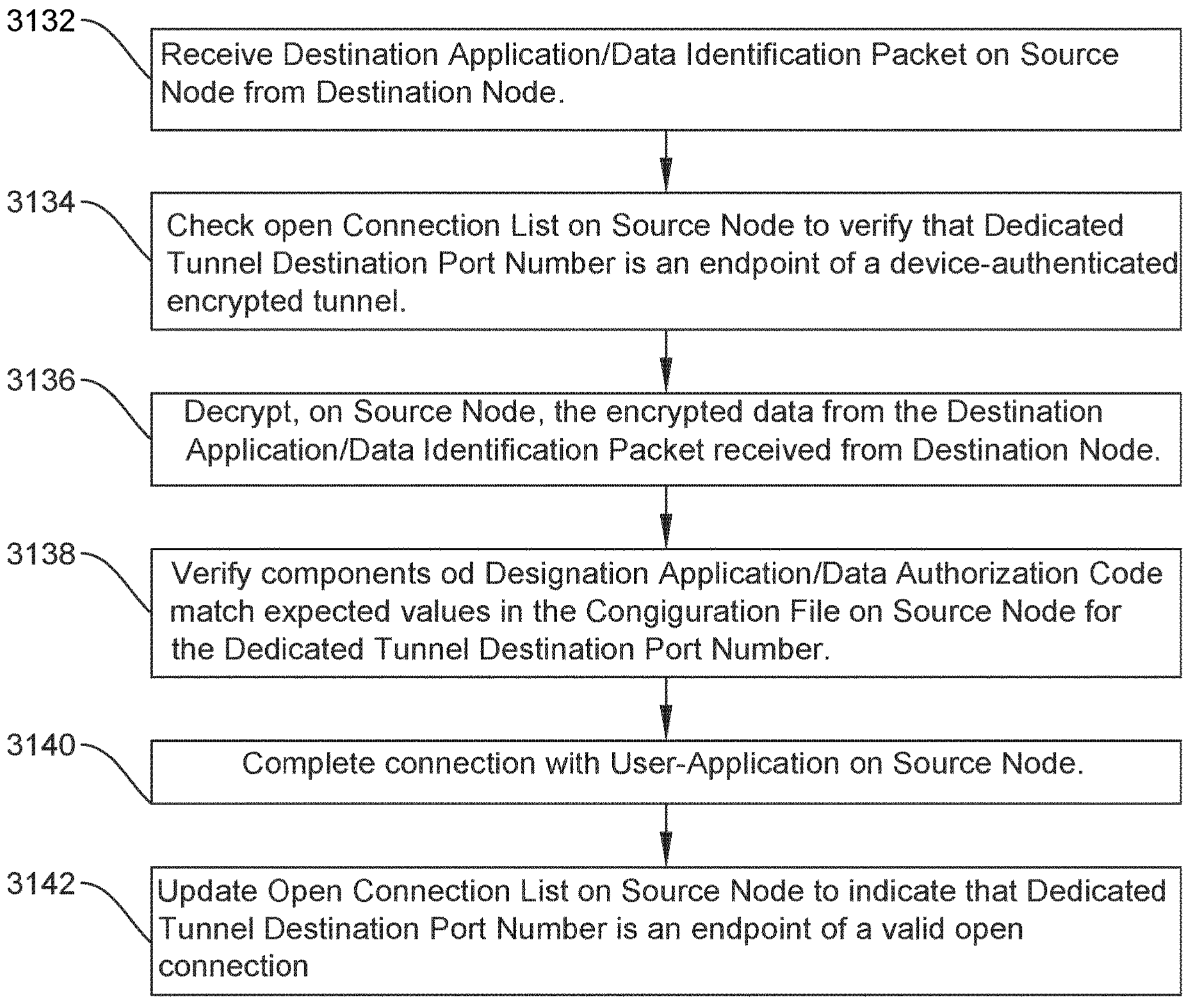
Figure 32A:
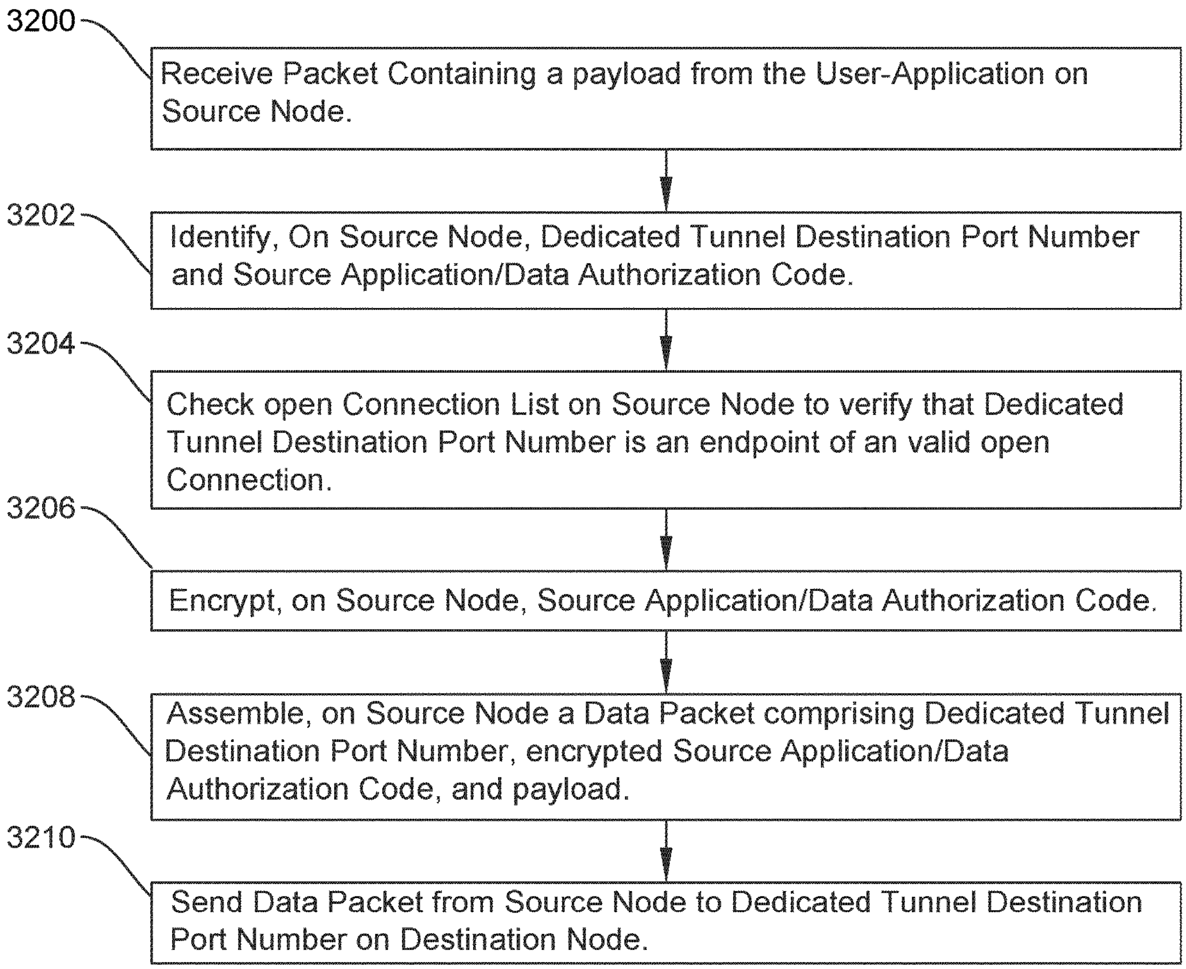
FIGS. 32(A-B): A flow chart illustrating exemplary communication management operations that may be associated with a network system in accordance with certain embodiments disclosed herein.
Figure 32B:
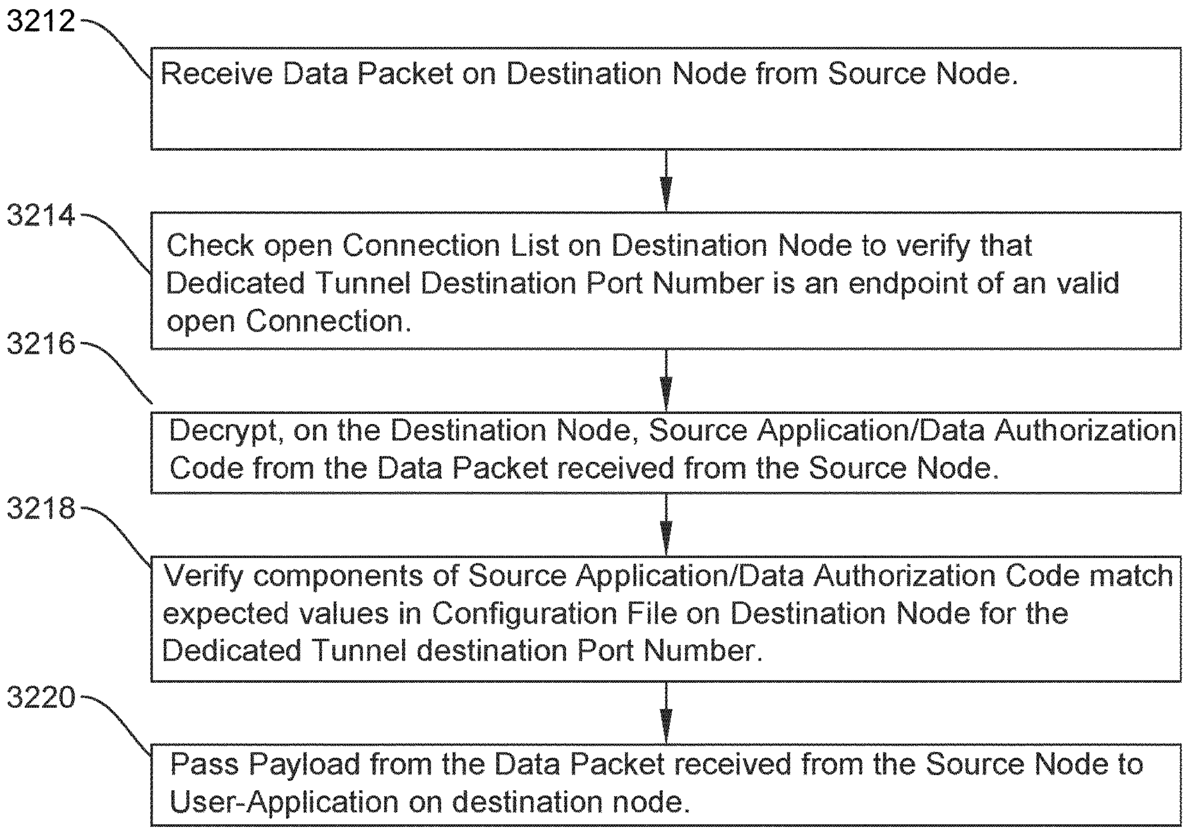

A schematic view of an unsecure node 2800 transmitting data 2802 over a network 2804 to an exemplary secure node 2806 via an exemplary gateway server 2808 executing a separation kernel 2810 is illustrated in FIG. 28. The transmitted data 2802 passes through a physical interface 2812 into a first network stack 2816 of a first kernel space 2814 and to a trusted application 2818 in a first application space 2820. Trusted data 2822 is transmitted from trusted application 2818 through the separation kernel 2810 to a second network stack 2824 in a second kernel space 2826 and network security software 2828, a portion of which executes in the second kernel space 2826 and a portion in a second application space 2830. The network security software 2828 routes the trusted data 2822 across the network 2804 through a pre-authorized encrypted network tunnel 2832 to a physical interface 2834 of the secure node 2806. Once in the secure node 2806, the trusted data 2822 is passed through a network stack 2836 in a kernel space 2838 of the secure node 2806 and network security software 2840 and directed to a recipient application 2842 in an application space 2844 of the secure node 2806. Network security software 2828 and network security software 2840 manage data traffic through the encrypted network tunnel 2832 based on parameters (2846 and 2848, respectively) loaded from encrypted, read-only files (2850 and 2852, respectively) by kernel mode programs (2854 and 2856, respectively). The encrypted, read-only files (2850 and 2852, respectively) are maintained by security configuration server 2858, which transmits updated encrypted configuration data (2860 and 2862, respectively) through encrypted network tunnels (2864 and 2866, respectively) to file update programs (2868 and 2870, respectively) as shown.

Figure 33:
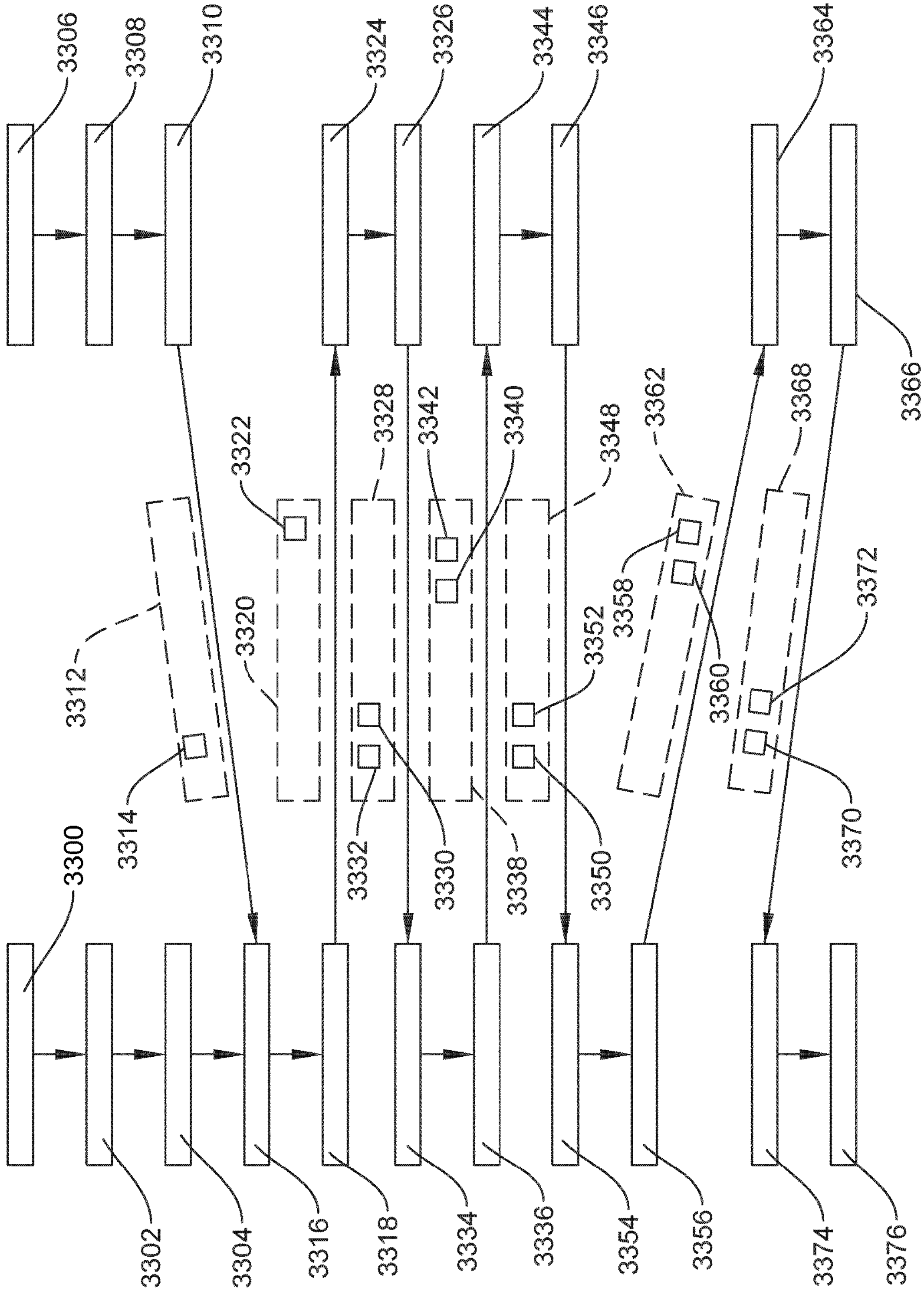
FIG. 33: Flow diagram of secure communication protocol.

FIG. 33 depicts data processing steps according to an exemplary secure communication protocol. A server security middleware detects 3300 a server bind request by a server application to open a port of the server (the "server port") and accesses a server lookup table to validate 3302 the authority of the server to open a port having the port number (the "server port number") assigned to the server port. Following successful validation 3302, the server port is opened and enters 3304 listening mode. A client security middleware detects 3306 a connection request from a client application and accesses a client lookup table to validate 3308 the authority of the client to form a data pathway to the server port. Following successful validation 3308, the client security middleware opens a client port and constructs and transmits 3310 an encrypted tunnel connection request packet 3312, comprising forming client authentication metadata 3314 and inserting the client authentication metadata into the packet 3312, the client authentication metadata comprising a connection state code. The connection state code is configured to be interpreted by the server security middleware that formation of an encrypted tunnel between the client security middleware and the server security middleware is in process. The destination port of the connection request packet 3312 is obtained from the client lookup table based on the server port number, and may be the same or different from the server port number. Upon receipt of the connection request packet 3312 at the server port, the server security middleware inspects 3316 the metadata 3314 and confirms 3316 the connection state. Following the inspecting and confirming 3316, the server security middleware constructs and transmits 3318 an encrypted tunnel reply packet 3320, comprising forming server authentication metadata 3322 and inserting the server authentication metadata into the packet 3320, the server authentication metadata comprising a connection state code. Upon receipt of the reply packet 3320, the client security middleware inspects 3324 the metadata 3322 and confirms 3324 that the connection state code matches an expected connection state (i.e., that formation of an encrypted tunnel between the client security middleware and the server security middleware is in process). Further steps are taken to complete formation of the encrypted tunnel between the client security middleware and the server security middleware, and upon completion both the client security middleware and the server security middleware note that the encrypted tunnel has been formed. Following the comparing and confirming 3324 and formation of the encrypted tunnel, the client security middleware constructs and transmits 3326 a client node identification packet 3328, comprising obtaining a client node identification code from the client lookup table, encrypting the client node identification code and a connection state code, and inserting the encrypted client node identification code 3330 and the encrypted connection state code 3332 (the connection state code indicating that the client and server are authenticating and authorizing one another following establishment of the encrypted network tunnel) into the client node identification packet 3328. Upon receipt of the client node identification packet 3328 at the server, the server security middleware verifies 3334 that the client node identification code is uniquely assigned to the data pathway, comprising successfully decrypting the encrypted client node identification code 3330 and the connection state code 3332 and verifying that the decrypted client node identification code matches an expected value in the server lookup table for the destination port number of the packet. Following the verification 3334, the server security middleware constructs and transmits 3336 a server node identification packet 3338, comprising obtaining a server node identification code from the server lookup table, encrypting the server node identification code and a connection state code (the connection state code indicating that the client and server are authenticating and authorizing data protocol transmitted over the data pathway as well as users and applications that are parties to the data pathway following establishment of the encrypted network tunnel), and inserting the encrypted server node identification code 3340 and the encrypted connection state code 3342 into the server node identification packet 3338. Upon receipt of the server node identification packet 3338 at the client, the client security middleware verifies 3344 that the server node identification code is uniquely assigned to the data pathway, comprising successfully decrypting the encrypted server node identification code 3340 and the connection state code 3342 and verifying that the decrypted server node identification code matches an expected value in the client lookup table. Following the verification 3344, the client security middleware constructs and transmits 3346 a client authorization packet 3348, comprising obtaining client authentication metadata from the client lookup table, encrypting the client authentication metadata and a connection state code, and inserting the encrypted client authentication metadata 3350 and the connection state code 3352 into the client authorization packet 3348, the client authentication metadata comprising a client identifier, a user identifier, and a data protocol descriptor obtained from the client lookup table. Upon receipt of the client authorization packet 3348 at the server, the server security middleware verifies 3354 that the server application is authorized to form a data pathway to receive data from the client application, comprising decrypting the encrypted client authentication metadata 3350 and verifying that the decrypted client authentication metadata matches an expected value in the server lookup table for the data pathway as determined from the server lookup table based on the destination port number of the packet. Following the verification 3354, the server security middleware constructs and transmits 3356 a server authorization packet 3362, comprising obtaining server authentication metadata from the server lookup table, encrypting the server authentication metadata and a connection state code, and inserting the connection state code 3358 and the encrypted server authentication metadata 3360 into the server authorization packet 3362, the server authentication metadata comprising a server identifier, a user identifier, and a data protocol descriptor obtained from the client lookup table. Upon receipt of the server authorization packet 3362 at the client security middleware, the client security middleware verifies 3364 that the client port is authorized to form a data pathway with the server port, comprising decrypting the encrypted server authentication metadata 3360 and verifying that the decrypted server authentication metadata matches an expected value in the server lookup table. Following the verification 3364, the server and the client note that an open connection state exists for transfer of data between the client security middleware and the server security middleware, and the client application transmits data to the client security middleware, and the client security middleware constructs and transmits 3366 a client data packet 3368 to the server, comprising encrypting client authentication metadata and data, and inserting the encrypted client authentication metadata 3370 and encrypted data 3372 into the client data packet 3368. Following receipt of the client data packet 3368 at the server, the server security middleware verifies 3374 that the data is authorized to be received by the server application, comprising successfully decrypting the encrypted client authentication metadata 3370 and verifying that the decrypted client authentication metadata matches an expected value in the server lookup table based on the server port number. Upon verification 3374, the server security middleware transmits 3376 unencrypted data to the server port.

Figure 35:
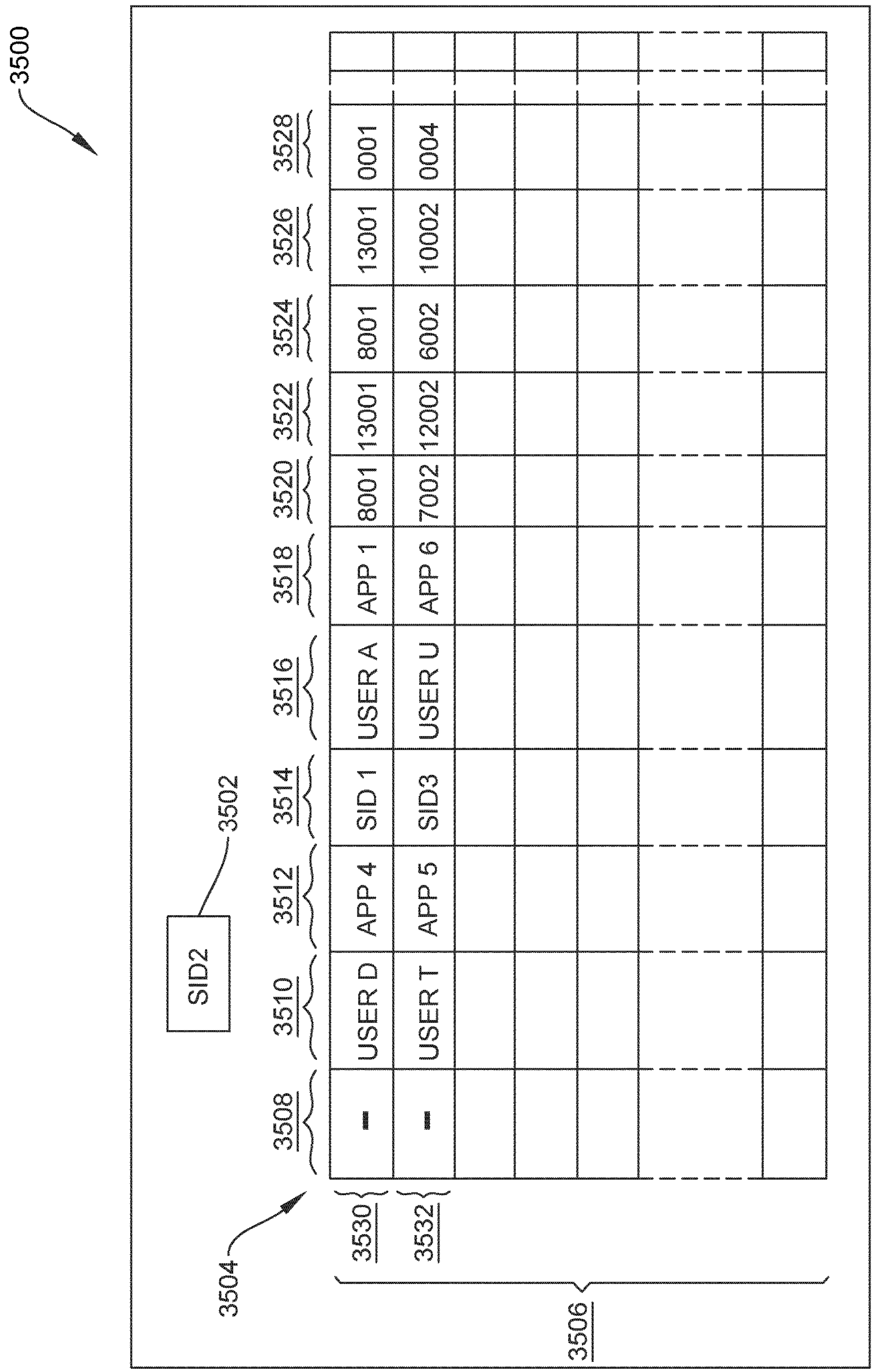
FIG. 35: Schematic view of second node having network configuration second data structure.

A schematic view of a network configuration first node identifier 3402 and first data structure 3404 stored in a non-transitory computer-readable storage medium (for example a nonvolatile memory) on a first node 3400 is depicted and a network configuration second node identifier 3502 and second data structure 3504 stored in a non-transitory computer-readable storage medium (for example a nonvolatile memory) on a second node 3500 is depicted in FIGS. 34 & 35. The data structures comprise records 3406 and 3506, each record composed of several fields that are interpreted by network security middleware to define authorized network connections. Optional first fields 3408 and 3508 contain identifiers for a network interface controller(s) of the first node and the second node, respectively. Second fields 3410 and 3510 contain identifiers for application process owners of the first node and the second node, respectively. Third fields 3412 and 3512 contain identifiers for application processes (corresponding to the respective application process owner identifiers) of the first node and the second node, respectively. Fourth fields 3414 and 3514 contain remote node identifiers (for example field 3414 might contain the second node identifier). Fifth fields 3416 and 3516 contain identifiers for remote application process owners. Sixth fields 3418 and 3518 contain identifiers for remote application processes (for example 3416 and 3418 might contain a process owner identifier and an application process identifier for a process on the second node). Optional seventh fields 3420 and 3520 contain port number identifiers for corresponding application processes of the first node and the second node, respectively. As shown, the field may be blank, for example if a local port is dynamically assigned following a connection request. Optional eighth fields 3422 and 3522 contain tunnel port number identifiers for network security software of the first node and network security software of the second node, respectively. As shown, the field may be blank, for example if a local port is dynamically assigned following a connection request. Ninth fields 3424 and 3524 contain port number identifiers for a server application process. The server application process port number identifier may correspond, as the case may be, to either the local application process specified in fields 3410 and 3412 (or 3510 and 3512) on the first node or second node, respectively, or may correspond to a remote application process to which a connection may be formed. Tenth fields 3426 and 3526 contain tunnel port number identifiers for network security software in communication with (and on the same node as) the server application process. The first node 3400 is a source or a destination node for communication of packet data and/or a data stream (and hosts a client or a server) in each of the records present in data structure 3404 (likewise, the second node is a source or a destination node for communication of packet data and/or a data stream in each of the records present in data structure 3504). The first record 3430 of the first node 2100, for example, is used by first network security software on the first node 3400 to configure a connection from the first node (having a node identifier 3402 "SID 1") to transmit data having data type "0001" from client application process "APP 1" having process owner "USER A" via port "7001" to port "8001" associated with server application process "APP 4" having process owner "USER D" on the second node (having node identifier 3502 "SID2"). Once a connection is formed, the client application process port "7001" is in communication via a loopback interface to first network security software present on the first node 3500, and said first network security software having opened a port "12001" which is bound to interface "NIC 001". The first network security software has a further connection to port 13001 associated with second network security software on the second node 3500 (having second node identifier 3502 "SID2"). The second network security software at port "12001" is in communication via a loopback interface to process application "APP 4" at port "8001" on the second node 2200. On the second node 3500, the first record 3530 corresponds to the first record 3430 of the first node 3400 because the local process and process owner identifiers (3512 and 3510) match the remote process and process owner identifiers (3418 and 3416) on the first node 3400 and because the destination port fields match (3424 and 3426 match 3524 and 3526, respectively). Records 3432 and 3434 illustrate a scenario in which a common application "APP 2" can be used by two processes (the two processes owned by "USER A" and "USER B", respectively) on the first node 3400, which are configured to form connections to communicate data with remote processes (application "APP 4" having owner "USER D" on the second node 3500 and "APP 5" having owner "USER F" on a third node (not shown) having an identifier "SID3"). The second record 3532 of the second node 3500 illustrates a scenario in which a process running application "APP 5" having a process owner "USER T" on the second node 3500 is configured to forms a connection to communicate data with a process running application "APP 6" having process owner "USER U" on the third node (not shown).

In addition to the fields 3408-3428 and the fields 3508-3528, in certain embodiments, for example, the data structures 3404 and/or 3504 may contain additional fields. In certain embodiments, for example, the data structure 3404 may be divided among two or more files (for example two files, three files, or four files). In certain embodiments, for example, the data structure 3504 may be divided among two or more files (for example two files, three files, or four files). The ordering of fields 3408-3428 and the ordering of fields 3508-3528 is a non-limiting example comprising certain embodiments of the present disclosure. Certain embodiments may comprise, for example, any of the other orderings which may be generated by permuting the orderings of fields 3408-3428 and/or the orderings of fields 3508-3528, or a subset or all of the orderings which may be generated by permuting the orderings of fields 3408-3428 and/or the orderings of fields 3508-3528.

Figure 36:
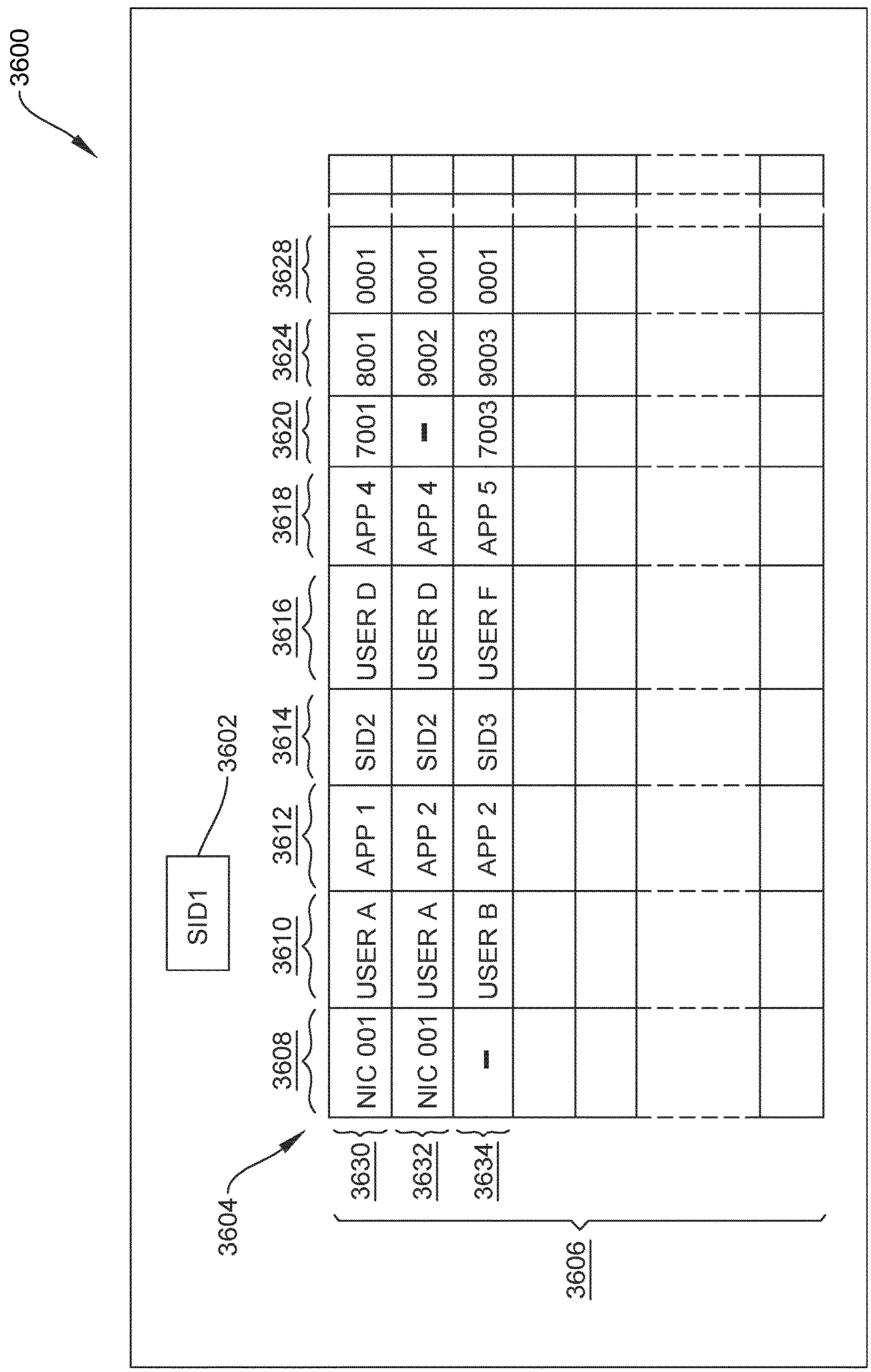
FIG. 36: Schematic view of first node having network configuration third data structure.
Figure 37:
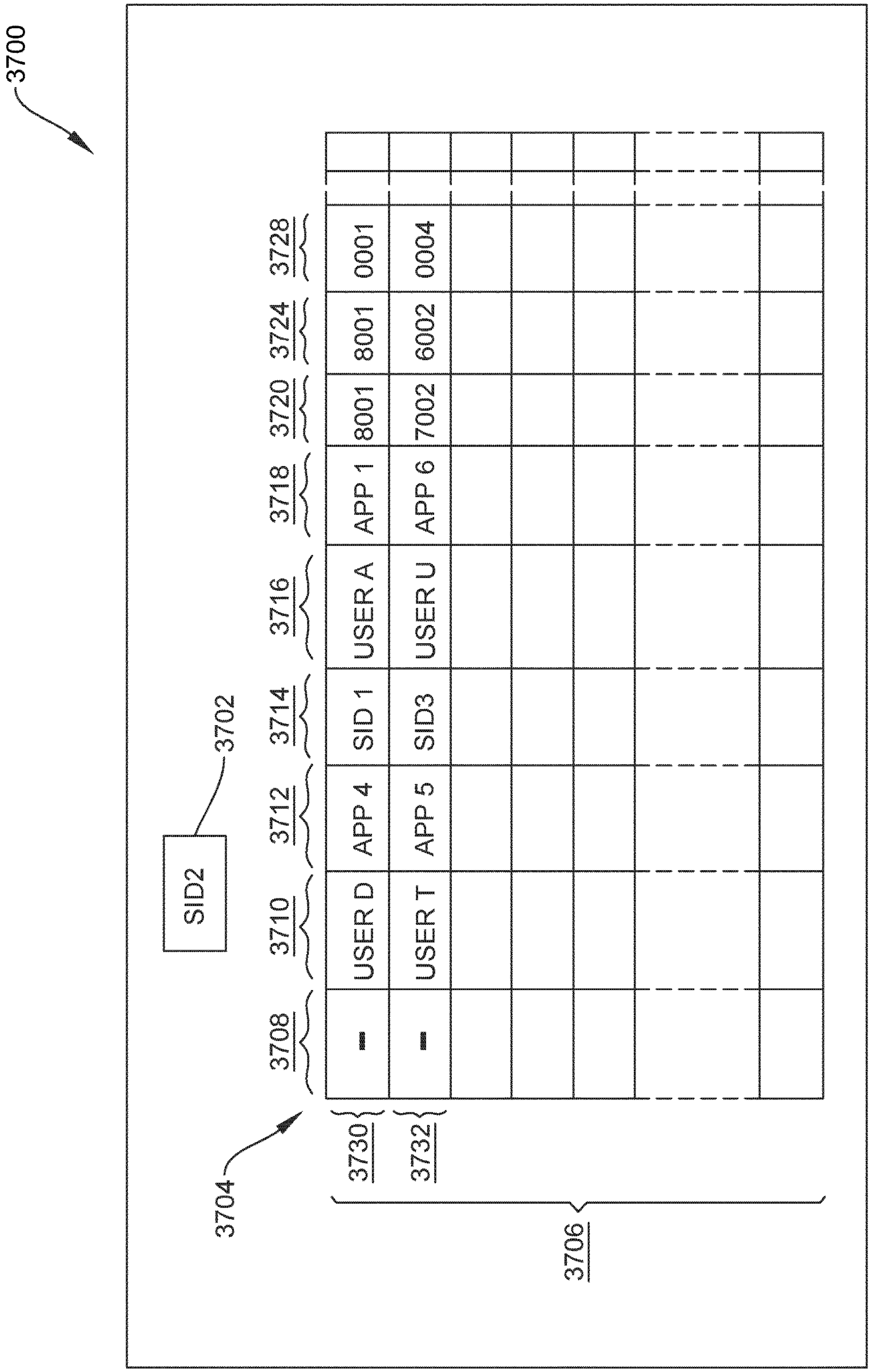
FIG. 37: Schematic view of second node having network configuration fourth data structure.

A schematic view of a network configuration first node identifier 3602 and third data structure 3604 stored in a non-transitory computer-readable storage medium (for example a nonvolatile memory) on a first node 3600 is depicted and a network configuration second node identifier 3702 and fourth data structure 3704 stored in a non-transitory computer-readable storage medium (for example a nonvolatile memory) on a second node 3700 is depicted in FIGS. 36 & 37. The data structures comprise records 3606 and 3706, each record composed of several fields that are interpreted by network security middleware to define authorized network connections. Optional first fields 3608 and 3708 contain identifiers for a network interface controller(s) of the first node and the second node, respectively. Second fields 3610 and 3710 contain identifiers for application process owners of the first node and the second node, respectively. Third fields 3612 and 3712 contain identifiers for application processes (corresponding to the respective application process owner identifiers) of the first node and the second node, respectively. Fourth fields 3614 and 3714 contain remote node identifiers (for example field 3614 might contain the second node identifier). Fifth fields 3616 and 3716 contain identifiers for remote application process owners. Sixth fields 3618 and 3718 contain identifiers for remote application processes (for example 3616 and 3618 might contain a process owner identifier and an application process identifier for a process on the second node). Optional seventh fields 3620 and 3720 contain port number identifiers for corresponding application processes of the first node and the second node, respectively. As shown, the field may be blank, for example if a local port is dynamically assigned following a connection request. Eighth fields 3637 and 3724 contain port number identifiers for a server application process. The server application process port number identifier may correspond, as the case may be, to either the local application process specified in fields 3610 and 3612 (or 3710 and 3712) on the first node or second node, respectively, or may correspond to a remote application process to which a connection may be formed. The first node 3600 is a source or a destination node for communication of packet data and/or a data stream (and hosts a client or a server) in each of the records present in data structure 3604 (likewise, the second node is a source or a destination node for communication of packet data and/or a data stream in each of the records present in data structure 3704). The first record 3630 of the first node 3600, for example, is used by first network security software on the first node 3600 to configure a connection from the first node (having a node identifier 3602 "SID 1") to transmit data having data type "0001" from client application process "APP 1" having process owner "USER A" via port "7001" (bound to "NIC 001") to port "8001" associated with server application process "APP 4" having process owner "USER D" on the second node (having node identifier 3702 "SID2"). Once a connection is formed, packet data from the client application process port "7001" is received by first network security software present on the first node 3700, which performs first network security functions followed by releasing the packet data for transmission to the second node 3700 where it is received by second network security software. The second network security software performs second network security functions and releases the packet to its destination of port "8001" associated with a process running application "APP 4" having process owner "USER D". On the second node 3700, the first record 3730 corresponds to the first record 3630 of the first node 3600 because the local process and process owner identifiers (3712 and 3710) match the remote process and process owner identifiers (3618 and 3616) on the first node 3600 and because the destination port fields match (3624 matches 3724). Records 3632 and 3634 illustrate a scenario in which a common application "APP 2" can be used by two processes (the two processes owned by "USER A" and "USER B", respectively) on the first node 3600, which are configured to form connections to communicate data with remote processes (application "APP 4" having owner "USER D" on the second node 3700 and "APP 5" having owner "USER F" on a third node (not shown) having an identifier "SID3"). The second record 3732 of the second node 3700 illustrates a scenario in which a process running application "APP 5" having a process owner "USER T" on the second node 3700 is configured to forms a connection to communicate data with a process running application "APP 6" having process owner "USER U" on the third node (not shown). In addition to the fields 3608-3628 and the fields 3708-3728, in certain embodiments, for example, the data structures 3604 and 3704 may contain additional fields. In certain embodiments, for example, the data structure 3604 may be divided among two or more files (for example two files, three files, or four files). In certain embodiments, for example, the data structure 3704 may be divided among two or more files (for example two files, three files, or four files). The ordering of fields 3608-3628 and the ordering of fields 3708-3728 is a non-limiting example comprising certain embodiments of the present disclosure. Certain embodiments may comprise, for example, any of the other orderings which may be generated by permuting the orderings of fields 3608-3628 and/or the orderings of fields 3708-3728, or a subset or all of the orderings which may be generated by permuting the orderings of fields 3608-3628 and/or the orderings of fields 3708-3728.

Figure 39:
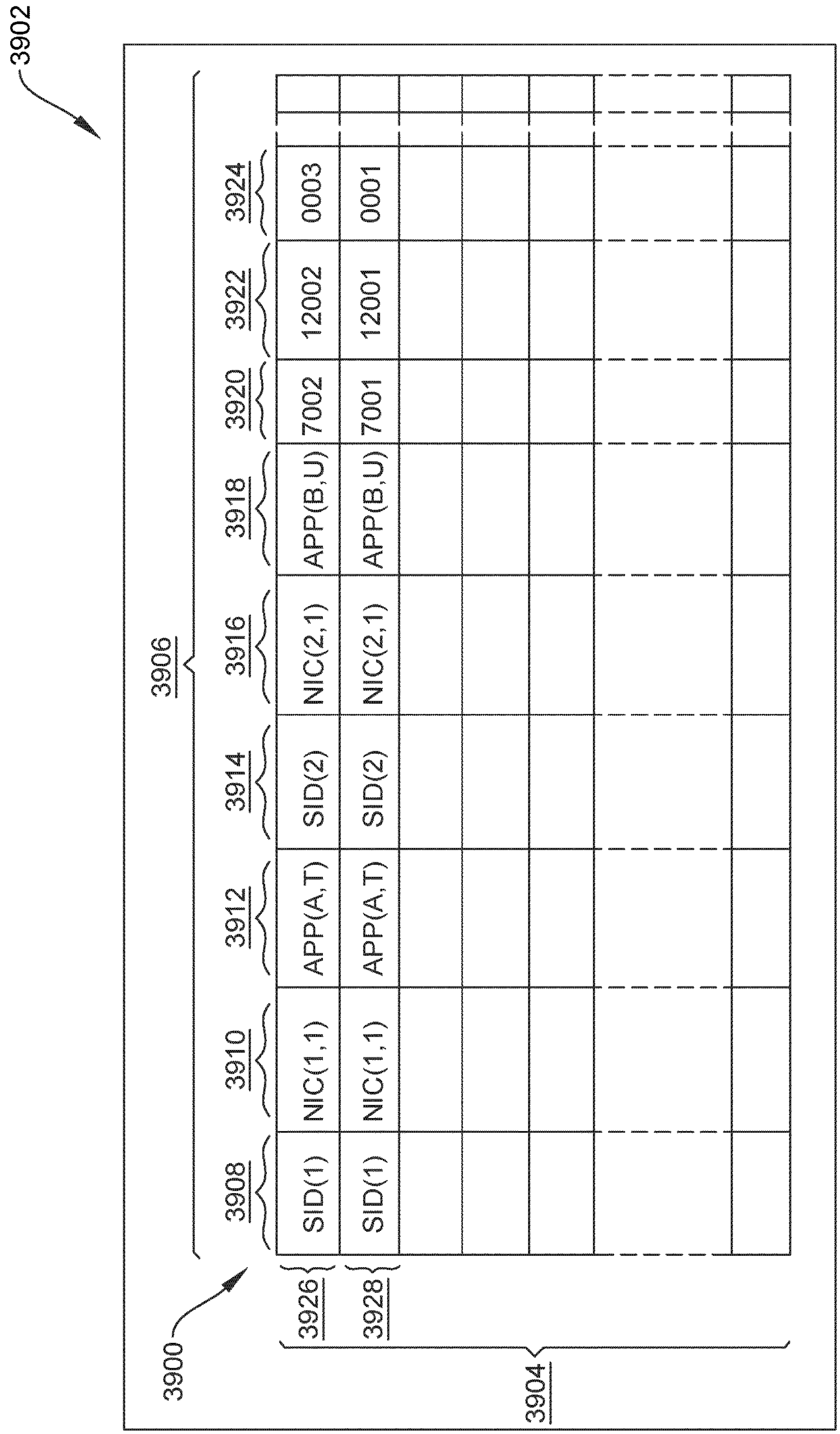
FIG. 39: Schematic view of second node having network configuration sixth data structure.

A schematic view of a network configuration fifth data structure 3800 stored in a non-transitory computer-readable storage medium (for example a nonvolatile memory) on a first node 3802 is depicted and a network configuration sixth data structure 3900 stored in a non-transitory computer-readable storage medium (for example a nonvolatile memory) on a second node 3802 is depicted in FIGS. 38 & 39. The data structures comprise records 3804 and 3904, each record composed of several fields 3806 and 3906 that are interpreted by network security middleware to define authorized network connections. First fields 3808 and 3908 contain node identification codes for a source node (i.e., a node having a resident application that is configured to send data to a different application that is resident on a destination node via a network). Second fields 3810 and 3910 contain codes for a network interface controller of the source node, processor, or computing device. Third fields 3812 and 3912 contain unique identifiers for the application configured to send data, the unique identifiers comprising an application code and a user code (for example an application code and a user code obtained from a process status check). Fourth fields 3814 and 3914 contain node identification codes for destination nodes (i.e., nodes having a resident application configured to receive data from an application resident on a source node via a network). Fifth fields 3816 and 3916 contain codes for network interface controllers of the destination node, processor, or computing device. Sixth fields 3818 and 3918 contain unique identifiers for applications configured to receive data, each unique identifier comprising an application code and a user code (for example an application code and a user code obtained from a process status check). Seventh fields 3820 and 3920 contain destination port numbers for the applications configured to receive data. Eighth fields 3822 and 3922 contain port numbers for network security software present on the destination nodes. Ninth fields 3824 and 3924 contain descriptors for authorized data protocol for the connection. The first node is a source or a destination node in each of the records present in data structure 3800 (likewise, the second node is a source or a destination node in each of the records present in data structure 3900). For example, in a first record 3826, the source node identification code is the node identification for the first node (designated "SID(1)"), the source network interface controller code is a code for an interface "2" on the source node (designated "NIC(1,2)"), and the source application identifier names an application "A" resident on the first node and user "T" (designated "APP(A,T)"). The first record 3826 defines a connection for transmitting data having an authorized data protocol descriptor "0001" from application "A" having user "T" on the first node to a destination at the second node, specifically a destination application "B" having a user "U" and a destination port having a port number "7001" via a network tunnel having a port number "12001" (i.e., network security middleware present on the second node will be associated with a port having a port number "12001", the port forming a destination endpoint of the network tunnel). In order for the connection to form between the first node and the second node, the data structure 3900 must contain an identical entry 3926—otherwise network security middleware present on the first node and/or the second node will prevent formation of the connection. In addition, the source application identifier of each data packet is verified by network security middleware present on the source node and included as metadata in each network packet transmitted over the network tunnel to the destination node, processor, or computing device. Any network packet containing inconsistent application and/or user information will be dropped by network security middleware resident on the destination node before being transmitted to the destination application. In addition, the network security middleware resident on the destination node will terminate the connection if more than a threshold number erroneous packets is detected. A second record 3828 of the first data structure illustrates a case where an application "D" and user "T" resident on the first node are configured to receive data having a protocol descriptor "0002" at an associated port having a port number "8001" via a tunnel port having a port number "13001" (i.e., port number "13001" is associated with or assigned to security middleware resident on the first node) from an application "C" and user "V" resident on a third node (not shown). It is noted that each tunnel port and each destination port are dedicated to a single connection—i.e., the same ports may not be used for different connections even if data is being transmitted between the same applications/users. For example, a third record 3830 (and a matching record 3928 present in the second data structure) differs from the first record only due to a difference in the protocol of the data transmitted, requiring different port numbers as shown.

In addition to the fields 3808-3824 and the fields 3908-3924, in certain embodiments, for example, the data structures 3804 and 3904 may contain additional fields. In certain embodiments, for example, the data structure 3804 may be divided among two or more files (for example two files, three files, or four files). In certain embodiments, for example, the data structure 3904 may be divided among two or more files (for example two files, three files, or four files). The ordering of fields 3808-3824 and the ordering of fields 3908-3924 is a non-limiting example comprising certain embodiments of the present disclosure. Certain embodiments may comprise, for example, any of the other orderings which may be generated by permuting the orderings of fields 3808-3824 and/or the orderings of fields 3908-3924, or a subset or all of the orderings which may be generated by permuting the orderings of fields 3808-3824 and/or the orderings of fields 3908-3924.

Figure 41:
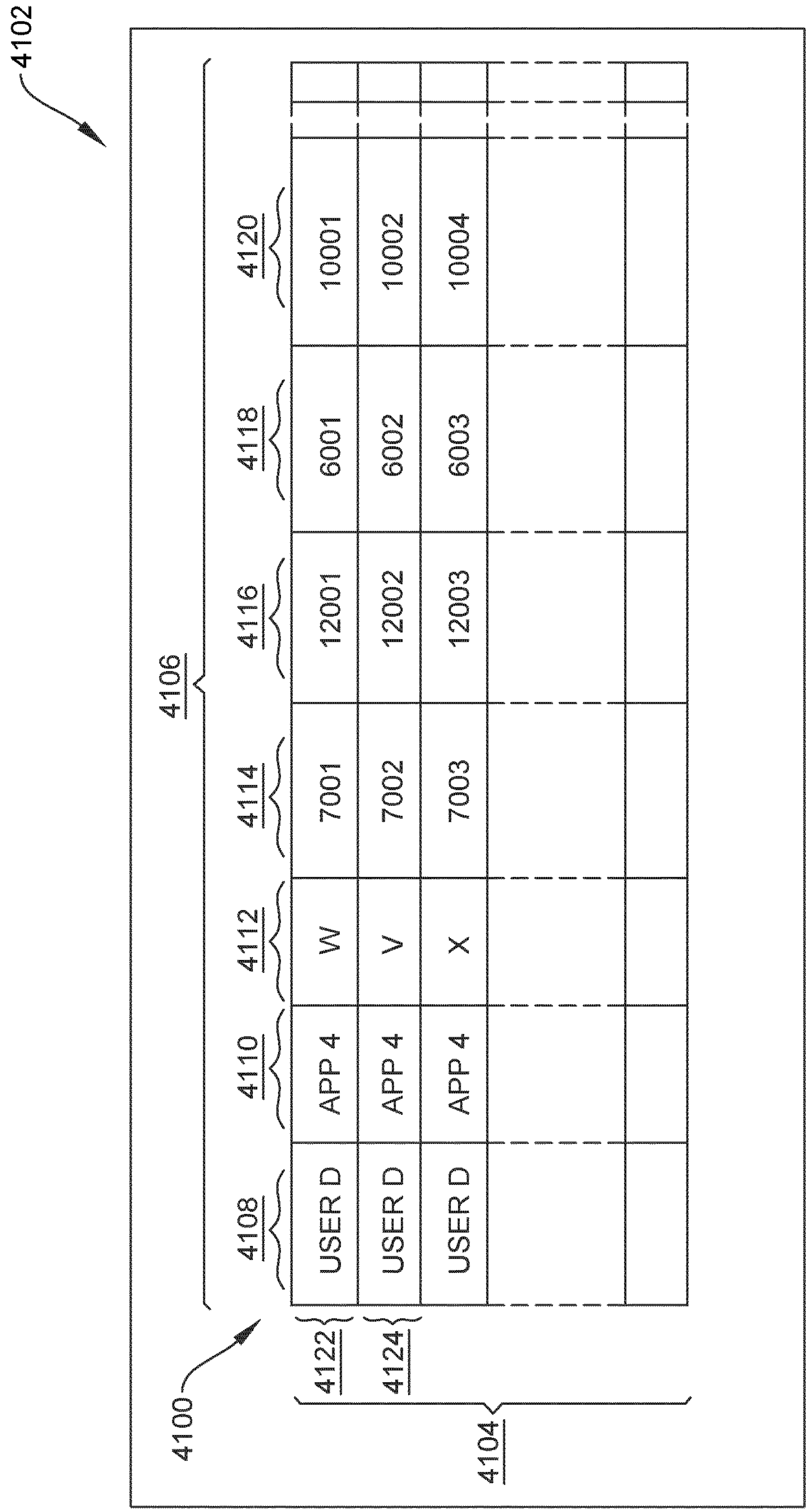
FIG. 41: Schematic view of second node having network configuration eighth data structure.

A schematic view of a network configuration seventh data structure 4000 stored in a non-transitory computer-readable storage medium (for example a nonvolatile memory) on a first node 4002 is depicted and a network configuration eighth data structure 4100 stored in a non-transitory computer-readable storage medium (for example a nonvolatile memory) on a second node 4102 is depicted in FIGS. 40 & 41. The data structures comprise records 4004 and 4104, each record composed of several fields 4006 and 4106 that are interpreted by network security middleware to define authorized network connections. First fields 4008 and 4108 contain an identifier for a user of an application. Second fields 4010 and 4110 contains an identifier for the application. Third fields 4012 and 4112 contain a descriptor for an authorized data protocol for the connection. Fourth fields 4014 and 4114 contain a port number for a local application. Fifth fields 4016 and 4116 contain a port number for local network security middleware. Sixth fields 4018 and 4118 contain a port number for a remote application. Seventh fields 4020 and 4120 contain a port number for remote network security middleware. Each record in the seventh data structure 4000 is a unique n-tuple and likewise in the eighth data structure 4100. Furthermore, the fourth field 4014 and the fifth field 4016 of each record in the seventh data structure 4000 form a unique 2-tuple, and likewise in the eighth data structure 4100. In addition, the sixth field 4018 and the seventh field 4018 of each record in the seventh data structure 4000 form a unique 2-tuple, and likewise in the eighth data structure 4100. The first node 4002 and the second node 4102 are constrained by their respective network security middleware to form only those network connections with port numbers and data protocol according to the seventh data structure 4000 and the eighth data structure 4100. For instance, based on the first record 4022 of the seventh data structure 4000 and the first record 4122 of the eighth data structure 4100, "USER A" of "APP 1" may communicate data with "USER D" of "APP 4" between port 6001 associated with "APP 1" and port "11001" associated with "APP 4" because, inter alia, the local application port number 4014 of the first record 4022 of the seventh data structure 4000 matches the remote application port number 4118 of the first record 4122 of the eighth data structure 4100, and vice versa; and because the data protocol descriptor 4012 of the first record 4022 of the seventh data structure 4000 matches the data protocol descriptor 4112 of the first record 4122 of the eighth data structure 4100. However, a "USER B" running application "APP 1" on the first node 4002 would not be able to form a connection based on local port "6002" with "USER D" running "APP 4" at least because the data protocol descriptor 4112 according to second record 4124 of the eighth data structure 4100 (i.e., "V") differs from the data protocol descriptor 4012 of the second record 4024 of the seventh data structure 4000 (i.e., "W"). Of further note, communication with the same user running the same application but with a different data protocol require different sets of local and remote ports (compare, for example, a third record 4026 and a fourth record 4028 of the seventh data structure 4000). In addition to the fields 4008-4020 and the fields 4108-4120, in certain embodiments, for example, the data structures 4004 and 4104 may contain additional fields. In certain embodiments, for example, the data structure 4004 may be divided among two or more files (for example two files, three files, or four files). In certain embodiments, for example, the data structure 4104 may be divided among two or more files (for example two files, three files, or four files). The ordering of fields 4008-4020 and the ordering of fields 4108-4120 is a non-limiting example comprising certain embodiments of the present disclosure. Certain embodiments may comprise, for example, any of the other orderings which may be generated by permuting the orderings of fields 4008-4020 and/or the orderings of fields 4108-4120, or a subset or all of the orderings which may be generated by permuting the orderings of fields 4008-4020 and/or the orderings of fields 4108-4120.

Figure 42:
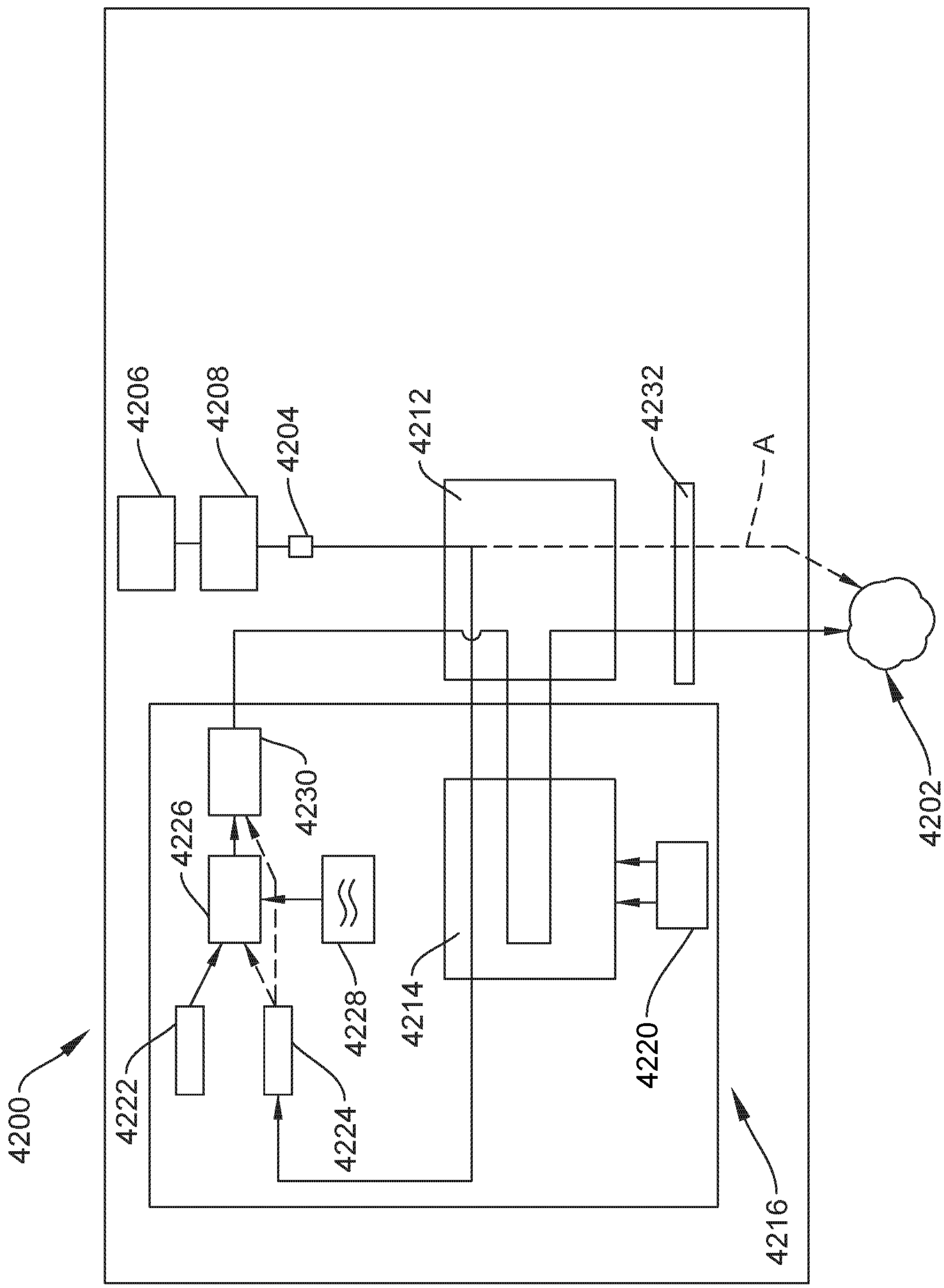
FIG. 42: Schematic view of exemplary node transmitting data to a network.

A schematic view of an exemplary node 4200 transmitting data to a network 4202 is illustrated in FIG. 42. A data packet sent from a program port 4204 by a user 4206 of a program 4208 to a network stack 4212 is routed to a first driver (or module, for example a kernel loadable module) 4214 of a network security layer 4216 (which security layer may operate in a kernel space, an application space, or a combination thereof). Based on a list 4220 of allowed network connections, the first driver (or module, for example a kernel loadable module) 4214 verifies that the user 4206 and the program 4208 are permissible, and obtains a network tunnel port number and data protocol for the data packet. The first driver (or module, for example a kernel loadable module) 4214 further verifies that the network tunnel port number is associated with a network tunnel that is in a valid state for transmitting data (for example having an open connection status). A builder module 4222 is invoked to assemble descriptors for the user 4206, the program 4208, and the data protocol into packet metadata. A data portion of the data packet is passed to a translator module 4224 to encode the data into translated data for transmission across the network tunnel. The packet metadata and optionally the translated data are encrypted by an encryption module 4226 using cryptographic keys specific to the network tunnel obtained from a file 4228 and an encrypted result is passed to an assembler module 4230 to form a modified data packet. If the translated data is not encrypted, it may bypass the encryption module 4228 and instead be passed directly to the assembler module 4230 as shown. The modified data packet is communicated to the network stack 4212 and a frame containing the modified data packet transmitted to the network tunnel by a physical interface 4232. Prior to communicating the modified data packet to the network tunnel, the first driver (or module, for example a kernel loadable module) 4214 verifies that the network tunnel is in a valid state for transmitting data. For illustrative purposes only, and not as part of the embodiment, path A shows that data packet sent from the program port 4204 would pass through the network stack 4212 and the physical interface 4232 to the network 4202 were the first driver (or module, for example a kernel loadable module) 4214 not present.

Figure 43:
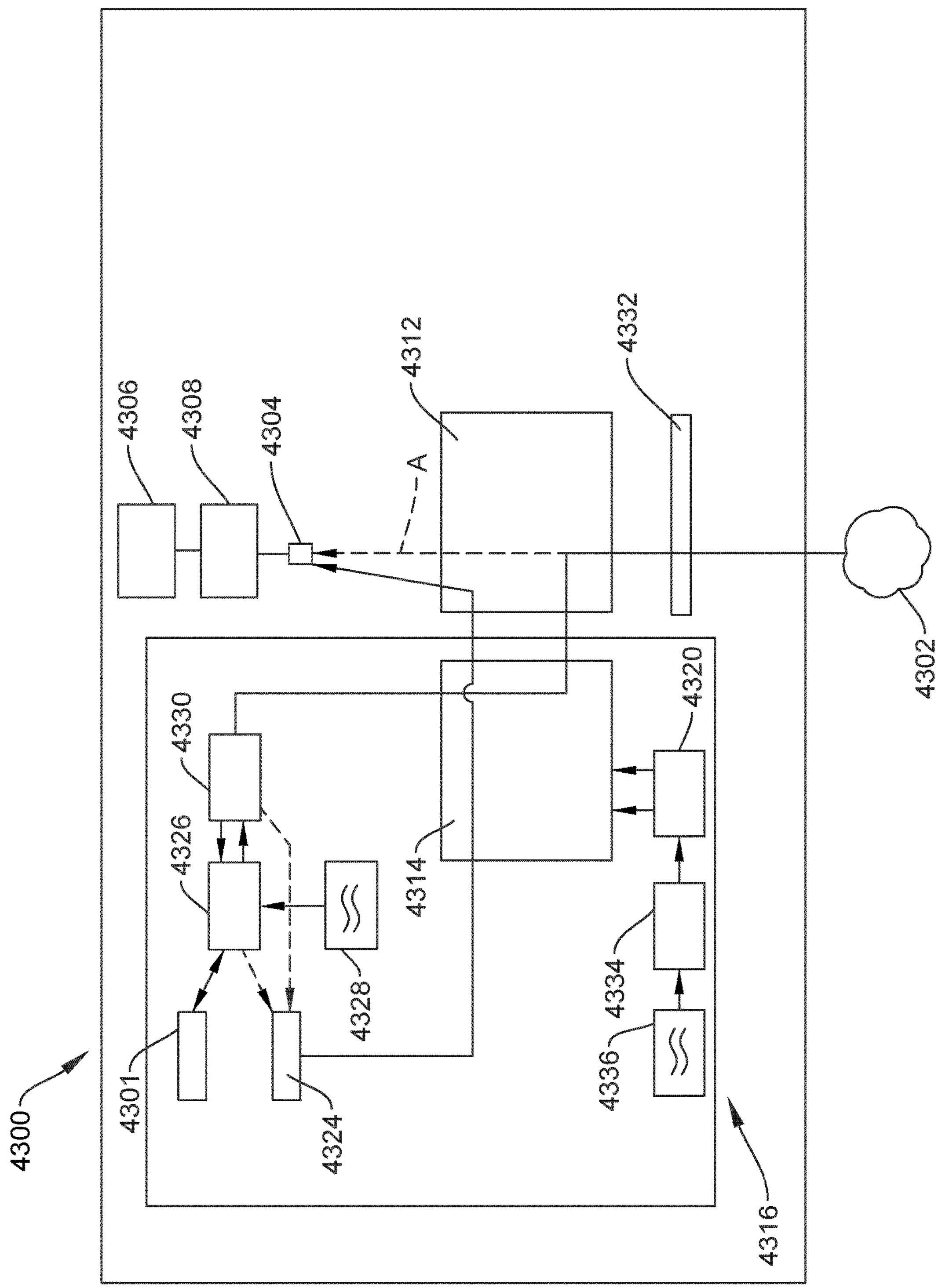
FIG. 43: Schematic view of exemplary node receiving data from a network.

A schematic view of an exemplary node 4300 receiving data from a network 4302 is illustrated in FIG. 43. A data packet containing translated data received from a network tunnel over the network 4302 and sent from a remote program port by a remote user passes through a physical interface 4332 and a network stack 4312. The data packet is received (or intercepted) by a first driver (or module, for example a kernel loadable module) 4314 (which may optionally be in a kernel space (for example a network API) or an application space) of a network security layer 4316 and directed to assembler 4330, where it is disassembled into encrypted metadata and the translated data (if the translated data is encrypted the encrypted translated data is passed with the encrypted metadata to an encryption module 4326, otherwise the unencrypted translated data is routed directly to a translation module 4324). Decrypted metadata obtained by passing the encrypted metadata through the encryption module 4326 is inspected by a validation module 4301 to verify that a descriptor comprising a remote application code, a remote user code, and a data protocol code match an expected value for the network tunnel. If the match is verified, the translated data is decrypted (if necessary) by encryption module 4326 and in any event the unencrypted/decrypted translated data is passed to a translator module 4324 for conversion into native format data and transmitted via a loopback interface to a local port 4304 associated with a resident program 3008.

Figure 44:
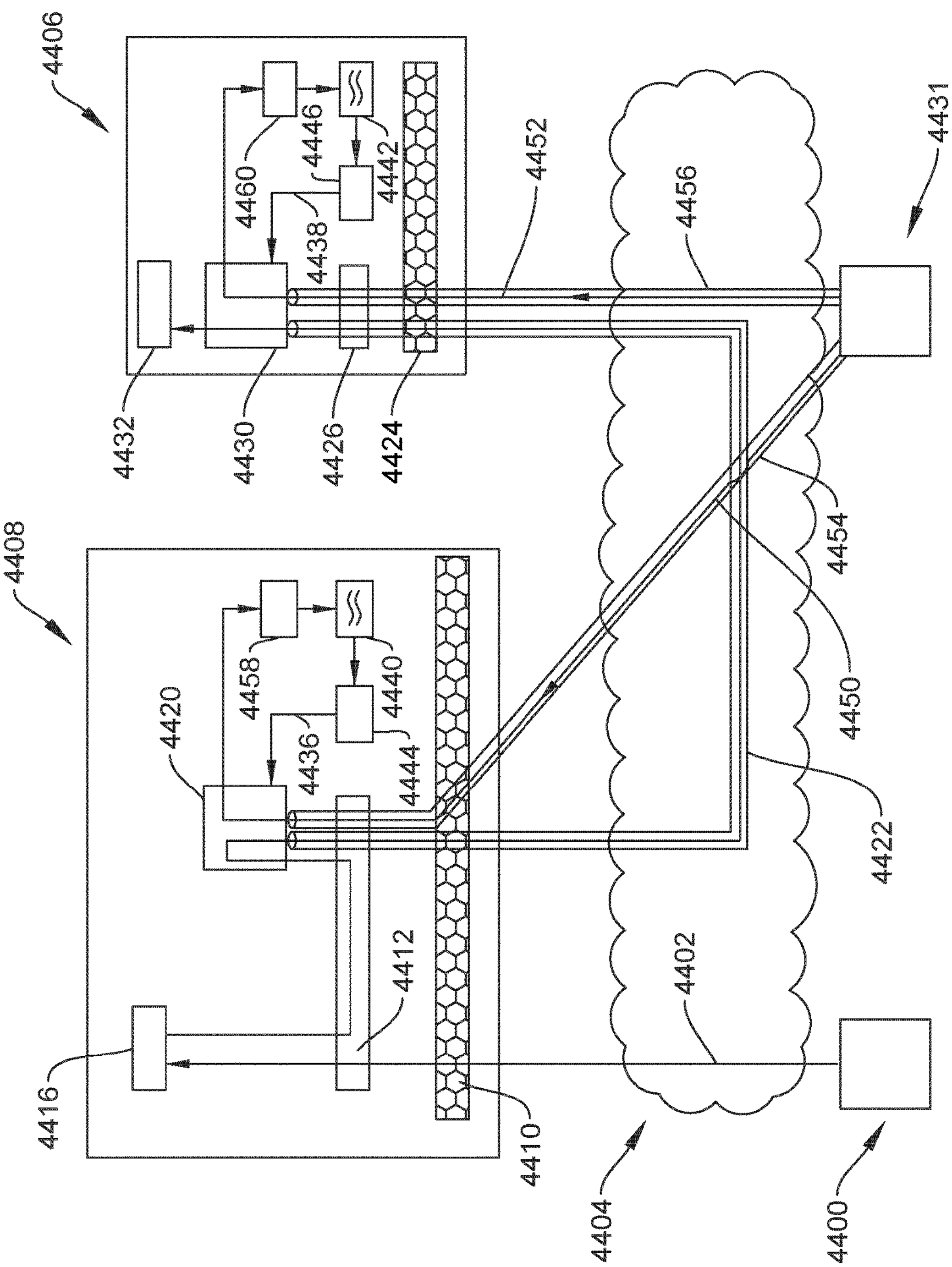
FIG. 44: Schematic view of gateway server.

A schematic view of an unsecure node 4400 transmitting data 4402 over a network 4404 to an exemplary secure node 4406 via an exemplary gateway server 4408 is illustrated in FIG. 44. The transmitted data 4402 passes through a physical interface 4410 into a network stack 4412 of the gateway server 4408 and to a trusted application 4416 of the gateway server (for example a trusted application running in an application space of the gateway server). Trusted data is transmitted from trusted application 4416 through a loopback interface of the network stack 4412 to a network security software 4420, (in certain embodiments, for example, a portion of the network security software may execute in kernel space and a further portion may execute in application space, or, in certain other embodiments, the network security software may execute only in kernel space or application space). The network security software 4420 routes the trusted data across the network 4404 through a pre-authorized encrypted network tunnel 4422 to a physical interface 4424 of the secure node 4406. Once in the secure node 4406, the trusted data is passed through a network stack 4426 of the secure node 4406 and network security software 4430 and directed to a recipient application 4432 of the secure node 4406. The network security software 4420 and the network security software 4430 manage data traffic through the encrypted network tunnel 4422 based on parameters (4436 and 4438, respectively) loaded from encrypted, read-only files (4440 and 4442, respectively) by computer programs (4444 and 4446, respectively). The parameters include, inter alia, shared secret node identification codes for the secure node 4406 and the gateway server 4408, a port number of the network security software 4430, a port number of the recipient application 4432, a process identification code and a process owner code associated with the recipient application 4432, and a data protocol associated with the transmitted data 4402. The encrypted, read-only files (4440 and 4442, respectively) are maintained by security configuration server 4448, which transmits updated encrypted configuration data (4450 and 4452, respectively) through encrypted network tunnels (4454 and 4456, respectively) to file update programs (4458 and 4460, respectively) as shown. In certain embodiments, for example, the computer programs (4444 and 4446, respectively) responsible for loading the encrypted, read-only files (4440 and 4442, respectively) may be positioned in application spaces. In certain embodiments, for example, the computer programs (4444 and 4446, respectively) responsible for loading the encrypted, read-only files (4440 and 4442, respectively) may be positioned in kernel spaces. In certain embodiments, for example, one the computer programs (4444 or 4446, respectively) responsible for loading the encrypted, read-only files (4440 and 4442, respectively) may be positioned in an application space and the other of the computer programs may be positioned in a kernel space.

Figure 45:
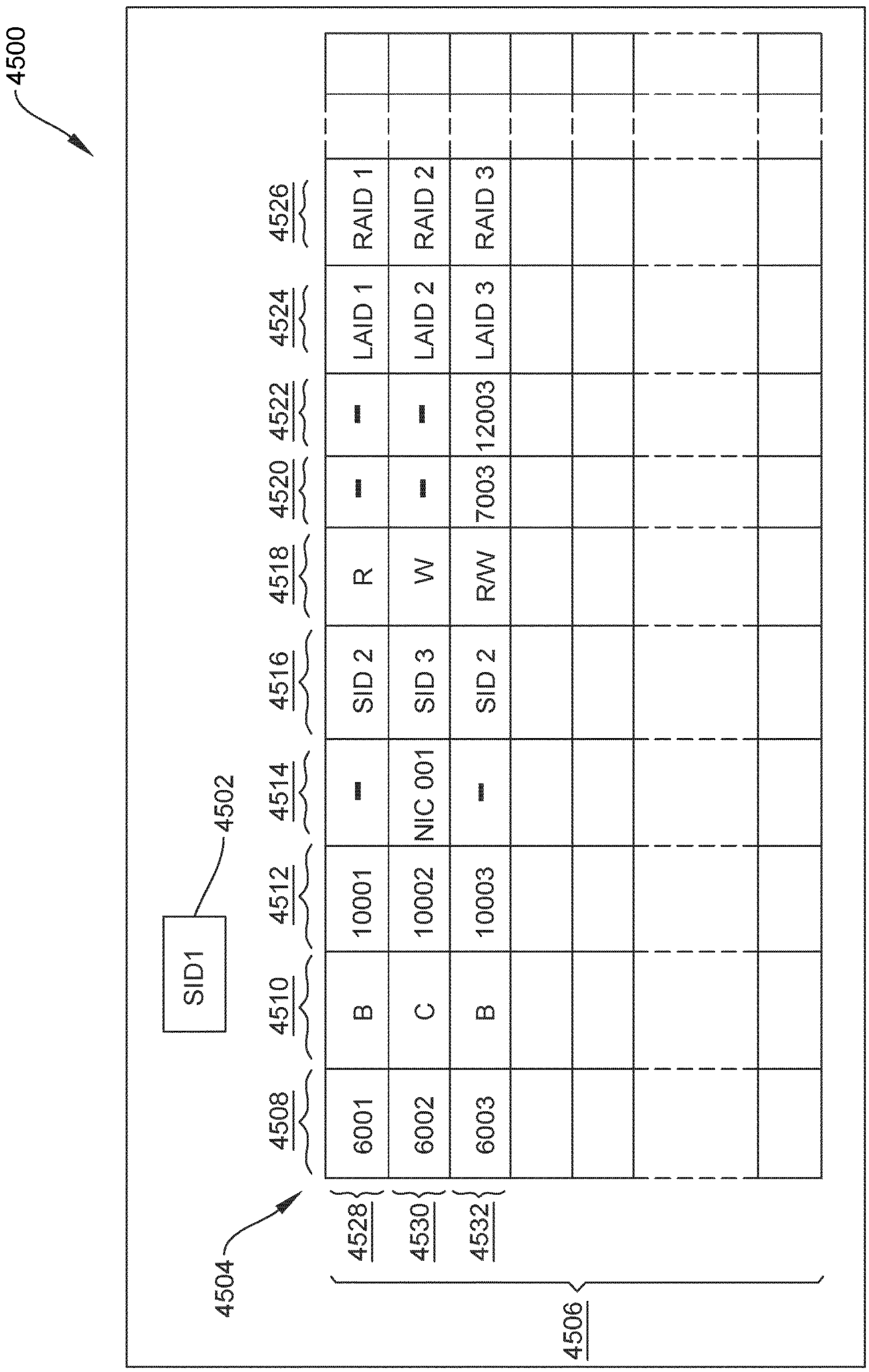
FIG. 45: Schematic view of first node having network configuration ninth data structure.

A schematic view of a network configuration first node identifier 4502 and ninth data structure 4504 stored in a non-transitory computer-readable storage medium (for example a nonvolatile memory) on a first node 4500 is depicted and a network configuration second node identifier 4602 and tenth data structure 4604 stored in a non-transitory computer-readable storage medium (for example a nonvolatile memory) on a second node 4600 is depicted in FIGS. 45 & 46. The data structures comprise records 4506 and 4606, each record composed of several fields that are interpreted by network security middleware to define authorized network connections. First fields 4508 and 4608 contain bind-side port numbers (i.e., numbers for listening ports or ports on server side of a connection) for network connections formed by the first node 4500 and the second node 4600, respectively. Second fields 4510 and 4610 provide a flag, the flag indicating whether an application program will bind ("B") the port to a loopback interface or form a connection ("C") with the listening port. Third fields 4512 and 4612 contain port numbers for network security software resident on the first node 4500 and second node 4600, respectively. Fourth fields 4514 and 4614 contain network interface controller identifiers (for example IP addresses, DHCP names, or a proprietary identifiers). Of note, in certain embodiments a network interface controller identifier need not necessarily be specified when the bind/connect flag is set to "B" whereas it must usually be set when the bind/connect flat is set to "C" (i.e., in order for a connect command to have access to a required destination address). Fifth fields 4516 and 4616 contain remote node identifiers. Sixth fields 4518 and 4618 contain a read ("R"), write ("W") or Read-Write ("R/W") flag to determine the allowed directionality of data flow. Optional seventh and eighth fields 4520 and 4620 and 4522 and 4622 contain static connection-side application and network security software port numbers (these fields are populated if static port numbers are used on the connect side of a connection, otherwise the optional seventh fields 4520 and 4620 and 4522 and 4622 may be blank and the connect-side ports set ephemerally). Eighth fields 4524 and 4624 contain application information (for example, application identifier and process owner information and a data protocol type) for a local application on the first node 4500 and second node 4600, respectively. Ninth fields 4526 and 4626 contain application information (for example, application identifier and process owner information and a data protocol type) for a remote application.

As shown, a bind-side port number may be associated with either a local application or a remote application. For example, in record 4528, the port number "6001" is associated with an application having the application information specified in column 4524 because the bind/connect flag 4510 is set to "B". The first node 4500 is a source or a destination node for communication of packet data and/or a data stream (and hosts a client or a server) in each of the records present in data structure 4504 (likewise, the second node is a source or a destination node for communication of packet data and/or a data stream in each of the records present in data structure 4604). The first record 4528 of the first node 4500, for example, is used by network security software on the first node 4500 to do its part to establish a connection from the first node (having a node identifier 4502 "SID 1") to receive ("R") data from an application (having an application identifier "RAID 1") at a local application (having an application identifier "LAID 1"). Once the connection is formed, the application process port "6001" is in communication via a loopback interface to network security software present on the first node 4500, said network security software having opened a port "10001" which is bound to interface "NIC 002" (see record 4628). As record 4530 shows, the network security software on the first node 4500 has a further connection to port "10002" associated with network security software on a third node identified by "SID 3". Records 4532 and 4632 illustrate a scenario in which the second node 4600 initiates a read-write ("R/W") connection with the first node 4500 via a network interface controller "NIC 002" on the first node, processor, or computing device. Of note, "LAID 3" in the record 4532 has the same value as "RAID 3" in the record 4632, and "RAID 3" in the record 4532 has the value as "LAID 3" in the record 4632. Of further note, "LAID 3" in the record 4532 refers to a different value than the value "LAID 3" in the record 4632. In addition to the fields 4508-4526 and the fields 4608-4626, in certain embodiments, for example, the data structures 4504 and 4604 may contain additional fields. In certain embodiments, for example, the data structure 4504 may be divided among two or more files (for example two files, three files, or four files). In certain embodiments, for example, the data structure 4604 may be divided among two or more files (for example two files, three files, or four files). The ordering of fields 4508-4526 and the ordering of fields 4608-4626 is a non-limiting example comprising certain embodiments of the present disclosure. Certain embodiments may comprise, for example, any of the other orderings which may be generated by permuting the orderings of fields 4508-4526 and/or the orderings of fields 4608-4626, or a subset or all of the orderings which may be generated by permuting the orderings of fields 4508-4526 and/or the orderings of fields 4608-4626.

In any of the foregoing embodiments, for example, the network packets may comprise one or more of the metadata, application process and data protocol metadata, identification codes, application identifiers, process identifiers, application process identifiers, user identifiers and/or codes, owner codes, user-application identifiers, process owner identifiers, application process identifiers, user-application process identifiers, data protocol identifiers and/or descriptors, payload data type descriptors and/or identifiers, payload data descriptors, file identification codes, policy identification codes, node identifiers and/or identification codes, device identifiers and/or codes, n-tuples and the like disclosed herein and/or in one of the INCORPORATED REFERENCES.

Certain embodiments may provide, for example, a method for monitoring, providing alerts for, securing, or preventing network communication between a first computing device and a second computing device and comprising establishing a communication pathway between a first transport layer port of the first computing device and a second transport layer port of the second computing device, the improvement comprising: one or more of the methods, systems, products, communication management operations, software, modules, middleware, computing infrastructure and/or apparatus of any of the embodiments disclosed herein and/or in one or more of the INCORPORATED REFERENCES.

In any of the foregoing embodiments, for example, the configured communication pathways, exclusive connection, or bidirectionally authorized and/or authenticated pathways may be one of the communication pathways and/or network tunnels described herein and/or in one of the INCORPORATED REFERENCES.

In any of the foregoing embodiments, for example, any of the configured communication pathways, exclusive connection, or bidirectionally authorized and/or authenticated pathways may configured according to one or more of the communication management operations described herein and/or in one or more of the INCORPORATED REFERENCES.

In any of the foregoing embodiments, for example, the communication management operations may comprise any of the communication management operations and/or a portion or all of one or more of the methods described herein and/or in one or more of the INCORPORATED REFERENCES.

In any of the foregoing embodiments, for example, the communication management operations may use one or more of the metadata, application process and data protocol metadata, identification codes, application identifiers, process identifiers, application process identifiers, user identifiers and/or codes, owner codes, user-application identifiers, process owner identifiers, application process identifiers, user-application process identifiers, data protocol identifiers and/or descriptors, payload data type descriptors and/or identifiers, payload data descriptors, file identification codes, policy identification codes, node identifiers and/or identification codes, device identifiers and/or codes, communication configuration parameters, encrypted parameters, configuration packets, n-tuples and the like disclosed herein and/or in one or more of the INCORPORATED REFERENCES to detect, monitor, report, generate an alert for, authenticate, authorize, establish a communication pathway (for example a configured communication pathway) for, and/or block communication of, application data between a first application on a first computing device and a second application on a second computing device.

In any of the foregoing embodiments, for example, the bidirectional authorization and authentication parameters may comprise one or more of the metadata, application process and data protocol metadata, identification codes, application identifiers, process identifiers, application process identifiers, user identifiers and/or codes, owner codes, user-application identifiers, process owner identifiers, application process identifiers, user-application process identifiers, data protocol identifiers and/or descriptors, payload data type descriptors and/or identifiers, payload data descriptors, file identification codes, policy identification codes, node identifiers and/or identification codes, device identifiers and/or codes, communication configuration parameters, encrypted parameters, configuration packets, n-tuples and the like disclosed herein and/or in one or more of the INCORPORATED REFERENCES.

In any of the foregoing embodiments, for example, the communication parameters file may comprise a portion or all of any of the files, configuration files, binary files, encrypted files, read-only files, kernel access-only files, local files, variable record length files, records, disclosed herein and/or in one or more of the INCORPORATED REFERENCES.

INCORPORATION BY REFERENCE

Without limitation, the following documents are hereby incorporated, in their entirety, by reference: U.S. Provisional Application Nos. 62/731,529, 62/655,633, 62/609,252, 62/609,152, 62/569,300; U.S. Patent Application Publication Nos. 2019/0109713, 2019/0109848, 2019/0109714, 2019/0109820, 2019/0109821, 2019/0109822, and 2019/0132315; and U.S. Pat. Nos. 10,361,859, 10,367,811, 10,374,803, 10,375,019, and 10,397,186 (collectively, the "INCORPORATED REFERENCES").

EXAMPLES

Prophetic Example 1

In the following Examples, maximum packet processing rates at several processor loads would be determined for network security middleware consisting of a port filter and metadata processing engine. The port filter would be configured to read the destination port number of each packet and compare said port number to a list of 500 port numbers stored in kernel random access memory. The metadata processing engine would be configured to extract 30 bytes of metadata from a predetermined portion of each packet, optionally decrypt the metadata using a decryption utility executing in application space, and compare said metadata to a list of 500 30-byte data segments stored in kernel random access memory. Each 30 byte metadata would comprise a fixed 10-byte user code, a 10-byte application code, and a 10-byte data protocol code. Results are presented in Table 1.

TABLE 1

Network Security Middleware Performance

| Example | Processor Load[1] | Packet Size (bytes) | Encrypted[2] | Packet Processing Rate ($sec^{-1}$)/(% wire speed[3]) Middleware | No Middleware |
|---|---|---|---|---|---|
| 1 | 2.5 | 100 | No | 52,500<br>70% | 56,250<br>75% |
| 2 | 2.5 | 1500 | No | 60,000<br>80% | 63,750<br>85% |
| 3 | 2.5 | 100 | RC4 | 45,000<br>60% | — |
| 4 | 2.5 | 1500 | RC4 | 52,500<br>70% | — |
| 5 | 5 | 100 | No | 63,750<br>85% | 67,500<br>90% |
| 6 | 5 | 1500 | No | 67,500<br>90% | 69,000<br>92% |
| 7 | 5 | 100 | RC4 | 60,000<br>80% | — |
| 8 | 5 | 1500 | RC4 | 63,750<br>85% | — |
| 9 | 10 | 100 | No | 69,000<br>92% | 69,000<br>92% |
| 10 | 10 | 1500 | No | 71,250<br>95% | 73,500<br>98% |
| 11 | 10 | 100 | RC4 | 67,500<br>90% | — |
| 12 | 10 | 1500 | RC4 | 69,000<br>92% | — |

[1] 1 GHz ARM9 processor running Microlinux
[2] Secure Hash Algorithm 3
[3] 1 Gb Ethernet interface having 10% packet processing overhead All publications and patent applications mentioned in this specification are herein incorporated by reference to the same extent as if each individual publication or patent application was specifically and individually indicated to be incorporated by reference.

While preferred embodiments of the present invention have been shown and described herein, it will be obvious to those skilled in the art that such embodiments are provided by way of example only. It is intended that the following claims define the scope of the invention and that methods and structures within the scope of these claims and their equivalents be covered thereby.

What is claimed is:

1. An edge device comprising a network interface controller (NIC) , a hardware processor, a communication parameters file, and software components executable by the hardware processor, the software components comprising:

i) a networking stack;

ii) an application program comprising an API command to the networking stack; and iii) a network security program executable to perform communication management operations, the communication management operations comprising:

a) authorizing one or more networking stack functions triggered by the API command, comprising:

I) obtaining an application identifier and process owner associated with an instance of the application program, and further obtaining a port number and a NIC address associated with the API command;

II) parsing the communication parameters file to obtain a nonpublic application code and a nonpublic user code associated with the port number paired with the NIC address; and III) confirming the nonpublic application code corresponds to the application identifier and further confirming the nonpublic user code corresponds to the process owner; and b) forming a configured network communication pathway between the application program instance and a remote program operated by a remote user on a remote device, comprising:

I) sending a first configuration packet from the device to the remote device, the first configuration packet containing a nonpublic device identifier for the device in a portion of the first configuration packet;

II) receiving a second configuration packet from the remote device, the second configuration packet containing a first remote parameter in a first portion of the second configuration packet and a second remote parameter in a second portion of the second configuration packet; and III) matching the first remote parameter to a nonpublic remote application code that is associated with the port number in the communication parameters file, and further matching the second remote parameter corresponds to a nonpublic remote user code that is associated with the port number in the communications parameter file, wherein the communication management operations further comprise: preventing the port number from being used by any communication pathway except for the configured network communication pathway.

2. The device of claim 1, wherein the API command is a bind command.

3. The device of claim 1, wherein the API command is a connect command.

4. The device of claim 1, wherein the configured network communication pathway is at least partially encrypted.

5. The device of claim 1, wherein the network security program is installed during production of the device.

6. The device of claim 1, wherein the obtaining is performed in a kernel space of the edge device.

7. The device of claim 1, wherein the confirming is performed in a kernel space of the edge device.

8. The device of claim 1, wherein the communication management operations further comprise: preventing all user-applications on the edge device from directly connecting to remote computing devices.

9. The device of claim 1, wherein the communication management operations further comprise:

i) receiving a series of further network packets, the series of further network packets comprising (a) application data, and (b) encrypted parameters in application layer portions of the further network packets;

ii) decrypting the encrypted parameters using decryption keys to obtain decrypted parameters; and iii) verifying that the decrypted parameters match the nonpublic remote application code prior to passing the application data to the application program.

* * * * *